United States Patent [19]
White

[11] Patent Number: 6,115,710
[45] Date of Patent: Sep. 5, 2000

[54] PORTABLE AND DYNAMIC DISTRIBUTED TRANSACTION MANAGEMENT METHOD

[75] Inventor: John W. White, Dallas, Tex.

[73] Assignee: Sterling Software, Inc., Dallas, Tex.

[21] Appl. No.: 08/374,019

[22] Filed: Jan. 18, 1995

Related U.S. Application Data

[62] Division of application No. 08/086,564, Jun. 30, 1993, Pat. No. 5,428,782, which is a continuation of application No. 07/972,882, Nov. 3, 1992, abandoned, which is a continuation of application No. 07/414,221, Sep. 28, 1989, abandoned.

[51] Int. Cl.[7] .............................. G06F 17/30; G06F 17/40
[52] U.S. Cl. ................................ 707/10; 707/3; 707/101; 707/103; 707/200
[58] Field of Search .................................. 395/600, 650, 395/700, 604, 610, 613, 614, 615

*Primary Examiner*—Thomas G. Black
*Assistant Examiner*—David Yiuk Jung
*Attorney, Agent, or Firm*—Baker & Botts, L.L.P.

[57] ABSTRACT

A system and method is shown for enabling a plurality of computers and associated computer resources, some or all of which may be of heterogeneous configuration, to cooperatively process various applications such that the execution is transparent to the user regardless of where the application is actually executing. This distributed applications architecture performs an information distribution service between multiple transaction processing systems by working with a transaction processor via communication channels to other hosts within the network and a dialog manager which uses a transaction processor interface to communicate with the transaction processor. The architecture employs a map service which provides an editor to create the maps for the application panels, a compiler to generate the maps into a linkable form, and a linkable interpreter which translates the linkable form into the screen presentation format for that platform. To distribute an application, the source code for the procedures, view and panels are moved as a block to the new system. This is possible because once the application source code is complete, all application logic, user interface control tables, view definitions, and other application-specific tables for one transaction definition are packaged by the present invention in a single load module on the system where the application will reside. The load module is then compiled using the target system's compiler, link editor, and bind process. Thus, all environment-dependent variations of import/export are automatically integrated with the application at load module bind time, requiring no source code changes.

3 Claims, 206 Drawing Sheets

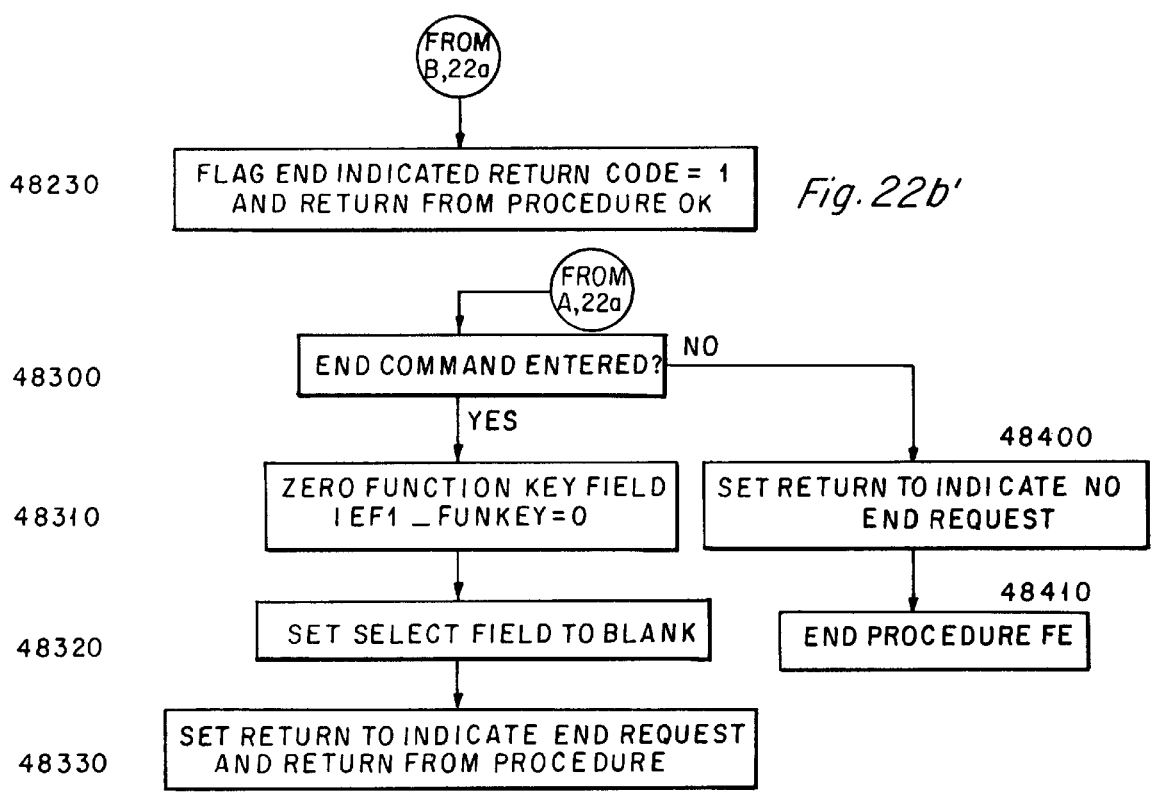

```
102390          BEGIN PROCEDURE: ET
                         │
                         │◄────── FROM F,23c
                         ▼
102420          PERFORM PROCEDURE
                DISPLAY(47300) OF
                   GTDET PANEL
                         │
                         ▼
102440          CHECK FOR USER END
                INDICATIONS PROCEDURE FE
                         │
                         ▼
102445          IS END INDICATED?  ──YES──► TO B,23c'
                         │
                         NO
                         ▼
102480          LOAD/CREATE TDF
                PROCEDURE GTDT
                         │
                         ▼
102485          IS CREATE TDF  ──YES──► TO C,23b
                  SUCCESSFUL?
                         │
                         NO
                         ▼
102490          SET NUMBER OF ENTRIES
                IN STDE TABLE TO -1
                INDICATING NO TABLE
                         │
                         ▼
                      TO A,23b
```

*Fig. 23a*

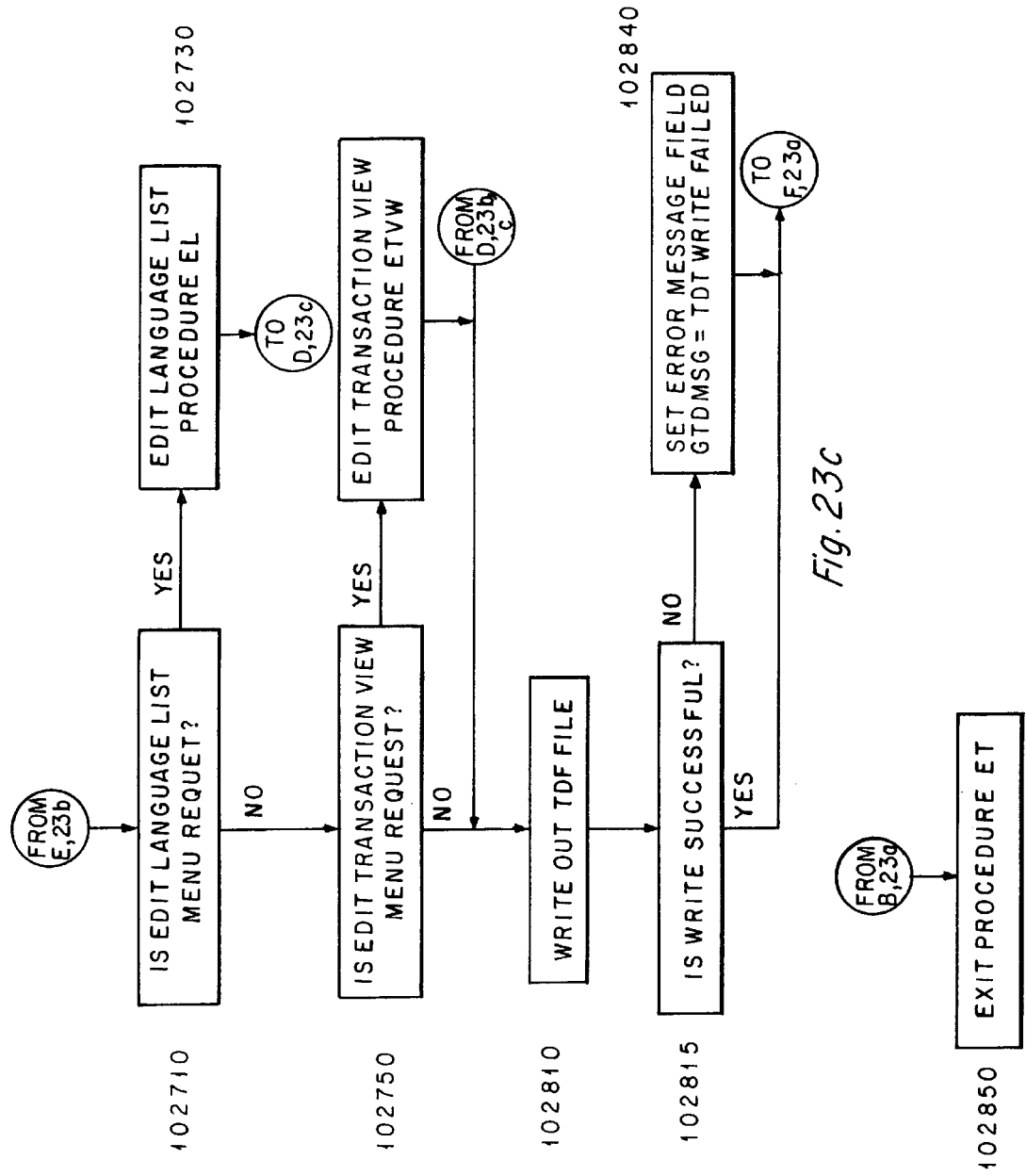

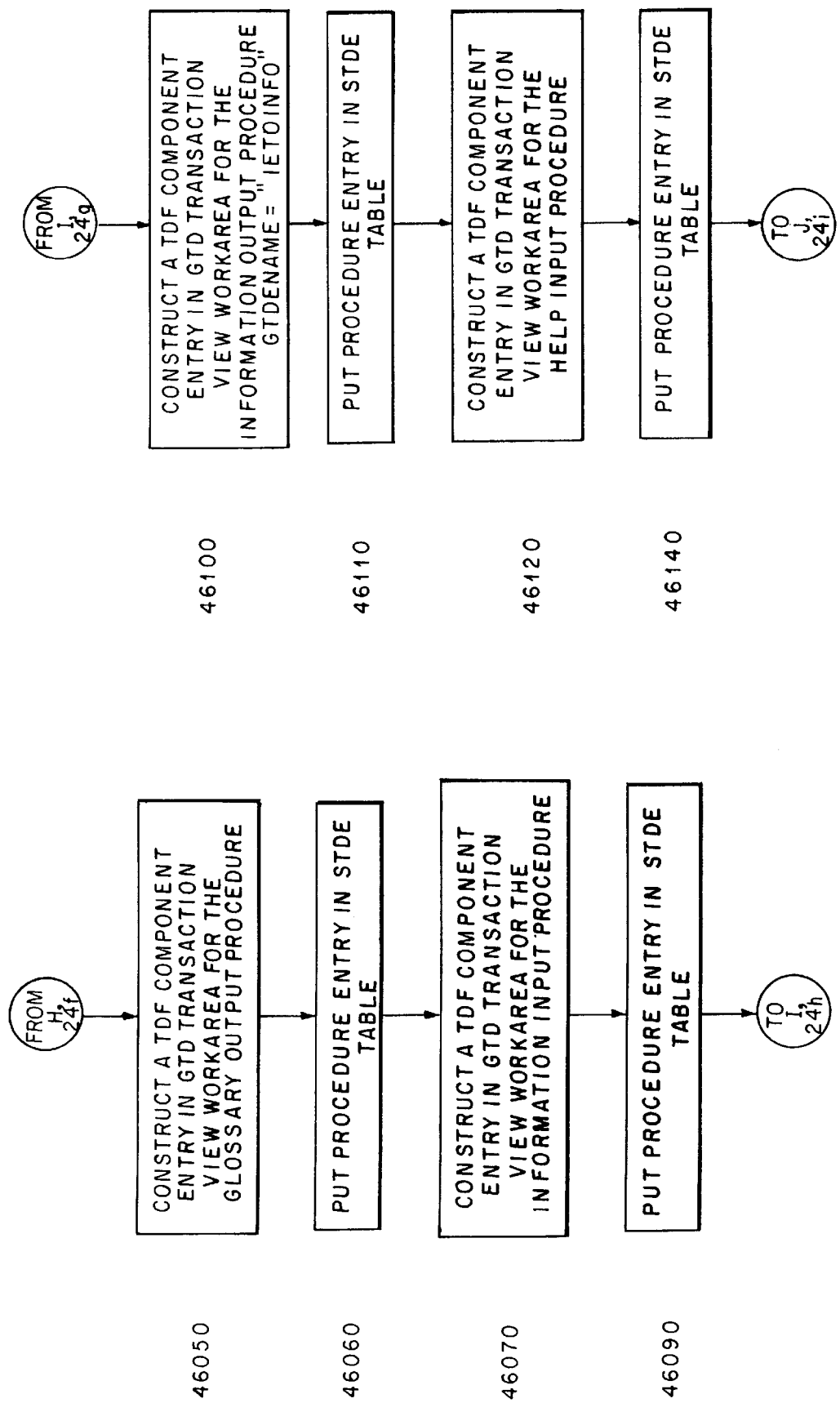

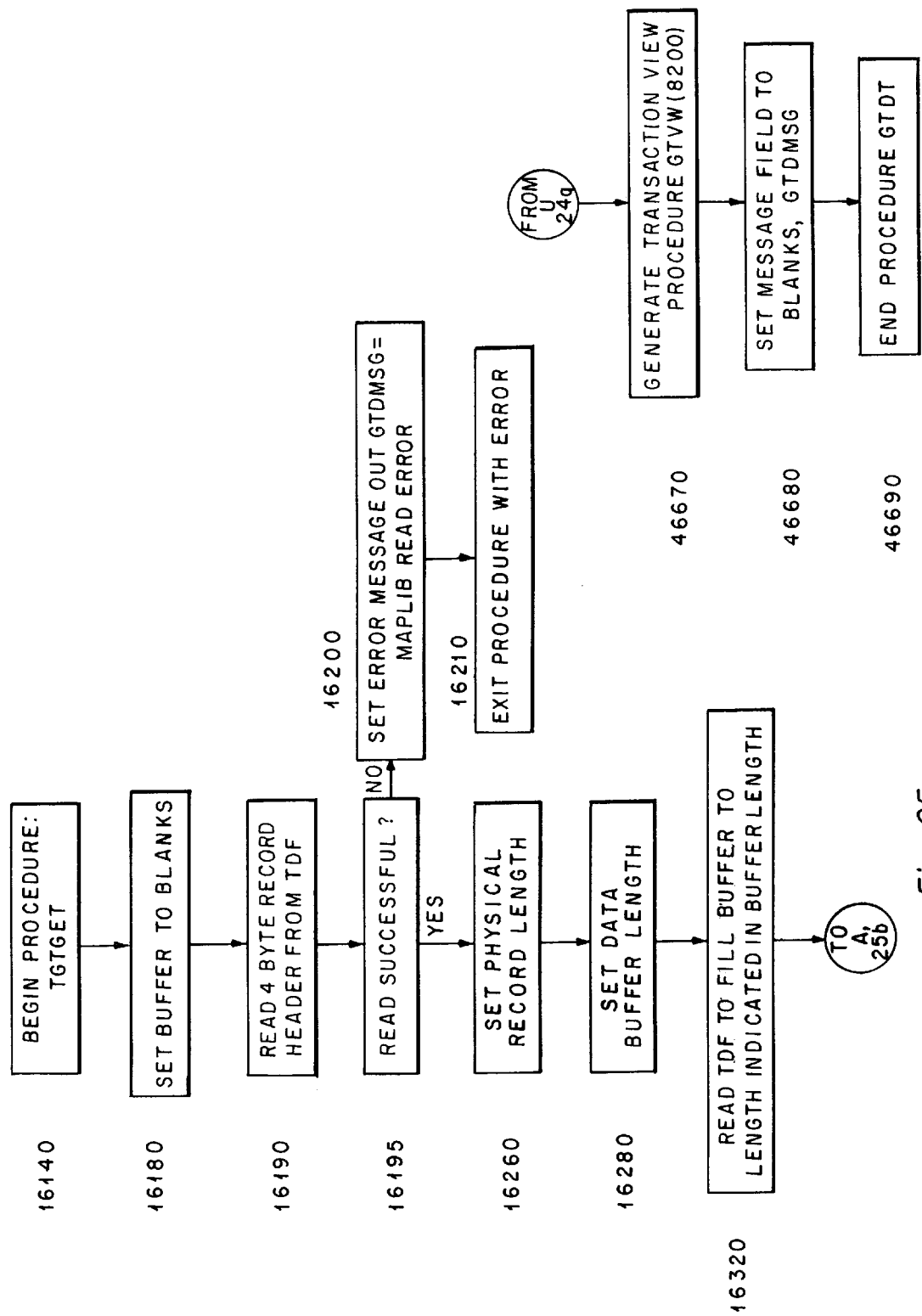

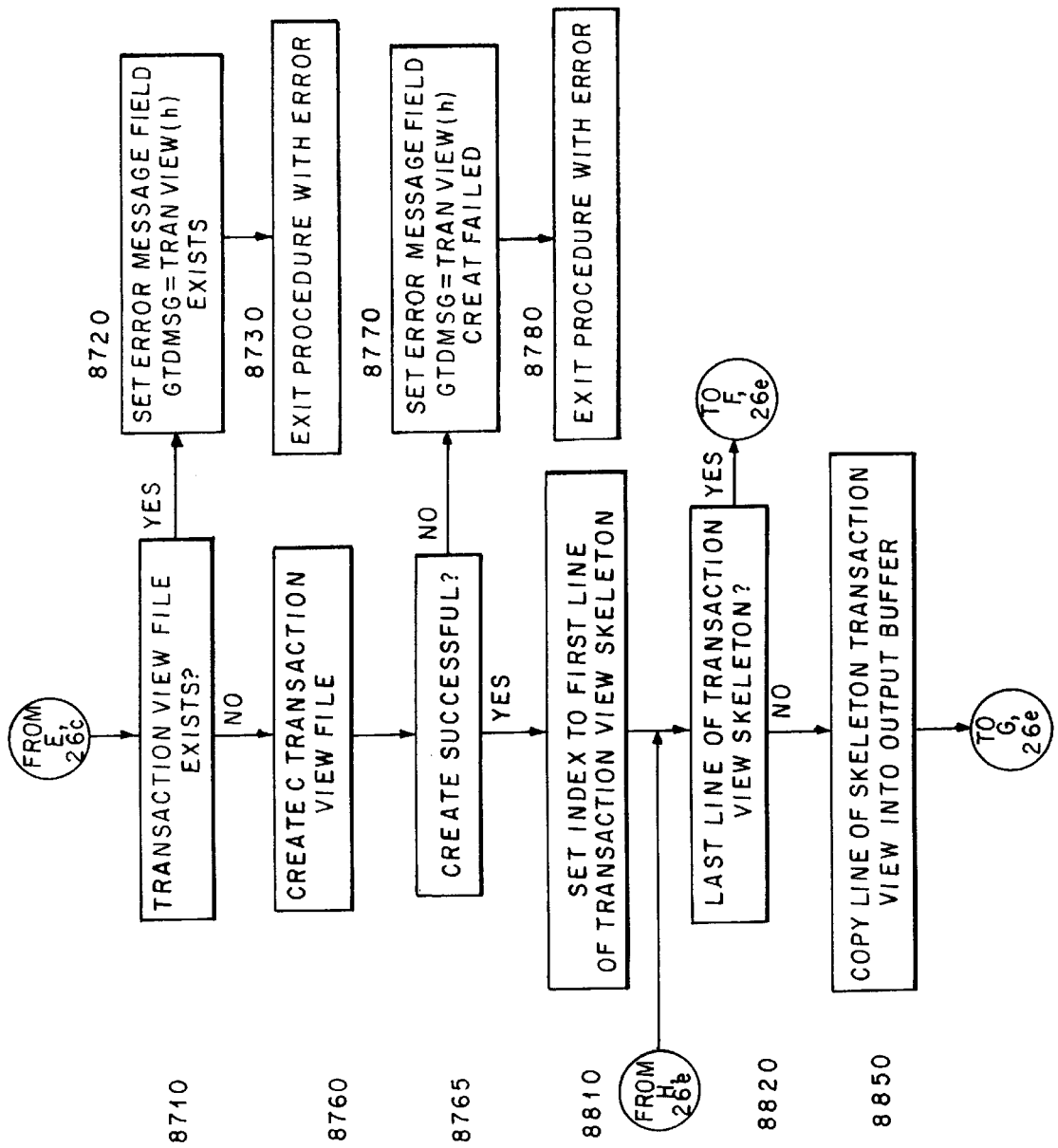

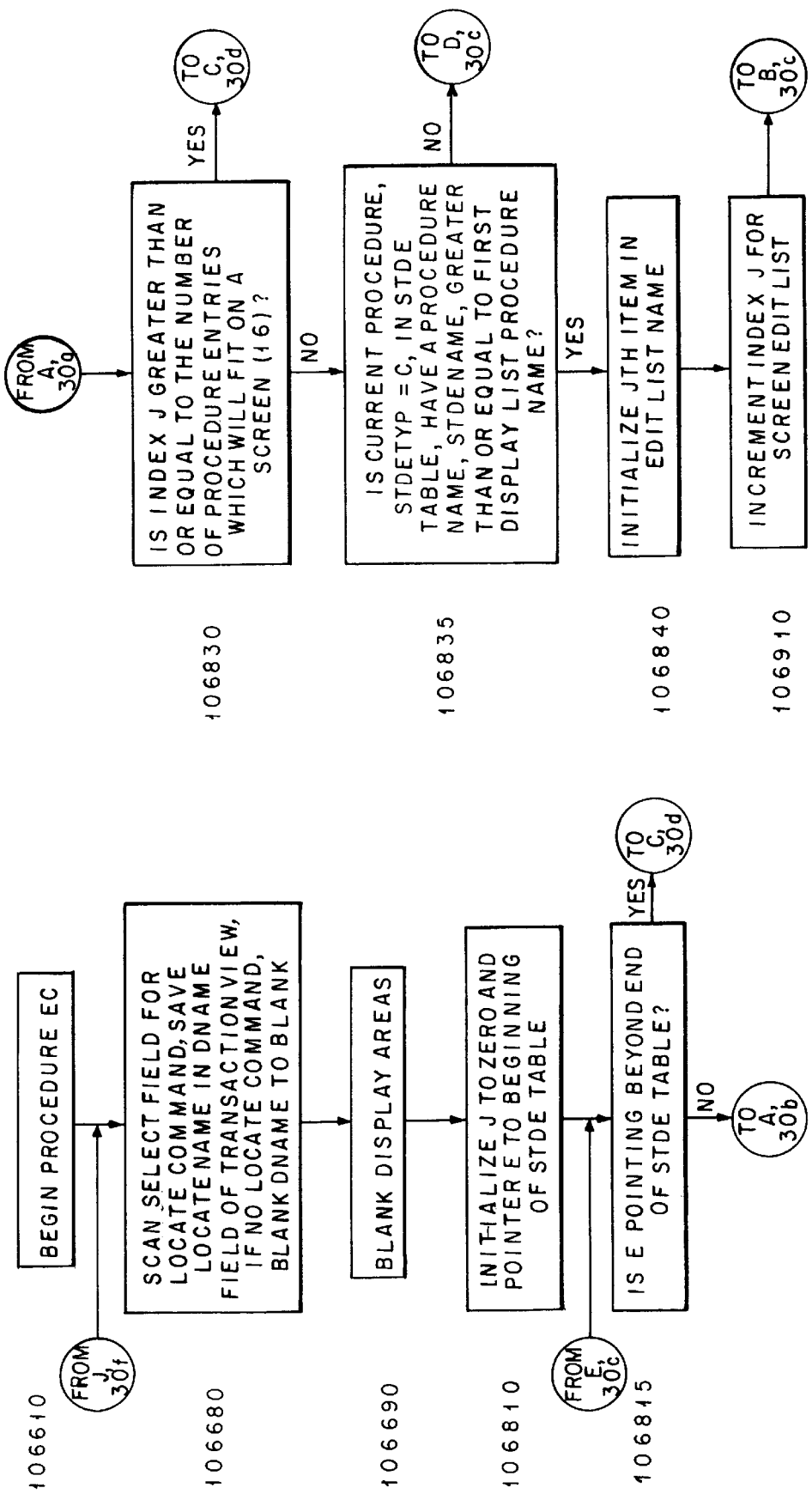

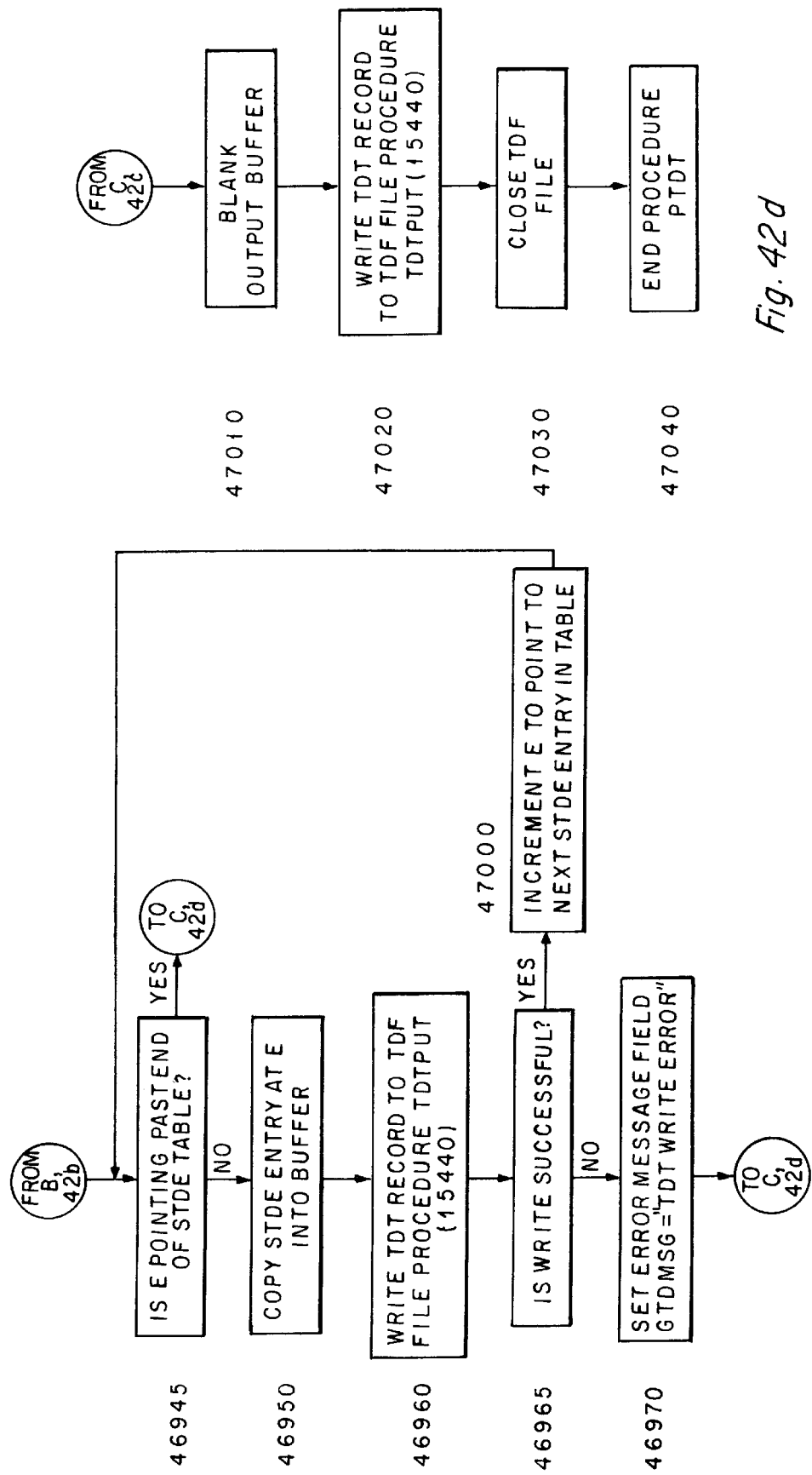

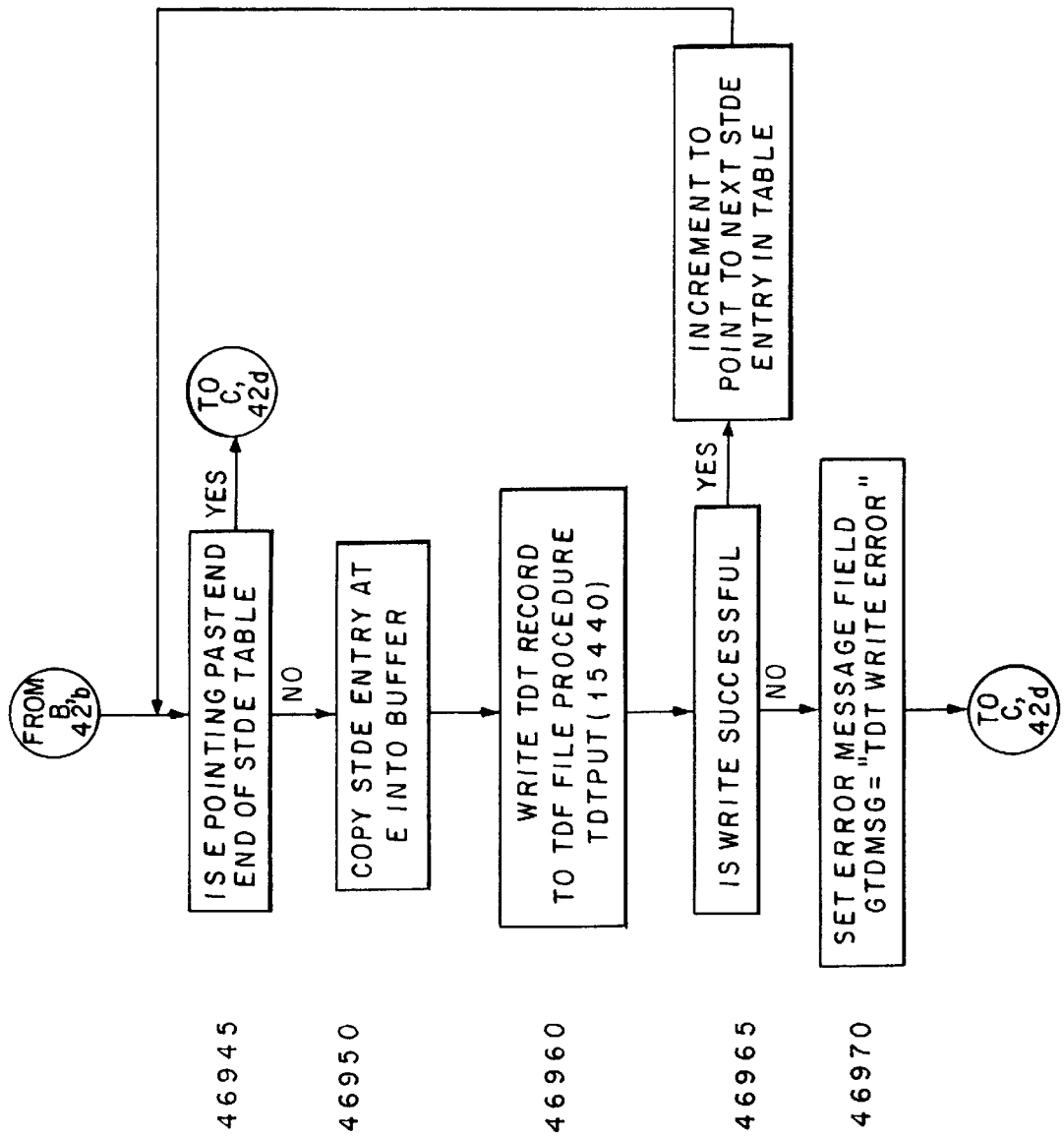

15440 — BEGIN PROCEDURE TDTPUT

15480 — SET BUFFER LENGTH TO POSITION OF LAST NON_BLANK CHARACTER IN BUFFER

15530 — SET RECORD LENGTH EQUAL TO BUFFER LENGTH + 4 BYTE HEADER

15570 — SET FIRST 2 BYTES OF HEADER EQUAL TO BUFFER LENGTH IN BIG_ENDIAN FORMAT

15590 — SET SECOND 2 BYTES OF HEADER EQUAL TO ZERO

15600 — WRITE HEADER TO TDF

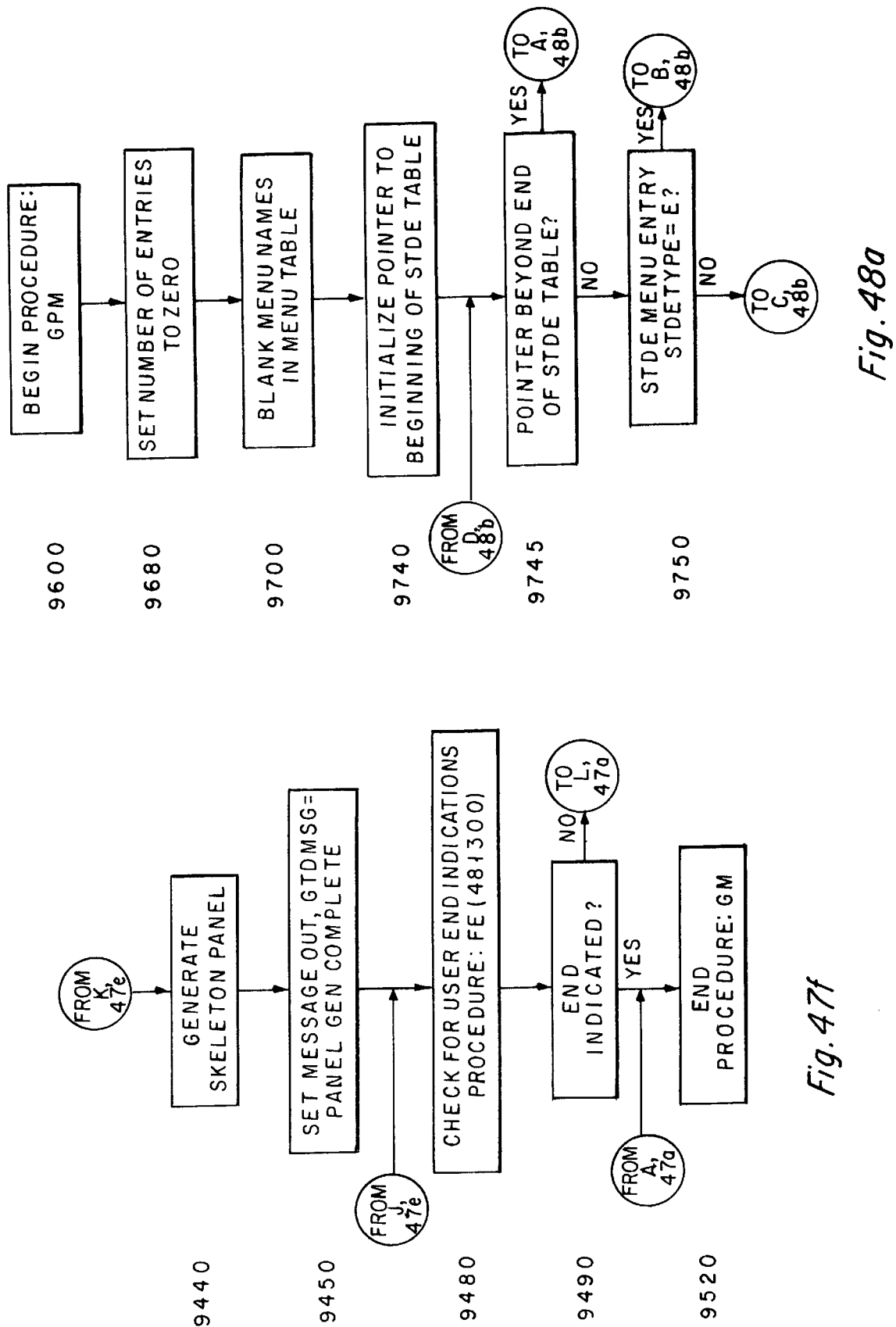

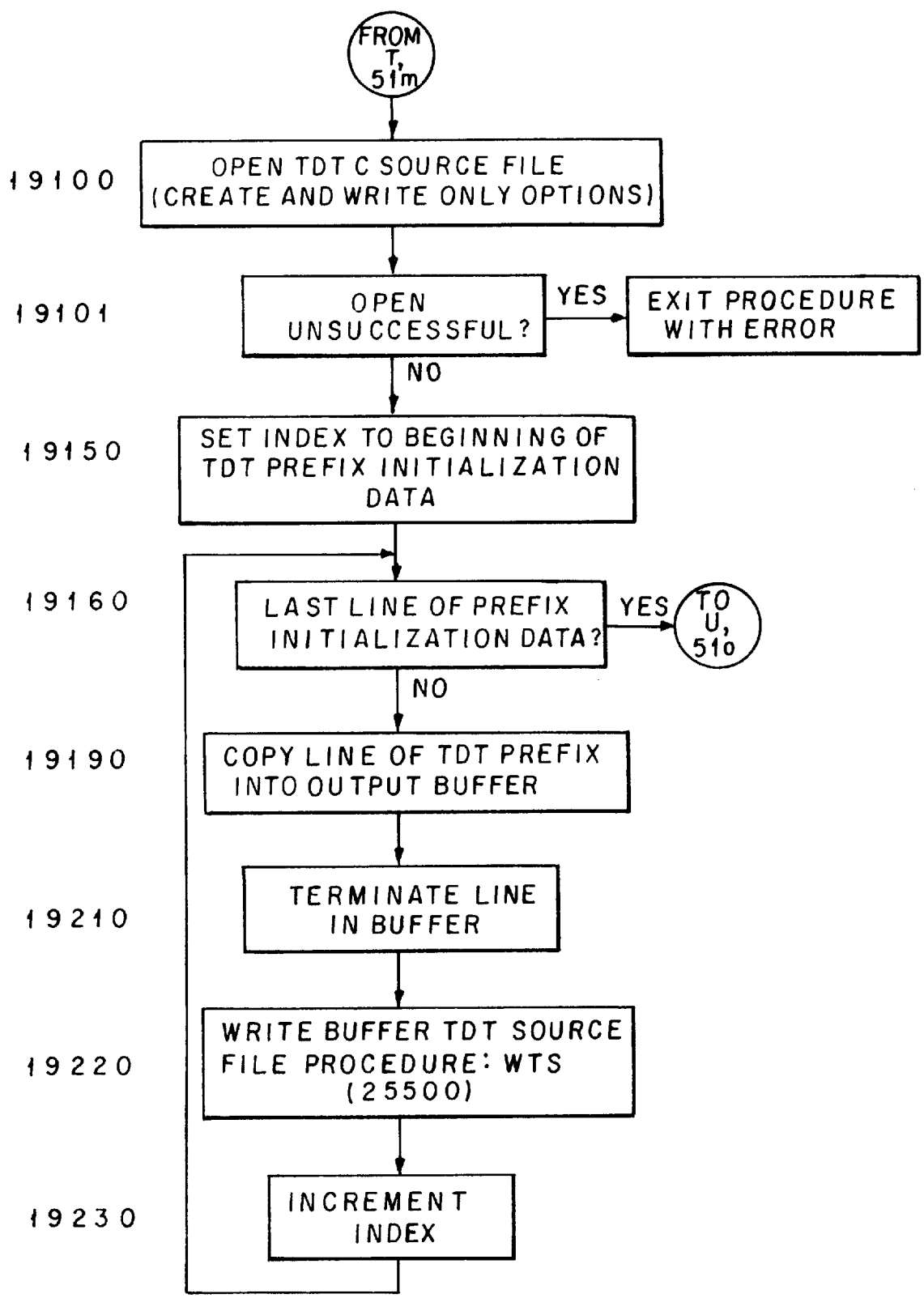
Fig. 5/n

```
19480 ──  BUILD C LANGUAGE EXTERNAL
           VIEW ENTRY IN BUFFER AS
           "EXTERN STRUCT VMOH", VIEW
           NAME FROM TABLE, TV, AT
           INDEX LOC i, "[];"
                    │
                    ▼
19530 ──  TERMINATE LINE IN BUFFER
          (PLACE NEW LINE CHARACTER
           AFTER DATA)
                    │
                    ▼
19540 ──  WRITE BUFFER TDT SOURCE
          FILE PROCEDURE WTS (25500)
                    │
                    ▼
19550 ──  INCREMENT        ──▶  ( TO
          INDEX, i                W,
                                  510 )
```

*Fig. 51p*

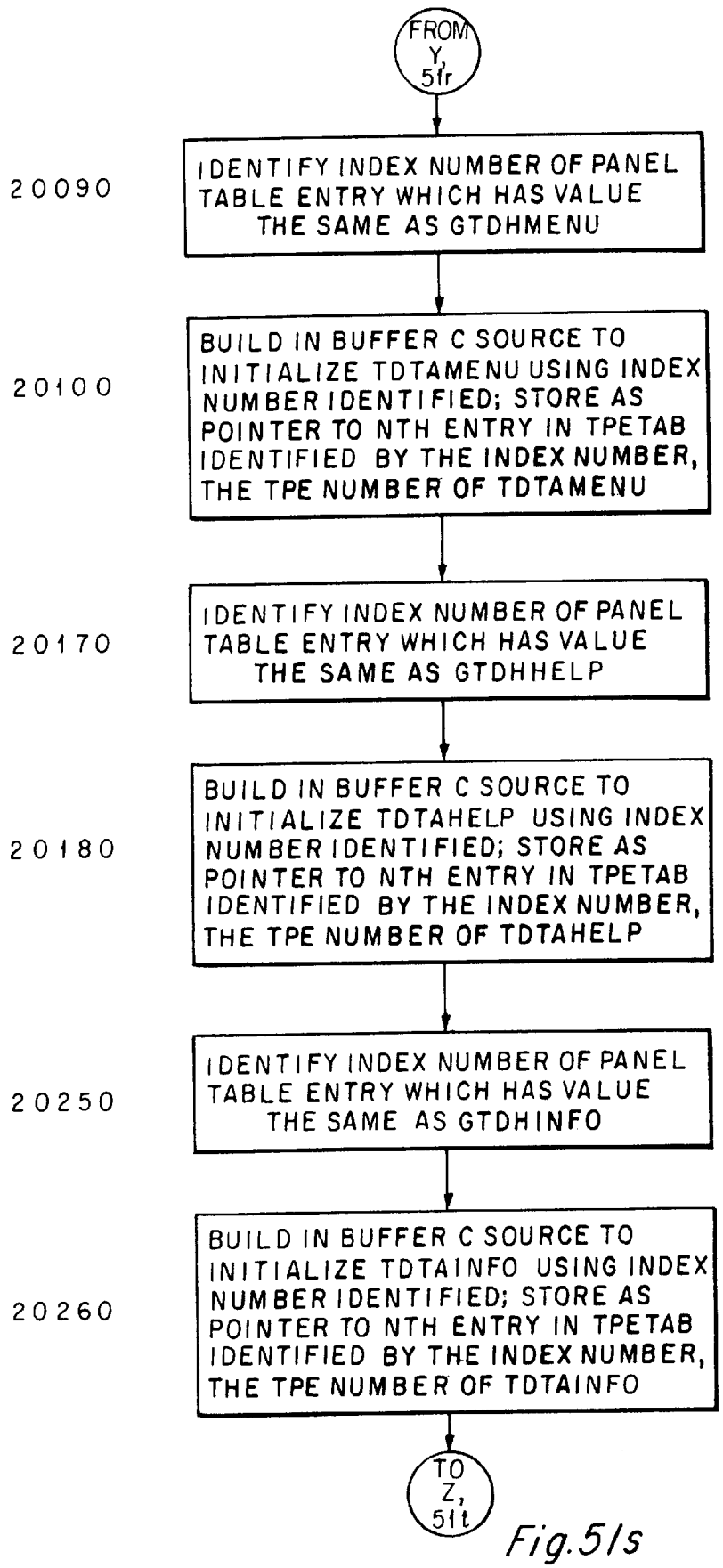
Fig.5/s

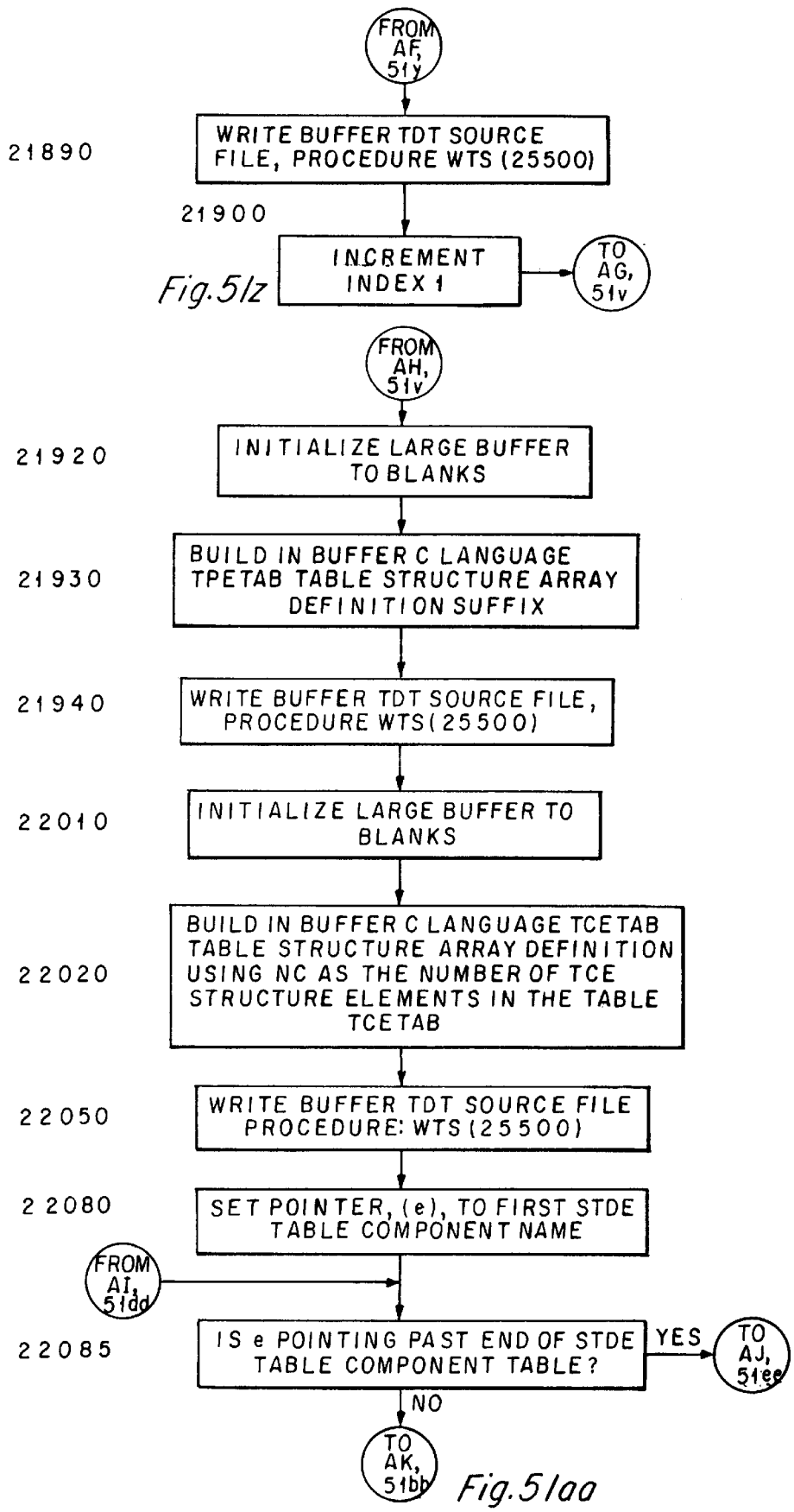

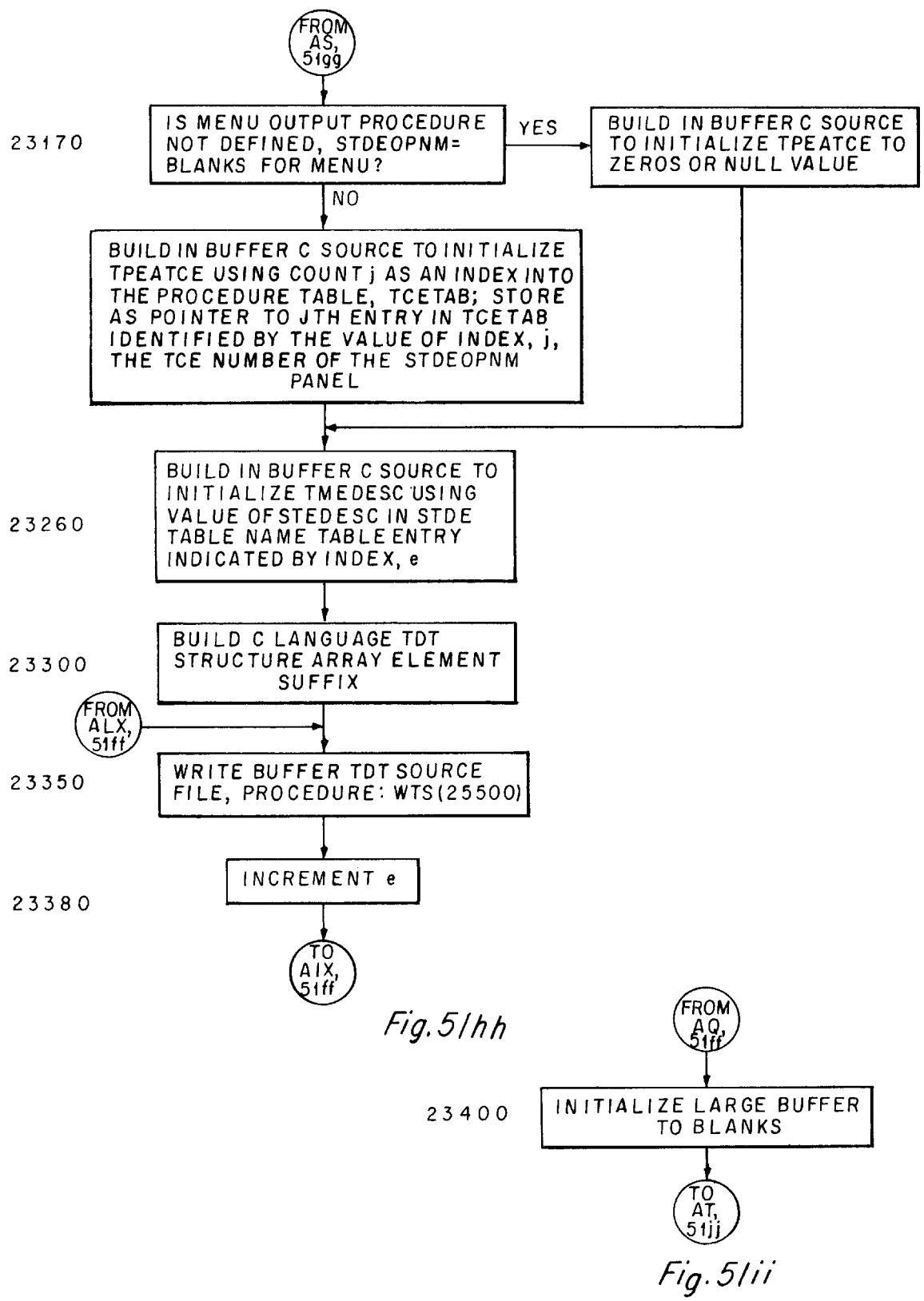
Fig. 5/hh
Fig. 5/ii

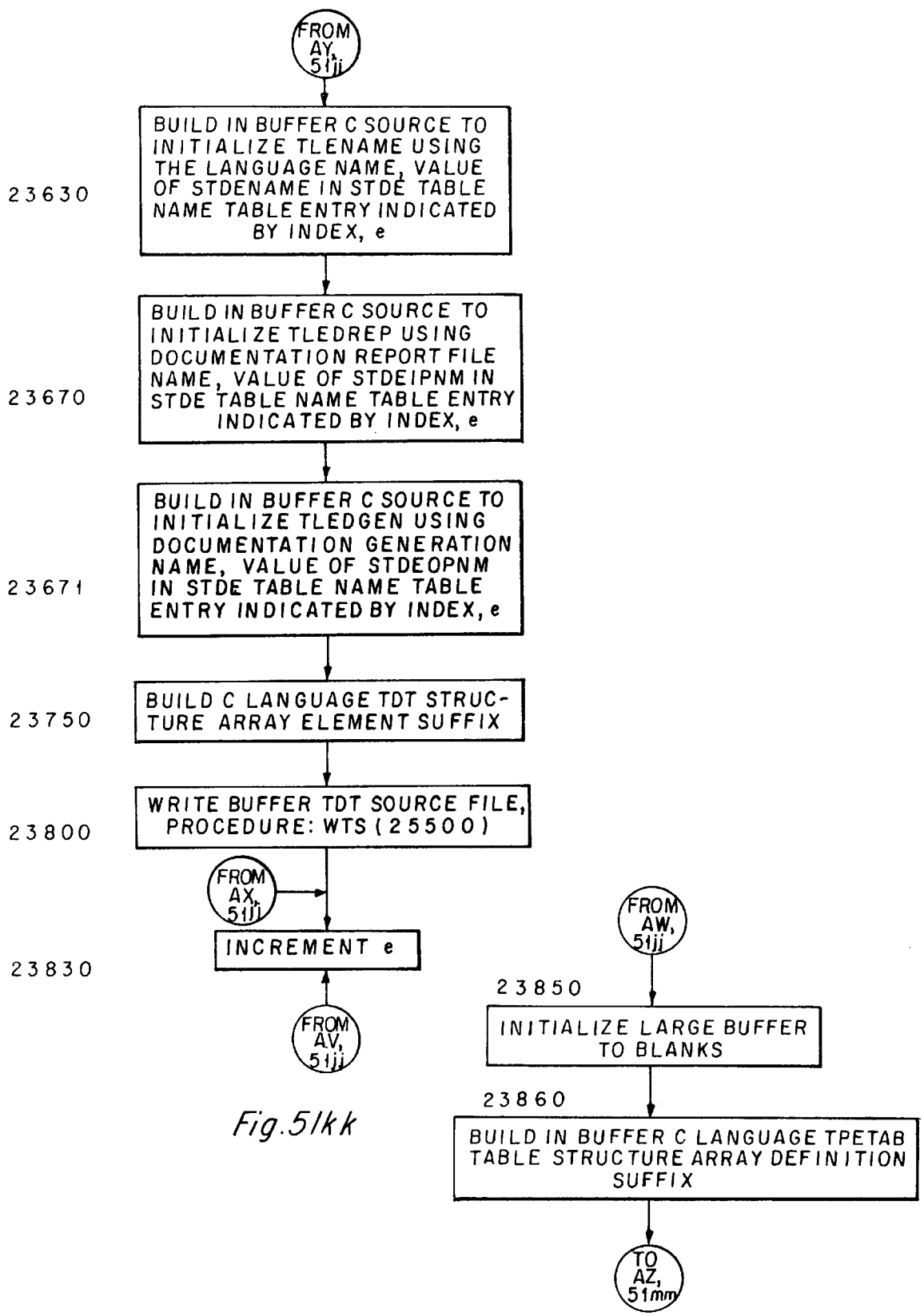

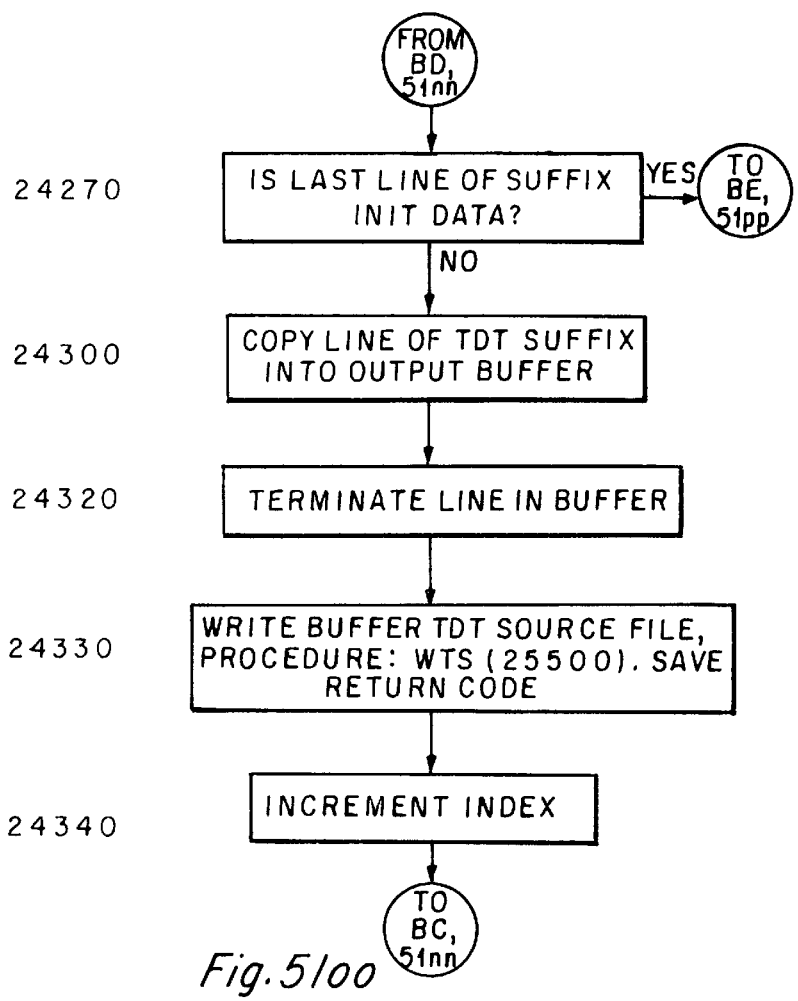
Fig. 5loo
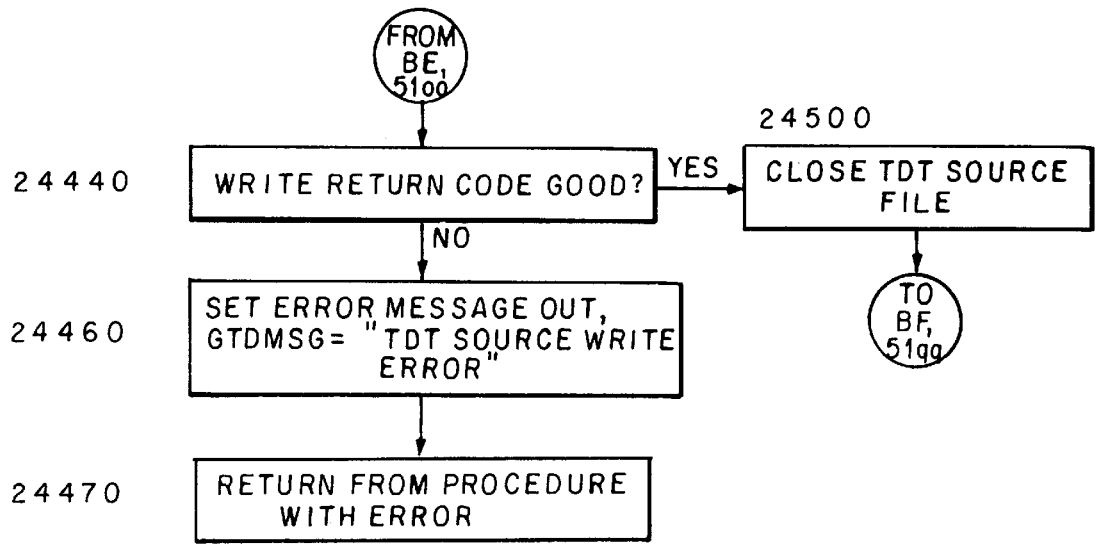
Fig. 5lpp

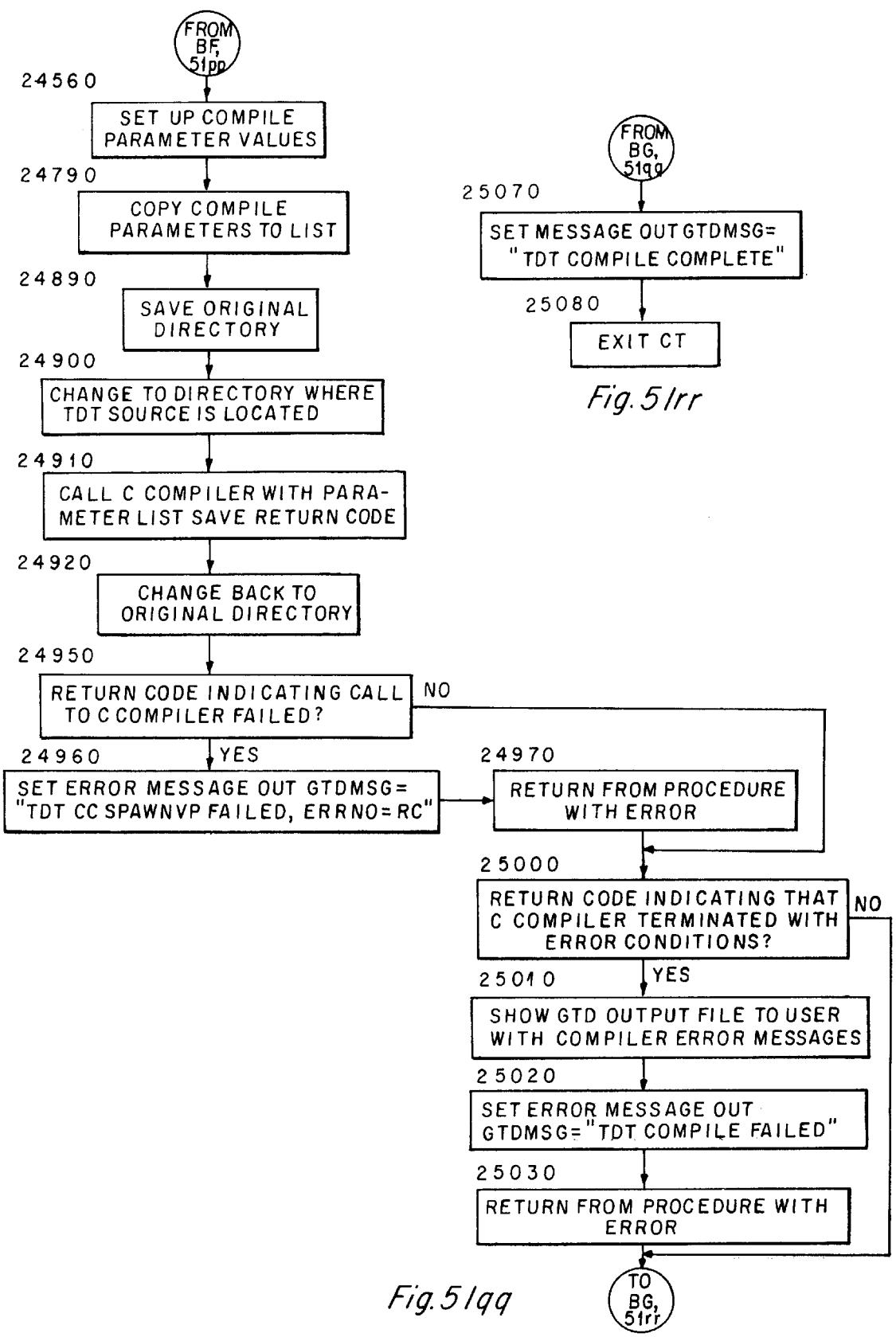

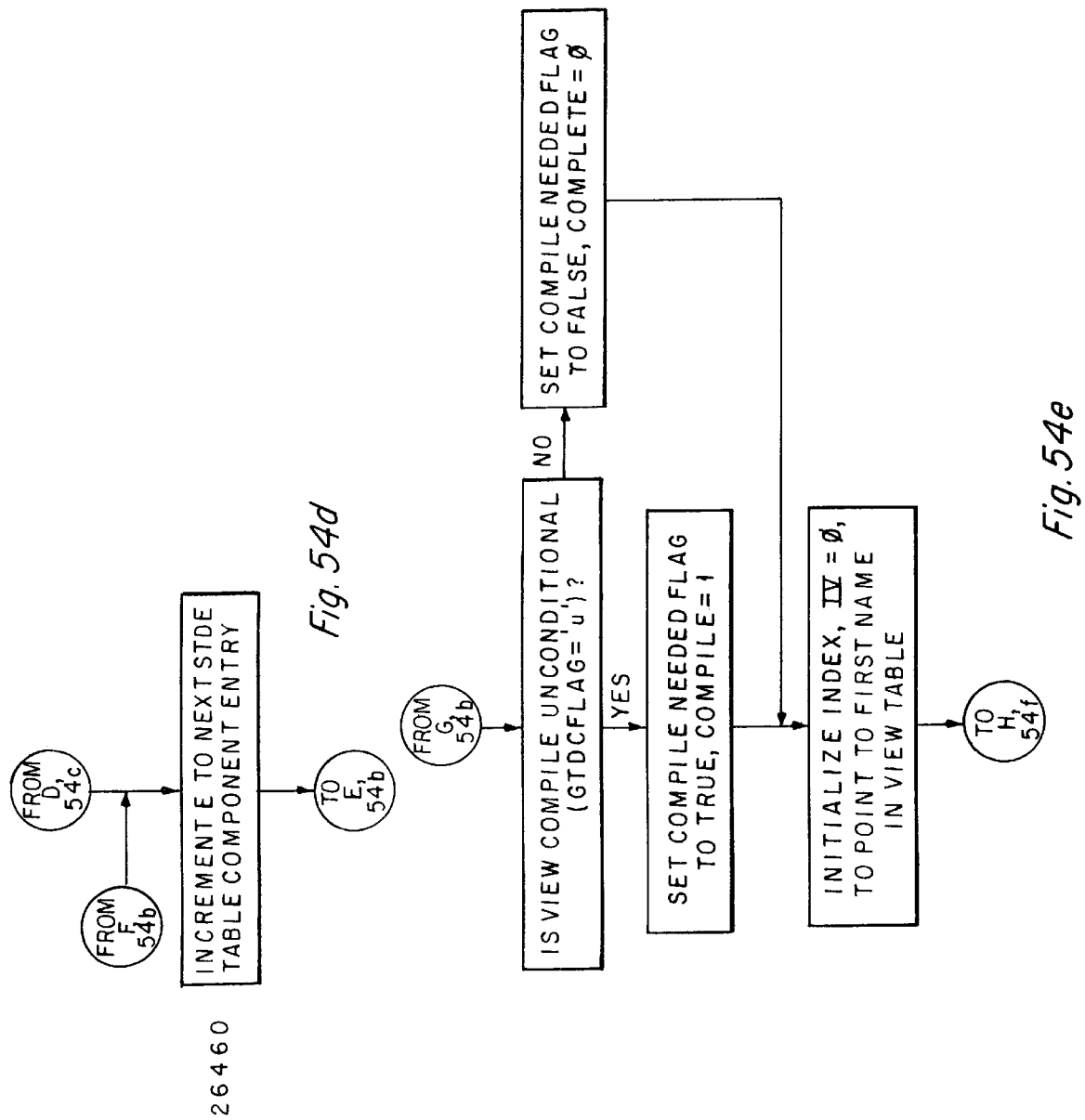

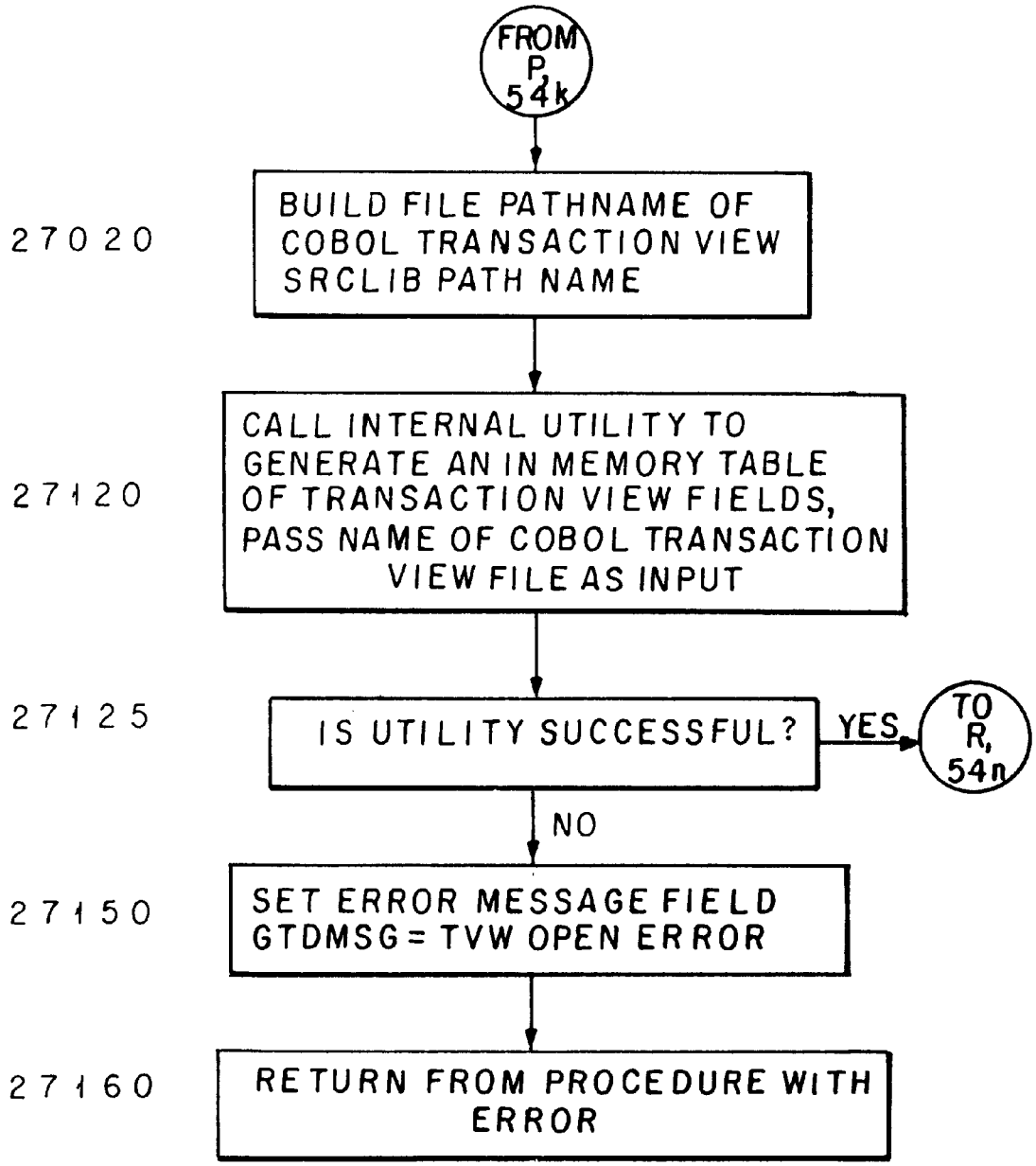

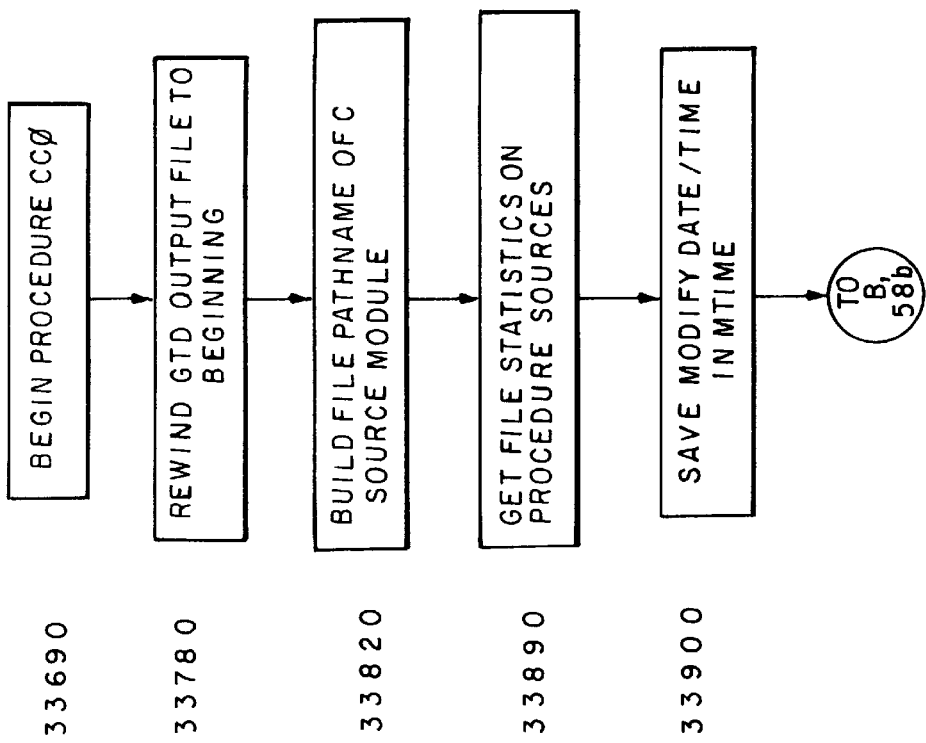
Fig. 58a
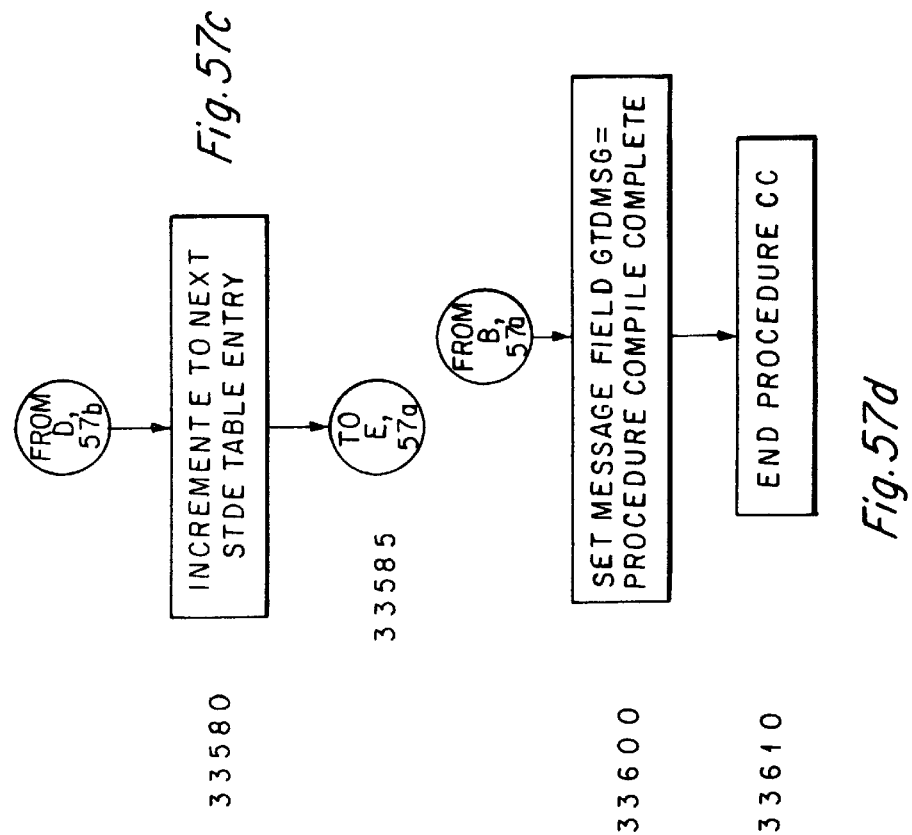
Fig. 57c
Fig. 57d

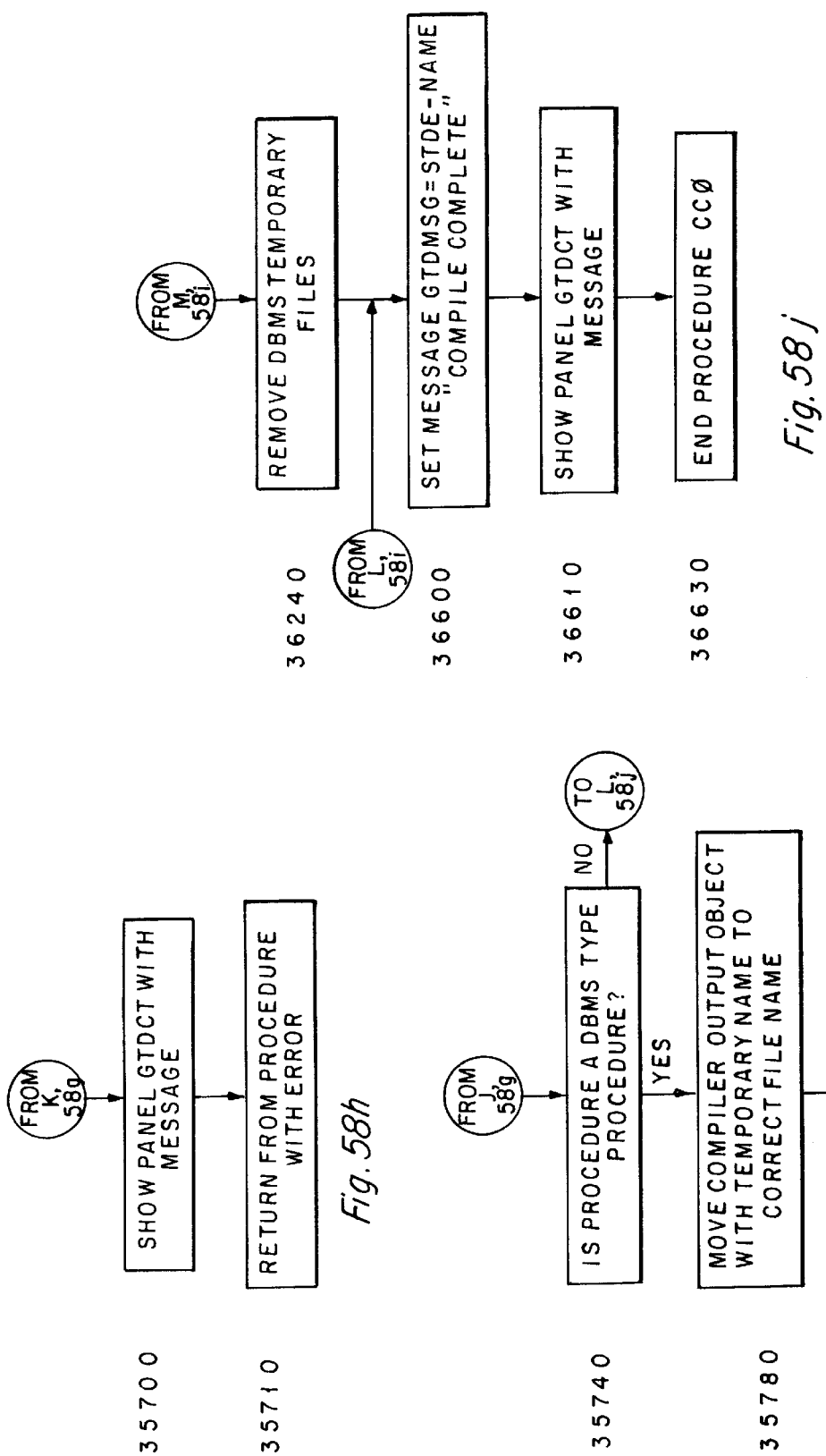

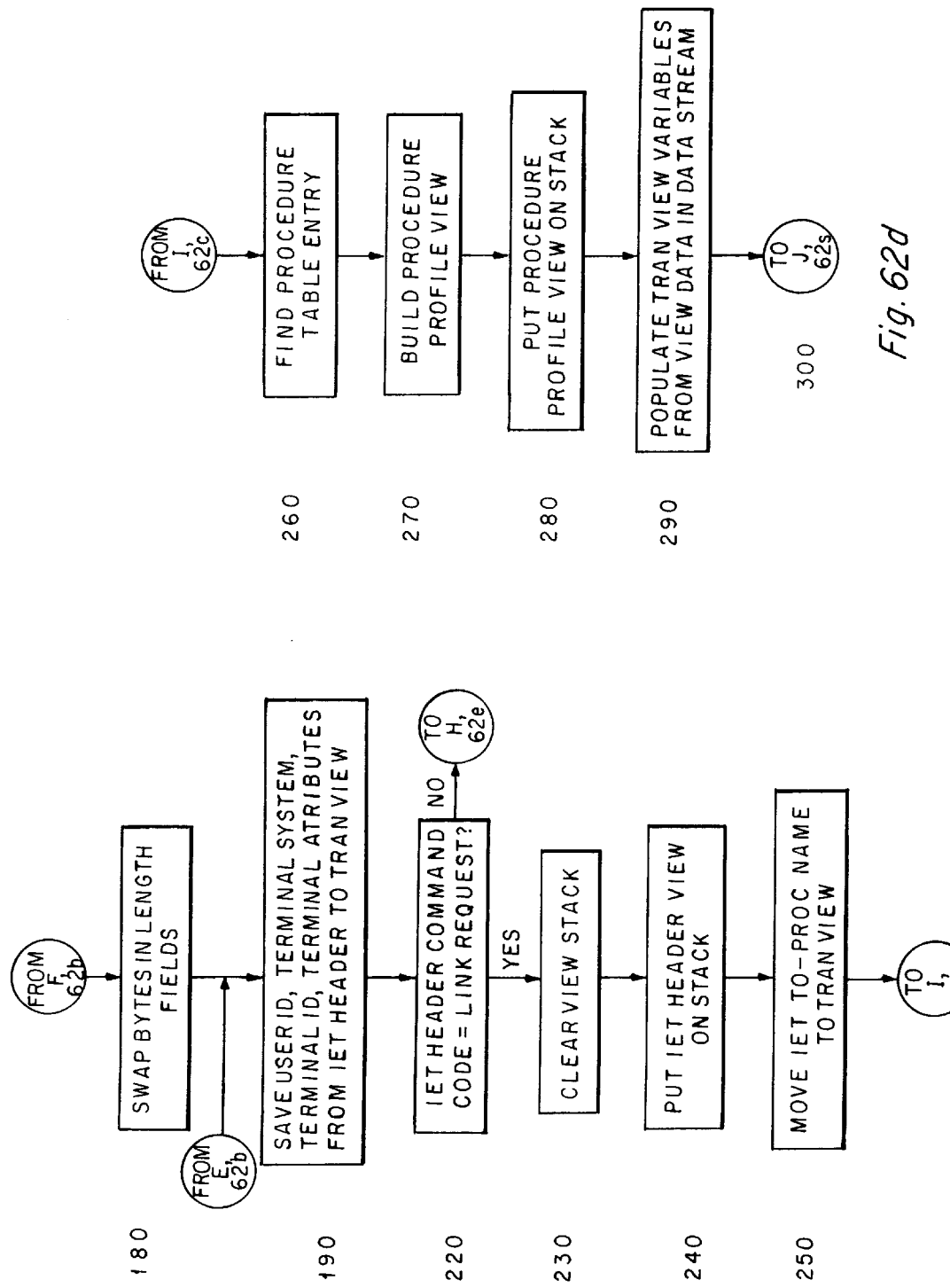

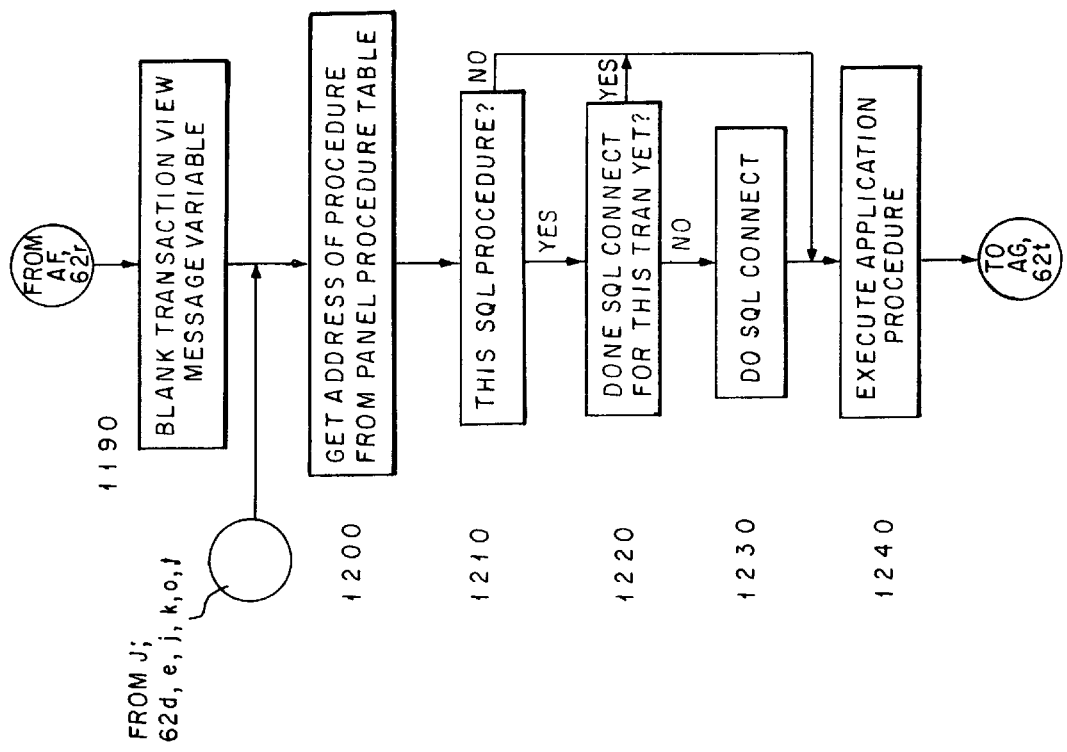
Fig. 62s
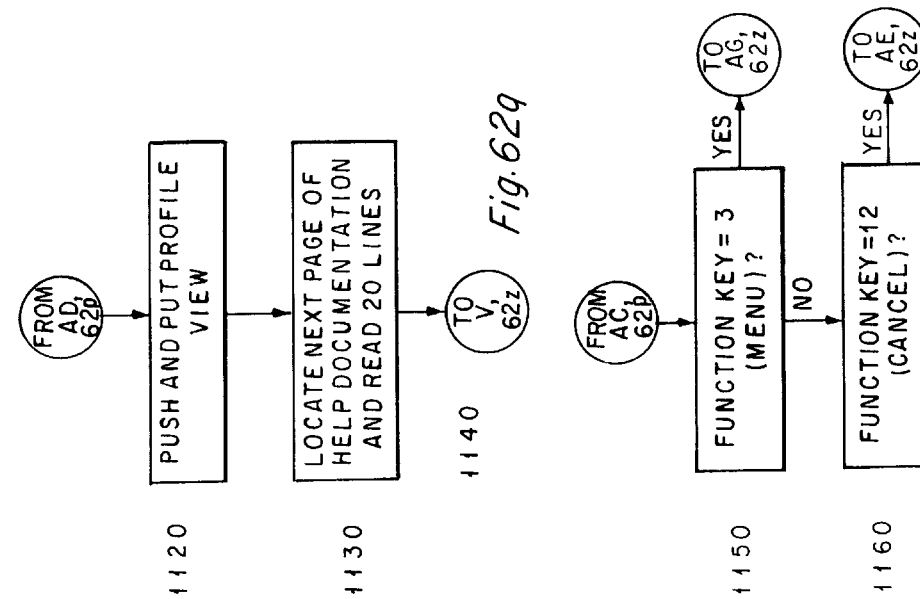
Fig. 62q
Fig. 62r

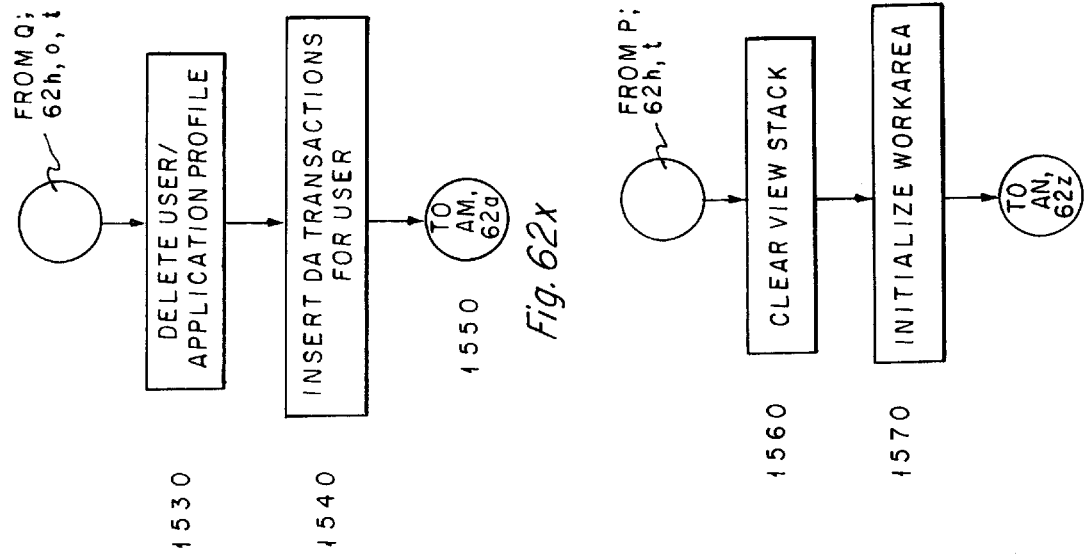
Fig. 62x
Fig. 62y
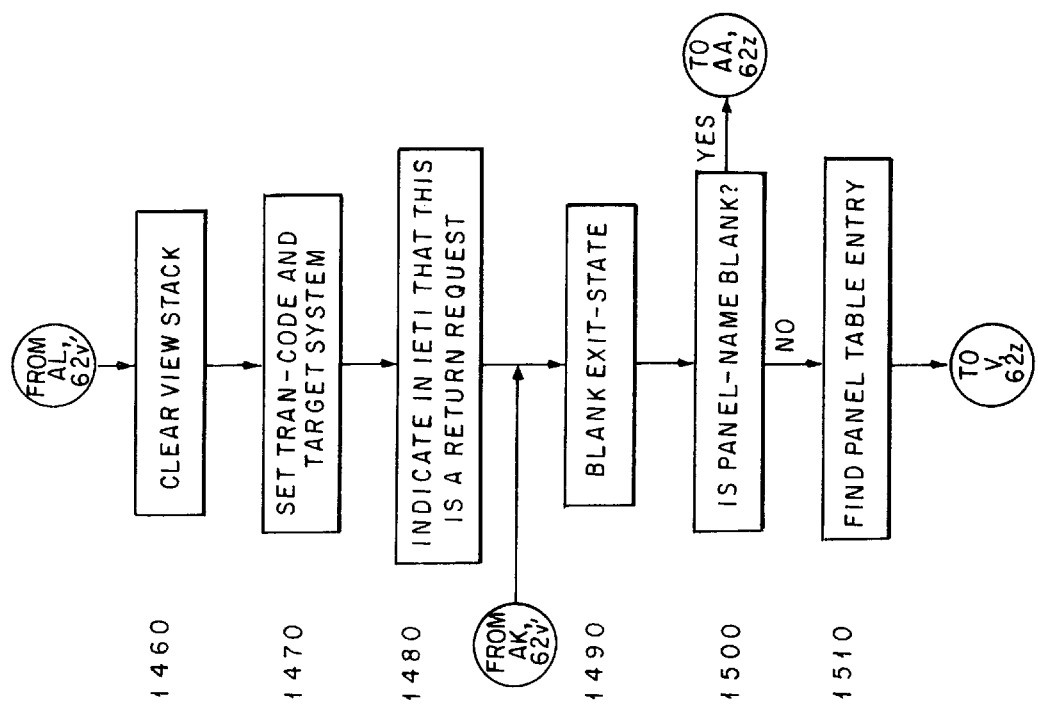
Fig. 62w

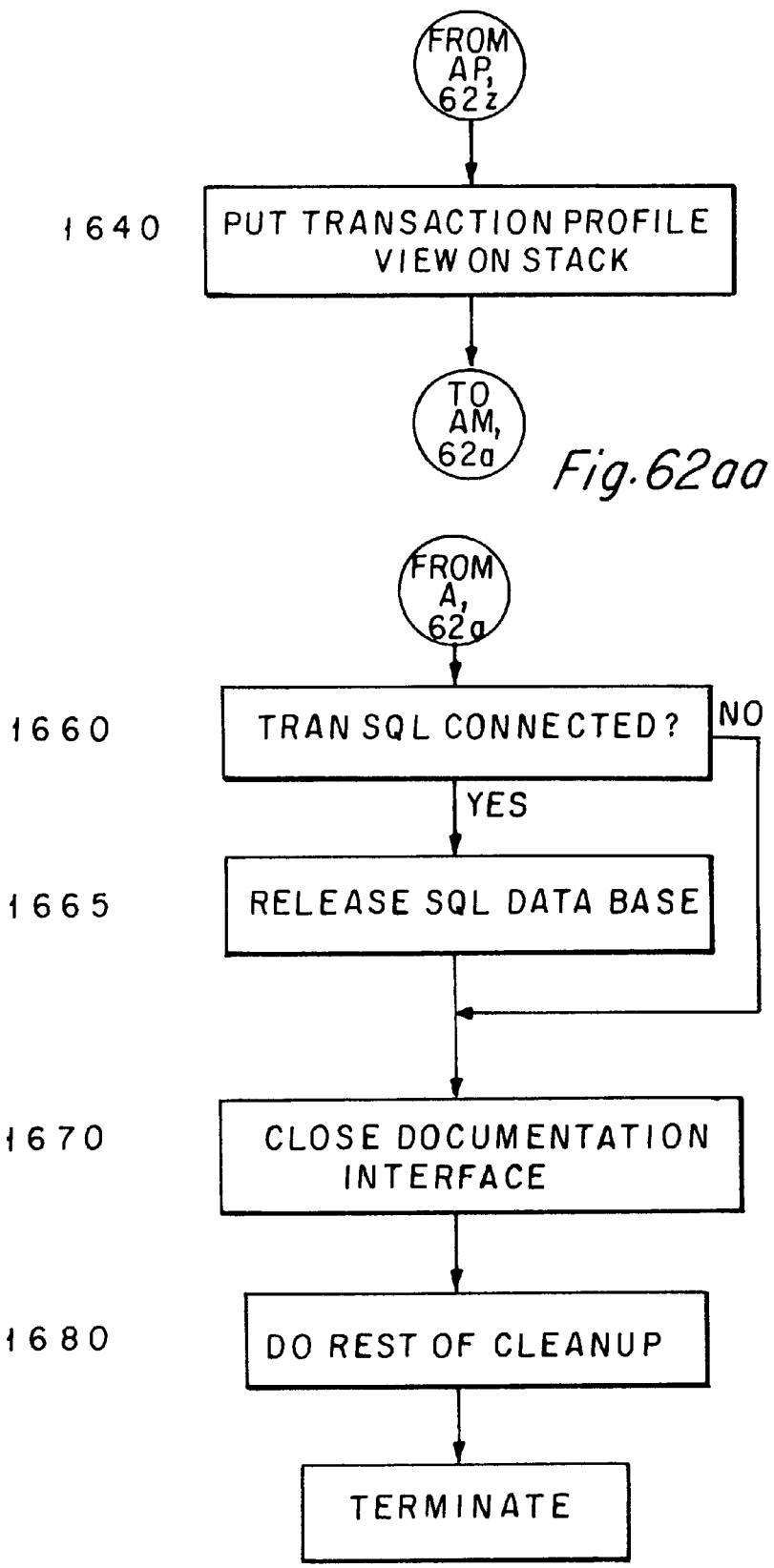

PORTABLE AND DYNAMIC DISTRIBUTED TRANSACTION MANAGEMENT METHOD

This is a divisional of U.S. patent application Ser. No. 08/086,564 filed Jun. 30, 1993 (now U.S. Pat. No. 5,428, 782), which is a continuation of 07/972,882, Nov. 3, 1992 (now abandoned), which is a continuation of 07/414,221 Sep. 28, 1989 (now abandoned).

NOTICE (C) Copyright 1989 Texas Instrument Incorporated. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

BACKGROUND OF THE INVENTION

1. Field of the Invention

This invention relates generally to computer software architectures, and more particularly to a system and method enabling a plurality of computers and associated computer resources, some or all of which may be heterogeneous in configuration, to cooperatively process a variety of applications such that the user sees the same image of the application no matter where the application is actually executing.

2. Description of the Related Art

In today's processing environment, business applications may be designed and implemented to operate in either a transaction mode or an interactive mode. Transaction mode is normally used when implementing applications within an environment in which many users are competing for limited resources. Interactive mode is most effectively used when resources can be dedicated to a user. In either mode, sharing of processor, data base, and/or terminal resources is normally limited to a homogeneous set of processors, operating systems, and/or transaction processing monitors.

Applications implemented using the transaction model, generally are structured as shown in FIG. 1. Each application load module includes logic for initialization, data import, data processing, data export, and termination.

Application logic is most frequently written in "C" or COBOL program languages. User interface (e.g., screen format) control tables are defined and packaged separately from the application's load module, although there is strong coupling between the user interface definition and the application's data processing logic. Working storage contains data elements which are in a form directly usable by the application program.

Looking now at FIG. 1, initialization logic 12 provides for opening data sets, connecting to any data bases needed for the particular instance of the application, and initializing working storage 10 to default values. Complex applications are implemented as dialogs consisting of several transaction executions per unit of work. This implementation mode is referred to as "conversational transactions" and requires that the state of the conversation be saved and restored for each transaction execution. Conversational transactions maintain the conversation state in working storage 10. At initialization, working storage 10 is refreshed from a copy which was saved at the time the transaction last terminated (for a given terminal).

Data import logic transforms an input data stream 22 from a hardware-dependent representation into the data elements comprising working storage 10. The data stream 22 could originate from a (terminal) device or from another transaction. In the case of devices, the application program logic 12 for data stream 22 decomposition is coupled with, and reflects, device characteristics. In the case of data received from transactions, the application program logic 12 is coupled with the data representation syntax and semantics of the sender.

Data processing logic 14 performs the computation and data manipulation for the application. Information is read from and written to system data base(s) 18, data files, and/or other information systems. Application-dependent integrity checks are performed. Queries are made of the information systems and the responses placed in working storage.

Data export logic 16 transforms working storage 10 data elements into a hardware-dependent representation. The destination for the output data stream 24 can either be a device or a transaction. In the case of devices, the application program logic for data stream 24 formatting is coupled with, and reflects, device characteristics. In the case of data transmitted to transactions, the data representation syntax and semantics of the data stream 24 must match the receiver's application logic.

Termination logic 16 includes closing data sets and committing any logical data base transactions which occurred during this execution instance of the application. If this is a conversational transaction, the current application state (working storage) is saved.

The interactive model provides applications with dedicated resources, including memory, data bases, files, and terminal. Implementation of conversational dialogs is easier than with the transaction model since the application state does not have to be explicitly saved/restored on every interaction with a terminal. Communications with other processors is achieved through "remote procedure calls" (RPC). RPCs are sometimes also used within the transaction model, or between interactive processes and transactions. In any of these cases, an RPC requires that the calling procedure (with all of its resources), the communications resource, and the called procedure (with all of its resources) be dedicated during the time of the call. Furthermore, the calling procedure's resources (such as the terminal) can not, in general, be used by the called procedure. RPCs have the same characteristics as inter-transaction data transfers, namely that the data representation syntax and semantics of the data stream must be synchronized between the client and server sides of an RPC.

There are however, many difficulties encountered with today's technology. For example, application source code is not portable. Much of the application logic is dependent upon a particular transaction processing monitor, operating system, data base management system, processor type, terminal devices, and/or other variations in the software environment. A very high degree of homogeneity between software environments is required to minimize the cost of porting applications from one environment to another. Multiple sets of source code are required to support the variations in software environment, with the attendant maintenance and function synchronization problems.

As a result of the above, programmers must be trained to generate source code for each specific software environment. Not only is this a waste of training resources, but this amounts to high costs in programmer time in generating source code to enable an application to meet the peculiarities of each particular environment.

As indicated above, user interface control tables (e.g., screen formats) are packaged separately from application program logic. This results in synchronization problems at execution time. In most cases, a synchronized update to both user interface control tables and application program logic can not be performed in real time. In order to avoid data integrity problems, application updates require that the application is taken offline and all pending input for the transaction is flushed prior to installation. Application logic is, nevertheless, tightly coupled with specific device characteristics, requiring application changes to support new user interface technology.

Conversational transactions require explicit application program logic to save/restore working storage. The conversation state is maintained with respect to a (terminal) device, not a user. If a user changes terminals, he can not resume to conversation which he started at the original device. Any software modifications to a conversational transaction which results in a redefinition or restructuring of the elements in working storage can not be implemented in real-time. In order to avoid data integrity problems, application updates require that the application is taken offline and all saved working storage reinitialized prior to installation.

Inter-transaction communications, including resource (e.g., transaction, terminal) sharing across distributed systems, is restricted to one of a single-image transaction processing system, and also requires synchronized installation of communicating application transactions. A synchronized update, across multiple systems, can not be performed in real time. In order to avoid data integrity problems, application updates require that all involved transactions be taken offline and all pending communications be flushed prior to installation.

Currently available techniques for cooperative processing require dedicated communications resources, dedicated processes, implementation-specific/complex program interfaces, and often asymmetric logic between user and server. For these reasons, it is difficult to quickly implement cooperative processing for small applications. Furthermore, some of the performance/cost objectives associated with a transaction model are compromised by excessive resource consumption associated with direct inter-application communication.

Implementation of business applications in interactive mode is not generally appropriate for high volume applications due to the lack of flexibility in the administration/control of computer resources, in addition to the inability to modify active, distributed applications in real time.

SUMMARY OF THE INVENTION

In view of the above problems associated with the related art, it is an object of the present invention to provide a system and method of computer software architecture for enabling a plurality of computers, and associated computer resources, some or all of which may be heterogeneous in configuration, to cooperatively process applications, including applications built from a single application source base.

Another object of the present invention is to provide improvement in application programmer productivity by limiting program logic to the processing logic; specifically isolating it from data import and data export logic. Because this logic is built into the common execution code used by all applications, there is a significant reduction in need for specialized application logic for menus, help, and cooperative processing functions as well as message handling functions. As a result, a programmer need only be trained for the single unified system execution and development environments. Furthermore, the programmer may quickly generate applications which can be distributed across multiple heterogeneous computer systems without requiring source code changes and enable modifications to an application to be implemented with one load module, one documentation set, and one data base bind.

Yet another object of the present invention is to provide improvement in user productivity by furnishing uniform help and menu functions between applications, affording users with menu, help and glossary access to functions from every application panel, and requiring users to remember fewer transaction codes.

A further object of the present invention is to provide lower system maintenance costs and improved system performance by enabling multiple functions to be accomplished in one reentrant package, enabling reduction of system definition resources required by each application, providing resource sharing across multiple heterogeneous computer systems, enabling control of resource utilization, requiring management of fewer transactions and external screens, enabling users to access applications on any heterogeneous system without being aware where the application is being run (e.g., the system running the application is transparent to the user), providing common application execution environment for a variety of platforms including mainframes, minicomputers, and workstations, as well as providing application scalability to meet a user's processing requirements.

Yet a further object of the present invention provides improved application quality control and maintenance by providing common application execution and development environment for a variety of platforms, providing real-time application upgrades, reducing development costs by enabling development of application on low cost platform for installation on different higher cost platforms, accessing and maintaining application components in a synchronized fashion, enabling applications to be tested as a large integrated application set before deployment, and simplifying deployment of applications by reducing the number of load modules and system definitions required to install those load modules.

These and other features and advantages of the invention will be apparent to those skilled in the art from the following detailed description of a preferred embodiment, taken together with the accompanying drawings, in which:

DESCRIPTION OF THE DRAWINGS

FIGS. 22a–b are a flow chart depicting the FE procedure which checks for an user-inputted end indicator for GTD panel functions according to the preferred embodiment of the present invention;

FIGS. 23a–c are a flow chart depicting the edit transaction parameters (ET) procedure according to the preferred embodiment of the present invention;

FIGS. 25a–b are a flow chart depicting the GTD read TDF record (TDTGET) procedure according to the preferred embodiment of the present invention;

FIGS. 26a–e are a flow chart depicting the generate transaction view (GTVW) procedure according to the preferred embodiment of the present invention;

FIGS. 30a–f are a flow chart depicting the edit procedure list (EC) procedure according to the preferred embodiment of the present invention;

FIG. 41 [omitted];

FIGS. 42a–e are a flow chart depicting the put TDF (PTDT) procedure according to the preferred embodiment of the present invention;

FIGS. 43a–b are a flow chart depicting the write TDF record (TDTPUT) procedure according to the preferred embodiment of the present invention;

FIGS. 47a–f are a flow chart depicting the generate maps user interface (GM) procedure according to the preferred embodiment of the present invention;

FIGS. 48a–d are a flow chart depicting the generate menu panels (GPM) procedure according to the preferred embodiment of the present invention;

FIGS. 57*a–d* are a flow chart depicting the compile (CC) procedure according to the preferred embodiment of the present invention;

FIGS. 58*a–j* are a flow chart depicting the compile C program (CCO) procedure according to the preferred embodiment of the present invention;

DETAILED DESCRIPTION OF A PREFERRED EMBODIMENT

These objects are accomplished in a preferred embodiment of the present invention known as Distributed Applications Architecture (hereinafter referred to as "DAA"). The DAA can be installed on a variety of platforms including mainframe computers, minicomputers, and individual workstation. Once DAA is installed, along with its required support subsystems, services and utilities, then DAA-generated applications may be accessed from any of these platforms. The support subsystems may be customized from products readily available in the market place.

DAA works with a transaction processor via communication channels to the other hosts within the network. It also employs a map service. The map service should provide an editor to allow application programmers to create the maps for the application panels, a compiler to generate maps into a linkable form, and a linkable interpreter which translates the linkable form into the screen presentation format for that platform.

Figure 2:
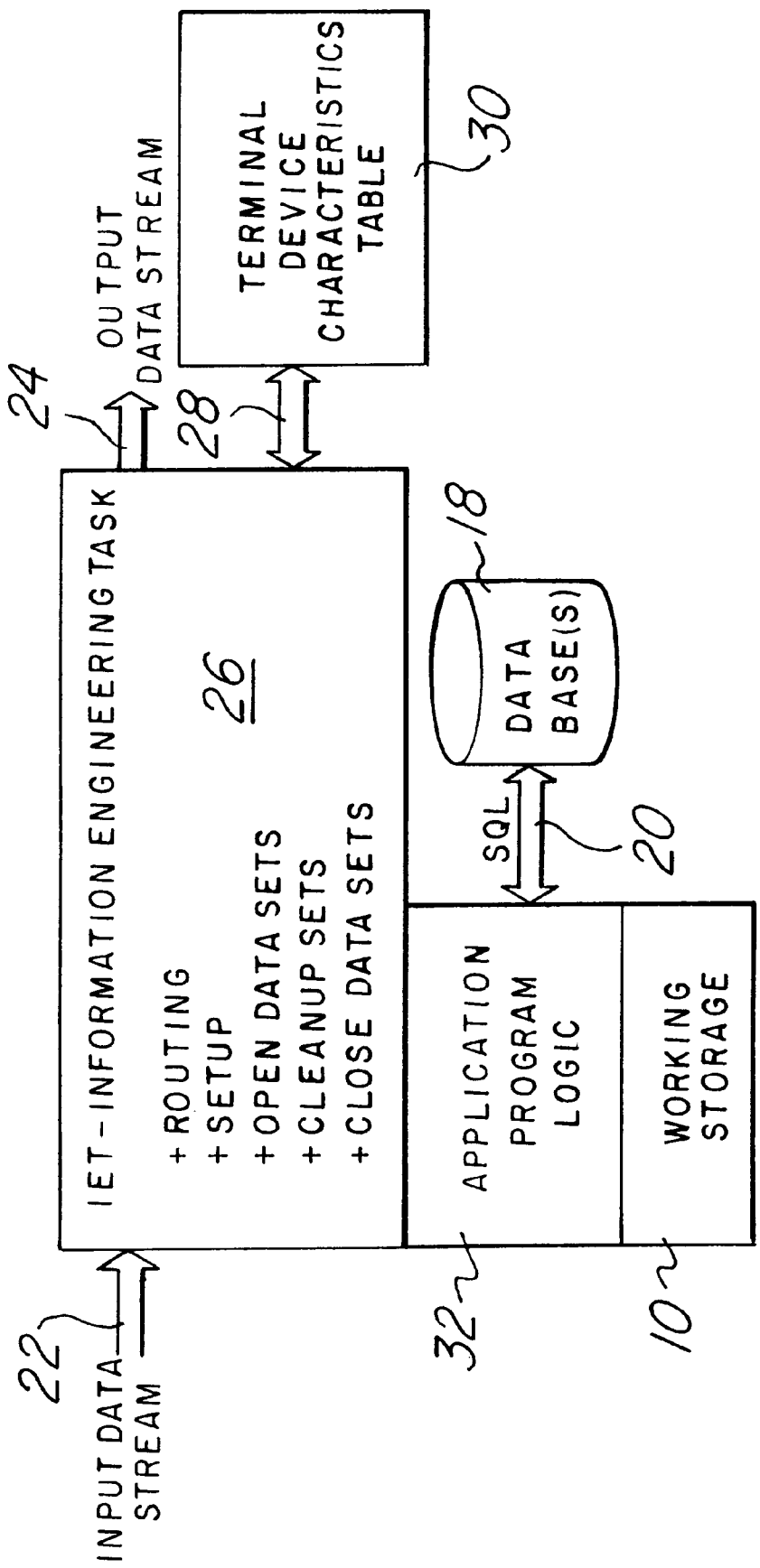
FIG. 2 is a block diagram depicting program application development according to an embodiment of the present invention.

Additionally, as seen in FIG. 2, in the preferred embodiment of the present invention, the DAA employs a DBMS 18 (Data Base Management System) which uses a standard form SAA SQL 20 to support application code DBMS functions and to save user/application profile information. It should be noted that more than one DBMS could be used; for example, one to support application functions and one to save profile information. Furthermore while a DBMS not using the standard form SAA SQL could be used, it should be realized that the embedded application DBMS code should be source compatible on the various platforms.

Looking in more detail at FIG. 2, each application transaction consists of the Information Engineering Task (IET) 26, application program logic 32 and working storage 10.

The hardware-specific input data stream 22 consists of the information input to the application. Information included is: data, hardware type of the input device, and characteristics of the output expected.

The IET 26 processes the input data stream 22 to prepare it for the application program logic 32. The setup decomposes the data stream 22 by converting the characters input to the application to its native data type for application program use. The application program 32 tells the IET 26 which data sets will need to be accessed. The IET 26 receives routing information from the terminal device characteristics and routing information table 20 via communication route 28, and 'opens' those data sets.

The main storage logic 10 performs the computation and data manipulation for the application. Application program logic 32 pulls information from, and stores information on, data base(s) 18 in the system using a preselected subset of Structured Query Language (SQL) commands 20, although other languages could be employed. When the computation and manipulation are completed, the IET 26 begins its cleanup.

The IET cleanup consists of two steps. First, composing the data generated from the application 32 into a format set by the programmer. The information is sent out as the output data stream 24. Second, 'closing' data sets which had been opened for use by the application.

All of the application logic, user interface control tables, view definitions, and other application-specific tables for one transaction definition are packaged in a single load module.

Figure 1:
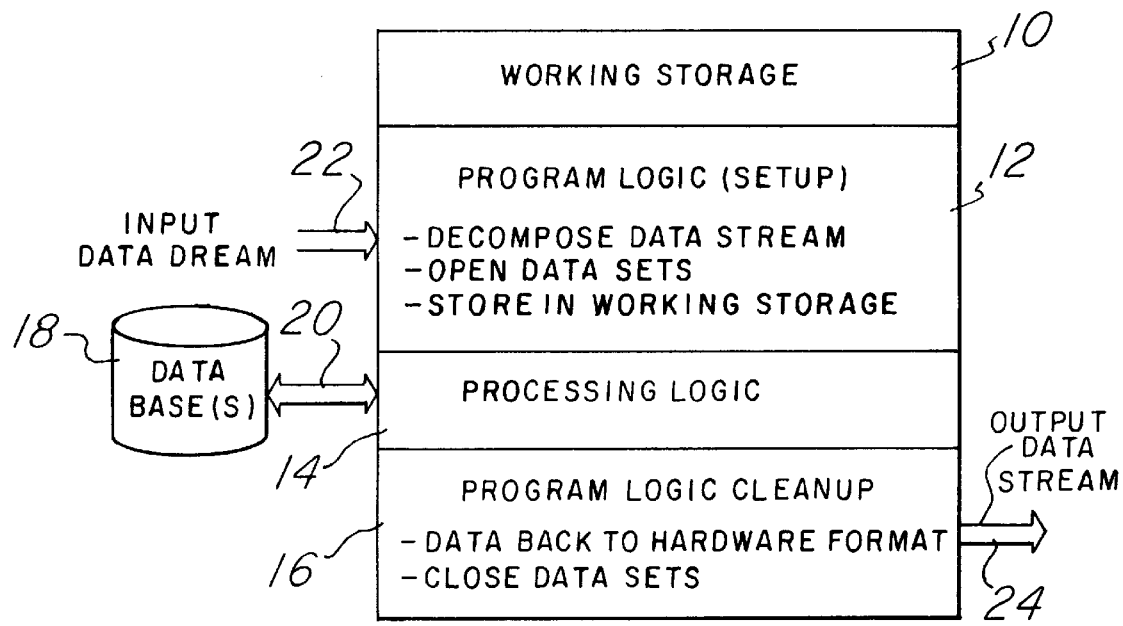
FIG. 1 is a block diagram depicting current program application development without the present invention.
Figure 3:
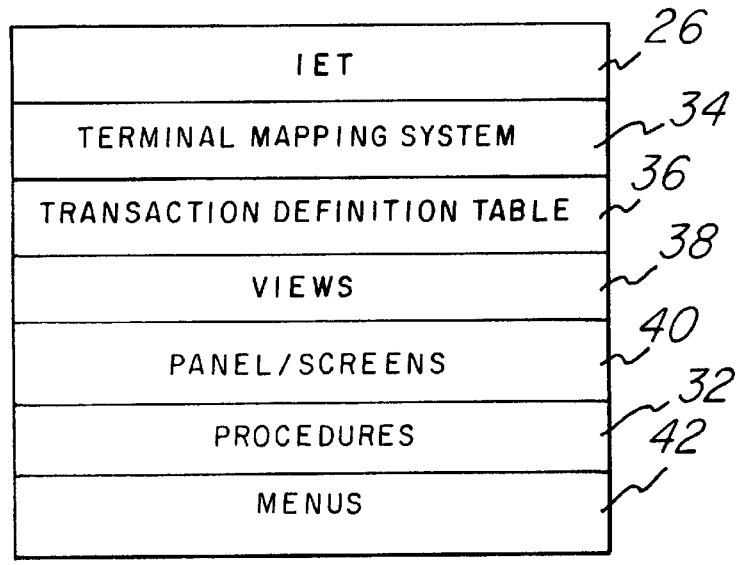
FIG. 3 is a block diagram of a sample load module according to the present invention.

The DAA Application load module, shown in FIG. 3, includes all the components necessary for a user to invoke a DAA application through DAA from a terminal on any other DAA system. The components in this module control routing of information, accessing data bases on different systems if necessary, cleaning up data sets when the application is finished, and presenting the information when complete. The load module also includes references to HELP, INFOrmation, and GLOSsary information stored on the system.

The DAA Transaction Definition Table (TDT) 34 defines all the elements of a DAA load module and is provided by the DAA.

The IET interface 26 is a logic element also provided by the DAA. The IET interface merges the information stored in the views 38 with the panels 40 designed by the programmer to form the application data structure.

The Terminal Mapping System (TMS) 34 is another logic element of the DAA. The TMS 34 is provided by the DAA and takes the data stream input to the DAA and converts it into IBM 3270 format data streams.

Views 38 are designed by the programmer to define the types of variables used by the application. A view 38 tells the IET interface what format the procedure 32 needs the data in. The IET interface 26 converts the input data stream to match that format. After the data is processed by the procedures 32 also, IET 26 converts the information stored in the views 38 to the format for the output data stream, or to the format specified for other procedures 32. The views 38 allow data to pass locally between procedures 32 on the system the user is logged onto and remotely to procedures on other DAA systems.

Panels, or screens 40 for the application are built from programming definitions using a screen painter and a special compiler. Panels 40 developed in this way are transferable across all systems at the source code level.

Menus 42 are special screens used to guide the application user through the procedures for an application, are defined by the programmer, and are expandable in source form.

Once the application source code is complete, all programmer designed blocks shown in FIG. 3 are built into one load module by the DAA software on the system where the application will reside. To move (or distribute) an application, the source code for the procedures 32, views 38, and panels 40 are moved as a block to the new system. The load module is compiled using the target system's compiler, link editor, and bind process. No source code changes are necessary.

No matter how complex the application, all application components of a load module are automatically in synchronization and consequently can be installed in real-time. Application-independent DAA logic and control tables are implemented as dynamically loadable libraries. DAA upgrades are automatically reflected in application load modules, ensuring synchronization of DAA functions across all application load modules. Additionally, this makes the application easier to distribute, and requires the application user to remember fewer transaction codes.

Application procedures contain no code related to either data import or data export. Application procedures are restricted to perform computation and data manipulation using data elements defined in working storage and optionally an interface to some information system. An information system supported by DAA is relational data base access via a well defined subset of Structured Query Language (SQL) commands. Other information systems could be employed by the application.

Data import/export functions are completely isolated from any application procedure. All environment-dependent variations of import/export, including network protocol, device characteristics, transaction processing monitor, operating systems, processor types, etc., are automatically integrated with the application at load module bind time. Import/export functions are driven from implementor-defined views and user interface control tables. User interface control tables describe the characteristics of the user interface, and how elements of working storage map to/from the user interface. "Import" and "export" views describe elements of working storage which are to be communicated between transactions. "Profile" views are used to describe elements of working storage which are to be saved/restored at initiation/termination time for each transaction execution.

At execution time, a view definition is used to encode or decode an information packet to/from working storage. Each element of working storage, which is selected by the view definition, is encoded into an identifier/value pair in the information packet. The identifier uniquely identifies, across all application versions of working storage, a particular element, independent of the element's location or length in working storage. At any time during the life cycle of an application, a programmer may change the location and/or length of elements in working storage, rebuild a new version of the application load module, and productionize the new load module. When a view is decoded from the information packet back to working storage, the element value is stored in the location/length defined by the application at the time of execution (i.e., not at the time of information packet creation).

These characteristics of view management significantly reduce the possibility for data integrity problems introduced by modifying application load modules in real time. The current state (profile) can be successfully restored to an application which modified its working storage layout. Application load modules which communicate with each other can be modified asynchronously, in real time, across heterogeneous environments, including changes to the import/export view and working storage layout.

Figure 5:
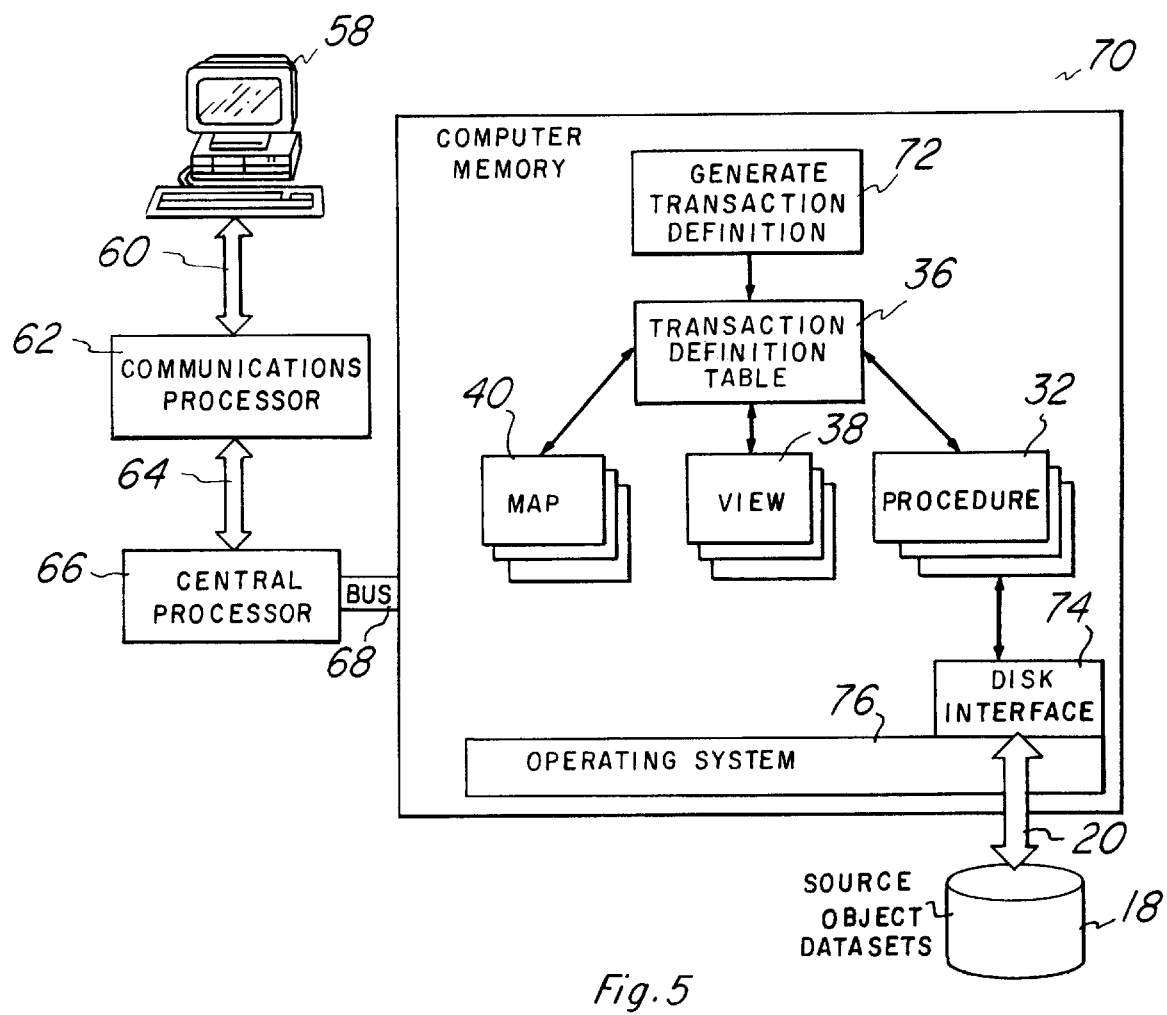
FIG. 5 is a block diagram demonstrating the development environment according to the present invention.

To better understand the present invention and the relationship of its component parts in the development environment, refer now to FIG. 5. Although the components seen there will be discussed in great detail later, a working understanding of their relationship with the hardware involved is necessary.

A user may input data or invoke an application at terminal 58. Terminal 58 directs such input to communications processor 62 via communications line 60. Communications processor 62 routes the input to central processing unit 66 ((CPU) via hookup line 64. At this point the CPU 66 addresses computer memory 70 via bus 68. Within computer memory resides the general transaction definition tool 72 (GTD), connected to transaction definition table 36 (TDT). The TDT overhead 36 points to specific locations in memory 70 for maps (panels) 40, views 38, and procedure logic 32. Application procedure logic in turn communicates through disk interface or data base management system 74, residing on operation system 76, to source object data sets on disk 18 via SAA SQL commands 20.

Figure 6:
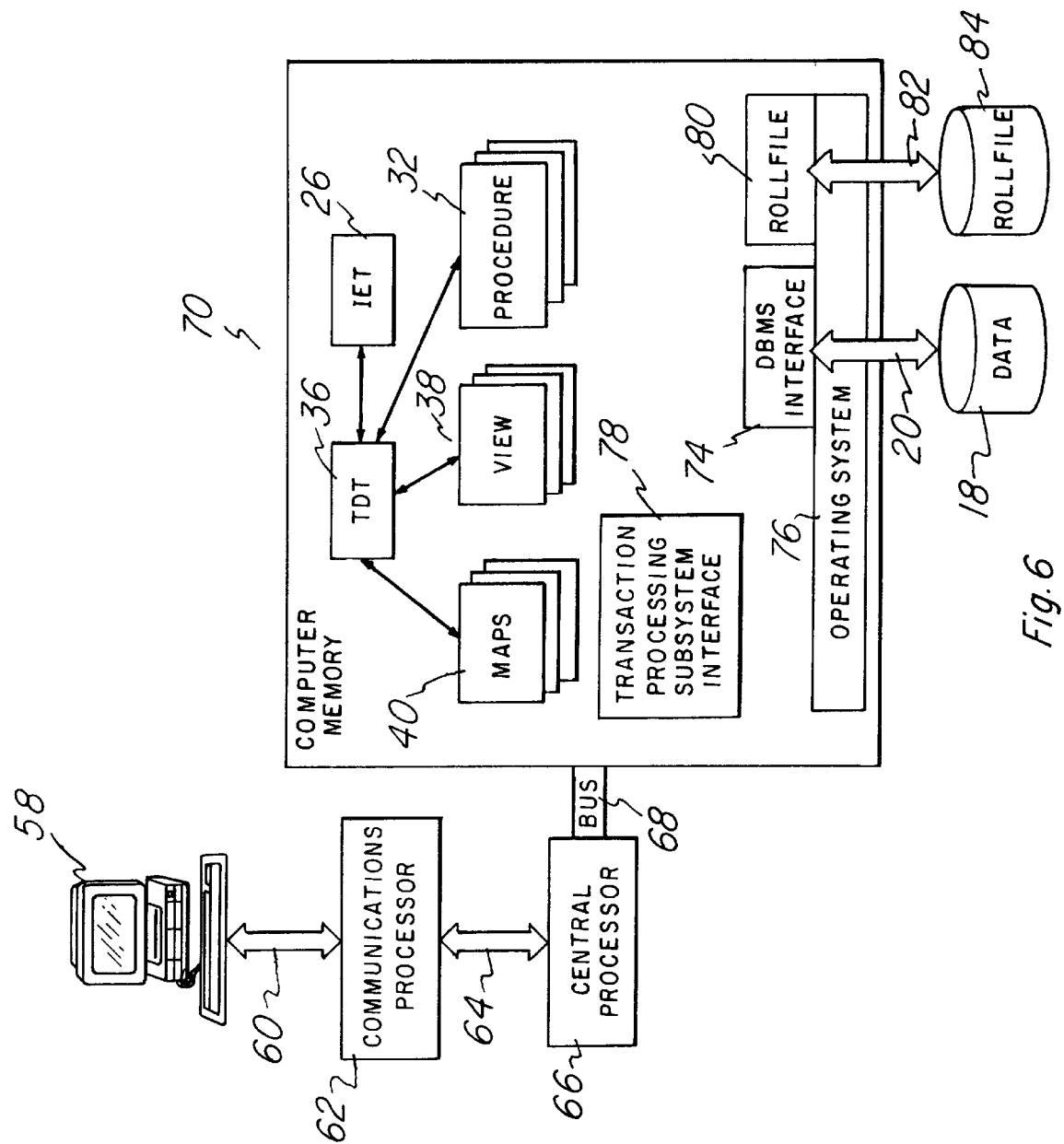
FIG. 6 is a block diagram depicting the execution environment according to the present invention.

In the execution environment of the preferred embodiment of the present invention, turning now to FIG. 6, a user invokes an application at terminal 58. Terminal 58 directs the request along communication line 60 to communication processor 62. Processor 62 in turn forwards the invocation to CPU 66 via hookup line 64. At this point the CPU 66 addresses computer memory 70 via bus 68. Within computer memory resides the transaction definition table 36 (TDT), the information engineering task 26 (IET), and transaction processing subsystem interface 78. TDT 36 points to specific locations in memory 70 for maps (panels) 40, views 38, and procedure logic 32. IET 26 employs transaction processing subsystem interface 78, to interface with outside systems. In processing the application, it works with DBMS interface 74, which resides on operating system 76, to access a data base on disk 18 via SQL commands 20. Likewise IET 26 maintains its ROLLFILE 80 via SQL commands 82 to ROLLFILE database management system 84.

Transaction and terminal resources are directly accessible from only one (single-image) transaction processing system. DAA implements an information distribution service between multiple transaction processing systems. The distribution service provides for the distribution of information packets, with guaranteed delivery, as well as the dispositioning of these information packets. Dispositioning typically utilizes transaction processing system facilities in order to forward the information packet to an application transaction or (terminal) device. Information packets destined for devices may be modified in order to conform with the device characteristics which are present at time of dispositioning, thus accommodating dynamic changes to device configurations. Isolation of data import/export functions from application procedural logic enables applications to transparently utilize this DAA distribution service facility in order to share resources (e.g., transactions, terminals) across distributed systems in heterogeneous software environments.

More specifically, the Information Engineering Task (IET) is an executable DAA procedure that receives control whenever an application program is executed and provides a number of devices to the application program which isolate it from the hardware and software environment in which the application runs. It communicates panels, views, and information between the user, user profile, applications procedure and remote DAA application procedures. Thus the services it performs include panel input/output processing, managing user documentation requirements, providing menu navigation, and handling cooperative processing interfaces for the application, as well as required DBMS setup, application synchronization and cleanup.

The IET uses a Transaction Definition Table (TDT, described below), and compiled view objects generated automatically by Generate Transaction Definition (GTD, described below) from the Transaction Definition File (TDF, described below) to correlate information to be communicated to the user, user profile, application procedures and DAA remote procedures. This information is stored in the transaction view data area and is the major interface between the application and the IET. The transaction view is initialized from the input screen and profile view when performing panel input/output processing and initialization of the transaction view from the input/output/interface views and profile views when performing cooperative processing.

The isolation that the IET provides enables the application procedure to contain primarily application specific logic. The languages (primary and DBMS) used in application procedures are written in languages which are implemented consistently across all DAA platforms so as to ensure application portability.

Prior to having DAA, and specifically, the transaction driver program, IET, and programmer did not require a table of pointers to his maps and procedures. Each transaction would have unique program logic containing the necessary decisions to explicitly call the proper procedures to process appropriate input from a user and to use various screen maps for output as required. This meant the programmer was required to provide code to handle all the possible dialog flows, and screen input/output.

In DAA, the IET module provides the dialog flow management and handles all the screen input/output including help documentation and glossary request. The programmer under DAA is only required to handle input and output variables from/to screen maps and remote procedures.

Since IET is a fixed program module that is common to all DAA transactions, it is not possible for embedded logic to call the appropriate user procedure and to use its unique screen maps. This problem requires that all information used to drive the application screens and procedures be contained in a separate linkable table. This table must have sufficient information to allow IET to choose the appropriate screen maps, call appropriate procedures before and after screen input/output, save and restore appropriate program variables (views), restart a transaction at the last known state and provide appropriate linkage to remote DAA transaction procedures. This table is known as the Transaction Definition Table (TDT) and is created by the DAA development tool, GTD, based on transaction definition information provided by the developer, or application programmer, and stored in the Transaction Definition File (TDF).

The TDT is a table of names, pointers, and control information required by the IET module at run time to properly communicate panels, views and information between the user, link-edited procedure and remote DAA procedures. The TDT is simply the anchor of information that allows IET to control execution flow. The TDT is constructed so that the developer's procedure code is unaware of the TDT's existence and frees the developer from writing his own code to correlate input/output application panels, help panels, glossary panels, as well as saving and restoring pertinent program variables (views) across multiple executions of a transaction for any given user.

The TDT consists of a variety of information such as application identification, version number, last transaction build date, help documentation file name, number of documentation languages supported, a pointer to first documentation language table entry, and an SQL support procedure entry point addresses for such functions as Connect, Commit, and Release. Map and procedure tables as well as menu and documentation language table entries also comprise part of the TDT.

Each of the map tables for application, menus, help, information and glossary panels contains such information as panel name, TMS screen map pointer, input/output procedure pointers, number of associated menu entries, and a pointer to the first associated menu entry. Each of the procedure tables contains such data as procedure name, procedure entry-point address, input/output/profile view table pointers, and SQL DB use flag. Each of the menu table entries contains such information as menu select code, panel entry pointer, panel procedure entry-point address, and displayable menu description string. Each of the documentation language table entries contains such specifics as documentation language name and documentation file name.

The Transaction Definition File (TDF) is a file of records used by GTD as the "blueprint" for constructing a DAA transaction. This TDF is an integral part of GTD because it contains all the information necessary to compile and link all the correct components of a given DAA transaction. The programmer simply uses GTD's menus and screens to add and delete the appropriate components and GTD files this information into the TDF.

Therefore, the content of the TDF is created and maintained by the developer using the GTD tool. The TDF is used by GTD to assist the programmer in the edit of his procedure code, panel maps, and menus. Once these components have been edited, the TDF is used by GTD to compile and create various object modules that are link-edited along with the IET to produce a transaction load module.

The TDF consists of a variety of types of records such as header, panel, menu, and procedure. The header typically contains a list of source, object, load and map libraries along with pertinent names, such as application and transaction-view names. Each panel is a record containing panel name and input/output processing procedure names. Each menu screen is a record containing menu name, menu panel name, input/output processing procedure names and displayable description string. Each procedure definition is a record containing procedure name, input/output/profile view files names, and language type.

The Generate Transaction Definition (GTD) never requires a programmer to build files containing instructions on compiling and linking the correct parts, because the GTD builds and maintains the TDF. Furthermore, the GTD provides for development of applications that execute under control of the IET.

More specifically, GTD is a menu driven user interface that is intended to be uniform across all DAA platforms providing the application developer with structured application development such as definition, creation/edit, construction, application transfer features and various utilities necessary for development in an environment with multiple heterogeneous development and execution hosts. Application programmers define application components and their interrelationships by using definition screens within GTD. They include procedure code, panel maps, menus, program data views and documentation. This information is stored in the TDF and later used by GTD when accessing any of the components for modification or for DAA application construction. The developer uses GTD to edit the application source components and to construct the executable application load module.

During construction, GTD uses the TDF and the application defined program data views to create object modules which are used by IET in order to perform its services for the application program. Whenever a GTD application is constructed, GTD ensures that all objects created are up-to-date with the source files so that the application will always be synchronized.

GTD provides for development of applications that execute under control of the IET through the user interface, and performs background functions at each state of the application development. These stages can be defined as definition, composition, construction and deployment. During definition GTD requires the user to define all of the components of the application, their physical storage location, their interrelationships, and any additional attributes or information. The definition information is stored in the TDF. During the composition phase GTD provides the application developer with menu access to each of the components listed in the TDF and provides generators and editors for each of these components.

During construction, GTD retrieves the information in the TDF and generates the TDT and view module which are used by the IET module at run time. GTD then compiles each of the components listed in the TDF using the appropriate compiler for each type of component in a predefined order by type. These types include the TDT and view modules GTD generates, menus and panel maps, and procedure code. GTD provides the application developer with construction alternatives. Components may be constructed conditionally or unconditionally based on date and time information which is updated each time a source component is modified during the composition phase or when an output object is created or replaced during construction. When performing conditional construction GTD checks the date and time on each source component and each output object. When the source component has a later date than the output object, GTD reconstructs the output object. Conditional and unconditional construction method approaches ensure the synchronization and consistency of the load module when construction is performed on all components in the TDF. To complete construction, GTD binds all of the load module components together into a load module using a linkage editor and installs the load module in the location referred to by the TDF.

During the deployment phase GTD provides the capability to transfer all, or selected, application components from one machine to another. The application developer identifies the target machine, the physical location on the target machine where the TDF file could be located, and the components to transfer. This transfer process accesses the components listed in the TDF and transfers them to an appropriate location on the target machine extrapolated from the target machine TDF file location. The transfer is accomplished using an available file transfer communications program between the source and target machines. As part of the transfer process all textual data is translated to the target machine format and the physical locations and names in the TDF are changed to conform to the target machine conventions.

In the evolving world of distributed computing systems, it is necessary that the applications be supported with a strategy consistent with the environment in which the applications operate. These distributed networks are composed of systems (computers) connected with communications facilities of various types, including wide area networks, local area networks, and bus architectures. These systems support local data bases and distributed data bases that allow synchronized maintenance of information between multiple computer systems.

In most general case, the present invention provides the capability to develop interrelated applications and put these applications into service on multiple heterogeneous processors connected with heterogeneous communications facilities utilizing heterogeneous data bases. Currently the COBOL and C languages are being supported. It should be understood however, that other languages could be used in applications involving the present invention. Furthermore, while particularly DBMS is the primary data base management system employed in implementing the present invention, other data base management systems such as DS/1 could also be used. Lastly, it is contemplated that the present invention should not be limited to the TSO, Unix and OS/2 environment platforms currently supporting the present invention.

The distinguishing features of a preferred embodiment of the present invention include application portability, consistent user interface, dynamic application changes, and cooperative processing between heterogeneous computer architectures. Application portability means that an application written in one of the supported programming languages (e.g., COBOL or "C"), along with all related copy (or include) files, user interface panel definitions, documentation, transaction definition tables, views, etc., can be moved and installed, without source-level modification, on any supported target platform.

"Dynamic application change" enables most application changes (including procedural, data base, or panel definition changes) to be made in real-time, without disruption of service or loss of data integrity. End users perceive installation of application changes as subsecond variances in response time, occurring only while the change is being installed. Individual transactions of a distributed cooperative processing application are updated asynchronously, without disrupting continuity or integrity of data communications. Consistent user interface means that a user, from any terminal in the network, has transparent access to all transactions in the network (subject to security constraints), that all transactions have a consistent form of dialog navigation, and that the panel layout, user interaction with panel elements, etc., is consistent across all transactions for any particular user's terminal.

The cooperative processing feature of DAA provides for data exchange between transactions residing on heterogeneous platforms, transparent to the application.

To meet the need for continuous operations and as well as implied dynamic change for applications, the preferred embodiment of the present invention modifies an application (including data base and panel presentation) dynamically with, in most cases, only subsecond interruption to service while the change is being implemented. This maintenance capability is segmented so that most changes for an application can be modified in one system (computer) without requiring the change to be synchronized throughout the distributed processing network. Certainly some applications, due to distributed calls between systems, will require synchronization of maintenance on multiple systems for certain types of application changes. However, the preferred embodiment of the present invention allows dynamic asynchronous change throughout a network.

Figure 7:
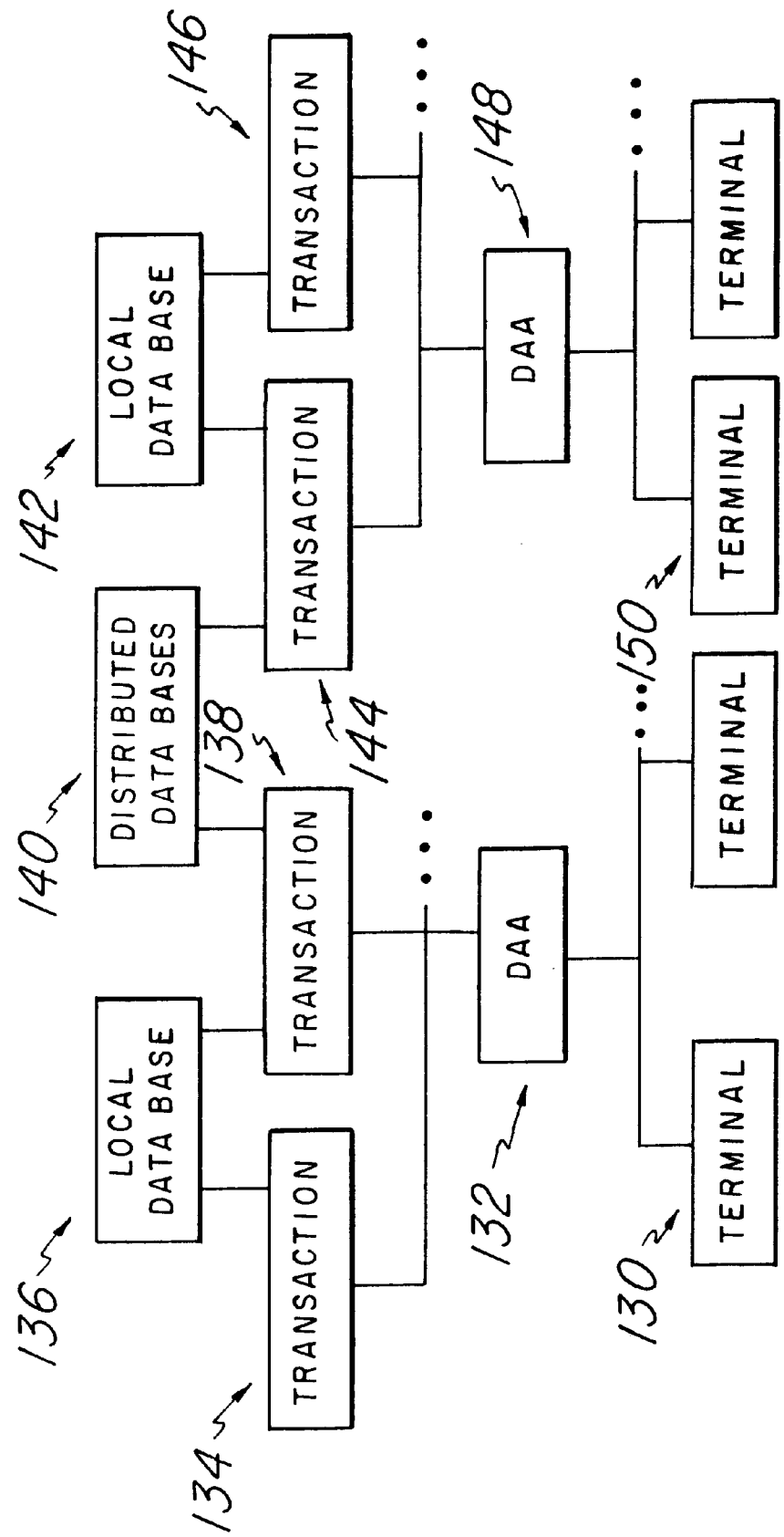
FIG. 7 is a graphical representation of application portability due to the implementation of the depicted cooperative processing.

The Distributed Application Architecture (DAA) environment according to a preferred embodiment of the present invention is comprised of a set of inter-connected systems, as shown in FIG. 7, discussed below, each of which is uniquely named and addressable by other systems within the network. Systems participate in the DAA environment by allowing applications to use their resources (e.g., terminals, transactions). Each system is a homogeneous application processing environment which supports or simulates either a single-processor transaction processing system or a multi-processor single-image transaction processing system (e.g., IMS).

To illustrate this aspect of cooperative processing between heterogeneous systems, return to FIG. 7. Two interconnected systems are depicted as an example only as more systems can frequently be involved in any transaction. Input invoking a transaction is received at logical terminal 130 and forwarded to the DAA environment 132. Logical terminal 130 could be an IBM 3270 device, an intelligent workstation window, a local terminal or a non-DAA process. The DAA environment 132 is a homogeneous application processing environment (e.g., a transaction processing system). DAA environment 132 invokes the required transaction. An application may require a transaction 134 that only requires information from local database 136. Or, a transaction 138 may require information from both local database 136 and distributed database 140. At the same time, terminal 150 may address DAA environment 148 to invoke transaction 144 which requires information from local database 142 and distributed database 140. It is possible with the present invention that transaction 144 (or 134, 138, 146) could use local database 142, call another transaction (say 134, 138, or 146) to request information from local database 136, and return the information to the DAA environment 148 to be properly formatted and returned to terminal 150.

Figure 8:
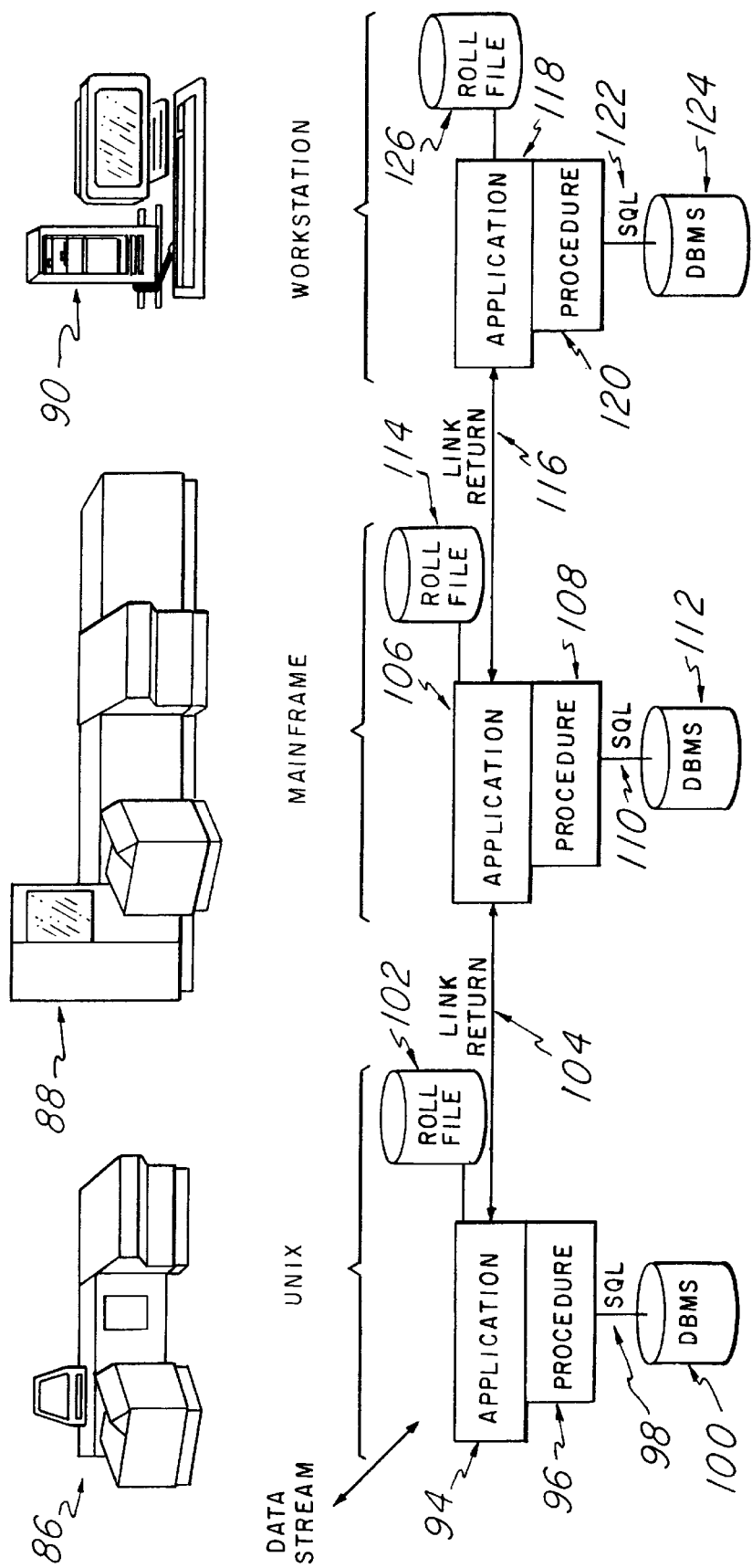
FIG. 8 is a block diagram of a heterogeneous environment showing distributed resource intercommunications supported by the present invention.

Looking now at FIG. 8, a more clear example of this cooperative processing across heterogeneous platforms is shown. Assume a data input stream 92 is received from a UNIX computer 86. This data stream 92 invokes application 94 to process procedure 96. Procedure 96 obtains information from DBMS 100 via SQL requests 98. As procedure 96 is processing, information is needed from DBMS which in turn needs information from DBMS 124 to complete its processing. With the present invention, this information may now be obtained, while remaining transparent to the user on the UNIX 86.

To accomplish this, procedure 96 is returned to application 94 in the form of an output view (not shown) requesting a LINK to, for example, IBM Mainframe 88. Application 94 suspends procedure 96 and stores relevant data from procedure 96 in a profile view (not shown) which is in turn stored in ROLLFILE 102. Then application 94 makes a LINK request via communication line 104 to the mainframe 88. The mainframe 88 grants the request and directs the data stream coming across line 104 to application 106. Application 106 determines this data stream is looking for information from DBMS 112. Application 106 forwards the data stream to procedure 108 in the form of an input view (not shown). Procedure 108 executes on the data stream, requesting information from DBMS 112 via SQL request 110. While executing, procedure 108 determines it needs some information from DBMS 124 to complete its execution. Procedure 108 is returned to application 106 in the form of an output view (not shown), while relevant data is stored in a profile view (not shown), in ROLLFILE 114. Application 106 then requests a LINK with OS/2 workstation 90, which is granted. Application 118 accepts the incoming data stream and forwards it to procedure 120 in the form of an input view (not shown). Procedure 120 executes, obtaining information from DBMS 124 via SQL request 122. After completing execution, procedure 120 returns to application 118 in the form of an output view (not shown). Application 118 makes a copy of this transaction and places it in a profile view stored in ROLLFILE 126. Application 118 then makes a RETURN request to mainframe 88. Upon the return of data stream via communication line 116, application obtains the profile view stored in ROLLFILE 114 and restarts procedure 108. Procedure 108 completes its execution, requesting additional information needed from DBMS 112, if any, and returns to application 106. Application 106 makes a record of the completed transaction and stores it in a profile view (not shown) stored in ROLLFILE 114. Application 106 then makes a RETURN request to UNIX 86. As the data stream is returned via communication line 104, application 94 obtains the stored profile view on this transaction from ROLLFILE 102 and restarts procedure 96. Procedure 96 completes its execution, requesting additional information needed from DBMS 100, if any, and returns to application 94. Application 94 makes a record of the completed transaction in the form of a profile view (not shown) and stores it in ROLLFILE 102. Application 94 then formats the outgoing data stream 92 for the appropriate terminal and sends it to the user.

DAA provides the services required to share transaction and terminal resources across heterogeneous systems. A system as contemplated by the present invention is an application processing environment within a network, such as an IMS, CICS, UNIX, OS2, or VMS processing environment, among others. Each system within the DAA environment has a name to uniquely identify that system, and the run time directory at each system maintains sufficient information to support the routing of resource requests to the appropriate processing system within the DAA network. The feature of DAA which supports routing of resource requests is known as "Distributed Resource Control".

These systems support distributed applications by allowing segments of these applications to process on any of the network-connected systems. These applications are serviced by a collection of named transactions (system-unique name) that may be referenced by the systems within the network and the users of the network. These transactions may access data bases that are known to various portions of the network and may be addressed to data bases on the local system or to data bases that are distributed on a set of remote systems in the distributed data base environment.

The users of the distributed application architecture disclosed as the present invention are named (network unique name) workstation operators, or processes or machines that present themselves as "users" to the network. A user within the preferred embodiment of the present application typically accesses an application provided in the DAA network through a workstation terminal. The user may invoke various functions of the network by entering data into the terminal by voice, barcode, keyboard, mouse, data stream from a process, or other input device. Output is presented to users of the network via a terminal display; it is presented as a data stream to a process "user" within the network.

A user signs on to one of the systems within the DAA network using an User-ID (network unique name) and an identifying password. This user identification is employed within the DAA network to identify activity for security and accounting purposes, as well as for profile management to maintain the status of processing activity for the user.

A given user may have multiple applications active on multiple systems at any one point in time. This may be viewed as the electronic work desk for a user at a given system. The user may suspend processing of a given application, either by signing off the network or by switching to an alternative application within his portfolio. At the suspension of execution of each transaction the control program will retain, within the profile data base (hereinafter referred to as the ROLLFILE) for that user on that system, the collection of data items (Profile View, described further below) that represent the status of that suspended application.

Similarly, more than one user may have multiple applications active on multiple systems at any one point in time. The results of each panel of an application is stored as it is completed in a profile view, which profile view is uniquely identified by application name and user identification on a system. Although multiple users may be at different stages within a particular application, because of the present invention, each user is able to restart his particular application at the stage last completed by that particular user, regardless of the system the user is logged onto and regardless of what system the application resides.

The architecture of the preferred embodiment of the present invention provides for a 'Display Active' transaction that allows the user to display the applications that are active for that particular user on the designated system. Utilizing the 'Display Active' application display, the user may scroll thru the systems within the network by striking the appropriate function key. From this 'Display Active' application panel, the user may also restart a suspended application, delete an application from the profile data base or may route the 'Display Active' transaction to a designated new system.

According to the preferred embodiment of the present invention, applications can run in any of several systems and the user may desire to interface with applications involving multiple panels. Therefore, it is imperative that certain attributes be displayed on the user interface panel to identify critical parameters associated with the particular user interaction, such as: the user responsible for initiating the transaction, the system on which the current application is running, the application (transaction) that is currently active for this display, the panel within that application that is currently being displayed, date and time of this interaction, error and information messages related to the interaction and standard prompting information that reflects actions that user may take from this particular panel. These standard panel attributes are detailed below for example purposes only.

| FUNCTION | INTERNAL NAME | ROW | COL | LENGTH |
|---|---|---|---|---|
| Transaction Name | IEF1-TRAN | 1 | 1 | 8 |
| Panel Name | IEF1-PANEL | 1 | 10 | 8 |

-continued

| FUNCTION | INTERNAL NAME | ROW | COL | LENGTH |
|---|---|---|---|---|
| Panel Title | NA/Optional | 1 | 19 | 30 |
| System Name | IEF1-SYSTEM | 1 | 58 | 8 |
| Date/Time | IEF1-CURDT | 1 | 62 | 18 |
| User ID | IEF1-USER | 1 | 72 | 8 |
| Message ID | IEF1-MSGID | 23 | 1 | 6 |
| Message Text | IEF1-MSGTX | 23 | 8 | 25 |
| Function Key Prompts | NA | 24 | 1 | <79 |

The format of the Function Key Prompts is 'Fnn=prompt' where "nn" is a one or two digit number identifying the function key number, and "prompt" is variable length indicator of the associated function.

When using DL/1 or other data bases, it is desirable, or often even necessary, to have a collection of functions and sub-functions packaged as TRANA and while another set of functions are packaged as TRANB to minimize the number of data bases associated with a given transaction. Therefore, according to the preferred embodiment of the present invention, multiple functions are packaged in each transaction module. Packaging multiple functions within a single transaction code (hereinafter referred to as a "trancode") improves user friendliness. Furthermore, it also minimizes the number of objects that must be managed when installing an application in a new system or when re-deploying a new release of an application. The size of any resulting transaction module is a design consideration and must balance technical and performance considerations with user friendliness and ease of maintenance.

A terminal as contemplated by the present invention is a presentation facility, such as a video terminal screen, and an input mechanism, normally a keyboard. However, as noted previously, this input mechanism could be a program, voice, barcode, mouse, or other input as well as a keyboard. Similarly, the display could be a program as well as the more conventional terminal display. Each logical terminal has a name that is unique within the DAA network.

The terminal is the primary interactive input/output facility for DAA applications according to the preferred embodiment of the present invention. Once the input has been prepared to the user's satisfaction, he may press ENTER (or an equivalent) to invoke the transaction. This transaction input stream will be passed to the appropriate system in the network. Once arriving at the appropriate system, it will be processed according to the transaction code. Once the transaction has been invoked, the application or the Information Engineering Task (IET) runtime controller, will be responsible for interpreting the input stream and in turn invoking the appropriate procedure.

Output generated by DAA transactions will be presented to the logical terminal, formatted according to the interface and device characteristics associated with the terminal (e.g., any necessary control sequences associated with display devices will be included in the data stream). The primary human interface to the DAA environment is through terminals that present panels of information from the applications via transactions executing in the various systems. Often, the terminal is a 24×80 video screen with keyboard. However, a "terminal" could also be a program (e.g., an interactive program such as a spread sheet package). Each logical terminal is uniquely defined within each system.

An application as contemplated by the present invention is a collection of transactions that perform a set of functions on behalf of the application. Each application has a four character name that is unique within each deployed runtime system.

A transaction with DAA according to the present invention is a collection of resources (panels, reports, procedures, databases, etc.) to be utilized in behalf of an application to perform various functions for that application. Each transaction is uniquely identified within each runtime system into which it is deployed. Additionally, each transaction comprises a set of load modules or programs that perform the specified functions in the appropriate environment for that transaction. Each transaction has a primary program (load module) which may, in turn, invoke sub-modules on behalf of that transaction.

Figure 9:
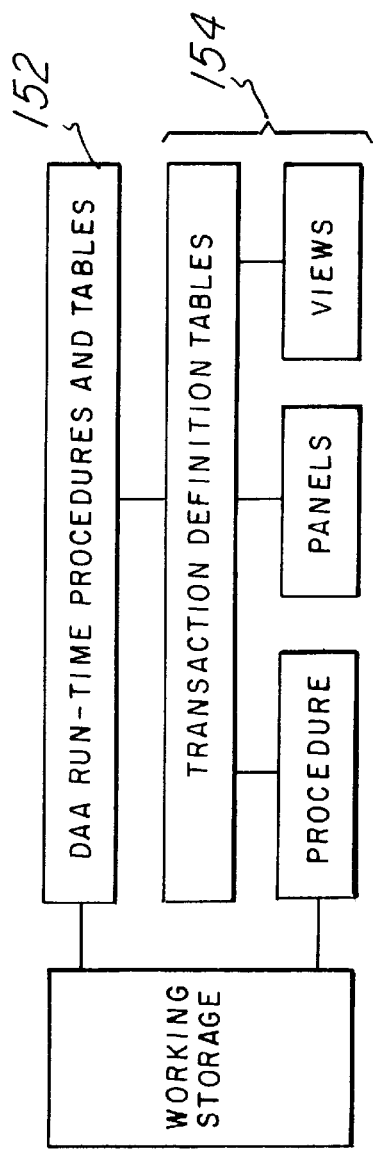
FIG. 9 is a block diagram of transaction concepts according to the preferred embodiment of the present invention.

As shown in FIG. 9, each DAA application transaction is composed of application procedures, panels, views, working storage, DAA run-time functions, a Transaction Definition Table (TDT), and other tables. As can be seen according to the preferred embodiment of the present invention, portion 152, containing the DAA runtime procedures and tables is application independent. Portion 154, containing the TDT, procedures (input), refresh), panels (menu, application) and views (import, export, profile), remains application dependent. Procedures have direct access to working storage, but are completely isolated from panels and views (and consequently isolated from the mechanics of inter-transaction communication, device communication, profile management, etc.).

Each transaction may perform multiple functions on behalf of the application. These functions are represented by application procedures. A procedure as contemplated by the present invention is a collection of code that performs a particular set of functions on behalf of a transaction. Each procedure has a name that is unique within the associated transaction. An application procedure may be invoked as a result of a panel being presented to the transaction that contains this procedure. A procedure may also be invoked by a distributed application transferring a request for service through a network request (LINK) to the designated system/transaction thereby invoking the designated transaction procedure. Upon completion of execution of a procedure, the procedure may stipulate that a panel is to be prepared and presented back to the application user or it may designate that control is to be passed to another system/transaction/procedure with a remote request, or it may designate that control is to return to the calling system/transaction/procedure that invoked this procedure.

A panel within DAA according to the present invention is a defined format for information interchange with a logical terminal (e.g., an IBM 3279 display terminal). Each panel is uniquely identified within the associated transaction. Associated with each panel is an INPUT procedure and REFRESH procedure. The input procedure is invoked when the corresponding panel is received from a terminal. The optional refresh procedure is executed upon the restart of an application or from a HELP suspension in order to refresh data to be presented on the panel prior to output display of the panel.

An input procedure is an application program that is invoked when a panel is received by a system from a terminal/process. When an input panel is received from a logical terminal, the input procedure associated with the panel is invoked.

A refresh procedure is an application program that is invoked prior to displaying a panel that is requested from a menu or is invoked upon restart of an application that has been suspended for HELP documentation presentation. The refresh procedure is typically used to retrieve data from data bases prior to display on the panel. The refresh procedure may also be invoked when a panel is to be presented as an initial user request from a menu. A refresh procedure may be associated with a menu selection and/or a panel. If a refresh procedure is associated with a menu selection, this procedure will be invoked prior to the display of the panel. If, however, a menu selection does not explicitly have a refresh procedure, then the refresh procedure on the panel specification will be invoked. If neither the menu selection nor the panel specification specify a refresh procedure, then the panel will be presented from the data in working storage, as populated from the profile view.

Working storage, sometimes also referred to as a transaction view, contains all data items that will be referenced by all panels, views, and procedures for this transaction. Working storage is passed to each procedure within the transaction for use in executing the logic of that procedure. Working storage consists of a fixed section, which is used to communicate between DAA run-time functions and application procedures, and a variable section, which is entirely application-defined.

Within DAA, according to the preferred embodiment of the present invention, application procedures communicate with each other, and with outside resources, via "views". Views are used to help isolate application procedures from the mechanics of inter-system communications, device presentation management, help facilities, menus, and other DAA common services. This isolation of the application logic from "services" ensures that:

an application can be serviced, without programming changes, through continually evolving communications, storage, presentation, packaging, processing, etc., technologies.

an application can be implemented on a variety of platforms and architectures, based on cost/performance measurements (not on migration costs).

an application can be implemented on a variety of user environments, including variances in national language, human interface hardware, and user preference.

an application can be altered in real time, including data interchange (view) re-definitions, without disruption or loss of data.

A view within DAA as contemplated by the present invention is a designated collection of data items that are utilized by the application. A view is a named collection of such data items and includes the identification and length of these data items as they relate to the particular transaction. The primary types of views are profile, import, and export. A profile view identifies all data items which are to be saved in the user's profile between executions of this transaction. An import view defines all data items to be presented to a called procedure by a calling procedure. An export view defines all data items to be presented upon completion of the execution of a called procedure to the calling procedure.

The profile view is a subset of working storage (sometimes known as a transaction view) that is to be saved in the user's profile for this application. At the completion of the execution of a procedure, the profile view for that procedure is extracted from working storage and written to the profile data base. As this transaction is reinvoked by subsequent data entry or application restart, this profile view is read from the profile data base and used to repopulate working storage. The profile view is intended to be a subset of working storage which defines the data requirements of the current user dialog state while minimizing the overhead associated with maintaining user profiles.

The import, or input, view is a collection of data items that are presented to a procedure when a procedure is LINKed-to from a called system/transaction/procedure. When a procedure completes and indicates an Exit State of LINK, the DAA control program (IET) will extract from working storage the data items identified by the import view for the called procedure and package that with the control information necessary to specify the calling and called system/transaction/procedure. This message is routed to the designated system and transaction for execution. The import view, when received at the called system/transaction/procedure, is used to populate working storage for the called transaction.

The export or output, view is a collection of data items representing the results of the execution of a called procedure. The export view is a subset of items contained in working storage at the completion of a procedure execution when the exit state is set to RETURN. This export view is packaged with interface control information into a message to be routed back to the calling system/transaction. When this message arrives at the designated system/transaction/procedure, the profile view for that system/transaction/procedure, the profile view for that system/transaction/procedure is retrieved from the profile data base and used to populate working storage. The export view is then extracted from the message just received and used to populate (and overlay profile data in) working storage. The specified procedure is then restarted.

A transaction view is a collection of data items to be used by the collection of procedures, panels, and views that make up a transaction. These data items may be thought of COBOL Data Definitions or as C structures, although other languages may be used, that specify each of these data items. The transaction view is passed as working storage area to each procedure within the transaction for use in executing the logic of that procedure.

When the TDT is first referenced, the GTD system will generate the "system required" portion of the transaction view and place this in the associated SRCLIB (described later). The transaction view name is usually of the form "tdtTVW". The application designer is then required to add any application-unique data items to this transaction view. Once specified, the transaction view is used as a data reference source for procedures, panels, and other views.

APPLICATION PORTABILITY. Application portability is achieved by supporting, on all DAA system platforms, and for evolving system environments: identical application source programs, identical application definitions, and identical application development environments.

Source program portability, or identical application source programs, for all supported platforms, is achieved by adherence to a selected set of industry-adopted standards, combined with a platform-independent program interface.

Examples of industry-adopted standards which are used to assure source program portability include: "C" program compliance with draft proposed ANSI "C" (X3J11), including the defined function library; "COBOL" program compliance with ANSI X3.23-1985 (Intermediate Level); and "SQL" compliance with ANSI X3.135-1986. Adherence to these standards are checked on all platforms having ANSI compliant compilers or pre-compilers. Deviation from the standard, including non-portable use of system-specific functions, is checked whenever feasible.

Examples of areas in which industry-wide standards do not exist include: interface to a transaction processing system; interface to a presentation system; communications between cooperative processes; routing messages to terminals, transactions, systems; user interface; profile management; help and user documentation. These functions are provided by DAA, but are completely isolated from application logic.

Furthermore, there is one interface between DAA and application procedures. The application procedure is called, passing it the address of working storage. Interaction between DAA run-time services and the application is via a fixed portion of working storage. The application used working storage to request services such as display a specific panel or link to a procedure. However, the application does not specify data requirements, logical control sequence, or any other mechanics of the service. Parameters of DAA services are isolated from the application logic, making the application source program independent of system-specific implementations.

The runtime environment for DAA applications provides for the major functions to be supported by a run time driver (IET) and associated run time subroutines. An application (input) procedure is invoked as a result of input from a panel or input from a remote procedure call (i.e., LINK). In either case, the structure and content of working storage, as well as the calling sequence itself, is identical. It is transparent to the application whether input was received from a panel or another procedure (except that an optional RETURN may be made to a calling procedure). These two forms of input are further described in the following paragraphs.

When panel input is received from a terminal to a procedure, the user's profile view is extracted from the ROLLFILE and placed in working storage. Working storage is presented to the procedure and the procedure is executed, which typically performs application-dependent data base query/updates, manipulative logic on data items in working storage and/or data bases, and preparation of output data elements in working storage (which may be saved in the user's profile or displayed to the output terminal when control is returned to IET). If, for example, the designer of the application receives input, reads data from the data base, places that data in working storage, and returns control to IET, the same panel will be displayed with the newly populated working storage data.

If the logic of the input procedure is such that it determines from terminal input or user action request (e.g., a function key) that an alternative panel is to be displayed, it may do so by inserting the new panel name in the IEF1-PANEL field and returning control to the IET. IET will prepare a panel for the input terminal consistent with the panel specification. If the IEF1-PANEL field is left blank, the master menu will be displayed.

The designer has the option of interrogating the user action request (e.g., function key), located in working storage element IEF1-FUNKEY, to determine action to be taken by this procedure in response to a user action request from the terminal. Note, however, that certain action requests are reserved for use in dialog actions defined in the consistent user interface (and implemented by IET).

An external procedure is a procedure which is physically located in a different transaction and possibly different system. The external procedure itself is not included in the calling transaction load module but a reference to this external procedure is made to correlate the import and export views for this procedure.

An application procedure can use the LINK and RETURN exit states to invoke external procedures. Distributed Resource Control (DRC) is used to route the request to the designated system/transaction. The procedure name, as specified, must be a well-defined procedure name within the called system/transaction. If it is not well-defined, then the menu for the called transaction will be displayed to the user.

The invoked system/transaction/procedure operates in the same environment as the parent transaction/procedure and has the same options (i.e., if a panel is to be displayed upon completion of the execution of this called procedure, the procedure may do so by entering a panel name in the IEF1-PANEL field and returning control with the IEF1-XSTATE field blank to display this panel to the requesting user).

A called external procedure may return control to the calling procedure by setting the variable IEF1-XSTATE to RETURN. In this case, the IET control program will extract data items from working storage as specified by the export view for this called external procedure, package that with the interface control block that initiated this call request and submit this output message to the calling system/transaction/procedure. Upon return to the calling system/transaction, the IET control program at this system will extract the profile view for the calling procedure from the profile data base and use it to populate working storage of the calling transaction, followed by a population (and consequent overlay) of working storage based on the export view received from the called external procedure. The calling procedure will be reinvoked for further processing.

DAA profile management is a service which is automatically provided to all application procedures executing in the DAA environment. Profile management saves and restores an identified subset of working storage, completely independent of application procedure logic. Profile management enables DAA transactions to have the characteristics of conversational transactions (except profiles are by user instead of terminal), without requiring application logic. Consequently, DAA procedures have some of the ease-of-programming features inherent with interactive-mode applications, while retaining the resource administration advantages inherent with transaction processing.

One side effect of DAA's profile management is that working storage is set according to the definition of the user profile (and not necessarily the last execution of the procedure). This encourages application procedures to be coded for serial re-usability and/or reentrancy.

Application definition portability, both with respect to supported platforms and evolving system environments, is achieved by using tables (as opposed to generating code) within the application load module.

Tables to describe the application requirements and definitions are independent of the specific implementation environment. For example, panel tables do not have any device-related information nor do import/export views have any protocol-specific information. Environmental dependencies, such as terminal devices or inter-system communications protocol, are isolated from the application definition. Consequently, DAA support for changes to the environment, either through explicit application transfer to another environment, or through natural evolution of the current environment, is achieved without impacting the application.

DAA provides a platform-independent interface to a structured development process, plus an automated mechanism for transferring an entire application development environment between platforms.

"Generate Transaction Definition" (GTD) is an interactive tool used for semi-automating the transaction development process. GTD provides the developer with a mechanism for specification of all transaction elements. The user creates and edits the Transaction Definition Table (TDT), which identifies the elements to be included in the transaction and the relationship between the elements. GTD also provides the mechanism for specifying parameters of DAA services, such as dialog interaction control, panel layout, profile mapping, import/export mapping, etc.

GTD provides a "common user interface" to the developer, independent of the platform being used for development. The tool has the same panels, and same options, on all systems.

All aspects of application development are identical on all platforms, including transaction definition, menu definition, panel layouts, view definitions, working storage definition, help and information documentation, etc. Variations in file naming conventions, compiler options, link options, SQL pre-compile options, and other system features are hidden from the developer. Variations in physical characteristics of supported terminals/devices are transparent to the developer. Variations in the transaction processing system, and associated interfaces, are hidden from the developer. Installation procedures are identical on all systems.

In addition, there is a function within GTD which provides for the automated transport of the entire development configuration, for a given application, from one system platform to another. These capabilities promote rapid deployment of applications across heterogeneous platforms.

GTD is a structured development environment and enforces structured construction of transactions. Since all components are known and controlled by GTD, it is feasible to automate the transfer of applications from traditional (albeit partially automated) development methodology to full-cycle CASE tools such as Texas Instruments' IEF.

DYNAMIC APPLICATIONS. The primary attributes of DAA transactions, according to the present invention, which contribute to the capability for dynamic application modification are: packaging all application-specific components of a transaction into single load module; and insulating transactions from the impact of view definition changes.

Additionally, DAA services associated with application transactions can be modified dynamically and synchronously (with respect to all application transactions) since: most DAA services are implemented as independent processes, communicating (in system-dependent implementations) with DAA run-time functions in the transaction; and the DAA run-time functions are dynamically loaded, independent of the transaction's load module.

These capabilities enable continuous operations at all systems. It avoids the problems of synchronized installation, enabling maintenance on each system to be performed asynchronously. It also enables continual upgrades to DAA service capability (e.g., ability to support new terminals/devices; new user dialogs; new help/documentation presentation features; etc.), transparent to application transactions.

One or more application procedures are packaged together with a transaction definition table, views, panels, and other resources to create a uniquely identified load module.

This load module, in combination with other attributes such as scheduling priority, is identified to the Transaction Processing Monitor via a "transaction identifier". This transaction identifier is the basis for scheduling work within DAA. The load module which is associated with the transaction identifier includes:

Application procedures.

Set of resources to be used in conjunction with application procedures, such as data sets or data bases.

Transaction Definition Table. This table includes, among other things:

A table of all referenced procedures, both internal and external.

For each referenced procedure, the import, export, and profile views associated with that procedure.

A table of all referenced panels.

For each referenced panel, the refresh and input procedures associated with that panel.

Working storage.

In summary, the load module contains all application-specific logic and data. Since the load module is treated as an indivisible unit by the transaction processing system, modifications of program logic, data base query, panels, and/or any other components of the transaction will always be installed synchronously, thereby ensuring load module integrity. Most non-DAA systems, both transaction processing systems and interactive systems, require or allow user interface control tables be physically separate from load modules (which inevitably leads to synchronization problems).

Specifically not included in the load module are the DAA run-time functions (IET, etc.,) which provide and/or interface to the various services provided by DAA.

IET, along with all lower level service functions associated with IET, is implemented outside the load module. IET is isolated from application load modules in order to reduce application load module size, synchronize system-wide installation, enforce IET upgrades into all applications, and perform IET upgrades without rebind or other modification to the application.

IET, along with all other DAA run-time functions, are implemented as a dynamic link module, callable from the (DAA provided) "main" program which gains control from the transaction processor.

Many DAA services are implemented as independent processes which utilize system-dependent techniques to communicate with the run-time functions linked to application transactions. These services include documentation retrieval system, profile management, and distributed resource control. The DAA services are implemented as servers; functions within application transactions are clients.

DYNAMIC VIEW MANAGEMENT. Application procedures communicate with each other, and with outside resources, via "views". Views are used to help isolate application procedures from the mechanics of inter-system communications, device presentation management, help facilities, menus, and other DAA common services.

Following each execution of a procedure, a subset of working storage is saved on disk. This subset is a specific "profile" view for the procedure. The profile view is used to re-populate working storage when panel input is complete (working storage is re-populated from both the panel input data and the profile).

Figure 10:
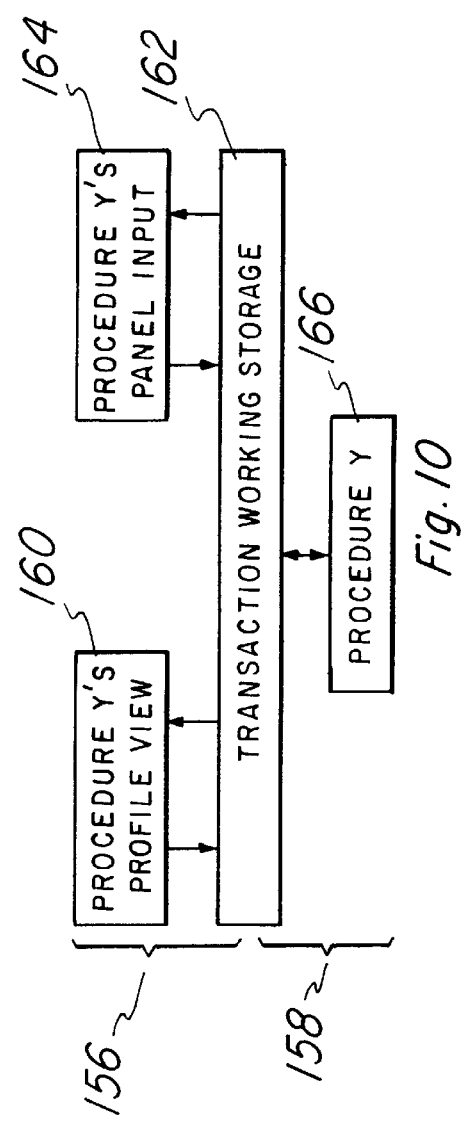
FIG. 10 is a block diagram depicting DAA procedure execution and profile view according to the present invention.

The relationships between DAA application procedures, working storage, and profile views is shown in FIG. 10. The portion of FIG. 10 designated 156 represents that portion of the execution under IET control. The portion designated 158 represents the portion of the execution that remains under control of the application.

When a transaction has been restarted after being suspended, a system according to the present invention uses the user identification provided at logon, and the application identification of the desired application procedures, to locate the profile view which has matching identification. If no profile view is found, to match the given identification, the system will generate a new profile view that bears the given identification. Once a profile view bearing the given identification has either been located or generated, the dialog manager then performs its processing sequence until the transaction is suspended again or completed.

The dialog manager (IET) processing sequence for profile views, panel views, and working storage is summarized as follows:

Read profile 160 and map to working storage 162.

Read panel input 164 and map to working 162.

Execute procedure 166.

Map working storage 162 to profile 160.

Map working storage 162 to panel 164.

Display panel (not shown).

Working storage is used directly by the application procedures. External views are used for coordinating (asynchronous, queued) data interchange between procedures.

Views which are interchanged between procedures via LINK, RETURN, or XFER or "profile" views which are stored on the user/session profile stack are "External views". These views have the property of existing asynchronously to the life cycle of transactions. (e.g., the transaction could be modified while a view is in transit between transaction executions, possibly with a different definition for working storage).

When data is interchanged between two transactions, or even between one execution instance of a transaction and another execution instance of the same transaction (e.g., "profile" views), a mapping occurs between an external view and working storage. The following transformation considerations apply to this mapping:

The internal representation of data within working storage may not correspond to the internal representation of the same data item in the external view. Either the format or length may be different.

Data items may be added to or removed from working storage or an external view.

The naming convention used by items in working storage may not correspond to the naming convention used by the external view.

The data content of the external view will change over time. Not all transactions using the external view are updated (nor necessarily have to be updated) to reflect changes in external view content. In any case, installation of external views or working storage modifications should be possible, in real time, with no disruption of application transactions or data distributions in progress.

The quantity of data within a view may vary. A repeating structure may occur a variable number of times.

External views are implemented according to the ISO presentation protocol standard, which defines both a "source" language specification for data structures as well as the run-time data encoding algorithms.

To achieve the goal of data interchange in an environment which permits real-time transaction modification, working storage is defined independently from the external views (import, export, profile). A view consists of a set of data elements, which can be "primitive" items or "sets" of data elements. The recursive definition allows arbitrarily complex structures.

Each data element of a view is assigned an identifier (which is always associated with the same element, even if the element changes relative position within the structure or has a change of length). Each data element of working storage is assigned an identifier which is always associated with the same element, even if the element changes relative position within the structure or has a change of length). A projection table is constructed for each view which defines the mapping between identifiers in a view and identifiers in working storage.

Using ISO-defined ASN.1 encoding, including embedded identifiers for each data element, views can be interchanged across heterogeneous platforms. Furthermore, view encoding is independent of any structural change in working storage since embedded identifiers are used for mapping (i.e., mapping is not dependent upon sequence of items in either working storage or view).

Consequently, data integrity of view exchange is maintained even with changes in relative order and/or removal or addition of items within the view.

Figure 11:
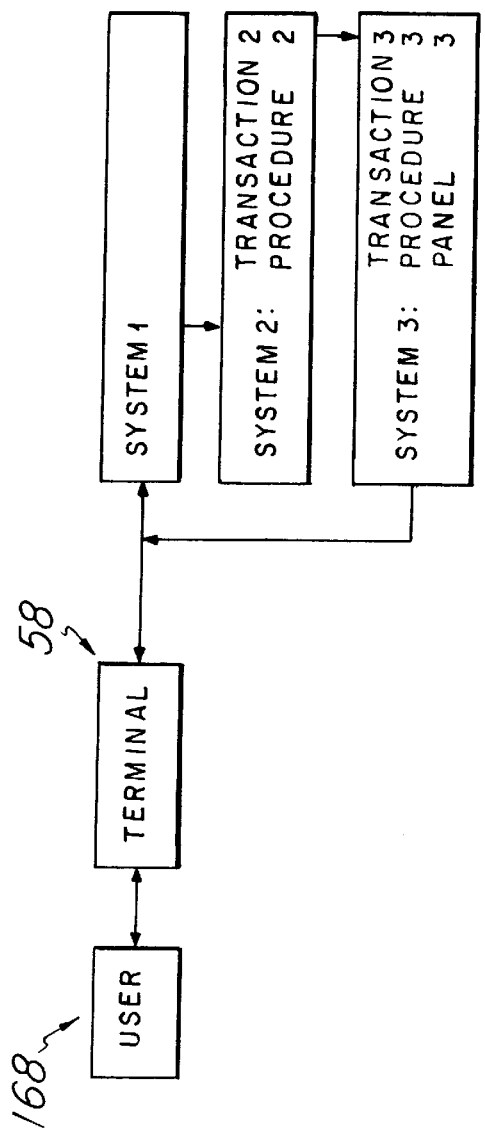
FIG. 11 is a block diagram depicting an user interface scenario according to the present invention.

CONSISTENT USER INTERFACE. A user interface scenario which illustrates user interaction with a distributed DAA application is shown in FIG. 11. In this example, a user 168 entered a panel on terminal 58 which was associated with System 2/Transaction 2/Procedure 2. Since the user's terminal was physically located on System 1, Distributed Resource Control (DRC) was used to route the message (i.e., panel input) to System 2/Transaction 2/Procedure 2. Application logic within Procedure 2 requested a LINK to System 3/Transaction 3/Procedure 3. DRC was used to route the LINK message to System 3/Transaction 3/Procedure 3. Application logic within Procedure 3 requested a panel to be displayed to the user. DRC was used to route the message (i.e., panel output) to the terminal 58 on System 1, for viewing by 168.

Within this scenario, involving multiple systems and transactions, user interface consistency is essential. The primary purpose of a consistent user interface within DAA is to have all computers, systems, applications look the same to the user. Panel layout, panel element interaction, and overall dialog flow are key aspects of user interface consistency. DAA enables and partially automates the specification of consistent system- and device-independent panel layouts (via GTD). Dialog flow is partially defined by the developer (menus, panel validity checks, documentation) and partially defined by DAA conventions for dialog flow between applications.

Run-time user dialog navigation is implemented by IET, independent of application logic. Providing a consistent user interface relies heavily upon profile management, which maintains the transaction state and selected application data for each user/session.

The user and computer exchange requests, creating a user-driven dialog which moves along one of the hierarchical paths provided by the application. Within the dialog, data and control is passed from one procedure to another. A procedure may be located on any system within the DAA environment. The location of a procedure is transparent to both the application logic and the end user.

IET controls most of the user dialog, isolating the application procedure from the major aspects of user interaction. This enables IET to implement not only a consistent user interface across all terminals and platforms, but also to evolve the user interface towards developing industry standards (independent of application logic). The following paragraphs describe an implementation of a consistent user interface (controlled by IET and defined by GTD).

Although the IET will be described in greater detail later, it uses a mapping service to interpret any panel input by mapping the input into variables which will be used to build panels. It interfaces with a transaction processing subsystem to obtain a next panel from a user and to present the output in a panel form with which the user may interact. By using a table of instructions containing pointers to maps, views, and application procedures, the IET is instructed, via a translator for the table of instructions, as to which next panel to present based on the results of the processing of the previous panel.

The IET manages dialog flow between various users, which can be a variety of logical terminals by initializing the fields within a transaction view for that transaction. After receiving a formatted input data message, the IET reads the message header to determine where the message is routed for proper processing. If the system.transaction.procedure name found in the header does not match that of the local system, the IET forwards the message packet on to the appropriate system. If there is a match, however, the IET yields control of the dialog flow to a map interpreter that the IET called. After the processing has completed to the extent possible, either due to application commands, or procedure suspension, or completion of the procedure, the IET builds an output message containing either an input view (for cooperative processing on another system.transaction.procedure) or an output view (for returning a cooperatively processed procedure or returning a panel containing the processed results to a user). Either way, the IET then forwards the message to the desired logical terminal.

Panels are the primary unit of information interchange between transactions and terminals. A description of the user dialog which follows is with respect to sequences of panels. Within a panel, there is information structured according to definition made in GTD. In particular, there are fields which display or receive formatted data. The fields have various attributes, such as color, reverse video, etc. The panel is imported to DAA whenever an "action" is requested (e.g., an action can be associated with a function key or an action bar pulldown menu item). When the panel is imported to DAA, DAA receives data which has been entered in entry fields, the action requested, and the currently selected (e.g., cursored) data item.

User interaction with panels, prior to the action request, are performed locally at the terminal (e.g., cursor movement, key entry to fields, etc.). This interaction is device-dependent, but is consistent across all DAA applications (for each particular terminal).

Panel to panel navigation is terminal-independent. DAA transactions present panels to the terminal via a panel driver (referred to as TMS). TMS interprets panels prepared by GTD and supports color, extended attributes, reverse video, underscore, and other characteristics. Certain terminals that could receive these panel presentations may not be capable of supporting the full functionality of the panels as prepared by the designer. To support multiple levels of terminal capability but still provide maximum functionality for the most capable terminal devices, TMS uses terminal characteristics information provided by Distributed Resource Control (DRC). Therefore, the application designer can design terminal presentations that utilize the maximum functionality of any terminal presentations that utilize the maximum functionality of any terminal that would utilize his application but, at the same time, be assured that his panels could be (dynamically) adapted to terminal devices that have less functionality.

At the same time the user and transaction are exchanging requests involving the processing of information, the dialog, under control of the user, is moving along one of the paths provided by the application. The user "navigates" through the application using specific actions that are part of the dialog. These dialog actions don't necessarily request the transaction to process information; they may only cause movement through the dialog path.

Dialog navigation within DAA is controlled at several levels: sessions, transactions, and panels.

The highest level in the hierarchy of user interaction with DAA is the DAA "Display Applications" (DA) transaction. The DA transaction identifies any active application on a system within the network for the designated user and may manage more than one session for each user. When a user signs onto the network, the User-ID becomes known to the network. By employing the display active (DA) transaction, a user is able to view the list of applications in progress for the specific User-ID. Through DA, the user may resume execution of an application or delete the profile view for an application from the ROLLFILE.

Since DA is a network-wide facility, the user may, through function keys or by designating an alternate system, transfer control of the DA transaction to an alternate system. Such transfer of control allows the user to view a list of applications active for that user on other systems in the network.

In order to manage and control the number of active applications, the system may restrict the number of active applications and the amount of ROLLFILE space allocated for each user. These parameters may be set by default when a new user signs on to the system and can be modified via the USR.C option of the IEC transaction (described later).

Each user session has its individual profile stack containing the current state information for the corresponding hierarchy of transactions and panels. The DA transaction allows the user direct access to all of his active sessions (including transactions on remote systems, if the session's transaction thread leads to remote systems).

Figure 12:
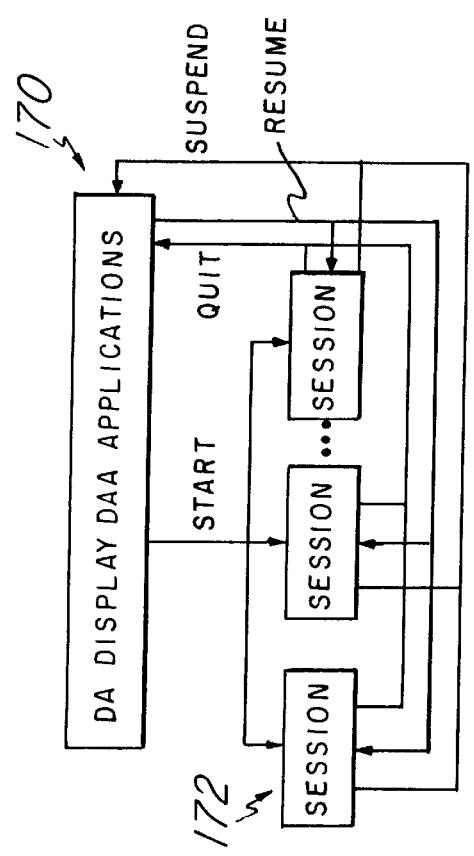
FIG. 12 is a block diagram showing possible navigation routes from session to session, for a typical dialog according to the present invention.

The possible routes of navigation and destinations from session to session, for a typical dialog, are shown in FIG. 12. As can be seen, a user may request DA1 (IETAAS) 170, which displays DAA applications, to start any session 172, may resume any suspended session 172, and may quit or suspend any session (current or suspended).

Users can perform the following actions with respect to sessions:

SUSPEND the current session. The suspend action saves the current state of the session and displays the DA panel. It is possible for the user to resume execution of the session at a later time (as an option from the DA panel), with the same data (profile) as the time of suspension.

RESUME a suspended session (option on the DA panel).

QUIT the current session. Terminates the current session, discards all profile information associated with the session, and returns users immediately to the DA transaction. The DA transaction is logically the farthest point to which users can return within DAA (i.e., the starting point for DAA users). In effect, quit is a fast-path exit to the highest level, logically bypassing the intermediate exit points. Any intermediate LINKed transactions are exited.

QUIT a suspended session (option on the DA panel).

CREATE a new session.

The IET manages dialog flow for data input from a logical terminal for a suspended transaction that has been restarted by initializing the variables in the related transaction view. After receiving the data input from the stored profile view, it checks to see if the input from the user is formatted. The IET reads the profile view and generates a new profile view based on selected portions of the formatted data input. After converting the input from the input view and profile view, the IET interfaces with a resident data base management system to obtain the necessary views, maps, and procedures required to process the input. The system creates an output view, populating with selected portions of the processed data and results. The IET makes a profile view of the current state just completed and replaces the previous view stored in the ROLLFILE with the new profile view. The IET then transmits the output view, in the form of a message bearing a header with routing information to the appropriate logical terminal.

Transaction navigation within a session is based on a thread of LINKed transactions. Each transaction has an execution state which is retained on the profile data base. The first transaction within a thread is determined by the user when he starts the session. The creation of a new LINK in the thread of transactions is under program control. The same transaction can occur more than once within a session. The return from a link can be performed by the program or can be short-circuited by the user (the Exit or Cancel actions).

Figure 13:
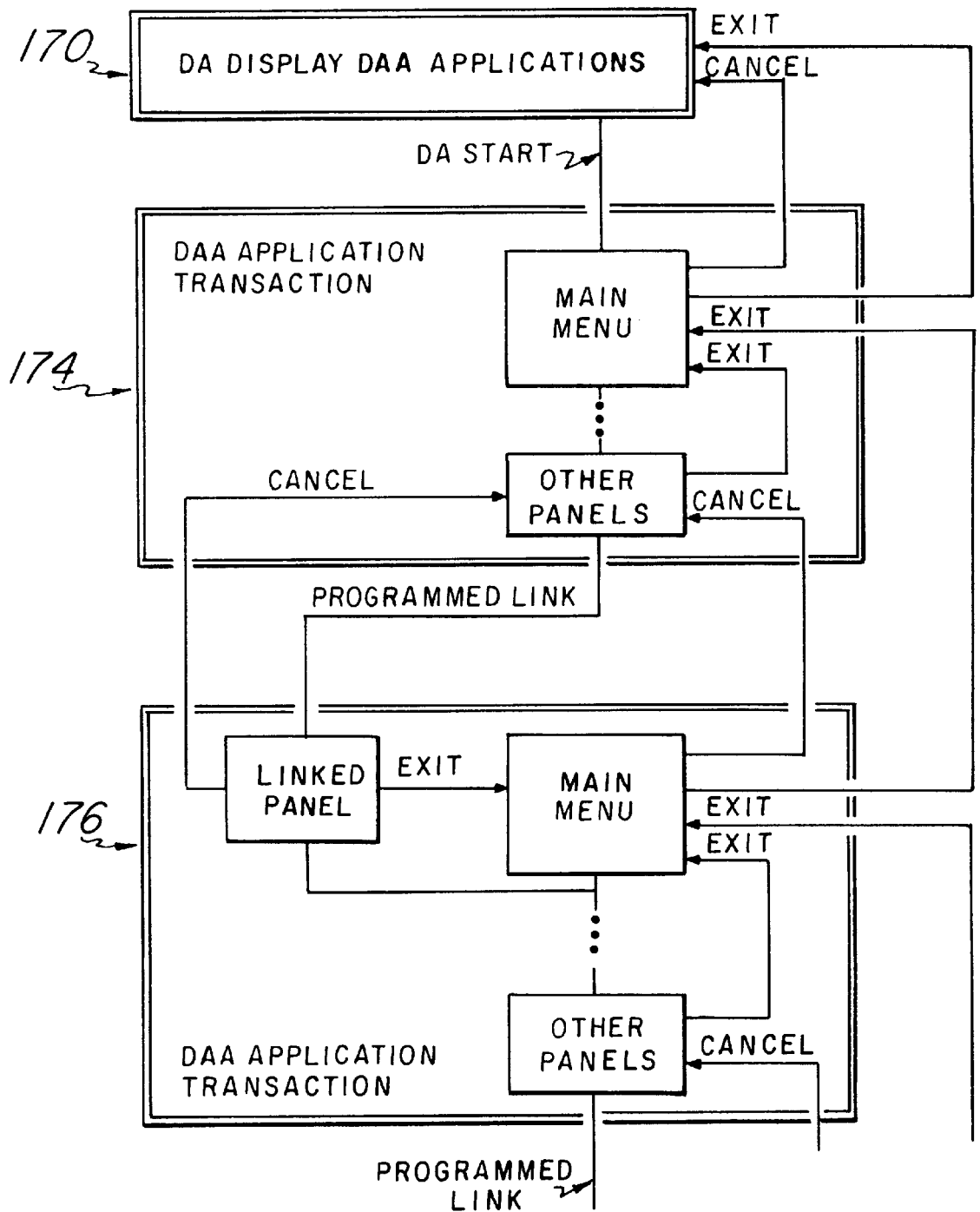
FIG. 13 is a block diagram showing possible navigation routes from transaction to transaction, for typical dialog according to the present invention.

The possible routes of navigation and destinations from transaction to transaction, for a typical dialog, are shown in FIG. 13. The various routes depicted in FIG. 13 emphasize navigation about the thread of LINKed transactions. As seen, DA display DAA applications 170 begins by linking to DAA application transaction 174 via transaction 174's main menu. From this menu, other panels can be invoked and this transaction (174) can be either canceled or exited. The other panels can be LINKed to the LINKed panel of DAA application transaction 176 or they can be exited to return to the main menu. The LINKed panel in transaction 176 may cancel transaction 176, at the user's request, or it may connect to the main menu of transaction 176. This main menu may in turn invoke other panels within transaction 176, can cancel transaction 176 to get back to the other panels of transaction 174, and can exit transaction 176 to return to the main menu of transaction 174. This pattern repeats for every transaction added onto the LINK thread.

Figure 14:
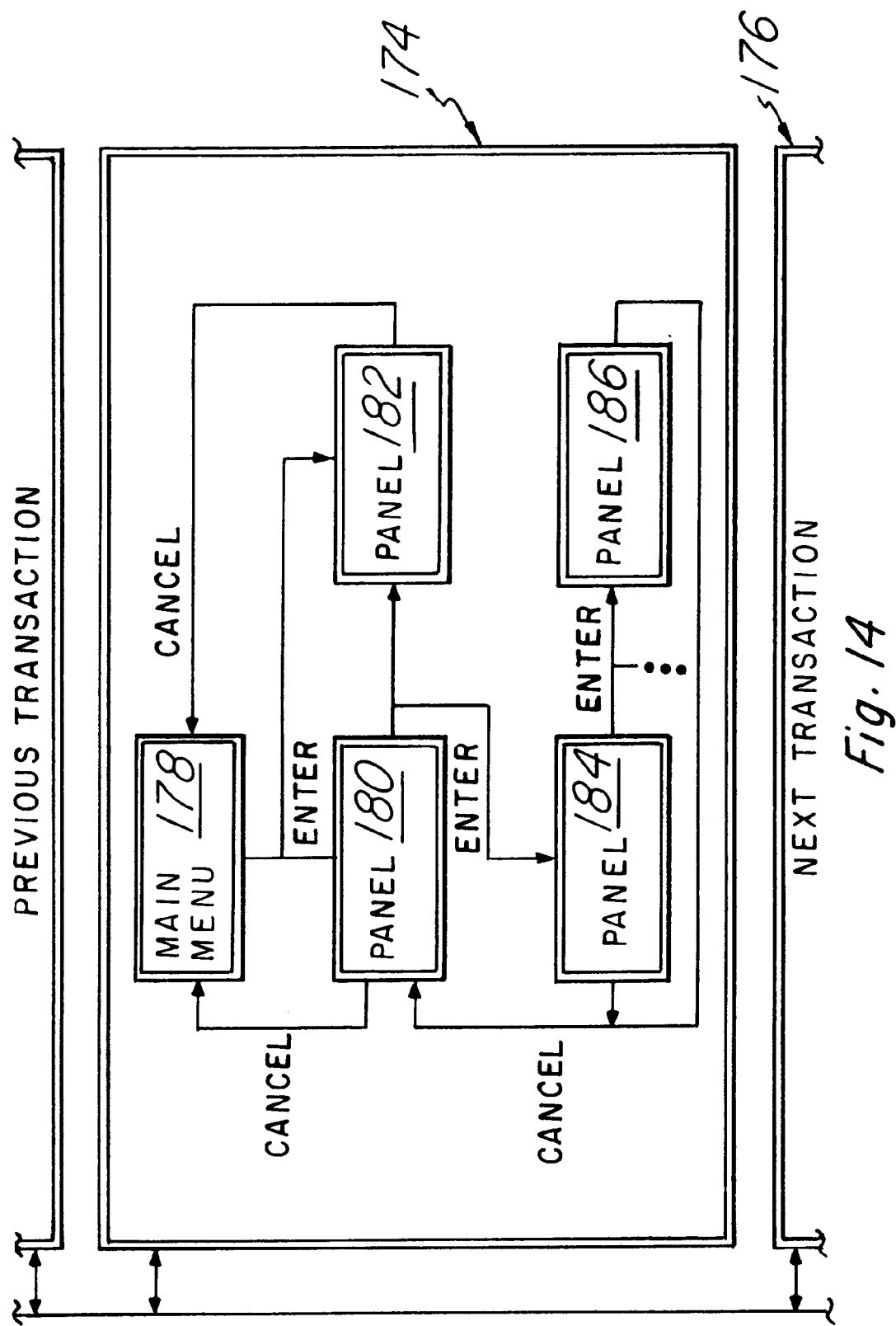
FIG. 14 is a block diagram showing possible navigation routes from panel to panel, for a typical dialog according to the present invention.

Within a transaction, there is a set of panels. The navigation through a sequence of panels is a function of the user interaction with transaction procedures. The possible routes of navigation and destinations from panel to panel, for a typical dialog, are shown in FIG. 14. The first panel executed within a transaction is either the main menu or the panel resulting from a LINKed procedure execution. Within FIG. 14, a closer look at the detail within an example current transaction 174 is depicted. Main menu 178 is interconnected with panels 180, 182. From main menu 178, panels 180, 182 may be entered. The navigation possibilities vary at panels 180, 182. From panel 180, for example, transaction may proceed to enter panel 182, enter panel 184, or cancel and return to main menu 178. Panel 182 may enter panel 184 or cancel and return to main menu 178. Panel 184 may enter panel 186 or cancel and return to panel 180. Panel 186, when completed, may only cancel and return to panel 180.

The actions users can perform with respect to panels are:

Go back one step (the Cancel action). This results in a refresh on the panel which is next higher in the hierarchy (e.g., panel shown immediately prior to the current panel). A Cancel issued from the main menu terminates the transaction.

The "Exit" action returns the user to the main menu for the current transaction. If the user is already in the main menu, and this transaction is LINKed, then a return is made to the main menu of the previous application transaction. If the user is already in the main menu, and this transaction is not LINKed, then exit to DA. Repeated exit requests allow users to step back through the application transaction by transaction, ultimately returning the dialog to the highest level in the hierarchy (the DA transaction).

Refresh action. When users request refresh, any data entered on the panel is ignored, and the refresh procedure is executed to generate the current status of data to be displayed on the panel. Example of application which might require "refresh" is a directory list.

"Help" action. When users request help, a help panel is displayed to assist users to complete the dialog. The help action triggers a help dialog, which is controlled entirely by IET and is further described in a subsequent section.

Proceed one step (the Enter action).

When users are finished interacting with a panel, it is submitted to the application with a specific action request. The action request can be either the enter action or other action which is not otherwise defined as a dialog control function managed by IET. Examples of how action requests are generated include the use of function keys for non-programmable terminals or mouse selection of action items in action bar pull downs on an intelligent work station.

The action request results in the execution of the panel's input procedure. By convention, the input procedure has logic which results in a different panel being displayed, or the same panel with significant data content changes. The application controls the hierarchical level of the panel from the "input" procedure. The input procedure can declare the relative hierarchical level of the next panel displayed, such as 1, 0, −1, or −2.

"1" means increment current level by one. The profile view associated with the input procedure is pushed on the session's profile stack, effectively saving the state of the panel as entered by the user. The profile view associated with the output procedure will be placed on the profile stack after the view just saved. This option is always used for the transaction menu hierarchy.

0 indicates the current level is not to be modified. Next panel is displayed at the same level of the hierarchy. This is the default for application panels.

−1 decrements the current level by one. A profile view is popped off the session's profile stack, recovering a panel and view as entered by the user. If there are no views on the stack for this transaction, then a RETURN is executed (with a completion code of "cancel"). This is the enforced action taken on a "Cancel".

−2 removes all saved views which are on the profile stack for this transaction and forces execution of the main menu.

"Help" for an application can be invoked at any time. Once invoked, the current state of the "Primary Panel" dialog is saved and a user dialog is initiated which is entirely under control of IET. When the user dialog is complete, control is returned to the state at which the "Primary Panel" dialog was interrupted.

Each data entry or selection field on any panel can have an associated "help" panel. Additionally, the panel itself has a "help" panel. Invoking "help" from the primary panel results in field-level help, if available, otherwise panel-level help (otherwise, help on the help system). Once within help, there is a defined set of help actions (e.g., function keys) which provide additional information about application keys, index to help documentation, (glossary) help on "selection"-type fields within the help panel, etc.

Information displayed within help panels are obtained from a documentation system. The documentation system organizes indexes documents by report.generation.chapter-.section.page. The following conventions are used to assign document sections to help functions:

REPORT.GENERATION. For a given combination of national language and transaction, there is a single "report-.generation" which includes all application help information. Help functions may also invoke the general DAA help information, which is located on report=DAAHELP; generation=(language code).

SECTION. For panel help information, the section named "SOO" is reserved for extended help information (general information about the panel). All other sections are the name of a data entry "field" or a choice field mnemonic appearing on the panel.

CHAPTER. The chapter named "GLOSSARY" is reserved for the following help functions:

KEYS. This is a section which describes each key used by the application and its function. The listing does not have to indicate which keys are valid in the current state of the application.

CONTENTS. This is a section which is also a table of contents of help information, organized by topic.

HELP. (Only on DAAHELP). Contains "Help on Help" information.

The chapter named "MESSAGE" is reserved for help on error messages (i.e., detailed description of each message generated by the application procedures). The sections within the chapter correspond to the message identifier code.

All other chapters are the same as panel names and contain information specific to panels. The help panels themselves are documented on DAAHELP.

Help is available at all times. Availability of help information for every application panel is validated, by GTD, when the transaction is built.

Within the help dialog, every help panel (with the exception of Extended Help panels) provide function key access to Extended Help. The title of help panels contain the word "Help" and identify the panel or field to which it applies.

The invocation of help is transparent to the application procedure and does not interfere with the current dialog. Data that user had entered before requesting help is saved in the user's profile.

The types of help panels are:

HELP. The Help action provides contextual help about a specific field, a panel, or about the help facility. Field help is provided if the cursor is on an entry field or a menu choice filed. Panel help is provided (known as "extended help") if the cursor is not on an entry field nor a menu choice field. Panel help is also provided if field help is not defined for the field. Help facility help is provided which HELP is requested from a help panel. The help facility help is also provided if the panel help is not defined.

EXTENDED HELP. When users request EXTENDED HELP, a help panel appears containing information about the current panel rather than a particular element on the panel. The EXTENDED HELP action option appears only in help panels.

HELP CONTENTS. When users request help contents, a table of contents appears, organized by topic, of all the help information in the application. The HELP CONTENTS action option appears only in help panels.

HELP INDEX. When users request help index, an index of the help information appears. The help index action option appears only in help panels. The HELP INDEX is in the form of a menu of options which provide the user access to the sections of help.

KEYS HELP. When users request keys help, a list appears containing the names and functions of all keys used by the application. They keys help action option appears only in help panels.

ENDING HELP. Users end help by requesting Exit or by repeatedly requesting Cancel to back out of any help panel.

While users are navigating through sessions, transactions, and panels, information is retained in the profile data base. The application determines how much information is actually retained (i.e., the profile view) on the profile data base. The application also determines, within a transaction, the hierarchical relationship between panels within a dialog, and consequently the flexibility of the user to navigate between panels within a transaction.

Once a panel is canceled, a transaction exited, or a session quit, the information is not available. Alternatively, the "suspend" exit can be used to save the current information/ state of a session, which enables reactivation of the session, without data loss, at any later time.

A consistent user interface implementation on DAA is enabled from definitions made by the application designer using GTD. GTD provides the designer with options to define panels and implicitly define dialogs. At execution time the dialog management function (IET, TMS, etc.), which is isolated from the application code, implements user-driven navigation actions, ensuring a consistent user interface across all DAA applications.

COOPERATIVE PROCESSING. Explicit cooperative processing between DAA application procedure is implemented via "LINK"/"RETURN". The mechanics of LINK/ RETURN, as well as support of generalized terminal/ transaction data interchange, is provided by Distributed Resource Control services within DAA.

Any DAA procedure can execute any other DAA procedure. The mechanism for executing a DAA procedure is the same whether it is packaged in the same transaction or a different transaction, located on the same or different system, located on the same or architecturally different type of processor, or located on the same type of transaction processing monitor or a different (DAA supported) transaction processing monitor.

The system requires that the developer has defined a unique system.transaction.procedure name for both the called and the calling procedures. This enables the system to accurately deliver any messages between various machines. After saving a current state of a calling procedure as a profile view, and storing it in a profile data base, the IET extracts data items from the calling transaction view and places them in an input view to be shipped to the called procedure. The IET packages these data items, together with the unique called procedure's name and the unique calling procedure's name and sends the packet to the called procedure. At the called procedure, the IET loads the called procedure's profile view and the input view received from the calling procedure. The called procedure executes the requested procedure. The IET then extracts the data items from the called transaction view and places them in an output view to be returned to the calling procedure. The IET packages these data items, together with the unique called procedure's name and the unique calling procedure's name and returns the packet to the calling procedure. The IET at the calling procedure extracts the profile view stored in the profile data base and loads it, together with the returned output view into the calling procedure's transaction view. At this point the procedure is restarted for further processing.

The specification for remote procedure execution is made as follows:

Application procedure includes logic to set "exit state".

Dialog flow specification. As a function of "exit state", defines a flow to a procedure. The flow can be a LINK, XFER, or SPAWN.

This structured approach to specification of procedure execution is intended to isolate the application logic as much as possible from the mechanics of dialog flow.

There are situations in which it is necessary to selectively execute a specific procedure on one of many systems. The logic required to make the determination of which system should be used to execute a procedure is application-dependent. The application has two system variables which it can use to set the system/transaction for a procedure: NSYSTEM (next system) and NTRAN (next transaction).

Dialog flow is controlled by commands which may originate from the application procedure (as exit states) or from the user. User commands are entered via action requests (e.g., function keys, action bar-pull down choice selections, or commands entered in the command area). Most user commands are processed directly by IET, as defined in the section on "consistent user interface".

The following commands may originate from the application procedure:

LINK. This command saves the current state of the procedure just completed on the profile stack and executes an application procedure which may be in the same or a different transaction, located on the same or different system. The next procedure to be executed is specified in the working storage data item "NPROC"; the next transaction is in "NTRAN"; and the next system is in "NSYSTEM". The value of the system and transaction data items are interpreted according to the rules for DRC (Distributed Resource Control). The next procedure is passed information via an IMPORT view. The LINK process is described more completely later.

RETURN. This command restores, from the user/session profile, the previous state of the DAA session thread, returning control to an application procedure which previously requested a "LINK". The procedure to which control is being returned is passed information via an export view.

XFER. This command transfers control to another application procedure. The specification of procedure is the same as for LINK. Unlike LINK, which results in "stacking" the profile view (and information/input views), the XFER command results in discarding the entire stack prior to executing the procedure. Consequently, the new procedure is at the top of the stack. XFER is similar in effect to an "Exit_ application" followed by a LINK, with the additional feature that a view is communicated to the new procedure. A RETURN from the new procedure results in returning control to the Session Manager.

(blank). This is the default exit state. It results in the display of the panel associated with the procedure.

Figure 15:
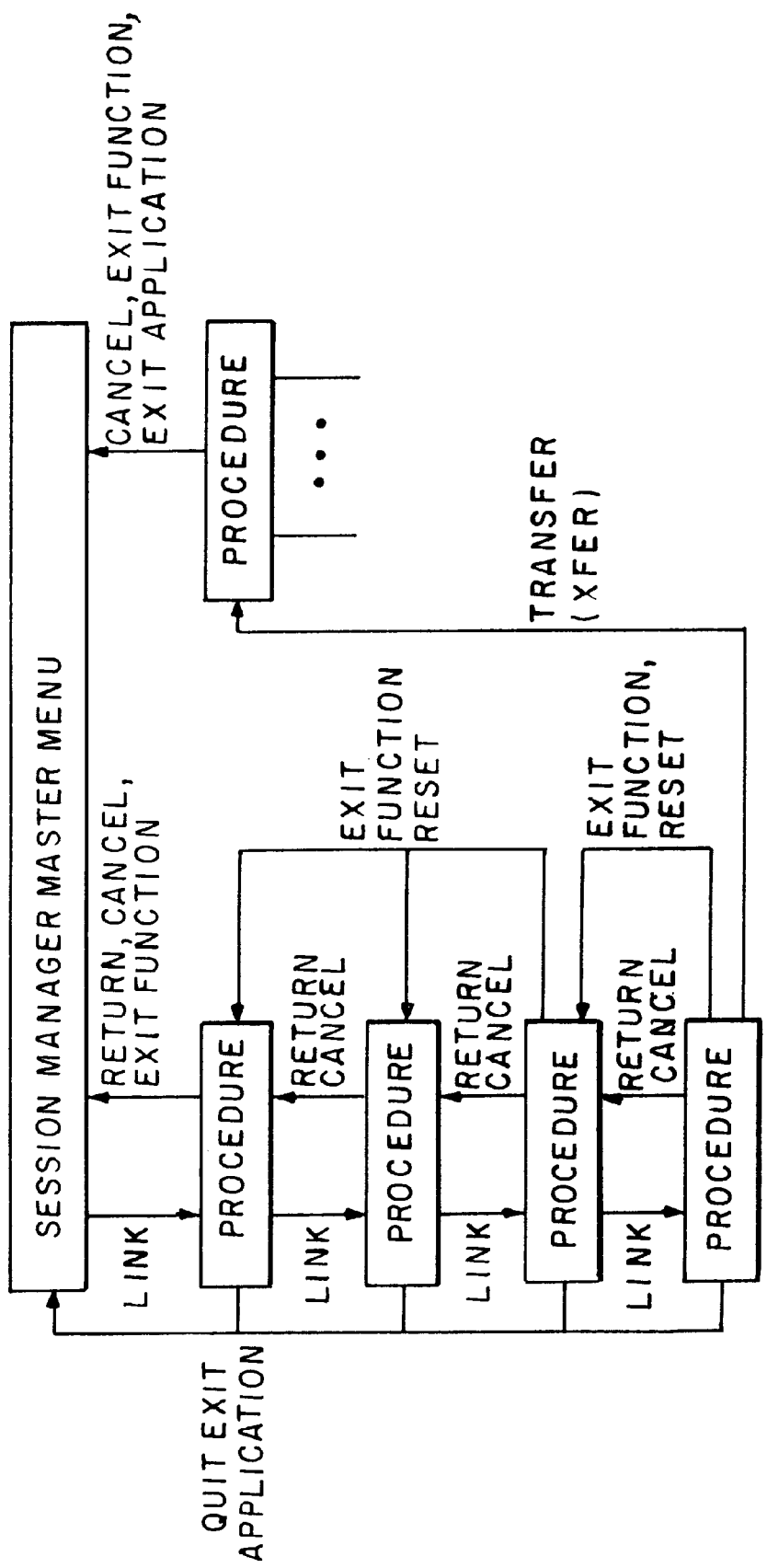
FIG. 15 is a block diagram depicting an example of DAA dialog flow, according to the preferred embodiment of the present invention, combining consistent user interface definitions with programmable dialog flow commands.

FIG. 15 shows a model for DAA dialog flow. The model combines "consistent user interface" definitions with programmable dialog flow commands, and is self-explanatory.

At execution time, an application procedure sets an exit state which is interpreted by IET as a dialog flow request. The dialog flow may specify a LINK to a specific PROCEDURE (optionally qualified by transaction and system). The "to" procedure of the flow has associated with it an external import and export view.

Figure 16:
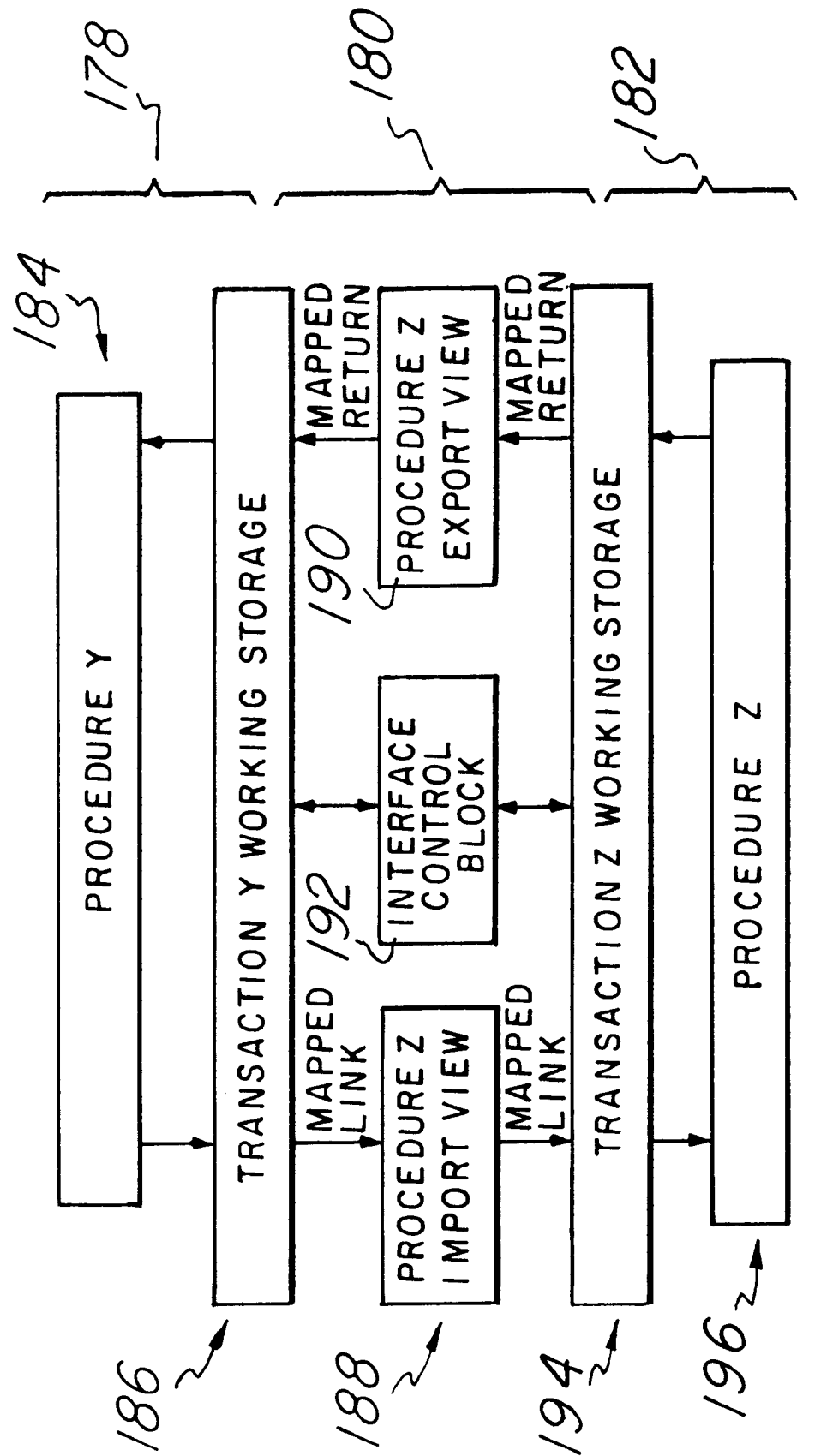
FIG. 16 is a block diagram depicting remote procedure execution/data flow, according to the present invention.

The relationships between DAA application procedures, working storage, import views, and export views are shown in FIG. 16. Procedure Y 184 will be a part of the transaction requesting procedure Z 196 to be executed using data from procedure Y 184. The portions of FIG. 16 designated 178, 182 are under application control, albeit possibly separate applications. The middle portion, 180, is under IET (part of preferred embodiment of the present invention, DAA) control.

Initially transaction Y's working storage 186 is mapped to procedure Z's import view 188. The import view 188 is then sent to the IET in the "to" load module (not specifically shown) containing procedure Z 196. IET, in this module, maps the import view 188 into the transaction Z working storage 194. At this point, procedure Z 196 is executed. Procedure Z 196 may call upon other procedures and/or interactions with other entities (such as the originating terminal) before requesting a RETURN. IET, in the load module maps transaction Z's working storage 194 into procedure Z's export view 190. Next, the export view 190 is sent to IET in the "from" load module (also not specifically shown). IET, in this load module, then maps the export view 190 into transaction Y's working storage 186. Lastly procedure Y 184 is executed.

Communications between transactions consist of messages having the following information: transaction identifier, interface control block, and a view.

The usual transaction identifiers are:

command—This data item indicates, generically, what type of message is being received. It may have one of the following values:

=IETCONT. Indicates that this is a DAA transaction communications control function. This function can not be entered manually, it can only be created as a result of an application procedure (or IET) requesting a LINK, XFER, RETURN, or SPAWN.

=RESET. Indicates that the "consistent user interface" RESET function is to be performed for the indicated transaction. This command may be entered manually. Any data following the command is ignored.

=QUIT. Indicates that the "consistent" user interface QUIT function is to be performed for the indicated transaction. This command may be entered manually. Any data following the command is ignored.

Any other value for the command data item causes a message interpretation to be attempted as if the message had originated from a terminal.

The interface control block is a fixed structure, the same for all DAA transactions. Within the interface control block, the parameter IETICC is for dialog control and may assume one of the following values:

&LINK&# LINK command.

&RETN&# RETURN command.

&XFER&# XFER command.

The view contained in the inter-transactional communication is an import view if the command is LINK, XFER, or SPAWN, or is an export view if the command is RETURN.

DISTRIBUTED RESOURCE CONTROL. DRC generalizes the concept of resources and uses an architecture (SNADS) which defines use of defaults and redirecting to avoid the necessity of universal distribution. In general, the DRC local data bases are for local use only and do not require any data exchange with other systems.

The "learning" function of the DRC View Distribution Service (view server) makes adjustments, as necessary, to references of external resources in order to optimize use of the communications system.

A DAA resource is an addressable entity which can originate or receive information distributions. Examples of resources include terminals and transactions.

Entities may be defined for the purpose of normalizing resource definitions. An example of this type of entity is DEVICE, which is used to normalize the TERMINAL resource. The entity DEVICE is defined as a resource, even though it is not used as a distribution originator or receiver.

DAA addresses resources with a combination of system identifier and resource identifier. The set of all systems and resources within systems is termed the DAA environment. Each unique instance of a DAA environment has an identifier (DAA_id).

DAA resources are distributed across a heterogeneous mixture of systems, network services, terminal/device types, applications, operating systems, transaction management systems, and CPUs. The following section describes how DAA manages its resources within its environment.

A system is used to identify the location of resources. A system has the following characteristics: a homogeneous application processing environment, and an uniquely identified node within an SNA network.

In particular, a system has a single, uniquely identified, transaction processing monitor (e.g., IMS, Tuxedo). The system may consist of multiple CPUs and/or operating systems (if the transaction processing monitor supports it). There may be more than one system on a CPU. The system must be uniquely identifiable on the SNA network for a specific DAA environment.

Resources exist within the context of a system. Within a system, resources must be uniquely identified (even if they are different types, such as transactions and terminals). The resource type is an attribute of local resources (i.e., not part of the unique identifier/address of the resource).

Resources (e.g., terminals and transactions) within DAA are addressed by the combination of system and resource-within-system. If the system portion of the resource address is specified, a distribution to the resource uses "directed" routing. If the system portion is not specified, then the system is defaulted according to rules for "undirected" routings.

Resource identifiers may be reused on other systems for different resource instances, including different resource types. For this reason, it is recommended that directed routing (i.e., inclusion of system_id) be used, where possible, for information distributions.

A transaction is the controlled use of a collection of resources to perform a business application function. The integrity of resources (e.g., data bases) are maintained per logical transaction. In DAA, a logical transaction must be contained within a single execution of a physical DAA transaction on a single system.

Transactions can remotely execute other transaction/procedures. Data exchange with the remotely executed transaction is defined via input/output views. A transaction procedure specifies remote procedure execution via a LINK command, passing an INPUT view. When the remote procedure is complete, it performs a RETURN command, passing an OUTPUT view back to the originating transaction.

Transactions must have a unique resource identifier within a system. The same transaction resource id can be used for different purposes on a different system. Therefore, it is recommended that references to transactions on remote systems include the remote system identifier.

Transactions are resources which are tightly controlled and totally integrated into the DAA environment. Utilities (GTD) exist for automating the construction of transactions. A runtime environment envelops the application transaction, providing DAA services transparent to the application code.

A terminal is a collection of resources which are used to interface to a user. A terminal normally consists of a VDU output device, and some combination of keyboard/program/voice/bar code/mouse input. Other terminal configurations are possible.

Communications with a terminal is via 3270 data stream protocol, which supports a wide variety of output and input devices. Each device supported has a set of functional characteristics which represent a subset of the total 3270 data stream protocol. In order to assure meaningful output to a given device, the 3270 data stream generator (TMS) must know the generic device type of the terminal.

Like transactions, a terminal must have a unique resource identifier within a system. A terminal resource identifier can be re-used on a different system. It is recommended that remote terminals be identified using both system id and terminal id.

In order to normalize the definition of TERMINAL resources, an entity type DEVICE has been established which contains the device attributes related to a given terminal. The DEVICE—TERMINAL relationship can be pictured as:

Communication networks are not a (visible) component of DAA. The mechanics of network operation is totally transparent to DAA applications. A multi-system DAA application may associate system identifiers with remote transactions, but does not need to comprehend the path between a local system and remote system. All terminal interface functions are handled by TMS/IET (transparent to DAA application procedures), which comprehends terminal device types and system location.

The data exchange between SYSTEMs within a DAA environment is implemented utilizing System Network Architecture Distribution Services (SNADS).

The communications system capabilities implemented within SNADS and other DRC components include:

(Dynamic) path determination and optimization.

Store and forward queues at intermediate nodes.

(Automated) maintenance and distribution of topology data bases.

Data exchange based on SYSTEM identifier only (i.e., no knowledge required of intermediate nodes).

Self-learning for routing to "new" systems and resources.

Notification to requester if request not completed.

The DRC communications system does not require any information from the application other than system_id (which is optional) and resource element id.

The local data base maintenance requirements are minimized through use of defaults and automated "learning". Extensive administrative functions are available to track data distributions and disposition unserviced distribution requests.

DAA will dynamically update resource routing tables to correct or resolve "Destination Service Units" for any given resource. This function is built into the DRC View Distribution Service.

Figure 17:
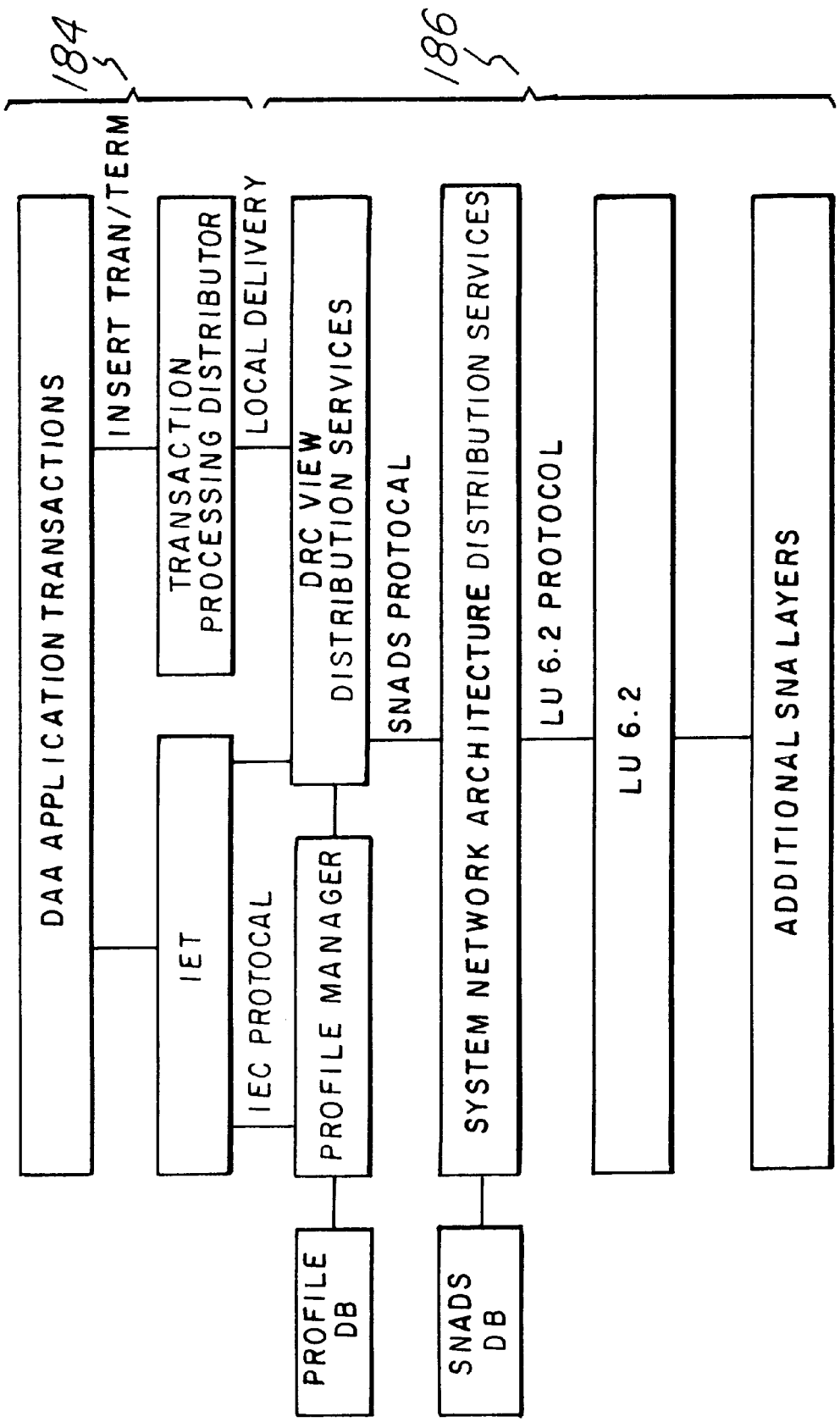
FIG. 17 is a block diagram showing the inter-relationships between various components used to implement distributed resource control according to the preferred embodiment of the present invention.

The preferred embodiment of the inter-relationships between various components used to implement DRC according to the present invention are shown in FIG. 17. The portion of FIG. 17 designated 184 is located in transaction processing address space and that portion designated 186 resides in IEC address space. As can be seen the DRC View Distribution Services (or view server for short) interfaces between the defined SNADS protocol boundary and a DAA transaction represented by IET.

Figure 18:
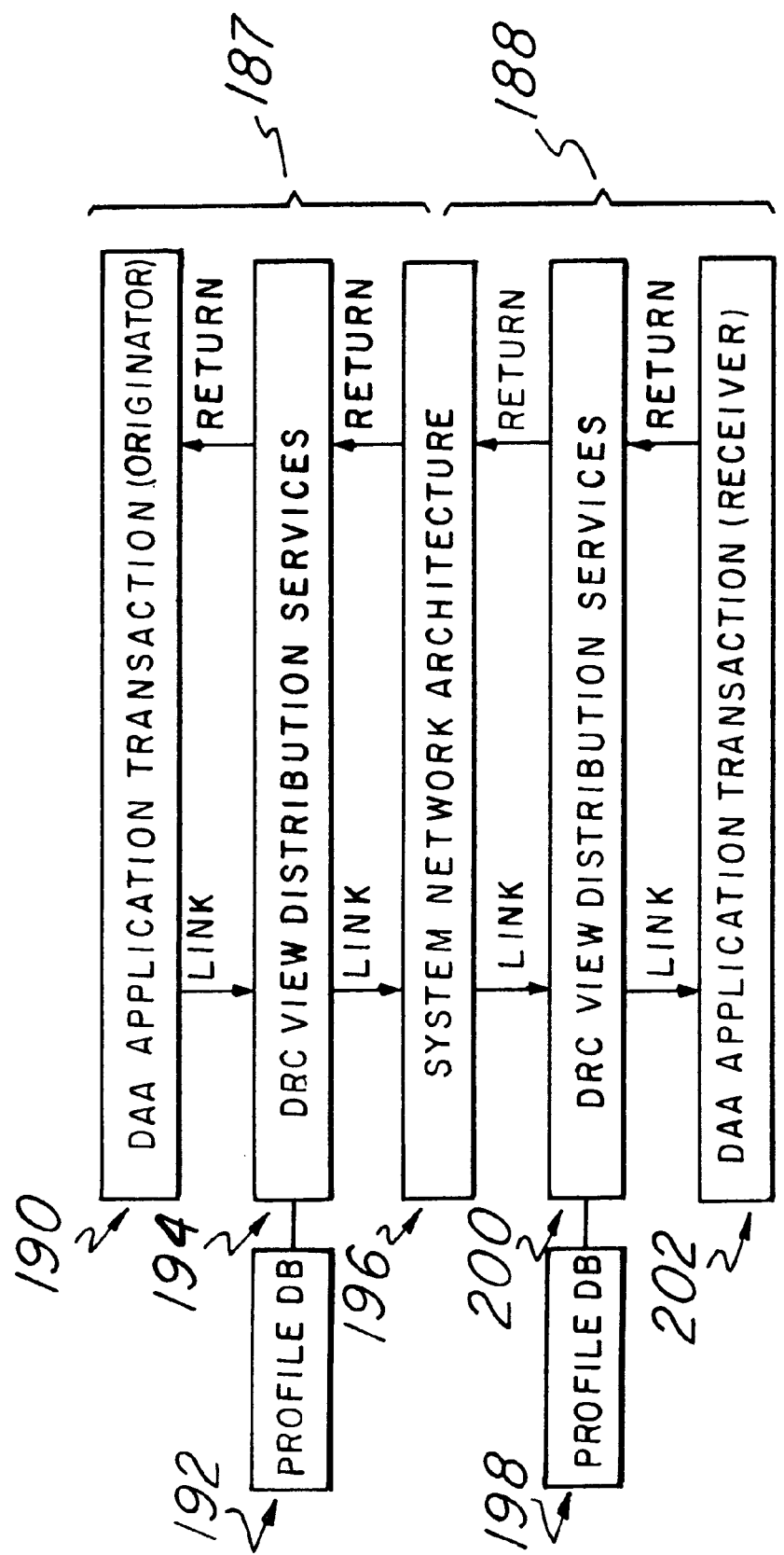
FIG. 18 is a block diagram demonstrating the logical flow of control and data associated with the LINK/RETURN implementation between transactions according to the preferred embodiment of the present invention.

Data exchange between transactions is driven by LINK and RETURN commands issued by DAA application transactions. The logical flow of control and data associated with the LINK/RETURN implementation is shown in FIG. 18. The following paragraphs outline the rolls of distribution between application transaction originator 190 of originating system 187 and application transaction receiver 202 of receiving system 188.

An application procedure within a transaction 190 initiates a data exchange with a remote transaction 202 by issuing a LINK command and specifying an INPUT view (not shown) which is to be communicated to a remote SYSTEM/TRANSACTION 88. IET (in the transaction address space) saves the INPUT view (and, transparent to application, an INTERFACE view) on the transaction PROFILE data base. The view on this PROFILE data base is referenced as a view relative to top of stack for a particular combination of USER and APPLICATION. IET initiates the distribution of the views by passing the LINK command to the VIEW server 194 (along with the User and Application identifiers).

The VIEW server 194 accepts the LINK command, along with its parameters, and processes the request asynchronusly to IET (which exits). The VIEW server 194 uses the PROFILE DB 192 as the "queue" of data which is to be sent via SNADS. SNADS operates as an intermediate system routing. In the profile VIEW (not shown) is an identification of destination system 188. Based on the strategy defined within SNADS 196, the distribution (view) is sent to the destination system 188. If the remote transaction execution completes successfully, a returned OUTPUT VIEW will (eventually) be received. The VIEW server 194 receives the VIEW, puts the VIEW to the PROFILE DB 192, and queues the TRANSACTION to run under the local transaction processing monitor.

The VIEW size is restricted only by the VIEW size allowed on the PROFILE DB 192 (2 gigabyte). The application is not required to block/de-block data exchanges having large byte counts. Furthermore, there is only one TRANSACTION execution per logical data exchange.

The view server 200 (on the destination system) receives the INPUT VIEW (also not shown), puts it immediately on the PROFILE DB 198, and queues the TRANSACTION to run under the local transaction processing monitor. The TP Distributor serves as the interface between DRCVDS 200 (view distribution service) and the Transaction Processing Monitor. In the case of IMS, this program is a continuously running BMP. In the case of a UNIX TP, the TP Distributor is a function embedded in DRCVDS. If TRANSACTION does not exits, then a return OUTPUT view is constructed with suitable completion codes and sent back to the application transaction originator 190.

Non-existent remote resources, and other types of distribution errors, are reported from either the remote VIEW server 200 or SNADS 196. The local VIEW server 194 will receive these distribution exceptions and propagate them to the distribution originator 190 (i.e., a DAA transaction). The results of completed remote transaction 202 may be returned, when view server 200 accepts a RETURN command, along with its parameters, and the whole previous process reverses. The OUTPUT VIEW travels back to SNADS 196 routed for system 187. View server 194 receives the VIEW, puts it into the PROFILE DB 192, and queues the TRANSACTION to run locally.

All local terminals on a system are identified as resources. Each terminal has a specific set of device characteristics. These device characteristics are required by TMS in order to properly construct 3270 data streams destined for the terminal. Unless the terminal is local, the device characteristics are not available through the local resource directory. Support of remote terminals is further complicated by the inability of a transaction processing monitor to route data to terminals outside of its environment.

Figure 19:
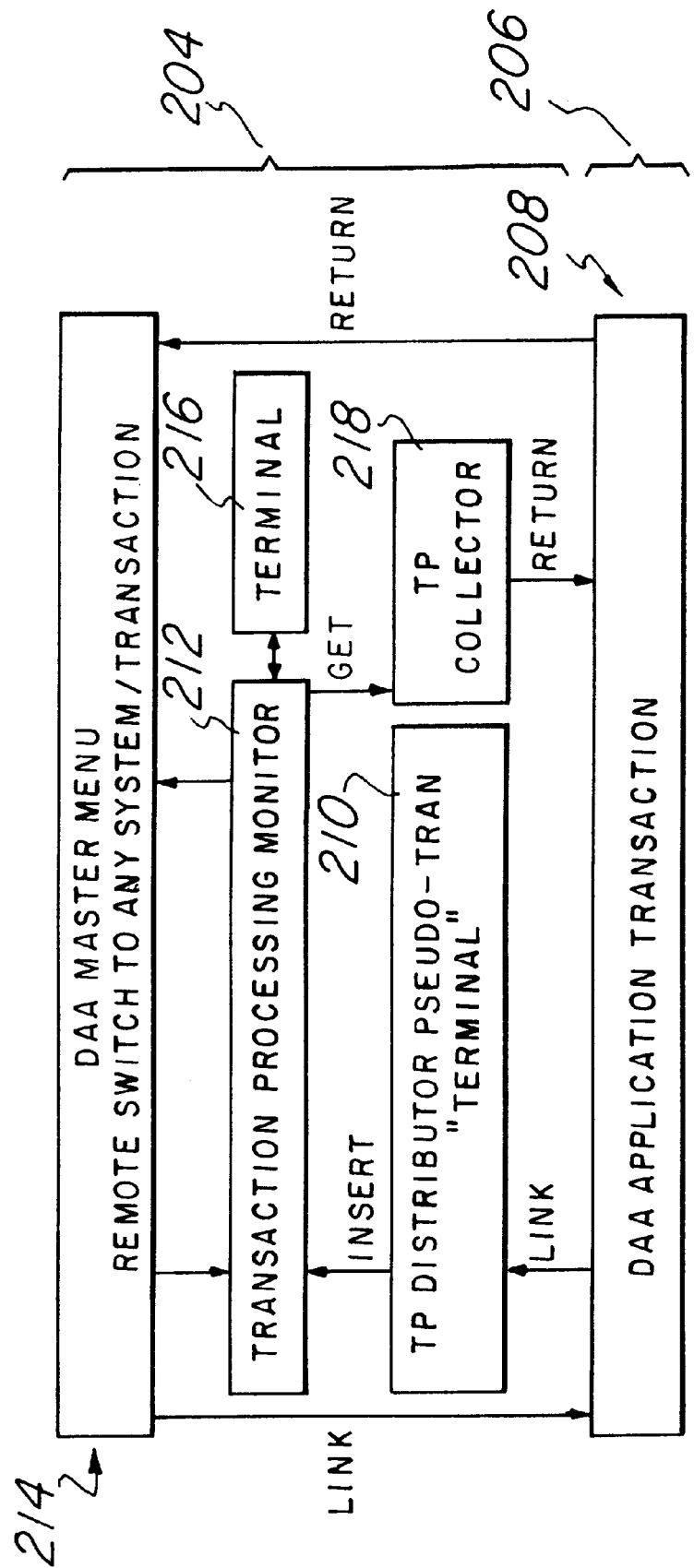
FIG. 19 is a block diagram depicting the logical flow of control and data associated with data interchange between terminals and transactions according to the preferred embodiment of the present invention.
Figure 20A:
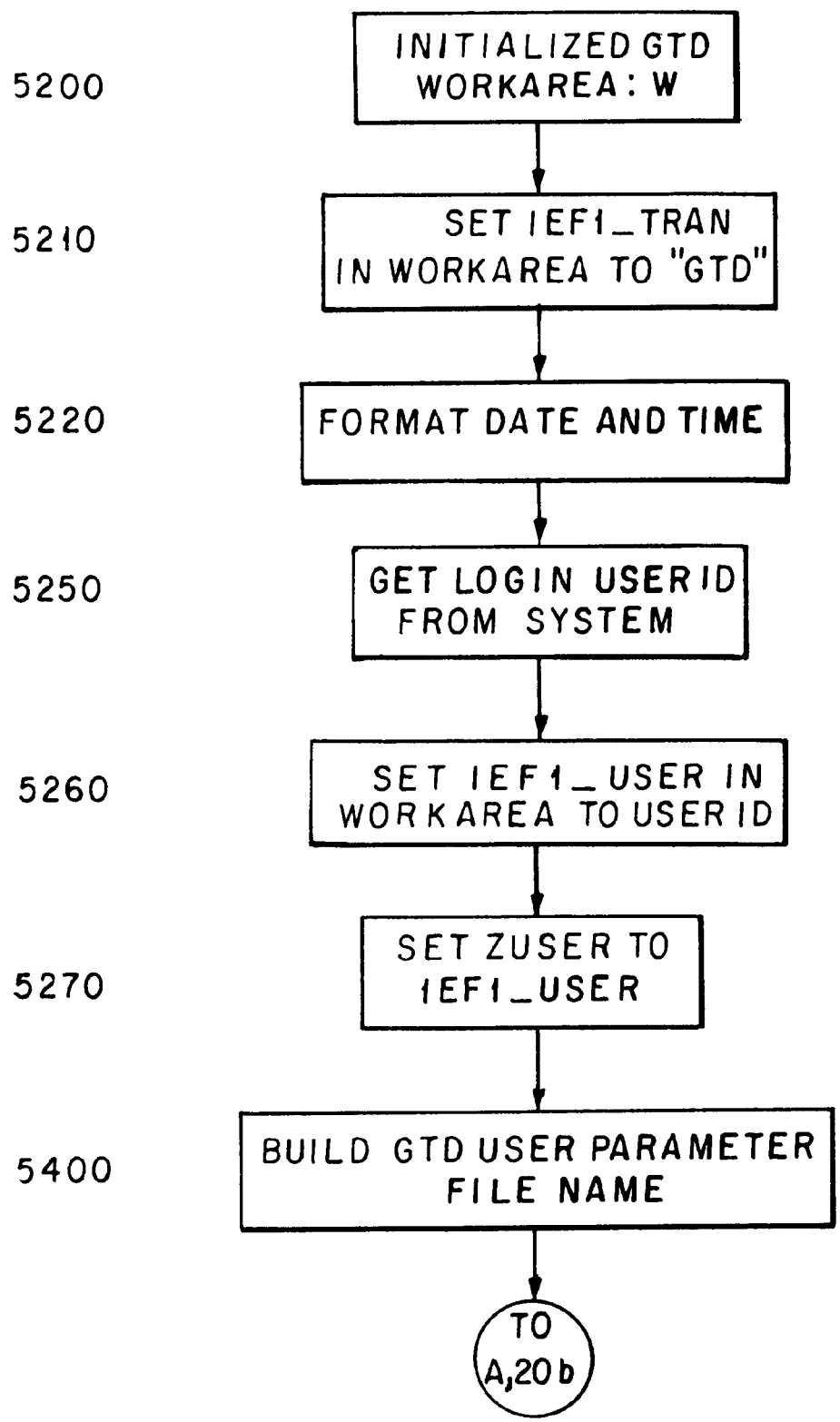
FIGS. 20a–f are a flow chart detailing the functions performed by the GTD at the highest menu level, according to the preferred embodiment of the present invention.
Figure 20B:
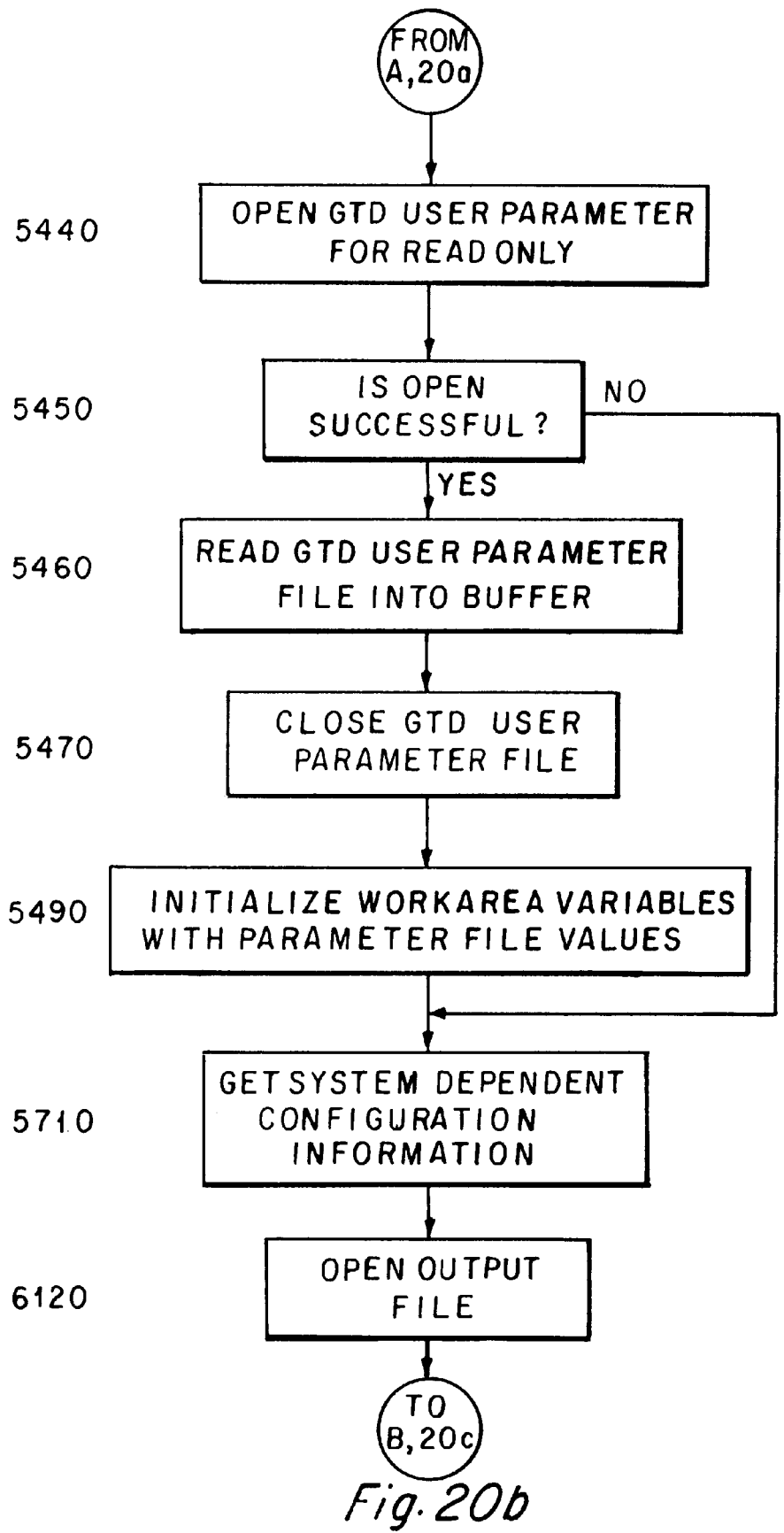
Figure 20C:
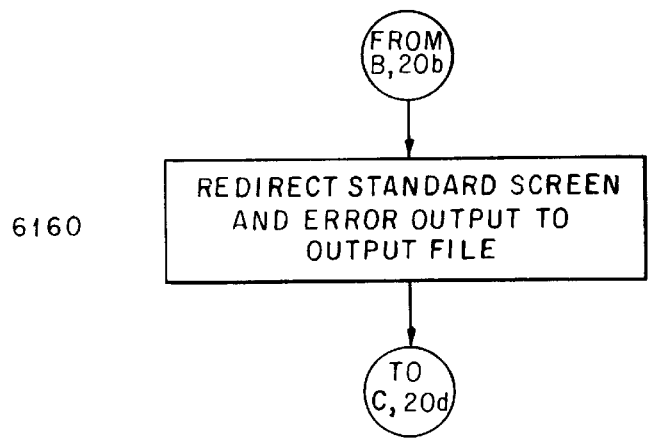
Figure 20D:
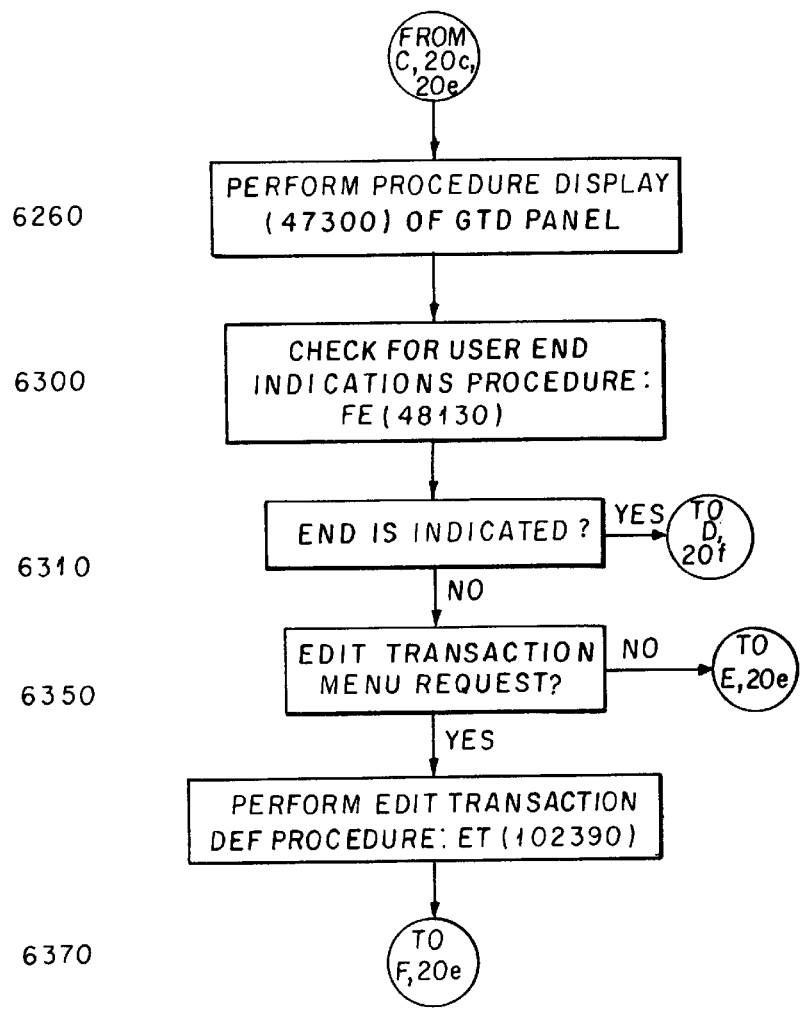
Figure 20E:
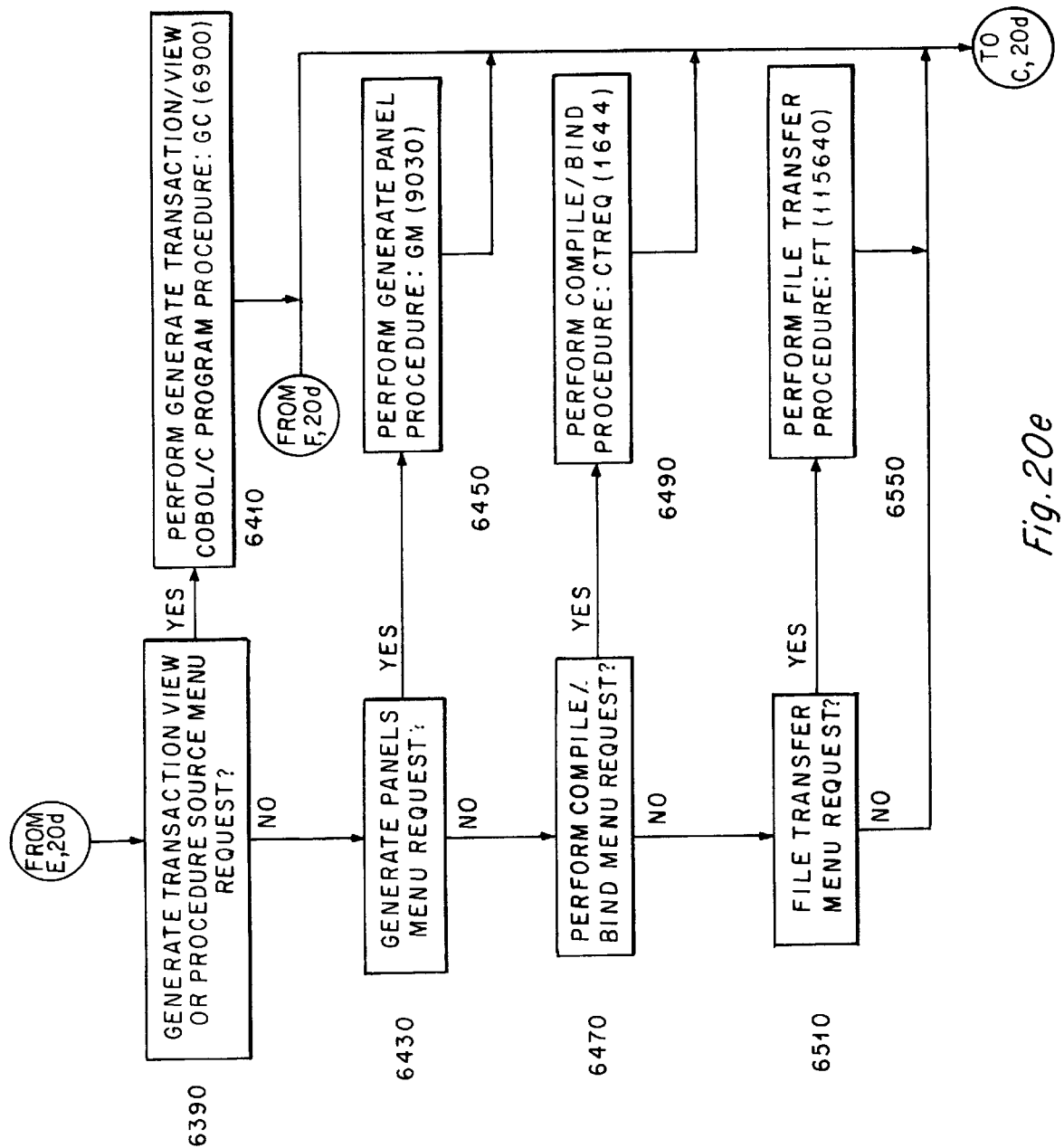
Figure 20F:
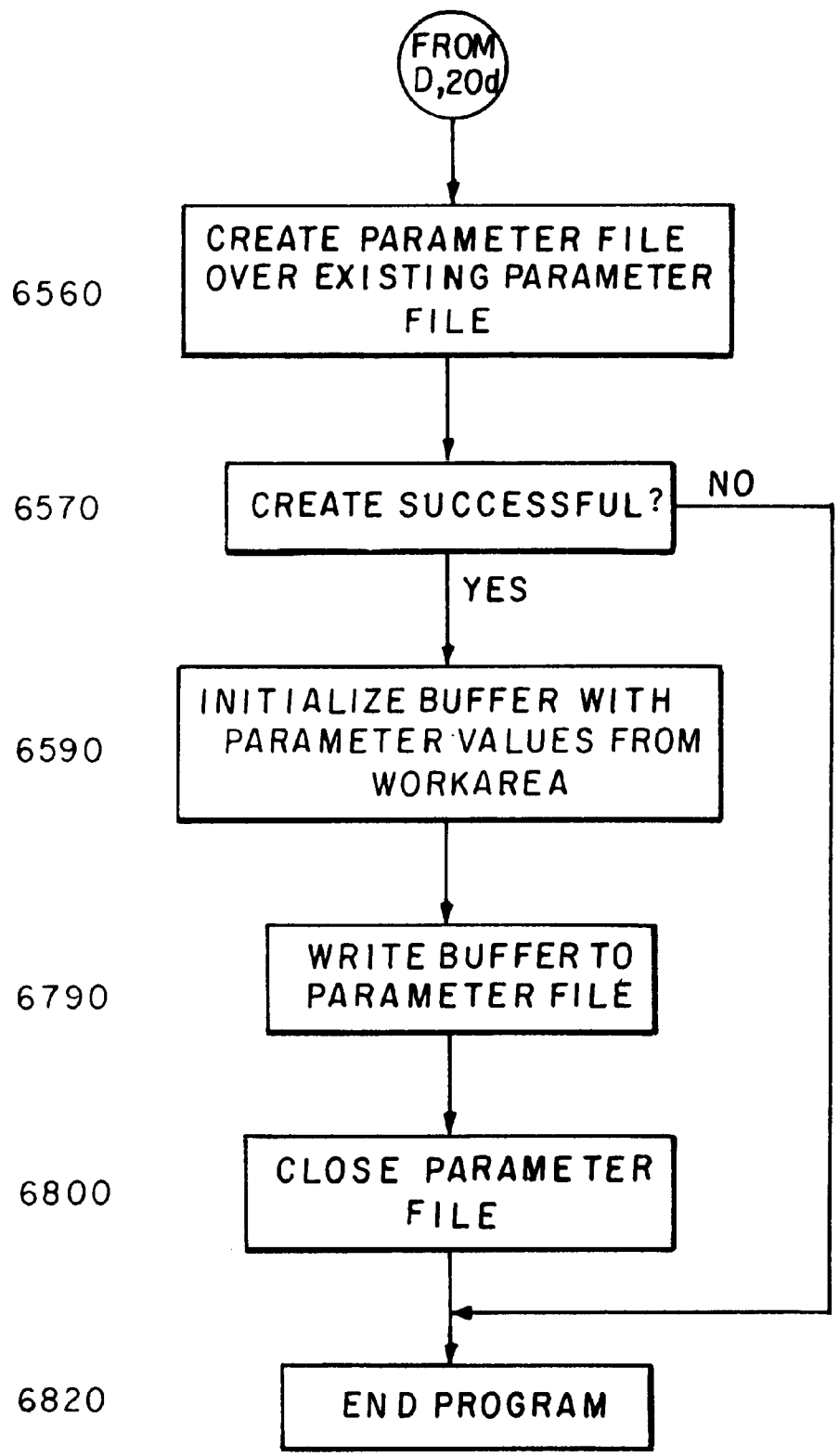

The logical flow of control and at associated with data interchange between terminals and transactions are shown in FIG. 19. A terminal first converses with a DAA transaction 208 on the local system. If this transaction performs a LINK, the terminal device attributes are passed to the remote system along with the user-specified INPUT view. When the remote transaction requests distribution of a 3270 data stream to the terminal, DAA master menu remote switch recognizes that it is a non-local terminal and issues a LINK to the DAA pseudo-transaction "TERMINAL" 210 (which is implemented within the TP Distributor program).

The TP Distributor 210 receives the 3270 data stream (as its INPUT view) and forwards it through the local transaction processing monitor 212 to the terminal 216. Data entry from the terminal 216 is routed through TP Collector 218

(which may require a/SET TRAN on IMS). The TP Collector 218 passes the 3270 data stream through (via RETURN) to the remote transaction. It is transparent to the DAA application whether the terminal 216 is local or remote.

If the remote transaction issues further LINKs, the terminal attributes are forwarded to the next (nested) DAA transaction. Multiple RETURN will ultimately RETURN to the terminal's owning system.

Part of the interface view associated with the LINK contains the TERMINAL id, the terminal's SYSTEM id, and the terminal's generic device type. This information is used in any LINKed transaction, and will be propagated to other LINKed transactions. In DAA, only local transactions can be executed without a LINK. Local transactions obtain terminal characteristics directly from the local resources directory (SNADS data base).

TRANSACTIONs send data to terminals via the VIEW server. A transaction generates arbitrary length 3270 data streams using TMS (and GDDM). These data streams are queued to the PROFILE data base. A request from the transaction to the view server initiates the transfer to queued 3270 data streams to a TERMINAL. If the terminal is local, the data stream is inserted directly to the local transaction processing monitor. In all other cases, the queued 3270 data stream is transmitted to a view server at a remote system. The mechanism is identical to the processing of INPUT/OUTPUT views, but the INTERFACE view is constructed automatically by the VIEW server and contains a pseudo-transaction identifier of "TERMINAL". The pseudo-transaction "TERMINAL" is implemented as a function built into the view server (it inserts the 3270 data stream to the local transaction processing monitor).

In the case of unsolicited output to remote terminals, 3270 data streams must be created for a terminal with unknown device attributes. In this case, TMS generates a 3270 data stream for the most capable device. When the data stream is processed by the "TERMINAL" transaction, it is passed through a filter which strips or converts control sequences known to be illegal for the device.

DRCVDS—VIEW DISTRIBUTION SERVICES. DRCVDS is the Distributed Resource Control View Distribution Services, also referred to as the View server. The VIEW server combines the functions of profile management, distribution services, and resource management (including TP monitor-controlled transactions and terminals) into a single interface for DAA transactions (via IET). View distribution is implemented by combining the distribution services of SNADS with the view storage and retrieval functions of the profile management data base.

The view server does not have its own data base; it uses the SNADS data base for resource control information and the profile management data base (user and roll files) for view storage and retrieval.

The view server acts as the interface between application transactions and the operations functions of SNADS. The view server augments SNADS by dynamically feeding back "learned" information about users (i.e., resources). This feedback is intended to improve network resource utilization, performance, and response times. This feedback feature will be most effective when sufficiently detailed routing tables are constructed at each DSUN.

The view server dispatches distribution information to local resources. The resource types currently recognized by the dispatching function include device, terminal, and transaction. The list of supported resources is easily extended, with the only software impact being the logic required to service a specific local-delivery queue. Each resource is generally associated with support of a DAA concept or capability. As new concepts are added to DAA, the VIEW server will be extended with explicit support for the associated new resource groups.

Each resource is identified as being local or non-local. Each local resource has a local delivery queue. The name of the local-delivery queue corresponds to the resource type (and consequently to the dispatching logic used to service the local-delivery queue). The name of local-delivery queue must be explicitly recognized by the view distribution service as a supported resource type.

Each local resource has a security code. This code may be used by the resource-specific dispatcher to disable distributions of secure data to unsecured resources.

Resources may have additional resource type-dependent attributes. These attributes are normally only used for local resources. When required by remote transactions, these attributes are normally passed with the interface view accompanying a LINK function (this is the technique for distributing terminal/device attributes to a remote transaction).

Transactions are dispatched by inserting the appropriate portion of the distribution information units to the local transaction processing monitor (e.g., IMS, TUXEDO). The concept of "local" varies according to the transaction processing monitor. For IMS with MSC links, "local" can be any global IMS transaction (note that there is a limit on data length if transaction is not local to IMS system).

Terminals are dispatched by inserting the appropriate portion of the distribution information units to the local transaction processing monitor (e.g., IMS, TUXEDO). The concept of "local" varies according to the transaction processing monitor. For IMS with MSC links, "local" can be any global IMS Lterm. A physical terminal may be identified as multiple logical terminals, each (possibly) with different device types and associated with different host systems. Each logical terminal can appear to the user as a window at his physical terminal.

Device is a resource type which does not support dispatching. Devices are present as resources for the sole purpose of normalizing TERMINAL attributes. Any attempt to dispatch to a device will result in a distribution error.

DEVICE resource information characterizes a device type, including its generic device type name, device attributes supported, and size of display. The DEVICE table is assumed to be identical across the network (and infrequently changed). The table is implemented as a resource table with local entries only. The information in the DEVICE table may be used to dispatch TERMINAL distribution, in particular if a 3270 data stream filter is required because the originator did not know the local terminal's device attributes.

TRANSACTION DEFINITION FILE

Before considering the GTD in detail, one aspect of its input and storage, the use of a Transaction Definition File (TDB), should be considered further. Prior to the DAA of the present invention and its transaction generator program, GTD, a programmer was required to provide his own job decks to compile all the appropriate procedures and screen maps. On a 370 mainframe this could consist of several JCL decks or TSO lists. On UNIX a programmer would have a make file containing instructions on compiling and linking all the correct parts.

With GTD, a programmer never needs to build such files because GTD builds and maintains the TDF. This TDF is an integral part of GTD which contains all of the information necessary to compile and link all the correct components of a given DAA transaction. The programmer simply uses GTD's menus and screens to add and delete the appropriate components; GTD files this information into the TDF.

The TDF is a file of records used by GTD as the "blueprint" for constructing a DAA transaction. The content of the TDF is created and maintained by the application developer using the GTD tool. The TDF is used by GTD to assist the programmer in the edit of his procedure code, panel maps, and menus. Once these components have been edited, the TDF is used by GTD to compile and create various object modules that are linked-edited, along with the IET, to produce a transaction load module.

The TDF consists of the following types of records: header, first header extension, second header extension, panel, procedure, menu and language. Each TDF will have only one header, first header extension and second header extension, in that respective order. Each TDF will also contain at least one panel, procedure and menu record and they will be in no particular order. The presence of language records in a TDF is optional.

Each record is of variable length. Trailing fields in a record which do not have a value will not be stored. On platforms supporting variable length record constructs, the LLZZ field is not explicitly stored as data. On other platforms, the LLZZ field is stored as data to support variable length record constructs.

Below is a field level summary with each record name given, followed by the length of that record and a brief description of the record.

HEADER

LLZZ, 4, Length of record.
GTDHRTYP, 1, Record type. Value should be 'H'.
GTDHMEM, 8, TDT name.
GTDHMTYP, 1, TDT name. Value should be 'D'.
GTDHDR, 8, Documentation report name.
GTDHDG, 8, Documentation generation name.
GTDAPPL, 4, Application name.
GTDRELN, 4, Release number for application.
GTDLLIB, 46, Load library path.
GTDLMEM, 8, Load library member name.
GTDOLIB, 46, Object library path.
GTDOMEM, 8, Object library member name.
GTDSLIB, 46, Source library path.
GTDCMEM, 8, Transaction view name.
GTDDLIB, 46, Data base library path.
GTDDMEM, 8, Data base library member name.
GTDNLIB, 46, Control library path.
GTDNMEM, 8, Control library member name.
GTDLEOPT, 50, Linkage-editor options.
GTDGOF, 1, Generation option flag. Values are 'Y' and 'N'. When value is 'Y', put "OPTION:" field on menu, help, info, glos, and panel.
GTDGLF, 1, Generation look-ahead flag. Values are 'Y' and 'N'. When value is 'Y', put LOOKAHEAD:" field on panel.
FIRST HEADER EXTENSION:
LLZZ, 4, Length of record.
GTDHEX1, 2, Record type. Value should be 'HX'.
GTDHEX1N, 2, Extension type. Value should be a binary 1.
GTDCDSN1, 46, Extra copy/header library path.
GTDCDSN2, 46, Extra copy/header library path.
GTDCDSN3, 46, Extra copy/header library path.
GTDCDSN4, 46, Extra copy/header library path.
GTDXLIB, 46, Debugger symbols.

SECOND HEADER EXTENSION:
LLZZ, 4, Length of record.
GTDHEX2, 2, Record type. Value should be 'HX'.
GTDHEX2N, 2, Extension type. Value should be a binary 2.
GTDLDSN1, 46, Extra load library path.
GTDLDSN2, 46, Extra load library path.
GTDLDSN3, 46, Extra load library path.
GTDLDSN4, 46, Extra load library path.
GTDLDSN5, 46, Extra load library path.
GTDLDSN6, 46, Extra load library path.
PANEL: (one instance per panel entry)
LLZZ, 4, Length of record.
STDETYP, 1, Record type. Value should be 'P'.
STDENAME, 8, Panel name.
STDESEL, 8, Unused.
STDEIPNM, 8, Input procedure name.
STDEOPNM, 8, Output procedure name.
STDEPVNM, 8, Unused.
STDEDESC, 32, Panel description.
PROCEDURE: (one instance per procedure entry)
LLZZ, 4, Length of record.
STDETYP, 1, Record type. Value should be 'C'.
STDENAME, 8, Procedure name.
STDESEL, 8, Unused.
STDEIPNM, 8, Input view name.
STDEOPNM, 8 Output view name.
STDEPVNM, 8, Profile view name.
STDEDESC, 32, Procedure description.
STDERSV1, 4, Reserved space.
STDECCBM, 1, Unused.
STDECDB2, 1, Data base flag. Values are 'Y' and 'N'. When value is 'Y', procedure has data base processing.
STDECXPD, 1, Debugger flag. Values are 'Y' and 'N'. When value 'Y', procedure will have debugger processing.
STDECTYP, 8, Procedure type. Values are 'COB2', 'C', 'ALC', 'ENTRY', and 'EXTERN'. When value is 'COB2' the procedure is a COBOL procedure. When value is 'C', the procedure is a C procedure. When value is 'ALC', the procedure is an assembler procedure. When value is 'ENTRY' the procedure is an entry point. When value is 'EXTERN' the procedure is an external entry point.
STDELOPT, 60, Language options.
MENU: (one instance per menu entry)
LLZZ, 4, Length of record.
STDETYP, 1, Record type. Value should be 'E'.
STDENAME, 8, Menu name.
STDESEL, 8, Selection value for menu item.
STDEIPNM, 8, Panel name to invoke.
STDEOPNM, 8, Procedure name to invoke.
STDEPVNM, 8, Unused.
STDEDESC, 32, Menu item description. Value is used during display.
LANGUAGE: (one instance per language entry)
LLZZ, 4, Length of record.
STDETYP, 1, Record type. Value should be 'L'.
STDENAME, 8, Language name.
STDESEL, 8, unused.
STDEIPNM, 8, Report name for documentation.
STDEOPNM, 8, Generation name for documentation.

GENERATE TRANSACTION DEFINITION (GTD)

According to the preferred embodiment of the present invention, the Generate Transaction Definition (GTD) system is a semi-automated facility for defining and managing applications operating in a DAA environment. The system runs under TSO, UNIX and OS/2. GTD allows the designer to specify those elements of a transaction to be included in the transaction load module, so the transaction can be constructed and placed into operation within the DAA environment.

A GTD-generated transaction includes drive routines (part of the IET module) that manage the coordination of panels, procedures, and views in the run-time environment. This set of routines interfaces with the Information Engineering Controller (IEC) facilities installed in the run-time environment to support execution. GTD supports the editing of the Transaction Definition Table (TDT). The TDT contains the specific relationships and the identification of the objects to be managed by the transaction.

The designer specifies the libraries or directories where the generated objects are to be maintained, identifies the specific documentation repository(ies) associated with this transaction during its execution and specifies the panels, procedures, and views to be included within this transaction. Menu entries assist the user in the selection of the functions included in this transaction.

The GTD system is also adapted to generate system-provided panels; generate prototype panels and procedures; compile TDT's, panels, procedures and views; bind the transaction load module; deploy homogeneous transaction load modules; and deploy heterogeneous transaction source.

In the preferred embodiment, the GTD system interfaces with other utilities such as CODESTAR and RINQ. CODESTAR, for example, supports data base BIND, panel editing and compilation, as well as source program editing and compilation. RINQ inserts the generated LOAD module along with its data base references into the target system. It should be realized that other comparable utilities may be employed instead of those mentioned, and that these particular utilities are merely a matter of design choice.

To develop an application using the GTD system, the designer must allocate a set of libraries or directories to support the maintenance of the objects comprising the application. In a preferred embodiment of the present invention, the following six libraries/directories support GTD-developed applications:

MAPLIB maintains TDTs and panels to be used by the application.

SRCLIB maintains source code, copy code, views, and macros to be used by the application.

OBJLIB maintains intermediate object modules which result from assemblies and compiles of application objects. These objects can include TDTs, views, and procedures.

LOADLIB maintains load modules for panels, procedures and the created program module containing the executable code for each transaction.

DBRMLIB maintains DB2 Data Base Request Module (DBRM) generated as a result of data base access calls in associated procedures (DB2 only).

CNTLLIB maintains control information associated with DB2 applications (DB2 only).

It should be noted that while six libraries are disclosed, in the preferred embodiment, more or less may be employed. Additionally the names given these libraries are a matter of design choice and the present invention should in no way be limited to these names and libraries.

Typically an application would be maintained in a set of libraries with data set name directory prefixes representing the application project. The last node would be the library or directory names specified above. When a new TDT is being created, the designer must specify the MAPLIB containing this TDT and must supply a 1–4 character name for the TDT.

Upon initial use of a TDT name, the GTD system will assume all of these other libraries/directories have names with the prefixes as specified for MAPLIB and will generate a TDT profile based on these assumptions. The application designer is then able to make adjustments to the library names in the TDT profile. These specifications will be maintained with in the TDT. As the designer requires further maintenance action for this transaction, the library/directory names will be referenced and used for the requested functions.

More specifically, the MAPLIB library/directory maintains information defining the TDTs which describe the transactions being developed, and maintains the panels (in source format) to be used by the transactions. Each TDT within MAPLIB is assigned a 1–4 character name. In the preferred embodiment, certain objects within the GTD library/directory set are named by extending the TDT name by up to four characters to define unique 8 character object names.

The panels maintained within MAPLIB can be developed from "scratch" using any map editor, such as the CODESTAR Map Editor, or may be generated by the GTD facility. The GTD facility can generate the panels as system-provided panels (e.g., MENUs, HELP GLOSSARY and INFO panels), or as custom panels in skeleton form. Furthermore, panels may also be developed by copying a panel similar to a desired panel, and editing the panel using an editor such as the CODESTAR Editor.

The OBJLIBN library/directory is used by GTD as an intermediate storage for object code versions of various elements of the particular transaction being defined. These intermediate objects include the TDT, the view member, and COBOL (or other language of choice) procedures as they are compiled. This library/directory is normally transparent to the user.

The LOADLIB maintains the load module format objects as developed by the GTD system. In particular, it is the final repository for the load module representing the completed transaction. The load module is placed in this library/directory by the GTD 'Bind Transaction' process. Format objects are placed in LOADLIB by a panel and procedure compiler (such as the CODESTAR Panel and Procedure Compiler), by the GTD panel and procedure compiler, and also by the GTD 'Bind Transaction' process.

The SRCLIB retains the source information for a GTD transaction and maintains the transaction, profile, input, and output views as source members. This source information can be COBOL, C, or Assembler source, COBOL copy code, Assembler macros, C header files, or source versions of the views associated with the transaction.

The DBRMLIB is standard DB2 DBRM library. It is an operating system-partitioned data set used as an intermediate receiving library for the DBRMs created by the DB2 pre-compiler. This library is required to support DB2 applications built with the GTD facility. A similar library would be needed to support other data base management architectures if a DB2 pre-compiler is not used.

The CNTLLIB is a standard operating system library used to maintain control information, particularly in support of the DB2 bind process. The CNTLLIB defines the control structures of the DBRMs used for the DB2 bind process.

Table 1 lists the GTD Library Specifications for the S/370. It depicts the relative organization, record format, block size, logical record length, moderate size and moderate number of directory blocks of the various libraries discussed above.

TABLE 1

GTD LIBRARY SPECIFICATIONS FOR S/370

| | LIBRARY | | | | | |
|---|---|---|---|---|---|---|
| | MAPLIB | SRCLIB | OBJLIB | LOADLIB | DBRMLIB | CNTLLIB |
| Organization | PO | PO | PO | PO | PO | PO |
| Record Format | VB | FB | FB | U | FB | FB |
| Block Size | 6004 | 3120 | 400 | 19069 | 3120 | 400 |
| Logical Record Length | 400 | 80 | 80 | 256 | 80 | 80 |
| Moderate Size (3380) tracks) | 15 | 120 | 30 | 60 | 15 | 5 |
| Moderate No. of Directory Blocks | 30 | 30 | 15 | 30 | 10 | 5 |

Information Engineering Controller (IEC) Support. The IEC is an address space that interfaces with GTD-generated applications to provide environmental control support for those applications. The IEC supports several critical functions for GTD applications, including: system name support (function 9), DAA environment definition (function 5), profile management (function 7), documentation management (function 1). The function numbers for the preferred embodiment provided and referred to are strictly design choice and should in no way limit the scope of the present invention.

IEC system name support function enables transactions to determine the name of the system on which the application is running. The system name is then used by the GTD application for presenting output panels and determining whether a panel input to an application, adapted to run on multiple systems, is executing on the specified system.

If the transactions are not operating on the proper system, the GTD runtime controller (IET) uses the system name on the panel and the DAA environment definition, also known as the Distributed Resource Controller (DRC), to determine the system type and routing specifications to route this transaction to the desired system. System name and type information (strictly design choice as to name of function, usually language dependent) is presented to the application via the following data items:

| | COBOL | C |
|---|---|---|
| System Name | IEF1-SYSTEM | wsystem |
| System Type | IEF1-SYSTYPE | wsystype |

The IEC's DAA Environment Definition function specifies the environment in which GTD applications operate. It allows the user to define the characteristics of the devices included in the DAA network, to define the terminals allowed to interface with the systems within the DAA network, and to specify the systems included within the network.

A GTD application uses a function 5 request to extract data, such as the following, from the IEC tables: device characteristics of the terminal from which an input response is received and device characteristics to which an output response is to be delivered. At run-time, these dynamically modifiable terminal characteristics are used to interpret an incoming message from a terminal, determine the output device characteristics, and prepare an appropriate output stream.

The environment specification is extracted as the input message is received. The characteristics of the terminal at input time are determined from the IEC Table via a function 5 request. This same terminal characteristic set is used for preparation of the output message. This minimizes the overhead for each transaction. However, it does offer the possibility for terminal characteristics to change during the transaction execution. If the terminal characteristics change it could cause temporary anomalies, but not integrity problems.

The IEC profile management function supports the Profile Management Facility. Each transaction maintains a profile view in the IEC ROLLFILE as a scratch pad. The profile information is structured in the IEC address space (hereinafter referred to as the "ROLLFILE"). The primary key is the user identification, while the secondary key is the application identification (also known as a transaction code).

The profile information is maintained in a push-down stack within the IEC space as multiple views are created for a given user/application. Information stored in the ROLLFILE includes: data extracted from the transaction view when a transaction procedure is completed; any input message received by the HELP facility when a user activates the HELP documentation; the interim HELP profile views as the application suspends execution between the viewing of pages in the HELP documentation; interface views for any applications invoked through distributed calls between systems.

When a transaction procedure completes execution, the profile view is extracted from the transaction view, and written to the profile address space in the IEC ROLLFILE. When a transaction input is received for a given user and a specified application, the profile view is extracted from the ROLLFILE and is written to the transaction view. The profile view provides a transient scratch pad to save critical parameters between transaction executions for a given user/application on the specific system.

Each user may have multiple application profiles maintained within the ROLLFILE simultaneously. This collection of applications can be thought of as an electronic work desk for each given user. Each user may also have an electronic work desk active on multiple systems within the network simultaneously.

Profile management is also extended when an application invokes the HELP facilities. When this happens, the profile view and the input message received by the HELP facility when the user presses the F1 key are captured and saved in the ROLLFILE. The profile view and input message are restored when the user exits HELP. Furthermore, if the application suspends execution during the viewing of the pages within the HELP documentation, the interim HELP profile is also maintained in the profile address space.

Profile space within the ROLLFILE is also used as a storage mechanism for maintaining the interface views for applications invoked through distributed calls between systems. These interface views are stored in the ROLLFILE to return control to the appropriate system.transaction.procedure when a called application completes processing and prepares to return to the calling system.transaction.procedure. Each interface view stored as a Profile view within the ROLLFILE maintains an identification of the calling system.transaction.procedure and the called system.transaction.procedure. This interface view is stored both in the calling system ROLLFILE and the called system ROLLFILE. This thereby supports the return of control from a called procedure when a RETURN exit state is set, and supports the forward tracing of control is the user restarts a transaction suspended by the system, indicated as 'EXTENDED DISTRIBUTED PROCESSING IN PROGRESS'.

GTD TRANSACTION PARAMETERS WITH IMS. Applications built using the GTD facility that run under IMS are provided input parameters for accessing the transaction view (containing such data as panel information), the Input/output Program Control Block (IOPCB), alternate IOPCB, and the Program Status Blocks (PSBs) for accessing DL/1 data bases. The IOPCB contains information necessary for proper transaction processing, such as terminal and user identification. Furthermore, the IOPCB must accompany every call back to the transaction processor.

To provide the transaction view as the first parameter, the other parameters in the normal IMS parameter list are offset by one position. The particular order of the addresses in the parameter list passed to the application are: the address of the transaction view, the address of the IOPCB, and lastly the address of the alternate IOPCB.

Other parameters in the list are the PSBs specified by the IMS application according to the SYSGEN. These are also offset by one position. Furthermore, GTD applications can only support 64 PSBs including the transaction view.

GTD Panel. A panel within the GTD application supports a presentation of information to the user, typically on a display screen such as the IBM 3270 video screen. The screen presents output data from an application and accepts input data to that application. Each panel has a unique 8 character name within the TDT and the MAPLIB directory/library. Each of these panels has an input and output procedure associated with it.

The input procedure, a mandatory procedure, is invoked when an input panel is received by a system from a input terminal or process. When an input panel is received, the panel name is placed in the TDT and the associated input procedure is given control by the IET runtime driver. This panel/input procedure relationship is specified using GTD. The input procedure is also defined using GTD. The source code for the procedure may be edited by selecting E (=Edit), or an other specified designator, for the desired procedure.

The output procedure, on the other hand, is an optional procedure which may be invoked prior to displaying a panel requested from a menu, or may be invoked upon the restart of an application suspended for HELP documentation presentation, in order to refresh data to be presented on the panel prior to actual output display of the particular panel. This panel/output procedure relationship is specified using GTD. As with the input procedure described above, the output procedure must also be defined using GTD and the source code for the procedure may also be edited by indicating the E(=Edit) selection for the desired procedure.

The output procedure is typically used to retrieve data from data bases prior to actual display of the panel. For example, an inventory transaction may have a part number saved in the profile view, however, prior to display of a panel of information relative to this part number, data base calls may be required to complete the output panel.

The output procedure may execute during the restart process after any HELP sequence has completed (F1= EXITHELP). The output procedure may also be invoked when a panel is presented as an initial user request from a menu. An output procedure can be specified on the menu entry specification, or may be associated with the panel on the panel specification. If an output procedure is specified on a menu entry, this procedure will be invoked prior to the display of the panel. If the output procedure on the menu entry is left blank, the output procedure on the panel specification will be invoked. If both are left blank, the panel will be presented from the data in the transaction view as populated from the profile view.

GTD MENU CONTROL SYSTEM. The Menu Control system for GTD applications is analogous to ISPF menu functions. The system supports four levels of hierarchical menus, with each level supporting 1 to 16 entries. Each entry on a menu is characterized by an 8 character selection code and a 32 character description to indicate the function offered by this selection code. Generally, when a transaction is initiated, the Master Menu is presented to the user for an initial selection. At any time during the execution of a transaction, the user can press the F12 key, or enter an equal sign '=' in the select field on any menu panel to return to the Master menu. It should be noted that the F12 and "=" keys are selected only as a matter of design choice and are not to be considered limitations of the invention.

The user can make a direct request to a function within the menu hierarchy by entering "tran=select.select.select.select" up to the four level specification capability of the GTD system. Shorter selections of 1, 2 or 3 select codes are also acceptable.

When menu panels are created, entries are specified to indicate the select code, the descriptive line for the menu entry, the panel that can be presented, and the procedure that can be executed prior to presenting the panel itself.

HELP SUPPORT FOR GTD APPLICATIONS. When an application is developed using GTD, the TDT can specify a TIOLR report.generation containing the transaction documentation. The information in the TIOLR report.generation is structured so a chapter name can reference a panel name to provide multiple sections and pages of documentation associated with each transaction panel.

The documentation is presented to the user of the application at run time by pressing the F1 key. The key causes the control program to collect the information on the user screen and store it in the ROLLFILE as a HELP view. The control program preserves the profile view for the transaction and presents the HELP documentation for that transaction to the user through a HELP panel. The panel name for this HELP documentation is tdHELP.

The user can return to the execution of the application after completing review of HELP documentation by pressing F1. The control program then proceeds to restore the profile view in the transaction view, execute the output procedure associated with the panel (if there is one), redisplay the panel suspended for the HELP presentation, and repopulate the screen with data items on screen data items on screen at the point the HELP request was made.

While in the HELP presentation, a user can request a definition of a word in text by placing the cursor on the word of interest and pressing the F2 key. F2 invokes the Glossary function. If the word has been defined by the application designer in the GLOSSARY, the definition will be presented on the screen. After viewing the definition, the user can press the F3 key to return to the HELP documentation, and in turn press F1 to exit from HELP and return to the suspended application panel.

GLOSSARY SUPPORT FOR GTD APPLICATIONS. The Glossary function allows the application designer to define a set of words in the designated TIOLR report.generation so the user can interactively select the definition of a word they do not understand. Glossary words are specified in the TIOLR chapter "report.generation.GLOSSARY". Words within the Glossary can be one to eight characters long. Each word is specified as a section within the Glossary chapter. Each word description may be up to several pages long.

Once a word has been selected from the Glossary, function keys allow the user to scroll through the possible multiple pages of documentation for that word. To find other words in the Glossary the user can either use function keys to scroll to next or prior words within Glossary, or enter a particular word in the entry field. If a word is specified by either method, and is not found in the Glossary, the next word in alphabetical order will be shown.

Word definitions can be selected from the Glossary from the HELP panel, INFO panel, or GLOS panel by placing the cursor on the word of interest and pressing F2. Once the user has completed a review of the Glossary, he can press F3 to return to the prior panel.

INFORMATION SUPPORT FOR GTD APPLICATIONS. The GTD runtime system (IET) supports the presentation of tutorial documentation from the documentation report.generation for a GTD transaction. The user can select tutorial documentation from the Master Menu by specifying a menu select code and description, the tdt INFO panel, and the IETOINFO procedure. This procedure and panel activates the information display function from the report.generation.chapter where the chapter is specified by the first eight characters of the description field on the menu entry.

Having selected an INFO presentation, the user can scroll forward or backward within this information by pressing F5 and F6, respectively, for forward and backward page scrolling or be entering the desired section and page names on the tdtINFO panel. The user can exit the INFO function by pressing F3 or F12 to return to the Master Menu.

GTD OPTION FIELD. The GTD system supports an option field on the panels. The option field allows the user to specify functions keys. This is especially useful when the user is using a terminal that does not have function keys. The option field can be placed on the panels by specifying the variable name, IEF1_OPTION(woption), as a three character input/output field. The option field can be automatically specified as the panels are created.

The user can enter an F (upper or lower case) followed by one or two decimal digits (1 to 24) in the option field. This is equivalent to pressing the corresponding function key. If the user enters an option field and also presses a function key, the function key will take precedence. If an entry is not in the preceding form, the entry is ignored by the IET and passed to the procedure.

GTD LOOKAHEAD FIELD. This field is an optional field that can be placed on a panel to allow the user to designate a next function to be performed. This 64 byte field is processed according to the application designer's specification. In the preferred embodiment of the present invention, the field is associated with function key F12. If a lookahead field is on the screen, or the first character of the lookahead field is not blank, or F12 is pressed, the menu action normally associated with F12 is ignored. The specification of F12 is passed to the application through the IEF1_FUNKEY (wfunkey) variable. The application recognizes the user wishes to execute the specific LOOKAHEAD function as indicated by the IEF1_LOOKAHEAD (wlookahead) field.

EDITING A GTD TRANSACTION DEFINITION. The anchor element of a GTD application is the TDT. The TDT is a member of a MAPLIB library/directory that contains the specification for a transaction. Each TDT entry is a named member, one to four characters long. The name may be extended up to four characters to create unique object names in support of the application.

A COBOL procedure within a GTD application is a standard structured COBOL member. The application designer can use any of the basic COBOL functions, and reference other programs and procedures, using standard language facilities of the environment where the transaction is intended to run. The COBOL procedure is intended to be a COBOL II structured COBOL member with minimal references to other facilities so the application can be portable to any of several environments.

When a procedure is entered with panel input, the transaction view will be populated with the profile view. The panel data will be superimposed on the profile view. When a procedure is entered with a LINK request, the transaction view is cleared (to zero) and the input view populates the transaction view.

To invoke an external procedure, use the LINK and RETURN facilities of the DAA. To execute a LINK to other procedures in the DAA, the user may specify a new system, transaction, and procedure in the respective fields (IEF1-NSYSTEM, 1EF1-NTRAN, IEF1-NPROC respectively) and enter the work LINK in the IEF1-XSTATE field.

If the logic of the application indicates a called procedure has completed execution and is to return to the calling procedure, the designer may enter RETURN in the IEF1-XSTATE field to return control to the calling transaction.procedure.

EDIT GTD APPLICATION VIEWS. Profile, input, and output views are maintained in the SRCLIB for each transaction within an application. These views are maintained as standard source members. The only information included on each line within this source member is the name of the data item to be included in that view. These views are correlated at compile time with the transaction view associated with the TDT. The further information necessary to develop the object form of the view is derived from the transaction view.

The views, as managed by the IET runtime monitor have characteristics validated at runtime to verify the data associated with the view is consistent with the current version of that view as managed by the executing transaction. These crosschecks are made using inherent parameters, including number of data items and total length of the data items in a view. Each profile, input, or output view has a version modifier to allow the designer to change the input, output, or profile views for a given transaction.procedure. The version identifier is specified by /VER=line in the source member for the corresponding view. 'line' represents a four character alpha/numeric version identification. As the designer specified a change to a view, he should also change the version number so the runtime validation of this version ID can detect inconsistencies in views as they are processed at runtime.

This version is necessary because changes for a transaction in one system may not occur precisely synchronous with changes in other systems within the network.

This source-identified version number is transcribed into the object and load modules versions by the view compile process of the GTD application builder. When a view image is created at runtime, this version ID is further transcribed into the runtime view image. As that view image is received by a called program, or extracted by the runtime controller at application restart, the version of the view image is validated against the version for the view definition. This improves the probability the information will be passed consistently between procedures in this DAA.

COMPILING GTD VIEWS. GTD view are compiled using GTD to generate the object version of the views. This process builds a multi-view object module that maintains a representation of each input, output, and profile view referenced within a transaction. This compilation process extracts the transaction view from the SRCLIB (normally 'SRCLIB(tdtTVW')' and parses this member to interpret data type, location, and length of each of the data elements within the transaction view. The view compiler then extracts each of the input, output, and profile views from the SRCLIB and generates an object section for each view. The object section includes a header identifying the view name, length, and version number. For each data element the object section generates an entry identifying that data element relative to the transaction view. Each section is given the name of the view. The object module created is given the name tdtVIEW. This object module, as created, is included with the transaction load module during the transaction bind step.

This yields a view model for each input, output, and profile view for a given transaction. This includes the views for the procedures included within this transaction, and the input and output view specifications for each of the procedures (EXTERN procedures) called by this transaction. The called procedure input and output views are defined in the TDT with GTD with a TYPE=EXTERN for the procedure.

COMPILING GTD PANELS. Views are compiled using GTD. The view compilation process is a mass view compile process. All views associated with this TDT are compiled and placed in the object member tdtVIEW.

The designer can request the mass panel compile. A conditional compile compiles panels changed in MAPLIB or if the transaction view has changed in SRCLIB since the last panel compile. The GTD system uses the modified date in MAPLIB and SRCLIB and the compiled date in the LOADLIB to make this determination. An unconditional compile compiles all panels in the transaction. The system references the TDT member in the MAPLIB to identify all of the panels (including menu panels) to be used by this transaction, and to initiate individual map compiles generating the load modules (LOADLIB) describing these panels for the run time interface. This is a lengthy step in the process. The designer will get a RETURN code for each panel in the TDT as they are compiled.

REGENERATING A GTD TRANSACTION. To reduce the cost of the development cycle while retaining full integrity of the regeneration process, an intelligent regeneration process is used. This process maintains, with appropriate libraries, a last change date for each of the significant objects defined by the TDT. To fully support this process, the GTD editor notes when a panel is generated or a view is edited. The CODESTAR editor identifies when a change is made to a panel. The CODESTAR compiler identifies when a panel is compiled.

The linkage editor identifies when a procedure is linked. The source editor identifies when a source change is made to a procedure.

The conditional regeneration begins by inspecting objects within the TDT to determine if a source change has been made requiring a regeneration or recompilation of any of these objects. The transaction view is the anchor object within this collection of items. If the transaction view has been edited, all panels, procedures, and views must be recompiled. If the transaction view has not been changed, only those objects modified since the last generation need to be recompiled. The regeneration process inspects the last edit date for a source module and the last link-edit date for the load module. If the last link-edit date is after the last source edit date, the compile is not required for that module. Similarly, if there has been no editing of a panel or the transaction view since the last compile and link-edit of the panel, a recompile of the panel is not necessary.

NOTE: Since the object module time stamp maintains minute resolution, it is necessary for full integrity to recompile objects with link edit time equal to source edit time. This may, on occasion, cause panels and procedures to be recompiled when no change has been made. If source edit and compile are both completed in the same minute, the next conditional regeneration will perform another compile.

EXECUTING A GTD TRANSACTION. Once a GTD transaction has been developed and installed into the runtime environment, the user can invoke that transaction by logging on to the system that supports this transaction. The user can enter 'R system name' or RTGxxx followed by the transaction code and press ENTER to run IMS transactions. If the user wishes to select a particular sub-function from the menu hierarchy within the transaction, he can immediately transfer to a sub-function within the transaction by entering '=select.select.select' specification. Once the transaction receives control, it will present the appropriate panel to the user. The transaction may have executed some procedure, or, depending on the application design, may only present an initial panel for further selection by the user. The user can enter data into the indicated panel and press ENTER to execute the indicated input procedure for this panel.

The user can press F1 for HELP documentation associated with the given panel. This documentation will be extracted for the TIOLR report.generation.chapter specified by the application designer. If the designer has not prepared the TIOLR report.generation information, the user can get a 'Documentation Open Error' error condition. If the particular chapter (panel name) has not been specified for the HELP documentation for a particular panel the user will get a 'Documentation Not Found' error condition. It is the designer's responsibility to develop and maintain the supporting documentation.

Once HELP has been invoked, the user can select glossary functions (press F2, or can press F1 to return to the interrupted panel.

Pressing F12 at any time returns the user to the transaction Master Menu. If the application designer has specified further actions with function key specification, the user can press the appropriate function key to request the indicated action. It is the application designer's responsibility to correlate function key descriptions on the function key line, normally line 24, with the panel input procedure "logic" to support these indicated function key actions.

When a GTD transaction terminates execution, the profile view is saved by the profile data base for the user/application on that system. The transaction can be resumed by entering the transaction code from a clear screen (or a directed routing of the form 'R system tran'). This restores the profile view, executes the panel output procedure (if any) and presents the current panel. Alternately the user can enter 'tran=' to retain profile view and present transaction master menu; 'tran=RESET or tran/RESET' to clear profile view and present transaction master menu; or 'tran=QUIT or tran/QUIT' to delete application from user's profile space on this system and display the 'Display Active' panel.

EXIT STATE. DAA procedure have a completion condition specified by the Exit State variable. This exit state is set by the application, or by the system, by placing a code in an eight character variable called IEF1-XSTATE/wxstate. The application uses the Exit State variable to indicate an action to be taken upon completion of the transaction. If this variable is not modified by the transaction the Exit State will be blank. A blank exit state causes the designated panel (IEF1-PANEL/wpanel) to be formatted and presented to the user at the input terminal (IEF1-TERM/wterm).

The application may specify the alternate exit states listed in Table 2.

TABLE 2

GTD Exit State

| Exit State | Action |
|---|---|
| blank | Display Panel=IEF1-PANEL/wpanel |
| LINK | Transfers control to IEF1-NSYSTEM/wnsystem, IEF1-NTRAN/wntran, IEF1-NPROC/wnproc |
| RETURN | Returns control to calling system transaction procedure |
| RESET | Clears profile view and displays master menu |
| QUIT | Deletes application from profile data base and presents 'Display Active' panel. |

LINK EXIT STATE. A LINK Exit State specifies the application procedure is requesting a transfer of control to the system.transaction.procedure as designated by IEF1-NSYSTEM (wnsystem), IEF1-NTRAN(wntran), and IEF1-NPROC(wnproc). The transaction name specified in IEF1-NTRAN(wntran) must be a network-defined transaction code. If the IEF1-NSYSTEM(wnsystem) name is blank, it is assumed the request is to a transaction in the current system or routed as specified by the local directory (DRC). If the IEF1-NPROC(wnproc) name is blank, a null input view will be prepared and the master menu for the indicated transaction will be presented to the user of the application.

When control is to be passed to a procedure using LINK Exit State, the input view for that called transaction.procedure is prepared by the system. The system extracts the designated data items from the transaction view, and packages these in a LINK message with an interface view indicating the calling and called system.transaction.procedure.

RETURN EXIT STATE. A RETURN Exit State causes control to be returned to the calling application. If a RETURN exit state is specified and the current procedure has not been LINKed to another system.transaction.procedure, an error message is specified in the IEF1-MESG(wmsg) field.

When a RETURN is executed from a transaction.procedure, the output view for the called transaction.procedure is packaged in a RETURN message with the interface view that invoked the request. The RETURN message is routed to the calling system.transaction.procedure.

When the calling transaction.procedure is reinvoked at the calling system, the profile view for the calling transaction.procedure is restored in the transaction view. The output view from the called procedure is stored in the transaction view and the calling procedure restarted.

RESET EXIT STATE. A RESET Exit State the profile view for this application/user on this system is cleared and the master menu for this transaction is presented. This condition can be initiated directly by the terminal user by entering 'tran=RESET' or 'tran/RESET'.

QUIT EXIT STATE. A QUIT Exit State removes the application from the ROLLFILE for this user on this system and the 'Display Active' application panel is presented. This condition can be initiated directly by the terminal user by entering 'tran=QUIT' or 'tran/QUIT'.

FUNCTION KEY SUPPORT IN GTD APPLICATIONS. The application designer can specify function key action for GTD generated applications by including logic within the input procedure to interrogate the function key filed. The function key filed is made available as a GTD system provide parameter IEF1-FUNKEY(wfunkey). This is a COMP-3 COBOL variable (short C variable) with a value in the range of 0 through 24, that represents the function key pressed. The IET monitor that controls the execution of the GTD run time module will interpret function keys 1, 11, and 12 and take the predefined system actions of 'F1' HELP documentation presentation; 'F11' Display Active applications presentation for the current user on the current system (transfers control from the current transaction to a system provide transaction (TRAN=DA) to display the list of the active applications for this user on this system); and 'F12' Master Menu presentation.

The application designer must include the appropriate logic within the application to specify alternative function key actions. A function key value of zero implies the ENTER key was pressed to invoke this transaction. If non-zero, the user can invoke the logic the application designer set up fro the function key pressed.

Example—Invoking alternate panel will place alternate panel in IEF1-PANEL(wpanel) field; GOBACK statement issued to return control to alternate panel; or alternate panel presented to user.

Example—Invoked alternate transaction
Alternate system.transation.procedure placed in IEF1-NSYSTEM (wnsystem), IEF1-NTRAN(wntran), IEF1-NPROC (wnproc) fields
LINK placed in IEF1-XSTATE(wxstate) fields
GOBACK statement issued to transfer control to alternate transaction
Input parameters prepared as specified by input view for called procedure.

The user can request the next or prior object from the one portrayed on the panel be extracted from the data base and its attributes presented for view. This is a typical function for F5 (next) and F6 (prior) keys within a referenced table or data base. It is the designer's responsibility to identify the next or prior object in the data base; read the appropriate attributes from the data base and issue the GOBACK statement to have the information presented on the panel.

GTD APPLICATION PROCEDURE STRUCTURE. The GTD system primarily supports COBOL and C applications. The GTD system will support Assembly Language Code (ALC) implementation, but these implementations require manual correlation of information not required in COBOL and C environments. For example, in the ALC environment, a DSECT must be maintained that is byte level compatible with the COBOL or C transaction view generated for view and panel references.

The ALC programmer must adhere to certain conventions for procedure definitions. While this has not proven to be a significant problem, it is more complex than the COBOL environment.

The COBOL and C environment for GTD-provided applications provide for the major functions to be supported by the IET runtime driver and the associated runtime subroutines. Therefore, the application development process is significantly simplified for procedures in this COBOL/C environment. When a procedure receives control from the IET runtime driver it can be invoked in two ways:

1. Input from a panel.
2. Input from a calling procedure.

INPUT FROM A PANEL. In general, when input is received from a terminal to a procedure, the profile view is extracted from the ROLLFILE and placed in the transaction view. That transaction view is presented to the procedure. The procedure executes the logic indicative of that particular input procedure:

reading records from data bases
  performing logic on the data items that extracted this input and the data items from the data bases
  preparing output data elements that can be saved in the profile view upon completion of the procedure execution or displayed to the output terminal.

The same panel input will be displayed with the updated data if the application designer sets up the following procedure:

receive input
  read data from the data base
  place data base data in the transaction view
  return control GOBACK or return)

If the input procedure logic determines from the terminal input or function key an alternate panel is to be displayed, it can insert the new panel name in the IEF1-PANEL (wpanel) field and execute the GOBACK (return) statement. This returns control to the IET controller and prepares a panel for the input terminal consistent with the panel specification. If the IEF1-PANEL(wpanel field is left blank, the MASTER MENU will be displayed.

The function key field, IEF1-FUNCKEY (wfunkey), can be interrogated to determine if a function key has been pressed. The application designer determines the action to be taken according to the key pressed. The function keys listed below are reserved for GTD-provided applications. Any other keys can be set up by the application designer.

F1 HELP
  F11 DISPLAY ACTIVE
  F12 MASTER MENU

INPUT FROM A CALLING PROCEDURE. A procedure can call other procedures, sub-programs, and sub-routines, as desired to execute particular functions for that procedure. External procedure calls, both external to this transaction and this system, can be invoked with the LINK and RETURN Exit states for a procedure.

The transaction name in the IEF1-NTRAN(wtran) field must be a defined transaction within the network. The transaction name can be routed based on the transaction routing specifications for the calling system to another system within the network. The procedure name must be a well-defined procedure name within the called transaction. If it is not defined, the MENU for the called transaction will be displayed to the user.

Having invoked the called system.transaction.procedure, that procedure can operate in the same environment, with the same options, as the parent transaction.procedure. For example, to display a panel upon completion of this called procedure execution, the application designer can enter a panel name in the IEF1-PANEL(wpanel) field and return control with the IEF1-XSTATE(wxstate) field blank. This displays the panel to the requesting user.

A called procedure can return control to the calling procedure by issuing the GOBACK (return) statement with the variable IEF1-XSTATE(wxstate) set to RETURN. Upon issuing the RETURN, the IET control program will:

extract data items from the called transaction view as specified in the output view for this called procedure
  package the data items with the interface view that initiated the call request
  submit the output messages to the calling system. transaction.procedure.

Upon return to the calling system.transaction, the IET control program will:

extract the profile view for the procedure from the profile data base
  load the profile view into the transaction view for the calling transaction
  load the output view as received from the called procedure on top of the transaction view.

The calling procedure will be reinvoked (at the top) for further processing as indicated by the application designer.

GTD External Procedure. An external procedure (EXTERN) is a transaction procedure called by a transaction through the LINK exit state. In this case, the procedure is not included in the calling transaction load module. A reference to this external procedure is made to correlate the input and output views for this procedure. An external procedure does not have a profile view. The profile view is maintained as null throughout the definition of the TDT.

When the TDT is prepared, the external reference will be noted by specifying the procedure type as EXTERN. The TDT will not create a reference for this external procedure. The external procedure will not be included in the load module. The input and output views for this procedure, since they are required when a LINK is executed to the external procedure (or a RETURN is performed), are included within the tdtVIEW module created at view compile time.

GTD Unformatted Input. To allow initial entry to the system to give more specific directioning to the application, the application designer can develop applications that process input to the transaction processing system from an unformatted input screen. While the data is usually presented from an unformatted input screen. While the data is usually presented from a formatted data screen, being able to support clear screen inputs can save interactions with the application.

In some cases, the unformatted input is processed by the IET command processor. These inputs are characterized by a clear screen input with a transaction code followed by a space (or multiple spaces) and an equal sign followed by a series of selection options separated by periods. For example: 'IEC=TRM.B'. This approach is satisfactory for gaining access to a system at a particular functionality level.

It is also desirable for application unique functionality to be presented to GTD-developed applications. For example an HRN transaction where the user wishes to input the transaction code HRN and an employee name as a single action to get a response presenting information regarding that particular employee.

These types of unformatted input applications can be supported by the GTD system by allowing the application designer to specify an UNFORMAT (GTD option.2 panel, defining the UNFORMAT panel to the GTD application, and in turn associating with the UNFORMAT panel a procedure to process the unformatted input.

The structure of the UNFORMAT panel is very basic. It requires:

field 1 (normally row 1 column 1), transaction code, typically 8 characters, IEF1-TRAN(wtran)

field 2 (normally row 1, column 10), panel name field panel name specified as UNFORMAT, typically eight characters, IEF1-PANEL(wpanel)

third field (normally column 18, application designer specified length), character input field unformatted, information following transaction code from unformatted screen placed in field with first non-blank character in left-most position.

The application is responsible for interpreting the input data stream according to any user rules desirable. In turn, the application typically presents a formatted output panel characterizing the desired user action. This parsing and panel presentation is completed by the input procedure associated with the UNFORMAT panel by GTD.

Since the structure of the UNFORMAT panel is uniform from one application to another, the application designer can create a new UNFORMAT panel for his library by copying an existing UNFORMAT panel. For generality, the application designer may desire to have the data input through the IEF1-OUTPUT(woutput) field since this is a user-available field in the GD transaction view, 32 bytes in length, and should be sufficient for most application requirements of this type.

The UNFORMAT panel must be name UNFORMAT. Therefore, the panel is unique within the library/directory set for a given application. It is preferred the application designer use a variable name fore the input data field in the system supplied section of the transaction view, since it will be invariant across applications managed within the same family of GTD libraries/directories.

GTD Application Panel Presentation. Transactions developed by the GTD system present panels to the terminal through a panel driver. This presentation server interprets TMS panels prepared by CODESTAR or by the GTD system which may support color, extended attributes, reverse video underscore, and other characteristics. Certain terminals receiving these panel presentations may not be capable of supporting multiple levels of terminal capability, but the panel presentation server still provides maximum functionality for the most capable terminal devices. The Transaction Mapping Service (TMS) module interrogates the IEC terminal and device tables IEC function 5) to determine the terminal capability where a panel is to be presented. The application designer can design terminal presentations using the maximum functionality of any terminal that would use this application. At the same time, these panel presentations can be adapted to terminal devices with less functionality.

Applications within the network can have the capability specified for each terminal name recorded in the IEC Terminal Table with a reference to the appropriate device characteristic. The IEC terminal controller can dynamically modify ('IEC=TRM.C') the characteristics of any terminal within the network at any or all of the systems within the network. This adapts maximum functionality of an application to the functionality of the target terminal.

GTD Documentation Report Definition—Language of Preference. GTD applications documentation is stored on TIOLR for the transaction user to access in one of the following ways:

Press F1 for HELP

Press F2 for GLOSSARY

Select INFO from menu

The documentation can be made available in multiple languages. The language of the documentation displayed depends on what the user has selected as his first and second language of preference (LP). The selections are made using the ITSS "Language of Preference" transaction, TSSLP.

The selection criteria of the report.generation (based upon language) is:

1. The report.generation declared for the primary LP if a report was defined for that LP.
2. The report.generation declared for the secondary LP if a report was defined for that LP.
3. The report.generation declared for ENGLISH if a report was defined for ENGLISH.
4. The report.generation defined as the default.

These reports must be defined on the system executing the transaction.

HELP Documentation. The organization of the HELP report.generation is as follows:

| Where: | rpt = report name defined by LP |
|---|---|
| | gen = generation name defined by LP |
| | panel = panel name for which HELP is provided |
| | soo = constant section name |
| | page = arbitrary page name(s) |

GLOSSARY DOCUMENTATION. The organization of the GLOSSARY report. generation is as follows:

rpt.gen.GLOSSARY.word.page

| Where: | rpt = report name defined by LP |
|---|---|
| | gen = generation name defined by LP |
| | GLOSSARY = constant chapter name |
| | word = word being defined |
| | page = arbitrary page name(s) |

INFO DOCUMENTATION. Selection of GTD System Documentation presents a submenu with the following options:

1. General Description
2. Technical Description

Selection of one of these options presents the text stored in the T report listed below. The glossary information for INFO is stored in the same report as for HELP.

General Description rpt.gen.GENERAL.sec.page

Technical Description rpt.genTECHNCL.sec.page

| Where: | rpt = report name defined by LP |
|---|---|
| | gen = generation name defined by LP |
| | chp = first 8 characters of menu description |
| | sec = arbitrary section name(s) |
| | page = arbitrary page name(s) |

GTD MENU HIERARCHY

The major functions of the GTD user interface are characterized in the top 2 levels of menu options. The GTD user is an application programmer or developer. The user interface menus, and the functions they support, are generic and can be implemented on any suitable platform to provide a consistent application development environment on each platform. FIG. 20 is a flow chart detailing the functions performed at the highest menu level according to the preferred embodiment of the present invention. The menu options provided to the user at the top level include the following functions:

1. EDIT TRANSACTION DEFINITION
2. GENERATE TRANSACTION VIEW/SOURCE PROGRAM
3. GENERATE PANELS
4. COMPILE TRANSACTION DEF/VIEWS/PANELS/PROCEDURES
5. FILE TRANSFER PANELS/PROCEDURES/VIEWS/DOCUMENTATION
6. EXIT

Menu item 1, EDIT TRANSACTION DEFINITION, provides functions which allow the application developer to characterize the application by providing functions to define and modify the application parameters and component parts. FIG. 23 is a flow chart of this Edit Transaction (hereinafter referred to as "ET procedure") describing these functions further.

Figure 44A:
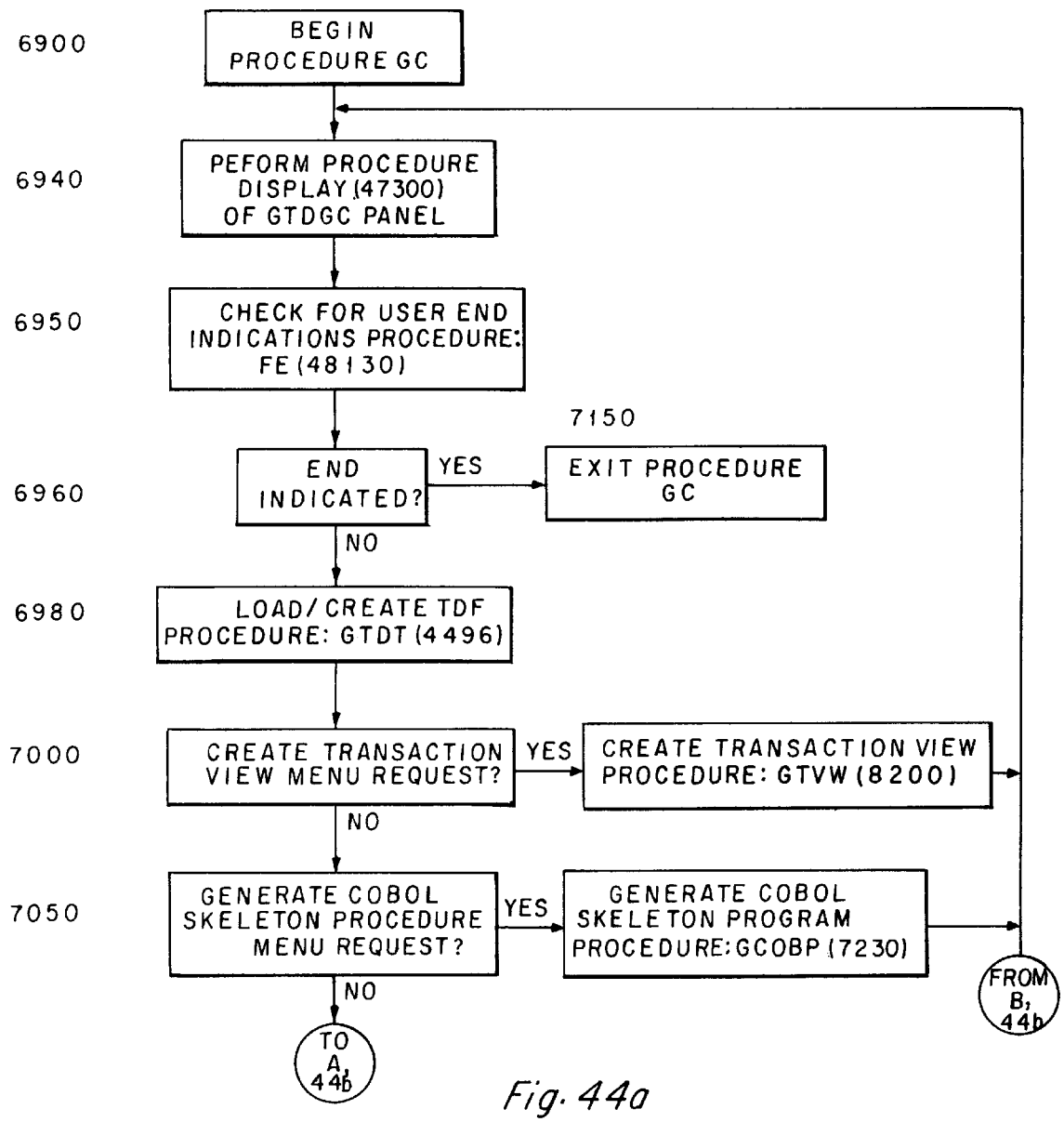
FIGS. 44a–b are a flow chart depicting the generate transaction/view, COBOL/C program (GC) procedure according to the preferred embodiment of the present invention.
Figure 44B:
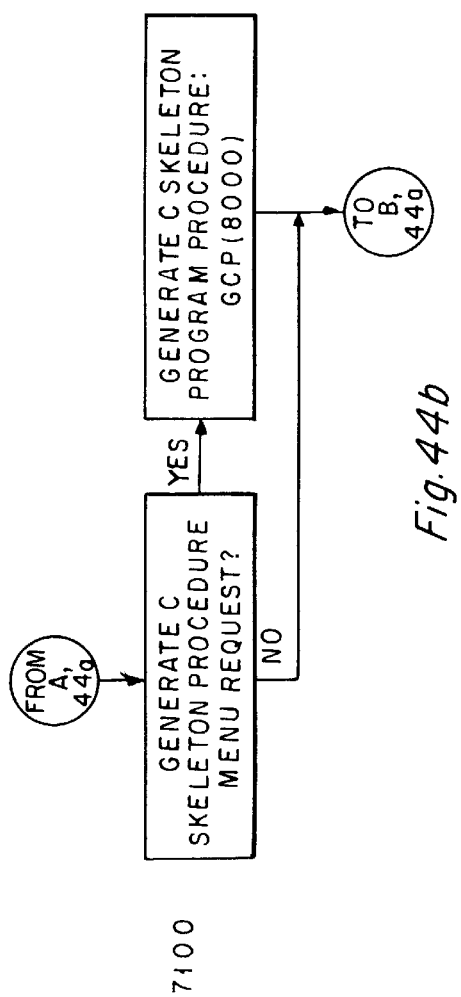

Menu item 2, GENERATE TRANSACTION VIEW/SOURCE PROGRAM, (hereinafter referred to as "GC procedure") provides functions which allow the application developer to generate the source files for the transaction view (the application data area) and programs. The transaction view and source programs are constructed so as to be compatible with the IET. Thus the required IET application interfaces are built into the data areas in the transaction view and into the program linkage for the application procedure. FIG. 44 depicts a flow chart of the preferred embodiment of the GC procedure, detailing these functions further.

Menu item 3, GENERATE PANELS, (hereinafter referred to as "GM procedure") provides numerous functions to allow the application developer to generate the system-provided panels, customized for his application and base panels for procedure dialog flow with the user. The GTD generates panels to be compatible with the IET. These generated panels have the fields required by the IET to perform its panel and menu dialog flow management. In addition, GTD generates menus which also support the IET user interface functions by providing consistent and well-defined common user interface functions. For the convenience of the developer these functions can also be performed by edit requests on the transaction view, procedure, and panels as provided by user interfaces included under menu item 1. However the developer may not need or wish to customize all the system-provided menus, information, glossary, and help screens thereby making menu item 3 functions useful. FIG. 47 depicts a flow chart of the preferred embodiment of GM procedure detailing these functions further.

Menu item 4, COMPILE TRANSACTION DEF/VIEWS/PANELS/PROCEDURES, (hereinafter referred to as "CTREQ procedure") provides the developer with the construction tools necessary to build a DAA application. Of utmost importance are the capabilities to generate the TDT and view tables required to characterize the application to the IET. Menu item 4 guarantees that applications built with GTD are constructed with consistent compile and link editor options for the DAA platform and ensure internal consistency within the application through the use of conditional and unconditional compilation options and the capabilities to compile land link all components in one process TION, into one load module. FIG. 50 depicts a flow chart of the preferred embodiment of the CTREQ procedure detailing these functions further.

Figure 61:
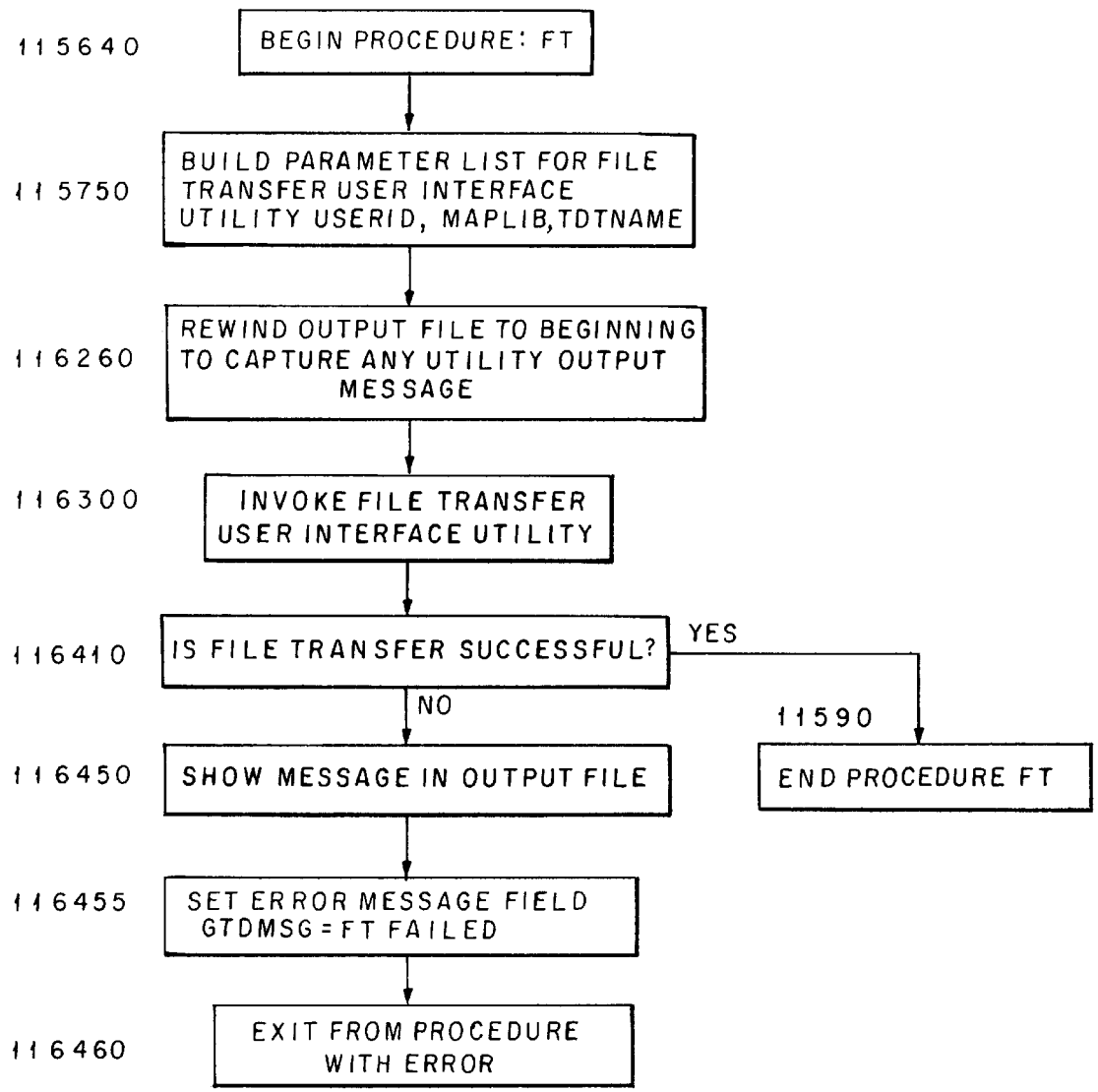
FIG. 61 is a flow chart depicting the file transfer panels/procedures/views/documentation (FT) procedure according to the preferred embodiment of the present invention.

Menu item 5, FILE TRANSFER PANELS/PROCEDURES/VIEWS/DOCUMENTATION (hereinafter referred to as "FT procedure") provides a utility to transfer all or part of the application source from one DAA machine to another. Menu item 6, EXIT, provides the user a clean exit from the GTD program. FIG. 61 depicts a flow chart of the preferred embodiment of the FT procedure, detailing these functions further.

Before considering each of these menus in detail, the GTD transaction view will be discussed. The GTD transaction view is a work area unique to GTD and should not be confused with the application transaction view, which is manipulated as a data file by GTD. This work area is used extensively throughout GTD as a place to: save the TDF header (all types) record fields, keep user inputs, and organize data for panel display. Length information for the name, pathname, userid, system identifier, object module external symbolic names data are limited by the maximum length supported by the most restrictive platform in the DAA system. Specific information concerning the transaction view, or work are, variables used by the preferred embodiment of GTD can be found in Appendix A.

Looking now at FIG. 20, depicting the top or first level GTD Main Menu User Interface Procedure, GTD initializes a work area, W (Block 5200), and sets the IEF1__TRAN variable in the work area at "GTD" (Block 5210). The date and time are obtained and formatted for display and saved in the work area variables ZDATE and ZTIME (Block 5220). GTD gets the USERID from the system (Block 5250), and sets the IEF1-USER variable in the work area (Block 5260) to that USERID. The ZUSER variable in the work area (Block 5370) is set to the value in the IEF1-USER variable.

A GTD user parameter file is opened for READ ONLY (Block 5400). The GTD user parameter file contains the information necessary for the system to present to the user some previously initialized fields from prior GTD sessions. This is done as a convenience for the user. The work area fields saved in the parameter file include: gtdmlib, gtdmmem, srcsid, srclid, srctdt, srcuid, tgtsid, tgtlid, tgtuid, tgtsw. In FIG. 20, the program tries to open the file (Block 5440). If unsuccessful, (Block 5450), there is no user information stored, and the program jumps to Block 5710. If the open is successful, the GTD user parameter file is read into a buffer(Block 5460) and the file is closed (Block 5470).

The work area variables are initialized with the parameter file variables, and the program proceeds to Block 5710, where it loads system-dependent environment information that applies to all users on the platform as well as information that is configurable by the user. The environment information that applies to all users on the platform includes: C compiler option, C compiler name, DAA system object/load library pathnames, DBMS software object/load library pathnames, DBMS copy source pathnames, DBMS pre-compiler pathname. This information is obtained from environment variables defined for all users. Other system-dependent environment information that is hard-coded into the program includes the specific names of all utilities, the specific options required by those utilities, the names of system, DAA and DBMS libraries. The system-dependent utilities include: C compiler, DBMS pre-compiler, DBMS to DBMS language translator, COBOL compiler, Linkage editor, editor, show file, copy, move, kill task utility, panel compiler, panel screen formatter (interpreter), panel editor, COBOL data map generator (compiler), COBOL to C translator.

It should be remembered that while the preferred embodiment depicts COBOL and C, the scope of the invention should not be limited in any way to these two languages. Additionally, an alternative to using the environment variables is to have a system environment information file which would have the above information, and possibly other information that is currently hard-coded in the program, stored in the file. This file can be loaded by GTD from a predefined location each time it is invoked, in much the same way as it loads environment variables in the preferred embodiment of the present invention.

Other environment information, which is configurable by the user, is also stored in environment variables. The configurable environmental information includes: DBMS source translator usage flag (indicating that an additional DBMS code translation step is required) and DAA test system library/object pathnames (the existence of which implies that the test pathnames should be used instead of the DAA production system library pathnames). Alternatively, this information could also be loaded from a GTD user configuration file when GTD is invoked.

After obtaining the system dependent configuration information, the procedure opens an output file unique to the user's userid (Block. 6120). The standard screen output and error output are then redirected to this file to be included in the screen information presented to the user (Block 6160). The output from the called utilities is then automatically written to the output file, and not to the display device, leaving GTD in control of the display device input/output. The output file remains open throughout the execution except when it is periodically rewound to purge existing data in the file. The output file can be displayed by GTD when errors from the utilities need to be examined by the application developer. An alternative implementation is to provide an output file for the utilities called from GTD and instruct the utilities, when called, to send their output to the indicated file. At Block 6180, the GTD initializes the user's terminal device to allow panel input and output.

Block 6260 displays a GTD panel. When the display procedure is complete, GTP calls the FE procedure (FIG. 22, beginning at Block 48130) to see whether the user has indicated he is finished using this procedure (Block 6300). If a user end is indicated, the program jumps to Block 6560. If not, the program checks to see whether the user requested the edit transaction definition menu option, GTDSEL=1 (Block 6350). The GTDSEL variable represents user input, typically, a menu selection, from the panel. When GTDSEL equals 1, the edit transaction definition procedure (ET, FIG. 23, starting at Block 102390) is called. When the ET procedure is complete, the program returns to Block 6260, to see if the user requires any other menu options from this panel.

If GTDSEL does not equal 1 at Block 6390, the procedure checks to see if GTDSEL equals 2, meaning the user requested the generate procedure or transaction view menu option. When GTDSEL equals 2, the generate procedure or transaction view procedure (GC, FIG. 44, beginning at Block 6900) is called. When the GC procedure is complete, the program returns to Block 6260, to see if the user requires any other procedures from this panel.

If GTDSEL does not equal 2 at Block 6430 the program checks to see if GTDSEL equals 3, meaning the user requested the generate panel menu option. When GTDSEL equals 3, the generate panel procedure (GM FIG. 47, beginning at Block 9030) is called. When the GM procedure is complete, the program returns to Block 6260, to see if the user requires any other procedures from this panel.

If GTDSEL does not equal 3 at Block 6470, the program checks to see if GTDSEL equals 4, indicating the user requested the compile/bind application menu option. When GTDSEL equals 4, the compile/bind application procedure (CTREQ FIG. 50, starting at Block 16440) is called. When the GM procedure is complete, the program returns to Block 6260, to see if the user requires any other options from this panel.

If GTDSEL does not equal 4 at Block 6510, the program checks to see if GTDSEL equals 5, indicating the user requested the transfer procedure/panels/views/documentation menu option. When GTDSEL equals 5, the file transfer procedure (FT FIG. 61, starting at Block 115640) is called. When the FT procedure is complete, or if GTDSEL does not equal 5, the program returns to Block 6260 to see if the user requires any other procedures from this panel.

When the user requests an end, the procedure creates a parameter file over the existing parameter file (Block 6560), to save transaction view variables from this GTD session so they are available to the user during the next GTD session. The program checks to see if the parameter file was successfully created (Block 6570). If it was not, the program jumps to Block 6820 and ends the program. If the create was successful, the buffer is initialized with the parameter values from the work area (Block 6590), the buffer is written to the parameter file (Block 6790), and the parameter file is closed (Block 6800). Block 6820 exits the program.

Figure 21:
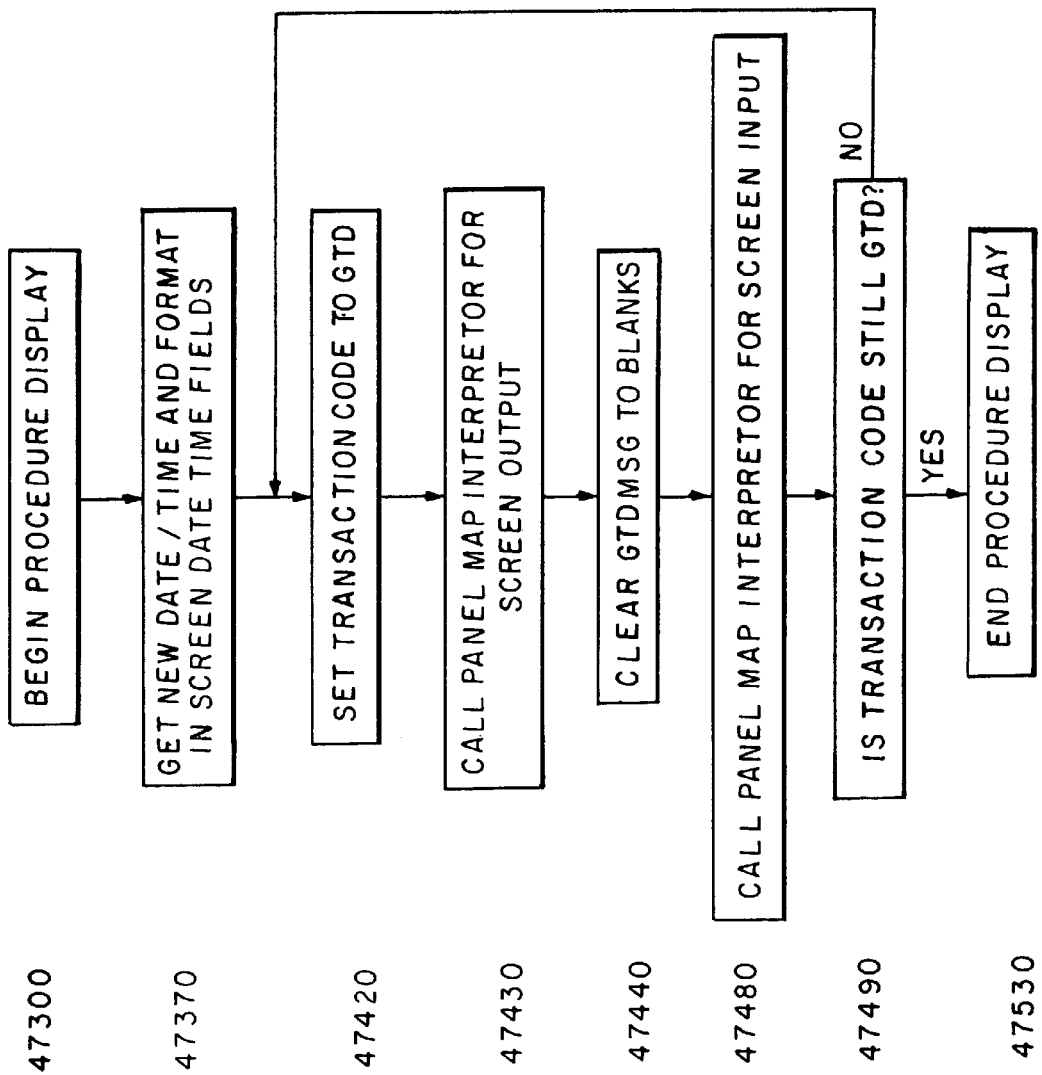
FIG. 21 is a flow chart depicting the procedure display procedure according to the preferred embodiment of the present invention.

GTD DISPLAY PANEL PROCEDURE. Looking now at FIG. 21, detailing the preferred embodiment of the GTD display panel procedure for displaying a panel to the user and then waiting for input from the user. It uses a panel interpretor to perform the panel device input to and output from the GTD transaction view fields which correspond to the display panel fields. It also maintains the current date and time for panel display, maintains the GTD value in the transaction field and clears the message field once the panel has been displayed.

The procedure obtains the new date/time and formats the panel date/time fields (Block 47370). The transaction code is set to "GTD" (Block 47420) and the panel interpreter is called to generate the screen output (Block 47430). GTDMSG is cleared to blanks (Block 47440) and the panel map interpreter is called to obtain user panel input (Block 47480). The procedure then checks to see if the transaction code is still "GTD" (Block 47490). If it is not, the procedure returns to Block 47420; if it is, the program exits the display panel procedure.

GTD FUNCTION END CHECKER FE PROCEDURE: Looking now at FIGS. 22a–b, the flow chart depicting the preferred embodiment of the GTD procedure to check for an end indicator. This FE procedure indicates that the user wants to exit from a particular panel function. On receipt of an end indication, the usual program function is to complete processing and terminate the current function. From the main menu, an end indication means that the user wishes to terminate the program. The user indicates an end indication in an number of ways. One way to terminate the program is to type an exit command in the GTDSEL user input field on the panel. This field is included on all GTD panels to support user exit commands (as well as other function defined commands). Another way is for the user to input an end or exit function key. In the current implementation of the present invention, this is function key 3, but any function key could be used. A function key input number is defined to correspond to the ief_funkey field in the work area or GTD transaction view.

Figure 22A:
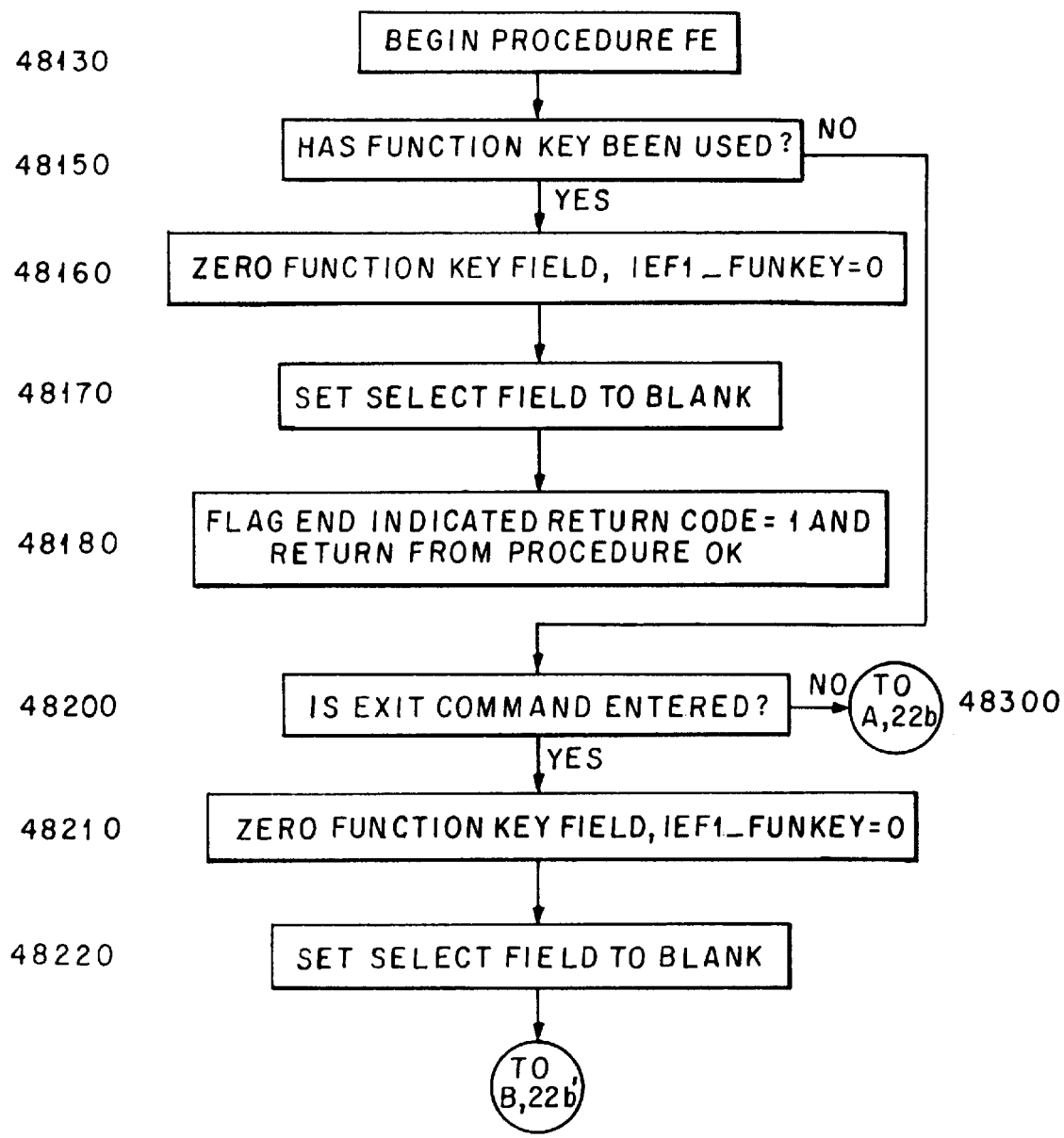

Starting with FIG. 22a, the FE procedure begins with Decision Block 48150 checking if the end function key was pressed. If the function key was not pressed, the procedure jumps to Decision Block 48200. If the function key was pressed, the procedure sets the function key field equal to zero, (Block 48160), and sets the select field to blank (Block 48170). At Block 48180, an end is indicated with a flag return code=1 and the program exits the procedure.

Decision Block 48200 checks if there is an 'x', or other preselected character, in the select field GTDSEL='x' OR 'X'. If there is an 'x' or 'X', then the function key field is set to zero and (Block 48210). The select field is set to blank (Block 48220). At Block 48230, an end is indicated with a flag return code=1 and the program exits the procedure.

At Decision Block 48300, the program checks if there is an 'end' in the select field GTDSEL='end' or 'END'. If not, then go to Block 48400. If so, the program sets the function key field to zero (Block 48310) and sets the select field to blank (Block 48320). At Block 48830, an end is indicated with a flag return code=1 and the program exits the procedure.

Block 48400 determines no end has been indicated and sets a flag equal to zero with a flag return code=0. The program ends procedure FE at (Block 48410).

Moving now to FIG. 23, at Block 102390, the ET procedure provides the interfaces necessary to define, edit and perform maintenance on application components, their characterization and their relationships. This information is stored in the TDF file. A copy of the TDF headers is saved in the GTD workarea (or GTD transaction view) in memory for program use, to be later stored in the TDF file. The format of the data portion of the headers is the same as the format of the TDF headers. The TDF component entries are also saved in a memory data structure for program use, to be later stored in the TDF file. The data structure used to store the TDF component entries is an array named the STDE or STDE table. The format of each STDE element is the same as the largest TDF component.

One of the major functions of the ET procedure is to define the application and maintain the application characteristic information in the TDF file in a consistent and structured manner. The application characteristic information includes application user dialog/session interface, and the application cooperative processing interface. GTD provides the application developer a structured method to quantify and edit this information in terms which can be saved in the TDF and used to construct the application load module. Included in the load module is a subset of the TDF and other information quantified in tables which are used by the IET during application execution. Information which is used to quantify the application dialog/session interface includes panels, the input and output procedures which support those panels, and the application profile view. Information which is used to quantify the application cooperative processing interface includes external and internal procedures as well as the input and output data views for those procedures. When the application is first being defined and no TDF exists, a set of default definitions are specified which define default names, locations of programs, panels and other items, as well as default definitions of system-provided procedures, panels and menus. These default definitions are extrapolated using a defined set of conventions from the name of the TDF file and path names provided by the user. These default definitions comprise a minimal essential subset of application parameters stored in the TDF header. In addition certain default component definitions are also set up. These component definitions are for panels, procedures, and menu entries provided to support the IET menu, help, information, and glossary management functions. These components are stored as panel, procedure, and menu records in the TDF file whenever a function within the ET procedure is performed.

The information in the TDF file allows GTD to locate each component of the application. According to the preferred embodiment of the present invention, the conventions used are as follows. The TDF and all panel and menu source (maps) are stored in a map library or directory. The path name of this library or directory is provided by the user and is kept in the GTDMLIB field of the GTD work area. It is not stored in the TDF. The TDF name is also provided by the user and stored in the GTDMMEM field of the GTD work area and in the GTDHMEM field of the TDF. The user-provided map library path name and TDF name are combined using machine-dependent file naming conventions and DAA conventions to yield the TDF file name. In the same way the GTD determines the file names of the transaction view source, the procedure source, panel and menu source, the view source, the TDT source, the TDT objects, the view objects, the panel and map objects, the procedure objects, and the load module. In the UNIX implementation of the preferred embodiment of the invention, the files are located using the listed path name, file name and extension conventions. Specific information regarding these files is located in Appendix B.

Other DAA application files exist or are used temporarily by GTD but their usage is generally hidden from the application developer. In some cases, specifically, with objects, the GTD file location conventions are different because of restrictions in compiler file output capabilities. In UNIX objects are created in the source (GTDSLIB) directory; on a mainframe, objects are created in the object (GTDOLIB) library. These slight differences in GTD implementation do not affect the portability of the application or affect the GTD development environment as seen by the application developer.

Another function of the second level ET procedure is the provision of an interface for selecting and identifying component (panels, procedures, views, and maps) source for editing or modification. Each of the second level procedures of the ET procedure will now be considered. Discussion of any other procedures called during execution of a specific second level procedure will follow discussion of the particular second level procedure.

Figure 23B:
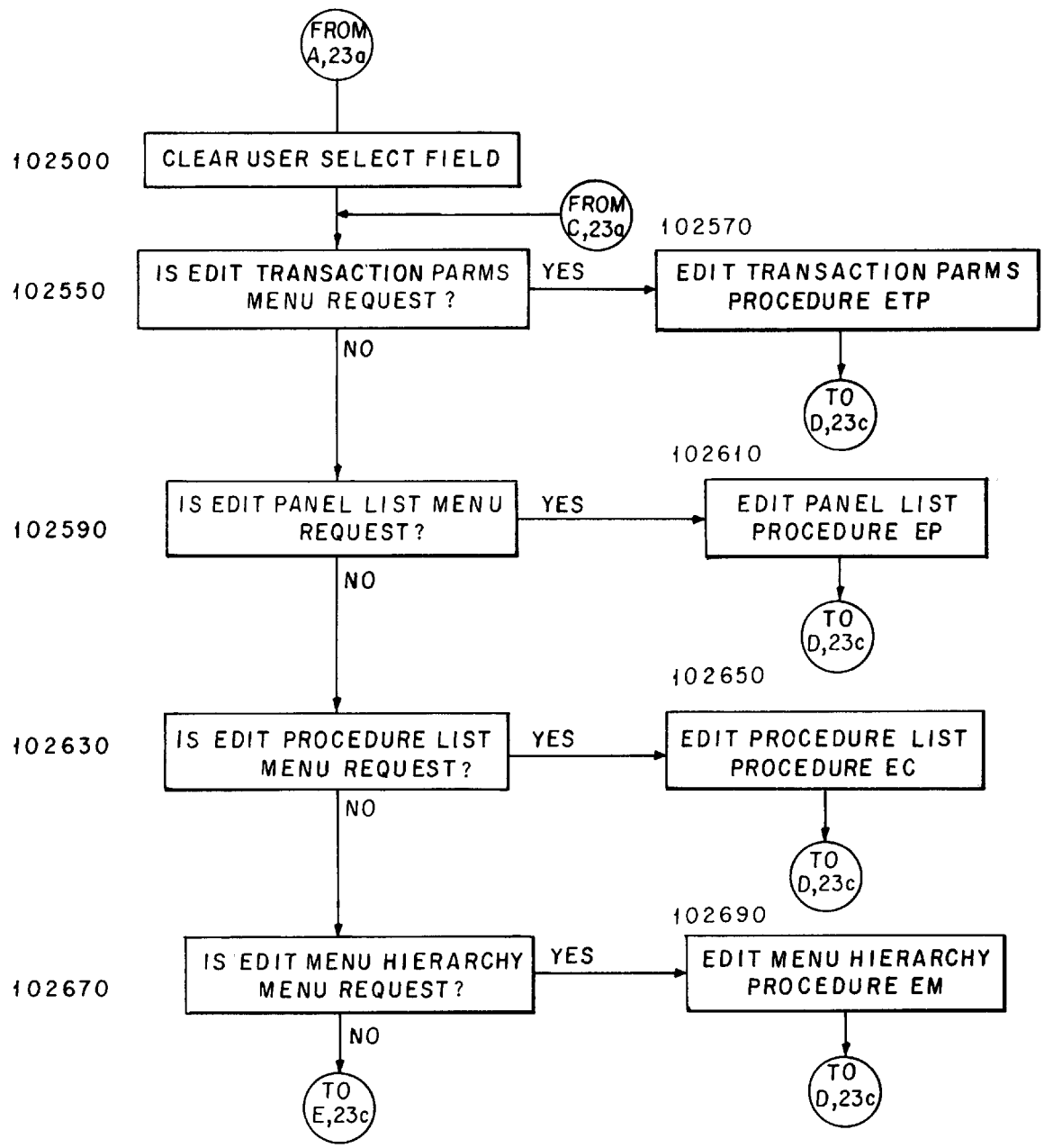
Figure 24B:
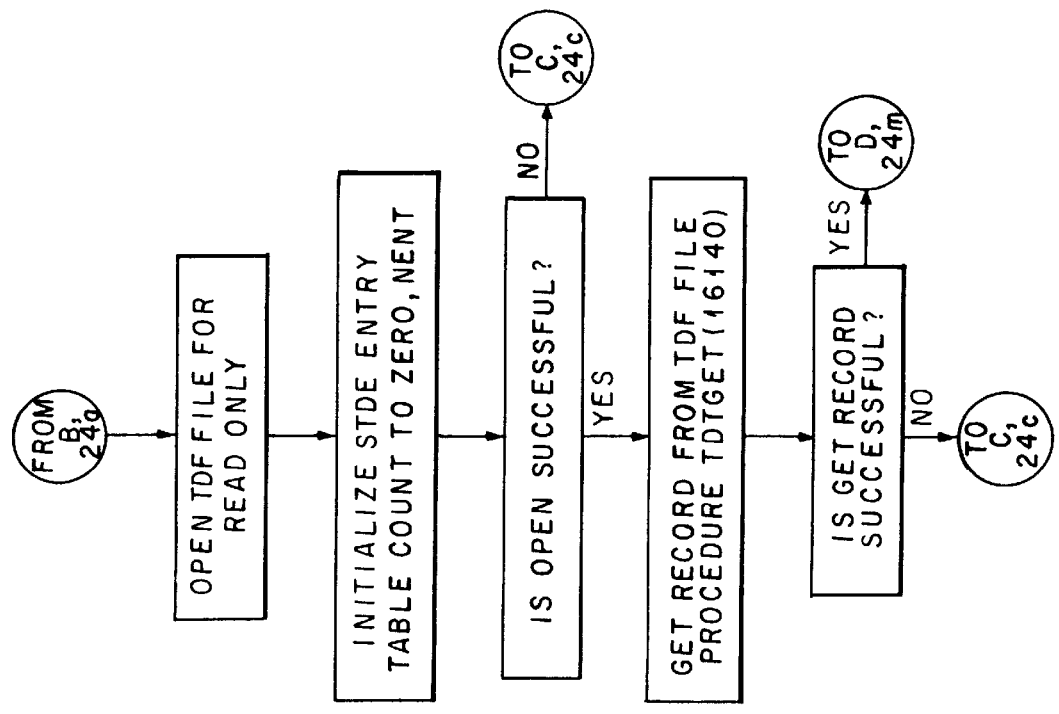
FIGS. 24a–r are a flow chart depicting the GTD get TDF (GTDT) procedure according to the preferred embodiment of the present invention.
Figure 24A:
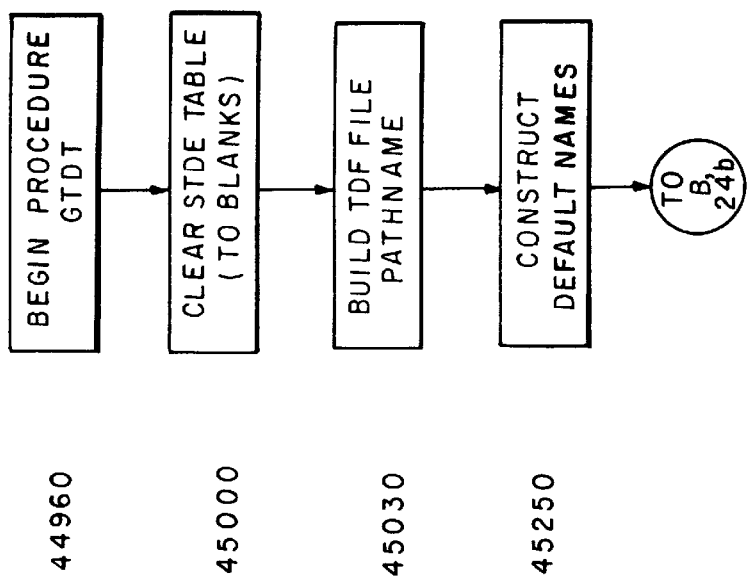
Figure 24C:
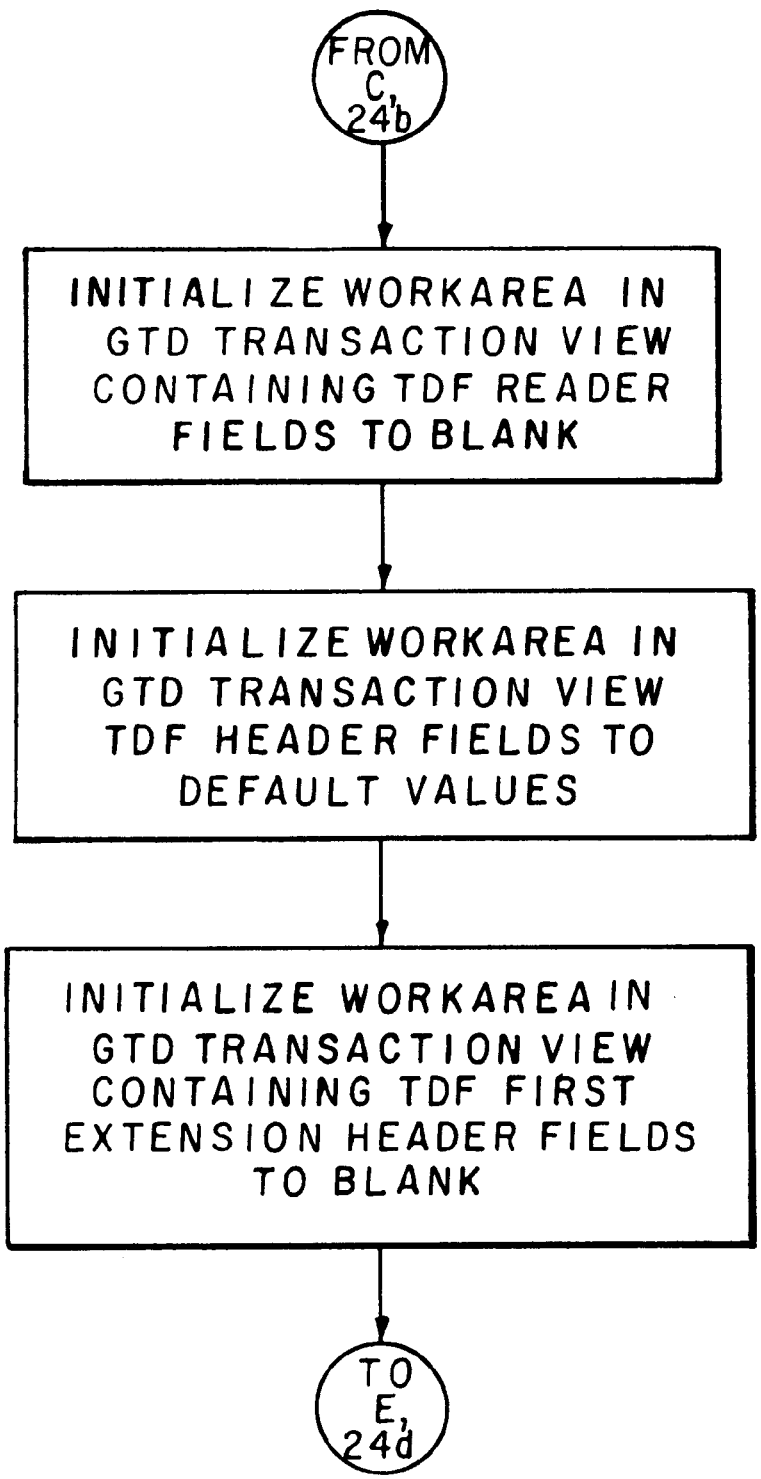
Figure 24D:
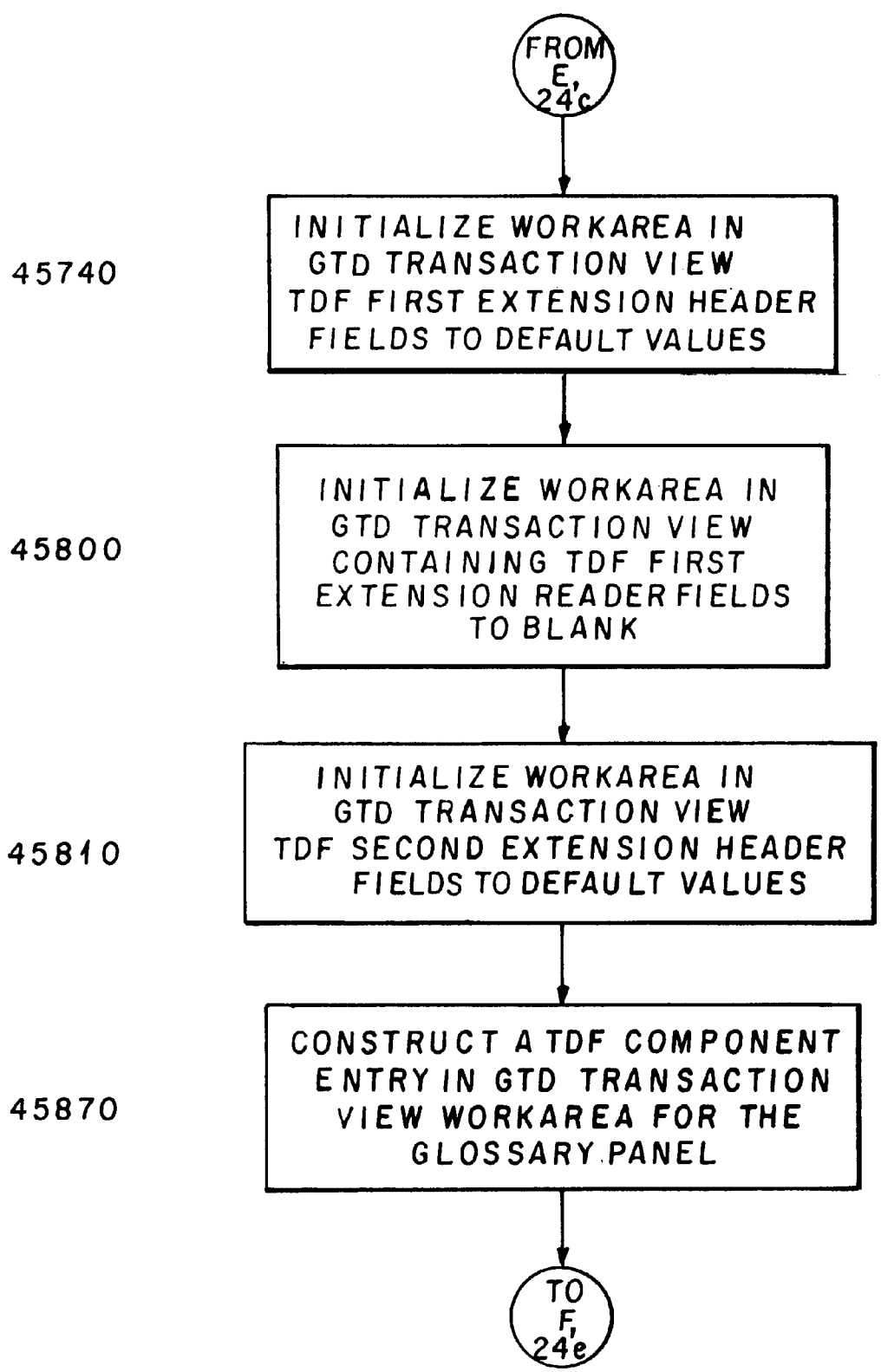
Figure 24F:
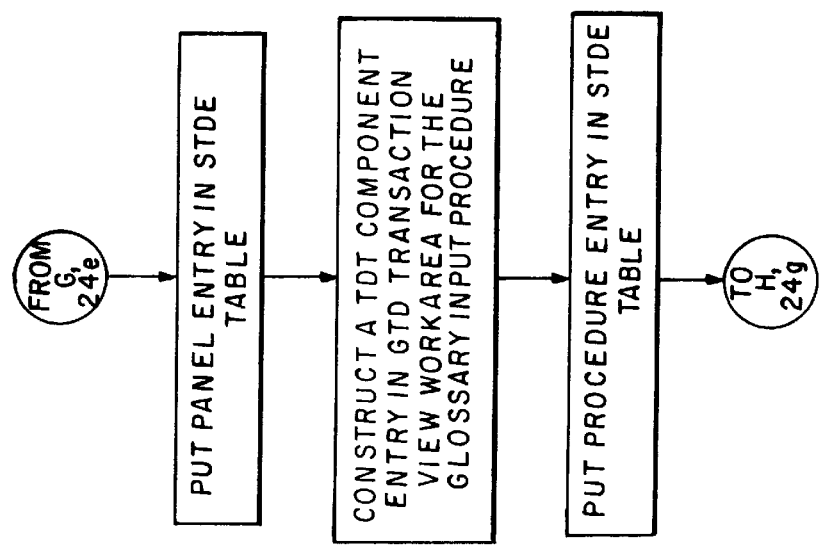
Figure 24E:
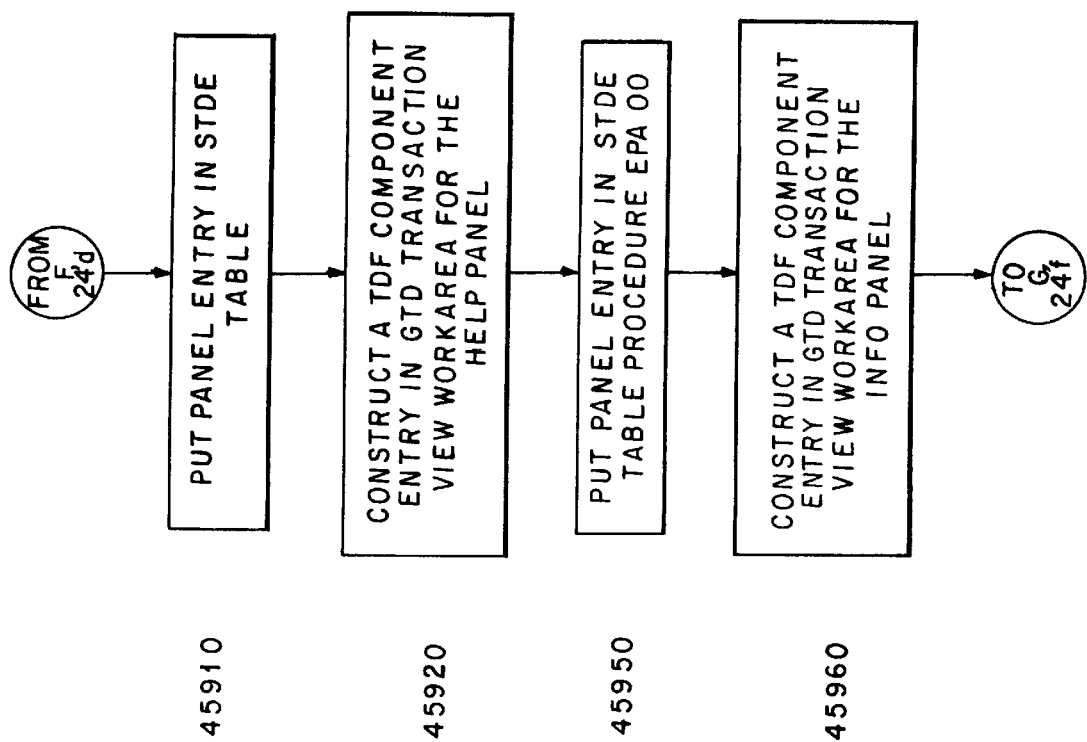
Figure 24J:
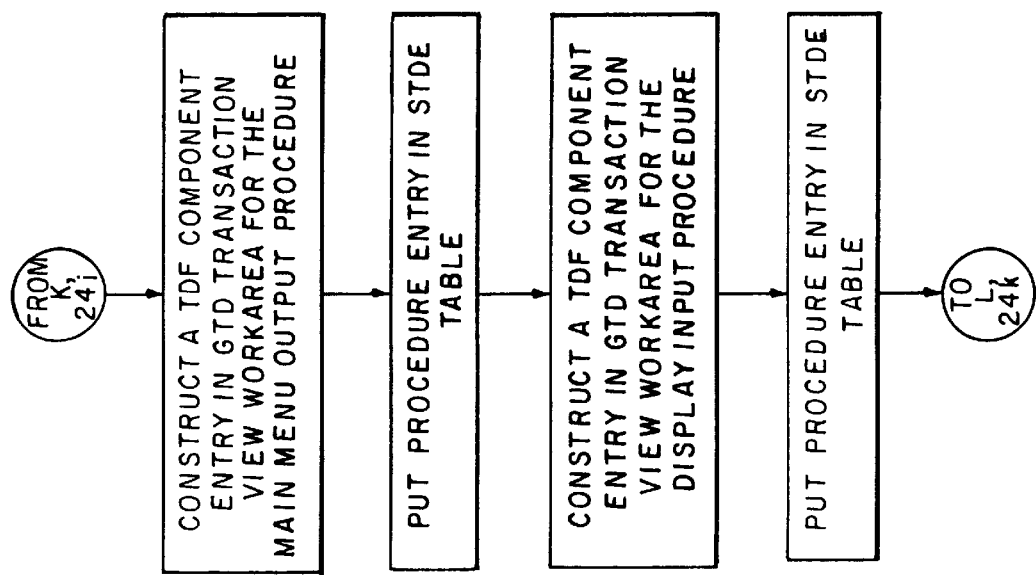
Figure 24I:
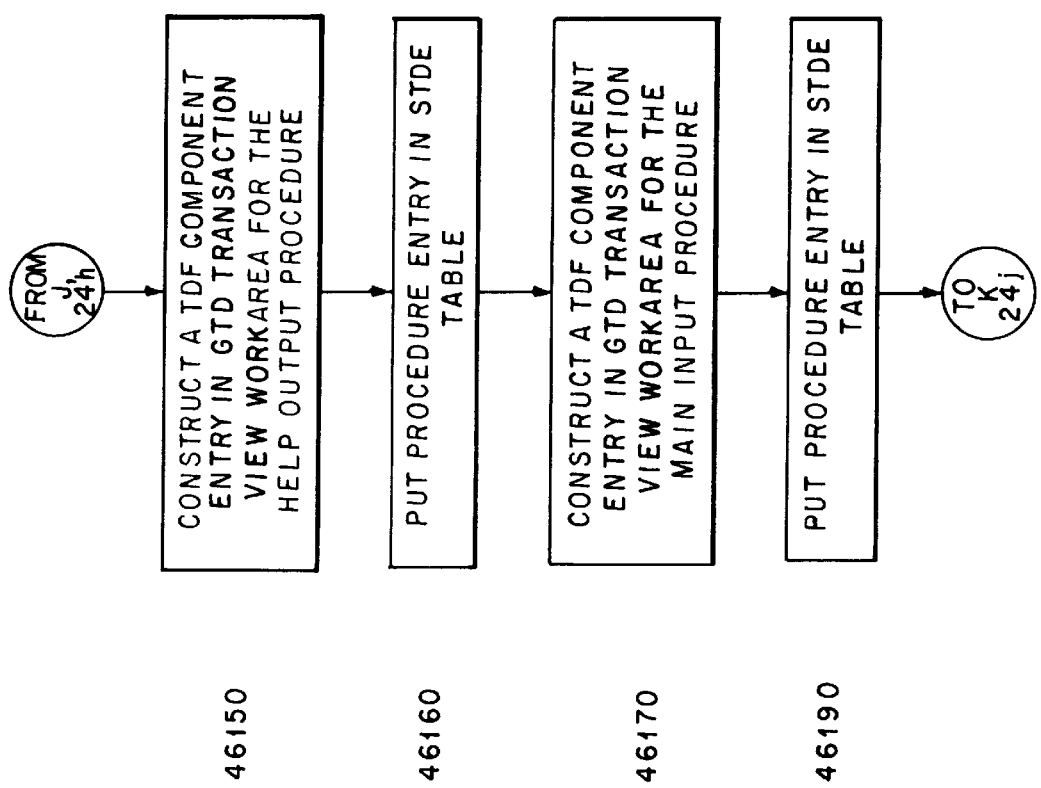
Figure 24L:
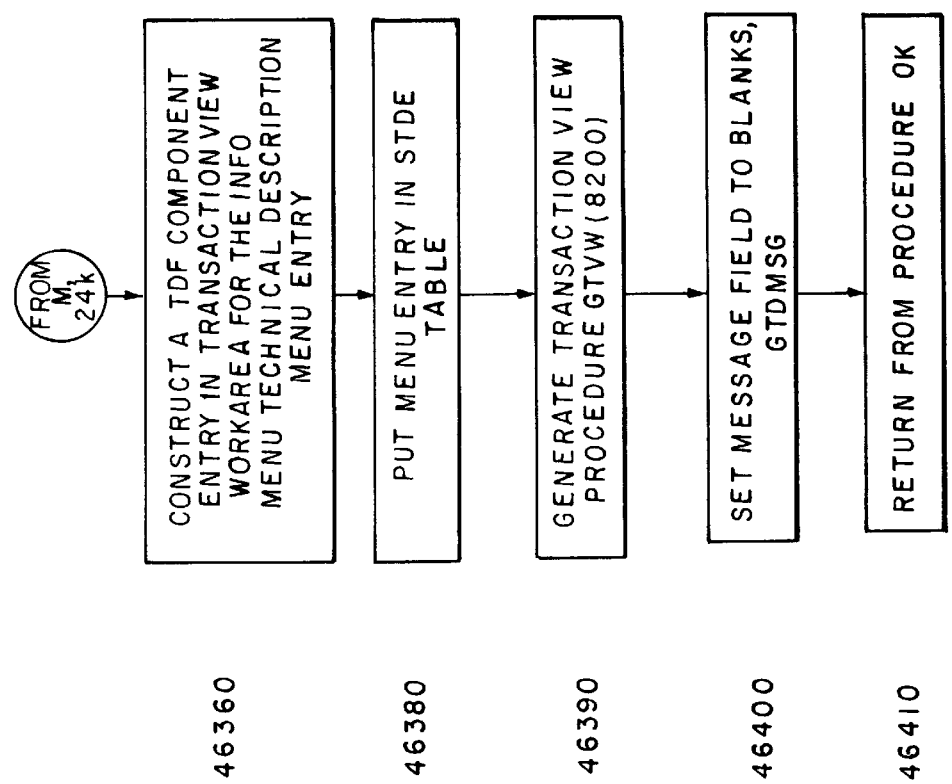
Figure 24K:
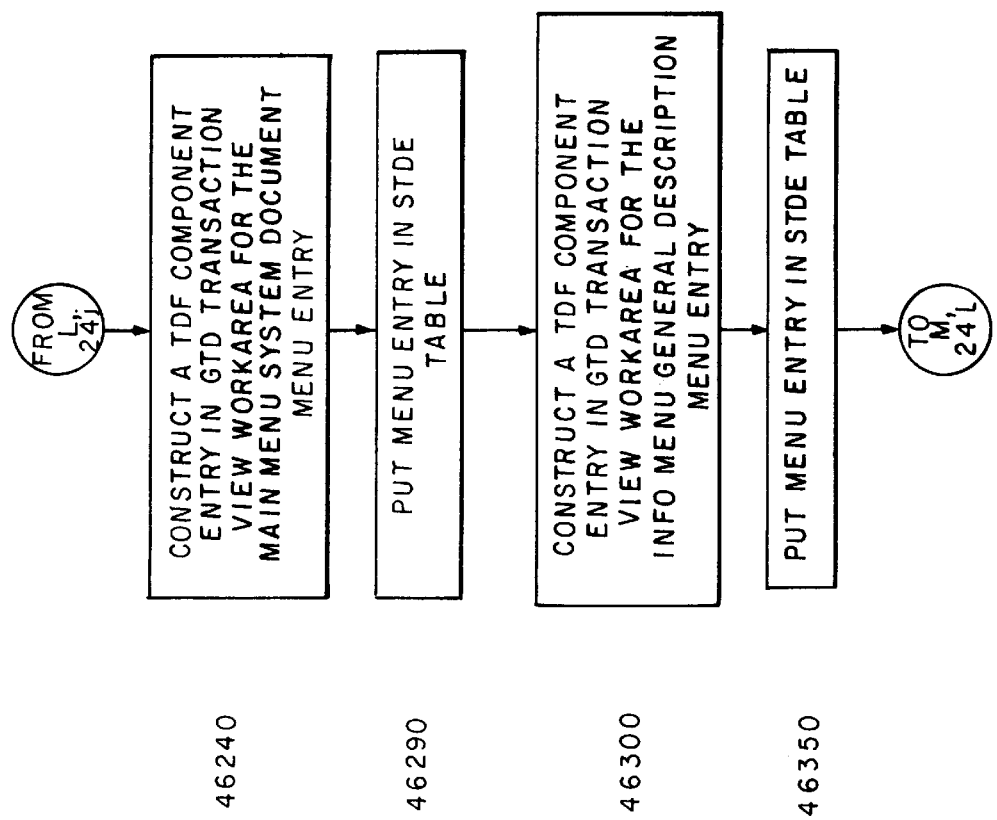
Figure 24M:
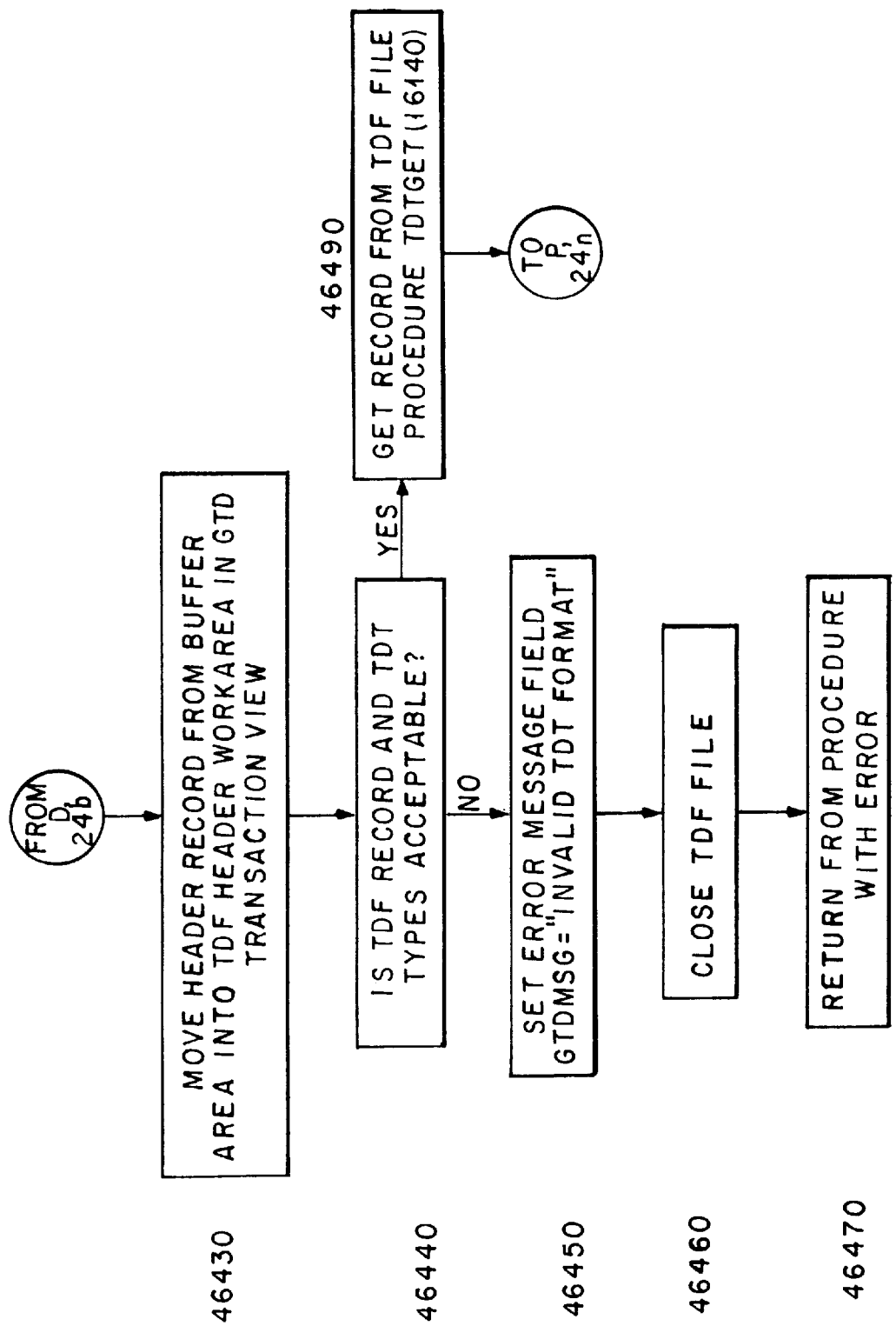
Figure 24O:
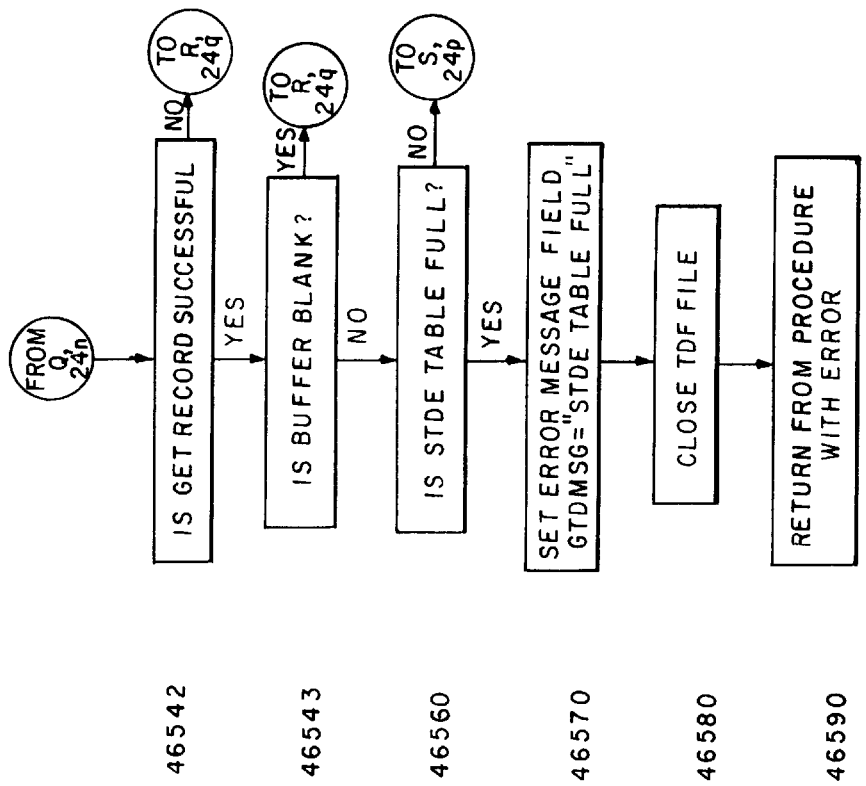
Figure 24N:
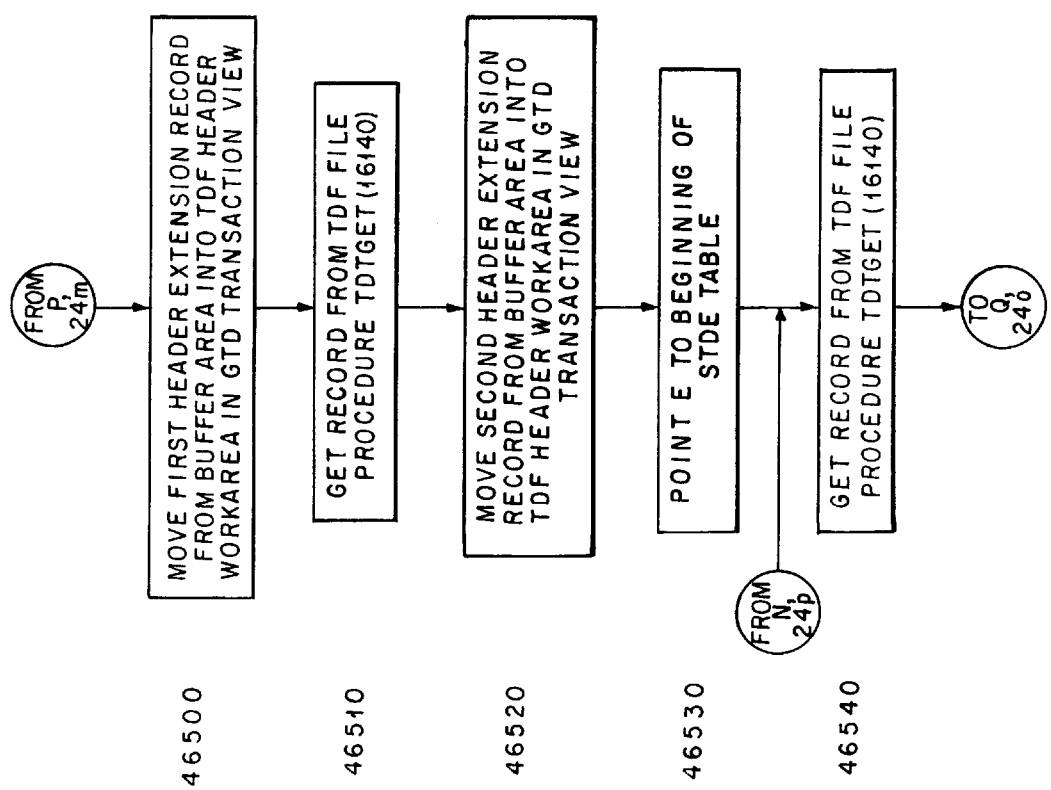
Figure 24P:
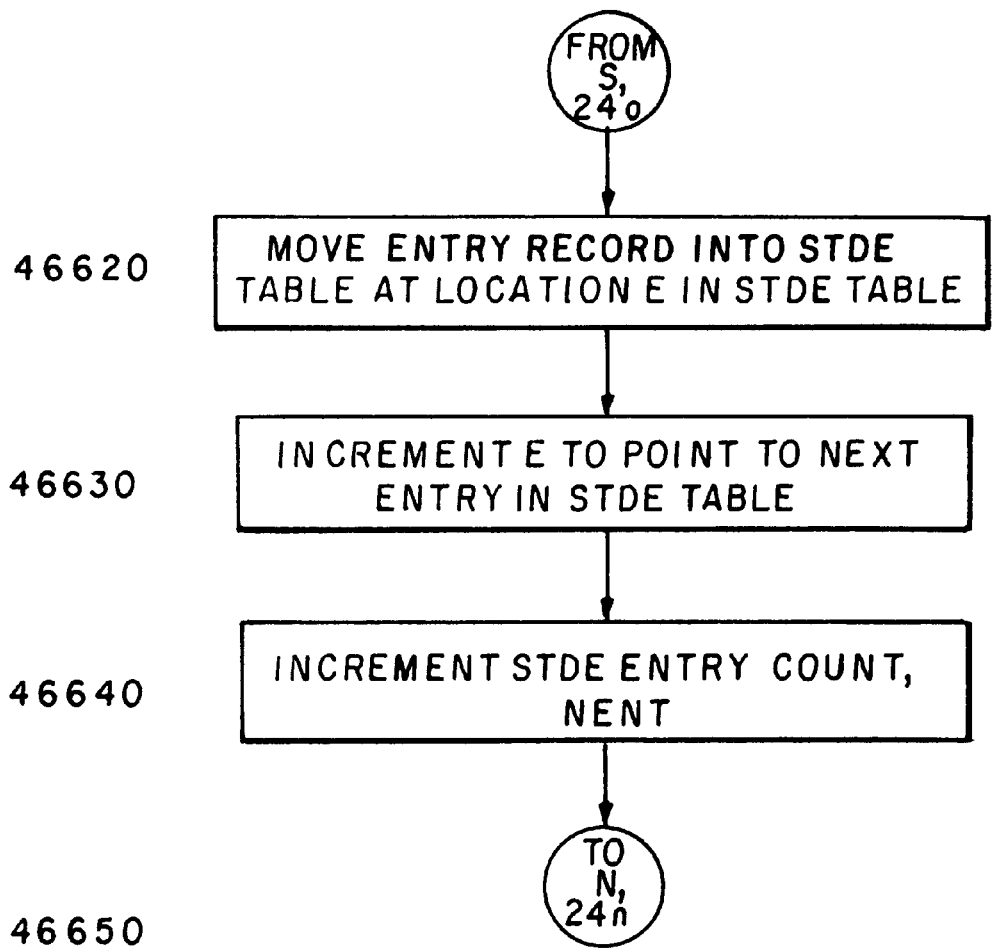
Figure 24Q:
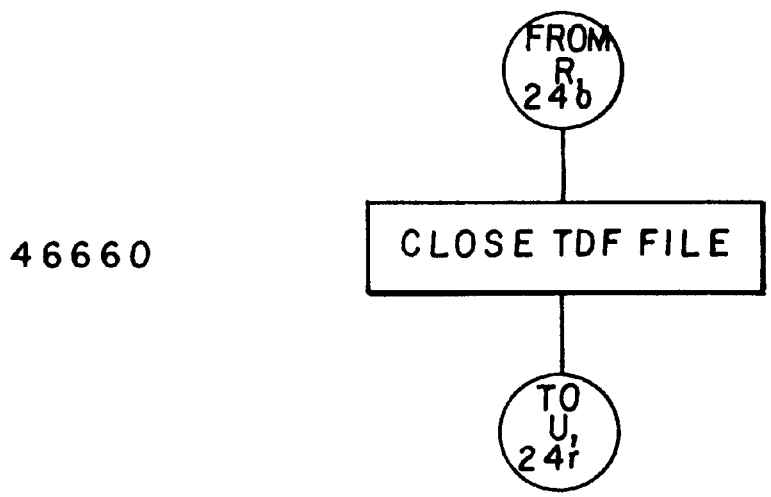

EDIT TRAN PARAMETERS. This third level procedure provides a display panel which includes information from the TDF header, the TDF first extension header, and the TDF second extension header. The user can change the information on this display panel as appropriate and have it saved into the TDF. FIGS. 23a–c depict the flow chart of the preferred embodiment of the ETP procedure, detailing these functions further.

This procedure provides a way for the a application designer to define the basic parameters of the transaction. The designer must specify the name of the TDT and the MAPLIB that contains it. If this is the first reference to the TDT within the MAPLIB, the system will assume the libraries/directories are to be SRCLIB, OBJLIB, LOADLIB, DBRMLIB, CNTLLIB, and MAPLIB; the transaction view is to be formed by extending the TDT name with the suffix TVW (tdtTVW); and the documentation indicates the TDT name is the report name while EOO is the generation name (tdt.EOO).

Any of these default specifications can be changed by the application designer. Once library/directory names have been specified, they should remain unchanged throughout the life of the transaction definition. The documentation report.generation can be changed at any time. This allows a convenient way to release new application documentation.

The GTD edit transaction definition (hereinafter referred to as "ET procedure") begins at block 102420 by performing the procedure to display a panel (FIG. 21, Block 47300), electing to display the GTDET panel. This panel contains a list of the third level procedure selections. Block 102440 performs the FE procedure (FIG. 22, Block 48130) to check for user input end indications. If an end is indicated, the program jumps to Block 102850 and exits the ET procedure. If an end is not indicated at Block 102480, the procedure performs the load/create TDF procedure known as GTDT procedure (FIG. 24, Block 44960) and checks to see if the load/create was successful(Block 102485. If the load/create was successful, the procedure jumps to Block 102550. If not, the procedure sets the number of entries in the STDE table to −1 to indicate no STDE table (Block 102490) and clears the user select field (Block 102500).

Figure 27:
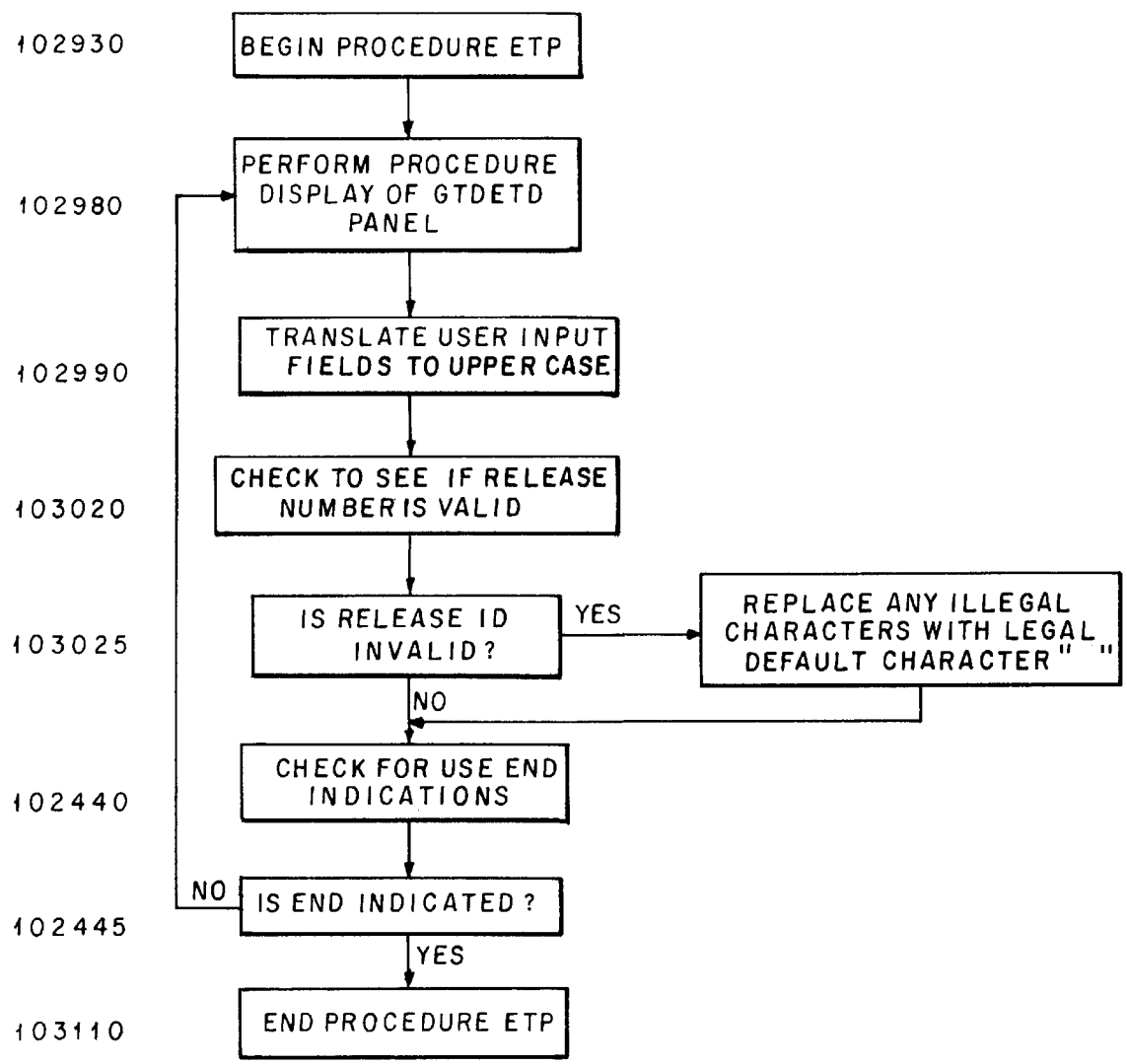
FIG. 27 is a flow chart depicting the edit transaction parameters (ETP) procedure according to the preferred embodiment of the present invention.
Figure 28A:
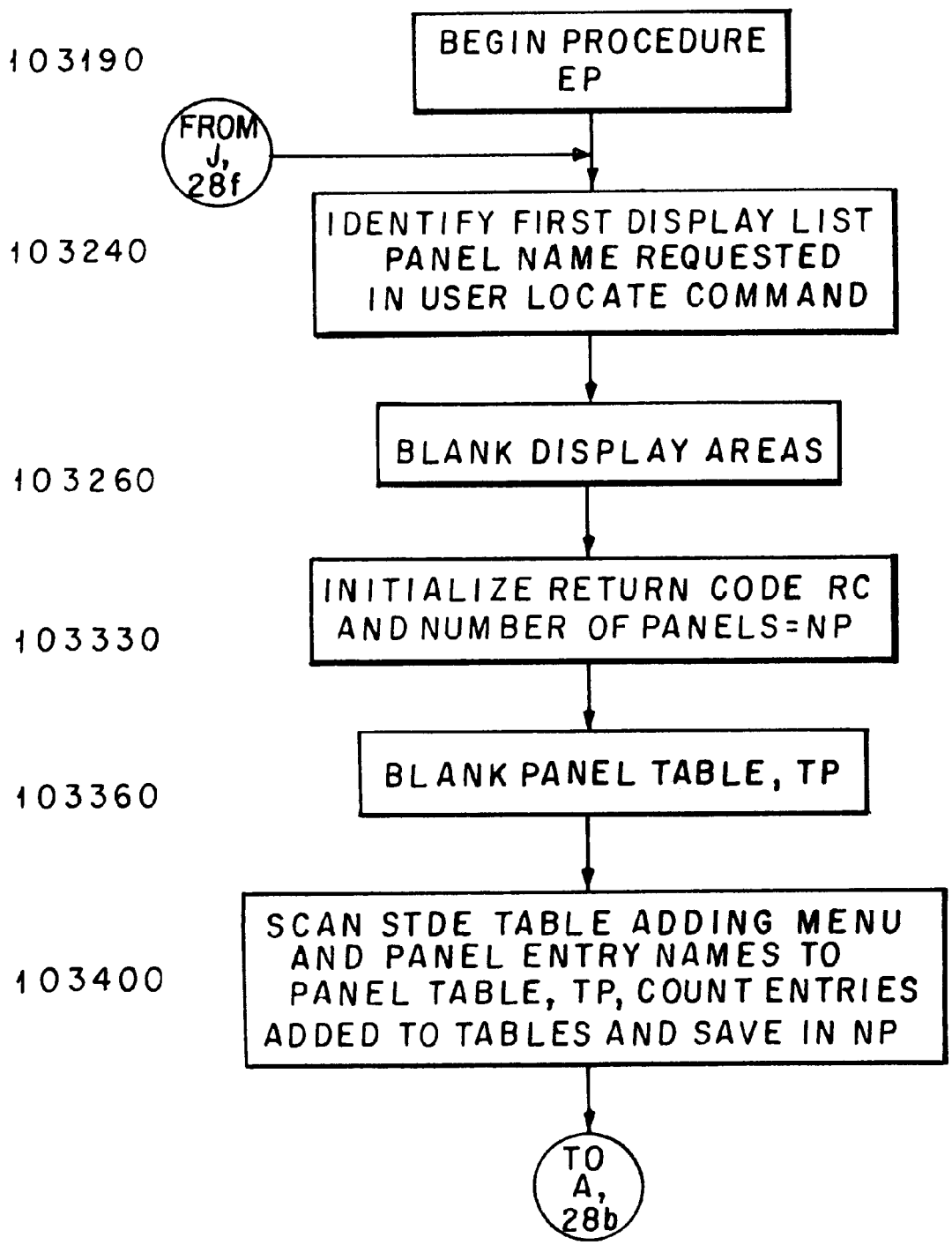
FIGS. 28a–f are a flow chart depicting the edit panel list (EP) procedure according to the preferred embodiment of the present invention.
Figure 28B:
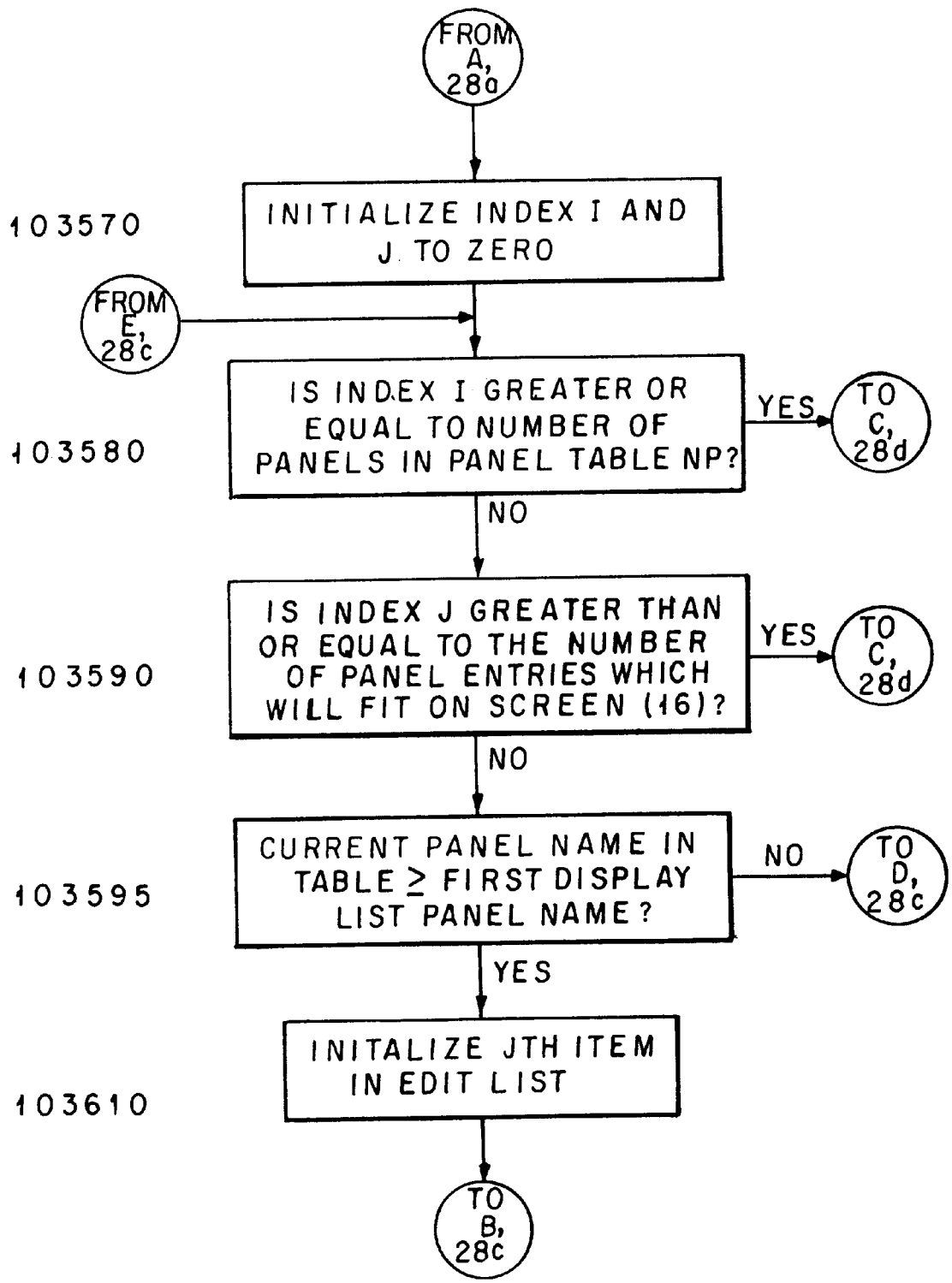
Figure 28C:
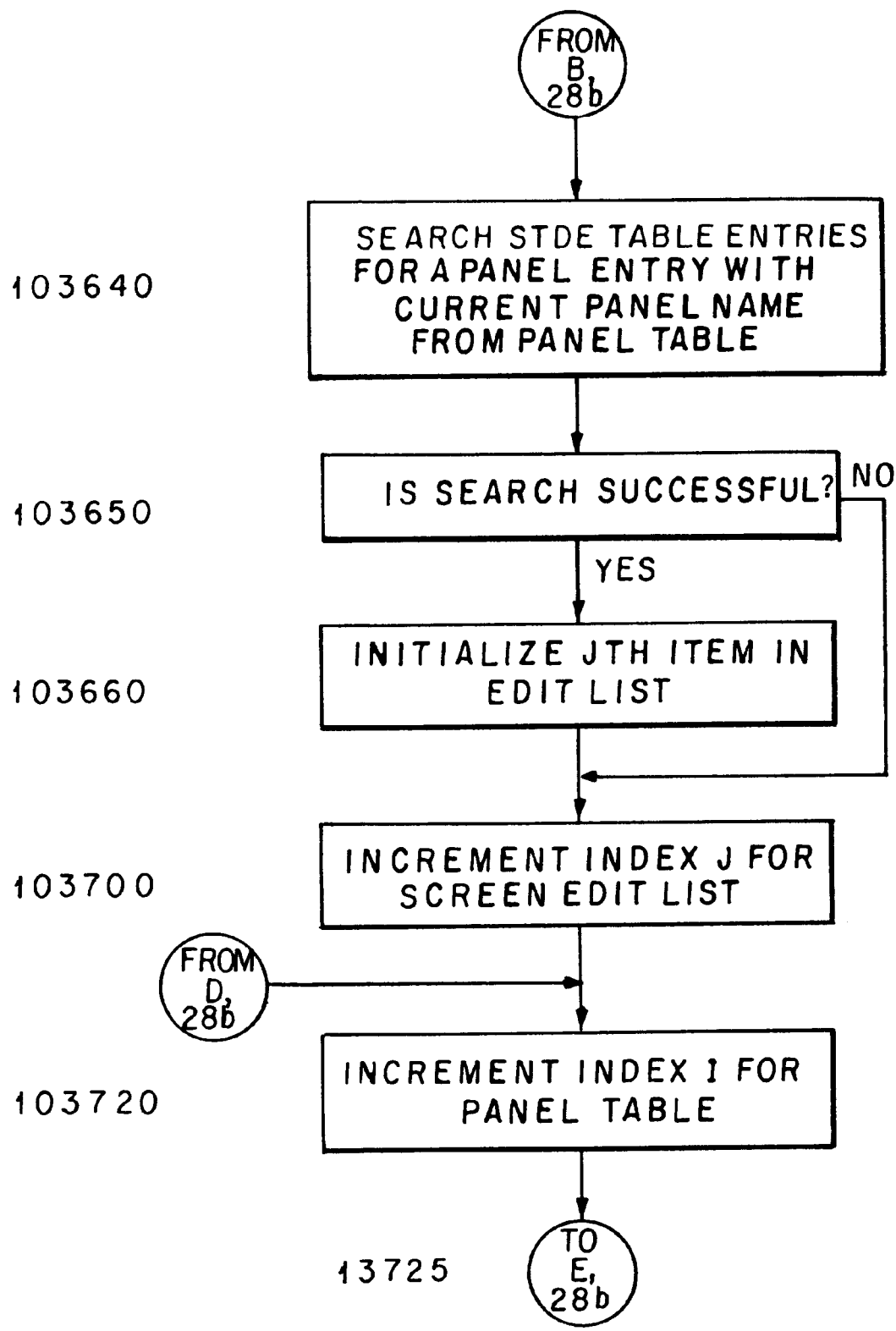
Figure 28D:
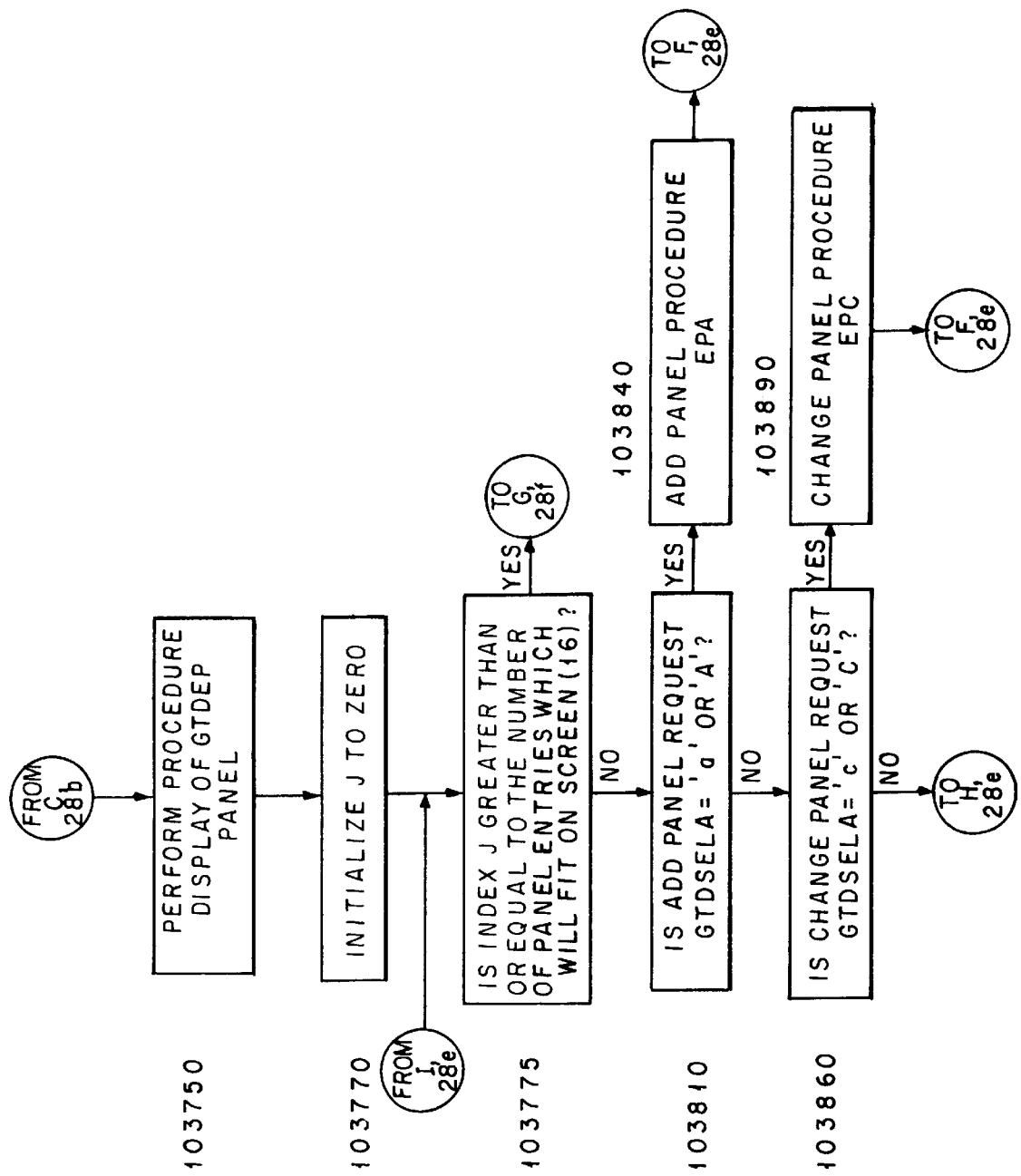
Figure 28E:
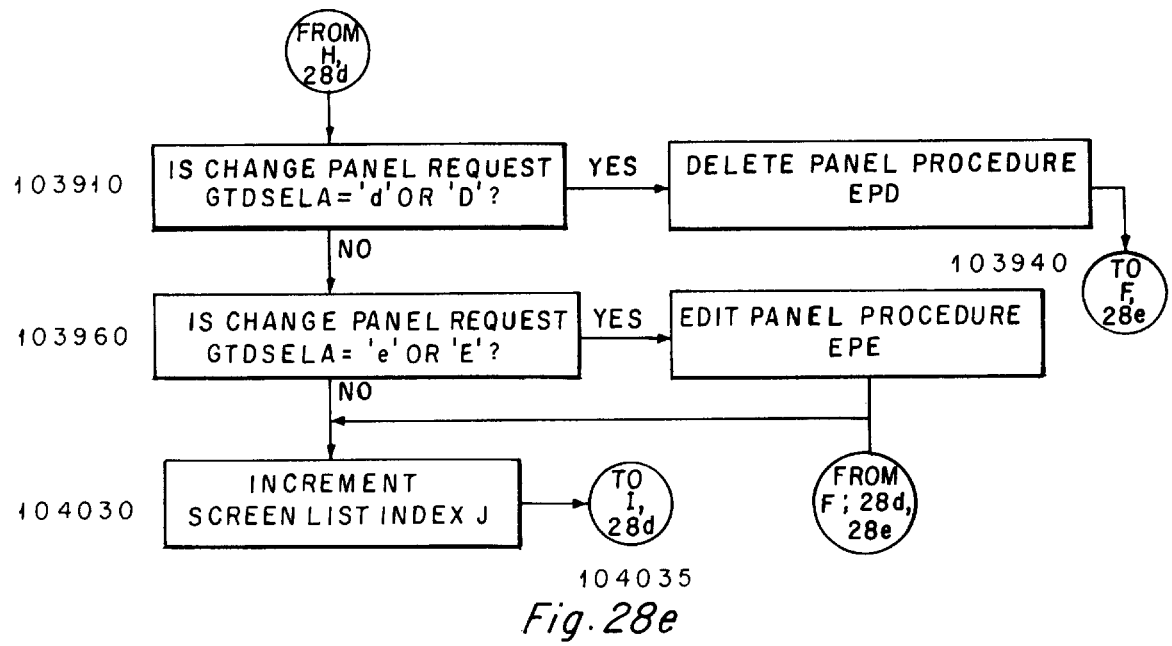
Figure 28F:
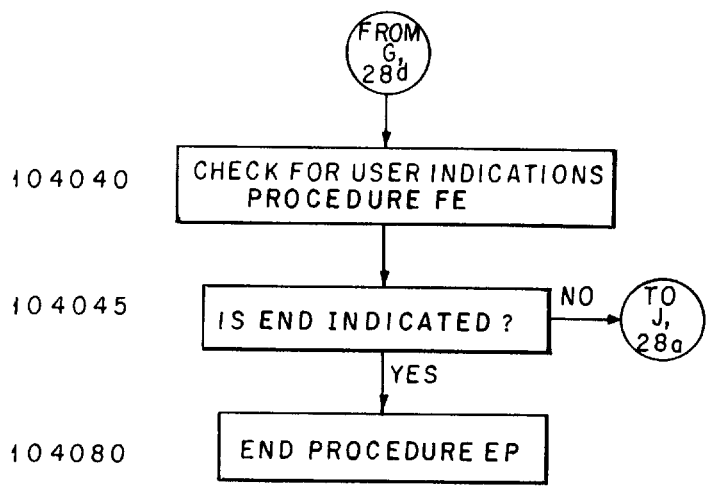

Decision Block 102550 checks to see if there is an edit transaction parameters request, GTDSEL=1. If there is, the edit transaction parameters procedure (FIG. 27, Block 102930) is performed and the procedure jumps to Block 102810. If there is not an edit transaction parameter request, the procedure checks to see if there is an edit panel list request, GTDSEL=2 (Block 102590). If there is, the edit panel list procedure (FIG. 28, Block 103190) is performed and the procedure then returns to Block 102810.

If there is not an edit panel list request, the procedure checks to see if there is an edit procedure list request, GTDSEL==3 (Block 102630). If there is, the edit procedure list procedure (FIG. 30, Block 106610) is performed and the procedure continues at Block 102810. If there is no edit procedure list request, the procedure checks to see if there is an edit menu hierarchy request, GTDSEL=4 (Block 102670). If there is, the edit menu hierarchy procedure (FIG. 37, Block 110280) is performed and the procedure jumps to Block 102810.

Figure 33:
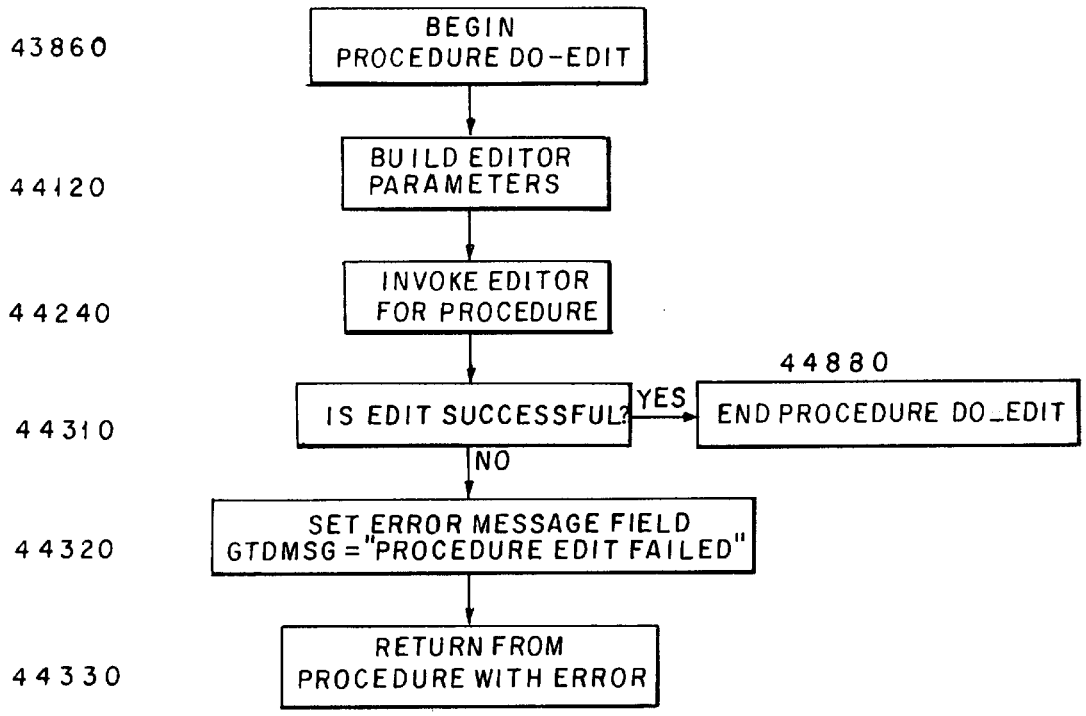
FIG. 33 is a flow chart depicting the edit filename (DO-EDIT) procedure according to the preferred embodiment of the present invention.

If there is no edit menu hierarchy request, the procedure checks to see if there is an edit language list request, GTDSEL=5 (Block 102710). If there is, the edit language list procedure (FIG. 40, Block 113070) is performed and the procedure continues at Block 102810. If there is no edit language list request, the procedure checks to see if there is an edit transaction view request, GTDSEL=6 (Block 102750). If there is, the fully qualified name of the transaction view file is built and the edit procedure (FIG. 33, Block 43860) is called to bid an editor. Once the edit is complete, or if there was no edit transaction view request, the procedure proceeds to Block 102810.

At this point, the procedure writes out the TDF file and then (Block 102815) checks to see if the write is successful. If it is not, the procedure sets the error message field, GTDMSG to equal "TDT WRITE FAILED" and moves to Block 102420. If the write is successful, the procedure returns to Block 102420, to await another display of the GTDET panel.

GTD GET TDF; GTDT PROCEDURE. According to FIGS. 24*a–r* which depict the preferred embodiment of this procedure, the GTDT procedure loads a TDF file into memory. The header records are stored in appropriate areas in the transaction view and the panel, procedure, language, and menu entry component records are stored in the STDE table. If no TDF file exists, then the memory areas are initialized with default TDF file values. The format of the TDF file records, and consequently the format of the transaction view header record work areas, as well as the STDE table entries, are documented in the TDF documentation.

The GTD GET transaction definition file (TDF) procedure begins by clearing the STDE table entries to blank (Block 45000) and building a TDF file pathname (Block 45030) using the MAPLIB pathname (gtdmlib), the TDT name (gtdmmem), and the suffix ".tdt". The procedure constructs default component names for the system panels and default application profile view and stores them in the variables listed: main menu, variable gtdhmenu; information menu, variable gtdhimnu; information panel, variable gtdhinfo; help panel, variable gtdhhelp; glossary panel, variable gtdhglos; and profile view, variable gtdhpvw (Block 45250). It should be recalled that these names have been selected as a matter of choice and should not in any way limit the scope of the present invention. The default component names are constructed by using the TDT name as stored in gtdmmem and appending a suffix which differentiates the various components (e.g., MENU for the main menu, IMNU for the information menu, etc.

Figure 25B:
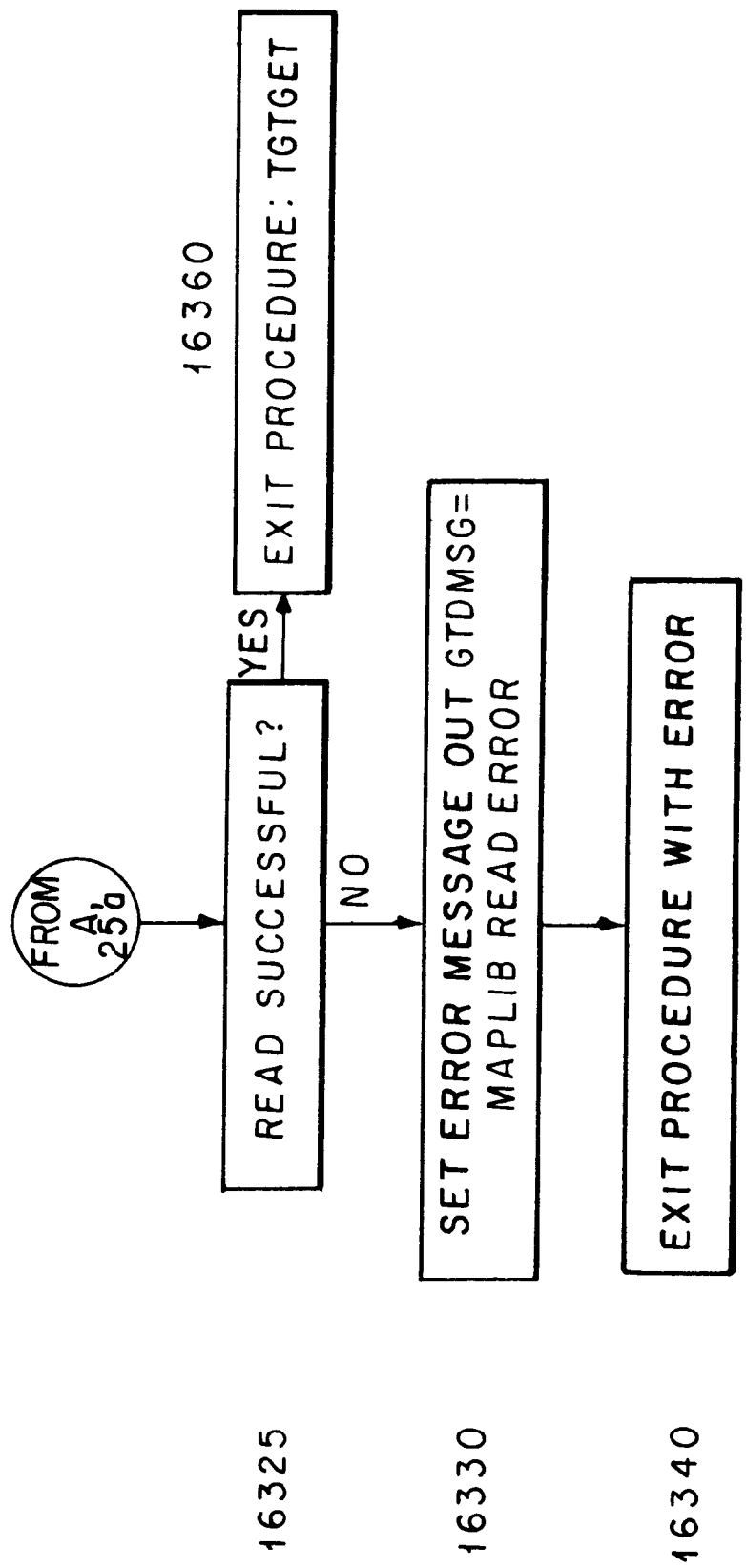
Figure 26A:
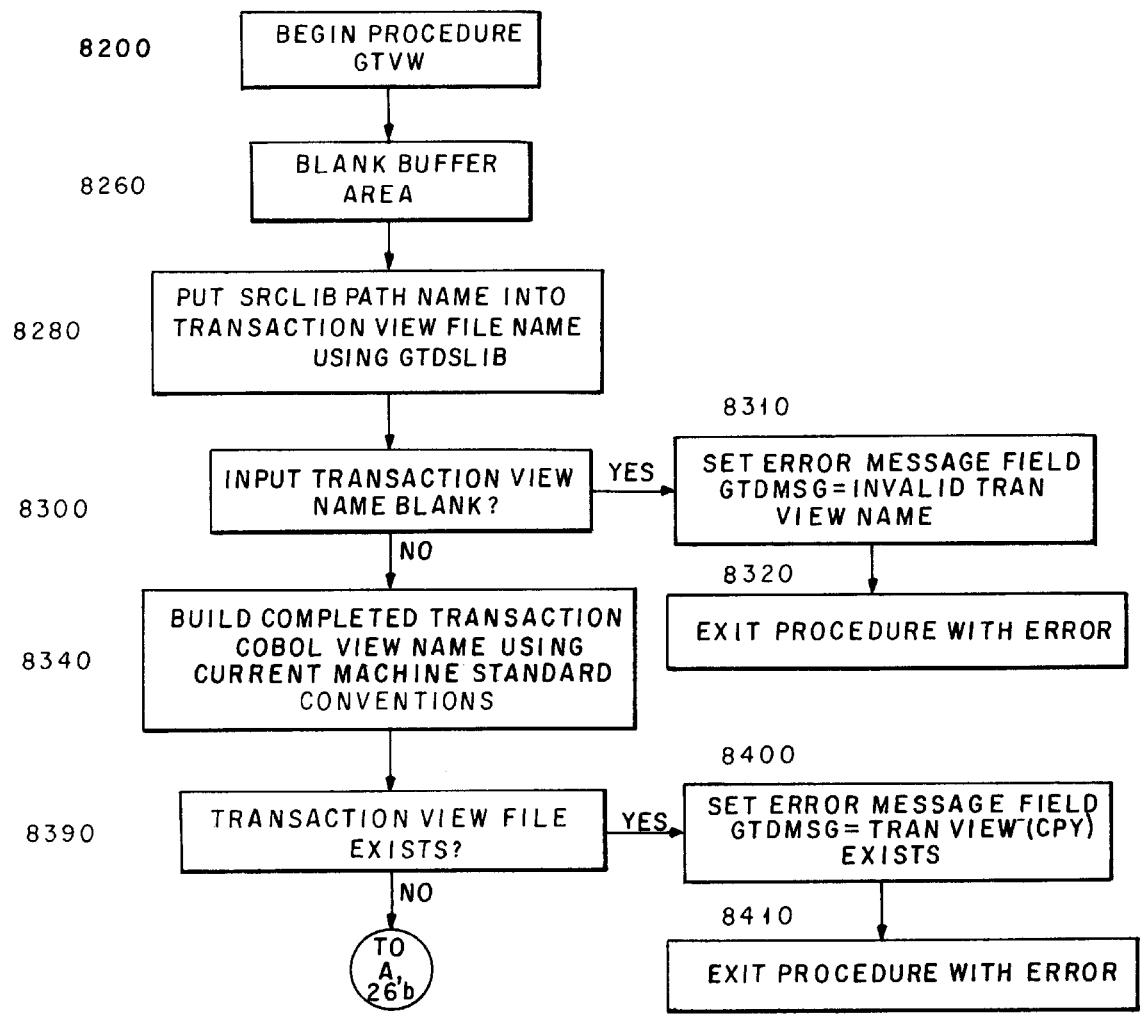
Figure 26B:
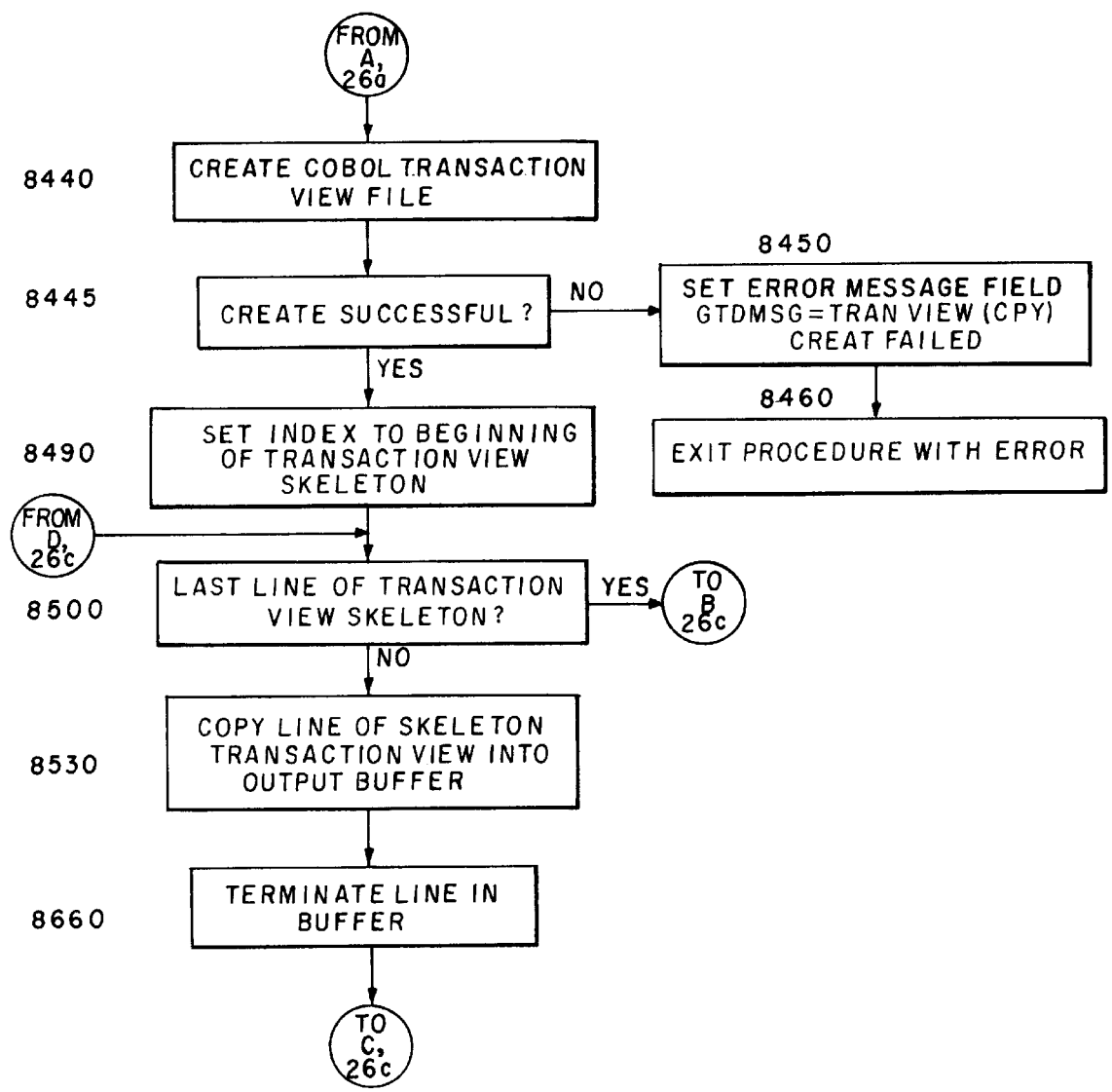
Figure 26C:
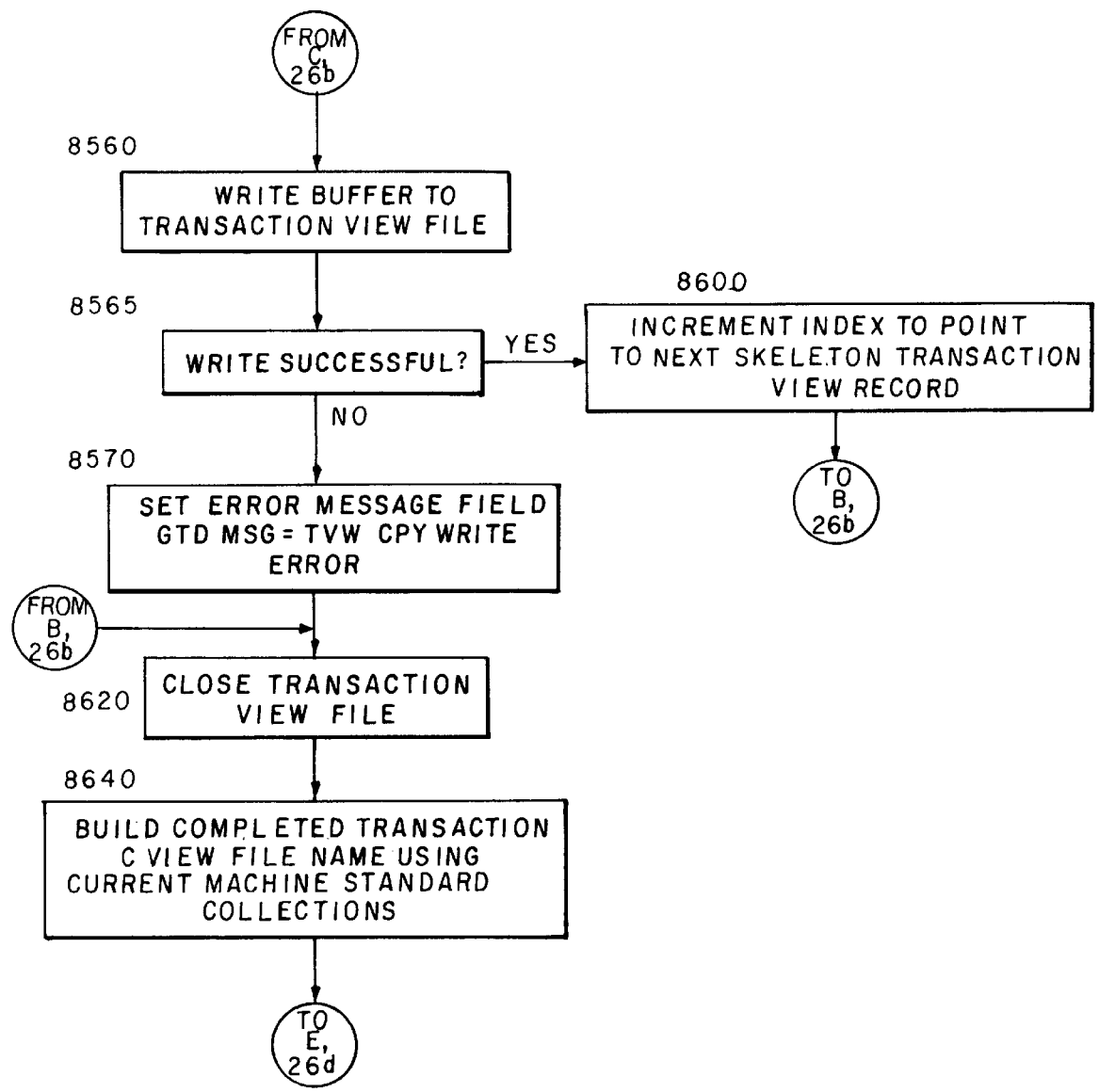
Figure 26E:
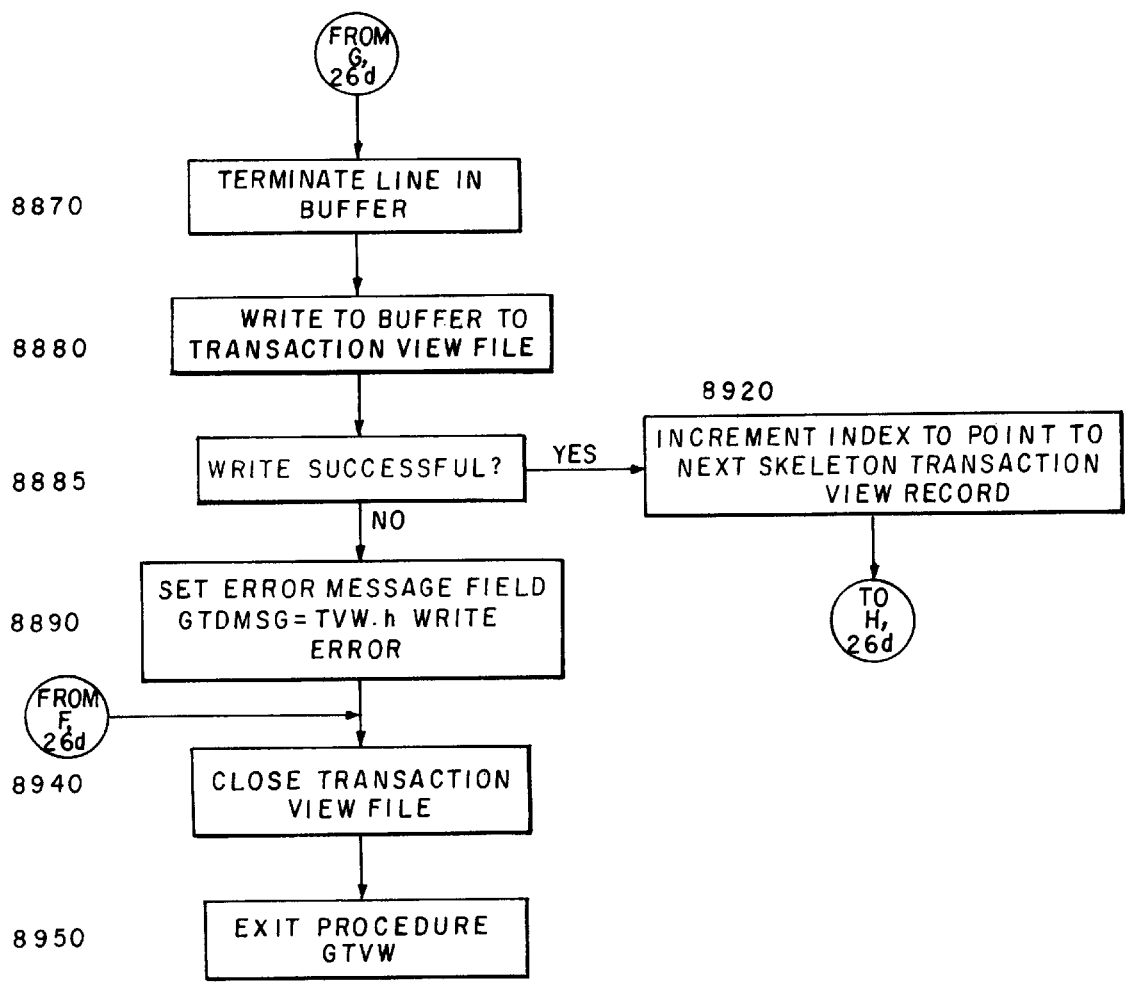

At Block 45410, the TDF file is opened for read only and the STDE entry table count, nent, is initialized to zero (Block 45420). Block 45430 checks to see if the open was successful. If it was not successful, the procedure proceeds to Block 45440 to build the initialization data for the TDF file in the STDE table and in the header record fields of the GTD transaction view. If the open was successful, the TDF file is loaded into the header record fields of the transaction view and the TDF component records are loaded into the STDE table. At Block 45432, the procedure performs the get record from TDF file (TDTGET) procedure (FIG. 25, Block 16140). The record obtained at this point is the TDF header record. Block 45434 checks to see if TDTGET was successful. If it was, the procedure jumps to Block 46430 to validate the header record read. If TDTGET was not successful, the procedure moves to Block 45440. Blocks 45440 through 46410 build the initialization data for the TDF in the STDE table and in the header record fields of the GTD transaction view and then constructs the application transaction view.

In Block 45440 the procedure sets the work area fields in the GTD transaction view containing the TDF header fields to blanks. The TDF header fields are then initialized to the default values (Block 45450) listed below: gtdhrtyp='H'; gtdhmtyp='D'; gtdhmem=gtdmmem; gtdllib=gtdmlib with last token (MAPLIB portion) removed, "LOADLIB"; gtdlmem=gtdmmem "PROG"; gtdslib=gtdmlib with last token (MAPLIB portion) removed, "SRCLIB"; gtdolib= gtdmlib with last token (MAPLIB portion) removed, "OBJLIB"; gtddlib=gtdmlib with last token (MAPLIB portion) removed, "DBRMLIB"; gtdnlib=gtdmlib with last token (MAPLIB portion) removed, "CNTLLIB"; gtdhdr= gtdmmem; gtdhdg "EOO"; gtdcmem=gtdmmem, "TVW'; gtdappl=gtdmmem; and gtdreln="0000".

The work area fields in the GTD transaction view containing the TDF first extension header fields is set to blanks (Block 45730) and then initialized to default values (Block 45740) listed below: gtdhex1="HX" and gtdhexln=1 in BIG_ENDIAN format. Byte order in which integer data is stored is different on different machines. The BIG_ENDIAN format refers to the storage of bytes from the high to lowest order in a left to right direction. This order is used as a convention for integer data stored in data sets to be transferred between machines such as the integer data in the source TDF and MAPs. Other conventions could be used such as LITLE_ENDIAN.

The work area fields in the GTD transaction view containing the TDF second extension header fields is set to blanks (Block 45800) and then initialized to default values (Block 45810) listed below: gtdhex2="HX" and gtdhex2n=2 in BIG_ENDIAN format. A TDF component entry is constructed in the GTD transaction view workarea for the glossary panel with the following values: gtdename= gtdhglos, gtdeipnm='IETIGLOS", and gtdeopnm= 'IETOGLOS" (Block 45870). The panel entry is put into the STDE table (Block 45910) using the process described below.

An attempt is made to add the new panel entry to the STDE table for later storage in the TDF. The attempt will fail if the panel name provided is blank, if the STDE table is full, or if the panel name provided already exists in the table. If no error is detected, the panel entry is inserted in the STDE table in ascending panel sequence. Specifically, the new panel is inserted before the first panel name which has a larger alphabetic comparison value or at the end of the table. The STDE entry count, nent, is incremented (Block 45910).

A TDF component entry is constructed in the GTD transaction view workarea for the help panel with the following values: gtdename=gtdhhelp, gtdeipnm= "IETIHELP", and gtdeopnm="IETOHELP" (Block 45920). The panel entry is put into the STDE table (Block 45950) using the process described in Block 45910.

Next, a TDF component entry is constructed in the GTD transaction view workarea for the information panel with the following values: gtdename=gtdhinfo, gtdeipnm= "IETIINFO", and gtdeopnm="IETOINFOF" (Block 45960). The panel entry is put into the STDE table (Block 45990) using the process described in Block 45910.

Then, a TDF component entry is constructed in the GTD transaction view workarea for the glossary input procedure with the following values: gtdename=IETIGLOS, gtdepvnm="IETGPVW", and gtdectyp="ENTRY" (Block 46000). The procedure entry is put into the STDE table (Block 45990) using the process described below.

An attempt is made to add the new procedure entry to the STDE table for later storage in the TDF. The attempt will fail if the procedure name provided is blank, if the STDE table is full, or if the procedure name provided already exists in the table. If no error is detected, the procedure entry is inserted in the STDE table in ascending procedure sequence as described above with regard to panel sequence. The STDE entry count, nent, is incremented (Block 45990).

A TDF component entry is constructed in the GTD transaction view workarea for the glossary output procedure with the following values: gtdename=IETIGLOS (Block 46050). The procedure entry is put into the STDE table (Block 46060) using the process described in Block 45990.

Next, a TDF component entry is constructed in the GTD transaction view workarea for the information input procedure with the following values: gtdename=IETIINFO, and gtdepvnm "IETIPVW", (Block 46070). The procedure entry is put into the STDE table (Block 46090) using the process described in Block 45990.

Then a TDF component entry is constructed in the GTD transaction view workarea for the information output procedure with the following values: gtdename=IETOINFO (Block 46100). The procedure entry is put into the STDE table (Block 46110) using the process described in Block 45990.

Subsequently, a TDF component entry is constructed in the GTD transaction view workarea for the help input procedure with the following values: gtdename IETIHELP, and gtdepvnm="IETHPVW", (Block 46120). The procedure entry is put into the STDE table (Block 46140) using the process described in Block 45990.

Then a TDF component entry is constructed in the GTD transaction view workarea for the help output procedure with the following values: gtdename=IETOHELP (Block 46150). The procedure entry is put into the STDE table (Block 46160) using the process described in Block 45990.

Next a TDF component entry is constructed in the GTD transaction view work area for the main menu input procedure with the following values: gtdename=IETIMENU, and gtdepvnm=gtdhpvw (Block 46170). The procedure entry is put into the STDE table (Block 46190) using the process described in Block 45990.

At Block 46200, a TDF component entry is constructed in the GTD transaction view work area for the main menu output procedure with the following values: gtdename= IETOMENU. The procedure entry is put into the STDE table (Block 46210) using the process described in Block 45990.

Then a TDF component entry is constructed in the GTD transaction view work area for other display input procedure with the following values; gtdename=IETDISPL (Block 46220). The procedure entry is put into the STDE table (Block 46630) using the process described in Block 45990.

Finally, a TDF component entry is constructed in the GTD transaction view workarea for the main menu system documentation menu entry with the following values: gtdename= gtdhmenu, gtdedesc="SYSTEM DOCUMENTATION", gtdesel="O", gtdipnm=gtdhimnu, gtdeopnm="GTD" (Block 46240). The menu entry is put into the STDE table procedure (Block 46290) using the process described below.

An attempt is made to add the new menu entry to the STDE table for later storage in the TDF. The attempt will fail if the menu name provided is blank, if the STDE table is full, if the name provided already exists in the table (for any other type of component, STDETYP not=E, named in an STDE-NAME field) or if the menu entry select field STDESEL already exists for the menu name. If no error is detected the menu entry is inserted in the STDE table in ascending menu sequence as discussed previously for procedure sequence. The STDE entry count, nent, is incremented (Block 46290).

A TDF component entry is constructed in the GTD transaction view workarea for the information menu general description menu entry with the following values: gtdename=gtdhimnu, gtdedesc="GENERAL DESCRIPTION", gtdesel="1", gteipnm=gtdhinfo, gtdeopnm="IETINFO" (Block 46300). The menu entry is put into the STDE table procedure (Block 46350) using the process described in Block 46290.

Next, a TDF component entry is constructed in the GTD transaction view workarea for the information menu technical description menu entry with the following values: gtdedesc="SYSTEM DOCUMENTATION", and gtdesel= "2" (Block 46360). The menu entry is put into the STDE table procedure (Block 46380) using the process described in Block 46290.

At Block 46390, the procedure then generates the transaction view using procedure gtvw (FIG. 26, Block 8200), sets the message field, gtdmsg, to blanks (Block 46400), and exits the procedure with no errors (Block 46410).

In Block 46430 the header record is moved from the buffer area into the TDF header area in the GTD transaction view. Block 46440 checks to see if the TDF record (gtdhrtyp=h) and TDT types (gtdhmtyp=D) are acceptable. If the records are acceptable, the procedure jumps to Block 46490. If not, the procedure sets the error message field, gtdmsg, equal to "INVALID TDT FORMAT" (Block 46450), closes the TDF file (Block 46460) and exits the procedure with an error (Block 46470).

At Block 46490, the procedure gets the first header extension record from the TDF file using the TDTGET procedure (FIG. 25, Block 16140). The first header extension record is moved from the buffer area into the corresponding TDF header workarea in the GTD transaction view (Block 46500).

The procedure then gets the second header extension record from the TDF file (Block 46510), again using the TDTGET procedure. The second header extension record is moved from the buffer area into the TDF header workarea in the GTD transaction view (Block 46520), and index "e" is pointed to the beginning of the STDE table (Block 46530), the memory copy of the TDF entry records.

Blocks 46540 through 46650 initialize the STDE table from the component records in the TDF. Whenever information is needed by GTD which is recorded in the TDF component records, GTD retrieves the information from the STDE table. Any modification of the application component definitions is performed on the entries in the STDE table. The STDE table entries are later stored by GTD after the modification has completed. Since all TDF information is maintained in memory during execution, the TDF can be written in its entirety, thereby simplifying TDF file input and output.

Specifically, the procedure gets a record from the TDF file (Block 46540) using the TDTGET procedure (FIG. 25, Block 16140, and then checks to see if the TDTGET was successful (Block 46542). If it was successful, the procedure moves the entry record into the STDE table at location e in the STDE table (Block 46620); increments e to point to the next entry in the STDE table (Block 46630); increments the STDE entry count, nent (Block 46640); and returns to Block 46540. If it was not successful, the procedure jumps to Block 46660. If the TDTGET procedure was successful, the procedure checks to see if the buffer is blank (Block 46543).

If the buffer is not blank, the procedure checks to see if the STDE table is full (Block 46560). If it is not full, the procedure jumps to Block 46620. If the STDE table is full, the procedure sets the error message field, gtdmsg, equal to "STDE TABLE FULL" (Block 46570), closes the TDF file (Block 46580), and exits the procedure with an error (Block 46590).

If the buffer is blank, the procedure continues to Block 46620 where the procedure closes the TDF file, generates the transaction view (Block 46670) using procedure GTVW (FIG. 26, Block 8200), sets the message field, gtdmsg, to blanks (Block 46690), and exits procedure GTDT.

READ TDF RECORD; TDTGET PROCEDURE. According to FIGS. 25*a–b*, which depict a flow chart of the preferred embodiment of the present invention, the GTD TDF input procedure begins by setting the buffer to blanks (Block 16180) and reading the 4 byte header from the transaction definition file (TDF). Decision Block 16190 checks to see if the read was successful. If it was not successful, the error message, GTDMSG, is set equal to "MAPLIB READ ERROR" (Block 16200) and the procedure is exited with an error (Block 16210). If the read was successful, the record length is set to equal the length in the first two bytes of the header in BIG_ENDIAN format (Block 16260). The buffer length is set to equal the record length minus the 4 byte header (Block 16280). The TDF is read to fill the buffer to the length indicated in buffer length (Block 16320) and the procedure checks to see if the read was successful (Block 16325). If it was not successful, the error message out, GTDMSG, is set equal to 'MAPLIB READ ERROR' (Block 16330) and the procedure is exited with an error(Block 16340). If the read was successful the program exits procedure TDTGET (Block 16360).

GENERATE TRANSACTION VIEW: GTVW PROCEDURE. Considering now FIGS. 26*a–e*, which depict a flow chart of the preferred embodiment of the present invention, the GTD transaction view procedure blanks the buffer area (Block 8260) and puts the SRCLIB path name from gtdslib into the transaction view file name, variable GTDCMEM, (Block 8280) using GTDSLIB. Then the procedure checks to see if GTDCMEM=blank (Block 8300). If GTCMEM is blank, the program sets the error message field, GTDMSG, to "INVALID TRAN VIEW NAME" (Block 8310), and exits the procedure with an error (Block 8320). If GTDCMEM is not blank, a completed transaction COBOL view name is built using the current machine standard conventions (Block 8340). GTD is written on each platform to comprehend the conventions required by the operating system. Once the transaction view name is built, the program checks to see if the transaction view file already exists (Block 8390). If the transaction view does exist, the error message field, GTDMSG is set to "TRAN VIEW(cpy) EXISTS" (Block 8400) and the program exits the procedure with an error.

If the transaction view file does not exist, the procedure attempts to create at transaction view file (Block 8440). If the create is not successful, the program sets the error message field, GTDMSG, to "TRAN VIEW (cpy) create FAILED" (Block 8450) and exits the procedure with an error (Block 8460). If the create was successful, an index is initialized to point to the first line of the skeleton program (Block 8490). This line is checked to see if it is the last line of the skeleton program (Block 8500). If it is, the procedure jumps to Block 8620. If it is not, this line is copied into the output buffer (Block 8530), and terminated (Block 8660).

The output buffer is then written to the transaction view file (Block 8560), and the procedure checks to see if the write was successful (Block 8565). If the write was successful, the procedure increments the index to point to the next line of the skeleton transaction view record, and moves back to Block 8500. If the write was not successful, the error message field GTDMSG is set to "TVW.cpy WRITE ERROR" (Block 8570).

At Block 8620, the procedure closes the transaction view file and builds a completed transaction C view file name using the current machine standard conventions (Block 8640). Once the transaction view name is built, the program checks to see if the transaction view file already exists (Block 8710). If the transaction view exists, the error message field, GTDMSG is set to "TRAN VIEW(h) EXITS" (Block 8720) and the program exits the procedure with an error (Block 8730).

If the transaction view file does not exist, the procedure attempts to create a transaction view file (Block 8760). If the create is not successful, the program sets the error message field, GTDMSG, to "TRAN VIEW(h) create FAILED" (Block 8770) and exits the procedure with an error (Block 8780). If the create was successful, an index is initialized to point to the first line of the skeleton program (Block 8810). This line is checked to see if it is the last line of the skeleton program (Block 8820). If it is, the procedure jumps to Block 8940, closes the transaction view file, and exits procedure GTVW (Block 8950). If it is not, this line is copied into the output buffer (Block 8850), and terminated (Block 8870).

The output buffer is written to the transaction view file (Block 8880), and the procedure checks to see if the write was successful, (Block 8885). If the write was successful, the procedure increments the index to point to the next line of the skeleton transaction view record, and returns to Block 8820. If the write was not successful, the error message field GTDMSG is set to "TVW.h WRITE ERROR" (Block 8990), the transaction view file is closed (Block 8940), and the program exits the procedure (Block 8950).

EDIT TRANSACTION PARAMETERS: ETP PROCEDURE. Considering FIG. 27 which shows a flow chart of the preferred embodiment of the procedure, the GTD edit transaction parameters procedure accepts user input in the GTD transaction view fields on the panel that corresponds with the TDF header, the TDF first header extension, and the TDF second header extension. The user information defined on the screen is eventually stored in the TDF file. When the TDF is first defined, GTD defines a sufficient number of default values to define a working TDF. These values can be customized by the user for special situations. Validation is performed and incorrect input is corrected.

Procedure ETP begins by performing the procedure to display a panel (FIG. 21, Block 47300) electing to display the GTDETD panel (Block 102980). This panel contains the TDF header fields described above. The procedure translates the user input fields GTDLMEM, GTDHDR, and GTDHDG into uppercase (Block 102990) and checks to see if the release number, GTDRELN, field is valid (Block 103020). If GTDRELN is invalid, the procedure replaces any illegal characters with default character " " (blank), and proceeds to Block 103070. If GTDRELN is valid, the procedure continues to Block 103070, where the FE procedure (FIG. 22, Block 48130) is performed to check for user input end indications. If an end is not indicated (Block 103080), the procedure returns to Block 102980. If an end is indicated the program exits procedure ETP.

EDIT PANEL LIST. This procedure is a third level procedure which provides a display panel which includes information from the TDF panel record type. This information characterizes a panel entry definition and is displayed on the panel in a list. Since more panel entries may be defined than may be displayed at one time, facilities are provided to allow navigation through the panel list. Functions are also provided for adding new panel definitions, modifying current panel definitions, deleting current panel definitions, displaying current definitions, and editing the panel map.

This procedure presents the application designer with a list of the panels within the TDT. Each panel entry can include an input procedure and an output procedure. The designer can add, change, delete, or edit entries within this list. System-provided entries (e.g., MENU, HELP, GLOS, and INFO support) can not be changed.

To delete an entry from the panel list, a 'D' is entered in the select field.

To add an entry to the panel list, an 'A' is entered in the select field. The user completes the 'ADD PANEL' screen by providing a panel name, an input procedure (optional). When the 'ADD PANEL' is completed, this entry will be inserted into the TDT and the updated panel list presented.

To change an entry to the panel list, a 'C' is entered in the select field. The user makes changes as necessary to the 'CHANGE PANEL' panel. When the 'CHANGE PANEL' panel is completed, these changes will be inserted into the TDT and the updated panel list presented.

To edit an entry in the panel list, an 'E' is entered in the select field for the desired panel. This presents the panel for Edit with the CODESTAR editor. If the panel does not exist when an Edit is requested, a default panel will be generated and presented for edit.

FIGS. 28*a–f* depict the flow chart of the preferred embodiment of the EP procedure, detailing these functions. further.

The GTD edit panel list (EP) procedure begins by scanning the select field for the locate command input by the user. The locate name is saved in the dname field of the transaction view. This locate name is used as the initial panel entry to be displayed in the edit list. If there is no locate command, dname is set to blank (Block 103240). The following display area variables are blanked (Block 103260): select, variable gtdsela; name, variable dnamea; input proc, variable dipnm; and output proc, variable dopnm. The return code, RC, and number of panels, NP, are initialized (Block 103330) and the panel table, TP is blanked. (Block 103360). The STDE table is scanned, adding the menu and panel entry names to the TP, counting the number of entries added to the table, and saving this number in the TP. The TP contains a unique list of panel and menu names sorted in ascending order. The index for the number of panels in the panel table, i, and the index for the screen edit list, j, are initialized to zero (Block 103570).

Blocks 103580 through 103725 constitute a process by which the initial panel list item to be displayed on the screen is located in the panel list table. Then the initial panel name and as many subsequent panels names as will fit on the display panel are placed in panel list display fields with the corresponding panel characterization information from the STDE table for each panel entry displayed. The process is finished when all panel names up to the end of the list or all panels names which will fit on the screen and their characterization data, have been placed in the display fields.

Decision Block 103580 checks to see if i is greater than or equal to the number of panels in the panel table. If i is greater than the number of panels in NP, the procedure jumps to Block 103750. If not, the procedure checks to see if j is greater than or equal to the number of procedure entries (16) which will fit on a screen (Block 103590). If j is greater than or equal to 16, the procedure jumps to Block 103750. If not, the procedure checks to see if the current panel in the panel table is greater than or equal to the next panel, dname, requested by the user (Block 103595). If the current panel name is not grater or equal to the next panel name, the procedure jumps to Block 103720. If the current panel name is greater or equal to the next panel name, the jth item in the edit list is initialized to the following values: panel name, variable dnamea=TP at index i; input procedure, variable IETIMENU; and output procedure, variable IETIOMENU (Block 103610).

The procedure scans the STDE table entries for a panel entry with the current panel name, STDETYP=P and TP(i)= STDENAME (Block 103640). Decision Block 103650 checks to see if the search was successful. If it was, the procedure initializes the jth item in the edit list to the following values: input procedure, dipnm(j)=STDEIPNM; output procedure, dopnm(J)=STDEOPNM (Block 103660) and increments j (Block 103700). If the search was not successful, the procedure just increments j (Block 103700). Block 103720 increments index i and then returns to Block 103580.

Blocks 103775 through 104035 constitute a process by which each user request for each panel list item is examined. If an add, delete, change, or edit request is identified, then the appropriate task is performed. The process is complete after the requests have been identified and performed for each panel in the list.

J is initialized to zero (Block 103770) and the procedure checks to see if j is greater than or equal to the number of procedure entries (16) which will fit on a screen (Block 103775). If j is greater or equal to 16, the procedure jumps to Block 104040. If not, the procedure checks to see if there is an add panel request, GTDSELA='a' or 'A' (Block 103810).

If there is an add request, a panel is displayed requesting the panel characterization information as described in the panel record type of the TDF. The input values are validated. This typically involves translating the panel name, input and output procedures, and option flag to upper case and ensuring that the option flag value is either "Y" or "N" (yes or no). The option flag value determines if the panel should be generated with or without an option field. After the input values are validated, an attempt is made to add the new panel entry to the STDE table for later storage in the TDF using the process described in FIG. 24, Block 45910. Once the panel is added, the procedure jumps to Block 104030. If there is no add request, the procedure checks to see if a change panel request GTDSELA='c' or 'C' (Block 103860).

If there is a change request, the change request panel name is verified. A change request can not be performed if the panel is a system-defined panel, or if the panel is not defined in the STDE table. By not permitting changes in definition to system-defined panels, GTD ensures that the IET will operate on these panels as intended. If the panel is not a system panel and is listed in the STDE table then the values in the STDE panel entry are copied into the work area fields which correspond to a STDE entry, and a panel is displayed requesting changes for the panel characterization information. The input values are validated in similar fashion to the add panel request of (Block 103810), and moved back into the STDE entry to complete the change. The only change the user is not permitted to perform with this implementation is a change to the panel name, although this change could easily be performed by deleting the old STDE entry and adding the new STDE entry. Once the panel is changed, the procedure continues to Block 104030. If there is no change request, the procedure checks to see if there is an delete panel request, gtdsela='d' or 'D' (Block 103910).

If there is a delete request, the delete request panel name is verified. A delete request can not be performed if the panel is a system-defined panel, or if the panel is not defined in the STDE table. By not permitting deletions for system-defined panels, GTD ensures that the IET will operate as intended. If the panel is not a system panel, and is listed in the STDE table, then the panel is simply deleted by overwriting the deleted entry with the later entries in the STDE table. The STDE entry count, nent, is decremented. Once the panel is deleted, the procedure proceeds to Block 104030.

Figure 29:
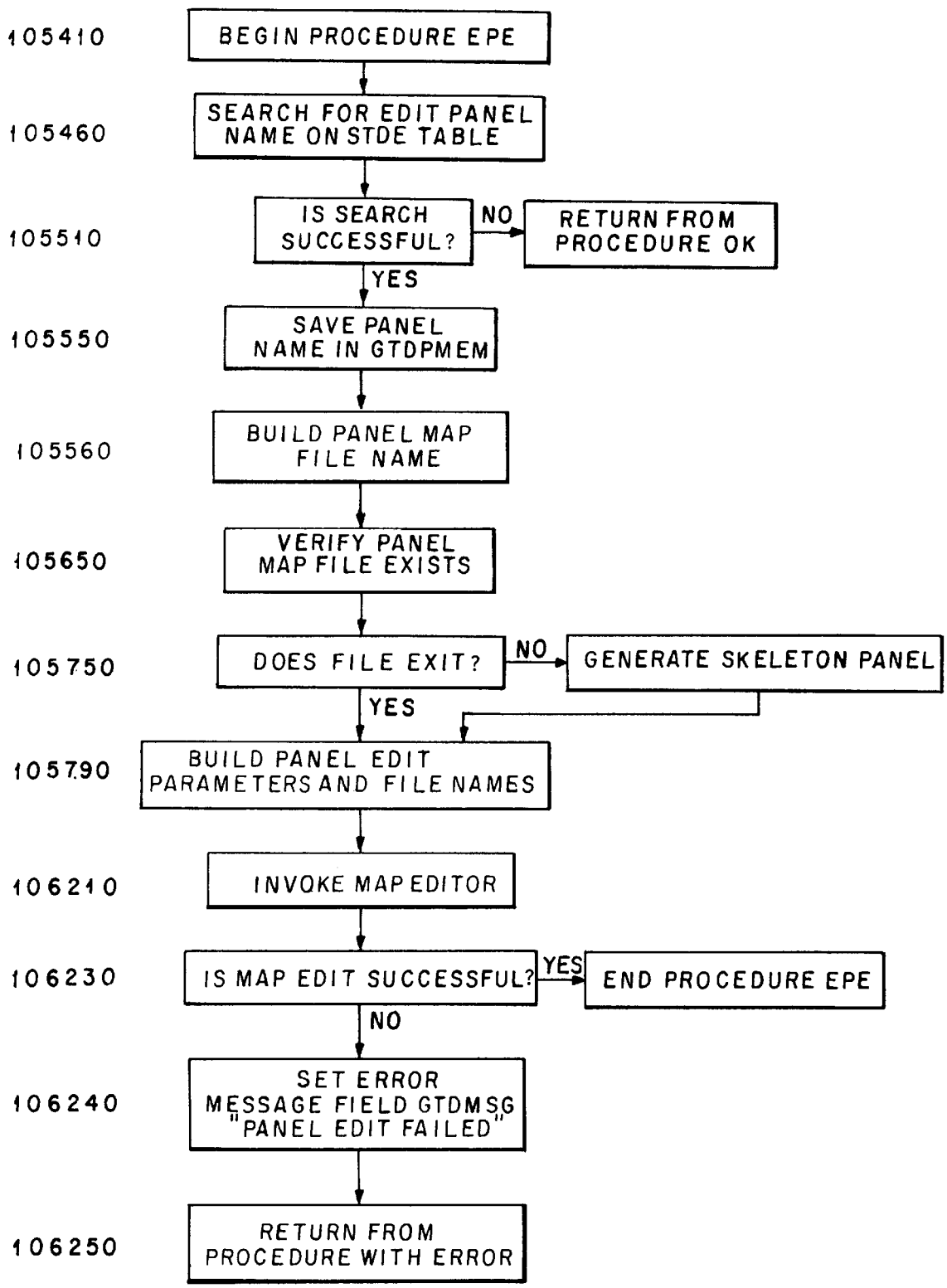
FIG. 29 is a flow chart depicting the edit panel (EPE) procedure according to the preferred embodiment of the present invention.
Figure 30C:
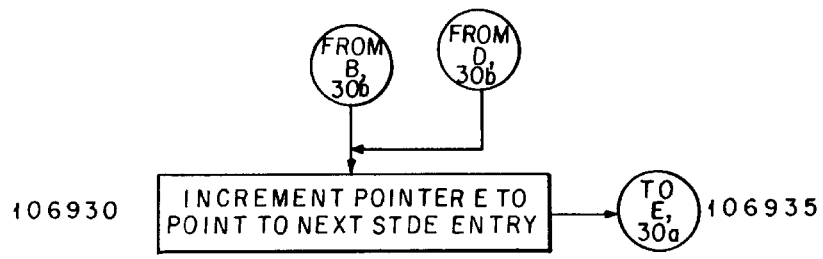
Figure 30D:
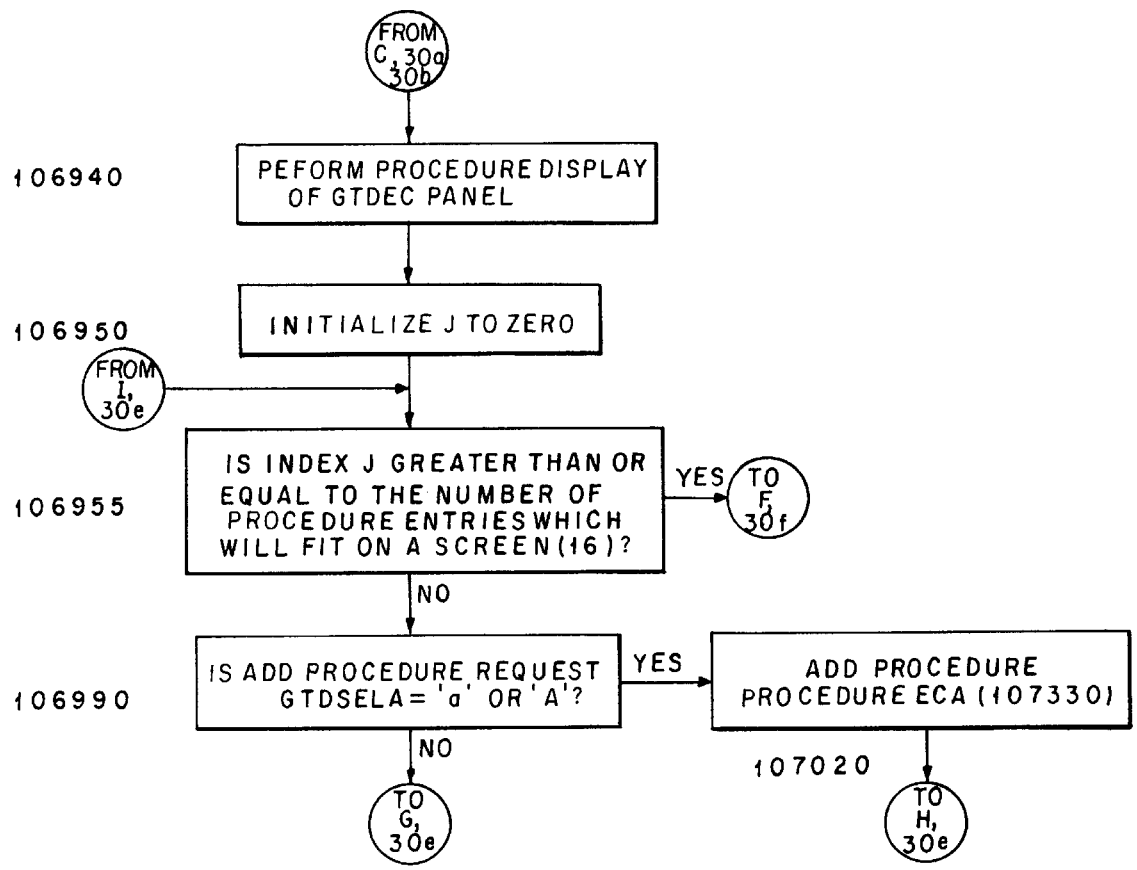
Figure 30E:
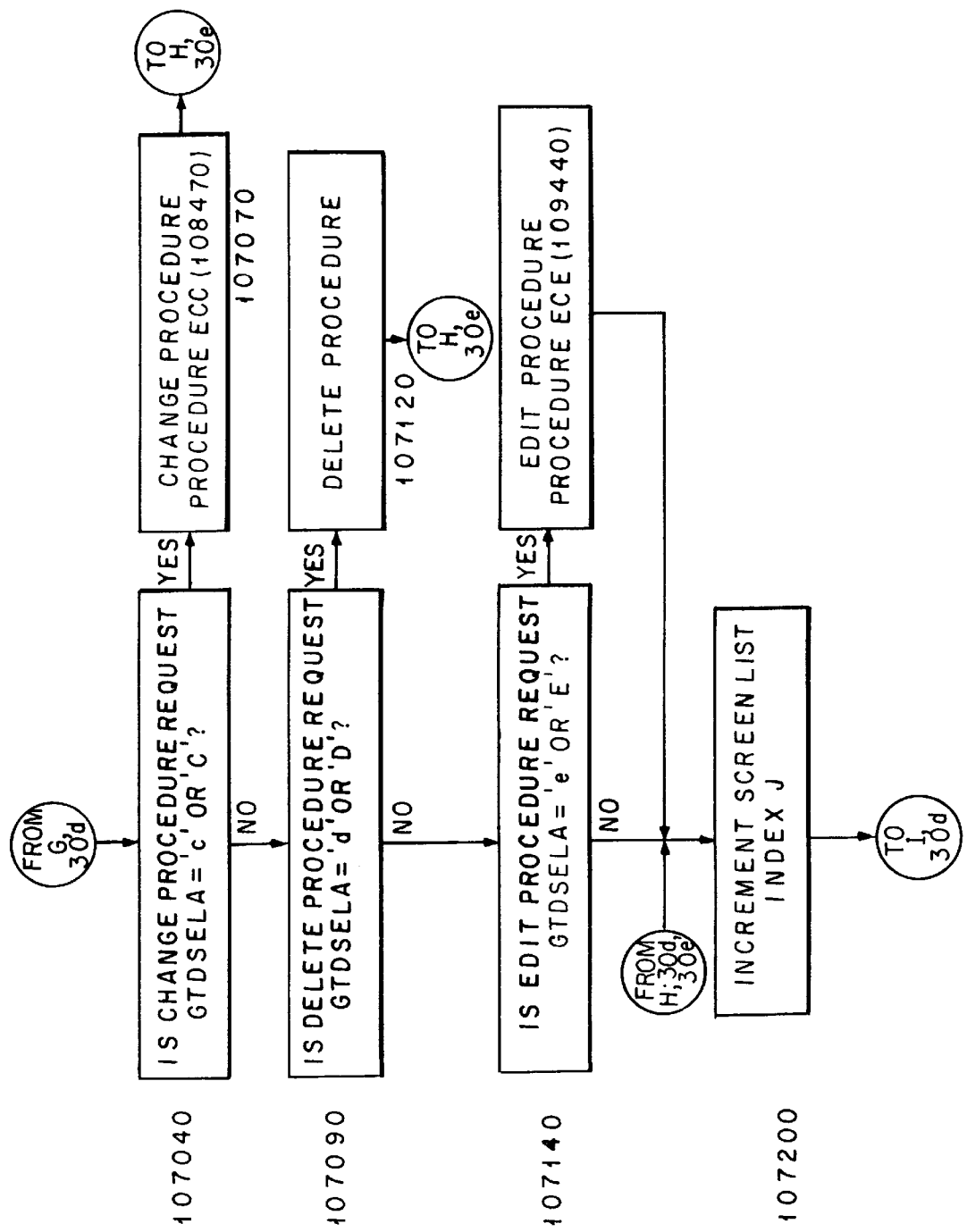
Figure 30F:
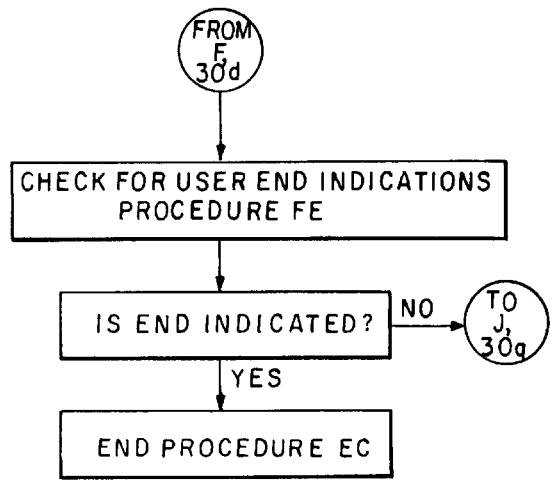

If there is no delete request, the procedure checks to see if there is an edit panel request, gtdsela='e' or 'E' (Block 103960). If there is an edit request, the edit panel (FIG. 29, Block 105410) procedure is performed, and the procedure proceeds to Block 104030. If there is no edit request, the procedure increments j (Block 104030) and returns to Block 103775.

Block 104040 performs the FE procedure (FIG. 22 Block 48130) to check for user input end indications. If an end is not indicated (Block 104045), the procedure returns to Block 103240. If an end is indicated, the program exits procedure EP.

EDIT PANEL: EPE PROCEDURE. Looking now at FIG. 29, which shows a flow chart of the preferred embodiment of this procedure, the GTD edit panel procedure begins by searching for the edit panel name in the STDE table (Block 105460). If the search is not successful, the program returns from the procedure without an error. If the search is successful, the procedure saves the panel name in variable GTDPMEM (Block 105550), builds a panel map file name (Block 105560), and checks to see if the file exists (Block 105750). If the file does not exist, the procedure generates a skeleton panel and goes to Block 105790.

Panels, or map source records, are generated in the format required by the map services employed. Specifically, the definition of each map record is built in a buffer using hard-coded specifications for each type of panel being generated (menu, glossary, information, help, or skeleton panels), and then written out to a map file. Specifications written into the map source include field names, field types, field row and column information, field lengths, field attributes and literal data. All these specifications are hard-coded for each type of panel and are written out to the file in the most convenient manner. The details of the logic to generate the maps in the format required by the map services employed are map service dependent and will not be discussed herein.

Skeleton panels are created with the following fields defined in the IETTVW and required by the IET: IEF1-TRAN, IEF1-PANEL, IEF1-SYSTEM, IEF1-CURROW, IEF1-CURCOL, IEF1-FUNKEY, IEF1-CURDT, IEF1-MSGID, IEF1-MSGTX, IEF1-MSGTX, IEF1-MSGAE, IEF1-USER, IEF1-OPTION (optionally generated when gtdgof=Y), IEF1-LOOKAHEAD (optionally generated when gtdglf=Y).

If the file does exist, the procedure continues to Block 105790. The procedure builds the panel edit parameters and file names (Block 105790), and invokes the map editor (Block 106210). Block 106230 checks to see if the map edit is successful. If the map edit is successful, the program exits procedure EPE. If the map edit is not successful, the procedure sets the error message field, gtdmsg, equal to "PANEL EDIT FAILED" (Block 106240), and exits the procedure with an error.

EDIT PROCEDURE LIST. This procedure is an other third level procedure which provides a display panel which includes information from the TDF procedure record type. This information characterizes a procedure entry definition and is displayed on the panel in a list. Since more procedure entries may be defined than may be displayed at one time, facilities are provided to allow navigation through the procedure list. Functions are also provided for adding new procedure definitions, modifying current procedure definitions, deleting current procedure definitions, displaying current definitions, and editing the procedure map. System-provided entries can not be changed.

To add an entry to the procedure list, an 'A' is entered in the select field for a procedure. The user completes the 'ADD PROCEDURE' panel by providing a procedure name, a procedure description, a name of profile view associated with procedure, a name of input view associated with procedure, and a name of output view associated with procedure (if any).

The procedures can be identified as one of several types:

| | |
|---|---|
| COB2 | COBOL procedure. Will be processed by the COBOL II compiler using GTD options 4.5, 4.6, 4.8, and 4.9. |
| C | C procedure. Will be processed by the C compiler using GTD options 4.5, 4.6, 4.8, and 4.9. |
| ALC | Assembly language procedure. |
| EXTERN | External procedure. Procedure is candidate to be LINKed-to by a procedure within this transaction |
| ENTRY | Procedure contained within another procedure in the transaction. |

As other languages are employed, additional types of procedures may be identified.

A procedure can be designated as a relational data base (DB) procedure and be processed by the appropriate preprocessor during the compile options. When the 'ADD PROCEDURE' panel is completed, the entry will be added, and the updated procedure list presented.

To delete an entry from the procedure list, a 'D' is entered in the select field.

To change an entry to the procedure list, a 'C' is entered in the select field. The user makes changes as necessary to the 'CHANGE PROCEDURE' panel. When the 'CHANGE PROCEDURE' panel is completed, the changes will be inserted into the TDT and the updated panel list presented.

To edit an entry in the procedure list, enter 'E' in the select field for the desired procedure. If a COB2 or C procedure does not exist when it is requested for edit, a default procedure will be prepared and presented.

FIGS. 30a–f depict the flow chart of the preferred embodiment of the EC procedure detailing these functions further.

The GTD edit procedure list procedure begins by scanning the select field for the locate command input by the user. The locate name is saved in the dname field of the transaction view. This locate name is used as the initial procedure entry to be displayed in the edit list. If there is no locate command, dname is set to blank (Block 106680). The following display area variables are blanked (Block 106690): select, variable gtdsela; name, variable dnamea; input view, variable dipnm; output view, variable dopnm; profile view, variable dpvnm; procedure type, variable gtdcty; rdbms flag, variable gtddb2; and debug flag, variable gtdxpd. The index for the screen edit list, j, is initialized to zero, and the pointer, e, is initialized to point to the beginning of the STDE table.

Blocks 106815 through 106935 constitute a process by which the initial procedure list item to be displayed on the screen is located in the STDE table. Then the initial procedure name, and as many subsequent procedures names as will fit on the display procedure, are placed in procedure list display fields with the corresponding procedure characterization information from the STDE table for each procedure entry displayed. The process is finished when all procedure names up to the end of the list, or all procedures names which will fit on the screen, and their characterization data have been placed in the display fields.

Decision Block 106815 checks to see if e points beyond the end of the STDE table. If so, the procedure jumps to Block 106940. If not, the procedure checks to see if j is greater than or equal to the number of procedure entries (16) which will fit on a screen (Block 106830). If j is greater than or equal to 16, the procedure jumps to Block 106940. If not, the procedure checks to see if the current procedure, STDETYPE=C, in the STDE table has a procedure name, STDENAME, greater than or equal to the next procedure name, dname, requested by the user (Block 106835). If the current procedure name is not greater or equal to the next procedure name, the procedure continues to Block 106930. If the current procedure name is greater or equal to the next procedure name, the jth item in the edit list is initialized to the following values: name, variable dnamea=STDENAME; input view, variable dipnm=STDEIPNM; output view, variable dopnm=STDEOPNM; profile view, variable dpvnm= STDEPVNM; procedure type, variable gtdcty= STDECTYP; rdbms flag, variable gtddb2=STDECDB2; and debug flag, variable gtdxpd=STDECXPD (Block 106840). J is incremented (Block 106910), e is incremented to point to the next STDE entry, and the procedure returns to Block 106815.

Block 106940 performs the procedure to display a panel (FIG. 21, Block 47300) electing to display the GTDEC panel.

Blocks 106955 through 107140 constitute a process through which each user request for each procedure list item is examined. If an add, delete, change, or edit request is identified, then the appropriate task is performed. The process is complete after the requests have been identified and performed for each procedure in the list.

Figure 31:
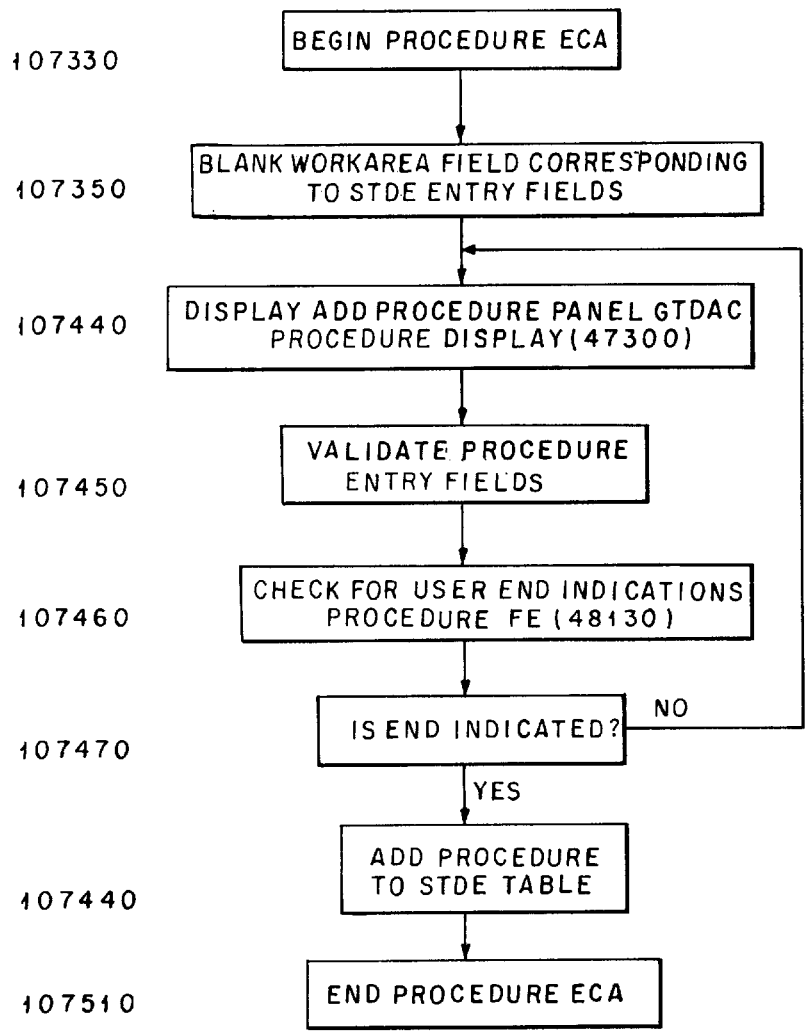
FIG. 31 is a flow chart depicting the add procedure user interface (ECA) procedure according to the preferred embodiment of the present invention.
Figure 32A:
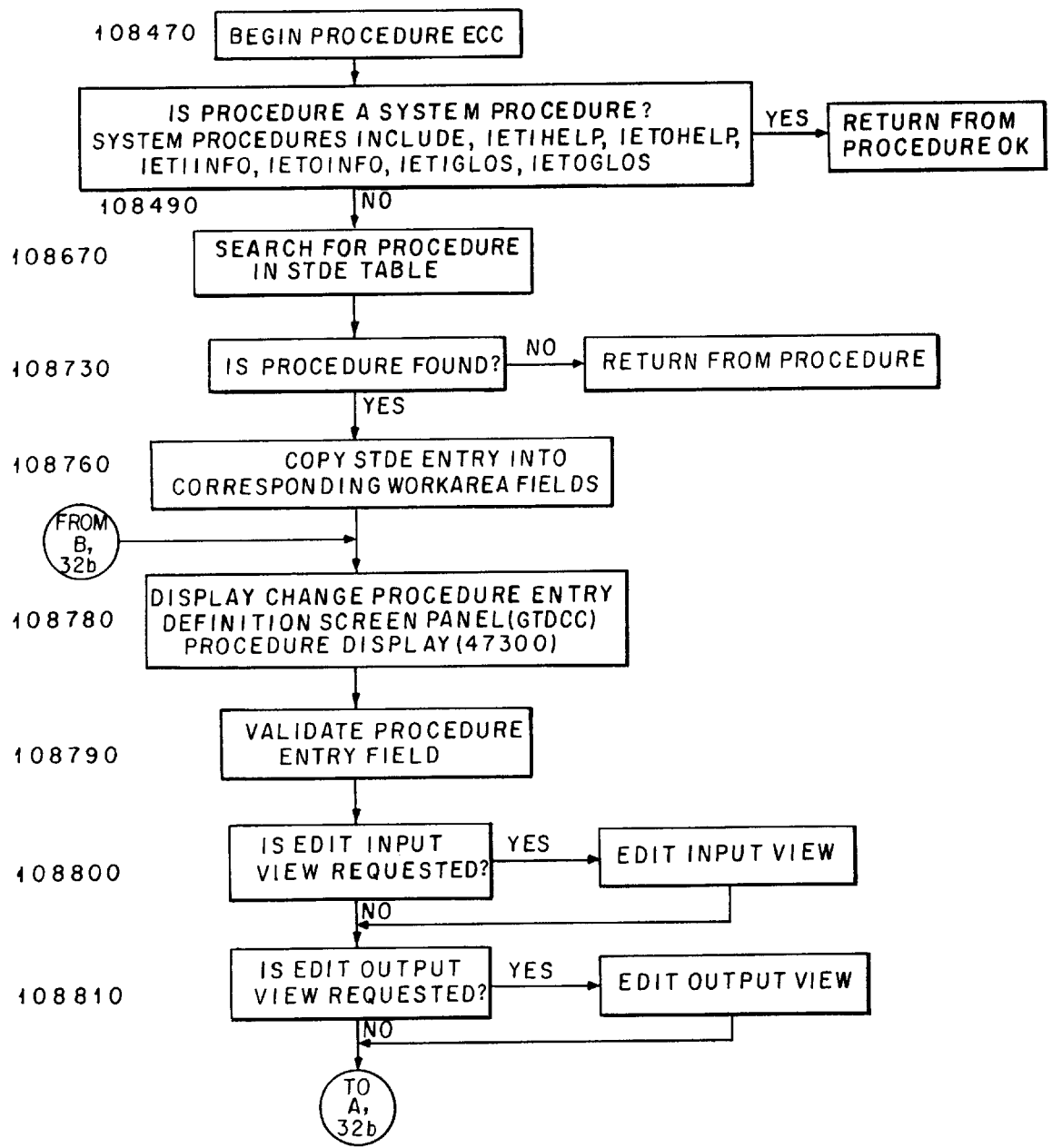
FIGS. 32a–b are a flow chart depicting the change procedure entry (ECC) procedure according to the preferred embodiment of the present invention.
Figure 32B:
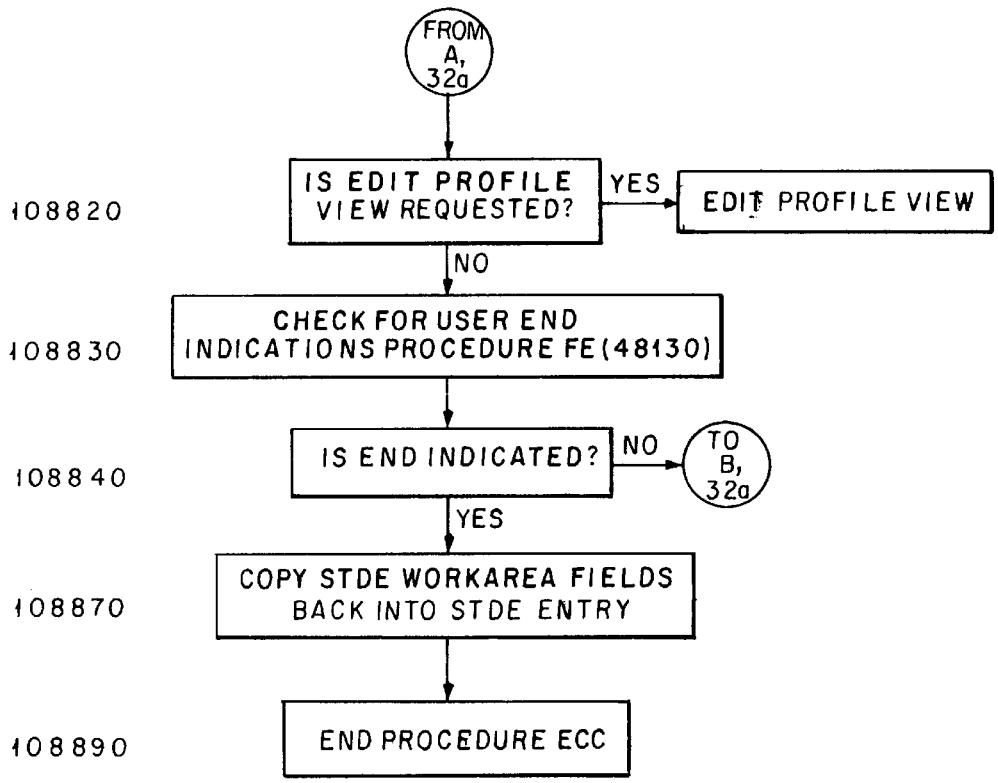

J is initialized to zero (Block 106950) and the procedure checks to see if j is greater than or equal to the number of procedure entries (16) which will fit on a screen (Block 106955). If j is greater or equal to 16, the procedure jumps to Block 107210. If not, the procedure checks to see if there is an add procedure request, gtdsela='a' or 'A' (Block 106990). If there is an add request, the add procedure (FIG. 31, Block 107330) is performed on the displayed procedure identified by index j (Block 107020) and the program proceeds to Block 107200. If there is no add request, the procedure checks to see if a change procedure request gtdsela='c' or 'C' (Block 107040). If there is a change request, the change procedure (FIG. 32, Block 108470) is performed on the displayed procedure identified by index j (Block 107070) and the procedure proceeds to Block 107200. If there is no change request, the procedure checks to see if there is an delete procedure request gtdsela='d' or 'D' (Block 107090).

Figure 34A:
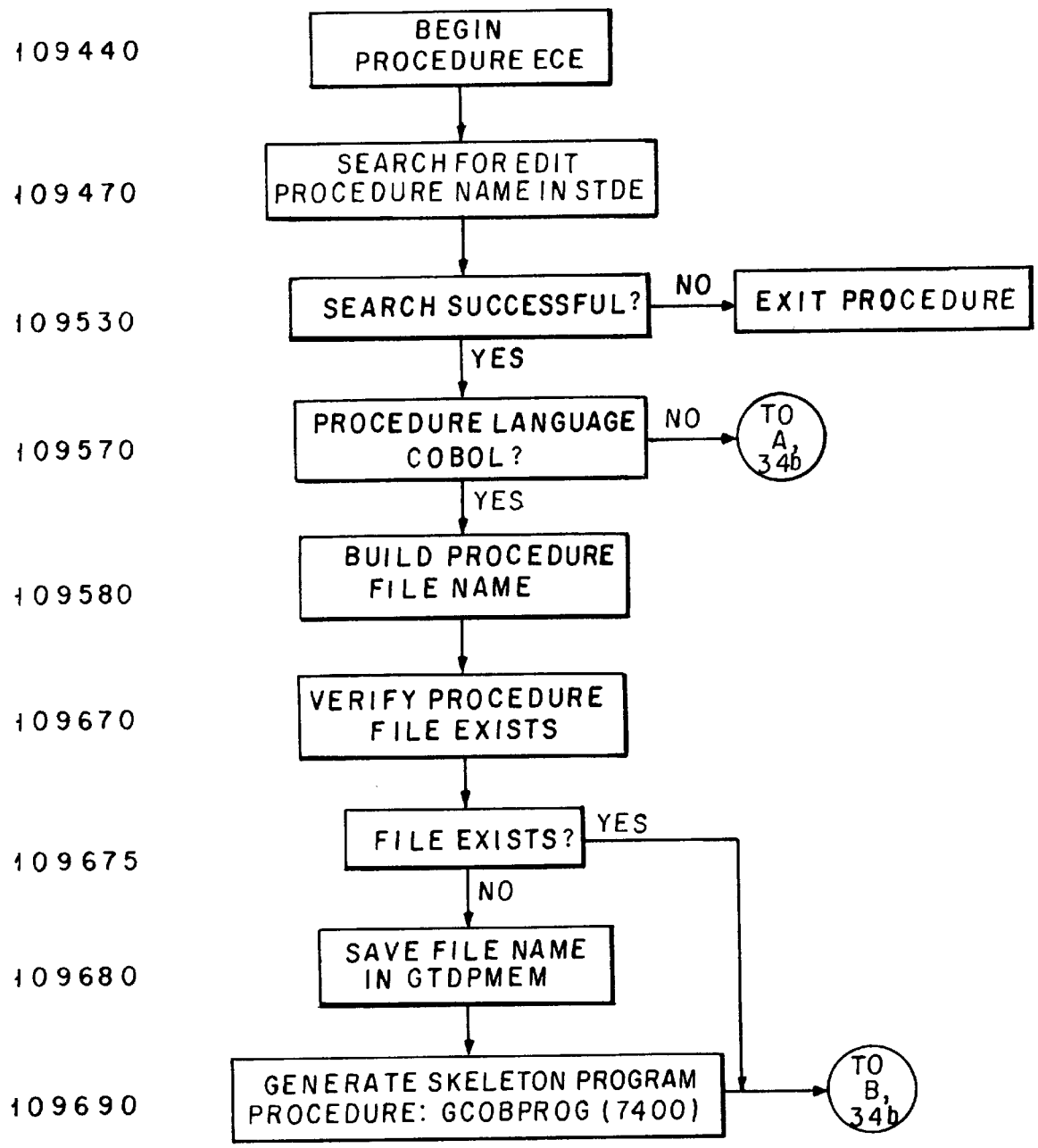
FIGS. 34a–b are a flow chart depicting the edit procedure (ECE) procedure according to the preferred embodiment of the present invention.
Figure 34B:
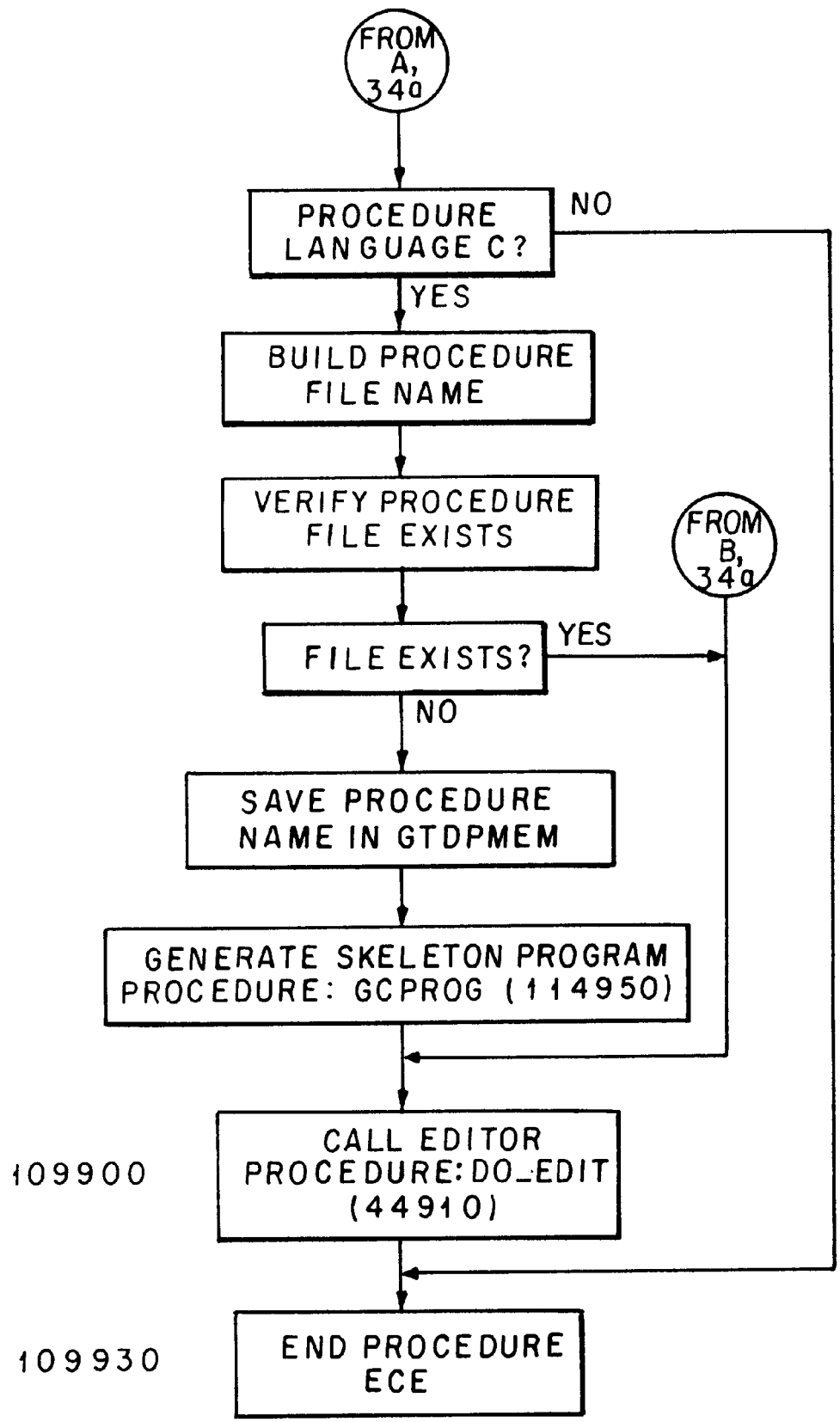

If there is a delete request, the delete request procedure name is verified. A delete request can not be performed if the procedure is a system-defined procedure, or if the procedure is not defined in the STDE table. If the procedure is not a system procedure, and is listed in the STDE table then the procedure is deleted by overwriting the deleted entry with the later entries in the STDE table. The STDE entry count, nent, is decremented. Once the procedure entry is deleted, (Block 107120) the program proceeds to Block 107200. If there is no delete request, the procedure checks to see if there is an edit procedure request, gtdsela='e' or 'E' (Block 107140). If there is an edit request, the edit procedure (FIG. 34, Block 109440) is performed on the displayed procedure identified by index j and the procedure jumps to Block 107200. If there is no edit request, the procedure increments j (Block 107200), and returns to Block 106955.

Block 107210 performs the FE procedure (FIG. 22, Block 48130) to check for user input end indications. If an end is not indicated (Block 107215), the procedure returns to Block 106680. If an end is indicated, the program exits procedure EC.

ADD PROCEDURE USER INTERFACE: ECA PROCEDURE. Considering now FIG. 31, which depicts the preferred embodiment of this procedure according to the present invention, the GTD add procedure user interface procedure begins by blanking the work area field corresponding to the STDE entry fields (Block 107330). The procedure performs the procedure to display a panel (FIG. 21, Block 47300) electing to display the GTDAC panel (Block 107440) requesting the user to define the procedure characterization information as described in the procedure record type of the TDF.

The procedure entry fields are validated (Block 107450). The validation includes translating the procedure name, input, output and profile views, and procedure type, data base procedure flag, and debug flag into upper case. The profile view name, data base procedure flag, and debug flag are blanked out when a procedure is defined to have a type of EXTERN. The data base flag and debug flag are blanked out when a procedure is defined to have a type of ENTRY. All fields, data base procedure flag and debug flag, which have a required value of either "Y" or "N", are redefined to have a value of "N" if the value defined by the user is not "Y". The procedure language type is defined to be C if the language defined by the user is not COB2, ALC, or C.

Block 107460 performs the FE procedure (FIG. 22, Block 48130) to check for user input end indications. If an end is not indicated (Block 107470), the procedure returns to Block 107440. If an end is indicated, the procedure is added to the STDE table (Block 107510) for later storage in the TDF.

An attempt is made to add the procedure entry to the STDE. The attempt will fail if the procedure name provided is blank, if the STDE table is full or if the procedure name provided already exists in the table. If no error is detected, the procedure entry is inserted in the STDE table in ascending procedure sequence as described earlier. The STDE entry count, nent, is incremented. Once the procedure is added, the program exits procedure ECA (Block 107520).

An attempt is made to add the procedure entry to the STDE using the process described in FIG. 24, Block 46040. Once the procedure is added, the program exits procedure ECA (Block 107520).

CHANGE PROCEDURE ENTRY: ECC PROCEDURE: Looking now at FIGS. 32*a–b*, which show the preferred embodiment of the procedure, a flow chart of the ECC procedure provides the capability to change the procedure characterization information as stored in the TDF and to edit the user input, output and profile view files.

The GTD change procedure entry procedure begins with Decision Block 108490 checking if the input procedure name is a system procedure. System procedures include IETIHELP, IETOHELP, IETIINFO, IETOINFO, IETIGLOS, and IETOGLOS. If it is a system procedure name, then the GTD returns from procedure ECC with no error. If not, procedure ECC searches the STDE table for the input procedure name (Block 108670). Decision Block 108730 checks to see if the input procedure was found. If not, the GTD returns from procedure ECC with no error. If the procedure is found, the STDE entry is copied into the corresponding work area fields (Block 108760).

Block 108780 displays the change procedure entry definition screen panel (GTDCC) procedure display (FIG. 21, Block 47300) containing the TDF procedure characterization information for modification. Block 108790 validates the procedure entry fields using the process described in FIG. 31, Block 107450. Blocks 108800 through 108820 handle the user request for editing of the procedure view files. A view file contains a list of all the transaction view variable names which the user determines are required for input, output, or profile view processing by the IET. Decision Block 108800 checks if the edit input view was requested. If so, the fully qualified input view name is constructed and the input view edited using procedure do-edit (FIG. 32, Block 43860). The procedure then continues to Decision Block 108810 to check if an edit output view was requested. If so, the fully qualified output view name is constructed and the output view edited using procedure do-edit (FIG. 32, Block 43860). The procedure advances to Decision Block 108820 to check if the edit profile view was requested. If so, the fully qualified profile view name is constructed and the profile view edited using procedure do-edit.

At Block 108830, the FE procedure (FIG. 22, Block 48130) is executed to check for user end indications. Decision Block 108840 then checks if end is indicated. If not, the procedure returns to Block 108780. If end is indicated, then the program continues to Block 108870 where the STDE work area fields are copied back into the STDE entry, and the program exits procedure ECC (Block 108890).

GTD EDIT FILENAME: DO-EDIT PROCEDURE: Continuing now to FIG. 33, which shows a flow chart of the preferred embodiment of this procedure according to the present invention, this do-edit procedure takes a fully qualified file name as input for editing.

The GTD edit filename procedure begins by building editor parameters (Block 44120) and then invoking the editor for the procedure (Block 44240). The edit parameters vary according to the editor being used. Generally all that would be required is the name of the editor (either unqualified or fully qualified), and the fully qualified name of the file to invoke the editor. This depends on the operating system platform and the editor being used. The name of the editor being used is stored as part of the environment information loaded at the beginning of the program and may vary. Decision Block 44310 checks if the edit was successful. If it was, the procedure do-edit is ended (Block 44880). If the edit was not successful, the error message field is set to GTDMSG=PROCEDURE EDIT FAILED (Block 44320). The procedure then returns with the error message (Block 44330).

Figure 35A:
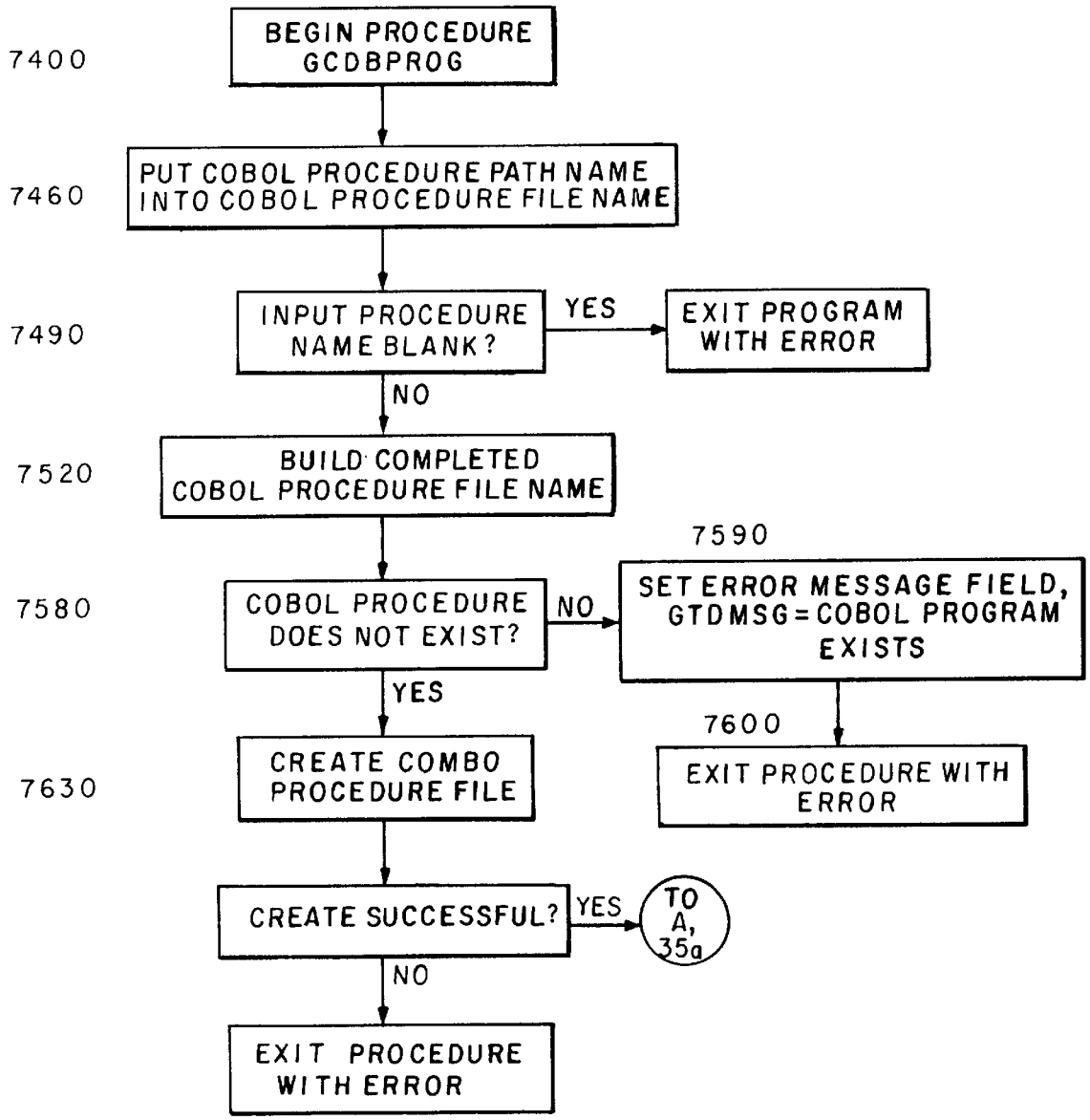
FIGS. 35a–c are a flow chart depicting the generate COBOL program (GCOBPROG) procedure according to the preferred embodiment of the present invention.
Figure 35B:
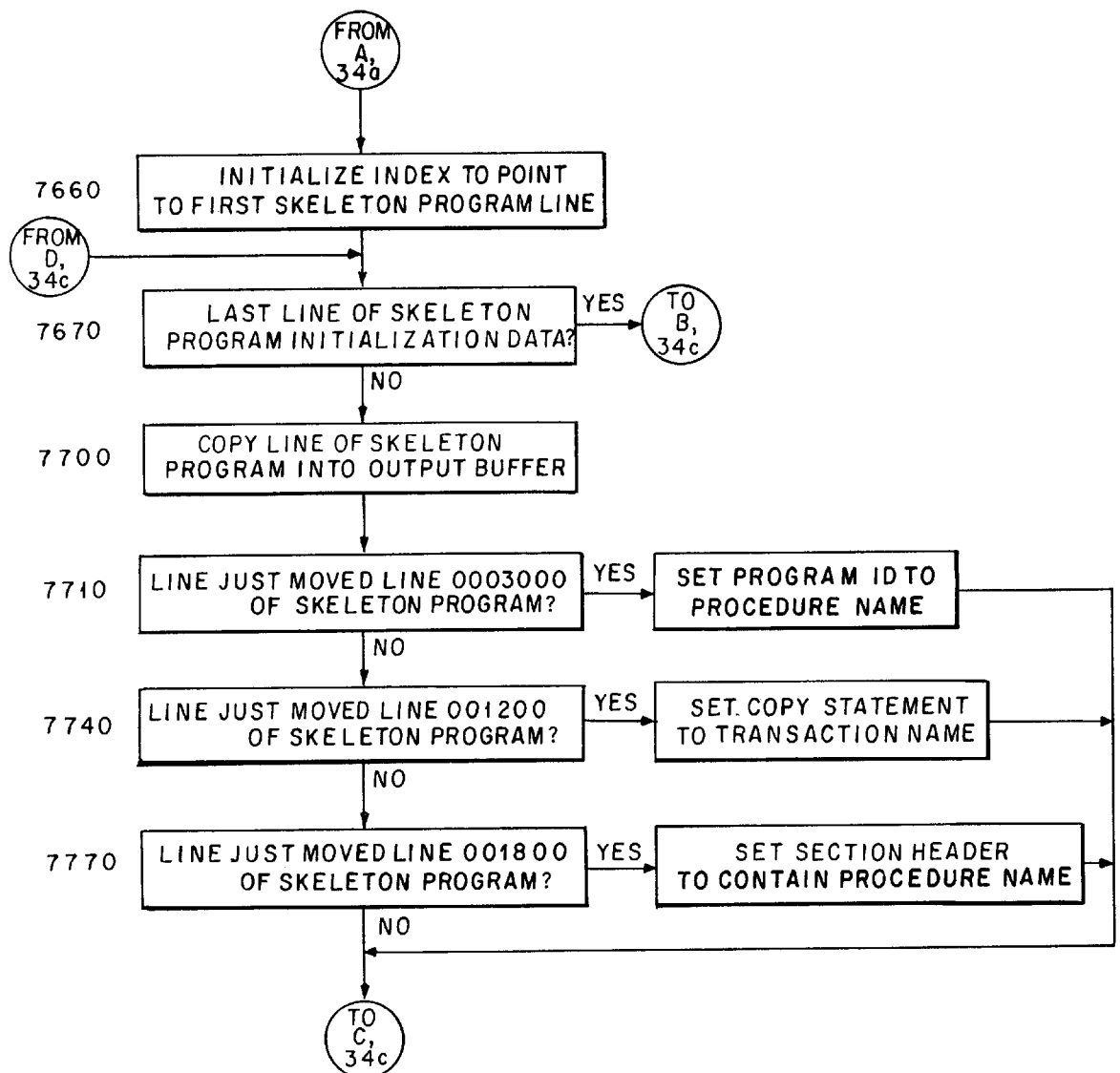
Figure 35C:
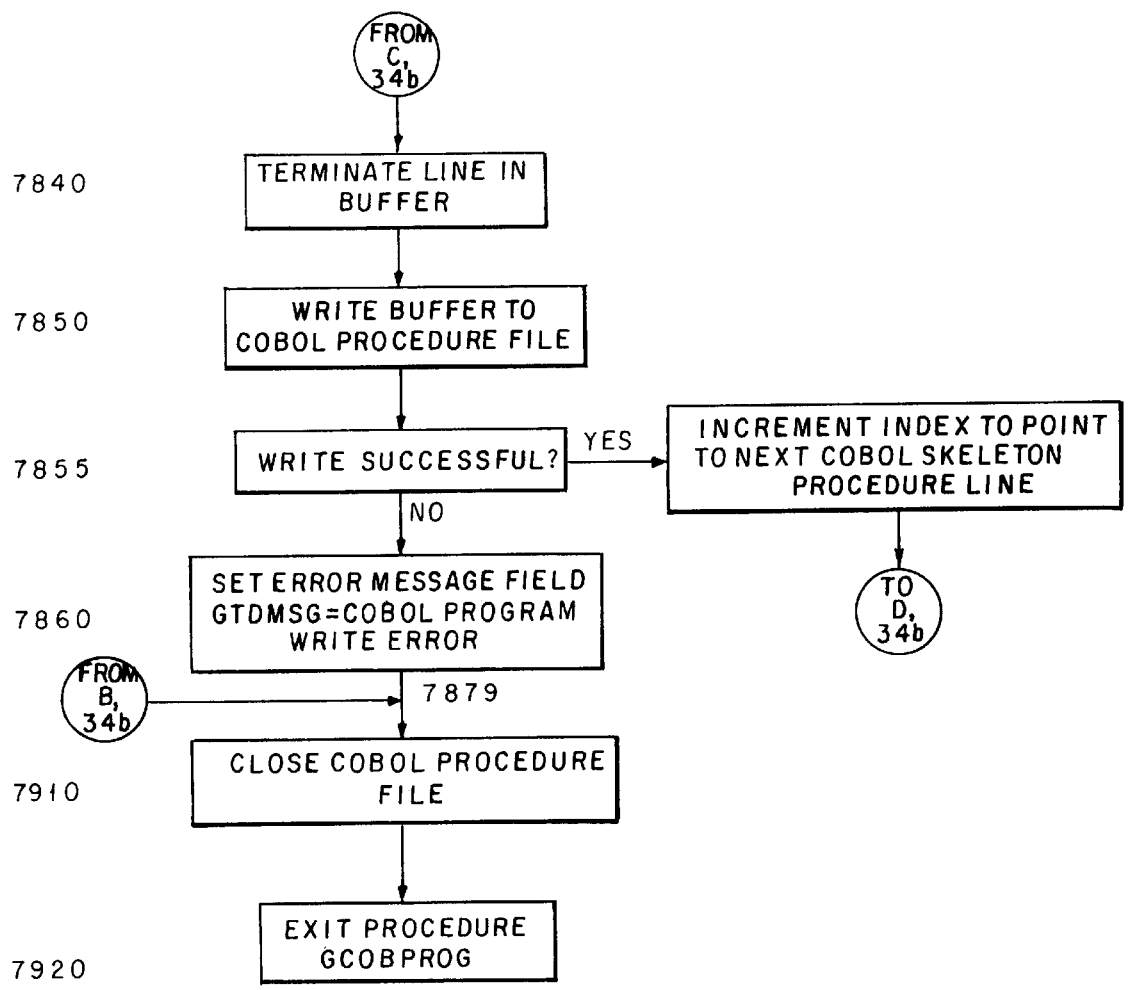

GTD EDIT: ECE PROCEDURE. Looking now at FIGS. 34*a–b*, which depict a flow chart of the preferred embodiment of this procedure, the GTD edit procedure begins by searching for the requested edit procedure name in the STDE table. Block 109530 checks to see if the search was successful. If it was not, the program exits the procedure without error. If the search was successful, the procedure checks to see if the procedure language is COBOL. If it is not a COBOL program, the procedure proceeds to Block 109750. If it is a COBOL program, the procedure builds a COBOL procedure file name (Block 109580), and verifies the procedure file exists (Block 109670). If the file exists (Block 109675), the procedure jumps to Block 109750. If not, the procedure saves the procedure name in gtdpmem (Block 109680), and generates (Block 109690) a skeleton program using the GCOBPROG procedure (FIG. 35, Block 7400). The program then jumps to Block 109900, to do the edit.

Figure 36A:
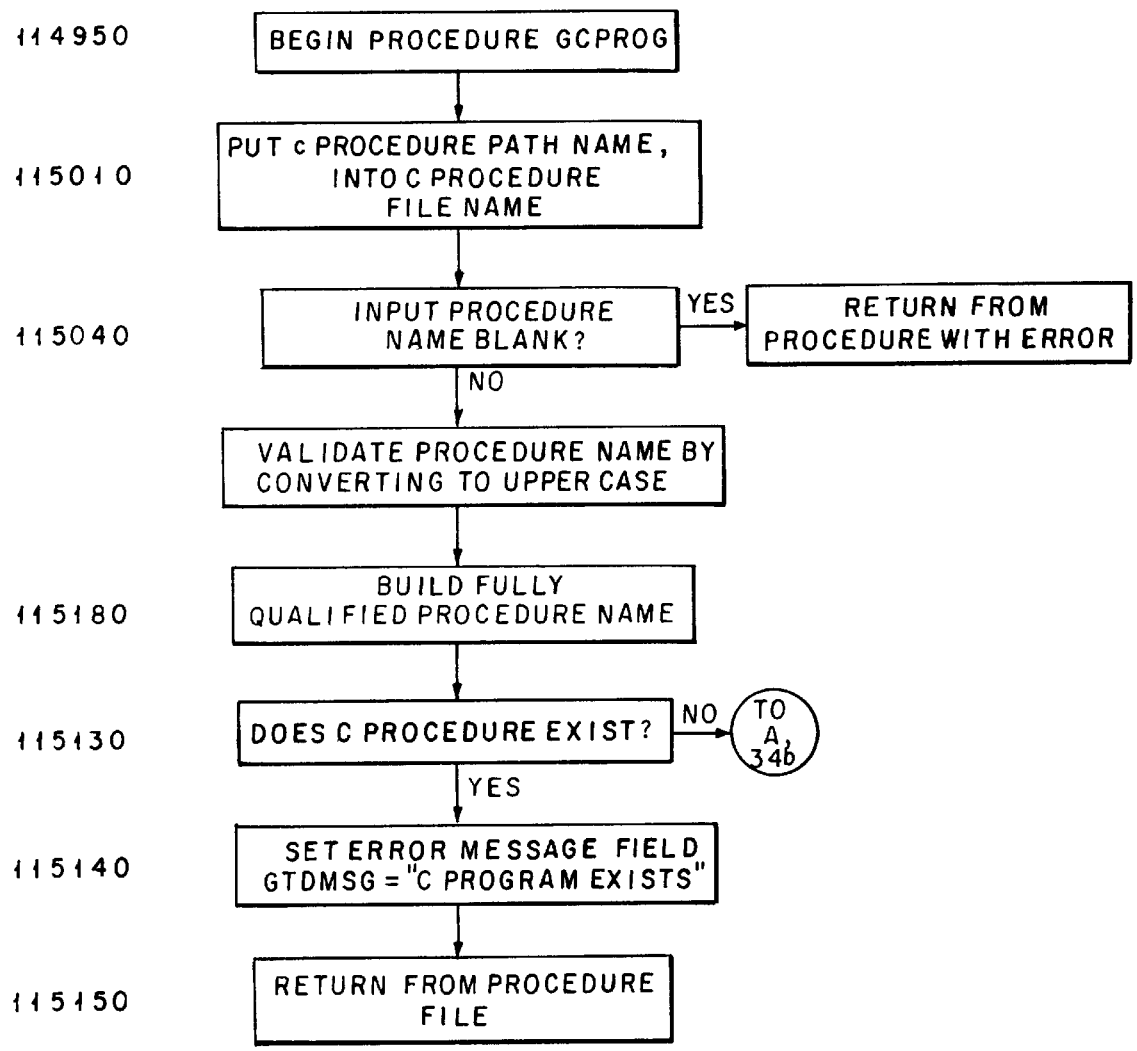
FIGS. 36a–c are a flow chart depicting the generate C program (GCPROG) procedure according to the preferred embodiment of the present invention.
Figure 36B:
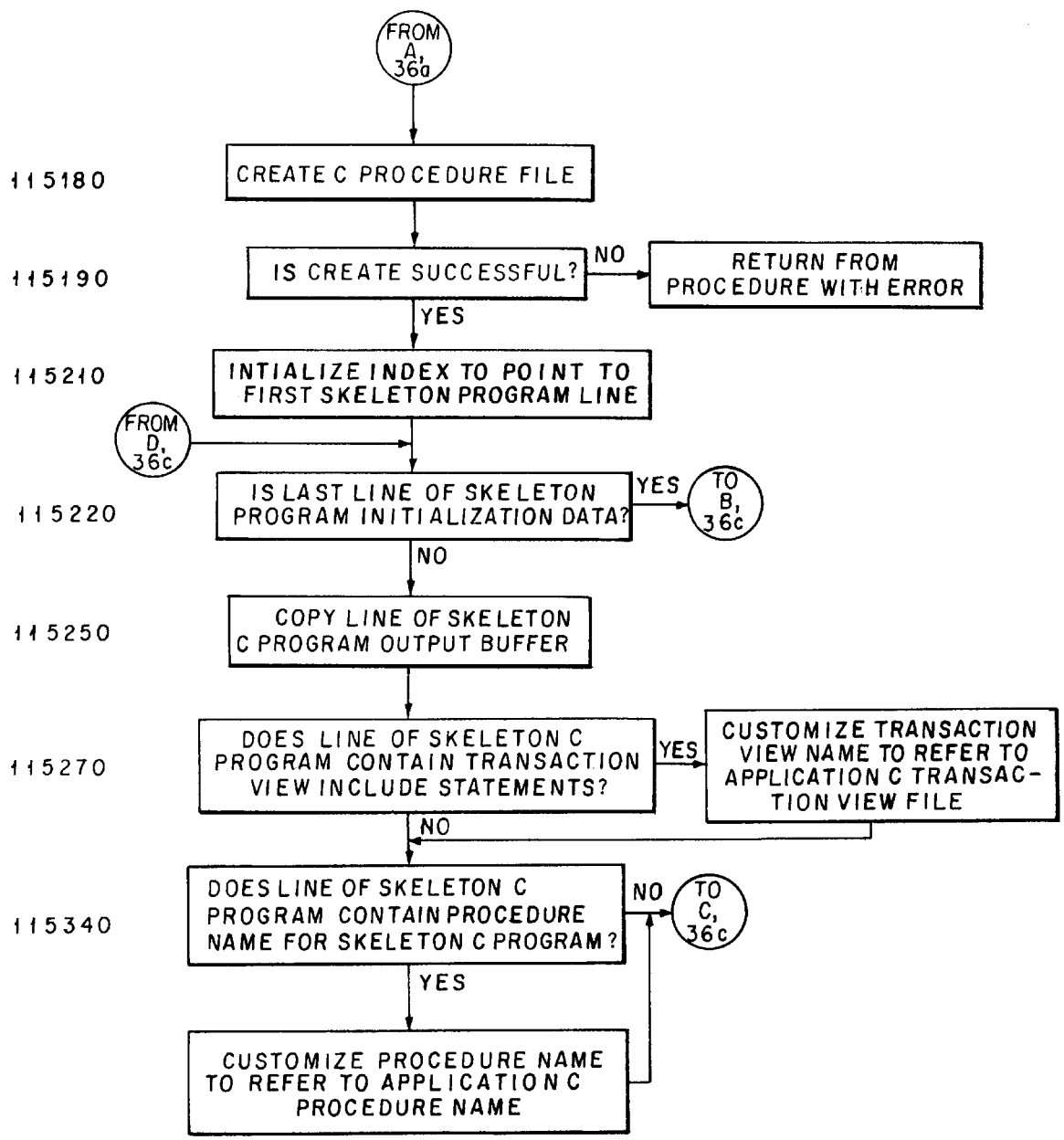
Figure 36C:
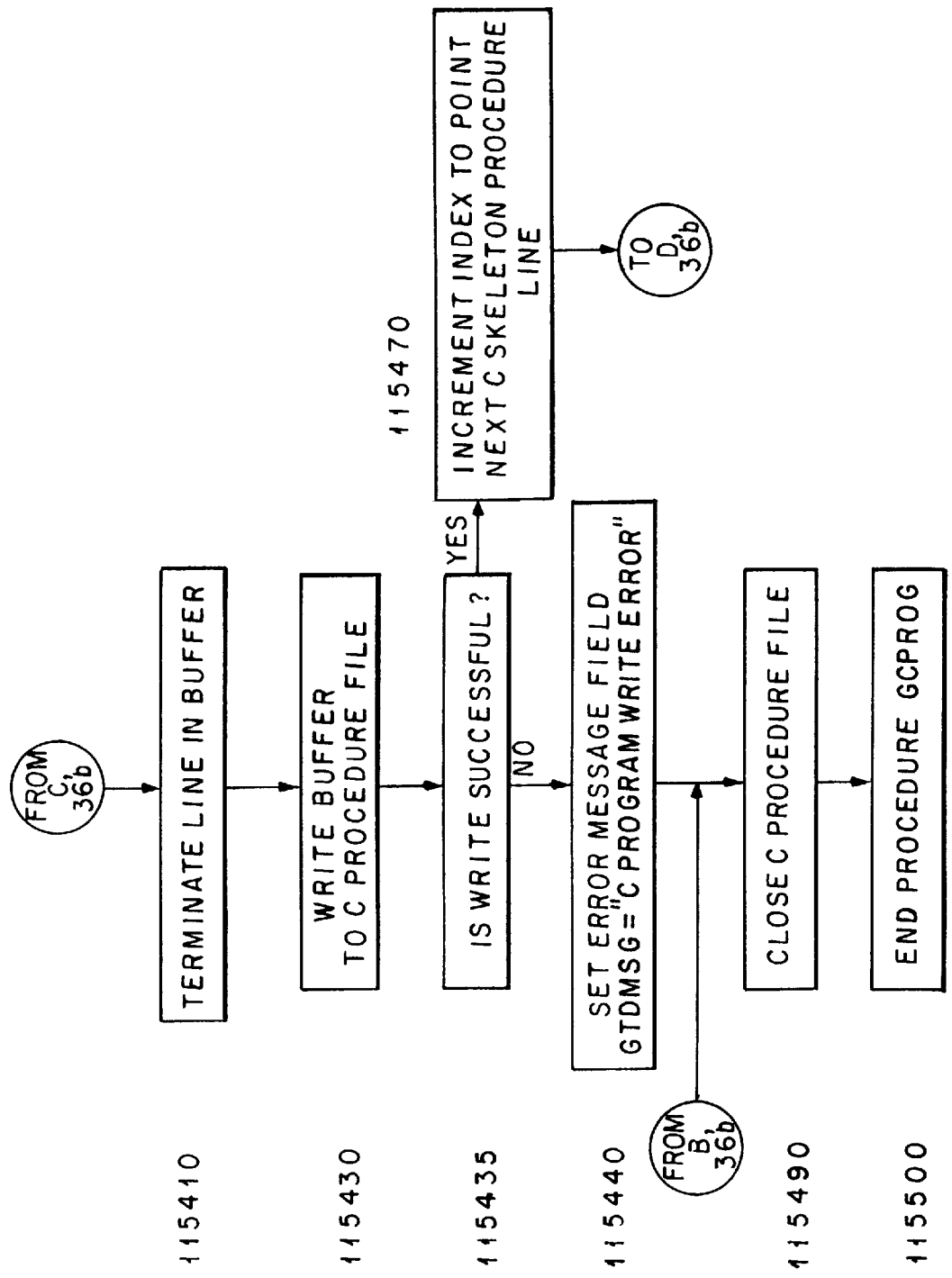
Figure 37A:
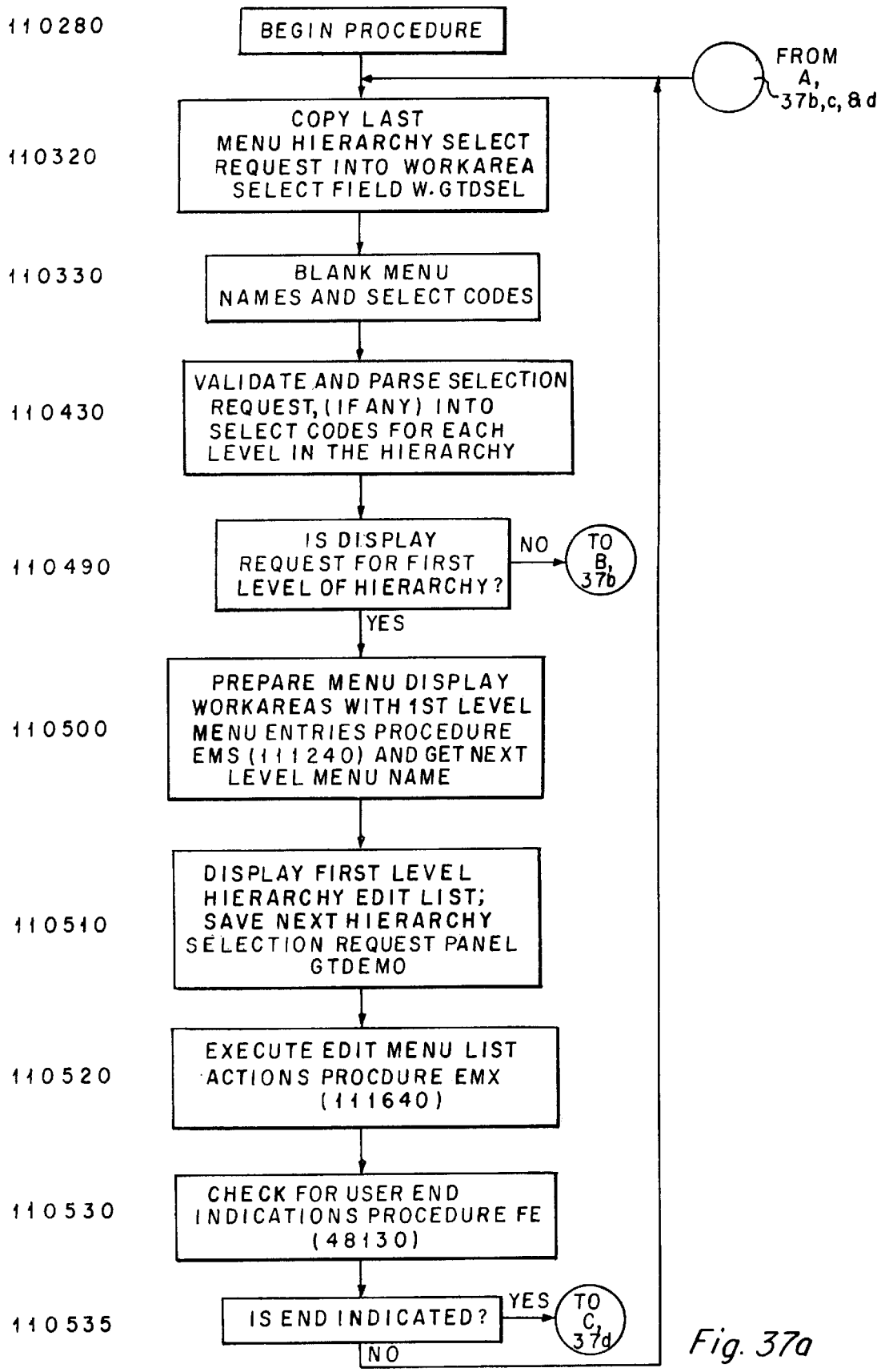
FIGS. 37a–d are a flow chart depicting the edit menu list (EM) procedure according to the preferred embodiment of the present invention.
Figure 37B:
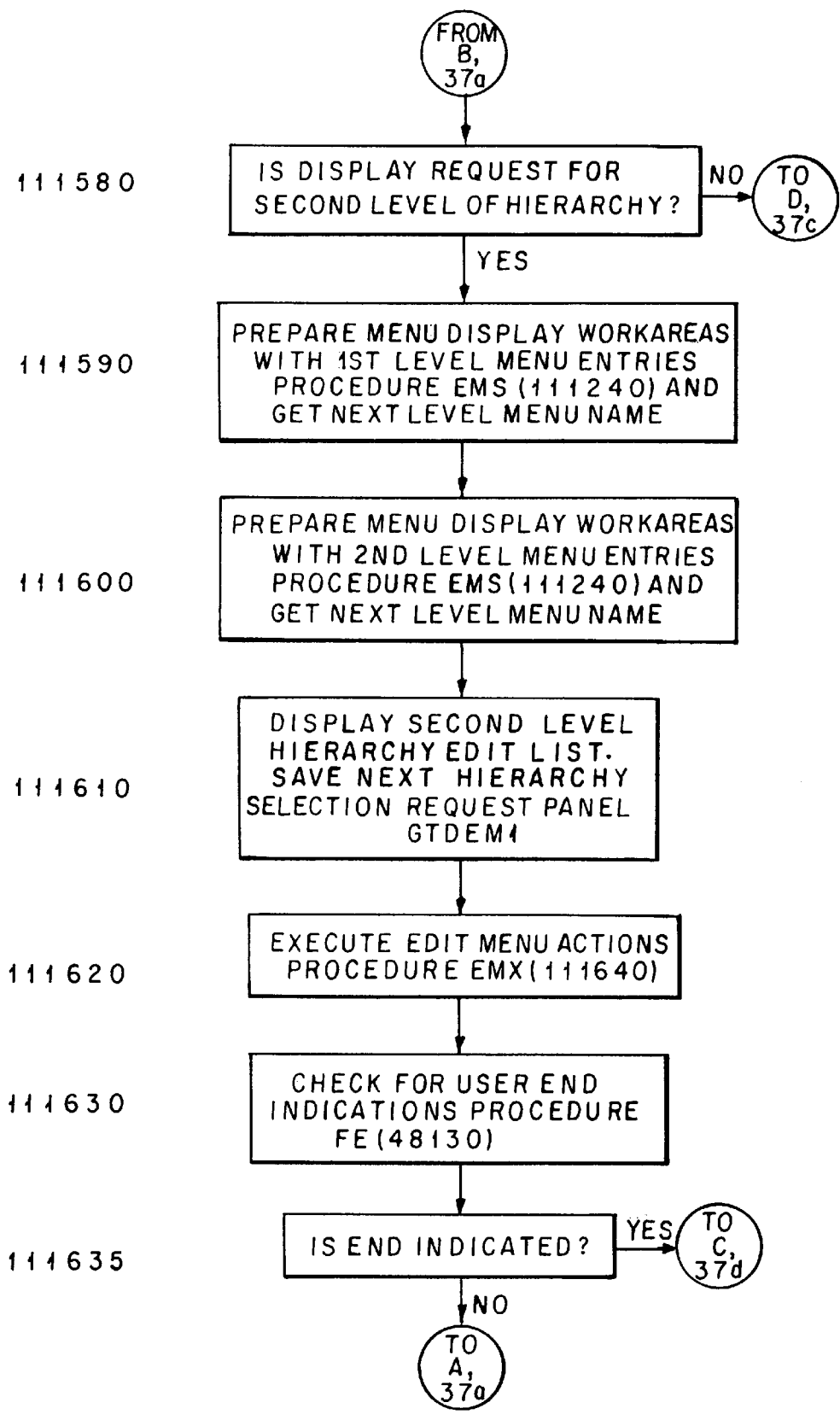
Figure 37C:
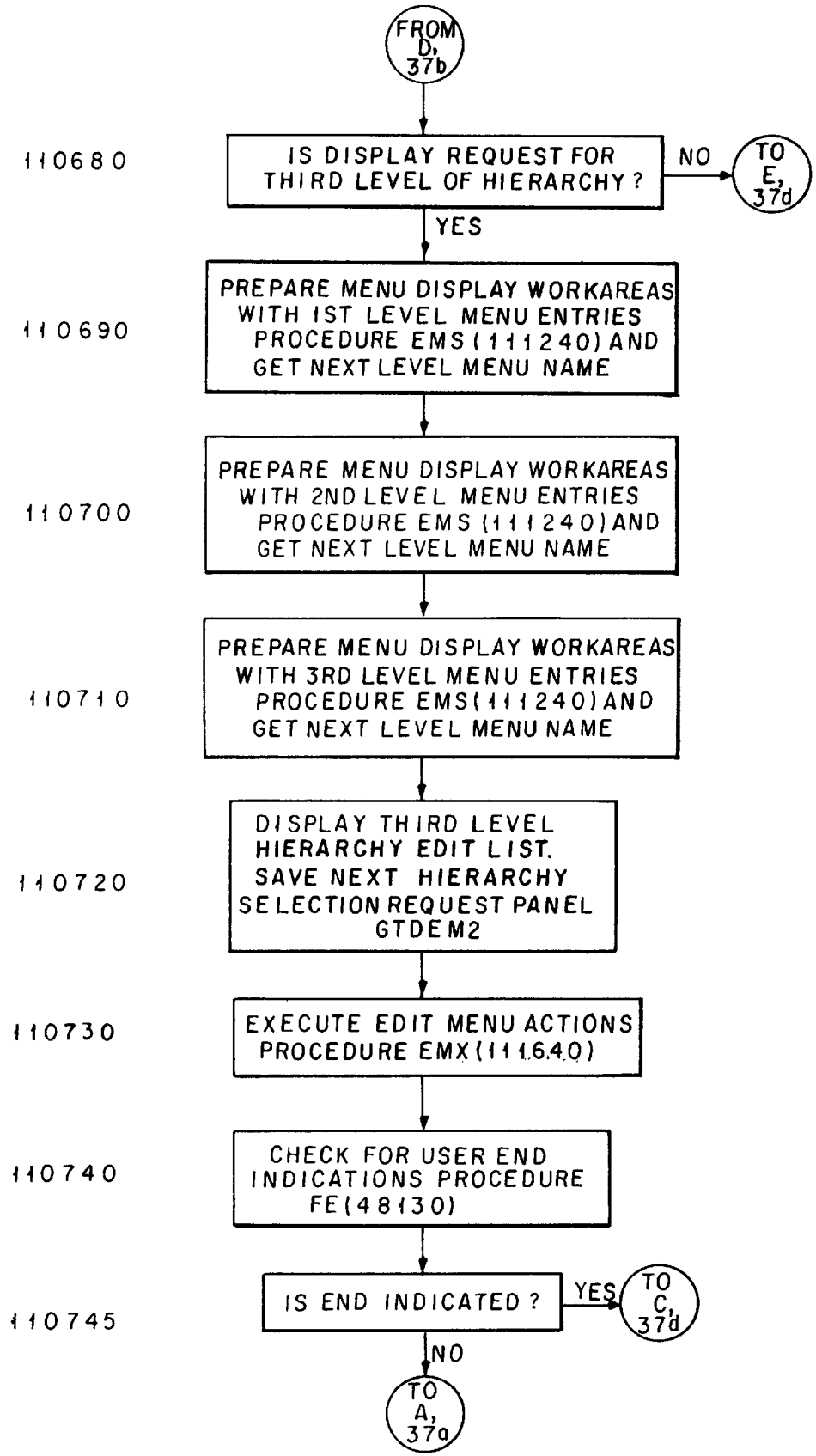
Figure 37D:
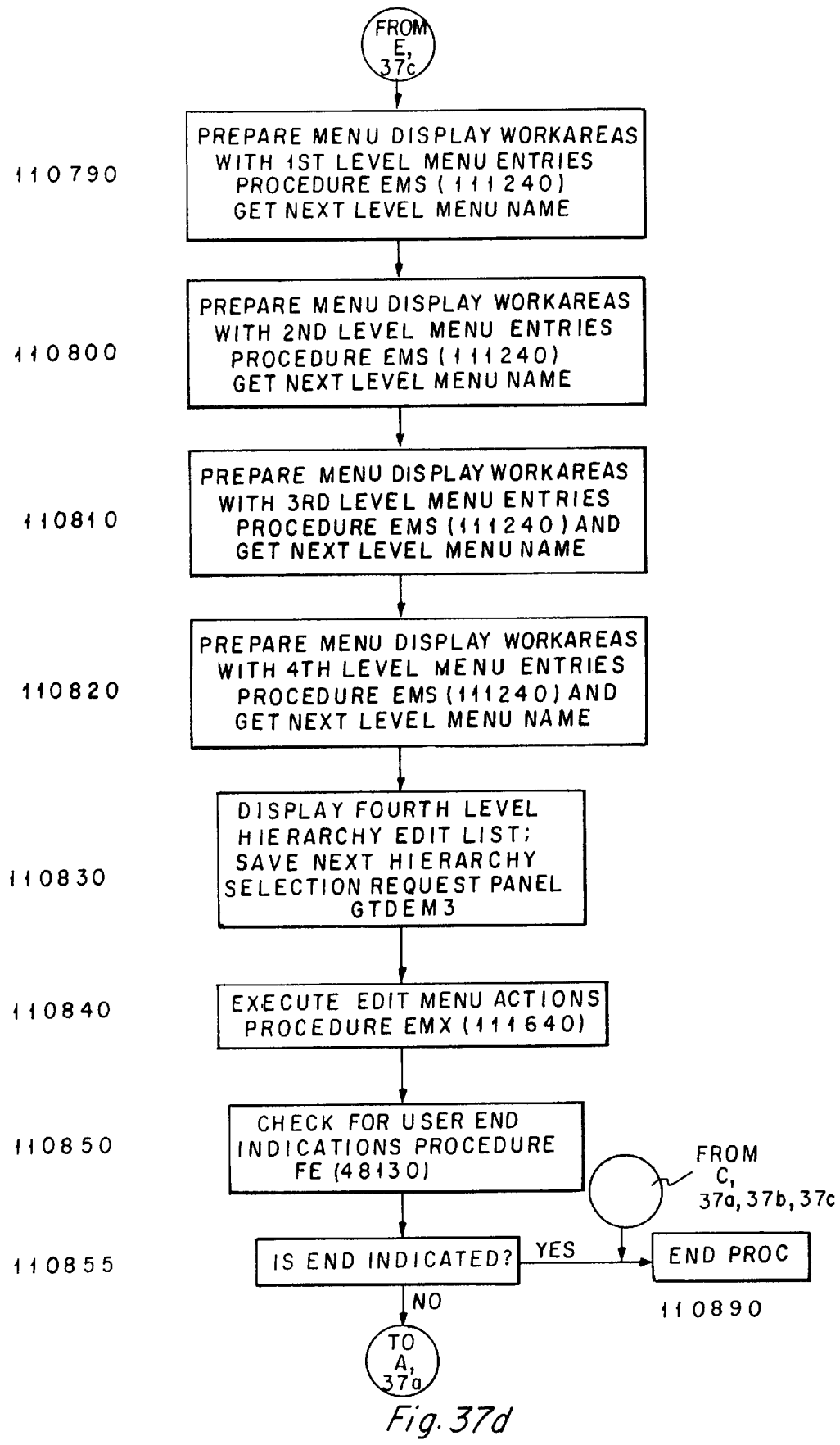

Block 109750 checks to see if the procedure is in C language. If it is not, the procedure continues at Block 109930. If it is in C, the procedure builds a procedure file name (Block 109760), and verifies the procedure file exists (Block 109850). If the file exists (Block 109855), the procedure proceeds to Block 109860. If not, the procedure saves the procedure name in gtdpmem (Block 109860), and at Block 109870 generates a skeleton program using the GCPROG procedure (FIG. 36, Block 114950).

Block 109900 performs the do-exit editor procedure (FIG. 33, Block 43860) on the procedure file, and the program exits the procedure (Block 109930).

GENERATE COBOL PROGRAM: GCOBPROG PROCEDURE. Considering next FIGS. 35*a–c*, which depict the preferred embodiment of this procedure, the GTD generate COBOL program procedure begins by putting the COBOL procedure path name from gtdslib into the COBOL procedure file name (Block 7460). Then the procedure checks to see if the COBOL procedure name is undefined, gtdpmem is blank (Block 7490). If gtdpmem is blank, the program exits the procedure with an error. If gtdpmem is not blank, a fully qualified COBOL procedure name file is built using the machine standard conventions (Block 7520). Once the COBOL procedure name is built, the program checks to see if the procedure already exists (Block 7580). If the procedure does exist, the error message field, GTDMSG is set to "COBOL PROGRAM EXISTS" (Block 7590), and the program exits the procedure with an error. If the procedure does not exist, an attempt is made to create the COBOL procedure file (Block 7630). If the create is not successful, the program exits the procedure with an error. If the create was successful, an index is initialized to point to the first line of the skeleton program.

Decision Block 7670 checks for the end of the skeleton program initialization data (Block 7670). If it is at the end of the initialization data, the procedure closes the COBOL procedure file (Block 7910) and exits procedure GCOB-PROB (Block 7920). If it is not at the end, this line is copied into the output buffer (Block 7700).

At this point the buffer contents are examined to locate the skeleton COBOL procedure lines which need customizing for the application. In the preferred embodiment of the present invention, the program id, the transaction view copy file and the first section name are customized.

The line moved into the output buffer is checked to see if it is line 003000 of the skeleton program (Block 7710). If it is line 003000, the program id, assumed to be defined on this line, is set to the procedure name and the procedure moves on to Block 7840. If it is not line 003000, the procedure checks to see if the line moved into the output buffer is line 001200 of the skeleton program (Block 7740). If so, the copy statement is set to the transaction view name and the procedure proceeds to Block 7840. If it is not line 001200, the procedure checks to see if the line moved into the output buffer is line 001800 of the skeleton program (Block 7700). If it is, the section header is set to contain the procedure name and the procedure continues to Block 7840. If it is not line 001800, execution continues with Block 7840 where the procedure terminates the line in the output buffer by placing a new line character at the end of the line. This line termination is a UNIX convention. Other terminal conventions may be used, such as filling a line with line spaces (a mainframe).

The output buffer is then written to the COBOL procedure file (Block 7850), and the procedure checks to see if the write was successful (Block 7855). If so, the procedure increments the index to point to the next line of the skeleton program and returns to Block 7670. If the write was not successful, the error message field GTDMSG is set to "COBOL PROGRAM WRITE ERROR" (Block 7860), the COBOL procedure file is closed (Block 7910). The program then exits the procedure (Block 7920).

GTD GENERATE C PROGRAM: GCPROG PROCEDURE: Looking now at FIGS. 36*a–c*, which show the preferred embodiment of this procedure according to the present invention, the GTD generate C program procedure begins by putting the C procedure pathname, gtslib, into the C procedure file name (Block 115010). Decision Block 115040 checks to see if the C procedure name is undefined, gtdpmem is blank. If blank, the procedure is exited with error. If not blank, the procedure name is validated by converting to uppercase. If valid, a fully qualified C procedure file name is built with procedure name gtdpmem and current machine standard naming conventions (Block 115180). Decision Block 115130 checks if the C procedure file exists. If not, the procedure continues to Block 115180. If the C procedure file exists, the procedure sets the error message field GTDMSG equal to "C PROGRAM EXISTS" (Block 115140) and exits the procedure file (Block 115150).

Block 115180 creates the C procedure file. Decision Block 115190 checks whether the create was successful. If not, the program exits the procedure with error. If the create was successful, the index is initialized to point to the first skeleton program line initialization data (Block 115210).

Decision Block 115220 checks for the end of the skeleton program initialization data. If the end of the initialization data is found, the procedure jumps to Block 115490. If the end of the initialization data is found, the procedure jumps to Block 115490. If the end of the initialization data is not found, then the procedure copies the line of skeleton program into the output buffer (Block 115250). Decision Block 115270 checks if the line of skeleton C program in the buffer contains the transaction view include statement. If so, the transaction view name is customized to refer to the application C transaction view file name. If not, Decision Block 115340 checks whether the line of skeleton C program contains the procedure name for the skeleton C program. If so, then the procedure name is customized to refer to the application C procedure name. If it does not contain the procedure name, then execution continues with Block 115410 by terminating the line in the buffer. The program writes the buffer to the C procedure file (Block 115430) and checks if the write was successful (Block 115435). If write is successful, the program increments the index to point to the next C skeleton procedure line (Block 115470) and then return to Block 115220. If the write is not successful, the procedure sets the error message field GTDMSG="C PROGRAM WRITE ERROR" (Block 115440). The program then closes the C procedure file (Block 115490) and ends procedure GCPROG (Block 115500).

EDIT MENU LIST. This procedure is another third level procedure which provides a display panel which includes information from the TDF menu record type. This information characterizes a menu entry definition and is displayed on the panel in a list. Since more menu entries may be defined than may be displayed at one time, facilities are provided to allow some navigation through the menu list. Functions are also provided for adding new menu definitions, modifying current menu definitions, deleting current menu definitions, and displaying current definitions.

GTD option 1.4 presents the application designer with the 'EDIT MENU' panel. The designer can edit entries within the four level hierarchy of menus supported by the GTD system. Upon initial request, the Master Menu for the transaction will require appropriate select codes, descriptions, a panel to be presented when a selection is made, and a procedure to be invoked when an entry is selected (optional).

To add an entry to the menu, an 'A' is entered in any select field. This presents an 'ADD MENU ENTRY' panel, allowing addition of a select code, a description, a panel to be presented when selection is made, or a procedure to be invoked when entry is selected (optional). When the 'ADD MENU ENTRY' panel is completed, the entry is added, and the EDIT MENU panel will be presented.

To delete an entry from the menu, a 'D' is entered in the select field.

To change an entry to the menu, a 'C' is entered in the select field. The user makes changes as necessary to the 'CHANGE MENU ENTRY' panel which allows changes to the description, panel name, or output procedure name. When the 'CHANGE MENU ENTRY' panel is completed, the changes will be incorporated, and the EDIT MENU panel presented.

The GTD system supports four levels of menus. To select a lower level menu to be edited, enter a selection sequence in the form S(select.select.select) in the command line of the 'EDIT MENU' panel. This specifies the menu within the hierarchy, the designer wants to edit. This is a cumulative process. The designer must define the Master Menu first and indicate an entry on the Master Menu is intended to reference a sub-menu by specifying an entry selection code, description field, and panel name that will be the name of this sub-menu, leaving the output procedure name blank. This continues (repeats) for up to four levels.

FIGS. 37*a–d* depict the flow chart of the preferred embodiment of the EM procedure detailing these functions further.

The GTD edit menu hierarchy procedure begins (Block 110320) by copying the last menu hierarchy select request into the workarea select field, w.gtdsel. Block 11330 blanks the menu names and selects codes for each level of the hierarchy, then Block 110430 validates and parses the selection request (if any) into select codes for each level in the hierarchy. The format of a selection request is S(x1.x2.x3); the "S(" or "s(" is searched for as the beginning of the request. If the keyword is found, then each x value is located and assigned to a hierarchy selection code. (x1 is assigned to hierarchy level 1, x2 is assigned to hierarchy level 2, and x3 is assigned to hierarchy level 3). If no hierarchy level is requested then its value is left blank, indicating no request specified for that level. If the display request is not for the first level of the hierarchy (Block 110490), the program proceeds to Block 110580. If it is, Block 110500 prepares the menu display workareas with the first level menu entries, procedure EMS, (FIG. 38, Block 111240) and gets the next level menu name. Block 110510 displays the first level of the hierarchy edit list and saves the next hierarchy selection request panel in GTDEMO (displays an edit list for information in the first level of the hierarchy). This process involves getting the new date/time and formatting the screen date/time fields. The panel interpreter is called to generate the screen output. GTDMSG is set to blanks and the panel map interpreter is called to obtain user panel input. After input is obtained, the user select field is saved (Block 110510).

Figure 39:
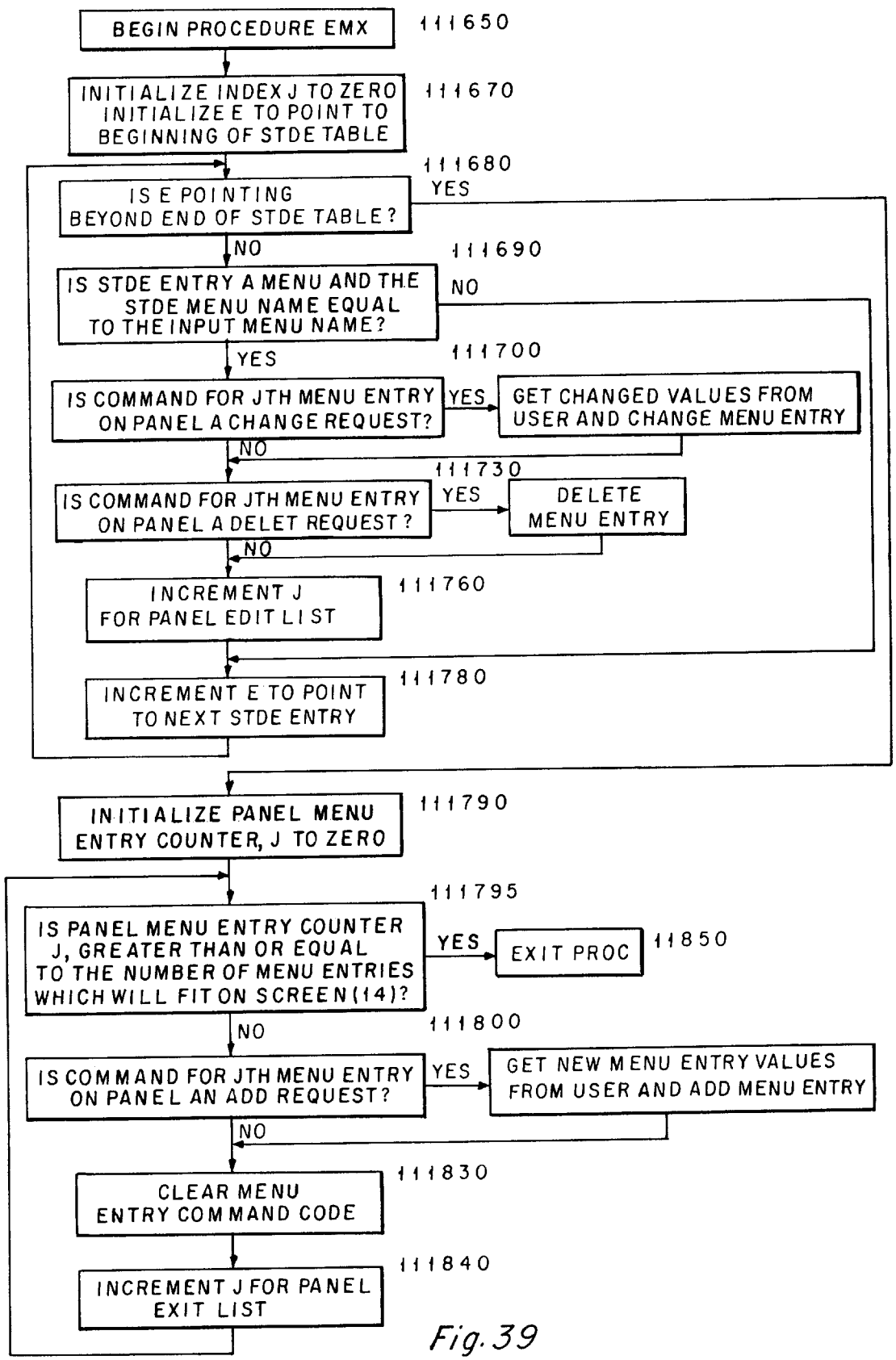
FIG. 39 is a flow chart depicting the edit menu list (EMX) procedure according to the preferred embodiment of the present invention.
Figure 40A:
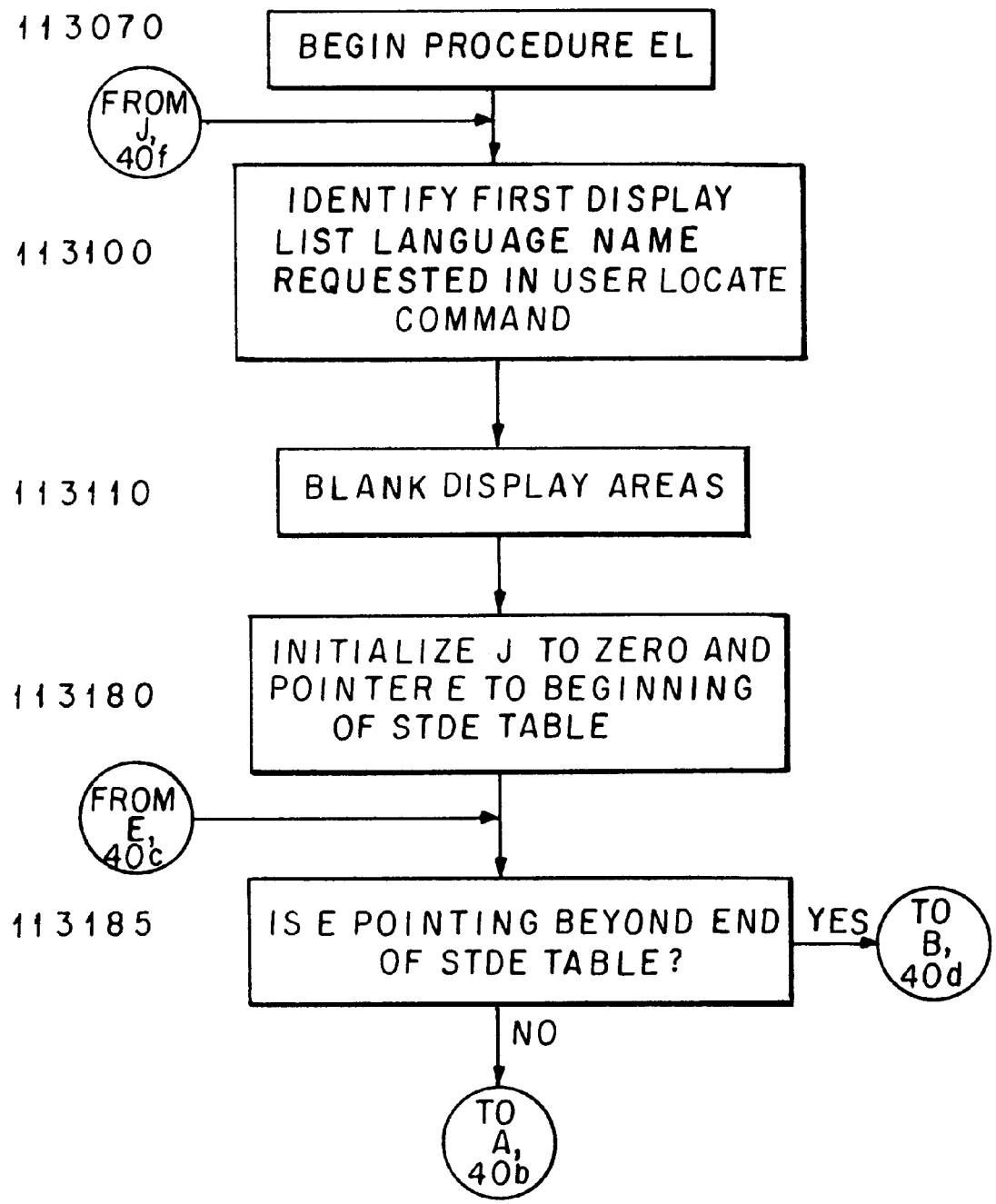
FIGS. 40a–f are a flow chart depicting the edit language list (EL) procedure according to the preferred embodiment of the present invention.
Figures 40B, 40C:
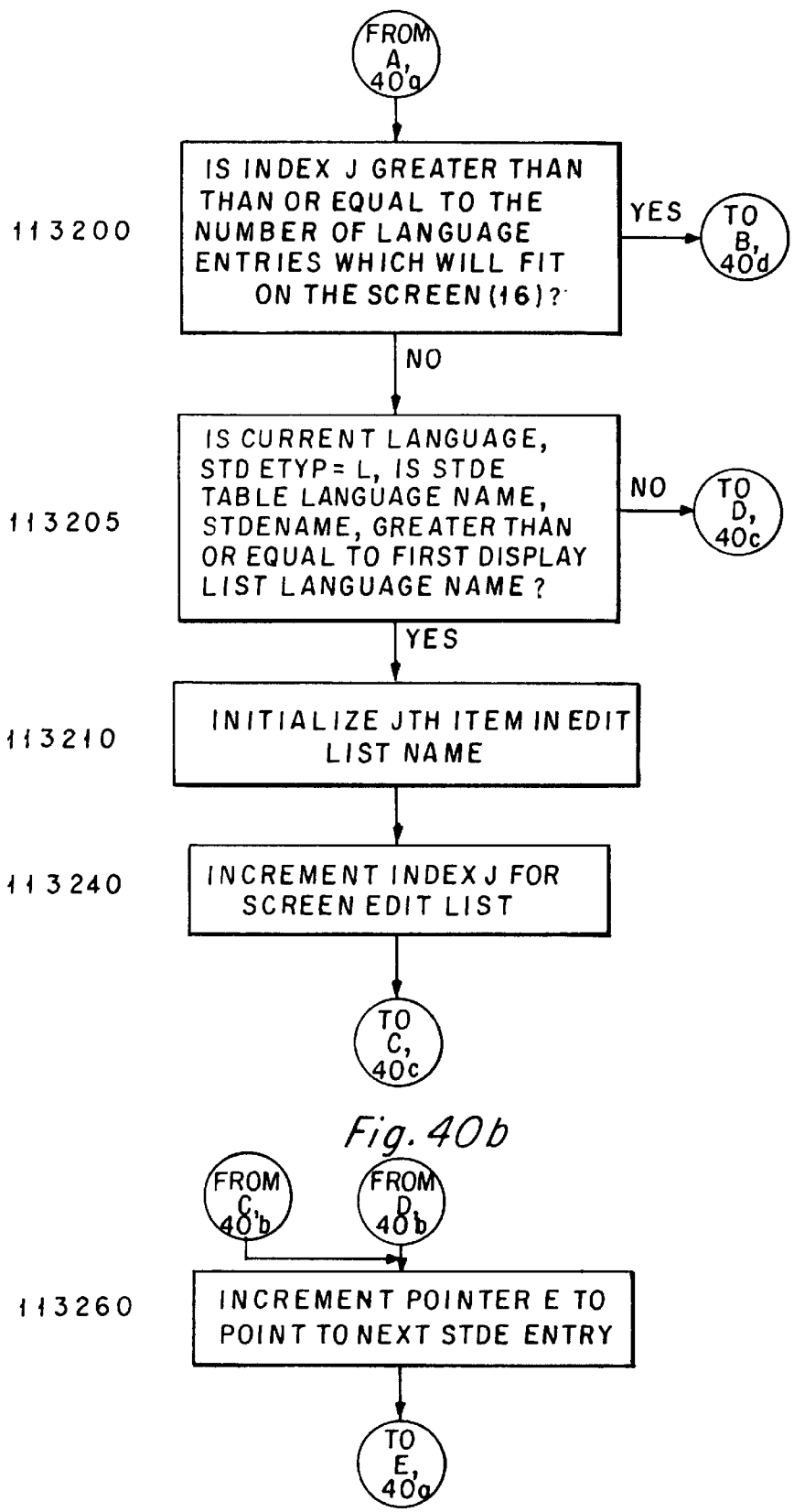
Figure 40D:
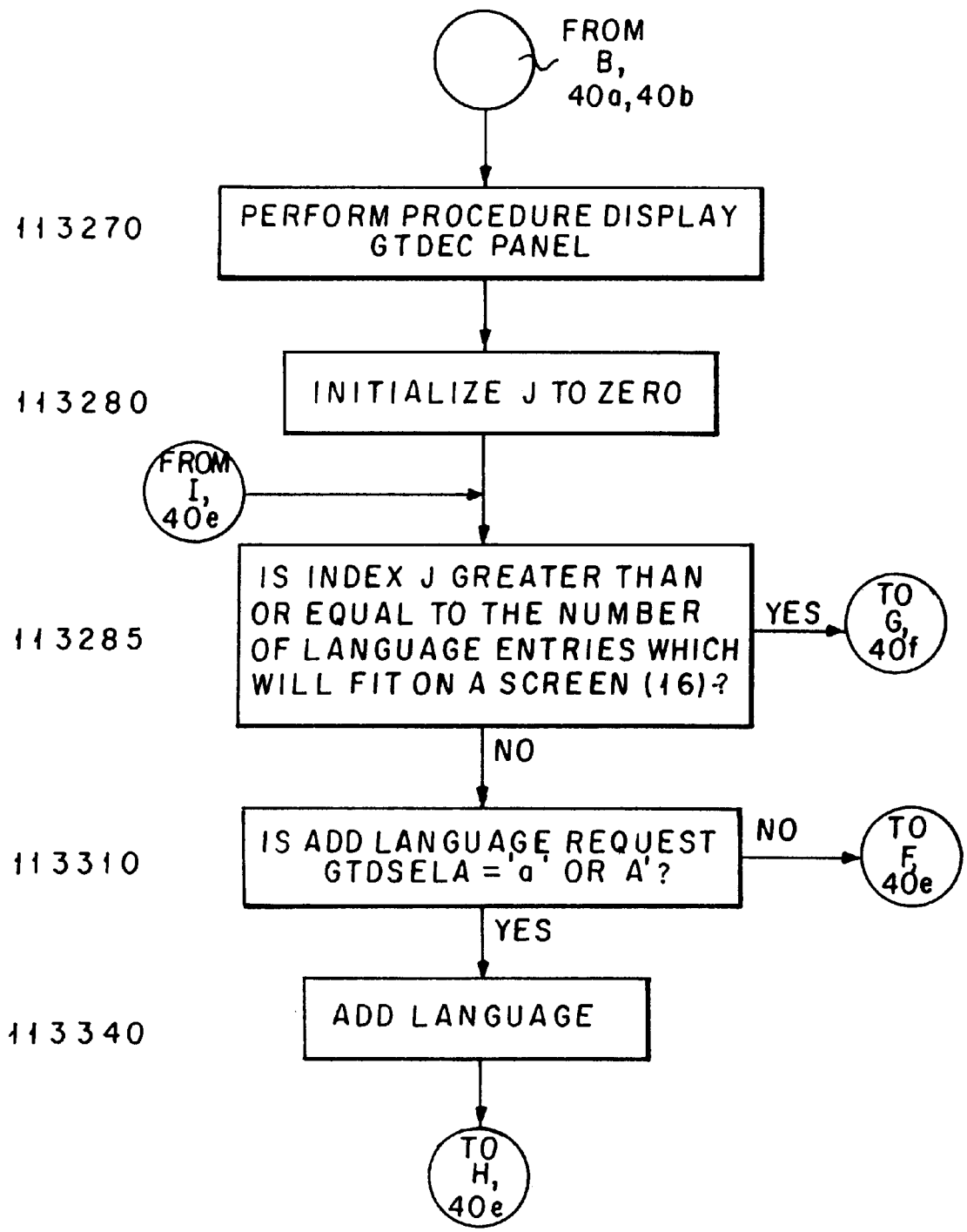
Figure 40E:
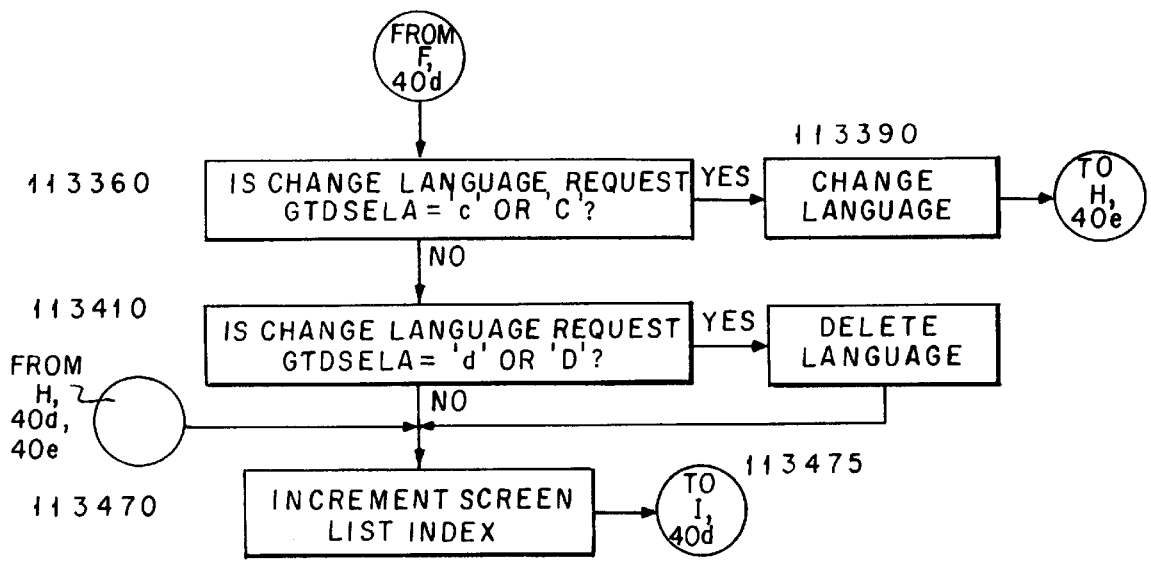
Figure 40F:
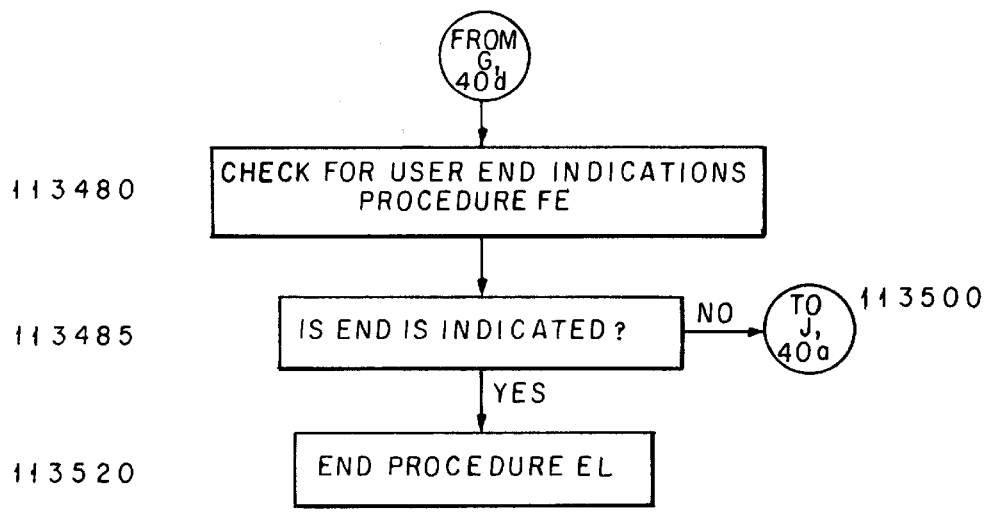
Figure 42A:
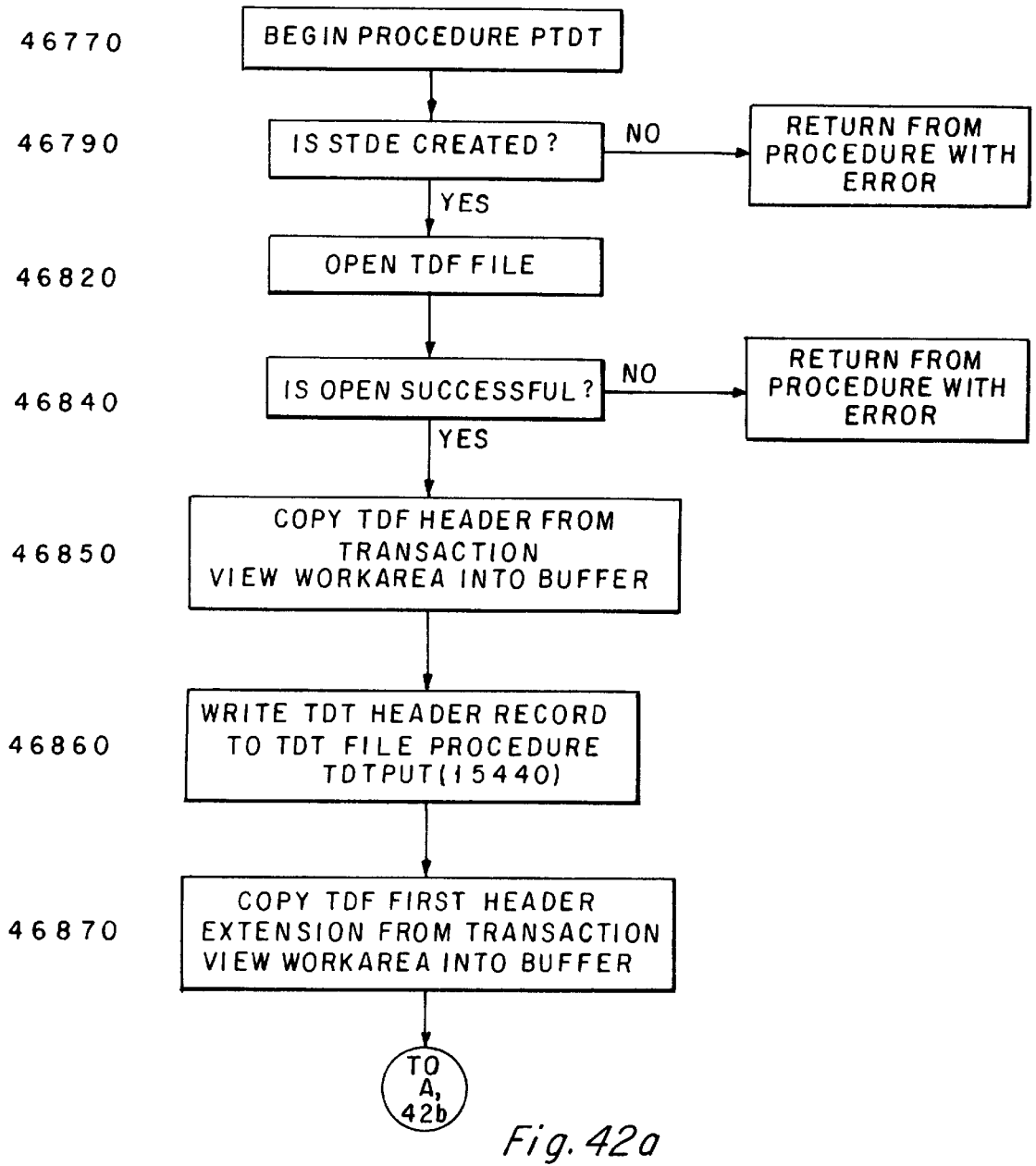
Figure 42B:
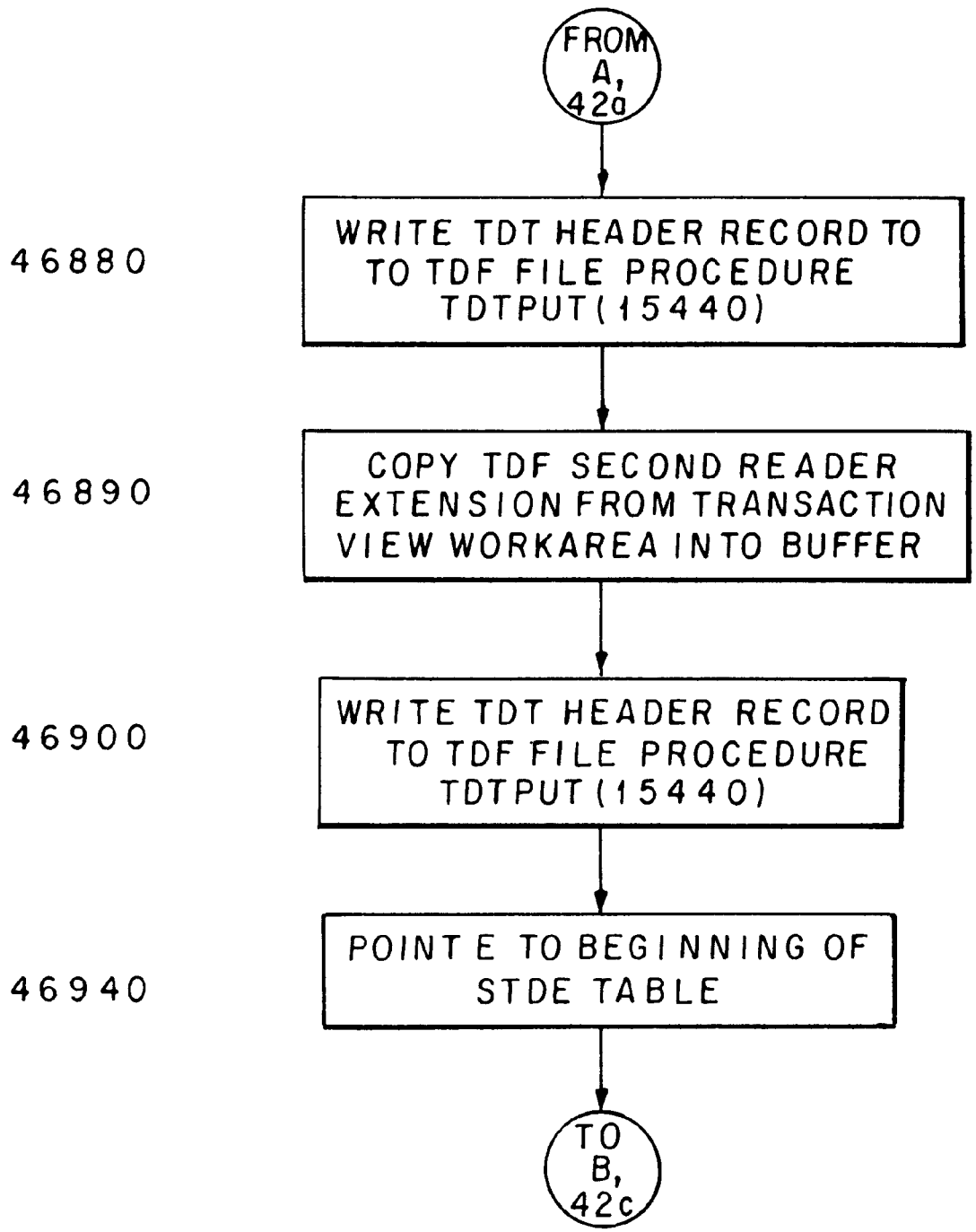

Block 110520 executes the edit menu list, procedure EMX (FIG. 39, Block 111640). Block 110530 checks for a user end indication, procedure FE (FIG. 22, Block 48130). If the end is indicated (Block 110535) the program exits the procedure (Block 110890). If not, the program returns to Block 110320 and continues processing.

If the display request was not for the first level of the hierarchy (Block 110490), Block 110580 determines if the request is for the second level of the hierarchy. If not, the program jumps to Block 110680. If it is, Block 110590 prepares the menu display workareas with the first level requested menu entries, procedure EMS, and gets the next level menu name. Block 110600 prepares the second level menu display workareas with the second level requested menu entries, procedure EMS, and gets the next level menu name. Block 110610 displays the second level hierarchy edit list and saves the next hierarchy selection request on panel GTDEM1 (displays an edit list for the second level menu as well as selection and description information on the previous level) as described in Block 110510. Block 110620 executes the edit menu list, procedure EMS. Block 110630 checks for a user end indication, procedure FE. If the end is indicated (Block 110632) the program exits the procedure (Block 110890). If not, the program returns to Block 110320 and continues processing.

If the display request was not for the second level of the hierarchy (Block 110580), Block 110680 determines if the request is for the third level of the hierarchy. If not, the program jumps to Block 110790. If it is, Block 110690 prepares the first level menu display workareas with the first level requested menu entries, procedure EMS, and gets the next level menu name. Block 110700 prepares the second level menu display and workareas with the second requested menu entries, procedure EMS, and gets the next level menu name. Block 110710 prepares the third level menu display workareas with the third level request menu entries, procedure EMS, and gets the next level menu name. Block 110720 displays the third level hierarchy edit list and saves the next hierarchy selection request panel in GTDEM2 (displays an edit list for the third level menu as well as selection and descriptive information on the previous 2 level menus) using the process described in Block 110510. Block 110730 executes the edit menu list, procedure EMX. Block 110740 checks for a user end indication, procedure FE. If the end is indicated (Block 110745) the program exits the procedure (Block 110890). If not, the program returns to Block 110320 and continues processing.

If the display request was not for the third level of the hierarchy (Block 110680), Block 110790 prepares the first level menu display workareas with the first level requested menu entries, procedure EMS, and gets the next level menu name. Block 110800 prepares the second level menu display and workareas with the second requested menu entries, procedure EMS, and gets the next level menu name. Block 110810 prepares the menu third level display workareas with the third level request menu entries, procedure EMS, and gets the next level menu name. Block 110820 prepares the fourth level menu display workareas with the fourth level request menu entries, procedure EMS, and gets the next level menu name. Block 110830 displays the fourth level hierarchy edit list and saves the next hierarchy selection request on panel GTDEM3 (display and edit list for fourth level with selection and description information for the previous 3 levels) using the process described in Block 110510.

In the currently supported menu hierarchy, only four levels are supported, but more levels could be supported by extending the logic presented here to cover more levels. Since the edit menu list display panel actually displays description and select information from previous levels in the hierarchy, new panels could be designed to display more levels and thereby extend the current logic and data area usage. Alternatively, logic could be added after handling the fourth menu hierarchy to display the previous 3 levels selected and describe information for menu hierarchy levels greater than 4.

Block 110850 checks for a user end indication, procedure FE (FIG. 22, Block 48130). If the end is indicated (Block 110855) the program exits the procedure (Block 110890). If not, the program returns to Block 110320 and continues processing.

Figure 38:
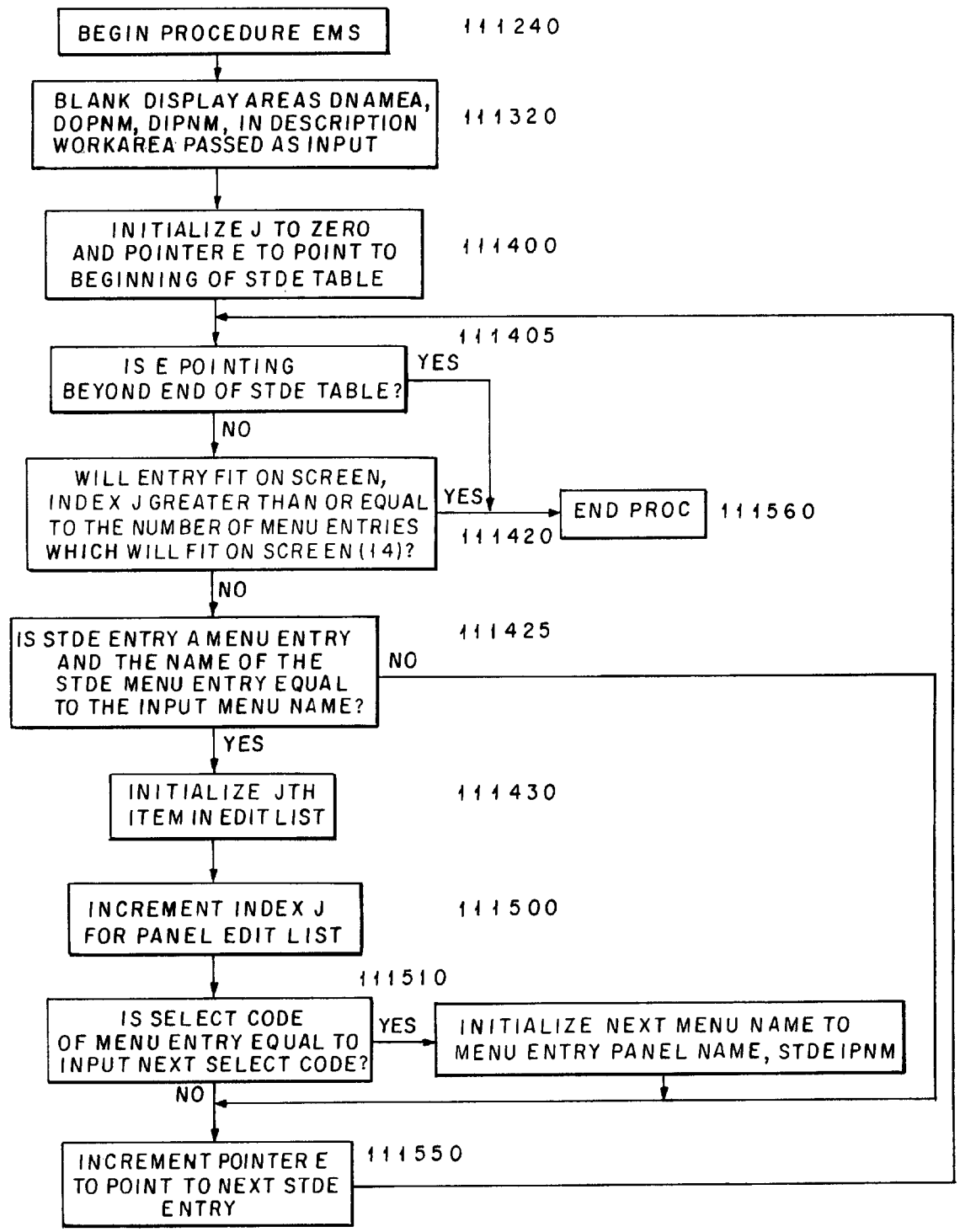
FIG. 38 is a flow chart depicting the prepare menu display (EMS) procedure according to the preferred embodiment of the present invention.

GTE PREPARE MENU DISPLAY; EMS PROCEDURE. FIG. 38 depicts a flow chart of the preferred embodiment of this procedure, according to the present invention. The GTD prepare menu display procedure initializes the display areas for the description, output panel, output procedure for each menu entry in the current menu. It takes as input the name of the current menu to be displayed, the workarea in which to place the select/description information, and the next menu select code. The EMS procedure outputs the initialized workareas for the current menu and the menu name corresponding to the next menu select code.

The EMS procedure begins by blanking out the menu display areas dnamea, dopnm, and dipnm in the workarea description (Block 111320), then initializing j to zero and the pointer e to point to the beginning of the STDE table (Block 111400). Decision Block 111405 checks if e is pointing beyond the end of the STDE table. If so, the program exits the procedure (Block 111560). If e is not pointing beyond the end of the STDE table, the next Decision Block 111420 checks if the entry will fit on the screen, that is, if index j is greater than or equal to the number of menu entries that will fit on the screen (16). If so, the program exits the procedure (Block 111560). If not, Decision Block 111425 checks if the STDE entry is a menu entry (STDETYP=E) and if the STDE menu entry name STDENAME is equal to the input menu name, menu. If not, the program exits the procedure (Block 111560). If so, the program initializes the jth item in the edit list and sets the following parameters: panel name is set to dnamea=STDEIPNM; output procedure name is set to dopnm=STDEOPNM; description is set to STDESEL, '-', including the portion of STDEDESC that will fit in the field, (Block 111430). The next step increments index j for the panel edit list (Block 111500). Then, Decision Block 111510 checks if the select code of the menu entry is equal to the next select code input value. If the menu entry is equal to the next selection input value then the procedure initializes the next menu name to the menu entry panel name, STDEIPNM (Block 111510). Otherwise, the program increments pointer e to point to the next STDE entry (Block 111550) and returns to Decision Block 111405 to check if e is pointing beyond end of STDE table. If so, the program exits the procedure (Block 111560). If not, at Block 111405, the program returns to Block 111420 and continues processing.

GTD EDIT MENU LIST: EMX PROCEDURE. FIG. 39 depicts a flow chart of the preferred embodiment of this procedure wherein, the EMX procedure processes the used add, delete, and change menu entry request operations for the menu entry edit list displayed.

The GTD edit menu list procedure begins (Block 111670) by initializing index j to zero and setting pointer e to the beginning of the STDE table. At Block 11680, the procedure then determines whether the e pointer has moved beyond the end of the STDE table. If so, the program jumps to Block 111790. If the e pointer has not moved beyond the end of the STDE table, the procedure determines (Block 11690) whether the entry is a menu entry (STDETYP=E) and if the menu entry name is equal to the input menu name (STDENAME=menu). If not, the procedure continues at Block 111780, to examine the next entry in the STDE table. If it is, the procedure determines whether the command for the jth menu entry on panel is a change command (Block 111700).

If it is a change request, the values in the STDE menu entry are copied into the work area fields which correspond to a STDE entry and a menu is displayed requesting changes for the menu characterization information. The input values are validated by translating the output panel and output procedure, gtdeipnm and gtdeopnm, to upper case, and then moved back into the STDE entry to complete the change. The only change the user is not permitted to perform with this implementation is any change to the menu name; although, this change could easily be performed by deleting the old STDE entry and adding the new STDE entry.

If it is not a change command, the program determines if the command for the jth menu entry on the panel is a delete command (Block 111730). If it is, the procedure deletes the menu entry in the STDE table by overwriting the deleted entry with the later entries in the STDE table. The STDE entry count, nent, is decremented and e is modified to point to the previous STDE entry.

If not, the procedure increments index j for panel edit list (Block 111760), then moves the e pointer to the next STDE entry (Block 111780), and returns to Block 111680 to continue processing.

Block 111790 initializes the panel menu entry counter and sets index j to zero. The procedure then determines if the panel menu entry counter, j, is greater than or equal to the number of menu entries which will fit on the screen (14) (Block 111795). If the counter has reached the maximum, the program exits the procedure (Block 111850). If the counter has not reached the maximum, the program determines if the command for the jth menu entry on panel is an add request (Block 111800). If it is, the work area fields which correspond to a STDE entry are cleared. the menu name initialized, and a panel is displayed requesting new menu entry characterization information from the user. The user input values are validated by translating the output panel and output procedure names, gtdeipnm and gtdeopnm, to upper case and then the menu entry is added using the process described in FIG. 33, Block 46290. If not, the procedure clears the menu entry command code (Block 111830), increments index j for panel edit list (Block 111840), and returns to block 111795 to continue processing.

EDIT LANGUAGE LIST. This procedure is another third level procedure which provides a display panel which includes information from the TDF language record type. This information characterizes a language entry definition and is displayed on the panel in a list. Since more language entries may be defined than may be displayed at one time, facilities are provided to allow navigation through the language list. Functions are also provided for adding new language definitions, modifying current language definitions, deleting current language definitions, and displaying current definitions.

When the user requests HELP documentation, GLOSsary support, or INFOrmation, the Language of Preference field determines the appropriate documentation to present to the user. If the documentation does not exist in the user's language of preference, English documentation will be presented, if available.

The GTD system supports applications that use HELP, GLOS, and INFO documentation to describe the functionality of the application. This documentation is maintained as part of the TDT. As the TDT is initially built, the designer can specify the report and generation to designate the documentation location. This feature can be extended to support multiple languages through the Edit Language List facility. The Edit Language list facility allows the designer to edit a list of languages and the associated report.generation for the documentation. The application designer can then provide documentation in the user's language of preference.

GTD 1.5 presents the designer with a list of languages specified for this TDT. Each language entry includes a report and generation specification to identify where the documentation resides for that language. The designer can add, change, or delete entries within this language list, by entering 'A', 'C', or 'D', respectively, and modifying the entries as necessary.

FIGS. 40*a–f* depict the flow chart of the preferred embodiment of the EL procedure, detailing these functions further.

The GTD edit language list procedure begins by scanning the select field for the locate command input by the user. The locate name is saved in the dname field of the transaction view. This locate name is used as the initial language entry to be displayed in the edit list. If there is no locate command, dname is set to blank (Block 113100). The following display area variables are blanked (Block 113110): select, variable gtdsela; name, variable dnamea; report, variable dipnm; and generation, variable dopnm. Index, j, and pointer E are initialized to the beginning of the STDE table (Block 113180).

Blocks 113185 through 113260 constitute a process by which the initial language list item to be displayed on the screen is located in the STDE table. Then the initial language name, and as many subsequent languages names as will fit on the display, are placed in language list display fields with the corresponding language characterization information from the STDE table for each language entry displayed. The process is finished when all language names up to the end of the list, or all languages names which will fit on the screen, and their characterization data have been placed in the display fields.

Decision Block 113185 checks to see if e is pointing past the end of the STDE table. If it is, the procedure jumps to Block 113270. If not, the procedure checks to see if j is greater than or equal to the number of language entries(16) which will fit on a screen (Block 113200). If j is greater than or equal to 16, the procedure jumps to Block 113270. If not, the procedure checks to see if the current language (STDETYP=L) is an STDE table language name, STDENAME, greater than or equal to the next language name, dname, requested by the user (Block 113205). If the current language name is not greater or equal to the request language name, the procedure jumps to Block 113260. If the current language name is greater or equal to the next language name, the jth item in the edit list is initialized to the following values: ;name, variable dnamea=STDENAME; report, variable dipnm=STDEIPNM, and generation, variable dopnm=STDEOPNM, (Block 113210). The procedure increments index j (Block 113240), increments pointer e to point to the next STDE entry (Block 113260), and then returns to Block 113185 to continue processing.

Block 113270 performs the procedure to display a panel (FIG. 21, Block 47300), electing to display the GTDEC panel.

Blocks 113285 through 113475 constitute a process by which each user request for each language list item is examined. If an add, delete, or change, request is identified then the appropriate task is performed. The process is complete after the requests have been identified and performed for each language entry in the list.

J is initialized to zero (Block 113280) and the procedure checks to see if j is greater than or equal to the number of language entries (16) which will fit on a screen (Block 113285). If j is greater or equal to 16, the procedure proceeds to Block 113480. If not, the procedure checks to see if there is an add language request, gtdsela='a' or 'A' (Block 113310).

If there is an add request, a language is displayed requesting the language characterization information as described in the language record type of the TDF. The input values are validated. This typically involves translating the language, documentation report, and documentation generation names to upper case. After the input values are validated an attempt is made to add the new language entry to the STDE table for later storage in the TDF. The attempt will fail if the language name provided is blank, if the STDE table is full, or if the language name provided already exists in the table. If no error is detected, the language entry is inserted in the STDE table ascending language sequence. The STDE entry count, nent, is incremented. Once the language is added, the procedure jumps to Block 113470. If there is no add request, the procedure checks to see if a change language request gtdsela='c' or 'C' (Block 113360).

If there is a change request, the change request language name is verified. A change request can not be performed if the language is not defined in the STDE table. If the language is listed in the STDE table, the values in the STDE language entry are then copied into the workarea fields which correspond to STDE entry and a language is displayed requesting changes for the language characterization information. The input values are validated as described for an add language request (Block 113310) and moved back into the STDE entry to complete the change. The only change the user is not permitted to perform with this implementation is a change to the language name. Once the language is changed the procedure proceeds to Block 113470. IF there is no change request, the procedure checks to see if there is an delete language request, gtdsela='d' or 'D' (Block 113410).

If there is a delete request, the delete request language name is verified. A delete request can not be performed if the language is not defined in the STDE table. If the language is listed in the STDE table, then the language is deleted by overwriting the deleted entry with the later entries in the STDE table. The STDE entry count, nent, is decremented. Once the language is deleted the procedure moves to Block 113470. If there is no delete request, the procedure increments j (Block 113470) and returns to Block 113285.

Block 104040 performs the FE procedure (FIG. 22, Block 48130) to check for user input end indications. If an end is not indicated (Block 113485), the procedure jumps back to Block 113100. If an end is indicated the program exits procedure EL.

Figure 43B:
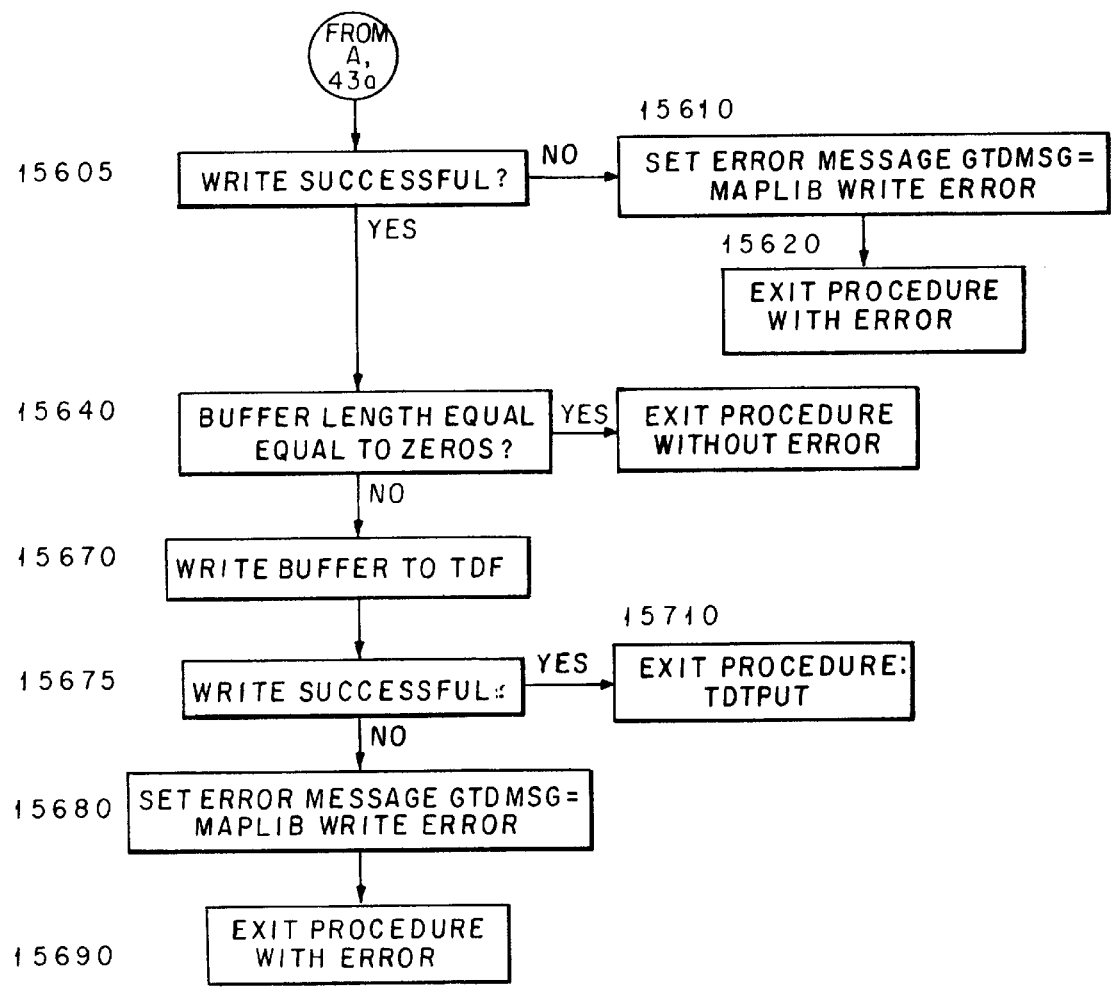

PUT TDF: PTDT PROCEDURE: Looking now at FIGS. 42*a*–*e*, which depict a flow chart of the preferred embodiment of this procedure according to the present invention, the Put TDF procedure begins by determining (Block 46790) if an STDE is created (number of entries, nent, is less than zero). If not, the program returns from the procedure with an error. If an STDE is created, the program opens a TDF file for output (Block 46820). If the TDF file open is not successful, the program returns from the procedure with an error. If it is successful, the program (Block 46850) copies the TDF header from the transaction view work area into the output buffer and at Block 46860 writes the TDF header record to the TDF file using TDTPUT procedure (FIG. 43, Block 15440). Next the TDF first header extension record fields are copied from the transaction view workarea into the buffer (Block 46870), and at Block 46880, the TDT header record is written to the TDF file using the TDTPUT procedure. Next the TDF second extension header record fields are copied from the transaction view workarea into the buffer (Block 46890), and at Block 46900, the TDT header record is written to the TDF file again using the TDTPUT procedure.

Block 46940 moves pointer e to the beginning of the STDE table. If the pointer (Block 46945) is past the end of the STDE table, the program continues at Block 47010. If not, Block 46950 copies the STDE entry at e into the buffer and Block 46960 writes the TDF record to the TDF file using the TDTPUT procedure. Decision Block 46965 determines if the write is successful. If so, the program proceeds to Block 47000 where pointer e is incremented to the next STDE entry in the table and the program proceeds to Block 46945. If not, the error massage field is set, GTDMSG= "TDT WRITE ERROR" (Block 46970), and the program jumps to Block 47010 which blanks the output buffer, and Block 47020 writes the TDT record to the TDF file using the TDTPUT procedure. The TDF file is then closed (Block 47090) and the procedure is exited (Block 47040).

WRITE TDF RECORD: TDTPUT PROCEDURE. Moving now to FIGS. 43*a*–*b*, which show a flow chart of the preferred embodiment for this procedure, according to the present invention, the GTD write TDF record procedure begins by setting the buffer length to equal the length of the position of last non-blank character in the buffer (Block 15480). The record length is set equal to the length of the buffer plus the 4 byte header (Block 15530). The first two bytes of the header are set equal to the buffer length in BIG_ENDIAN format (Block 15570). The second 2 bytes of the header are set to zeros (Block 15590) and the 4 byte header is written to the transaction definition file (TDF). Decision Block 15605 checks to see if the write was successful. If it was not successful, the error message out, GTDMSG, is set equal to "MAPLIB WRITE ERROR" (Block 15610) and the procedure is exited with an error (Block 15620).

If the write was successful, the procedure checks to see if the buffer length is equal to zeros (Block 15640). If the buffer length is zeros, the program exits the procedure without an error. If not, the buffer is written to the TDF (Block 15670). The procedure checks to see if the write was successful (Block 15675), and if it was, exits procedure TDTPUT at Block 15710. If the write was not successful, the procedure sets the error message out, GTDMSG, to "MAPLIB WRITE ERROR" (Block 15680) and exits the procedure with an error (Block 15690).

EDIT TRANSACTION VIEW. This third level procedure provides a capability to edit the application transaction view. A default transaction view is generated at the time default TDF entries are defined. This default transaction view consists of a workarea definition which includes only the system-required IETTVW structured variables, typically with a C "include" or COBOL "copy" statement. The application dependent variables are defined following the IETTVW variables.

GENERATE TRANSACTION VIEW/SOURCE PROGRAM. The next major area of the GTD involves the Generate Transaction View/Source program which provides function to allow the application developer to generate the source files for the transaction view (the application data area) and programs. The transaction view and source programs are constructed so as to be compatible with the IET. This builds the required IET application interfaces into the data areas in the transaction view and into the program linkage for the application procedure.

GENERATING GTD TRANSACTION VIEWS. Transaction views are the basis for procedures, panels and views to reference data items. The application designer must define the structure of the transaction view. A required portion of the transaction view is used by the system to reference system data items. These system variables include userid using transaction, system where transaction is running, current date, current time, function key pressed when transaction was invoked, and other key parameters.

The system generates a starter transaction view upon the first save of the TDT. The GC procedure presents the application designer with a transaction view generation screen. This screen allows the designer to specify the MAPLIB in which the TDT member is maintained, and the name of the TDT member. The format of the system-defined transaction view is described in Appendix C.

Figure 45:
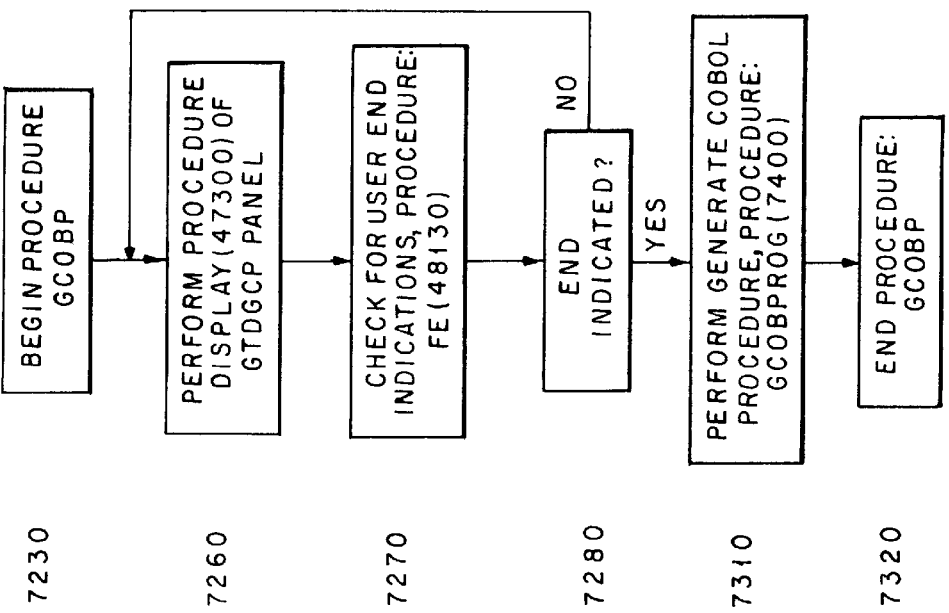
FIG. 45 is a flow chart depicting the general COBOL procedure user interface (GCOBP) procedure according to the preferred embodiment of the present invention.
Figure 46:
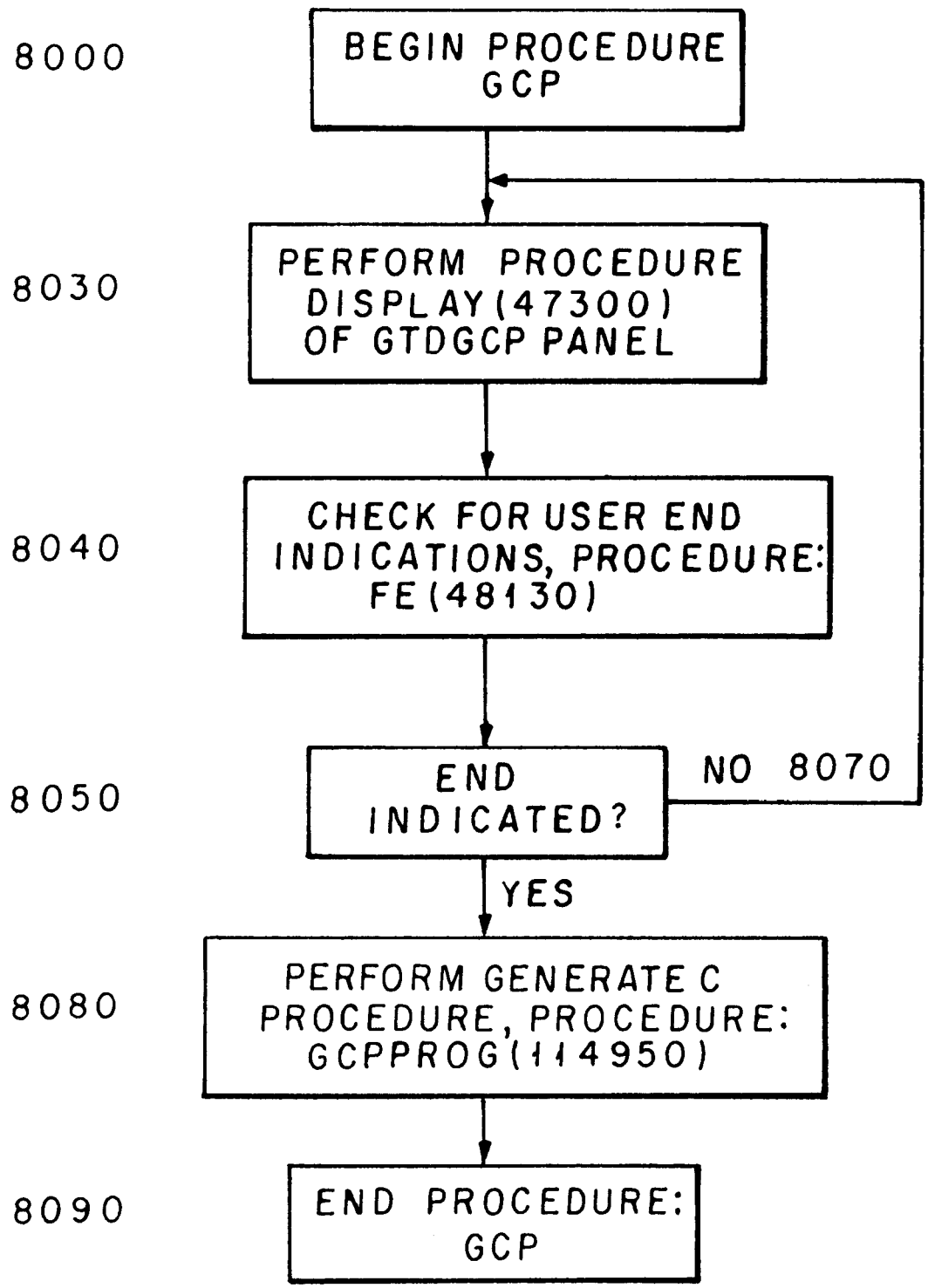
FIG. 46 is a flow chart depicting the generate C procedure user interface (GCP) procedure according to the preferred embodiment of the present invention.
Figure 47A:
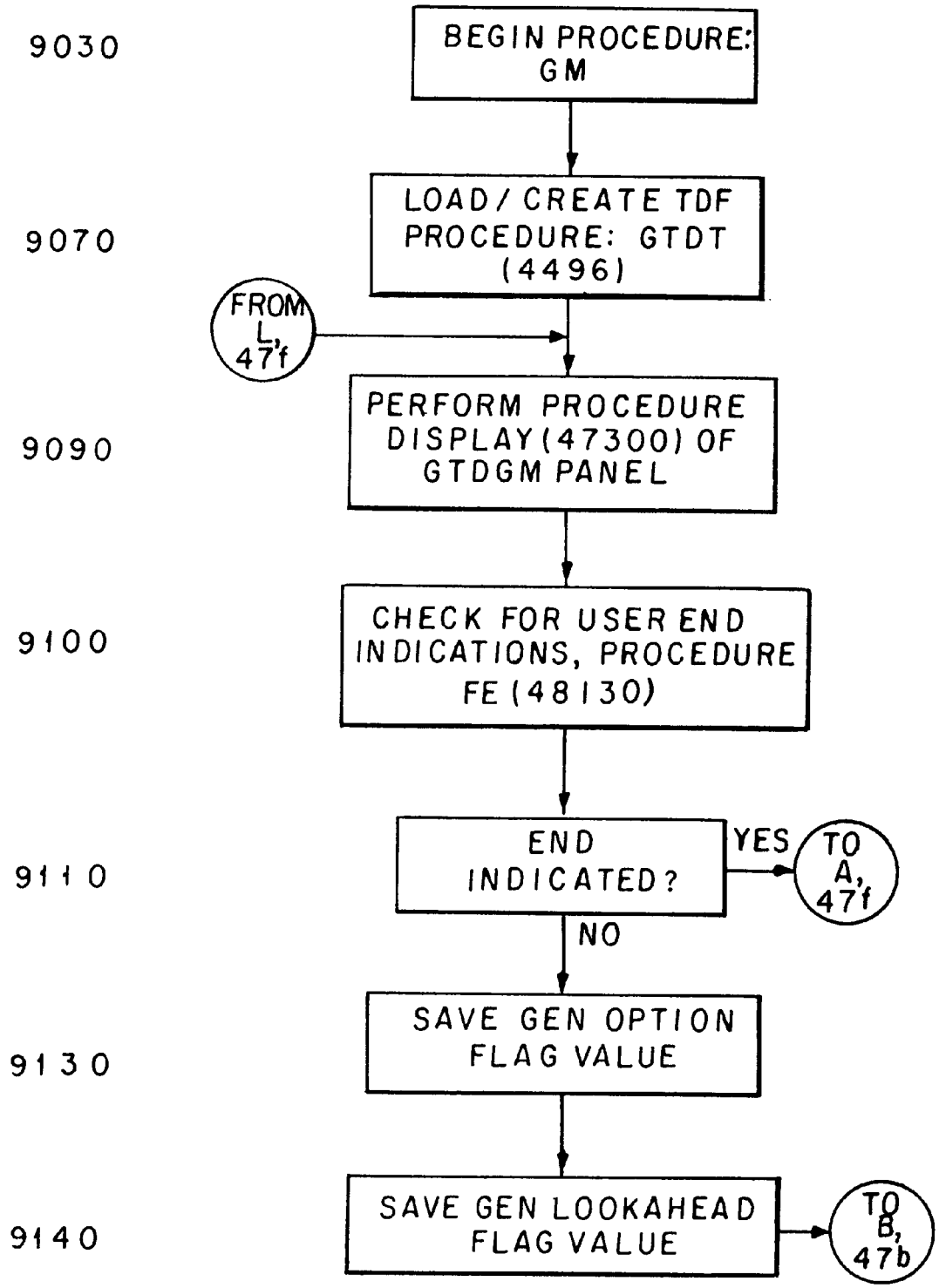
Figure 47B:
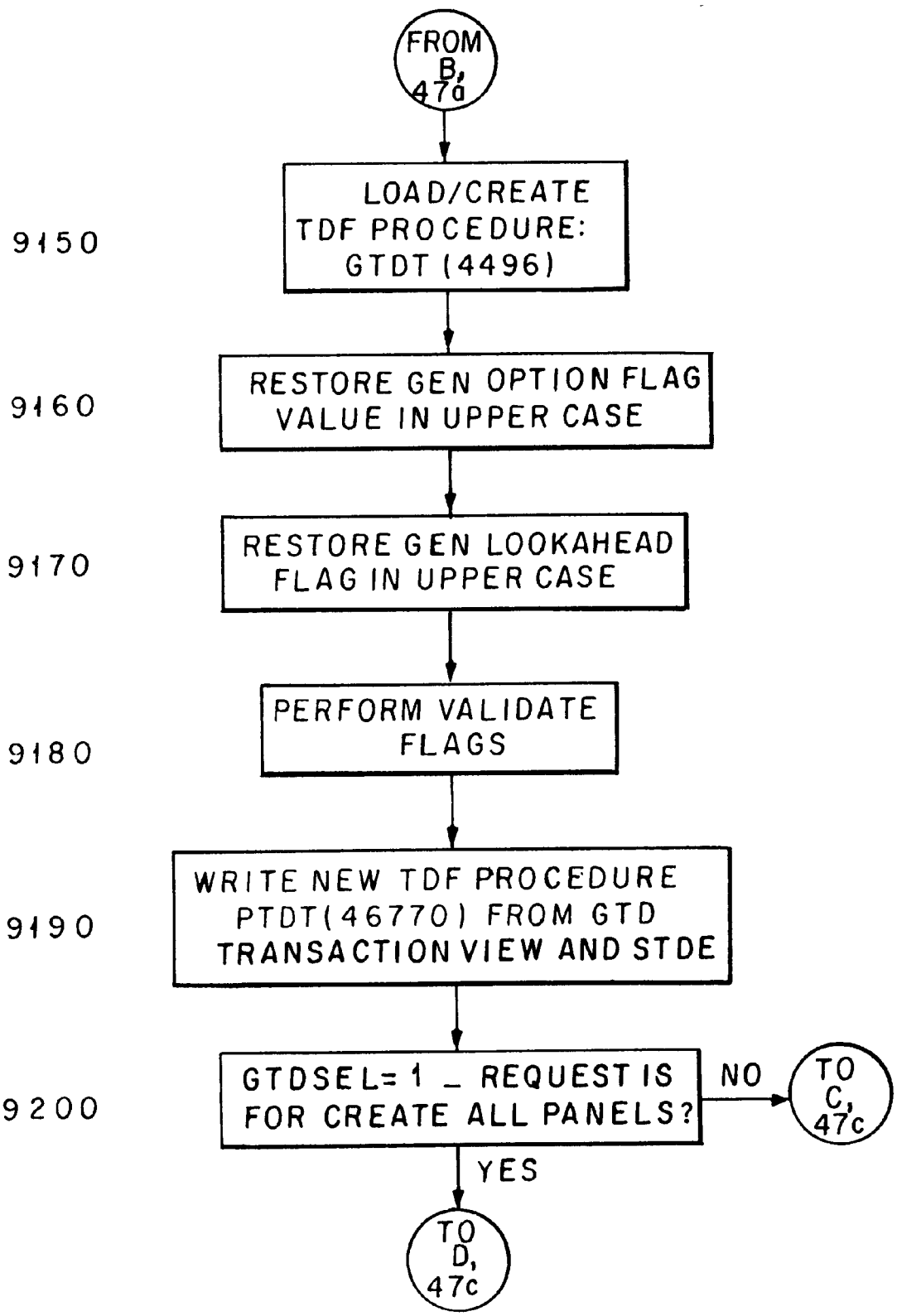
Figure 47C:
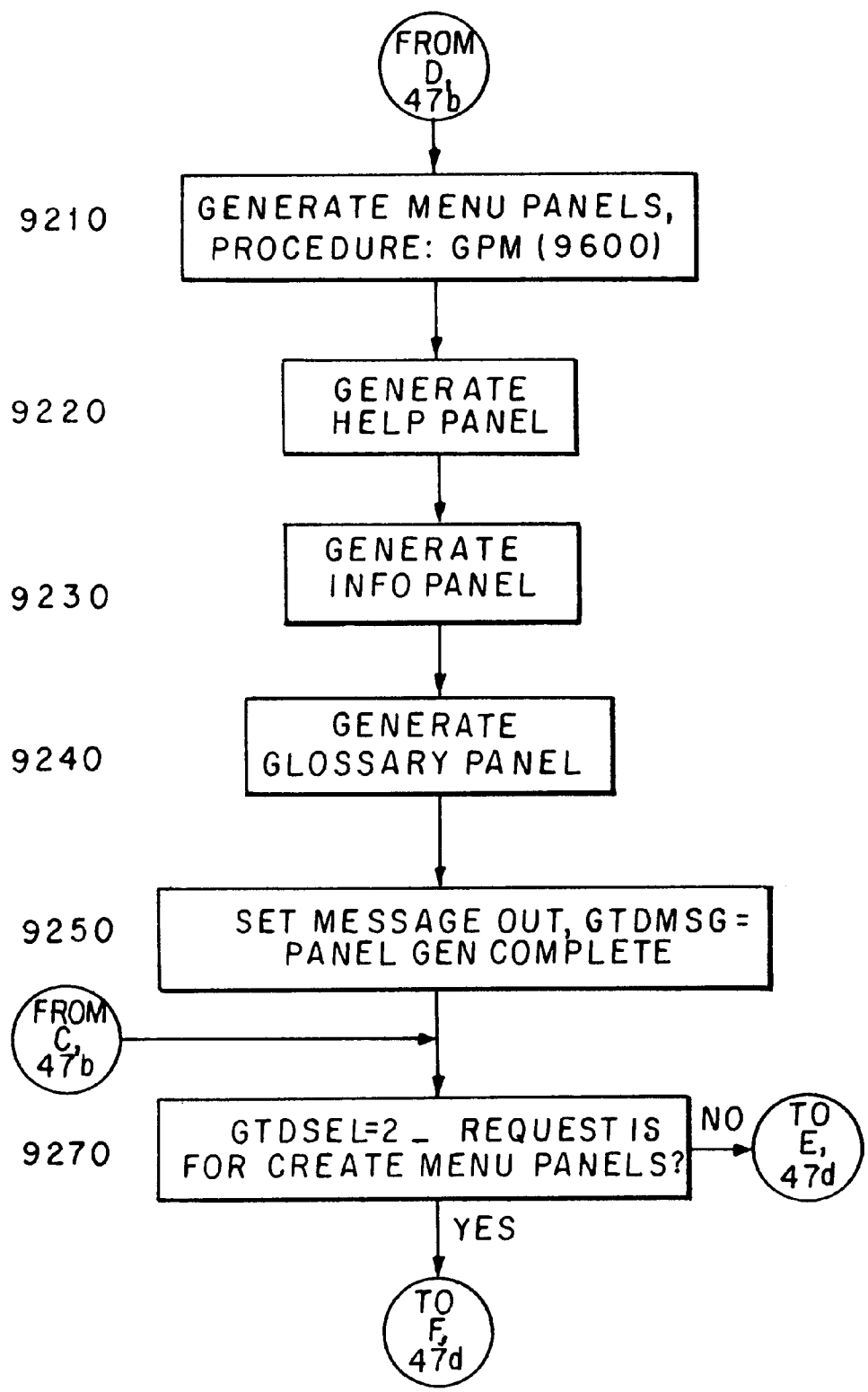
Figure 47D:
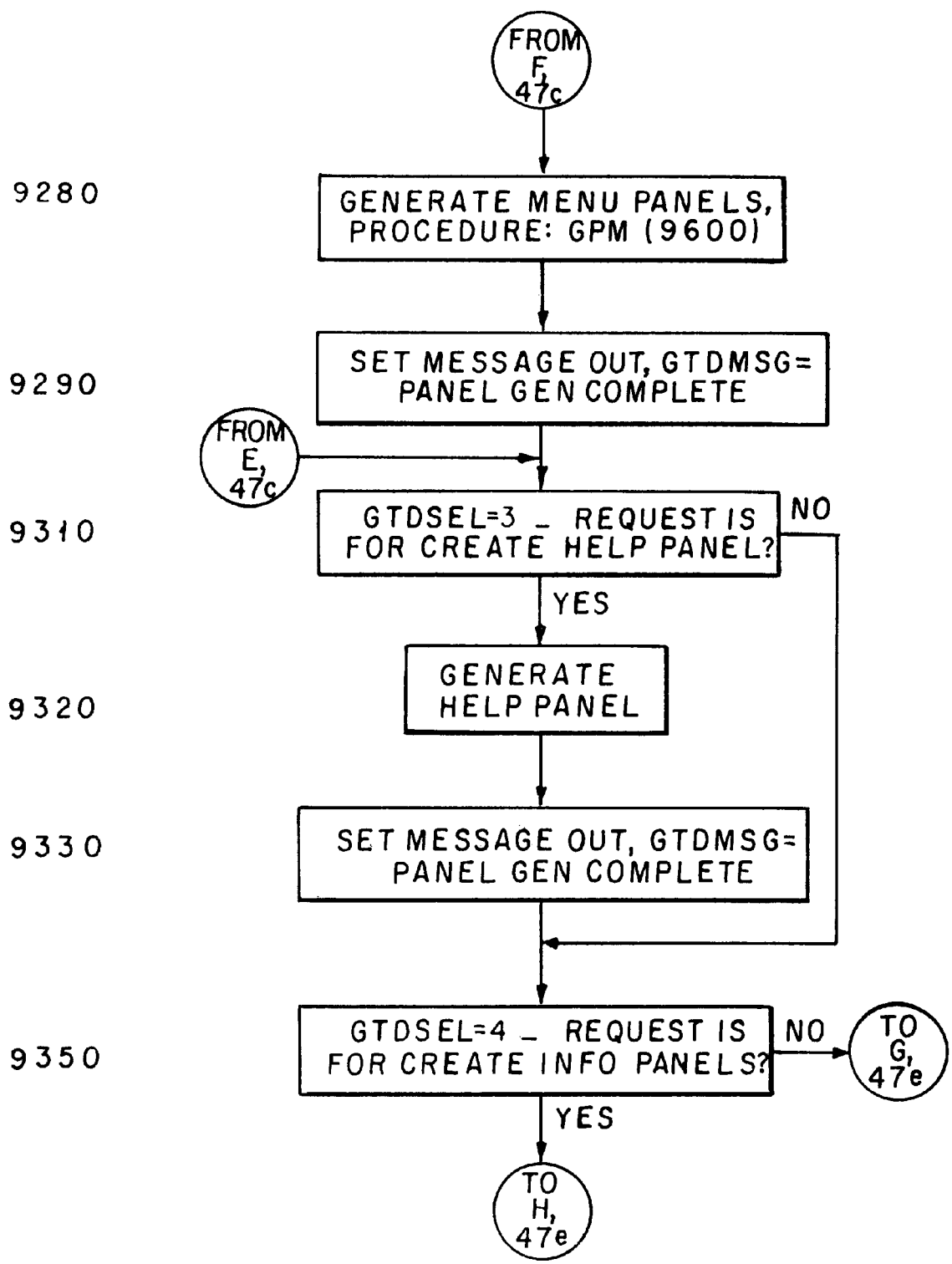
Figure 47E:
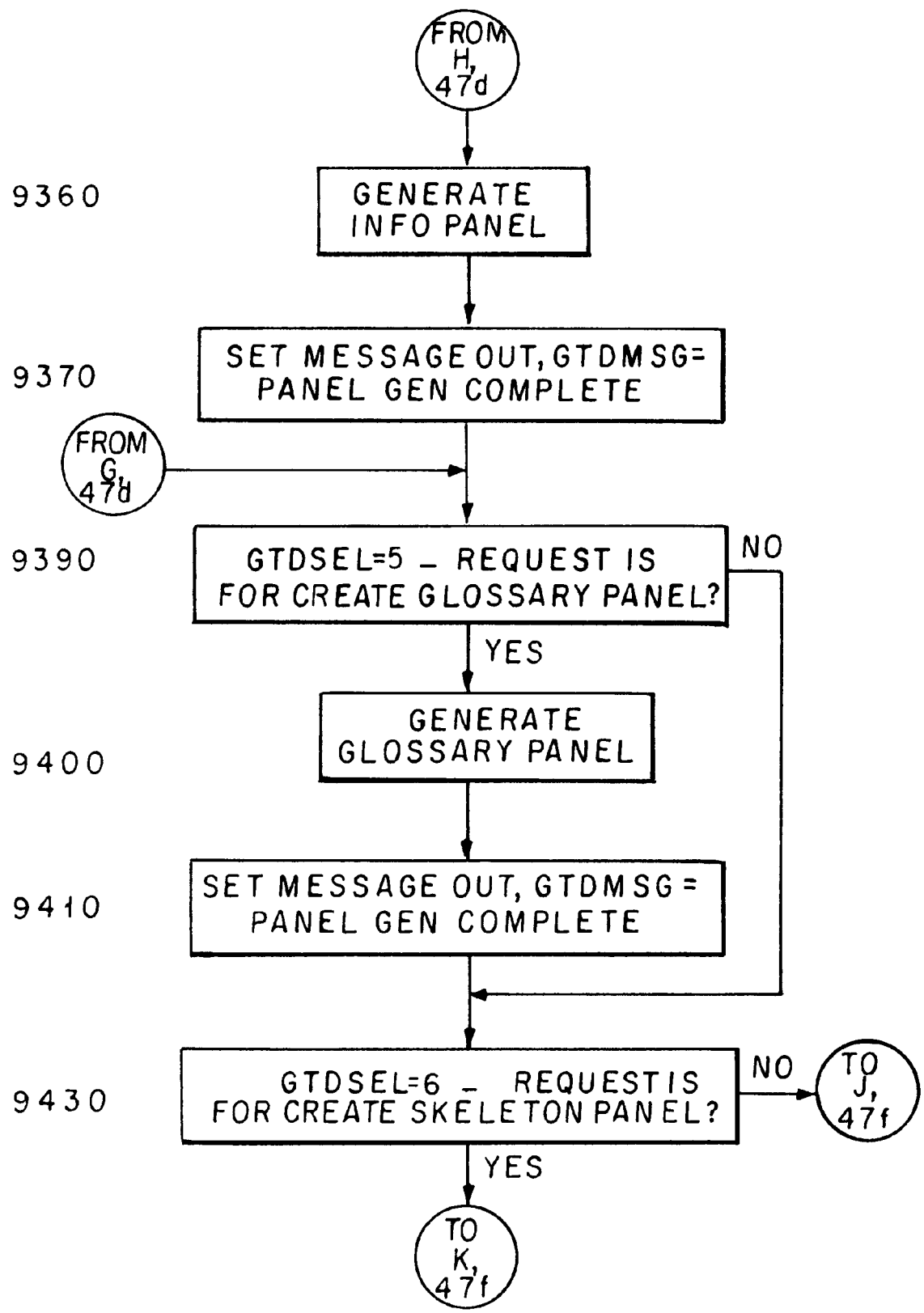

FIGS. 44–46 depict flow charts of the preferred embodiments of various aspects of this program.

The GC procedure defined at FIG. 44, Block 6900 provides the interfaces necessary to generate a transaction view, C procedure, or COBOL procedure. Specifically, the source is generated to be compatible with the IET. The transaction view generated stores the data fields required by the IET in a portion of the application transaction view, known as the IET transaction view, named IETTVW. The programs generated have the appropriate program entry points and program linkage defined so that the IET can call the generated application procedure and receive control back when the procedure terminates. The application program must be generated to be a callable procedure with one data area to be used as input. This data area is the transaction view. The application program must use the procedure name as the entry point and must return control back to its caller when program processing is complete. Generating a skeleton transaction view and application procedures, GTD facilitates the generation of applications which are compatible with the IET, thereby ensuring the IET will operate on these panels as intended.

The technique used to generate the transaction view, C procedure and COBOL procedures is basically the same. An initialized data structure is defined in the GTD program which contains the standard definition. Each data structure record is moved into a buffer, customized if necessary, and then written to the source file. This process continues until the end of the data structure is located.

Other techniques for accomplishing the present invention could involve obtaining the standard definition from other sources such as a GTD system configuration file. Also, the process could be extended through the use of a CASE product such as Texas Instruments' IEF, which would allow the application developer to build a specification of the application procedure with the CASE product, and then a complete, or more fully defined, procedure may then be generated using the same CASE product. The requirements for IET interfaces and data areas would be comprehended in the application procedure specifications.

Below are listed the third level menu options under the second level menu GENERATE TRANSACTION VIEW/SOURCE PROGRAM. In addition to selecting a menu option to perform, the user is also required to provide 2 additional pieces of information: the name of the TDF file (gtdmmem), and the library or pathname under which the TDF file may be accessed (gtdmlib). These 2 pieces of information are required to perform any of the menu functions. Input fields for these values are included on each of the second level hierarchy menus.

2. GENERATE TRANSACTION VIEW/SOURCE PROGRAM
  2.1 GENERATE TRANSACTION VIEW
  2.2 GENERATE SKELETON COBOL PROGRAM
  2.3 GENERATE SKELETON C PROGRAM
  2.4 EXIT

Menu option 2.1, GENERATE TRANSACTION VIEW, provides a capability to generate the application transaction view. This default transaction view consists of a workarea definition which includes only the system required IETTVW structure variables, typically with a C "include" or COBOL "copy" statement. The application dependent variables are defined after the IETTVW variables. The flow chart of the GTVW procedure starting with FIG. 26, Block 8200 details this function further. The GTVW procedure has been explained in detail earlier, therefore such discussion will not be repeated here.

Menu option 2.2, GENERATE SKELETON COBOL PROGRAM, provides a capability to generate an application COBOL skeleton program. The flow chart of the GCOBP procedure (FIG. 45) starting with Block 7230) details this capability further.

Menu option 2.3, GENERATE SKELETON C PROGRAM, provides a capability to generate an application C skeleton program. The flow chart of the GCP procedure (FIG. 46, starting with Block 8000) details this capability further.

GTD GENERATE TRANSACTION/VIEW, COBOL/C PROGRAM: GC PROCEDURE. Looking first at FIGS. 44*a–b*, which depict the preferred embodiment of this procedure, the second level GTD generate transaction/view, COBOL/C program procedure begins by performing the procedure (FIG. 21, Block 47300) to display a GTDGC panel (Block 6940). When the procedure is completed, the FE procedure (FIG. 22, Block 48130) checks to see if the user has indicated he is finished using this procedure (Block 6950). If a user end is indicated, the program jumps to Block 7150 and exits procedure GC. If not, the program (Block 6980) performs the load/create transaction definition file (TDF) GTDT procedure (FIG. 24, Block 44960).

When the GTDT procedure is completed, the program checks to see if variable GTDSEL=1 (Block 7000). The GTDSEL variable represents user input, typically a menu selection, from the panel. When GTDSEL=1, the user accesses the create transaction view GTVW procedure (FIG. 26, Block 8200). When the GTVW procedure is complete, the program returns to Block 6940 to see if the user requires any other procedures from this panel.

If GTDSEL does not equal 1, the program checks to see if GTDSEL=2, (Block 7050). When GTDSEL=2, the user accesses the generate COBOL skeleton program GCOBP procedure (FIG. 45, Block 7230). When the GCOBP procedure is complete, the program returns to Block 6940 to see if the user requires any other procedures from this panel. If GTDSEL does not equal 2, the program checks to see if GTDSEL=3 (Block 7100). When GTDSEL=3, the user accesses the generate C skeleton program GCP procedure (FIG. 46, Block 8000). When the GCP procedure is complete, or if GTDSEL does not equal 3, the program returns to Block 6940 to see if the user requires any other procedures from this panel.

GENERATE COBOL PROCEDURE USER INTERFACE: GCOBP PROCEDURE. Looking now at FIG. 45, which shows a preferred embodiment of this procedure, the GTD generate COBOL procedure user interface procedure begins by performing the procedure (FIG. 21, Block 47300) to display a GTDGCP panel (Block 7230). When the procedure is completed, the FE procedure (FIG. 22, Block 48130) checks for user end indications (Block 7260). If a user end is not indicated, the program returns to Block 7260. If a user end is indicated, the program (Block 7310) performs the generate COBOL GCOBPROG procedure (FIG. 35, Block 7400). The GCOBPROG procedure generates a skeleton COBOL program, that can be edited by the user to meet his specific needs. When the procedure is completed, the program exits procedure GCOBP (Block 7320).

GENERATE C PROCEDURE USER INTERFACE: GCP PROCEDURE. Continuing to FIG. 46, which shows a preferred embodiment of this procedure, the GTD generate C procedure user interface procedure begins at Block 8030 by performing the procedure (FIG. 21, Block 47300) to display a GTDGCP panel. When the procedure is completed, the FE procedure (FIG. 22, Block 48130) checks for user end indications (Block 8040). If a user end is not indicated, the program returns to Block 8030. If a user end is indicated, the program at Block 8080 performs the generate C GCPPROG procedure (FIG. 36, Block 114950). The GCPPROG procedure generates a skeleton C program, that can be edited by the user to meet his specific needs. When the procedure is completed, the program exits procedure GCP (Block 8090).

GENERATE PANELS PROGRAM. The next major area of the GTD involves the Generate Panels program which provides functions to allow the application developer to generate customized system-provided panels for his application and provides base panels for procedure dialog flow with the user. These panels are generated to be compatible with the IET, and have the fields required by the IET to perform its panel and menu dialog flow management.

The GM procedure defined at FIG. 47, Block 9030 provides the interfaces necessary to generate menu panels and the system-defined GLOS, INFO and HELP panels. These panels have all the fields pre-defined in standard locations to allow the IET to provides the application with dialog management, menu navigation, glossary, information, and help functions. The standard location provide the application user with a common application interface for all DAA application. The application developer has the option of customizing the look of the panel generated, but should not delete fields required by the IET.

The application designer can generate the system-provided panels and skeleton panels to be customized for the application using the generate panels procedures. The designer is presented with a selection panel to generate the system-provided panels for this application. Normally, the designer would specify Option 1 which generates the panels to perform standard MENU, GLOSsary, HELP, and INFOrmation functions for the GTD application being developed. The designer can elect to generate a sub-set of these panels by entering other options.

To generate a skeleton panel (MAP) application designer must specify the MAPLIB and panel name to be generated to the skeleton panel. The panel name must be unique within that library. For inclusion in a TDT, the panel must be included with the panel list. Once the data is entered on the skeleton panel, the panel is generated.

The method used to generate the panels is to generate the map source records in the format required by the map services employed. Specifically the definition of each map record is built in a buffer using hard-coded specifications for each type of panel being generated (menu, glossary, information, help, or skeleton panels) and then written out to map file. Specifications written into the map source include field names, field types, field row and column information, field lengths, field attributes and literal data. All these specifications are hard-coded for each type of panel and are written out to the file in the most convenient manner.

Alternative embodiments of this aspect of the GM program would be to copy the panel source from a location specified in a GTD system configuration file and then plug in the particular customized information required (e.g., the panel name; for menu entries, the selection and description information).

Below are listed the third level menu options under the second level menu GENERATE PANELS. In addition to selecting a menu option to perform, the user is also required to provide 2 additional pieces of information: the name of the TDF file (gtdmmem), and the library or pathname under which the TDF file may be accessed (gtdmlib). These 2 pieces of information are required to perform any of the menu functions. Input fields for these values are included on each of the second level hierarchy menus.

3 GENERATE PANELS
3.1 GENERATE MENUS(ALL), HELP, INFO, AND GLOS PANELS
3.2 GENERATE MENU PANELS
3.3 GENERATE HELP PANEL
3.4 GENERATE INFO PANEL
3.5 GENERATE GLOS PANEL
3.6 GENERATE SKELETON PANEL
3.7 EXIT

Menu option 3.1, GENERATE MENUS(ALL), HELP, INFO, AND GLOS PANELS, provides a capability to generate panel source for all menus and the system provided help, information, and glossary panels. The menu option lines are constructed from menu entries stored in the TDF. All requested panels are generated in turn.

Menu option 3.2, GENERATE MENUS provides a capability to generate panel source for all menus. The menu option lines are constructed from menu entries stored in the TDF.

Menu option 3.2, GENERATE HELP PANEL provides a capability to generate panel source for the system-provided HELP panel.

Menu option 3.3, GENERATE INFO PANEL provides a capability to generate panel source for the system-provided INFO panel.

Menu option 3.4, GENERATE GLOS PANEL provides a capability to generate panel source for the system-provided GLOS panel.

Figure 48B:
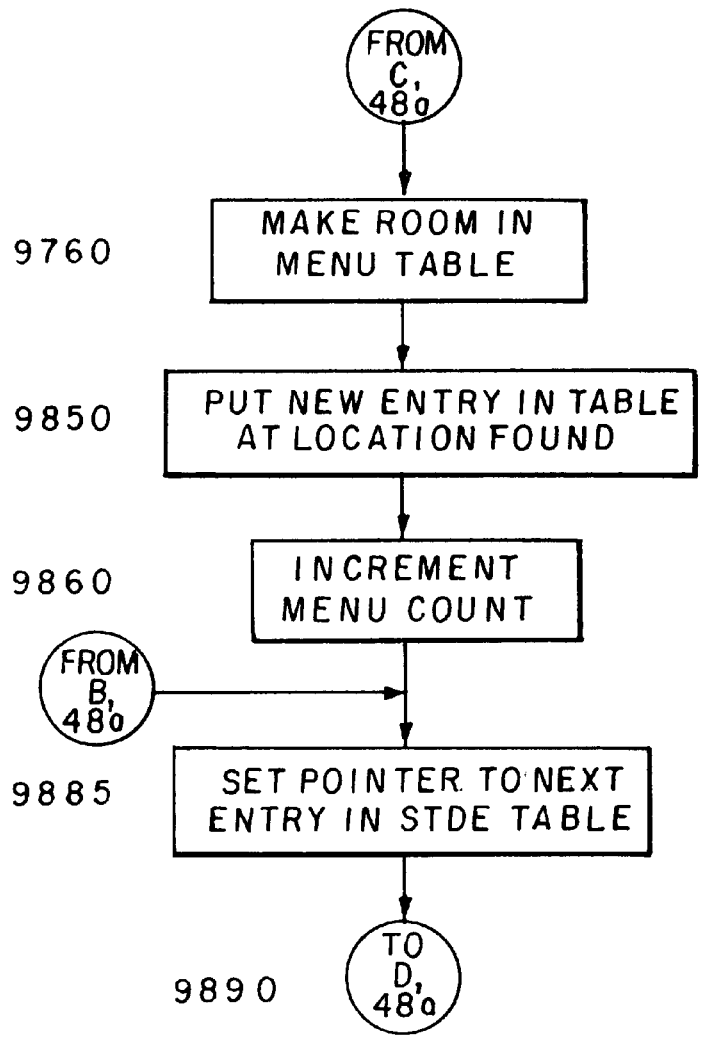
Figure 48C:
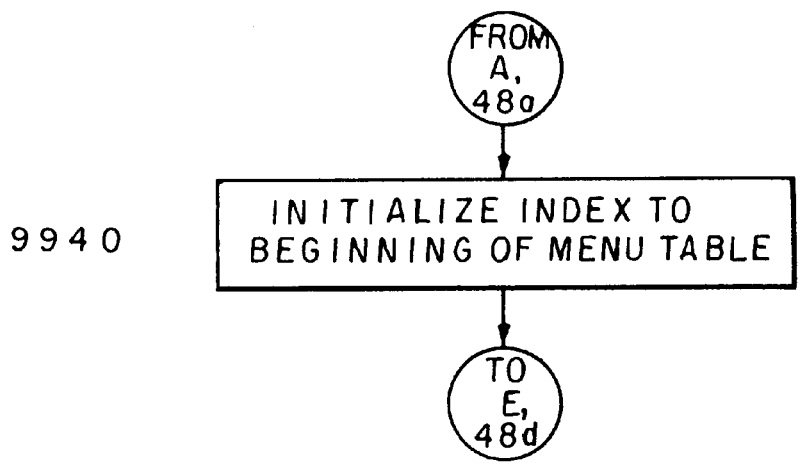
Figure 48D:
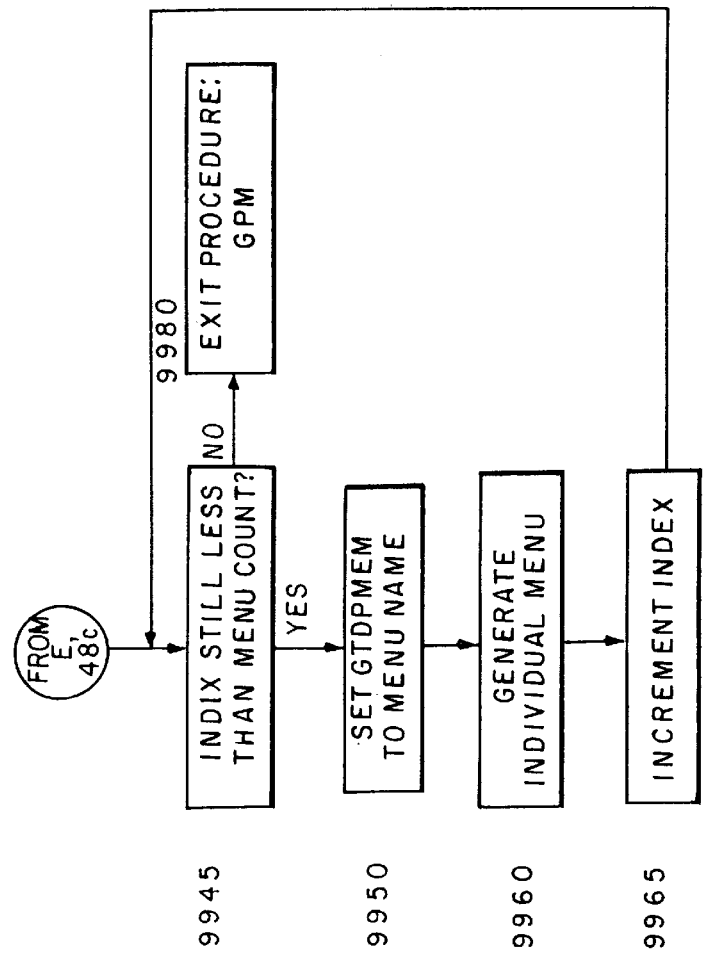
Figure 50A:
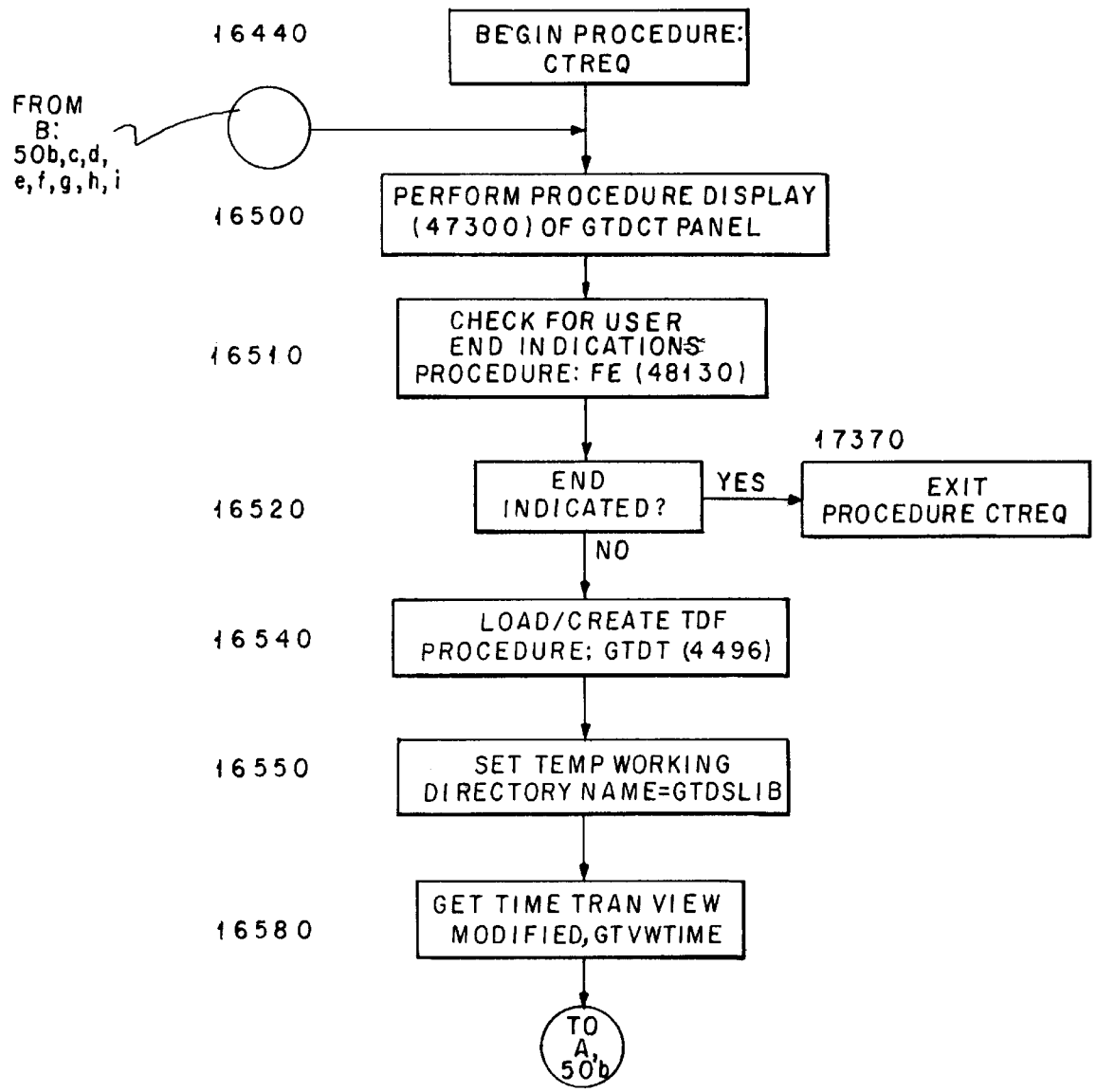
FIGS. 50a–j are a flow chart depicting the compile transaction definition/views/panels/procedures (CTREQ) procedure according to the preferred embodiment of the present invention.
Figure 50B:
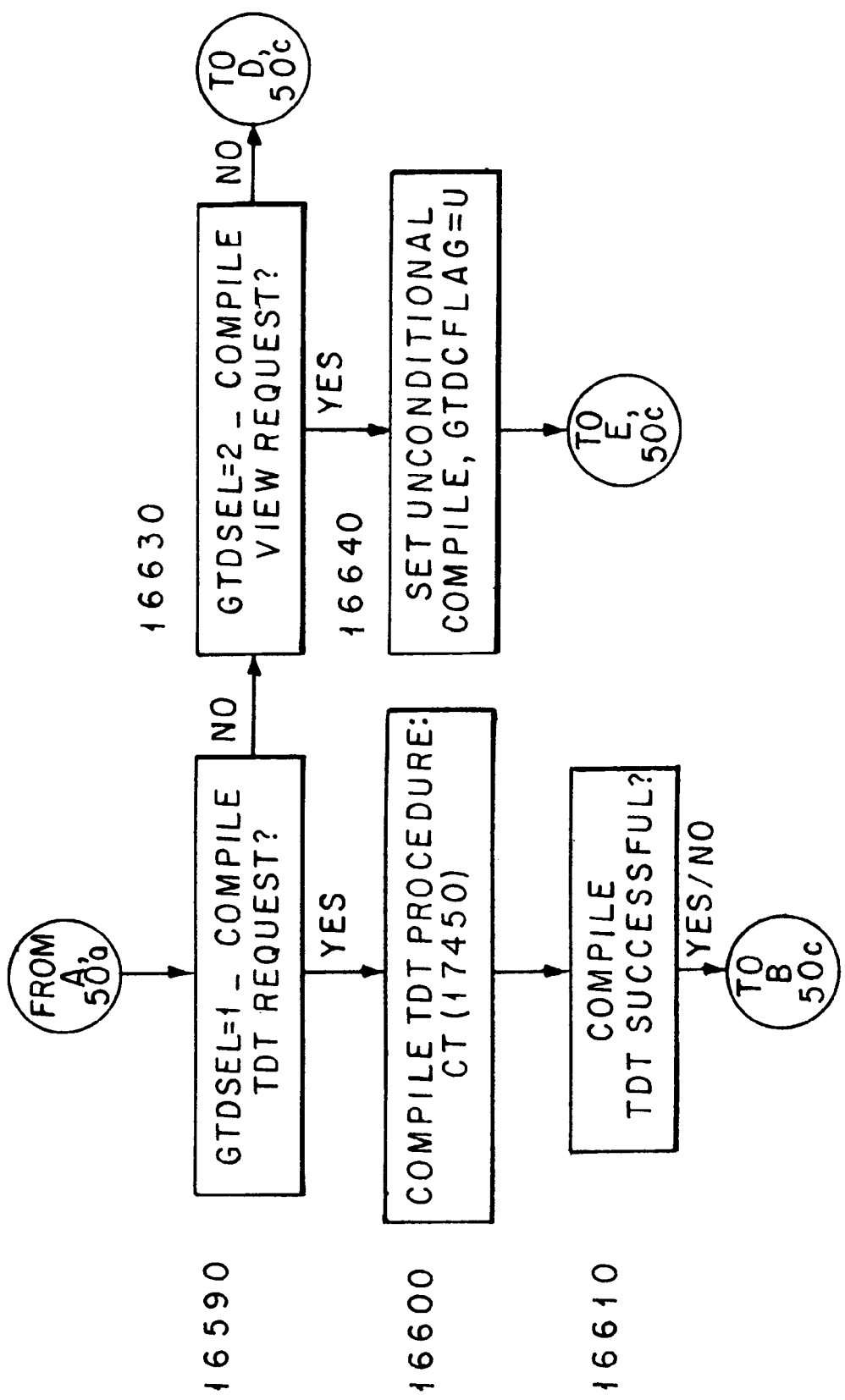
Figure 50C:
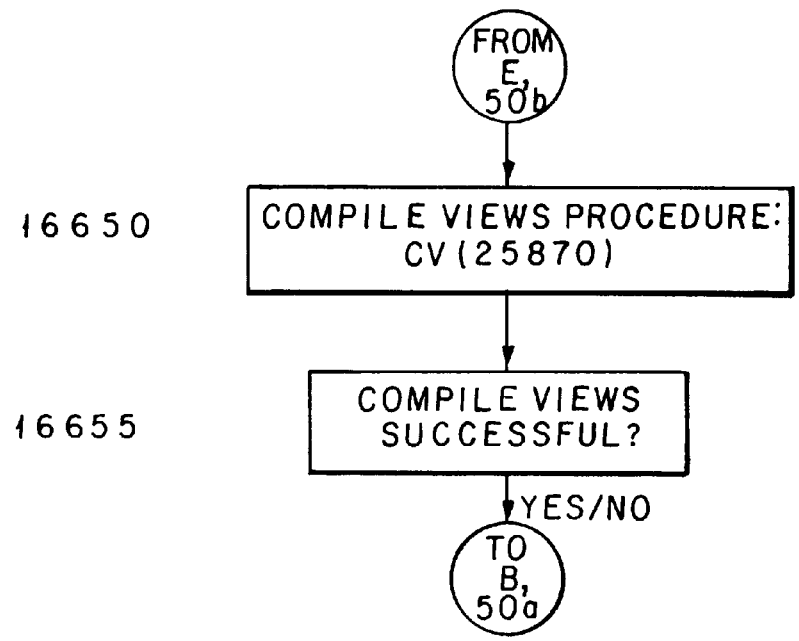
Figure 50D:
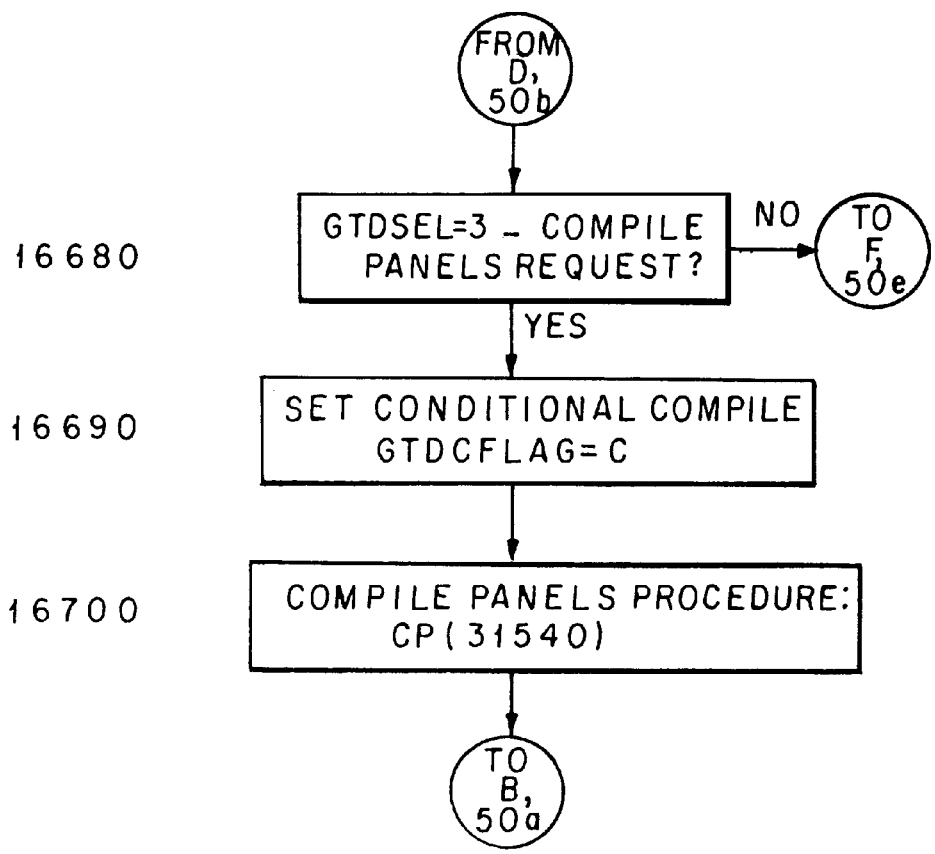
Figure 50E:
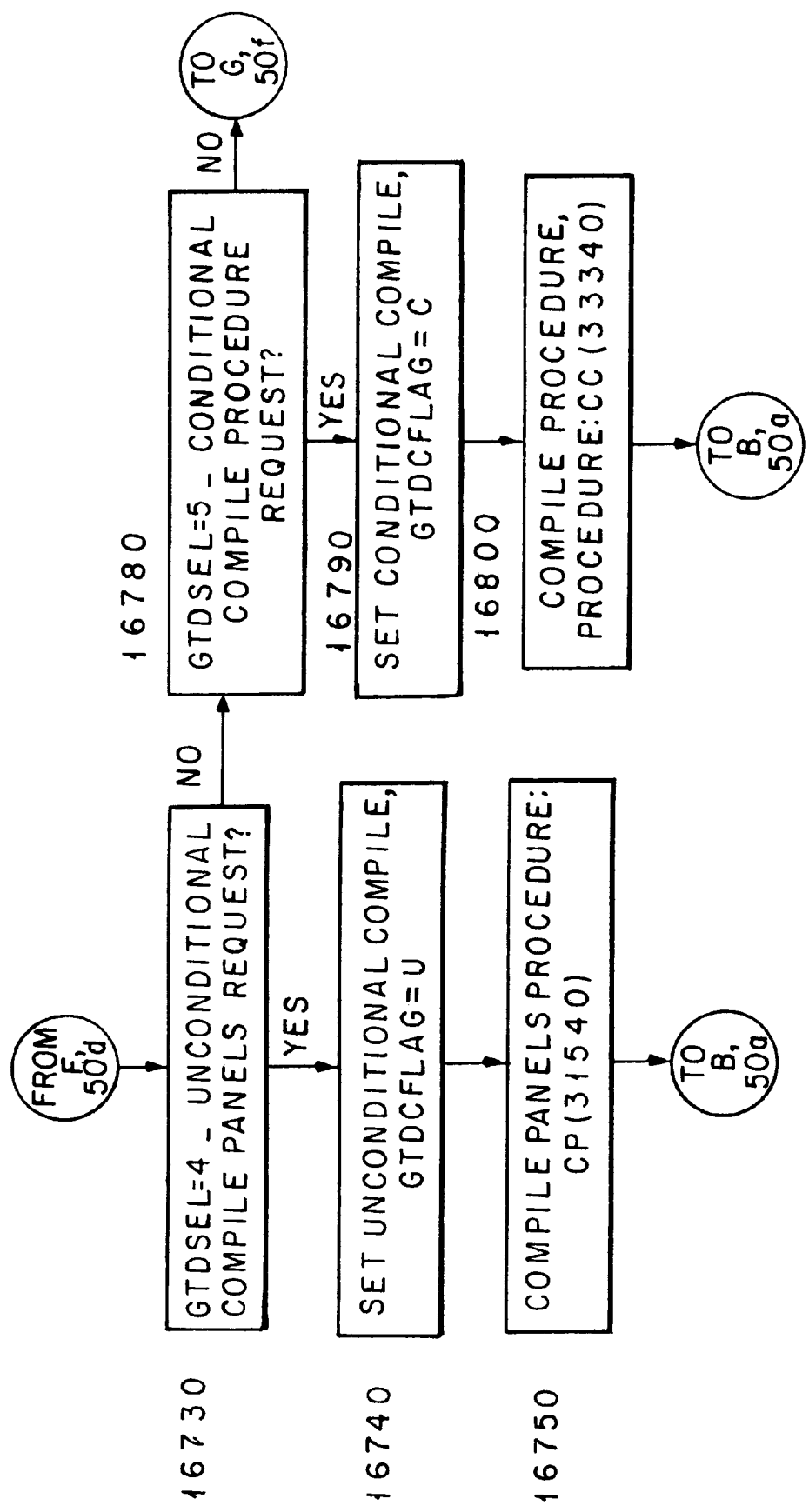
Figure 50F:
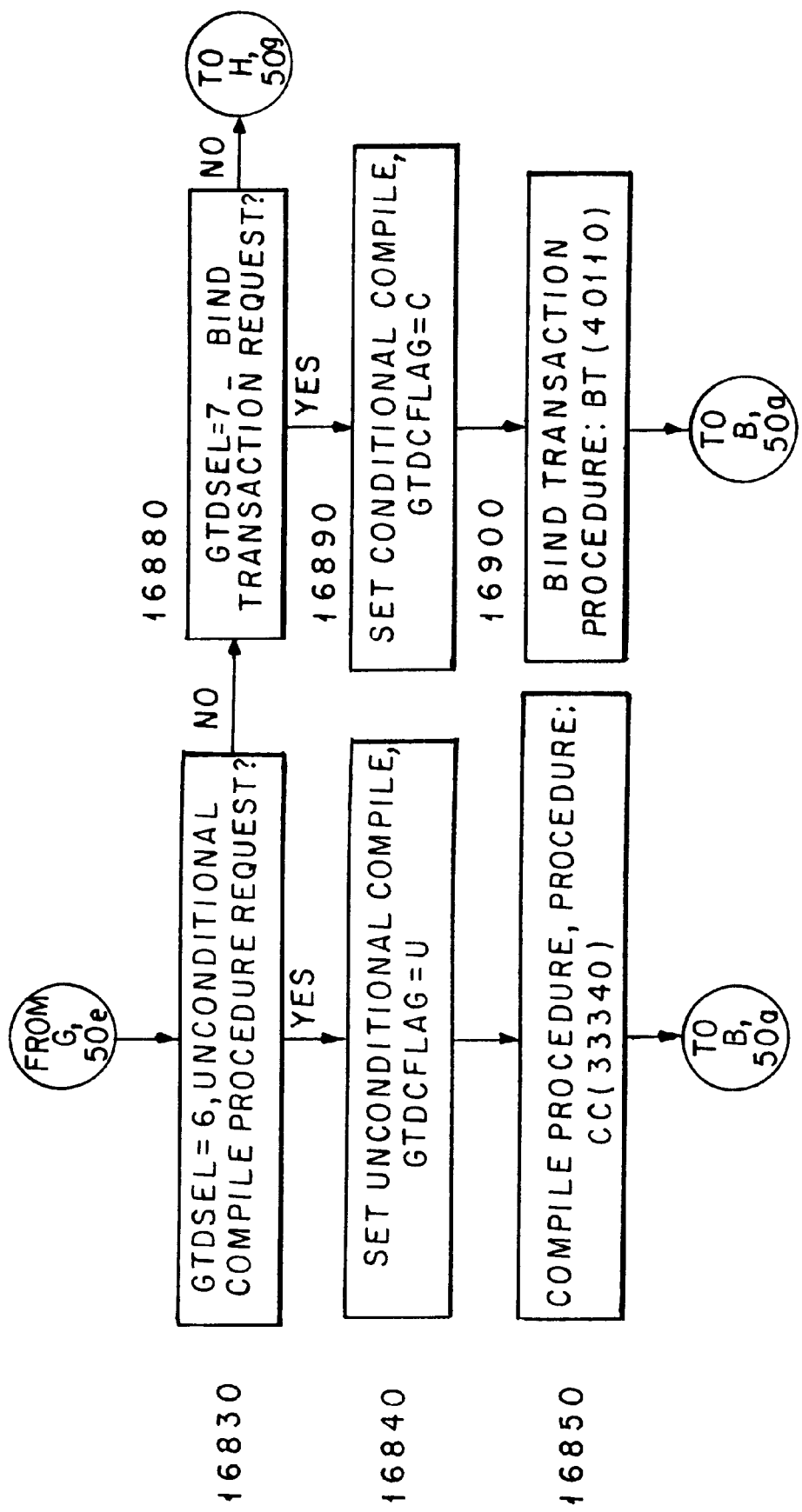
Figure 50G:
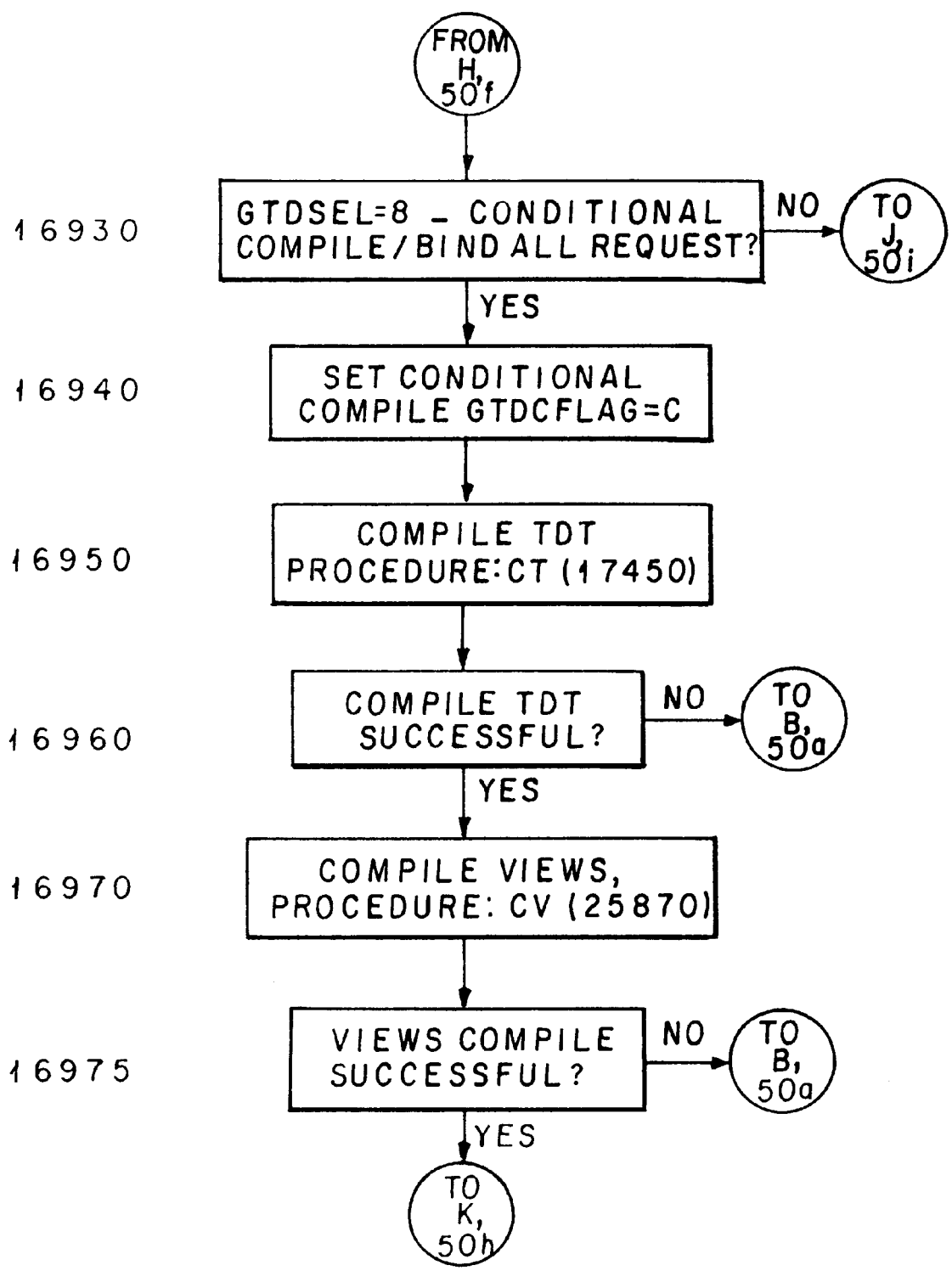
Figure 50H:
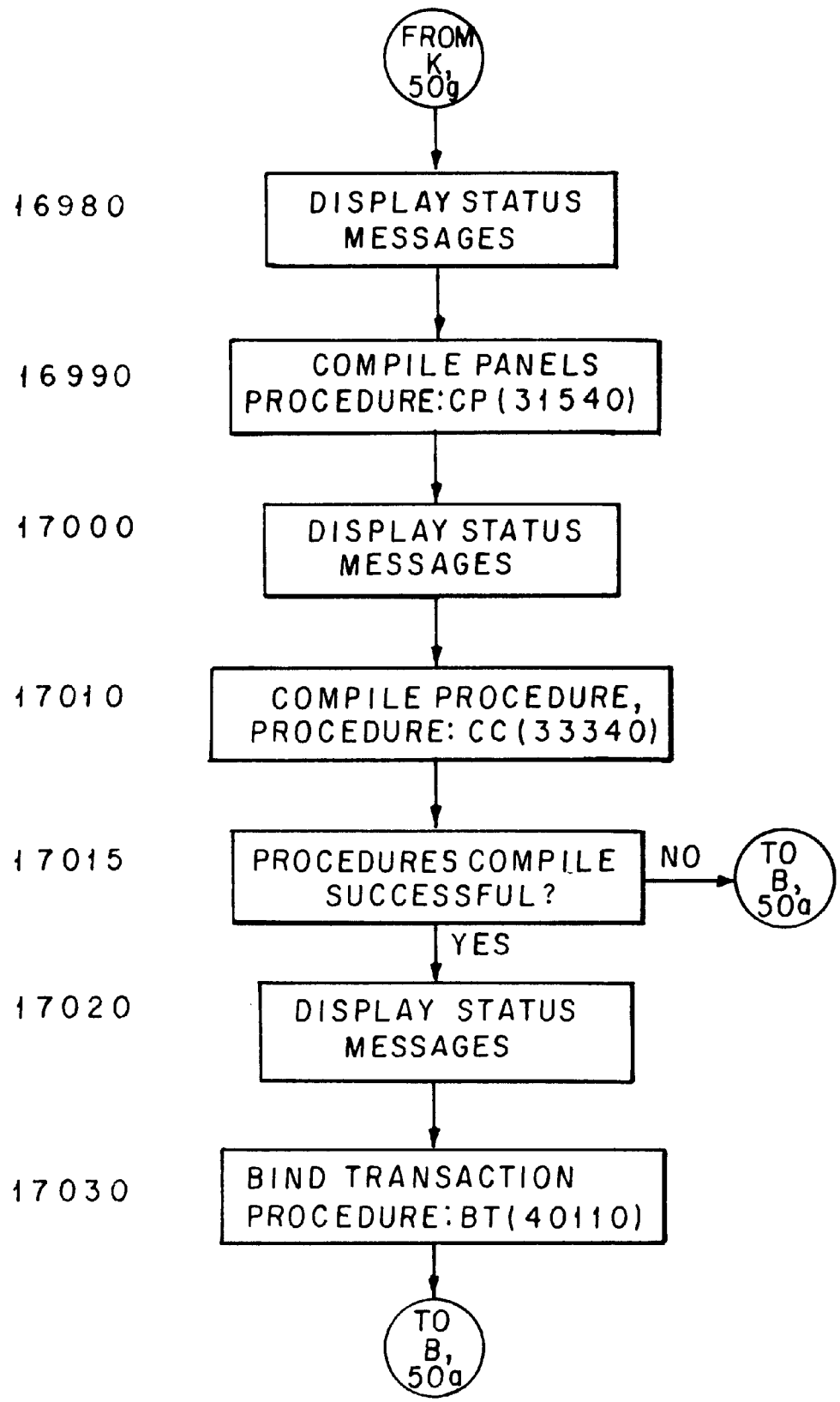
Figure 50I:
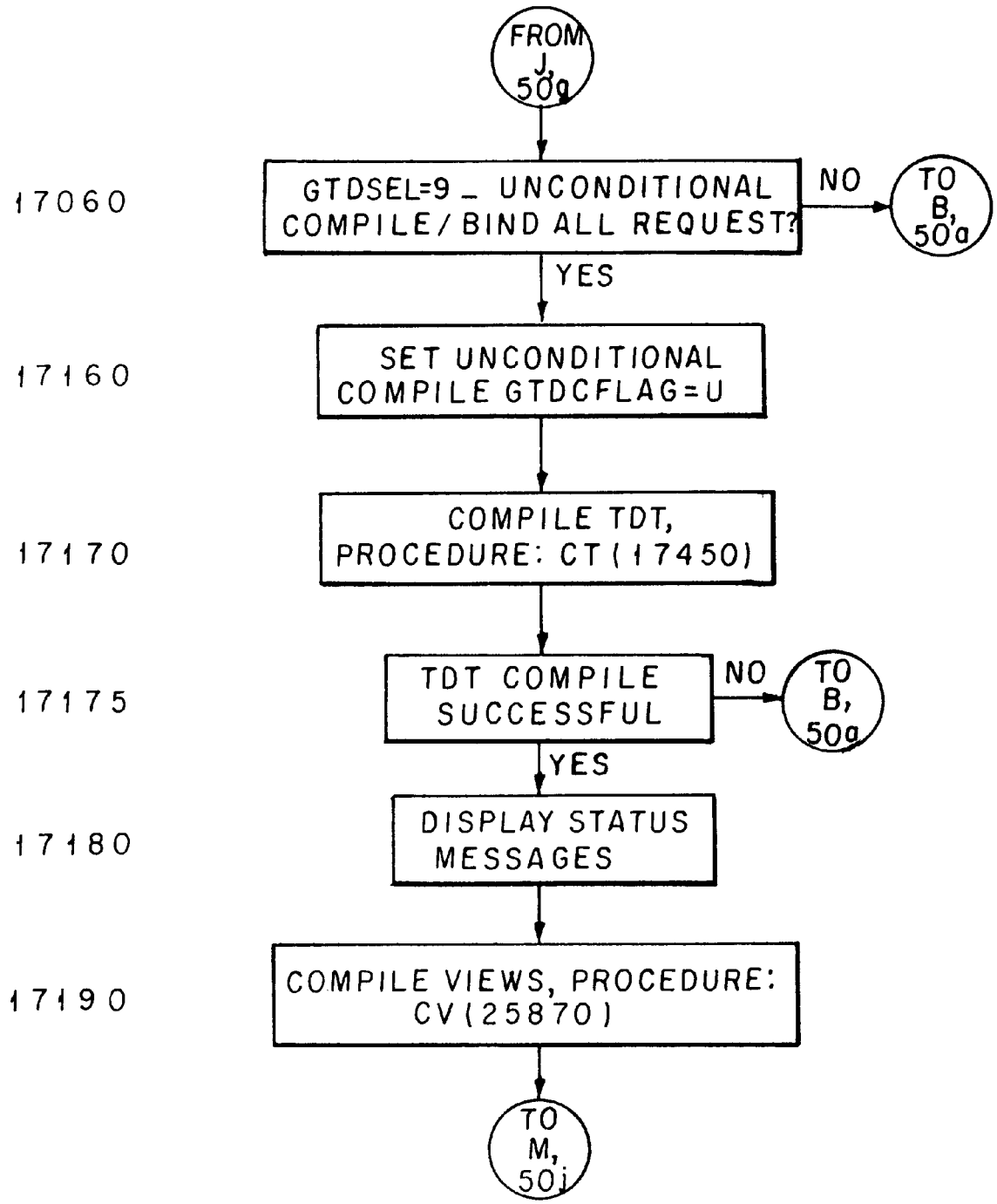
Figure 50J:
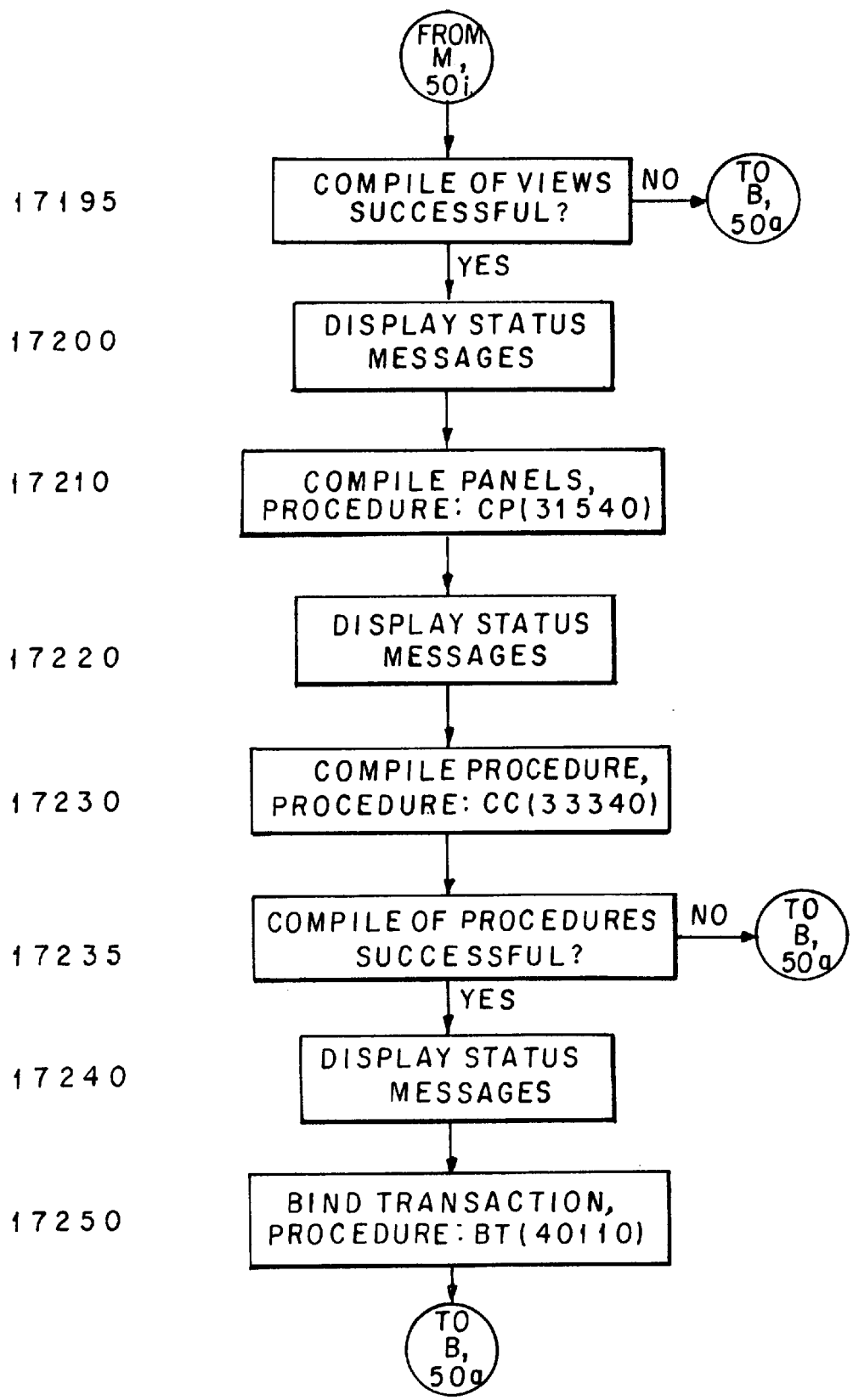

The flow chart of the GPM procedure (FIG. 48, starting with Block 9600) details these menu option capabilities further.

Figure 49:
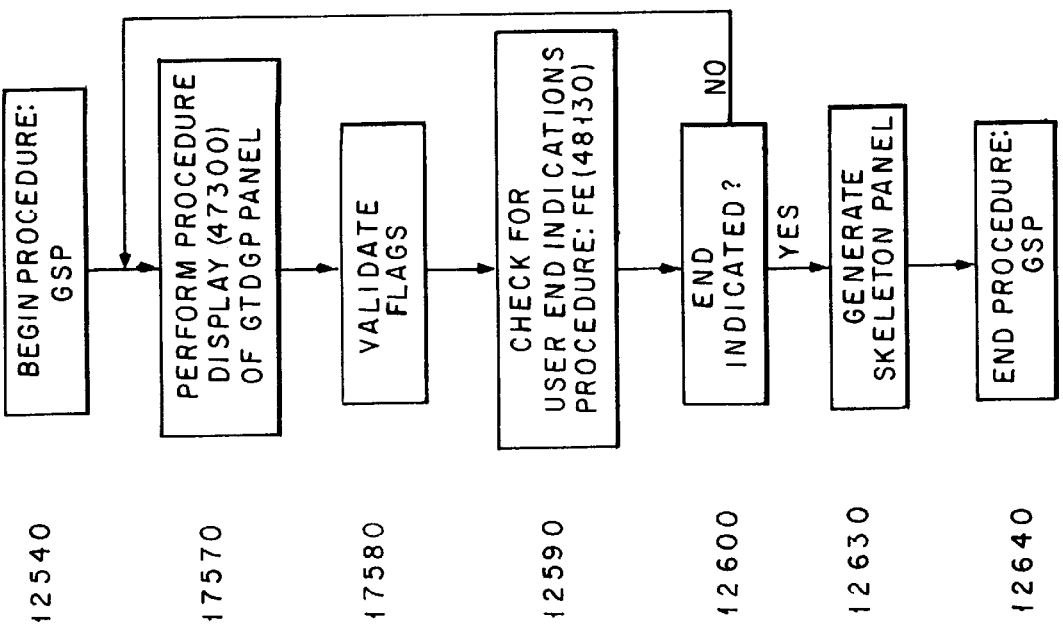
FIG. 49 is a flow chart depicting the generate skeleton panel user interface (GSP) procedure according to the preferred embodiment of the present invention.

Menu option 3.2, GENERATE SKELETON PANEL provides a capability to generate a user panel skeleton source file. The generated panel skeleton panel provides a starting point from which the application developer can work when composing the application panels. The flow chart of the GSP procedure FIG. 49 starting with Block 12540) details this capability further.

GENRATE MAPS USER INTERFACE: GM PROCEDURE. Starting with FIGS. 47*a–f*, which depict a preferred embodiment of this procedure according to the present invention, the GTD generate maps user interface procedure begins at Block 9070 by performing the load/create transaction definition file GTDT procedure (FIG. 24, Block 44960). When the GTDT procedure is completed, control is returned to Block 9090 which performs the display procedure (FIG. 21, Block 47300), electing to display a GTDGM panel (Block 9090). Procedure FE (FIG. 22, Block 48130) then checks for user end indications (Block 9100). If a user end is indicated, the program jumps to Block 9520 and exits procedure GM. If a user end is not indicated, the program saves the generate option flag (GTDGOF) value (Block 9130), and the generate lookahead flag (GTDGLF) value (Block 9140). Procedure GTDT (FIG. 24, Block 44960) then loads and creates the TDF (Block 9150). The generate option flag value (Block 9160) and generate lookahead flag (Block 9170) are restored to the GTD transaction view, and the flags are validated by translating the values to upper case and then changing their values to "N" if the values contained are not "Y" (Block 9180). When the flags have been validated, procedure PTDT writes a new TDF from the information in the GTD transaction view.

Decision Block 9200 checks to see if the user input option code of GTDSEL=1, which is a request for all panels to be created. If not, the program jumps to Block 9270. If GTDSEL equals 1, the GPM procedure (FIG. 48, Block 9600) generates the menu panels (Block 9210), followed by all the system-defined panels.

The HELP panel is created at Block 9220 with the following fields defined in the IETTVW and required by the IET: IEF1-TRAN, IEF1-PANEL, IEF1-SYSTEM, IEF1-CURROW, IEF1-CURCOL, IEF1-FUNKEY- IEF1-CURDT, IEF1-MSGID, IEF1-MSGTX, IEF1-MSGTX, IEF1-MSGAE, IEF1-USER, IEF1-HELPPNL, IEF1--OPTION (optionally generated when gtdgof=Y), IEF1-TEXT(01) thru IEF1-TEXT(21).

The INFOrmation panel is created at Block 9230 with the following fields defined in the IETTVW and required by the IET: IEF1-TRAN, IEF1-PANEL, IEF1-SYSTEM, IEF1-CURROW, IEF1-CURCOL, IEF1-FUNKEY, IEF1-CURDT, IEF1-MSGID, IEF1-MSGTX, IEF1-MSGTX, IEF1-MSGAE, IEF1-USER, IEF1-INFOCHP, IEF1-INFOSEC, IEF1-INFOPAG, IEF1-OPTION (optionally generated when gtdgof=Y), IEF1-TEXT(01) thru IEF1-TEXT(21).

The GLOSsary panel is created at Block 9240 with the following fields defined in the IETTVW and required by the IET: IEF1-TRAN, IEF1-PANEL, IEF1-SYSTEM, IEF1-CURROW, IEF1-CURCOL, IEF1-FUNKEY, IEF1-CURDT, IEF1-MSGID, IEF1-MSGTX, IEF1-MSGTX, IEF1-MSGAE, IEF1-USER, IEF1-GLOSSEC, IEF1-OPTION (optionally generated when gtdgof=Y), IEF1-TEXT(01) thru IEF1-TEXT(21).

When all the panels have been generated, GTDMSG is set equal to PANEL GEN COMPLETE, and the message is output to the user (Block 9250).

Decision Block 9270 checks to see if the user has input an option code of GTDSEL=2, a request for only the menu panels to be created. If not, the program proceeds to Block 9310. If GTDSEL equals 2, the GPM procedure (FIG. 48, Block 9600) generates the menu panels (Block 9280). When the procedure is complete, GTDMSG is set equal to "PANEL GEN COMPLETE", and the message is output to the user (Block 9290).

Decision Block 9310 checks to see if the user has input an option code of GTDSEL=3, a request for only the help panels to be created. If not, the program continues to Block 9350. At Block 9320, if GTDSEL equals 3, the help panel is generated as described for Block 9220. When the help panel has been generated, GTDMSG is set equal to "PANEL GEN COMPLETE", and the message is output to the user (Block 9330).

Decision Block 9350 checks to see if the user has input an option code of GTDSEL=4, a request for only the information panels to be created. If not, the program jumps to Block 9390. At Block 9360, if GTDSEL equals 4, the information panel is generated as discussed Block 9230. When the information panel has been generated GTDMSG is set equal to 'PANEL GEN COMPLETE", and the message is output to the user (Block 9370).

Decision Block 9390 checks to see if the user has input an option code of GTDSEL=5, a request for only the glossary panels to be created. If not, the program proceeds to Block 9430. At Block 9400, if GTDSEL equals 5, the glossary panel is generated as described for Block 9240. When the glossary panel has been generated, GTDMSG is set equal to "PANEL GEN COMPLETE", and the message is output to the user (Block 9410).

Decision Block 9430 checks to see if the user has input an option code of GTDSEL=6, a request to generate a skeleton panel. If not, the program continues to Block 9480. If GTDSEL equals 6, procedure GSP (FIG. 49, Block 12540) generates the skeleton panel (Block 9440). When the procedure is complete, GTDMSG is set equal to "PANEL GEN COMPLETE", and the message is output to the user (Block 9450).

Procedure FE (FIG. 22, Block 48130) then checks for user end indications (Block 9480). If a user end is indicated, the program moves to Block 9520 and exits procedure GM. If a user end is not indicated, the program returns to Block 9090 to continue processing.

GENERATE MENU PANELS: GPM PROCEDURE. Moving now to FIGS. 48*a–d*, which depict the preferred embodiment of this procedure according to the present invention, the GTD generate menu panels procedure begins at Block 9680 by setting the number of entries in the menu count index to zero and blanking the menu names in the menu table (Block 9700). The procedure initializes a pointer to the beginning of the STDE table (Block 9740). Decision Block 9745 checks to see if the end of the STDE table has been reached (Block 9745). If it has, the procedure jumps to Block 9940. If not, the procedure checks if the current STDE table entry is a menu entry, STDETYPE=E. If the entry is not a menu entry, the procedure proceeds to Block 9885. If the entry is a menu, the menu name is added to the menu table (Block 9760). The menu name table is built in a sorted manner and contains only unique menu names. The new menu name is loaded into the location found (Block 9850) and the menu count is incremented (Block 9860). Block 9885 increments the STDE pointer to point to the next STDE table entry and the procedure returns to Block 9745.

When the end of the STDE table has been reached, the index is initialized to the beginning of the menu table (Block 9940) and checked to see if it is still less than the menu count (Block 9945). If not, the program exits procedure GPM (Block 9980). If the index is still less than the menu count, GTDPMEM is set to the menu name (Block 9950), and the individual menu panel is created.

The menu entry field containing the selection values STDESEL and menu selection description STDEDESC are placed on the screen in a list as constants together on the same line with a list of the menu entries constituting the menu options.

The menus are created with the following fields defined in the IETTVW and required by the IET; IEF1-TRAN, IEF1-PANEL, IEF1-SYSTEM, IEF1-CURROW, IEF1-CURCOL, IEF1-FUNKEY, IEF1-CURDT, IEF1-MSGID, IEF1-MSGTX, IEF1-MSGTX, IEF1-MSGAE, IEF1-USER, IEF1-COMMAND, IEF1-GDATE, IEF1-GTIME, IEF1-APPL, IEF1-TDTID, IEF1-RELN, IEF1-OPTION, (optionally generated when gtdgof=Y), IEF1-LOOKAHEAD (optionally generated when gtdlf=Y).

When the menu has been created, the index is incremented, and the program returns to Block 9945.

GENERATE SKELETON PANEL USER INTERFACE: GSP PROCEDURE. Considering next FIG. 49, which depicts the preferred embodiment of this procedure, the GTD generate skeleton panel user interface procedure begins at Block 12570 by performing the procedure (FIG. 21, Block 43700) to display a GTDGP panel.

At Block 12580, the generate option and lookahead flag fields are validated by translating the values to upper case and then changing their values to "N" if the values contained are not "Y". When the flags have been validated, procedure FE (FIG. 22, Block 48130) checks for user end indications (Block 12590). If a user end is not indicated, the program returns to Block 17570. If a user end is indicated, the program (Block 12630) generates the skeleton panel. Skeleton panels are created with the following fields defined in the IETTVW and required by the IET: IEF1-TRAN, IEF1-PANEL, IEF1-SYSTEM, IEFF1-CURROW, IEF1-CURCOL, IEF1-FUNKEY, IEF1-CURDT, IEF1-MSGID, IEF1-MSGTX, IEF1-MSGTX, IEF1-MSGAE, IEF1-USER, IEF1-OPTION (optionally generated when gtdgof=Y), IEF1-LOOKAHEAD (optionally generated when gtdglf=Y).

The generated panel may then be edited by an appropriate map editor and customized to meet specific application needs. After the skeleton panel is generated, the program exits procedure GSP (Block 12640).

COMPILE TRANSACTION DEF/VIEWS/PANELS/PROCEDURES

The next major area of the GTD involves the Compile Transaction Definition, Views, Panels and Procedures program which provides the application developer with the construction tools necessary to build a DAA application, particularly the TDT and view tables required to characterize the application to the IET. When the TDT edit has been completed, the designer can request an object module be created for the TDT using the CTREQ procedure. This presents a panel allowing the designer to specify the TDT member to be compiled. The CTREQ procedure ensures that applications built with GTD are constructed with consistent compile and link-editor options for the DAA platform.

Furthermore, the CTREQ procedure defined FIG. 50 at Block 16440 provides the user interfaces necessary to construct an application load module and install it in an executable load module library or directory. The application is built with the necessary TDT and view tables required by IET. The information in these tables is checked for consistency and completeness before the table objects are built.

If the edit specifications for a selected transaction are consistent (all panels and procedures referenced in TDT member are defined as entries in TDT) the compilation will create the appropriate object module. The object module builds the tables that interrelate the panels, procedures, menu entries, and views within the TDT suitable for controlling execution of this transaction at run time.

If errors exist in this process (for example, a panel is referenced on menu and the panel is not defined to menu hierarchy or as a discrete the panel specification) these error conditions will be noted for the designer to correct.

In addition to providing the user interfaces for compiling/constructing the tables required by IET, the CTREQ procedure includes user interfaces for compiling the application panels and procedures as well as building the load module. The menu options provided construct each type of component as a group, either conditionally or unconditionally. By treating each type of component as a group, the program helps to ensure synchronization within a component type.

Other menu options provided construct the entire application in a sequence which ensures synchronization between all components of the application. When one of these is selected, the entire application is constructed in the following sequence type: the TDT, the views, the panels, the procedures, the application load module. This construction sequence comprehends the data dependencies between different types of application objects.

The conditional construction options ensure synchronization by checking modification dates of both the source module and the transaction view source and comparing those dates with modification dates on compile objects. Source modules which have been modified later than their corresponding object module require reconstruction. Each object module with an earlier modify date than the transaction view will also require reconstruction. The conditional construction permits a shorter (but still synchronized) construction process when only a few changes have been made to the application. The unconditional construction forces reconstruction of all objects.

Below are listed the third level menu options under the second level menu COMPILE TRANSACTION DEF/VIEW/PANELS/PROCEDURES. In addition to selecting a menu option to perform, the user is also required to provide 2 additional pieces of information: the name of the TDF file (gtdmmem), and the library or pathname under which the TDF file may be accessed (gtdmlib). These 2 pieces of information are required to perform any of the menu functions. Input fields for these values are included on each of the second level hierarchy menus.

4. COMPILE TRANSACTION DEF/VIEWS/PANELS/PROCEDURES 4.1 COMPILE TRANSACTION DEFINITION 4.2 COMPILE VIEWS 4.3 COMPILE PANELS—CONDITIONAL 4.4 COMPILE PANELS—UNCONDITIONAL 4.5 COMPILE PROCEDURES—CONDITIONAL 4.6 COMPILE PROCEDURES—UNCONDITIONAL 4.7 BIND TRANSACTION 4.8 COMPILE/BIND ALL ELEMENTS—CONDITIONAL 4.9 COMPILE/BIND ALL ELEMENTS—UNCONDITIONAL 4.10 EXIT

Menu option 4.1, COMPILE TRANSACTION DEFINITION provides the capability to generate and compile application description/control tables into linkable objects which can be used by the IET when performing dialog management, obtaining profile information, performing cooperative processing, and interfacing with the application. The flow chart of the CT procedure FIG. 51, starting with Block 17450, details these capabilities further.

Menu option 4.2, COMPILE VIEWS provides the capability to generate and compile view tables into linkable objects which can be used by the IET when saving/restoring application profile information and when obtaining/retrieving input/output information during cooperative processing. The flow chart of the CV procedure (FIG. 54, starting with Block 25870) details this capability further.

Menu option 4.3, COMPILE PANELS—CONDITIONAL and Menu option 4.4, COMPILE PANELS—UNCONDITIONAL provide the capability to compile all application panels either conditionally (Menu option 4.3) or unconditionally (Menu option 4.4). A flag is set indicating the conditional state for the compilation then a procedure is invoked to manage the compilation of all the application panels. The flow chart of the CP procedure (FIG. 55, starting with Block 31540) details this capability further.

Figure 57A:
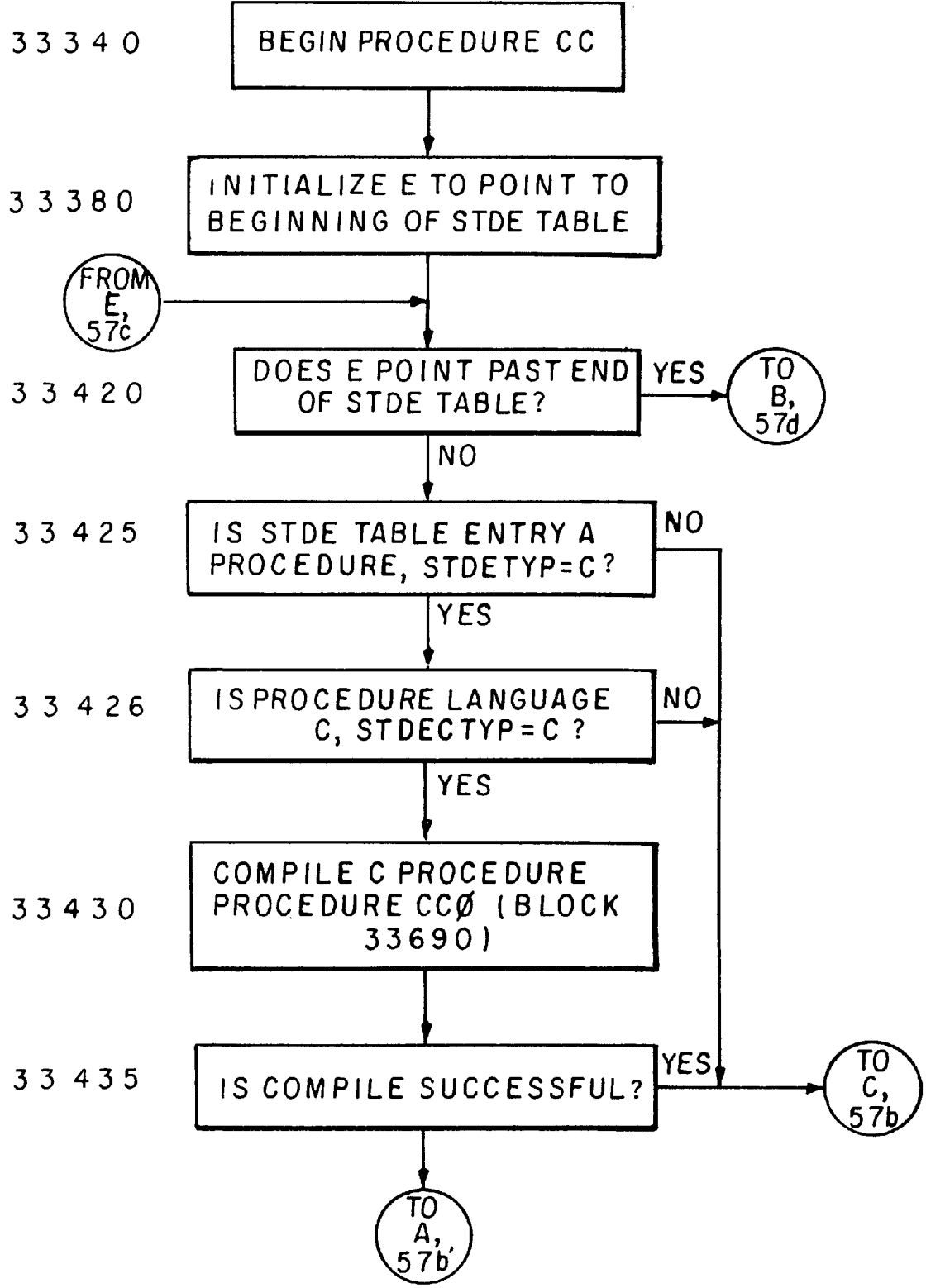
Figure 57B:
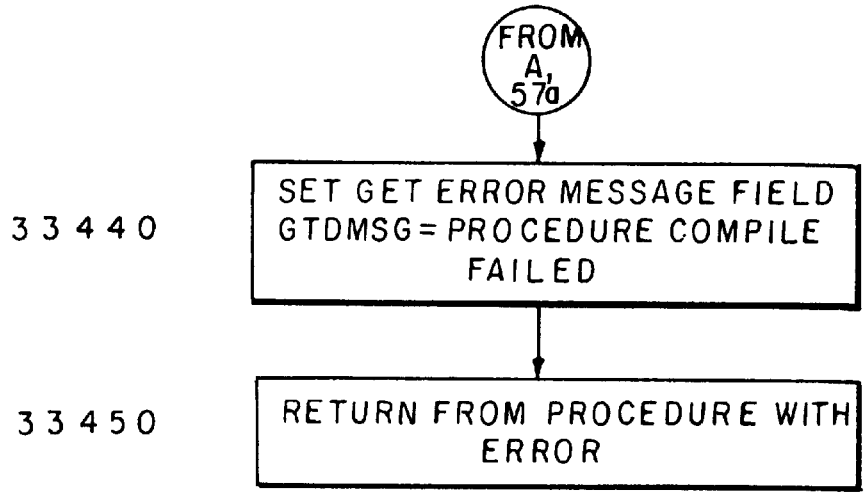
Figure 57B:
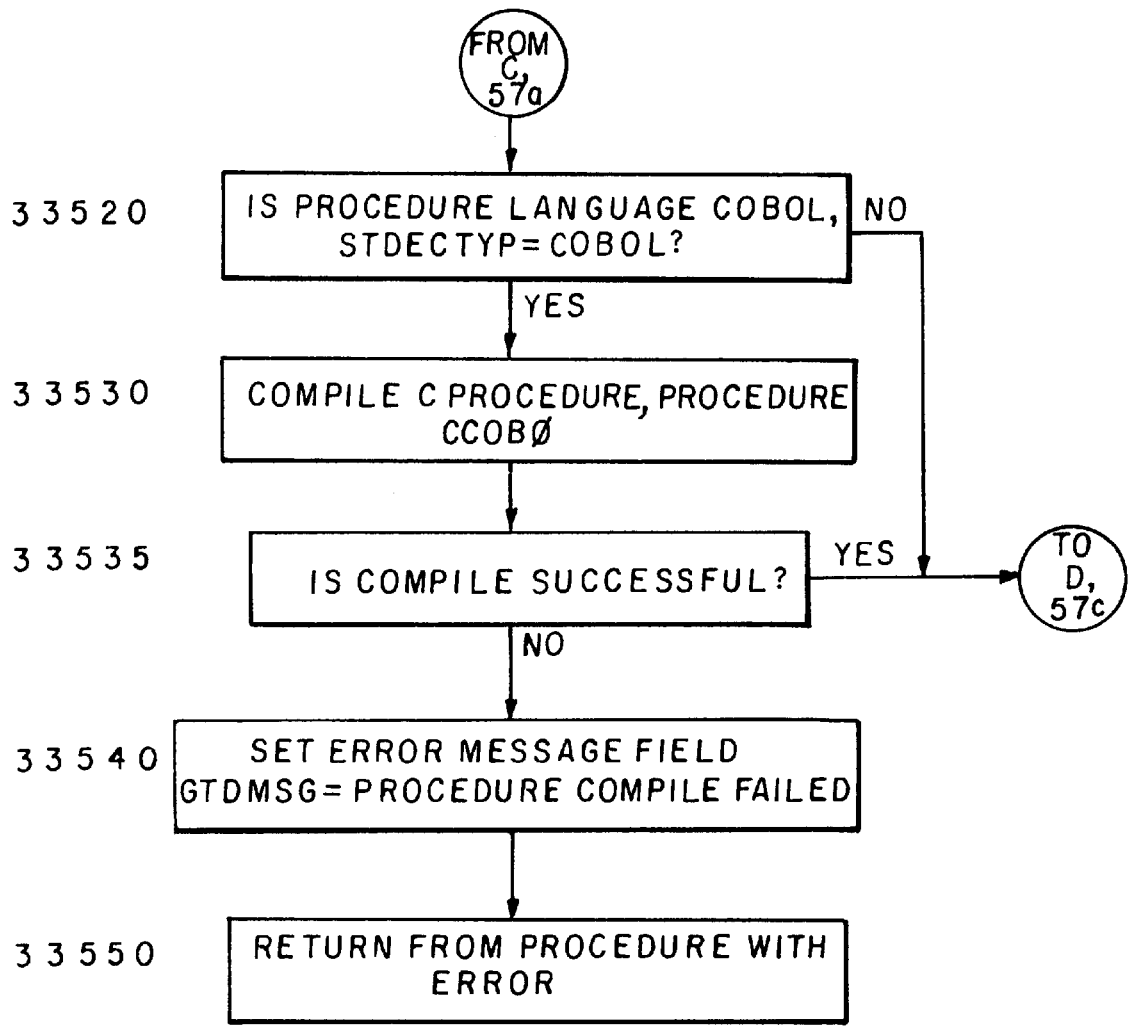
Figure 58B:
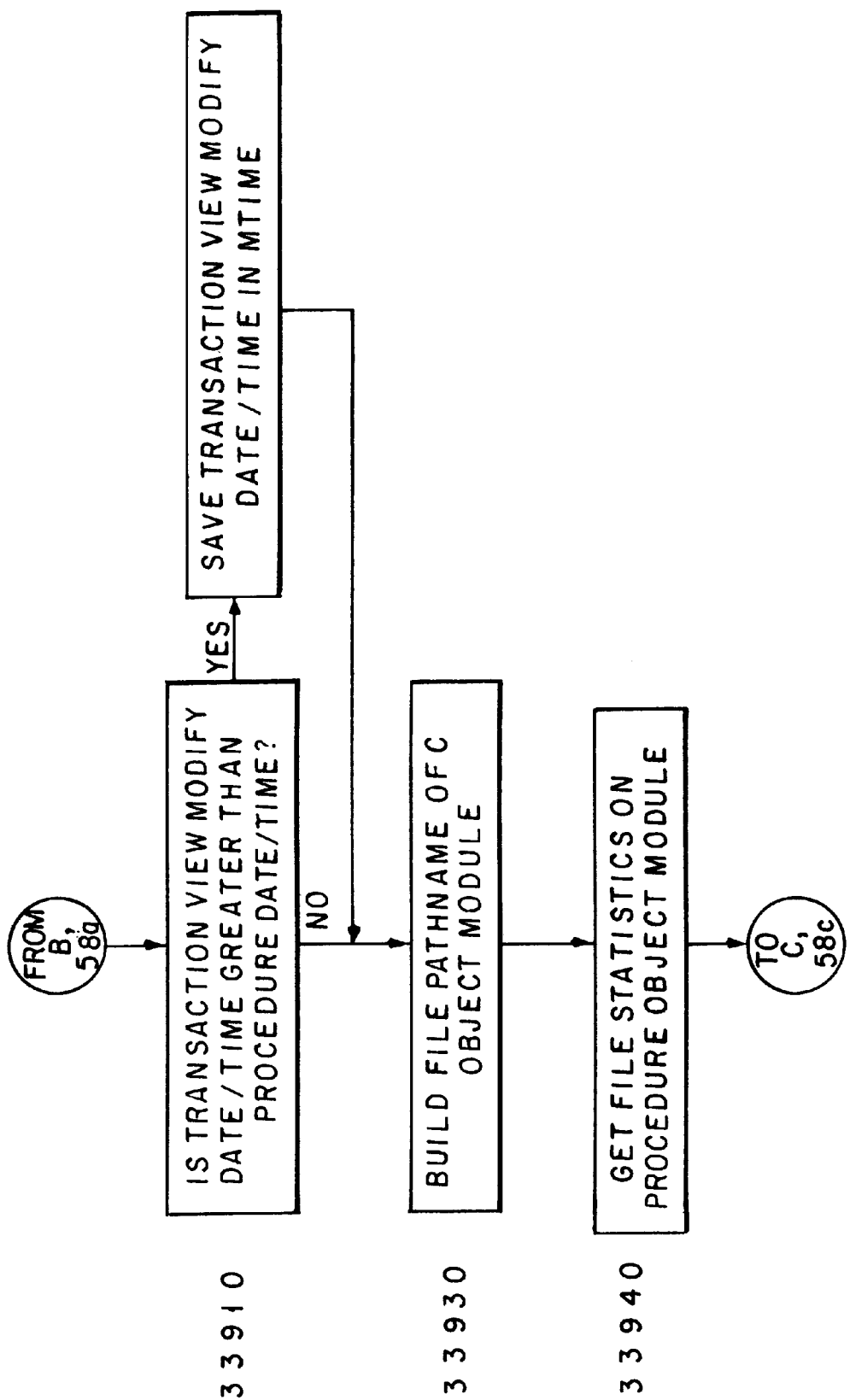
Figure 58C:
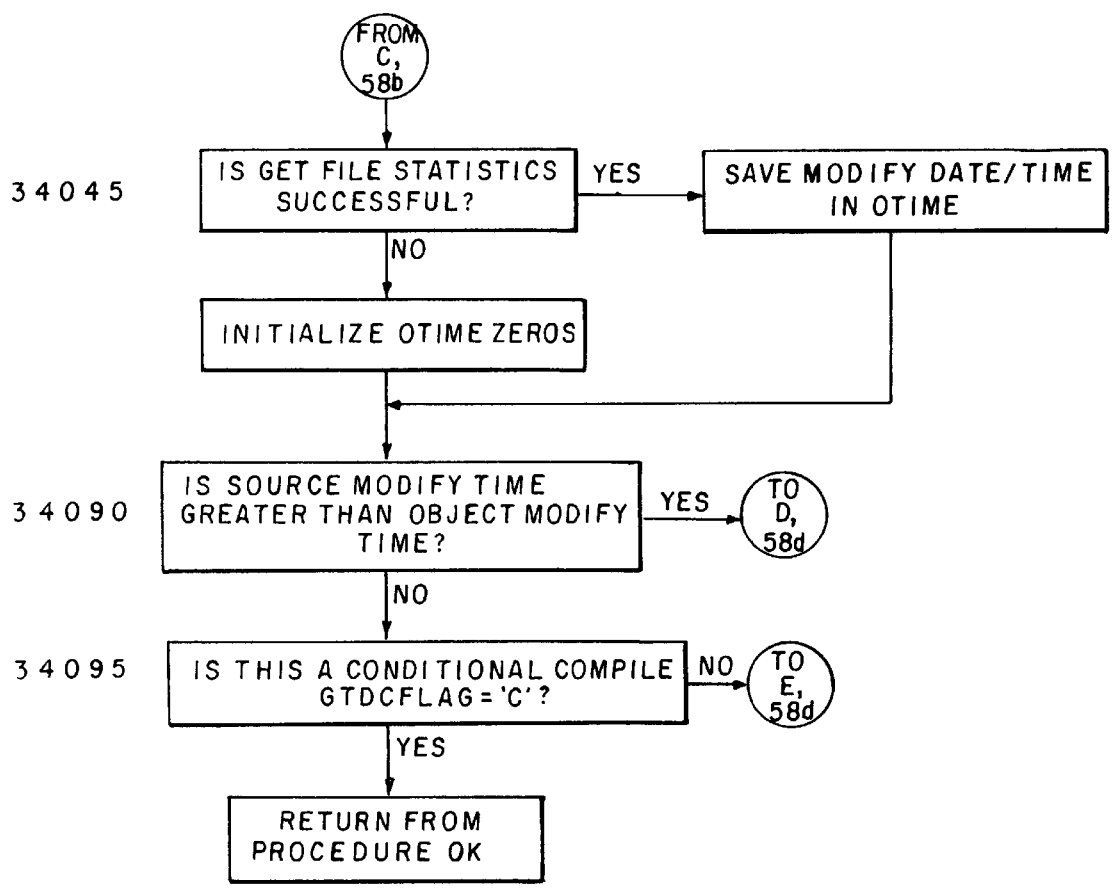
Figure 58D:
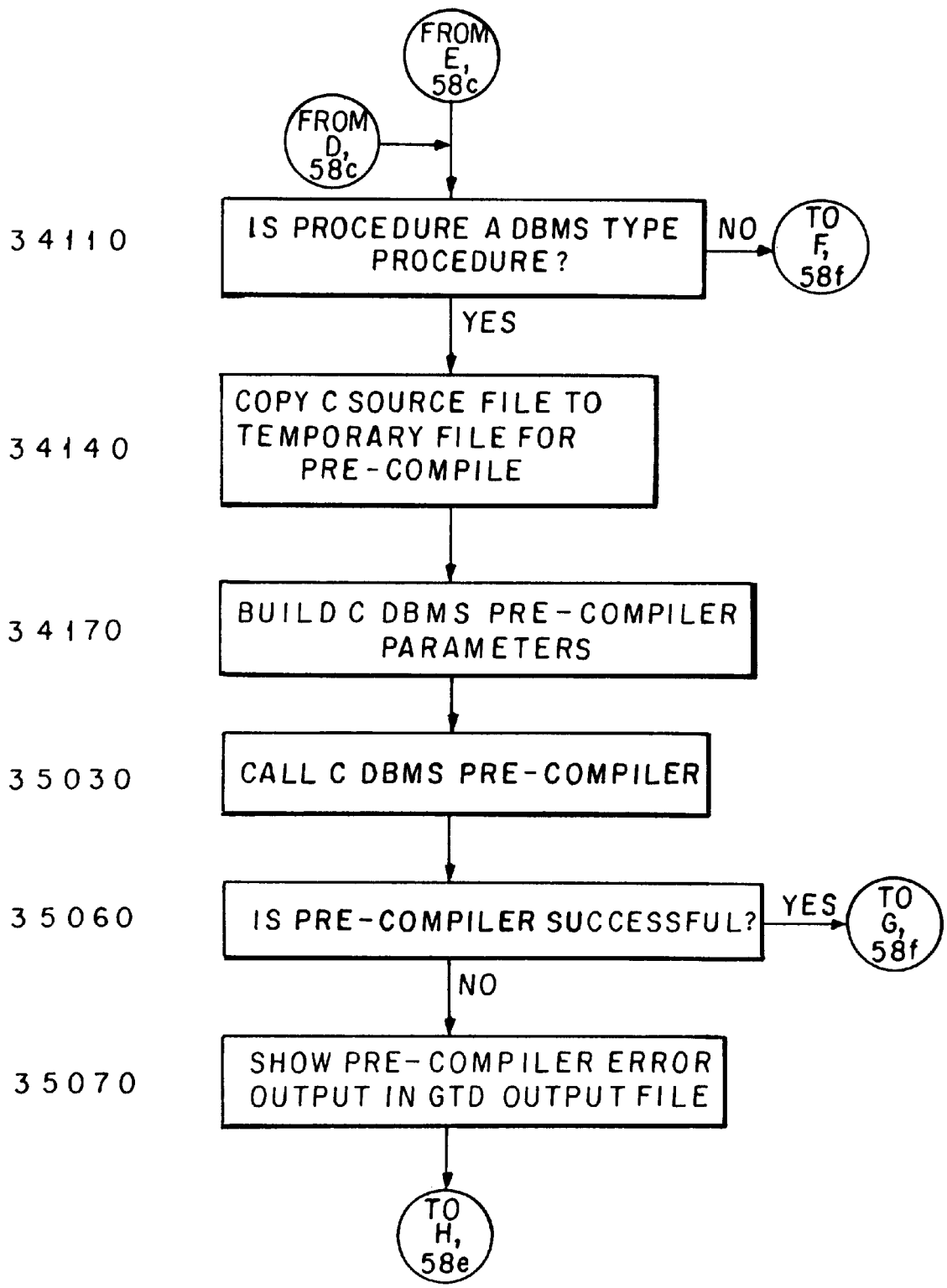
Figure 58E:
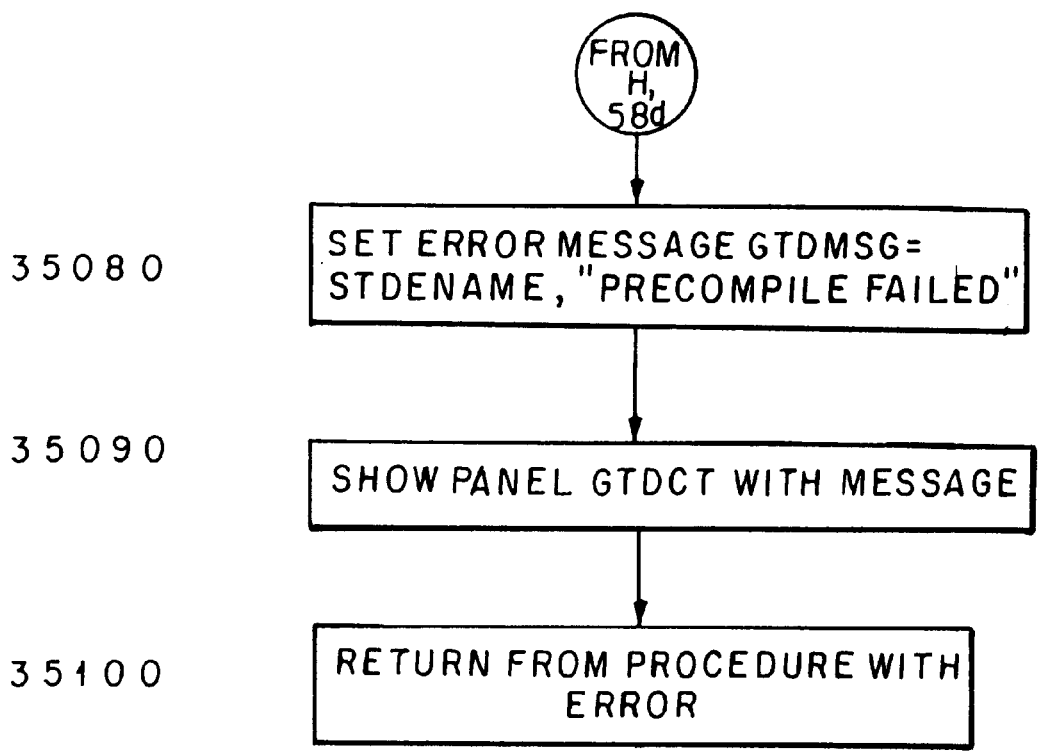
Figure 58F:
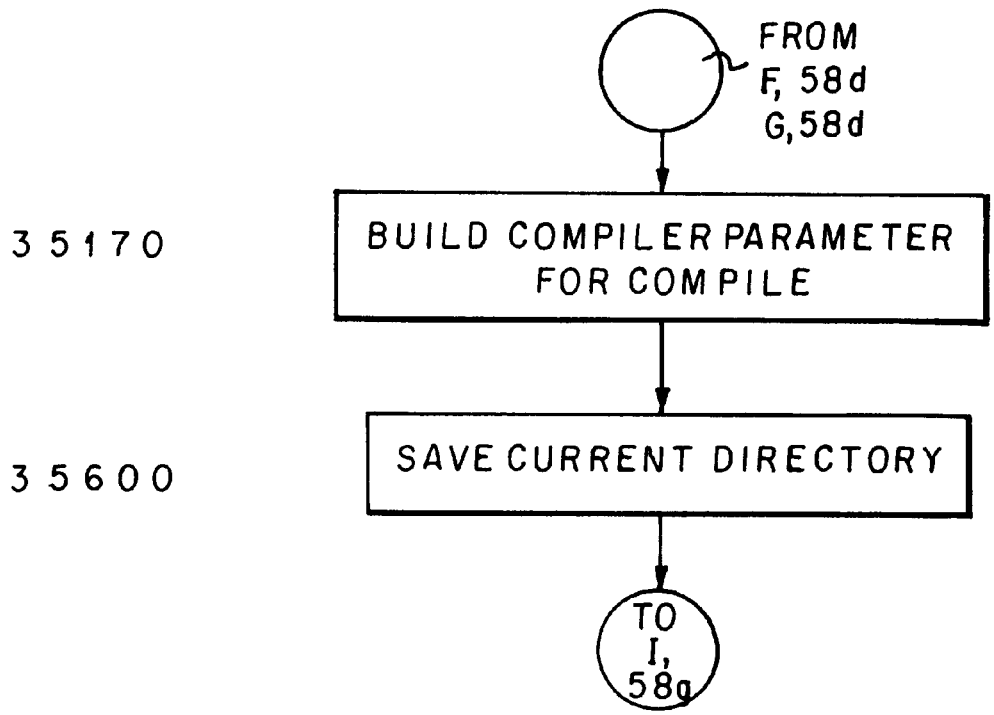
Figure 58G:
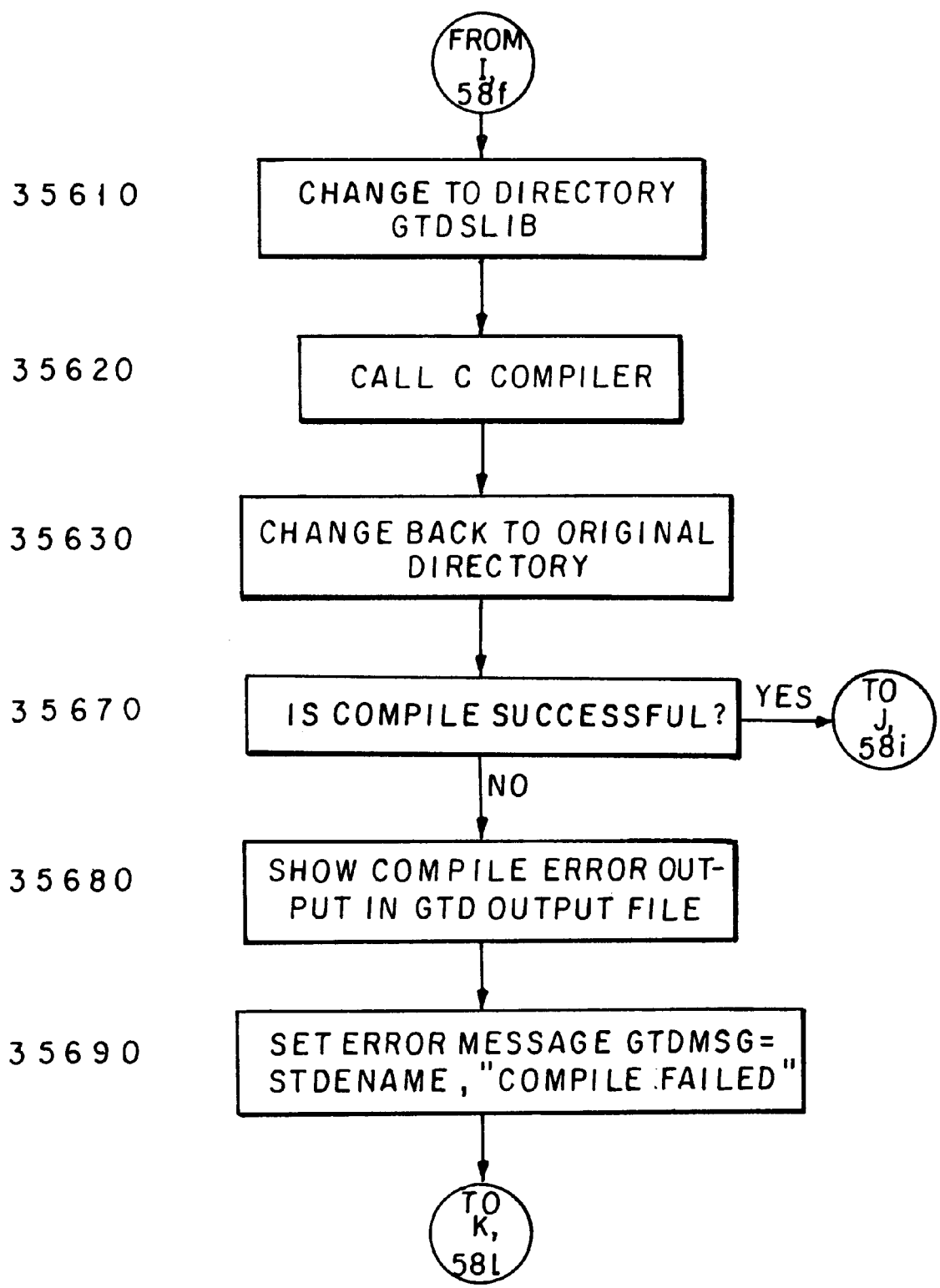

Menu option 4.5, COMPILE PROCEDURES—CONDITIONAL and Menu option 4.6, COMPILE PROCEDURES—UNCONDITIONAL provide the capability to compile all application procedures either conditionally (Menu option 4.5) or unconditionally (Menu option 4.5). A flag is set indicating the conditional state for the compilation, then a procedure is invoked to manage the compilation of all the application procedures. The flow chart of the CC procedure (FIG. 57, starting with Block 33340) details this capability further.

Menu option 4.7, BIND TRANSACTION provides the capability to link all application objects, as well as any required system objects, into a single load module and install it in a library or directory for executable modules. The flow chart of the BT procedure (FIG. 60, starting with Block 40110) details this capability further.

Menu option 4.8, COMPILE/BIND ALL ELEMENTS—CONDITIONAL Menu option 4.9, COMPILE/BIND ALL ELEMENTS—UNCONDITIONAL provide the capability to compile all application components either conditionally (Menu option 4.8) or unconditionally (Menu option 4.9). A flag is set indicating the conditional state for the compilation immediately then all the compile procedures are invoked in turn to manage the compilation of the application components.

COMPILE/BIND: CTREQ PROCEDURE. Starting with FIGS. 50a–j, which depict a preferred embodiment of this procedure according to the present invention, the GTD compile/bind procedure begins at Block 16500 by performing the procedure to display a panel (FIG. 21, Block 47300) electing to display the GTDCT panel. This panel is a menu of all the construction processes available. Block 16510 performs the FE procedure (FIG. 22, Block 48130) to check for user input end indications. At Block 16520, if an end is indicated, the procedure proceeds to exit the program at Block 17370. If an end is not indicated, at Block 16540 the procedure performs the load/create TDF (FIG. 24, Block 44960) GTDT procedure. The temporary working directory is initialized from gtdslib (Block 16550). Block 16580 then obtains the transaction view modify date/time and saves it in gtvwtime. This is later used when evaluating conditional compilation cases.

Decision Block 16590 checks to see if there is a compile TDT request, GTDSEL=1. If not, the program jumps to Block 16630 to continue identifying the user request. If GTDSEL equals 1, the compile TDT (FIG. 51, Block 17450) CT procedure is performed (Block 16600). The compile status is checked (Block 16610). The program then returns to Block 16500 to redisplay the menu.

Decision Block 16630 checks to see if there is a compile views request, GTDSEL=2. If not, the program proceeds to Block 16680 to continue identifying the user request. If GTDSEL equals 2, the unconditional compile flag is set, gtdcflag=U (Block 16640). The compile views (FIG. 54, Block 25870) CV procedure is performed (Block 16550). Block 16655 then checks the compile views status after which the program returns to Block 16500 to redisplay the menu.

Decision Block 16680 checks to see if there is a conditional compile panels request, GTDSEL=3. If not, the program proceeds to Block 16730 to continue identifying the user request. If GTDSEL equals 3, the conditional compile flag is set, gtdcflag=C (Block 16690). The compile panels (FIG. 55, Block 31540) CP procedure is performed (Block 16700). The program then returns to Block 16500, to redisplay the menu.

Decision Block 16730 checks to see if there is an unconditional compile panels request, GTDSEL=4. If not, the program moves to Block 16780 to continue identifying the user request. If GTDSEL equals 4, an unconditional compile flag is set, gtdflag=u (Block 16740). The compile panels (FIG. 55, Block 31540) CP procedure is performed (Block 16700). The program then returns to Block 16500, to redisplay the menu.

Decision Block 16780 checks to see if there is a conditional compile procedures request, GTDSEL=5. If not, then the procedure jumps to Block 16830 to continue identifying the user request. If GTDSEL equals 5, the conditional compile flag is set, gtdflag=c (Block 16790). The compile procedures (FIG. 57, Block 33340) CC procedure is performed (Block 16800). The program then returns to Block 16500 to redisplay the menu.

Decision Block 16830 checks to see if there is an unconditional compile procedure request, GTDSEL=6. If not, the program moves to Block 16880 to continue identifying the user request. If GTDSEL equals 6, the unconditional compile flag is set, gtdcflag=U (Block 16840). The compile procedure (FIG. 57, Block 33340) CC procedure is performed (Block 16850). The program then returns to Block 16500 to redisplay the menu.

Decision Block 16880 checks to see if there is a bind transaction request, GTDSEL=7. If not, the program jumps to Block 16930 to continue identifying the user request. If GTDSEL equals 7, the conditional compile flag is set, gtdcflag=C (Block 16890). The bind transaction (FIG. 60, Block 40110) BT procedure is performed (Block 16850). The program then returns to Block 16500 to redisplay the menu.

Decision Block 16930 checks to see if there is a conditional compile/bind all request, GTDSEL=8. If not, the program jumps to Block 17060 to continue identifying the user request. If GTDSEL equals 8, the conditional compile flag is set, gtdcflag=C, (Block 16940). The compile TDT (FIG. 51, Block 17450) CT procedure is performed (Block 16950). The status of the compile is then checked (Block 16960). If the TDT compile was not successful, the program returns to Block 16500 to redisplay the menu. If the TDT compile was successful, the compile views (FIG. 54, Block CV 25870) procedure is performed (Block 16970). The status of the views compile is then checked (Block 16975). If the views compile was not successful the program returns to Block 16500 to redisplay the menu.

If the views compile was successful the status messages are displayed but no input is accepted from the user (Block 16980). The compile panels (FIG. 55, Block 31540) CP procedure is performed (Block 16990). Again, the status messages are displayed but no input is accepted from the user (Block 17000). The compile procedures (FIG. 57, Block 33340) CC procedure is performed (Block 17010). The status of the compile is checked (Block 17015). If the compile was not successful, the program returns to Block 16500 to redisplay the menu panel. If the compile was successful, the status messages are displayed, but still no input is accepted from the user (Block 17020). The bind transaction (FIG. 60, Block 40110) BT procedure is performed, and the procedure returns to Block 16500 to redisplay the menu panel.

Decision Block 17060 checks to see if there is an unconditional compile/bind all request GTDSEL=9. If not, the program returns to Block 16500 to redisplay the menu panel. If there is, the unconditional compile flag is set, gtdcflag=U (Block 17160). The compile TDT (FIG. 57, Block 17450) CT procedure is then performed (Block 17170). The TDT compile status is then checked (Block 17175). If the TDT compile was not successful, the program returns to Block 16500 to redisplay the menu panel. If the TDT compile was successful the status messages are displayed but no input is accepted from the user (Block 17180). Next, the compile views (FIG. 54, Block 25870) CV procedure is then performed (Block 17190). The status of the views compile is then checked (Block 17195). If the compile was not successful, the program returns to Block 16500 to redisplay the menu panel. If the compile was successful, the status messages are displayed but no input is accepted from the user (Block 17200). The compile panels (FIG. 55, Block 31540) CP procedure is then performed (Block 17210). The status messages are displayed but again no input is accepted from the user (Block 17220). The compile procedures (FIG. 57, Block 33340) CC procedure is then performed (Block 17230). The status of the compile procedures is then checked (Block 17235). If the status of the compile was not successful, the program returns to Block 16500 to redisplay the menu panel. If the compile was successful, the status messages are displayed but still no input is accepted from the user (Block 17240). Finally, the bind transaction (FIG. 60, Block 40110) BT procedure is performed (Block 17250) and the program returns to Block 16500 to redisplay the menu panel.

COMPILE TRANSACTION DEFINITION: CT PROCEDURE

Figure 51A:
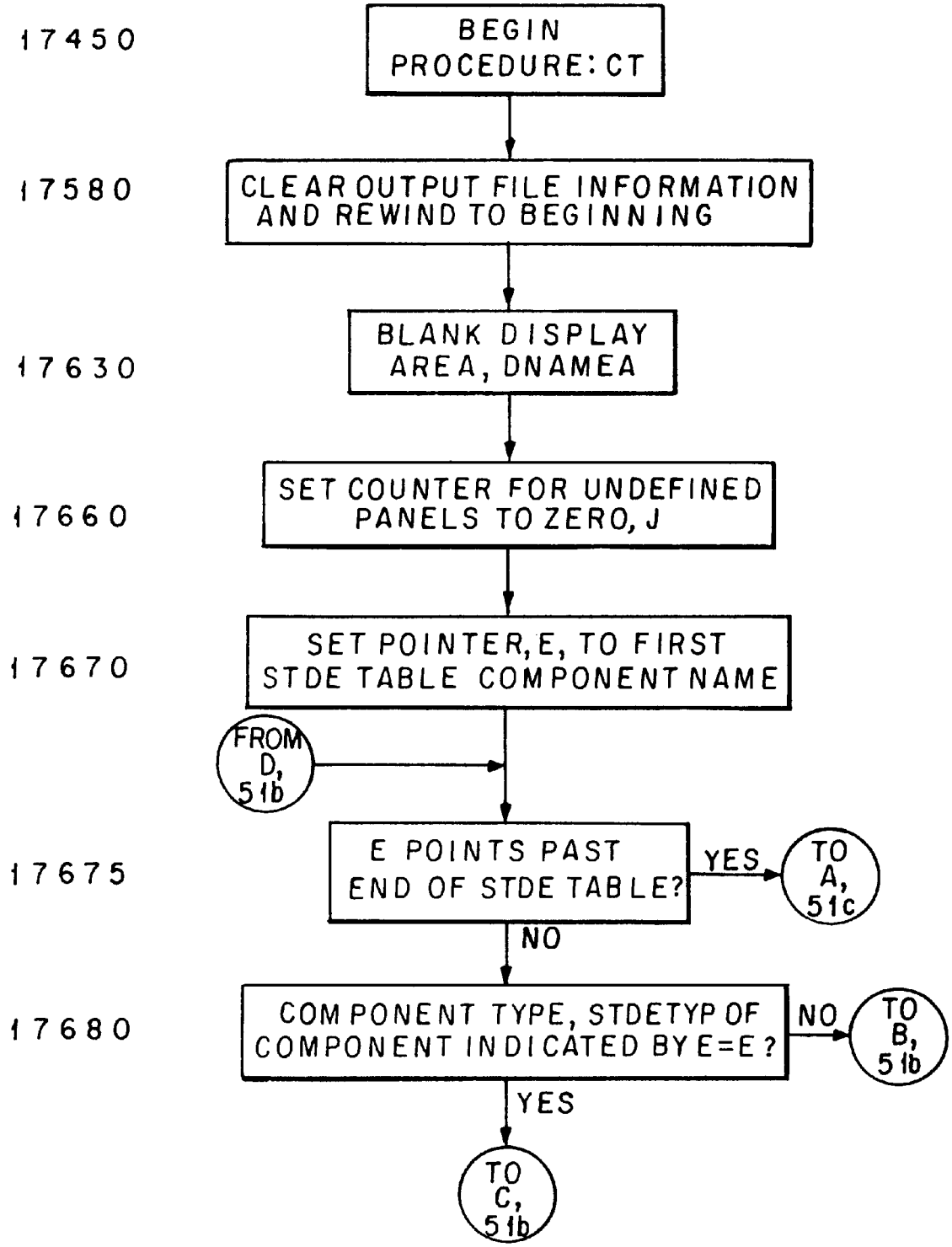
FIGS. 51*a–rr* are a flow chart depicting the compile transaction definition (CT) procedure according to the preferred embodiment of the present invention.
Figure 51B:
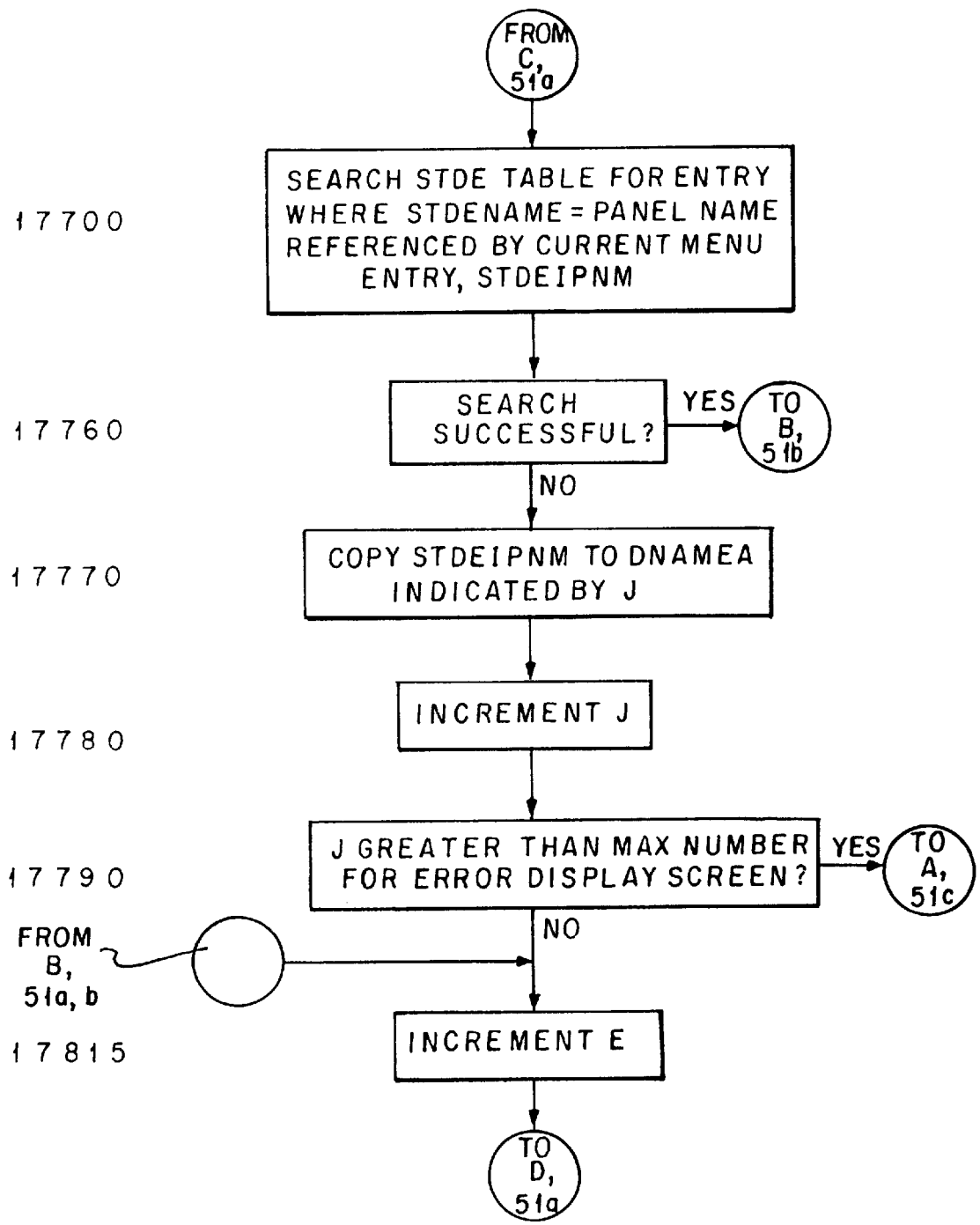
Figure 51C:
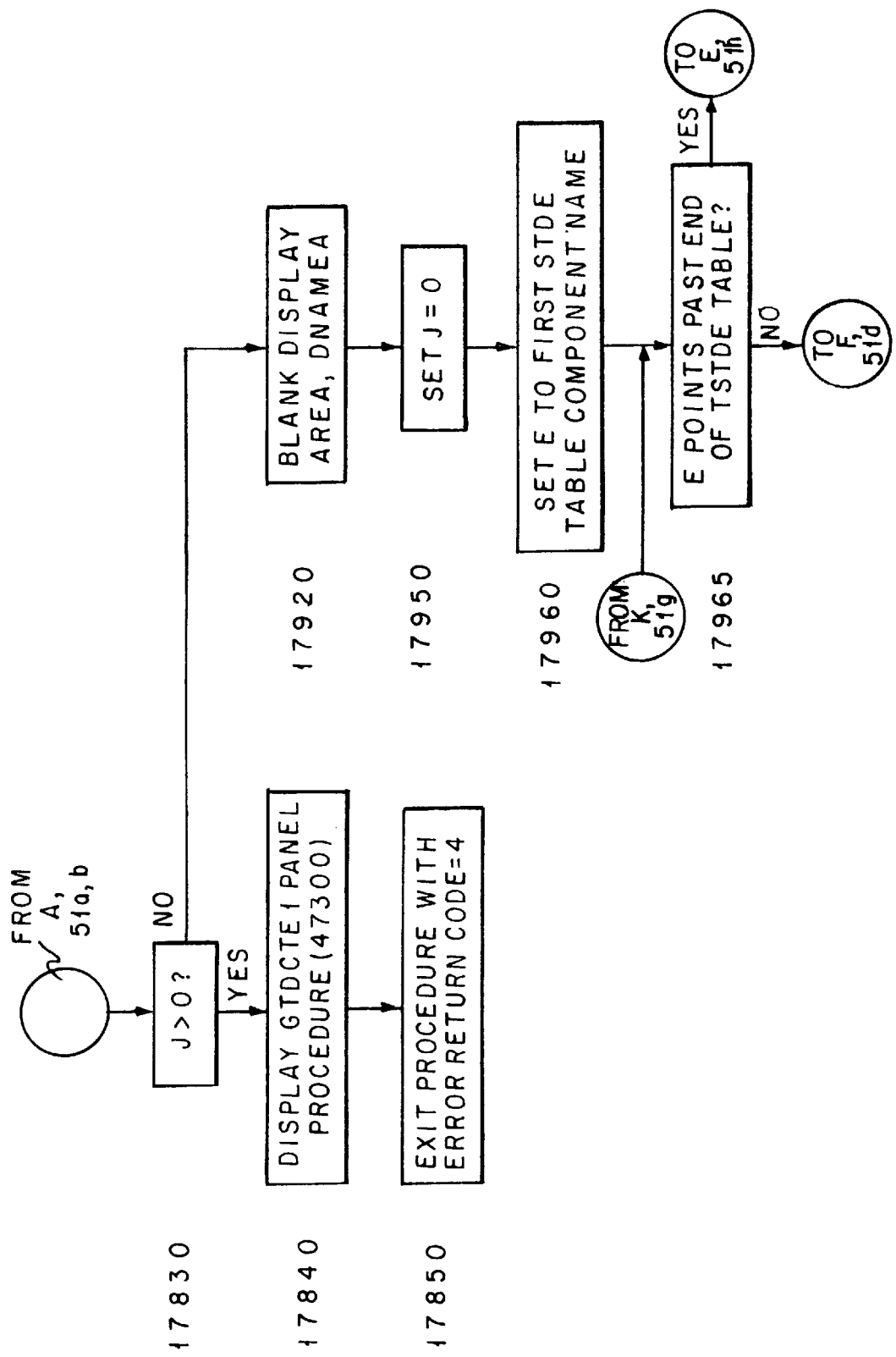
Figure 5L:
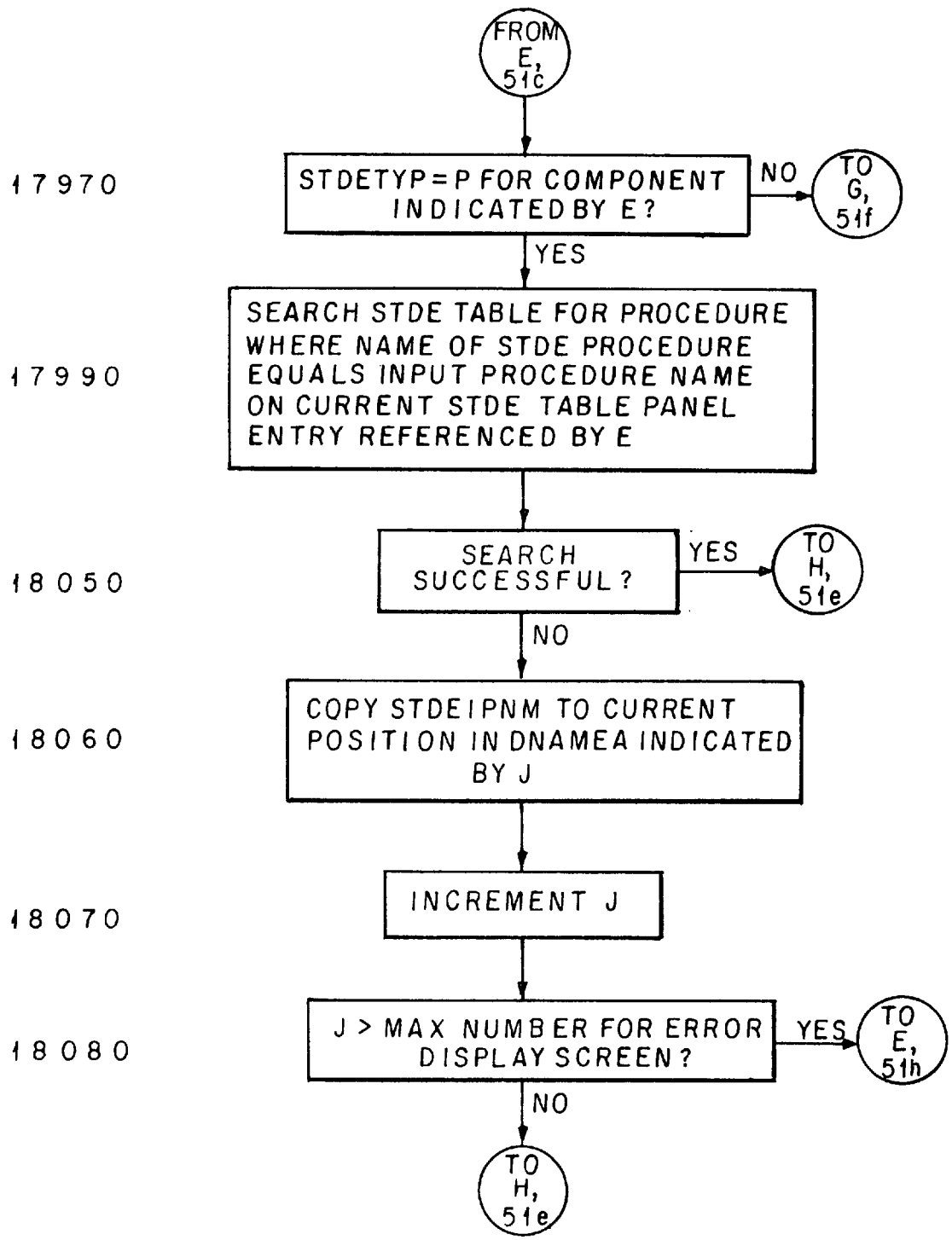
Figure 51E:
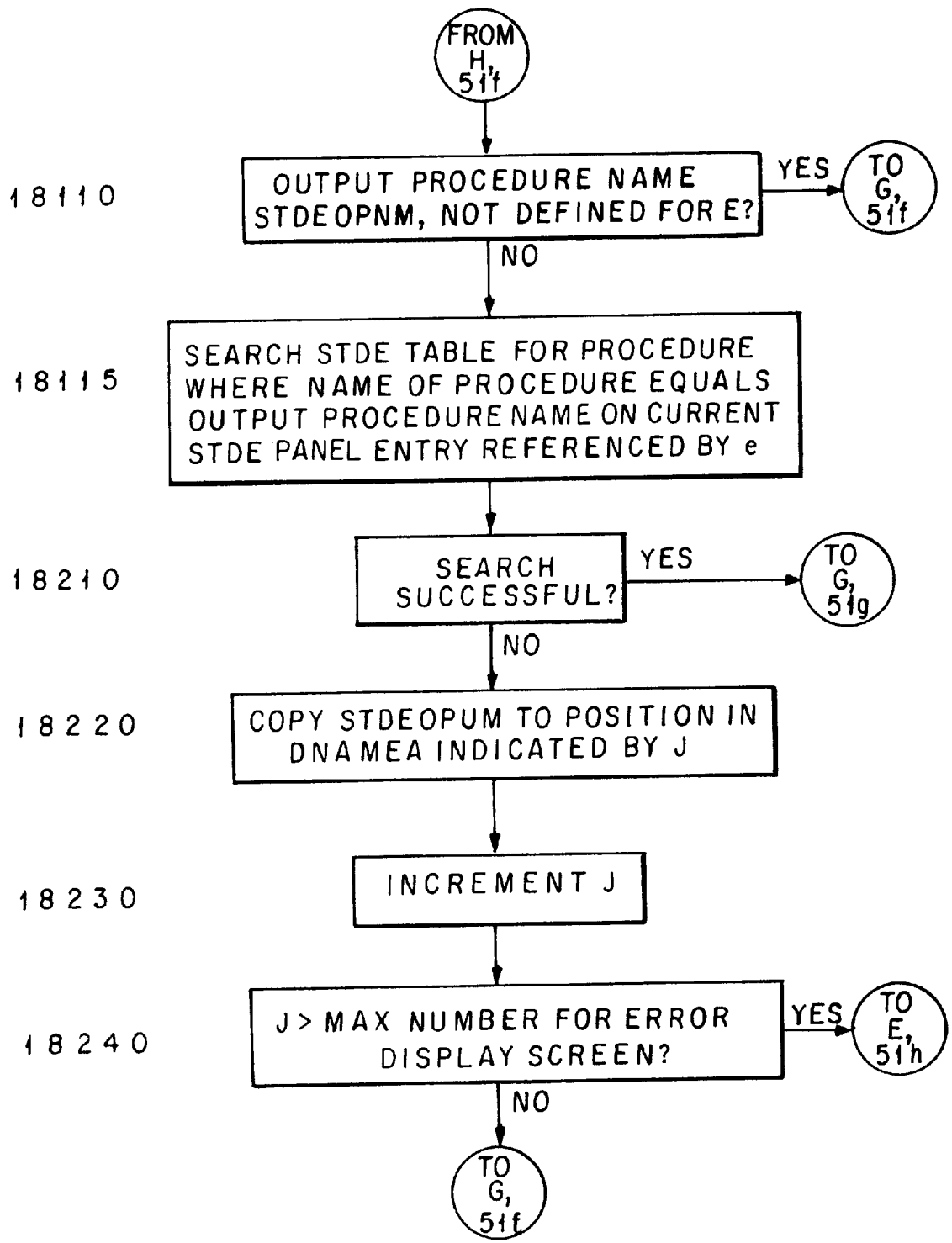
Figure 5L:
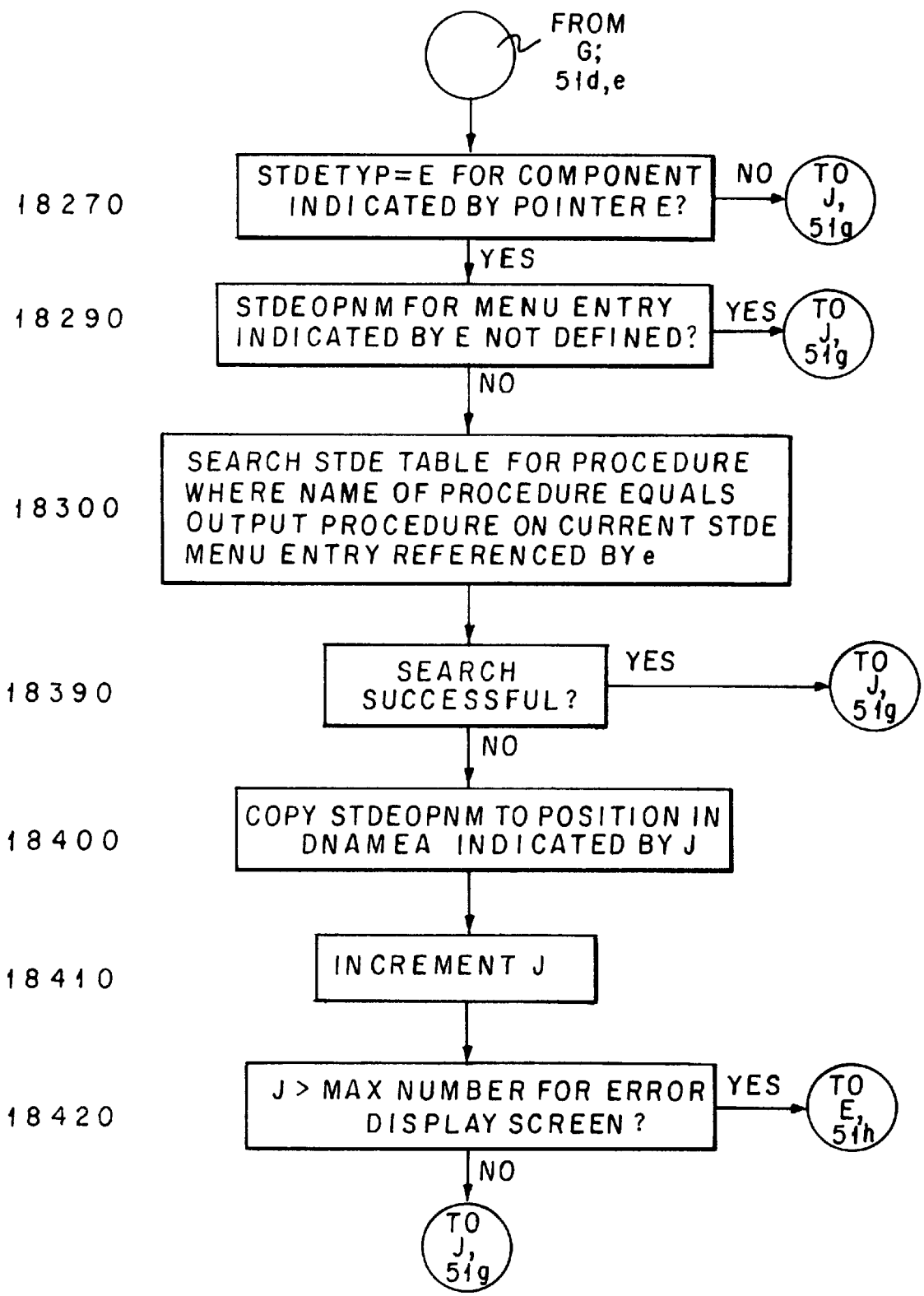
Figure 51G:
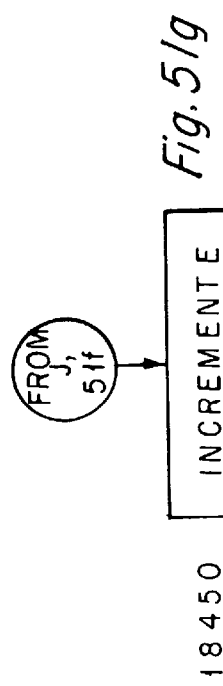
Figure 51H:
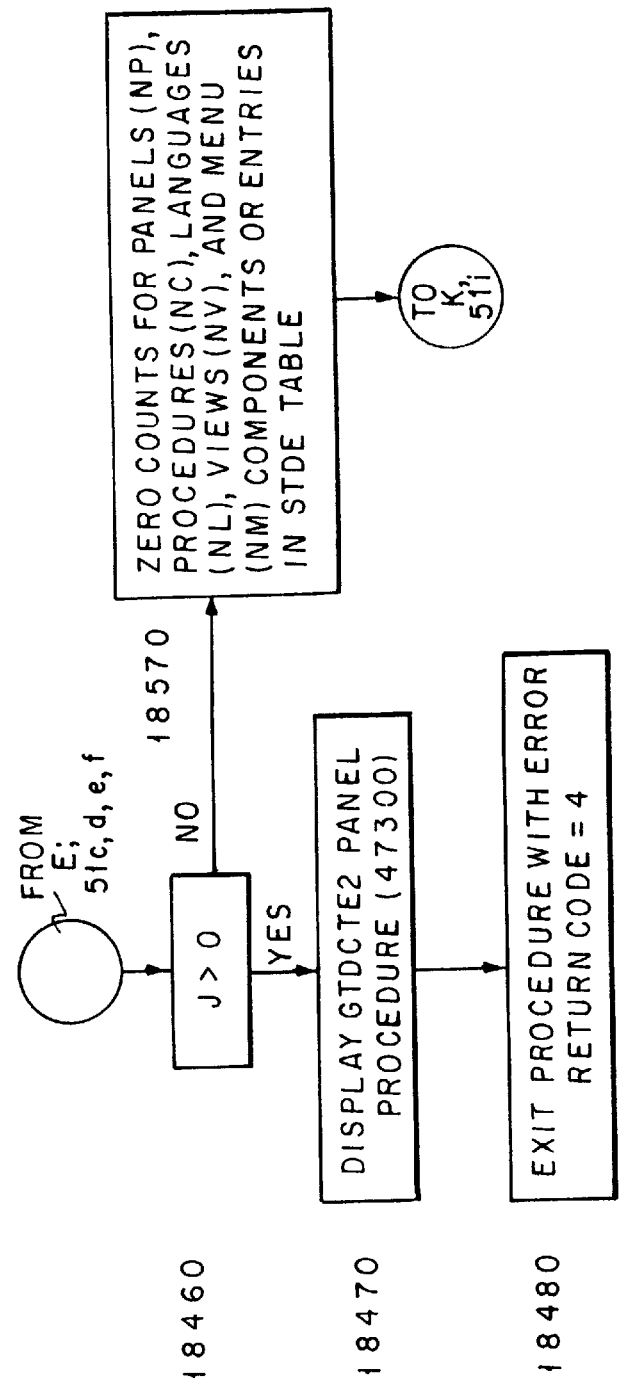
Figure 5:
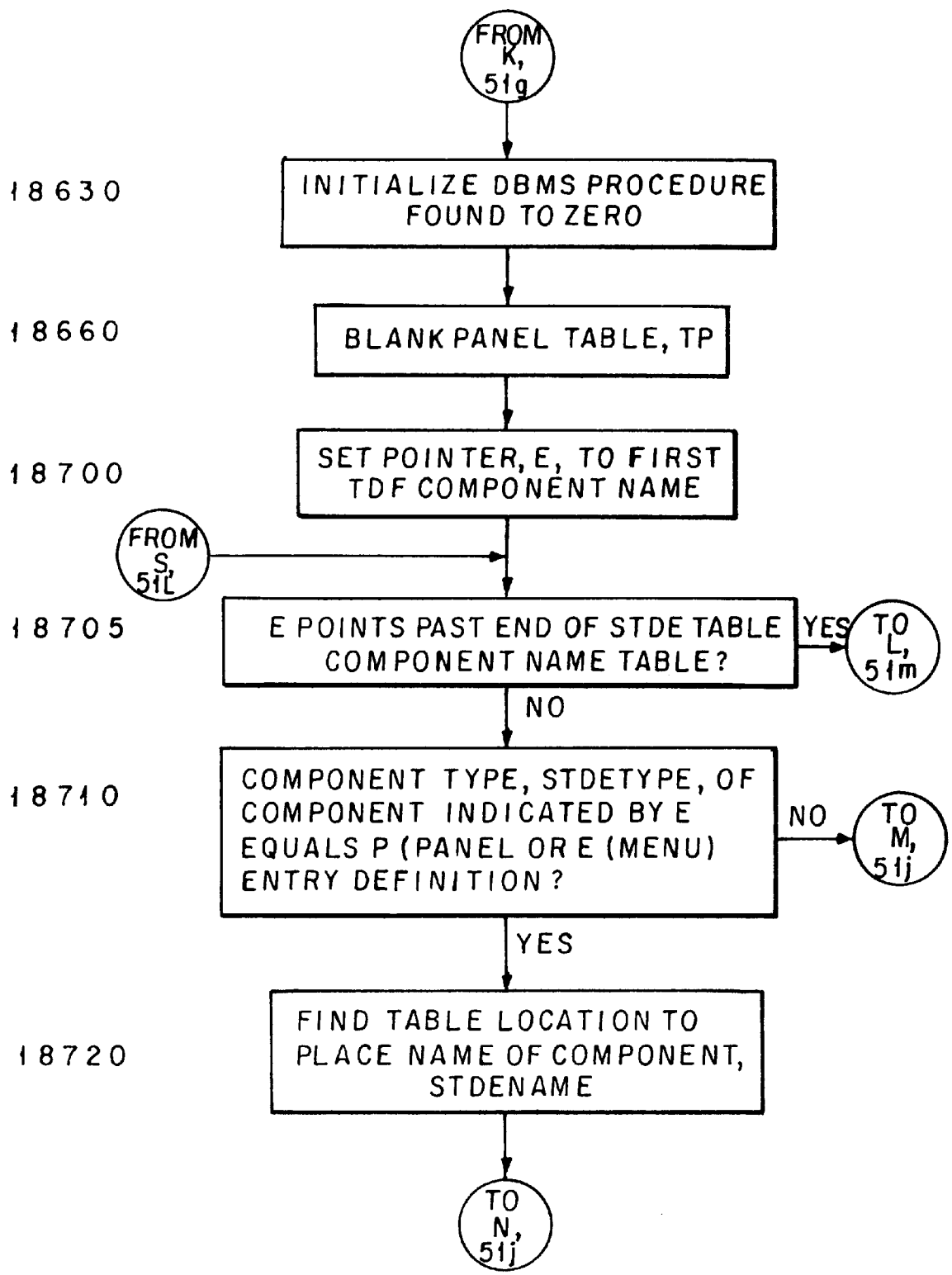
Figure 51J:
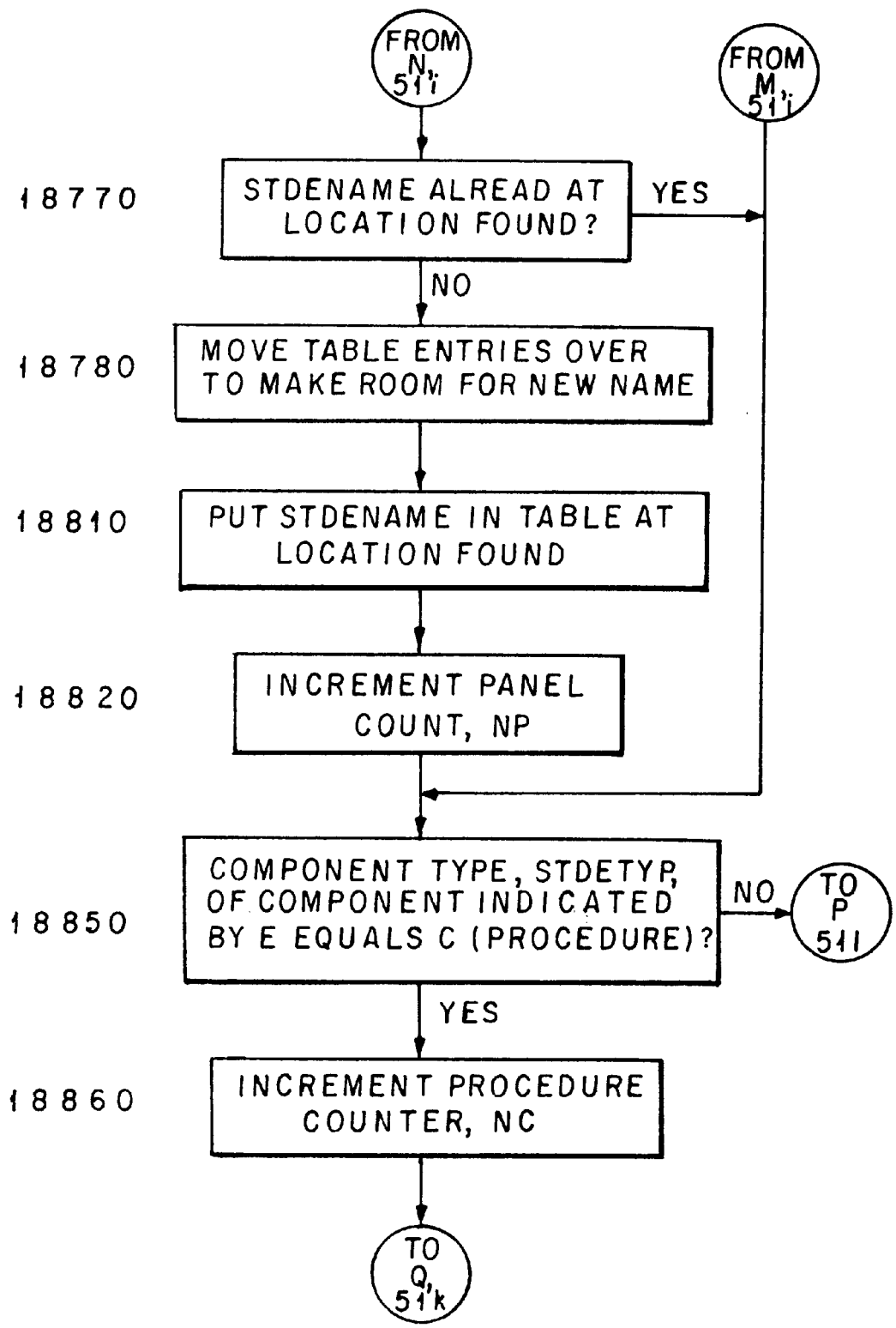
Figure 5I:
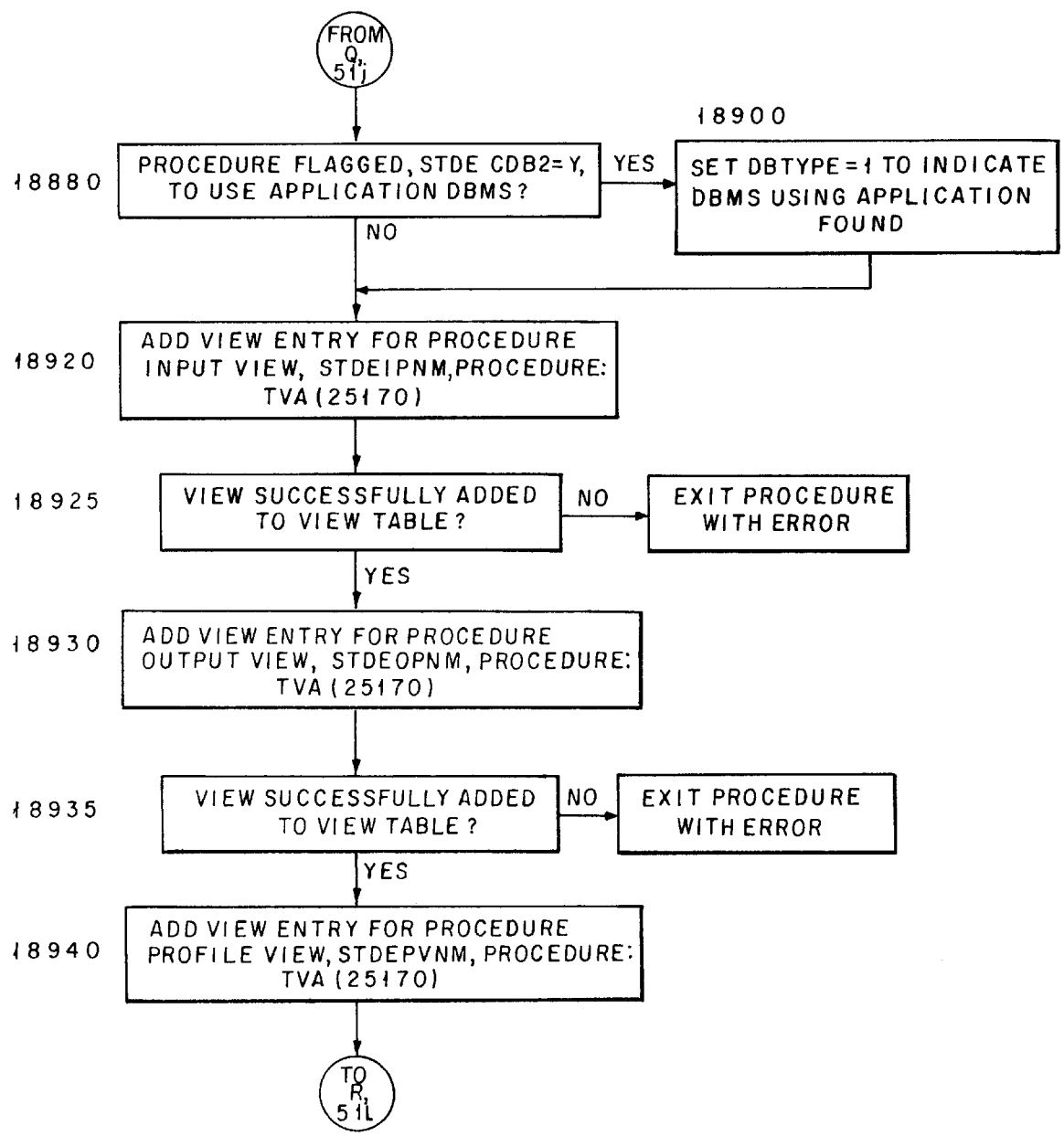
Figure 5L:
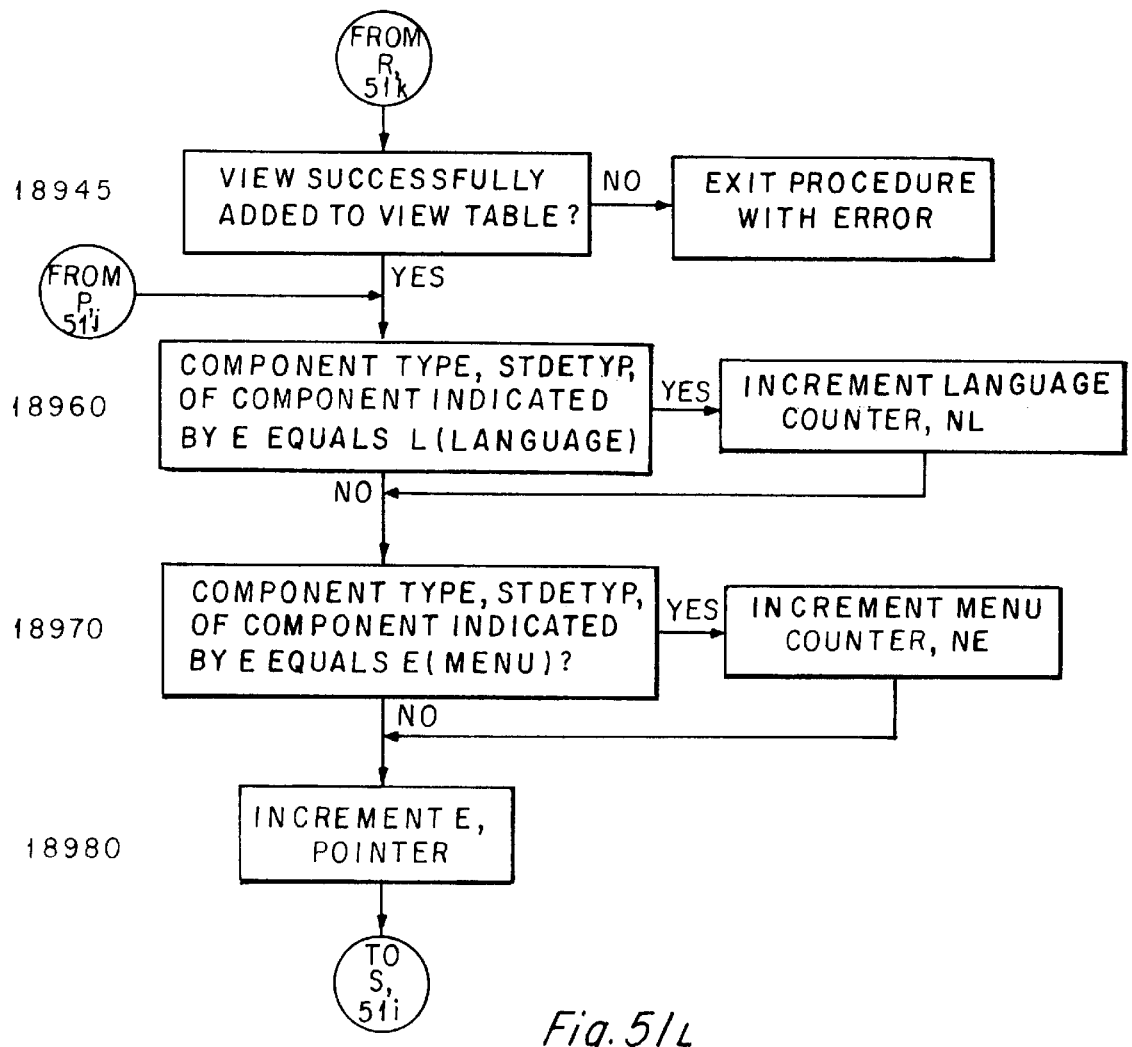
Figure 5L:
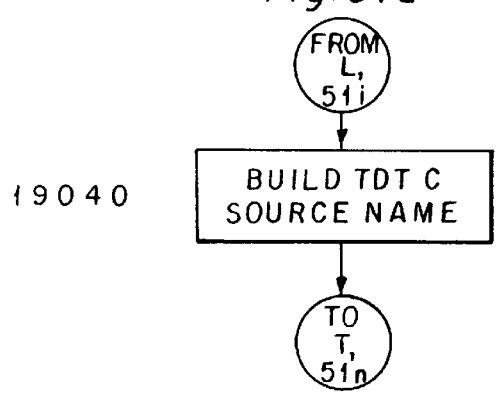
Figure 510:
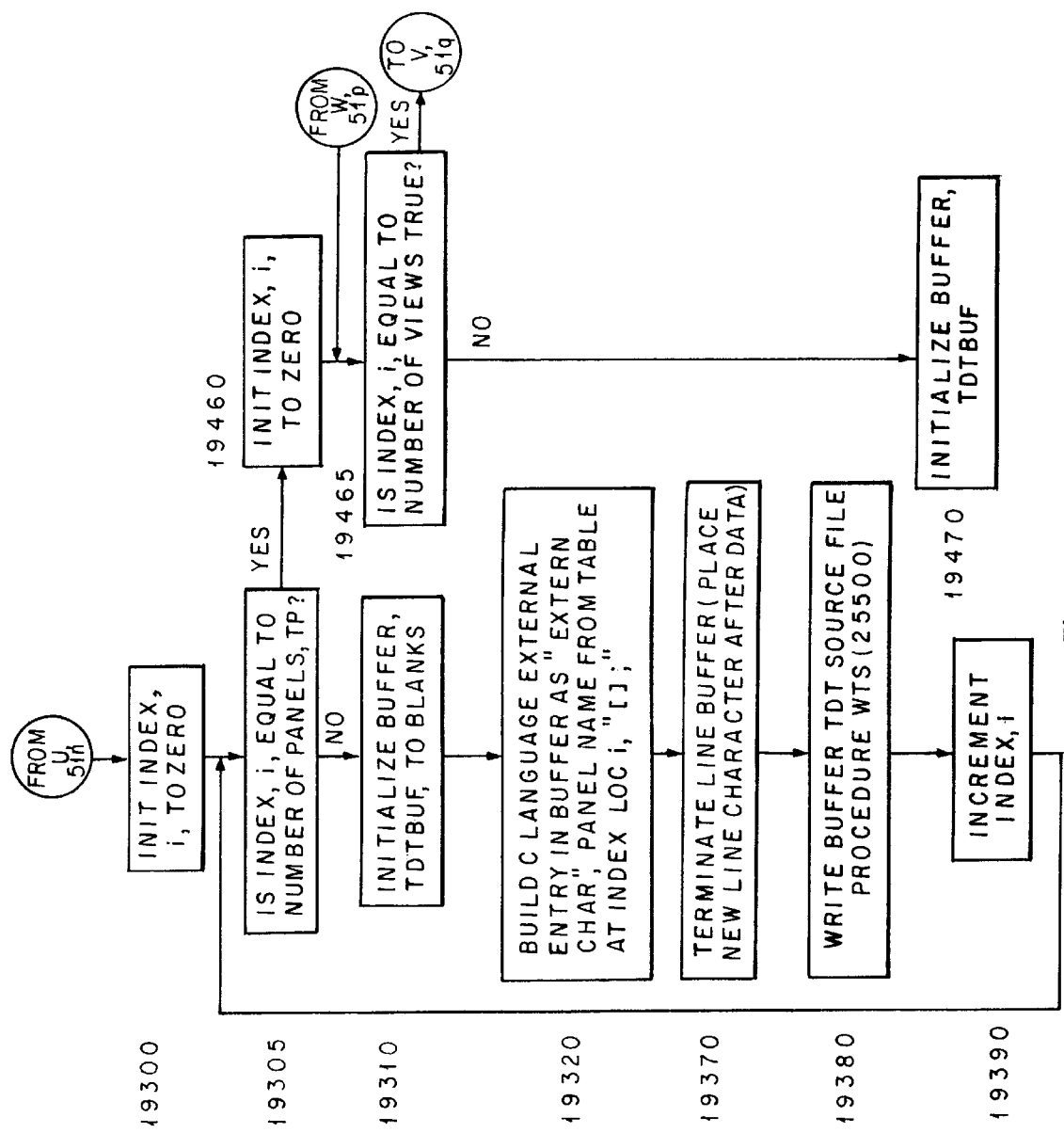
Figure 51Q:
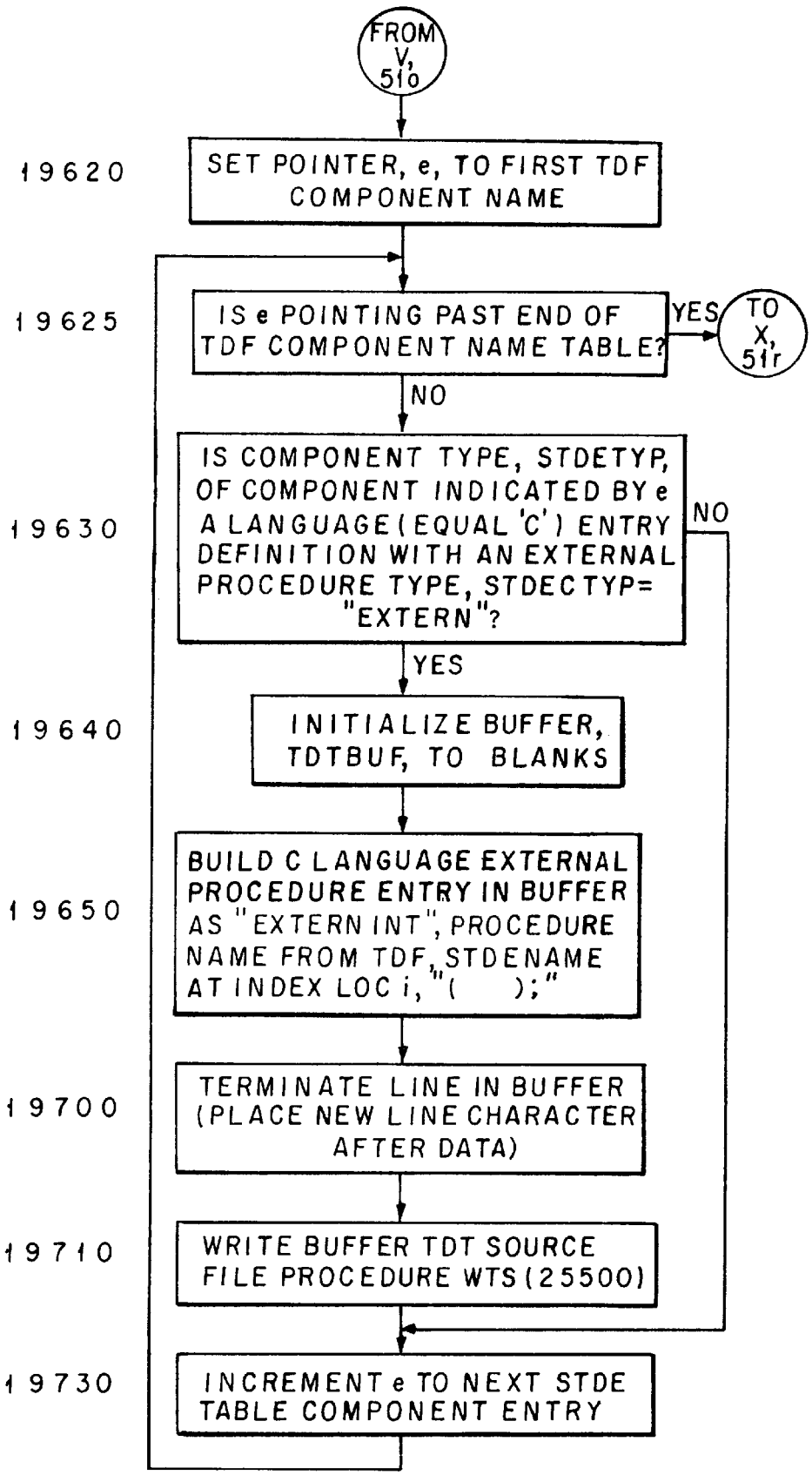
Figure 5L:
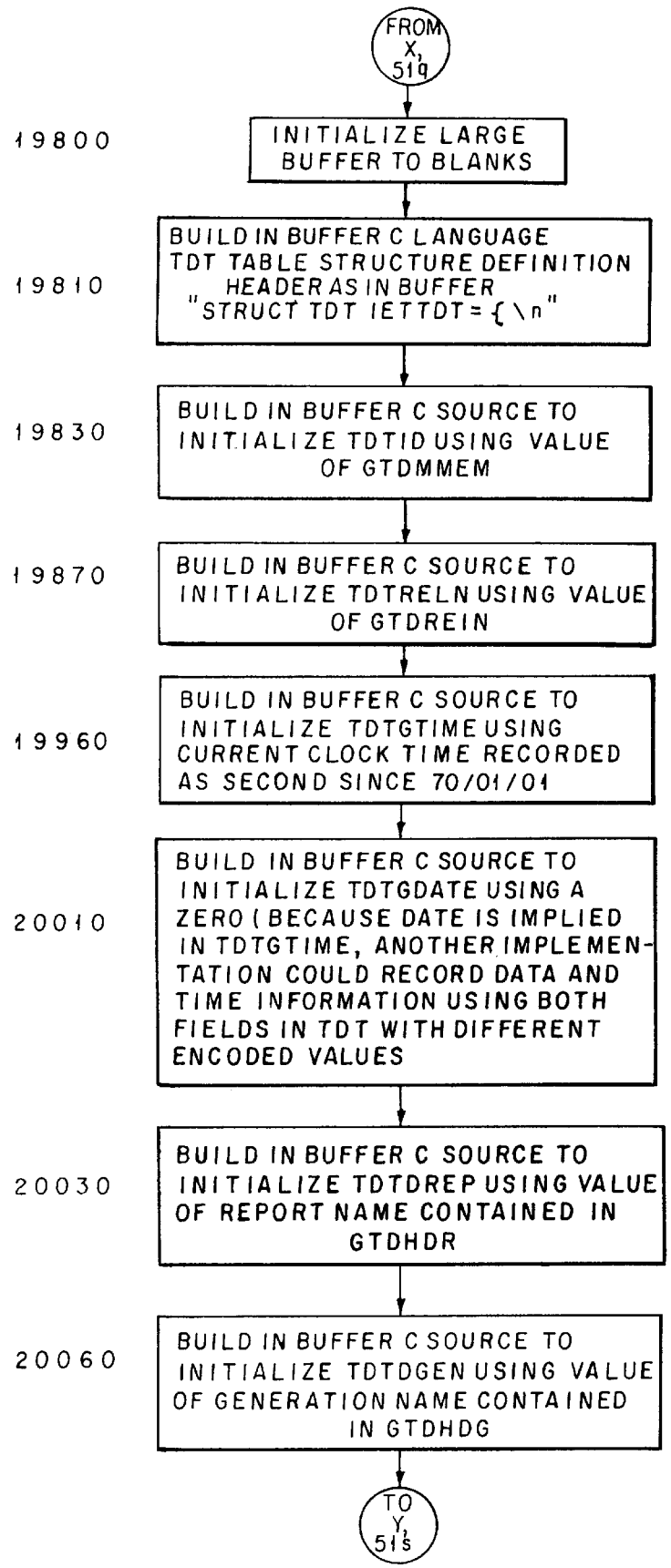
Figure 5:
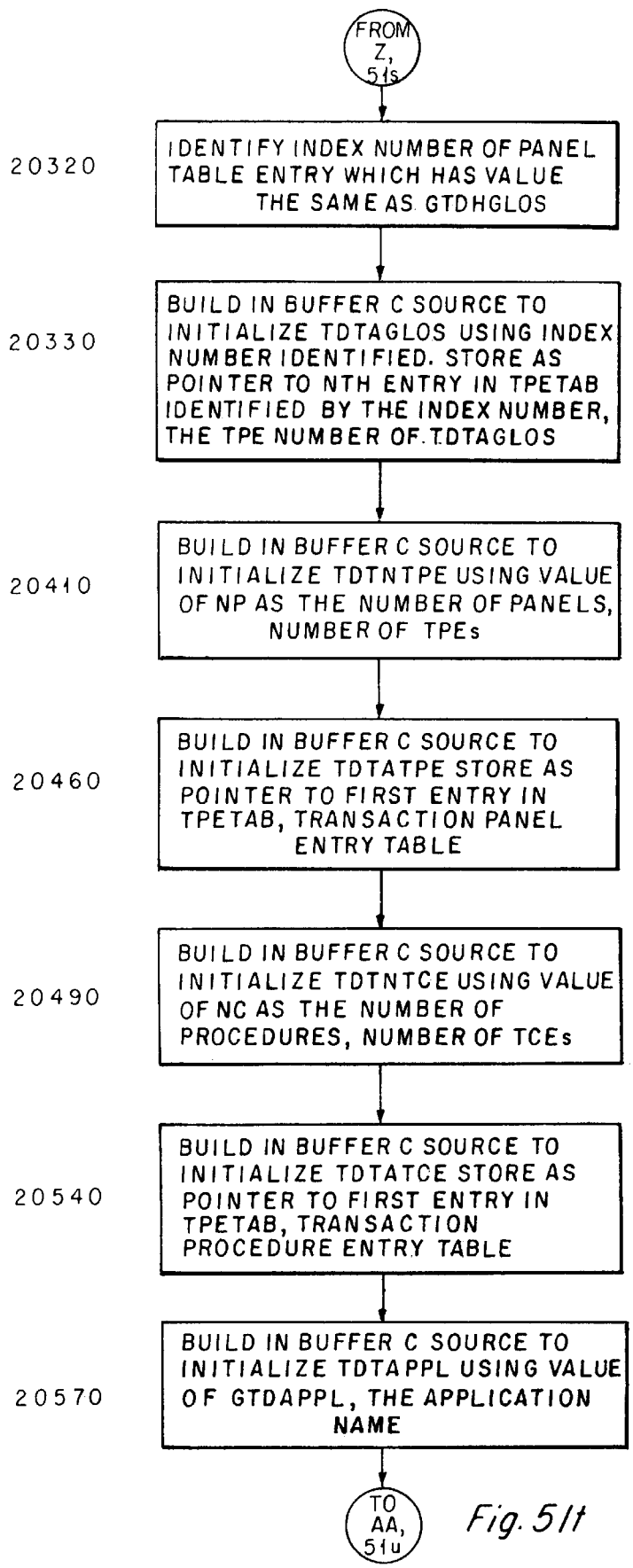
Figure 5L:
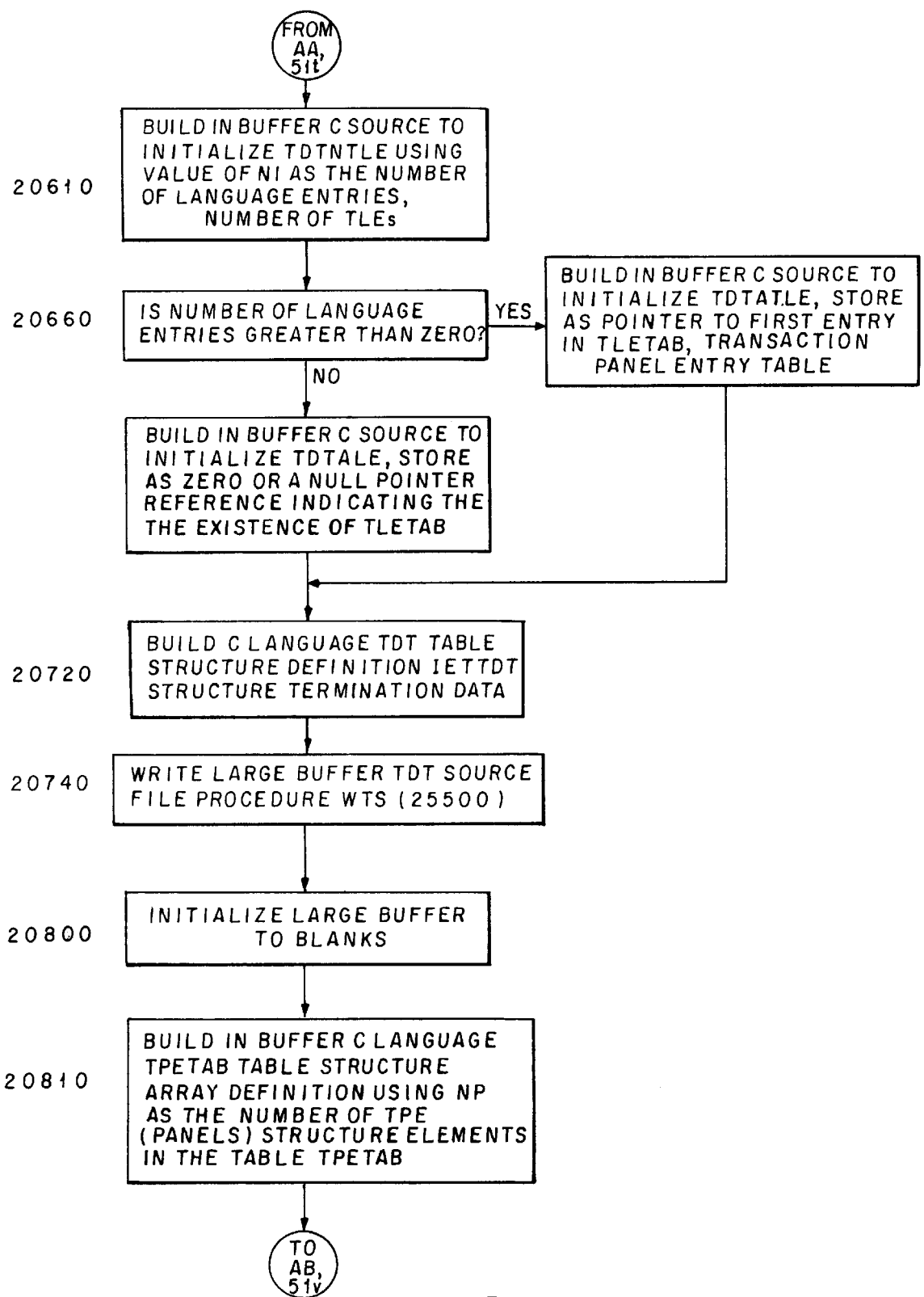
Figure 5L:
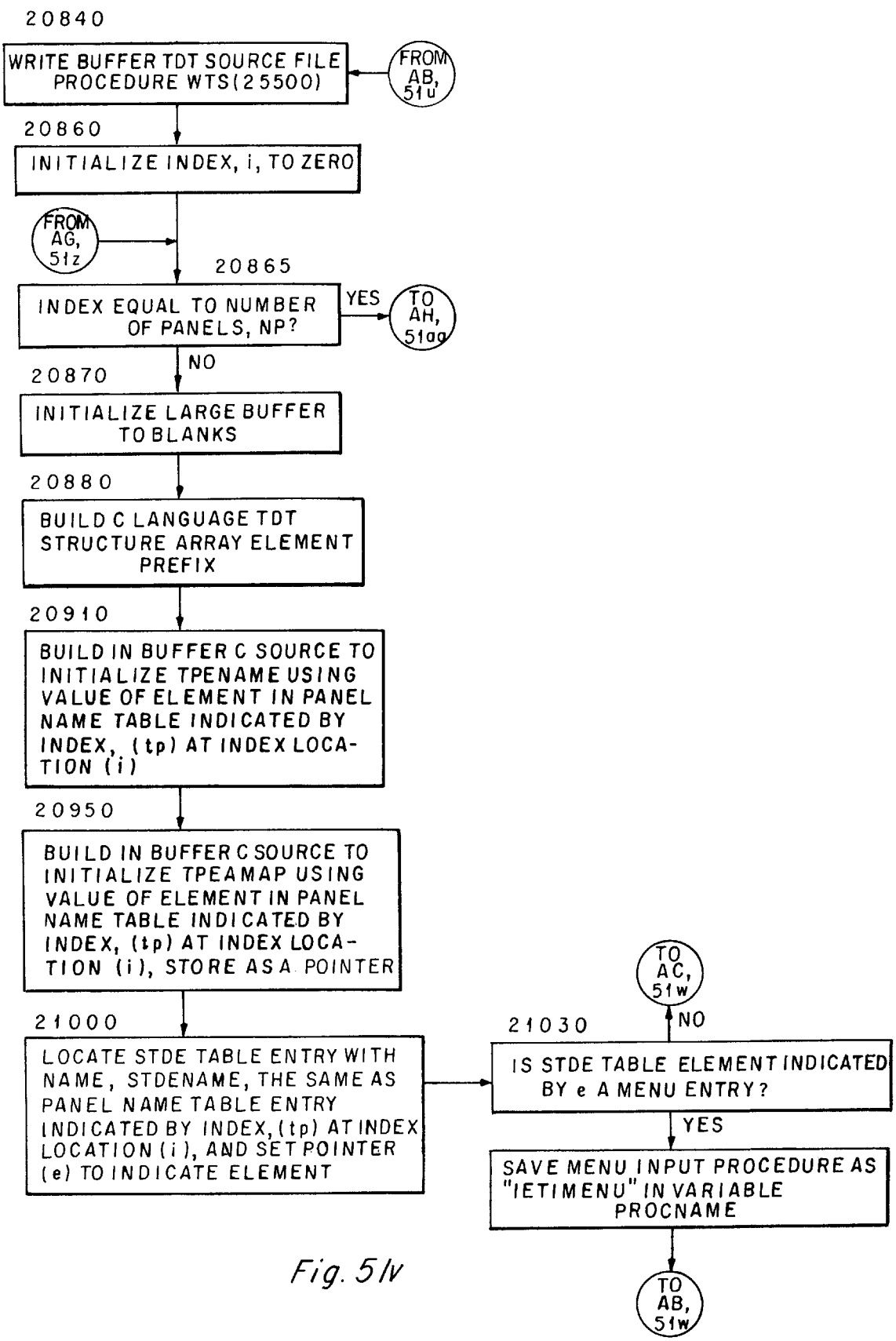
Figure 51W:
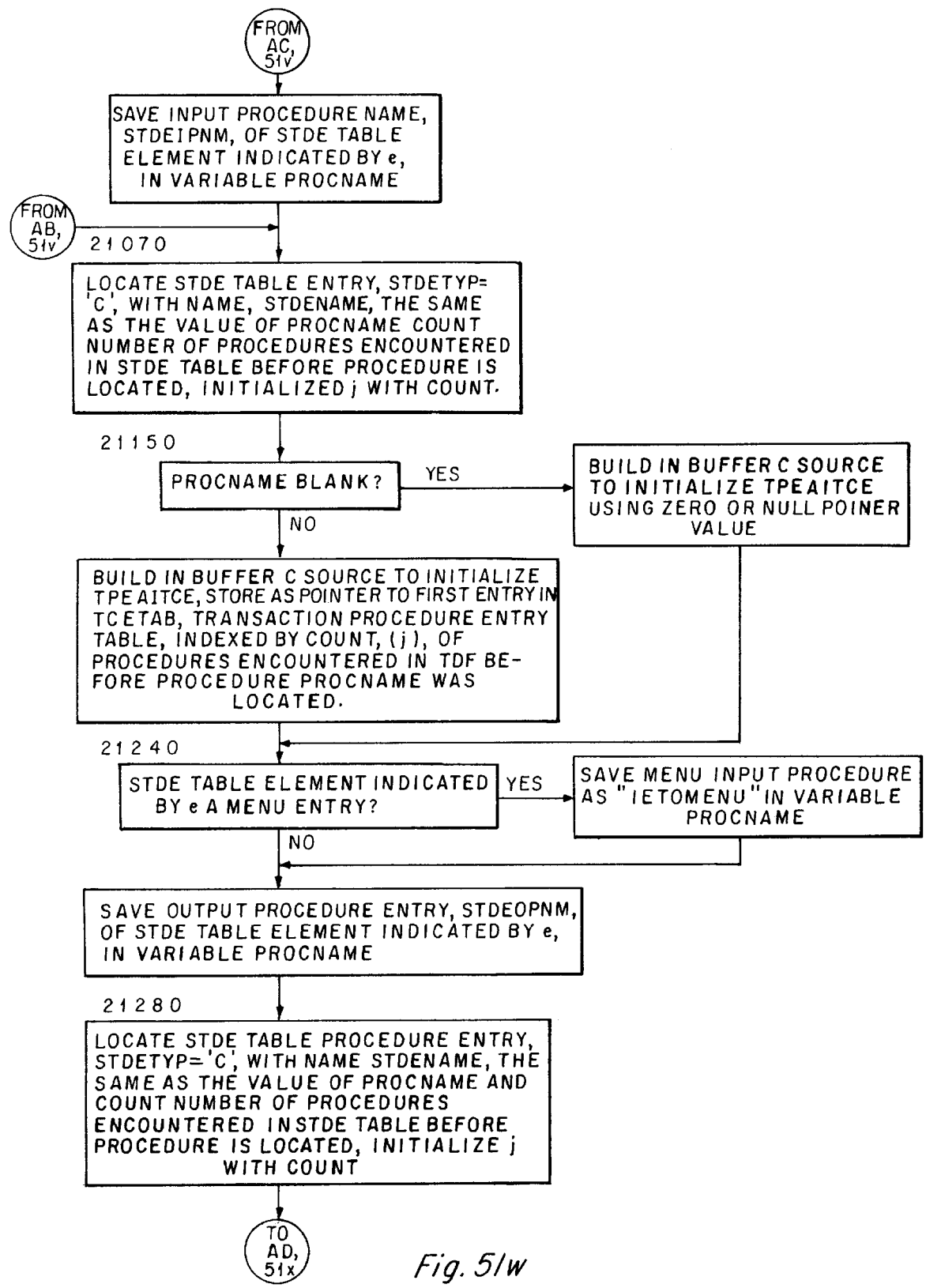
Figure 51X:
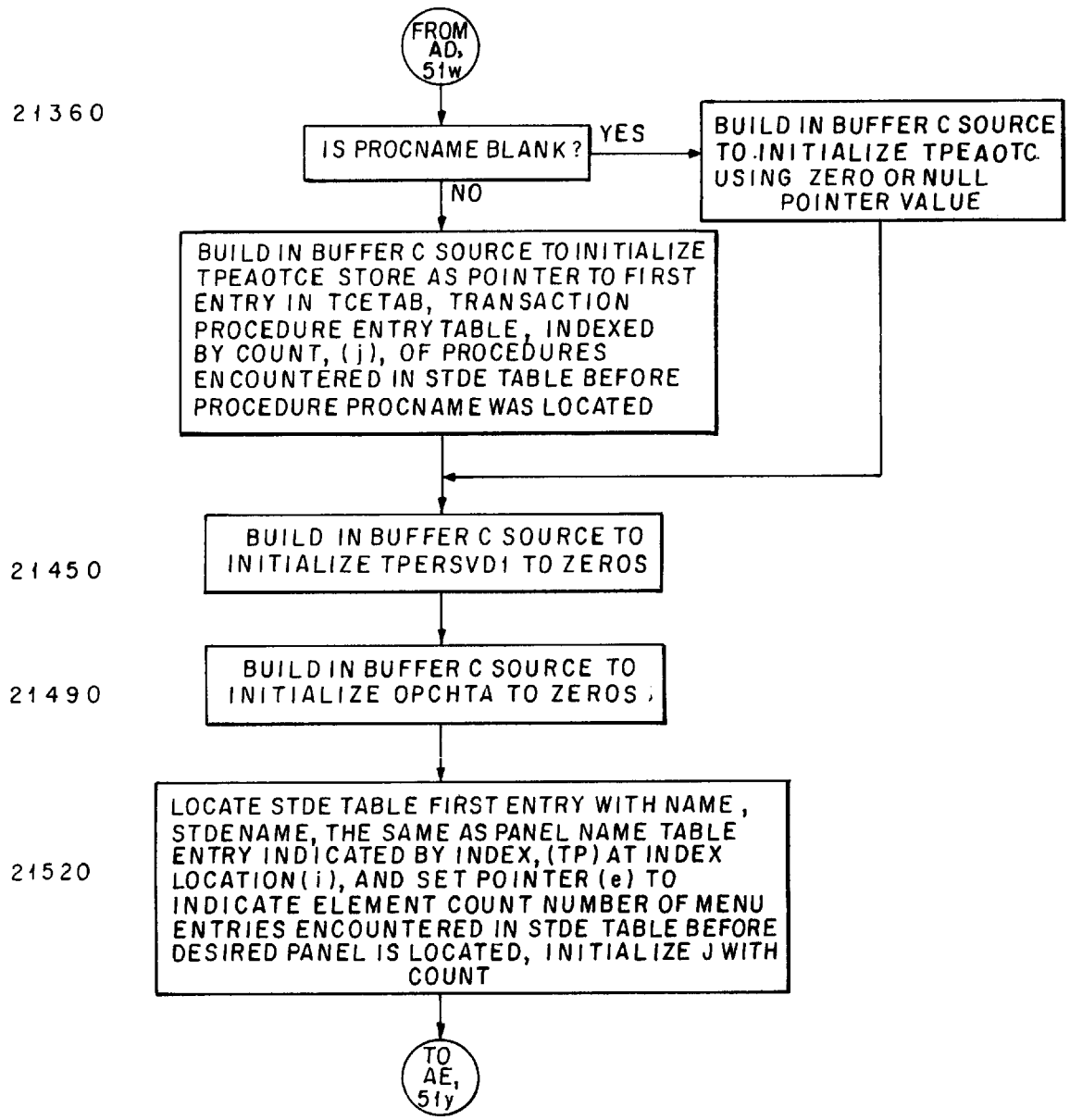
Figure 5L:
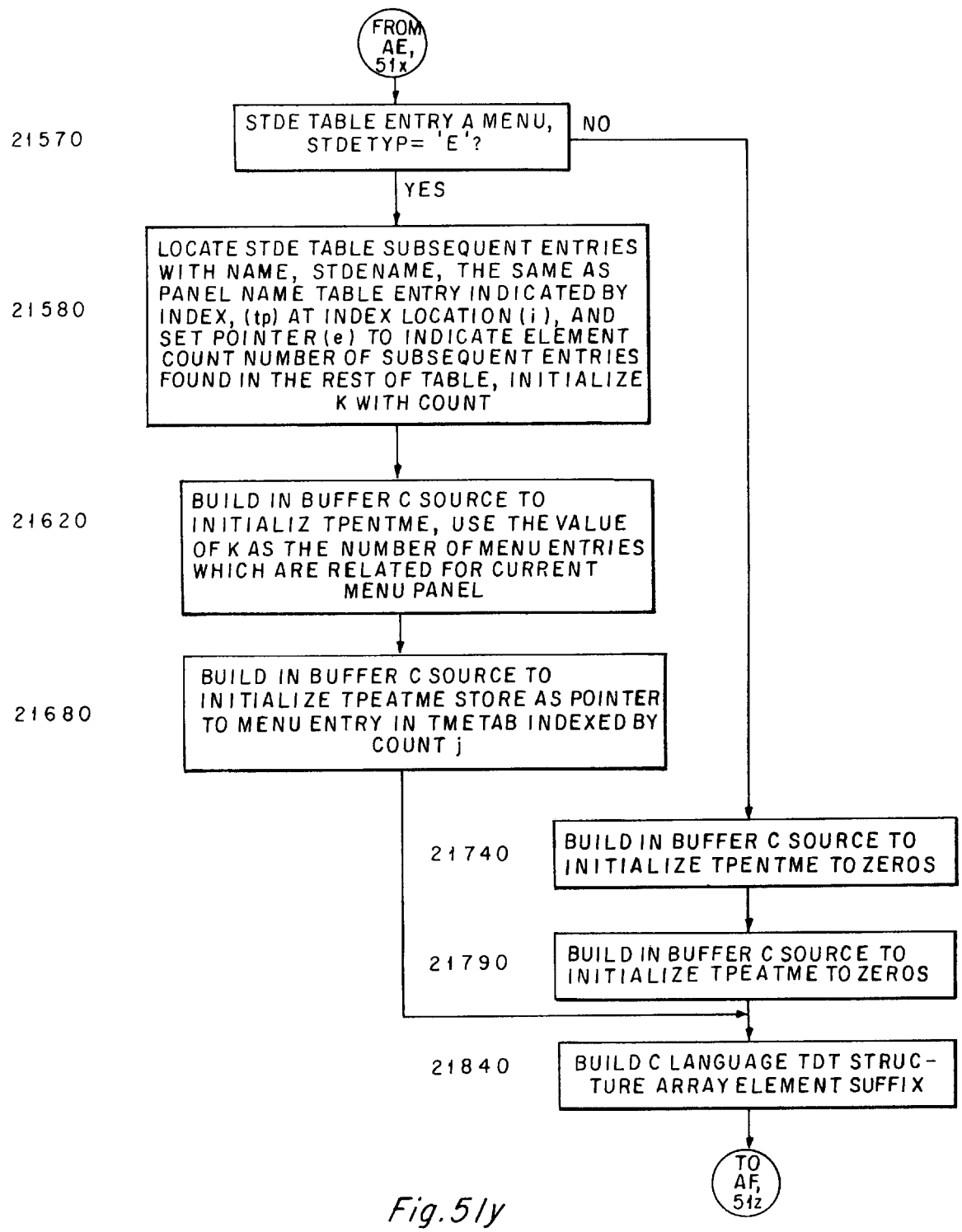
Figure 51B:
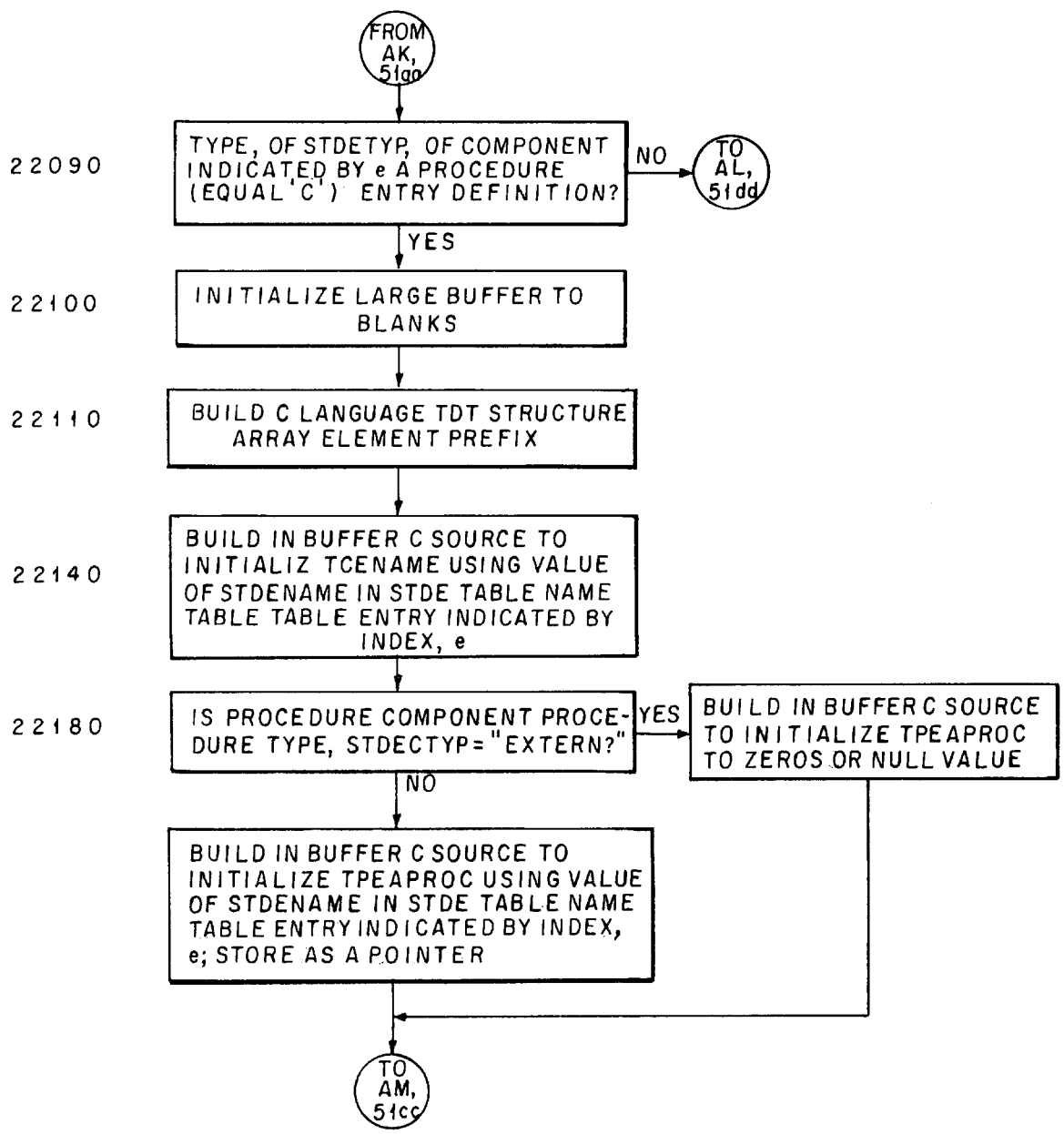
Figure 51C:
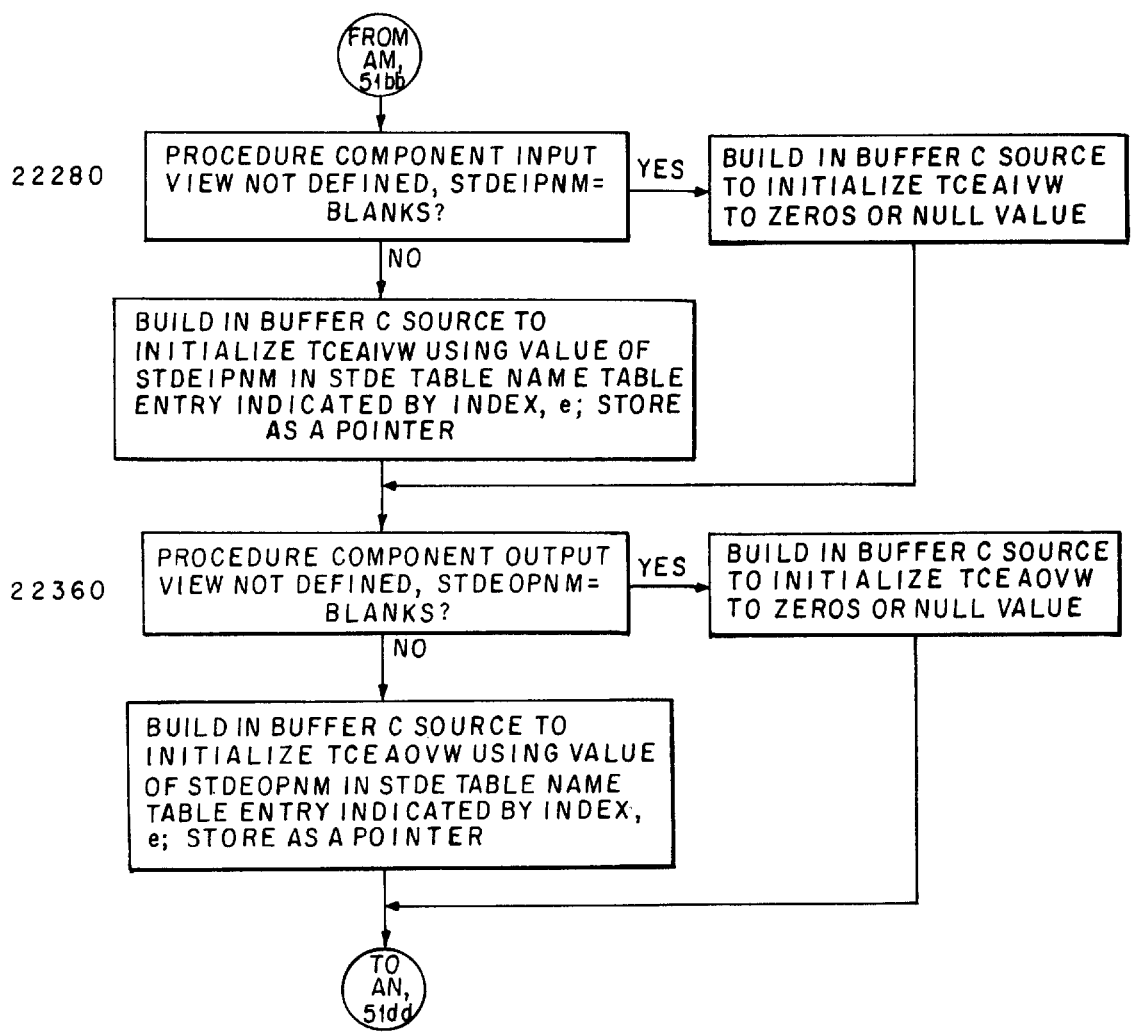
Figure 51D:
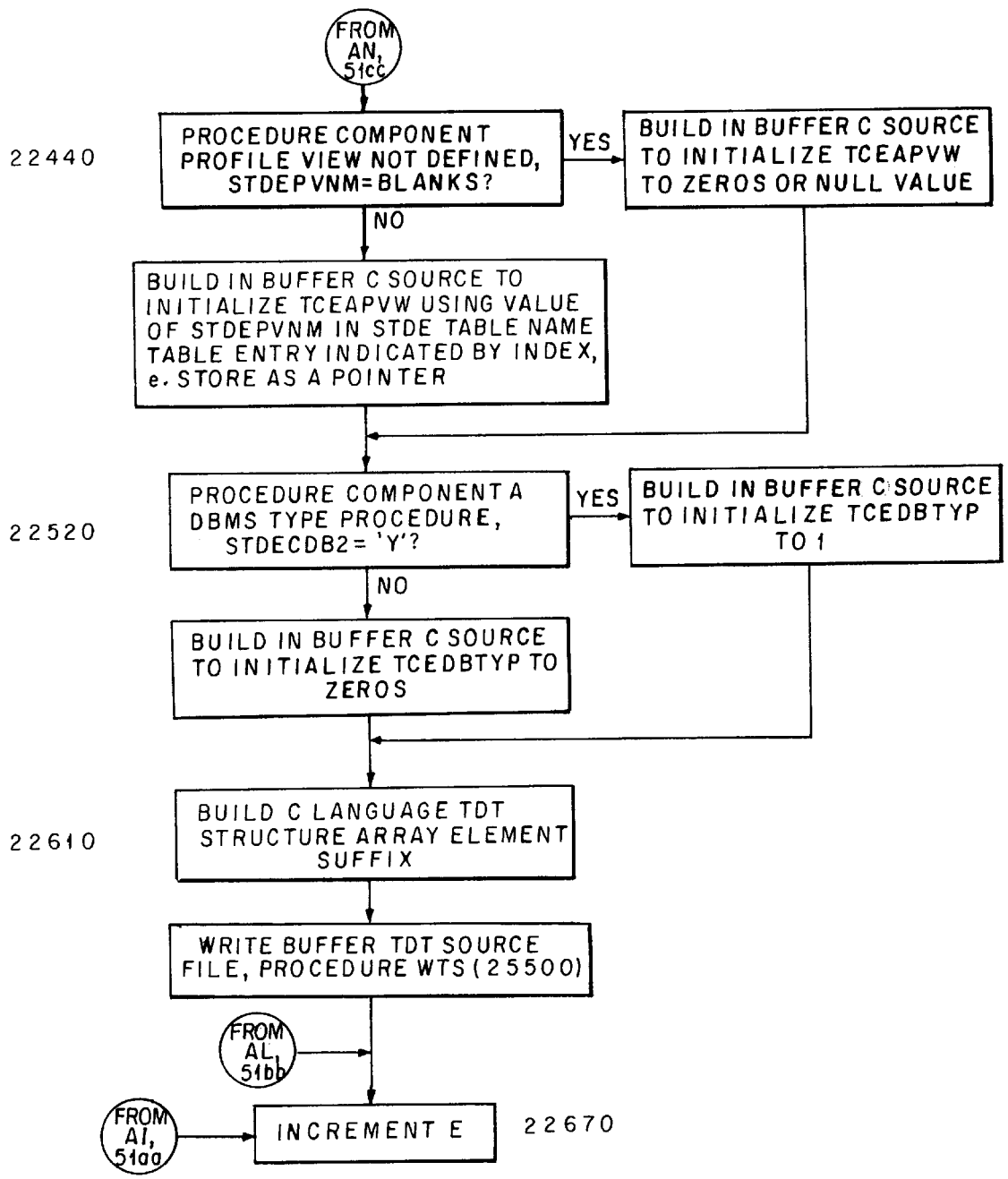
Figure 51E:
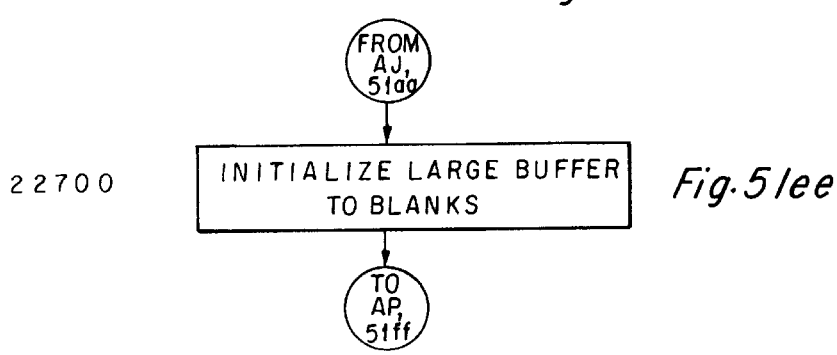
Figure 51F:
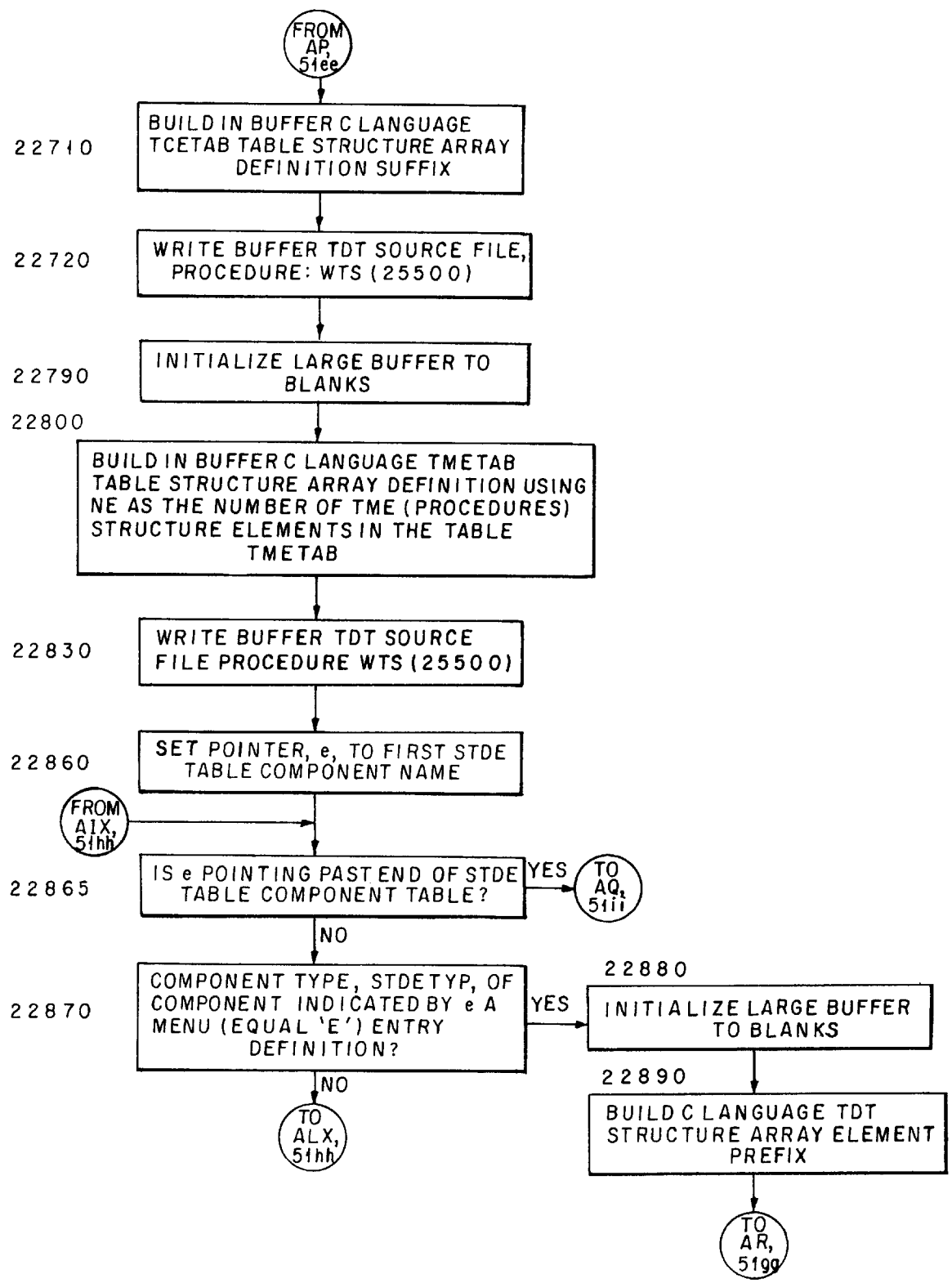
Figure 51G:
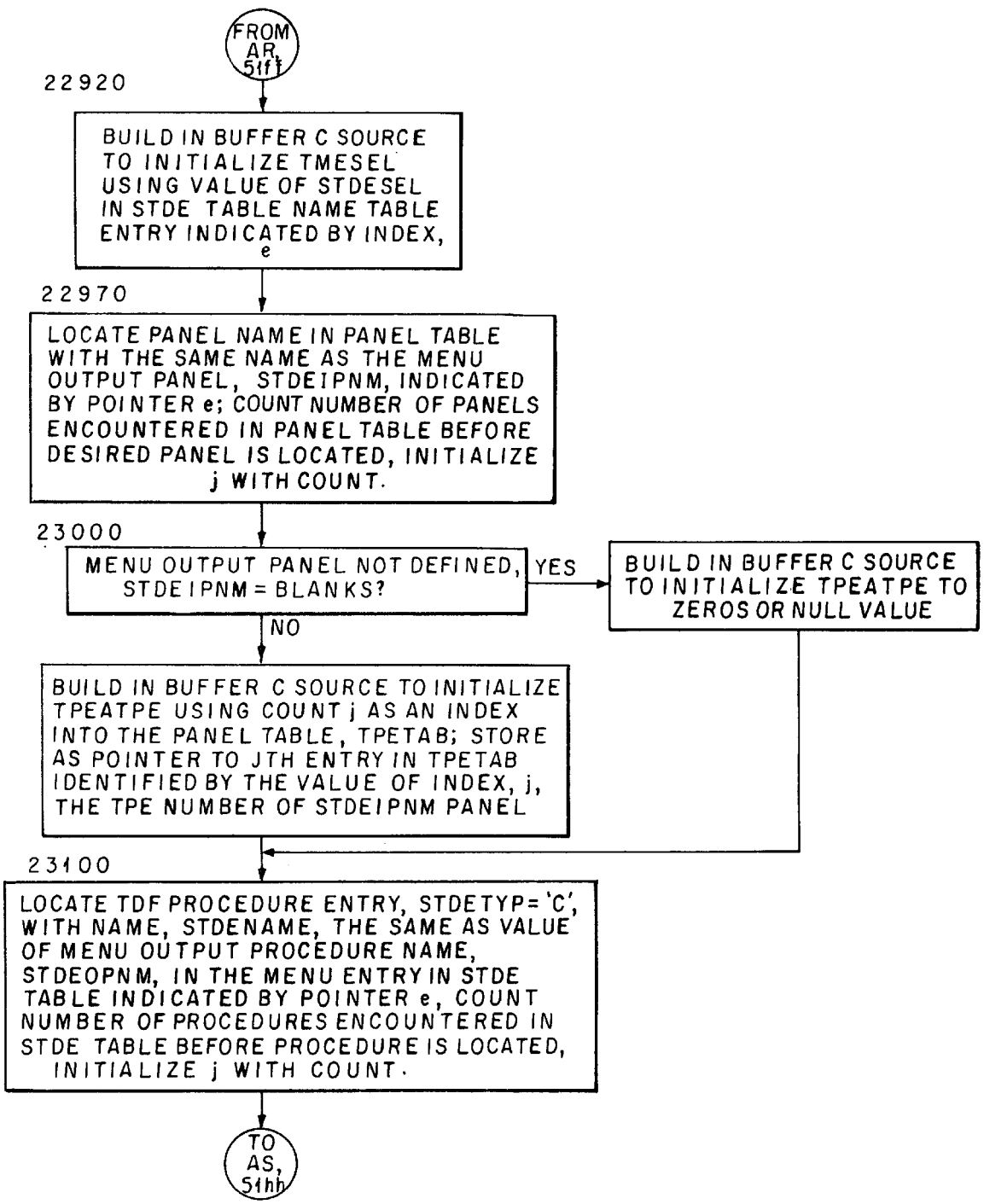
Figure 51J:
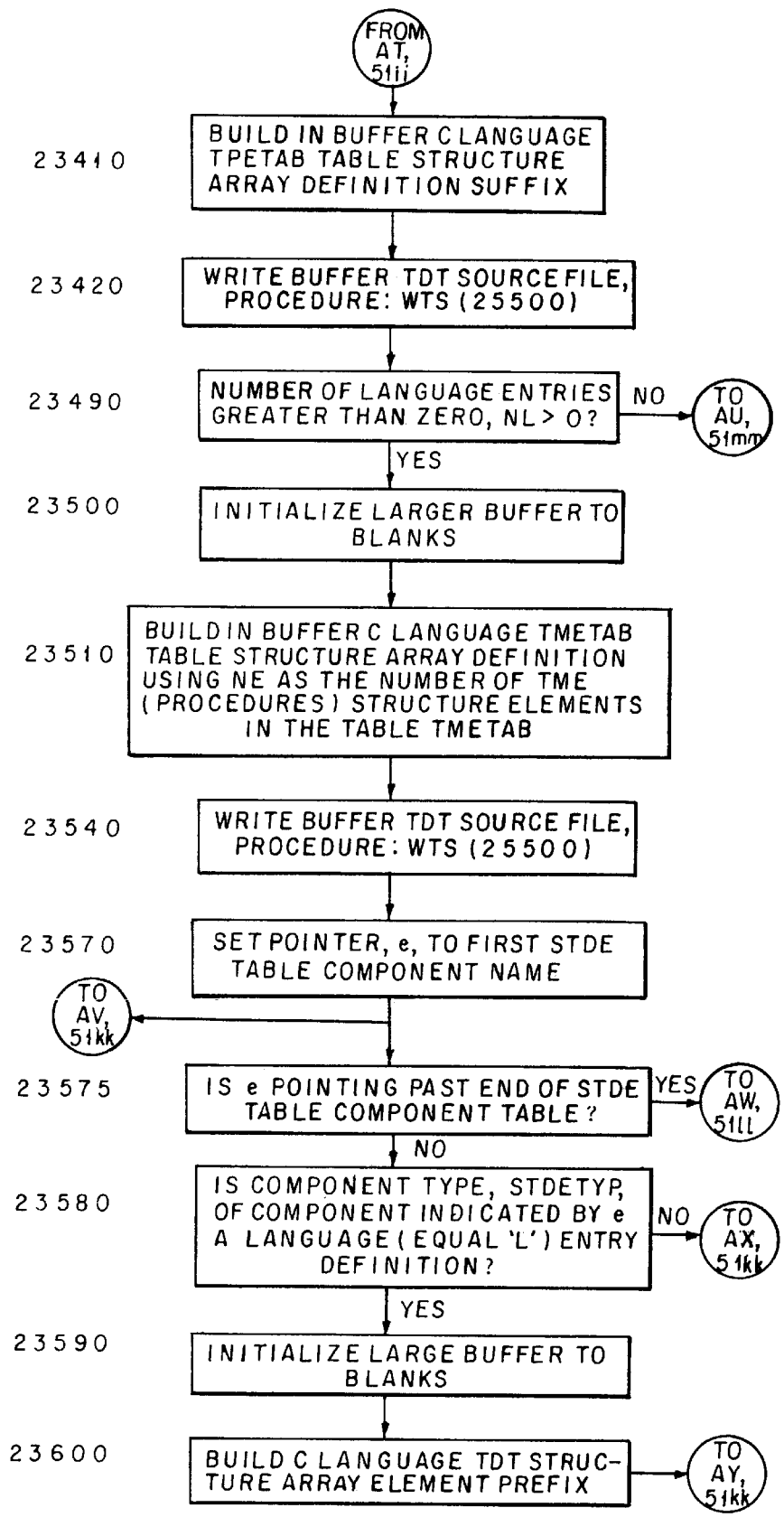
Figure 51M:
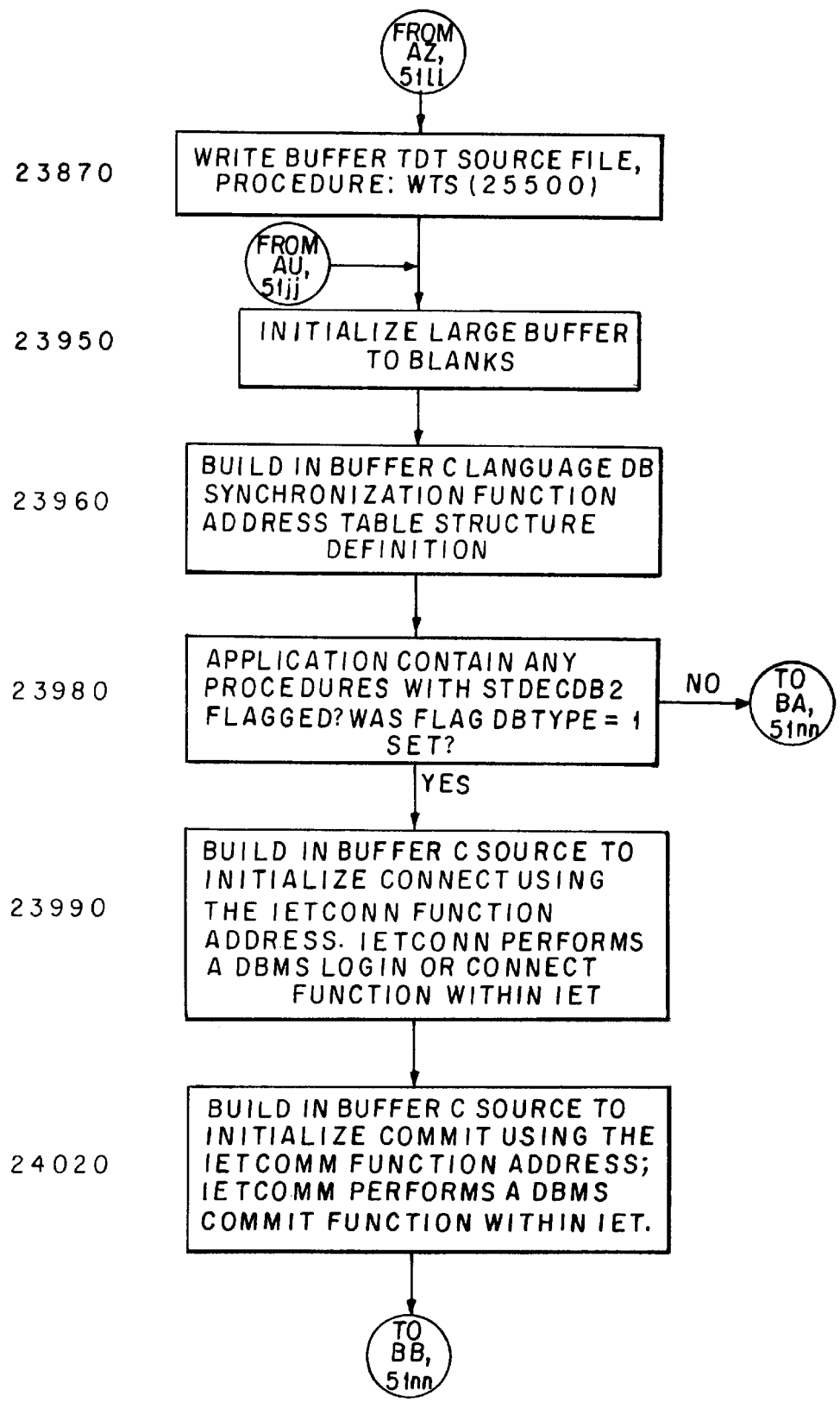
Figure 51N:
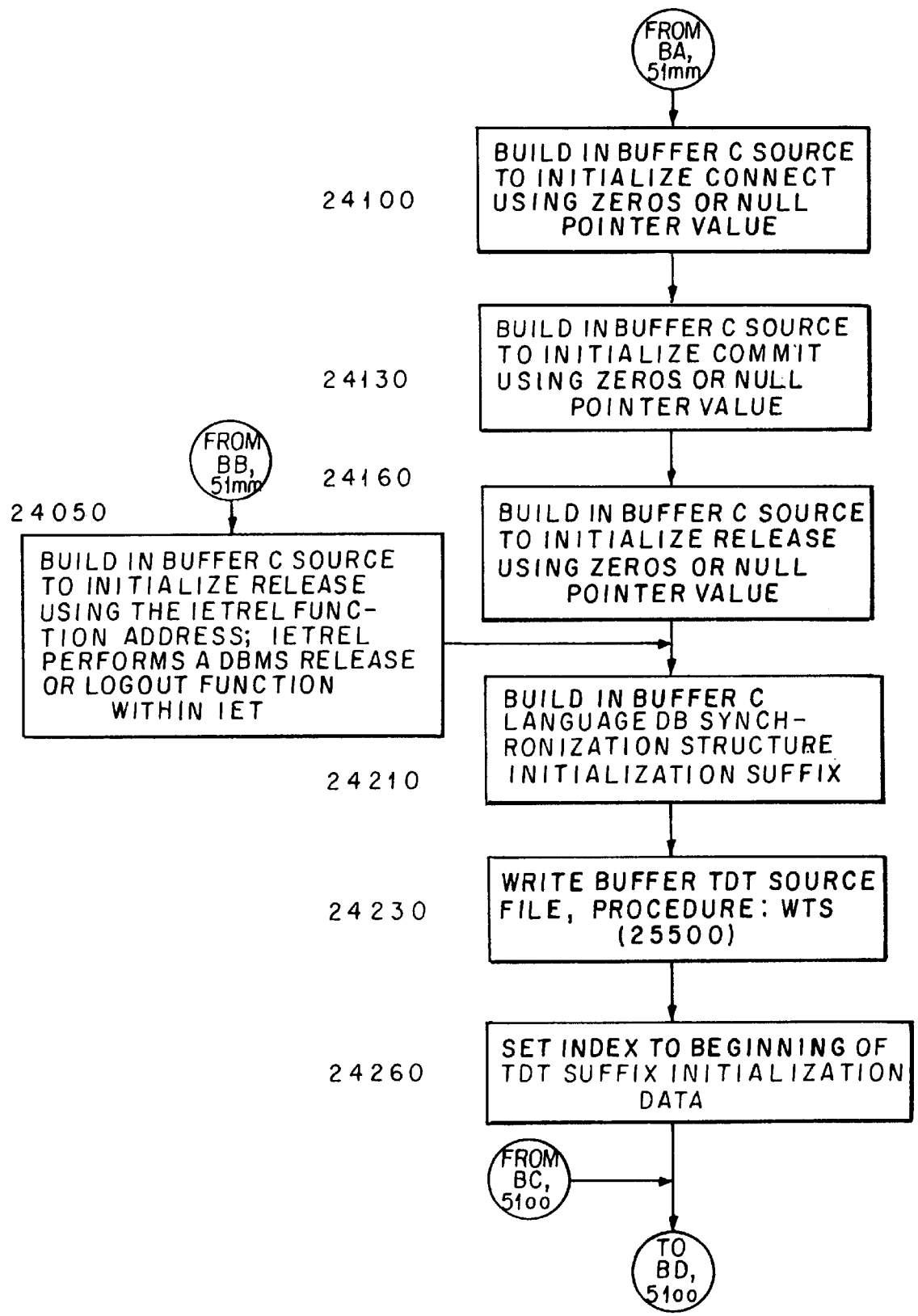

Looking next at FIGS. 51*a–rr*, which depict a flow chart of the preferred embodiment of this procedure according to the present invention, the CT procedure is responsible for building the transaction definition table, TDT object module. This procedure must produce a standard object module that is to be link-edited with IET, application panel maps and procedures to produce an executable transaction. The TDT consists of various separate tables with inter-related pointers that allows IET at execution time to control the dialog between the user and the application code using the application defined maps and menus. In addition to the dialog, IET handles all panel input/output for the application and facilitating the communications from one transaction to a remote transaction via the DAA link and return facility.

In summary, the following table types are constructed by GTD through the CT procedure: TDT anchor block (consists mainly of pointers to other TDT tables); transaction panel entries table, TPETAB, with one TPE per panel; transaction code entries table, TCETAB, with one TCE per referenced executable procedure entry point; transaction menu entries table, TMETAB, with one TME per menu panel; transaction language entries table, TLETAB, with one TLE per language supported; and the data base sync table referencing SQL data base support routine entry points.

Building this TDT object module can be accomplished different ways. On UNIX, the CT procedure, as flow charted here, builds a C language source file that is later compiled by the C compiler to produce a link-editable object module. On MVS a CT version exists that constructs 370 linkable objects modules directly, without the aid of a C compiler.

The CT procedure involves building and compiling the TDT. The TDT is built in the following manner. First the STDE table is inspected to ensure that all the definitions are complete and consistent by determining if any panels or procedures have been left undefined (i.e., without a source file). Then all panels, menus, procedures, languages, and views are counted and a table built containing the names for each type of component. Once all the components are accounted for, a source procedure is built containing source language statements which define the customized TDT information. In the case of the current implementation for UNIX, this source file is built as a C source file. The TDT source generation proceeds by generating a standard source prefix, external name definitions for the panels, views, procedures; generating the TDT, TPETAB, TCETAB, TMETAB, TLETAB, and DB synchronization function address table; and then generating a standard source suffix. The standard source prefix contains files, function prototypes, and external definitions common to all TDT source. The standard source suffix contains a small procedure, DLITCBL, that is called by the transaction sub-system main module upon execution of the transaction. DLITCBL, in turn, calls IET, passing the address of the TDT and any input/output control block passed by the transaction sub-system main module. Once the TDT source file is built, it is compiled using a standard compiler. In the case of an UNIX implementation, a C compiler is used.

The first section of the CT procedure (Blocks 17450–17850) determines if there are any undefined panels (i.e., menu panel references with no corresponding panel defined). It begins by clearing the output file information and rewinding to the beginning of the file (Block 17580). The display area, DNAMEA is blanked out (Block 17630) and the counter for undefined panels is set to zero (Block 17660). Pointer e is set to the first STDE table component name (Block 17670). Decision Block 17675 checks to see if pointer e is past the end of the STDE table. If so, the procedure jumps to Block 17830. If not, Decision Block 17680 checks to see if the component type, STDETYP, of the component indicated by e is equal to 'E', indicating a menu entry definition. If not, the procedure proceeds to Block 17815. If e equals E, the procedure searches the STDE table looking for a component where component name, STENAME, is equal to the panel name referenced by the current menu entry, STDEIPNM, for the menu component indicated by e (Block 17700). If search is successful, the procedure advances to Block 17815.

The panel name, STDEIPNM, is copied to the current position in the display area. DNAMEA, indicated by the number of undefined panels in Block 17770, and the number of undefined panels is incremented by one (Block 17780). In Decision Block 17790, if the number of undefined panels is greater than the maximum number for the error display screen, then the procedure moves to Block 17830. Otherwise, it increments e to the next component (Block 17815) and returns to Block 17675.

Decision Block 17830 checks to see if the number of undefined panels is greater than zero. If not, the procedure moves to Block 17920. If the number is greater than zero, Block 17840 performs the procedure to display a GTDCTE1 panel (FIG. 21, Block 47300), and the CT procedure exits with the error return code set to 4 (Block 17850).

The next section of the CT procedure verifies (Blocks 17920–18480) each panel's procedures. The rule is that every panel must have an input procedure and the name given must match the name of a defined procedure. The panel output procedure is optional, but if present, must match a defined procedure. In addition, menu entries may optionally specify a procedure name and, if present, it must be the name of a defined procedure.

This section of the CT procedure begins at Block 17920 by blanking out the display area, DNAMEA, and setting the counter for undefined procedures, j, to zero (Block 17950). The pointer, e, is set to the first STDE table component name (Block 17960).

Decision Block 17965 checks to see if e is pointing past end of the STDE table. If so, the procedure advances to Block 18460. Next, Decision Block 17970 checks to see if the component type, STDETYP, of the component indicated by e is equal to "p", (indicating a panel entry definition). If e does not equal "p", the procedure continues at Block 18270.

In Block 17990, the program searches the STDE table looking for a procedure entry where STDETYP equals "C" (for component) and where component name, STDENAME, equals the input procedure name referenced by the current panel entry, STDEIPNM for the panel component indicated by e. If the search is successful, the procedure continues to Block 18110.

At this point, if no procedure name was found for the input procedure name specified, the procedure name, STDEIPNM, is copied to the current position in the display area, DNAMEA, indicated by the number of undefined procedures, j (Block 18060). The number of undefined procedures is then incremented (Block 18070). In Decision Block 18080, if the number of undefined procedures is greater than the maximum number for the error display screen, the procedure then jumps to Block 18460.

Decision Block 18110 checks to see if the output procedure name, STDEOPNM, for panel entry, e, is not defined (i.e., contains blanks). If so, the procedure advances to Block 18270.

In Block 18115, the STDE table is searched for a procedure entry where STDETYP equals "C", and where the component name, STDENAME, equals the output procedure name referenced by the current panel entry, STDEOPNM, for the panel component indicated by e. If the search is successful, the procedure continues to Block 18270.

At this point, if no procedure name was found for the output procedure name specified. The procedure name, STEOPNM, is copied to the current position in the display area, DNAMEA, indicated by the number of undefined procedures, j (Block 18220). The number of undefined procedures is then incremented (Block 18230). In Decision Block 18240, if the number of undefined procedures is greater than the maximum number for the error display screen, then the procedure jumps to Block 18460.

Decision Block 18270 checks to see if the component type, STDETYP, of the component indicated by e is equal to an 'E' (indicating a menu entry definition). If not, the procedure advances to Block 18450.

Decision Block 18290 checks to see if the output procedure name, STDEOPNM, for menu entry, e, is not defined (i.e., contains blanks). If so, the procedure jumps to Block 18450.

In Block 18300, the STDE table is searched for a procedure entry, STDETYP, that equals the output procedure referenced by the current panel entry, STDEOPNM, for the panel component indicated by e. If the search is successful, the procedure continues at Block 18450.

At this point, if no procedure name was found for the menu procedure name specified, the procedure name, STDEOPNM, is copied to the current position in the display area, DNAMEA, indicated by the number of undefined procedures, j (Block 18400). The number of undefined procedures is then incremented (Block 18410). In decision Block 18420, if the number of undefined procedures is greater than the maximum number for the error display screen, the procedure jumps to Block 18460. Otherwise the procedure increments e to the next component (Block 18450), and returns to Block 17965.

Decision Block 18460 checks to see if the number of undefined procedures is greater than zero. If not, the procedure continues at Block 18570. If so, Block 18470 performs the procedure to display a GTDCTE2 panel (FIG. 21, Block 47300), and the CT procedure exits with an error return code set to 4 (Block 18480).

During Blocks 18570–18980, a pass is made through the STDE table to count panels, menus, procedures and views. In addition, if a panel or menu is found, its name is stored alphabetically in a master table, TP, and duplicates are ignored. If a procedure is found marked as a relational data base process, a global flag, dbtype, is set to true. And lastly, each defined view name for a given procedure is added to the master table, TV.

This section begins by zeroing out each counter: NP for panels, NC for procedures, NL for languages, NV for views, and NM menu components or entries in STDE table. The DBMS procedure found flag is initialized to zero (Block 18630), the panel table, TP is blanked (Block 18660), and the pointer, e, is set to the first STDE table component name (Block 18700).

Decision Block 18705 then checks to see if e is pointing past the end of the STDE table. If so, the procedure jumps to Block 19040. Otherwise, Decision Block 18710 checks to see if the component type, STDETYP, of the component indicated by e is equal to "P" (panel) or "E" (menu). If e is not equal to either, the procedure proceeds to Block 18850.

Block 18720 finds the panel table location in which to place to name, STDENAME. The table is built in an ascending sorted manner. In Decision Block 18770, if the name, STDENAME, is already contained at the location found, the procedure jumps to Block 18850. Otherwise, it moves panel table entries over to make room for the new name (Block 18780), and put the new entry, STDENAME, in the panel table at the location found (Block 18810). Then the panel count, NP, is incremented, (Block 18820).

Decision Block 18850 checks to see if the component type, STDETYP, of the component indicated by e is equal to a 'c' (indicating a procedure entry definition). If it is not, the procedure continues at Block 189960, where the procedure counter, NC is incremented (Block 18860). In Decision Block 18880, if the procedure has STDECDB2 equal to 'Y' (to use the application DBMS), then procedure sets DBTYPE equal to '1', indicating an application that uses DBMS has been found (Block 18900).

Figure 52A:
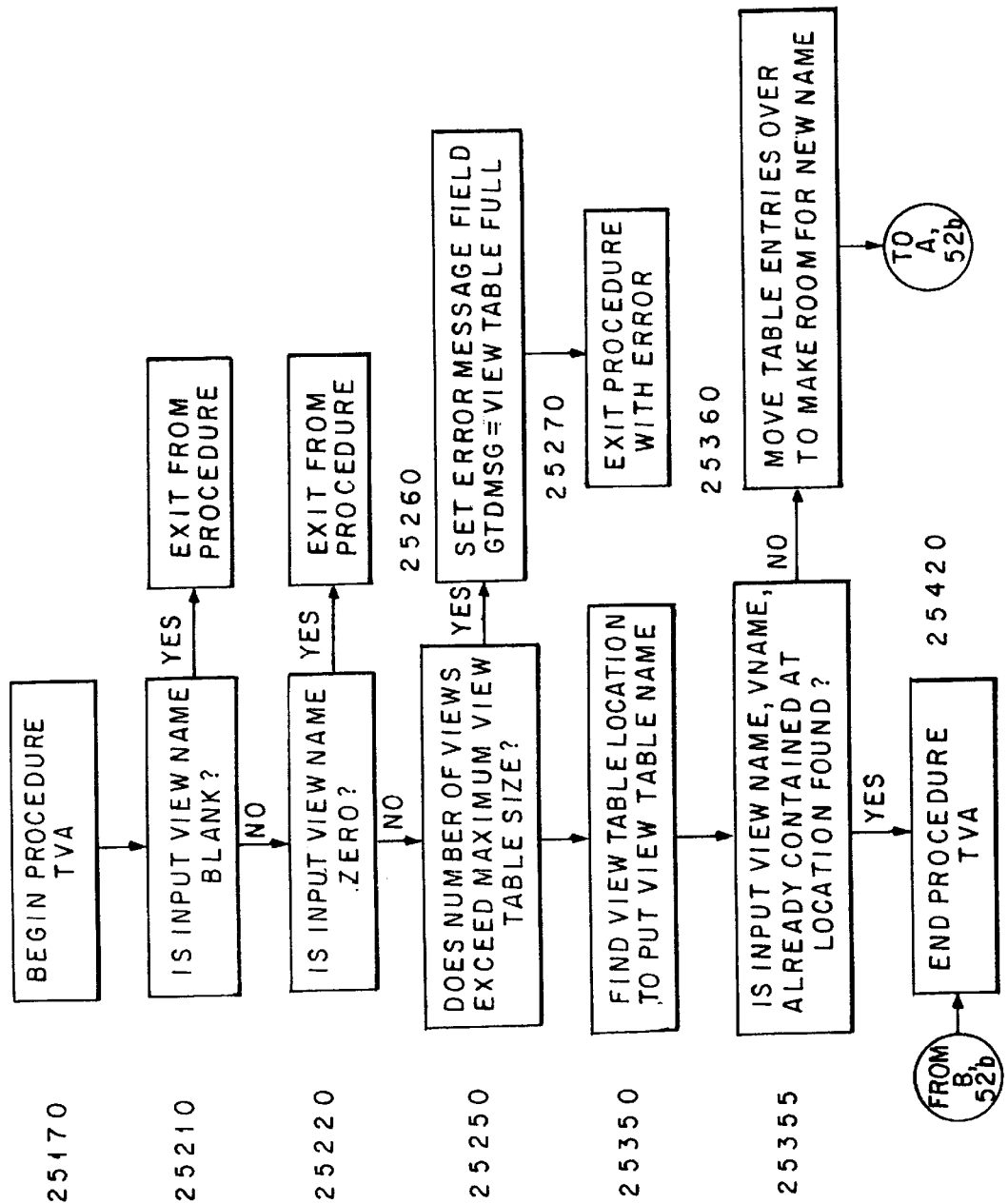
FIGS. 52*a–b* are a flow chart depicting the add view name to table (TVA) procedure according to the preferred embodiment of the present invention.
Figure 52B:
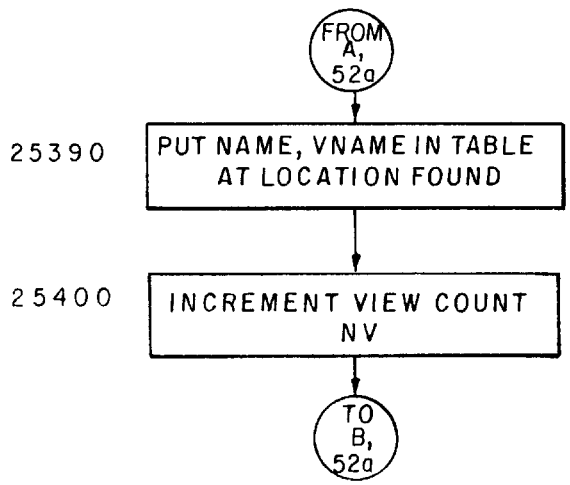

Block 18920 adds a view name to the table (FIG. 52, Block 25170) by using the TVA procedure for the current procedure entry input view name STDEIPNM (Block 18920). Decision Block 18925 checks to see if the view was successfully added to view table. If not, the program exits the CT procedure with an error return code.

The CT procedure executes the add view name to table (FIG. 52, Block 25170) TVA procedure for the current procedure entry output view name STDEOPNM (Block 18930). Decision Block 18935 then checks to see if the view was successfully added to view table. If not, the program exits the CT procedure with an error return code.

The CT procedure executes the add view name to table (FIG. 52, Block 25170) TVA procedure for the current procedure entry output view name STDEOPNM (Block 18930). Decision Block 18935 then checks to see if the view was successfully added to view table. If not, the program exits the CT procedure with an error return code.

The CT procedure then executes the add view name to table (FIG. 52, Block 25170) TVA procedure again, this time for the current procedure entry profile view name STDEPVNM (Block 18940). Decision Block 18945 checks to see if the view was successfully added to view table. If not, the program exits the CT procedure with an error return code.

Decision Block 18960 checks to see if the component type, STDETYP, of the component indicated by e is equal to an 'L' (indicating a language entry definition). If so, the language counter, NL, is incremented. Decision Block 18970 checks then to see if the component type, STDETYP, of the component indicated by e is equal to an "E" (indicating a menu entry definition). If so, the menu counter, NE, is incremented. At Block 18980, the procedure increments pointer e to the next STDE table component entry and then jumps to Block 18705.

The next CT procedure section (Blocks 19040–19230), opens the output file for the TDT "C" source statements that are to be compiled later into the TDT object module. The file name is consist with the user-specified source library name, plus the TDT name, plus the extension of ".c". Finally, the source prefix is written to the beginning of the file. This prefix consists of the C statement necessary to compile the table, such as "includes" and "extern" statements.

Specifically, Block 19040 builds the TDT C source name with pathname; gtdslib, filename: gtdmmem, UNIX extension: .c, and opens the TDT C source file for create and write only options (Block 19100). In Decision Block 19101, if the open is unsuccessful, the program exits the CT procedure with an error return code.

Block 19150 sets the index to the beginning of the TDT prefix initialization data. Decision Block 19160 checks to see if this is the last line of prefix initialization data. If so, the procedure moves to Block 19130.

At Block 19190, the line of TDT prefix is copied into the output buffer, and the line in the buffer is terminated by placing a new line character after the data (Block 19210). In Block 19220, the write buffer TDT source file WTS procedure (FIG. 53, Block 25500) is performed. At this point, the procedure increments the index (Block 19230) and jumps to Block 19160.

The next CT procedure portion (Blocks 19300 through 19730) generates the C extern definitions for the panels, views, and tables. Since each of these items is actually defined in another object module, the CT procedure must declare the names of these items to be external so that references to them by pointers in the to-be-generated TDT can be resolved at link-edit time.

This section begins by zeroing out the index, i, at Block 19300. In Decision Block 19305, if index i, is equal to the number of panels, TP, then the procedure jumps to Block 19460.

Figure 53:
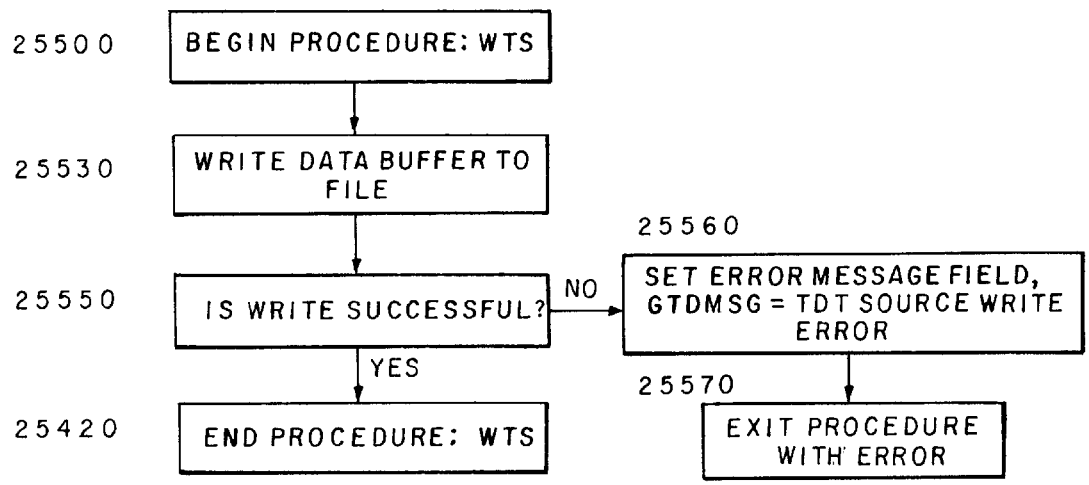
FIG. 53 is a flow chart depicting the write buffer to file (WTS) procedure according to the preferred embodiment of the present invention.
Figure 54A:
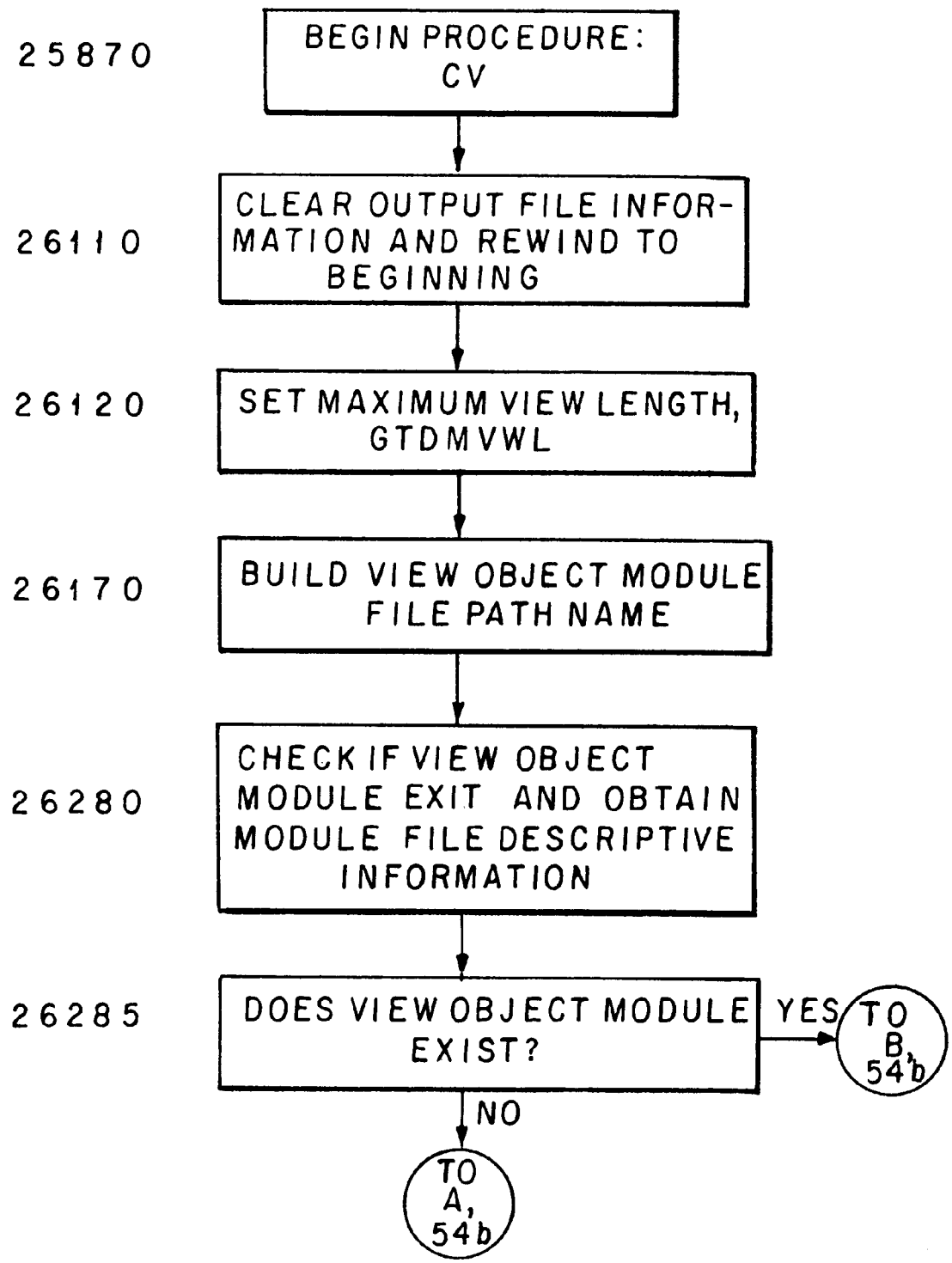
FIGS. 54*a–mm* are a flow chart depicting the compile view (CV) procedure according to the preferred embodiment of the present invention.
Figure 54B:
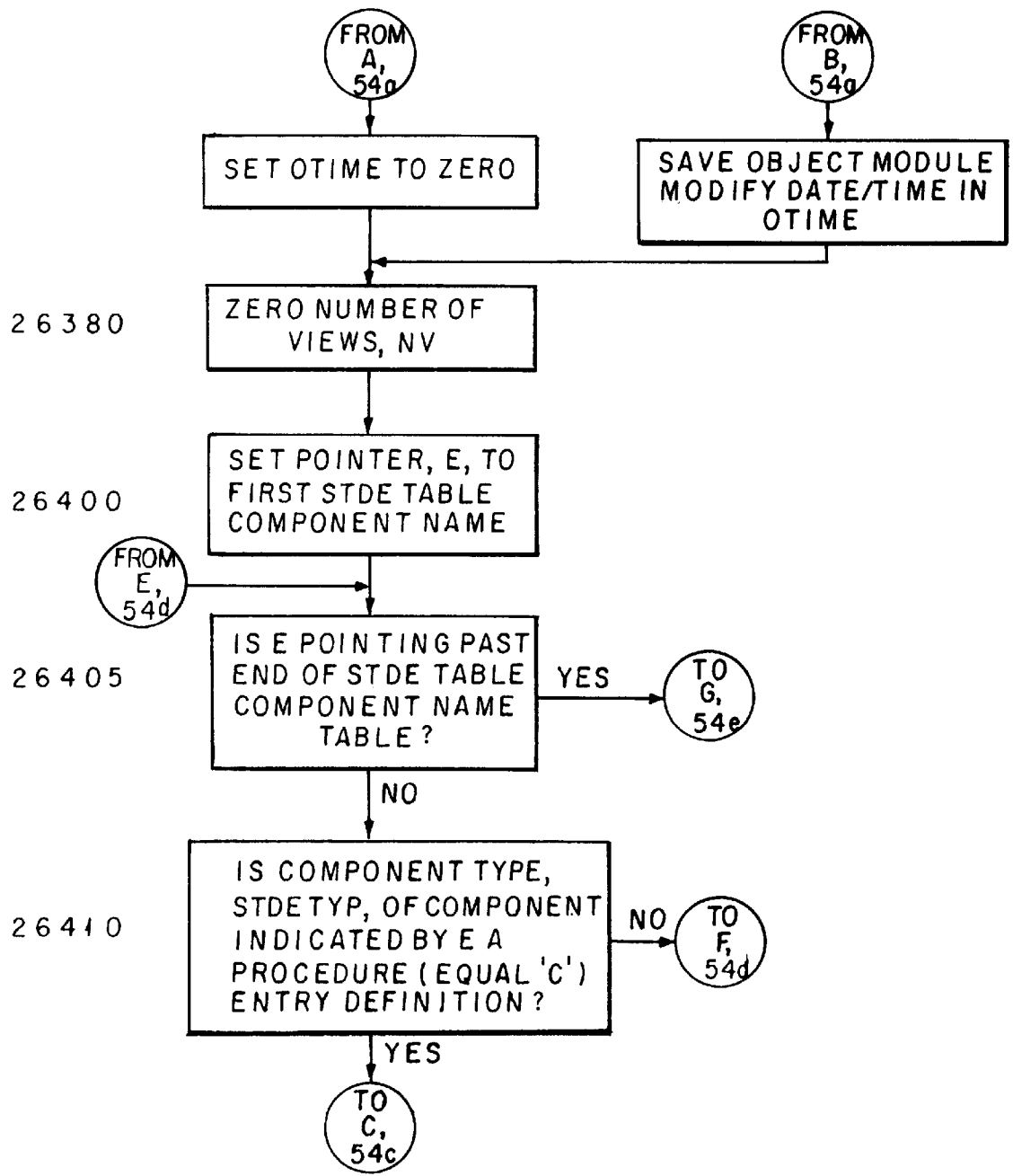
Figure 54C:
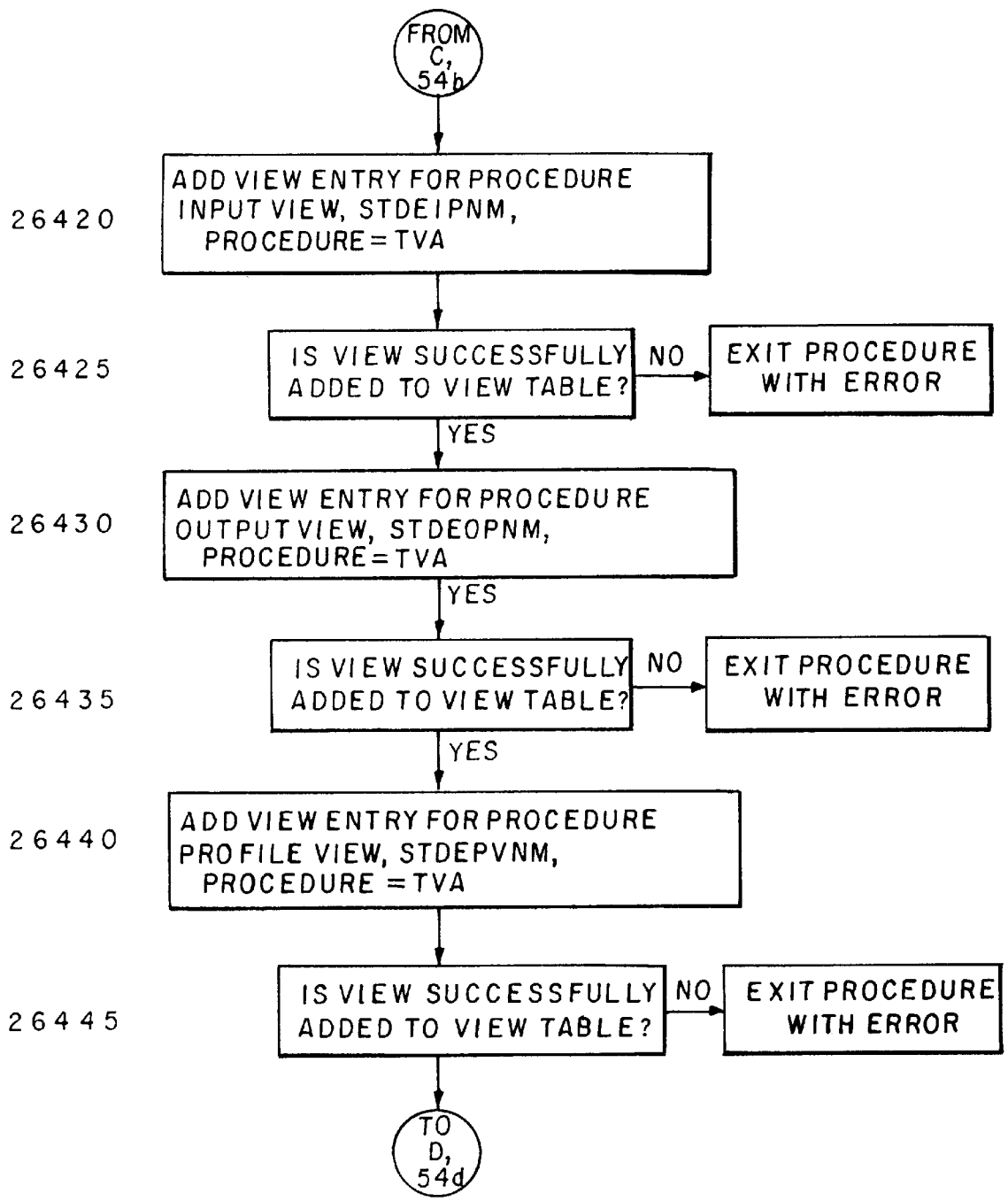
Figure 54F:
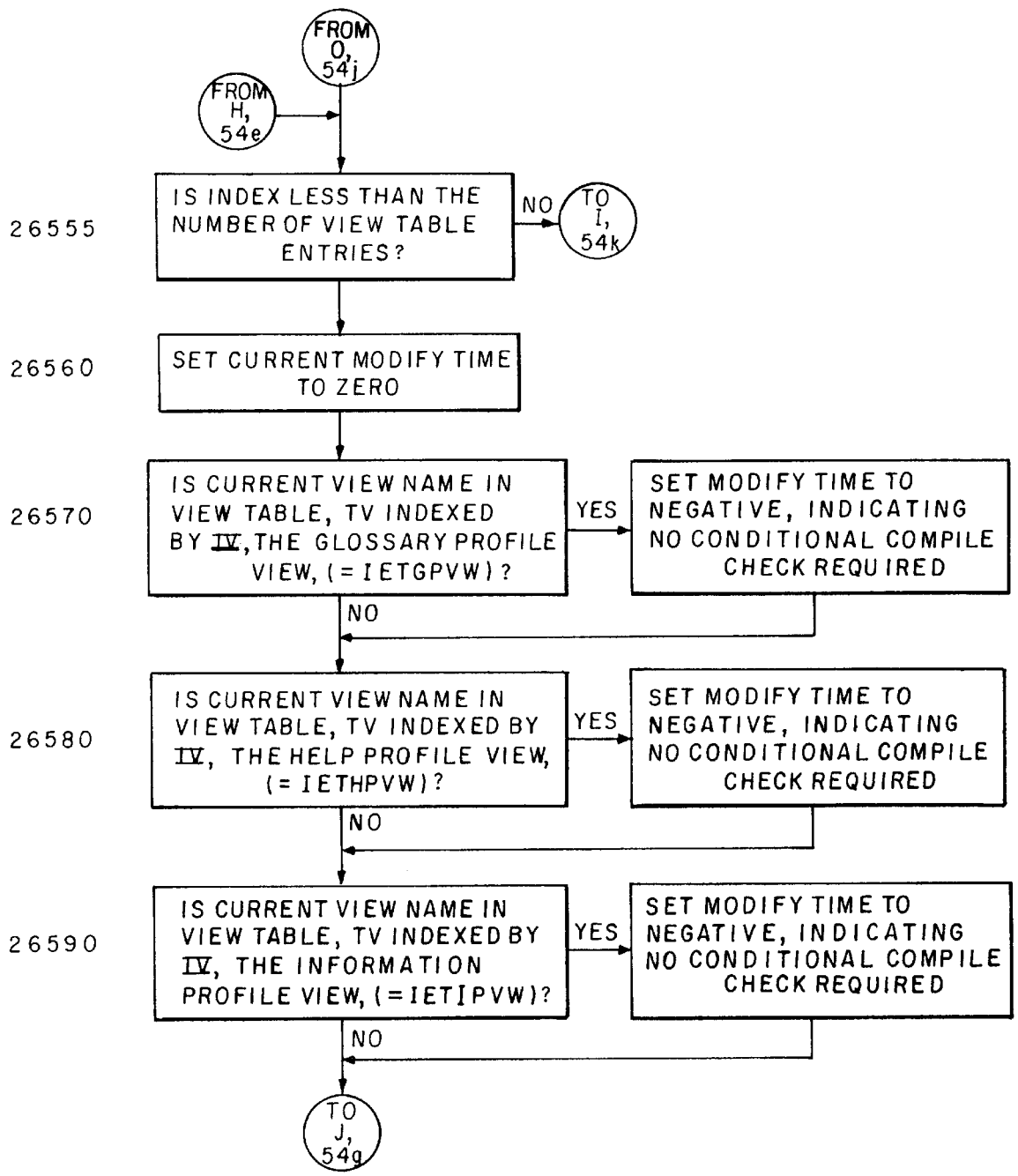
Figure 54G:
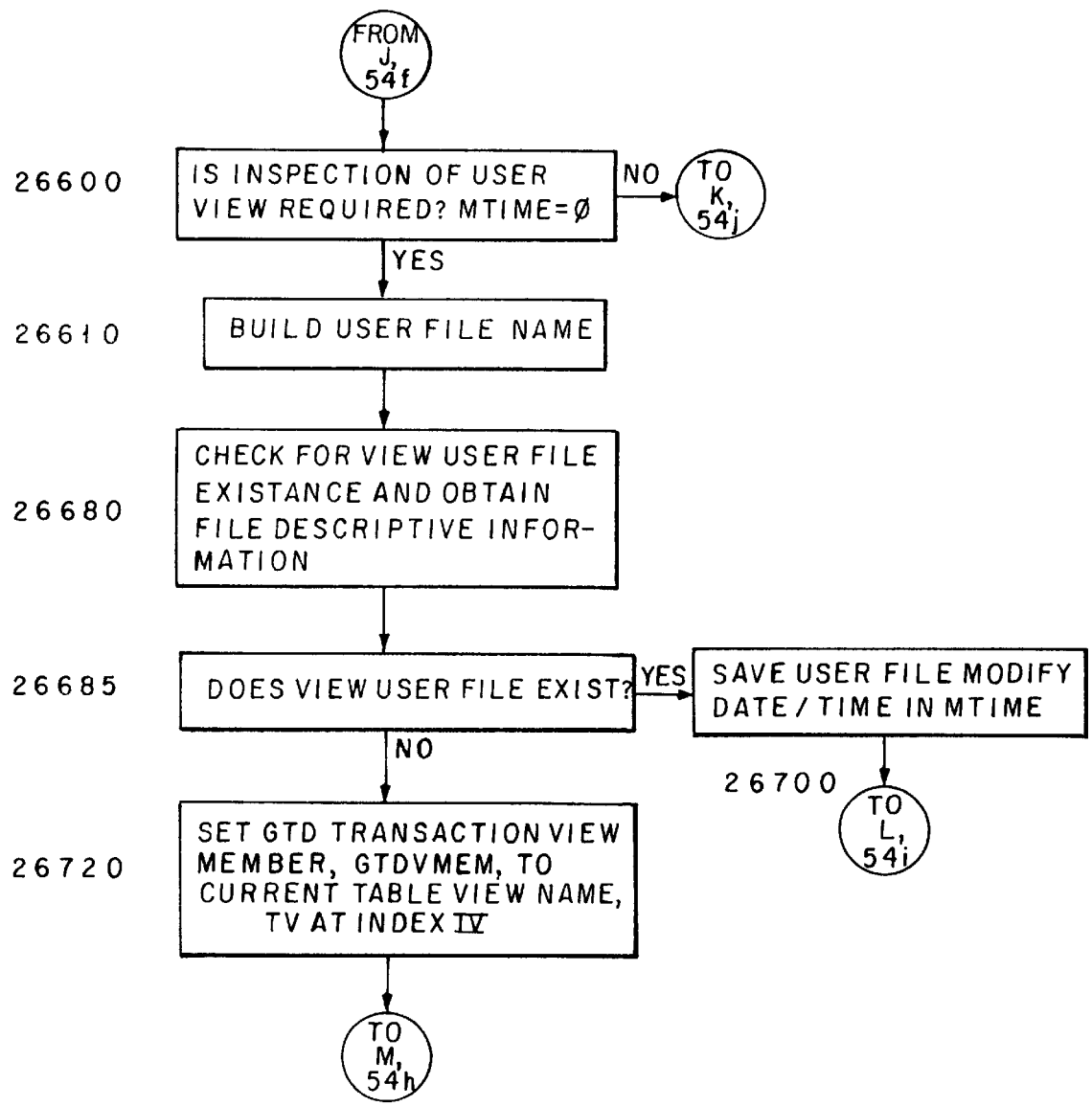
Figure 54H:
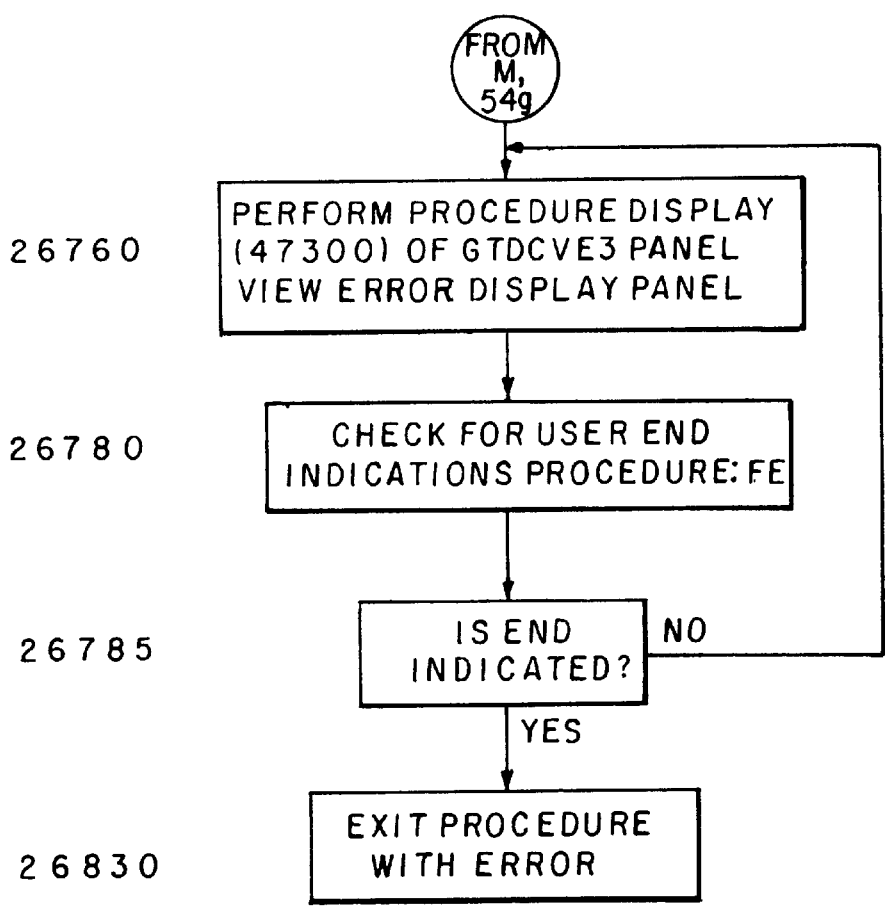
Figure 54I:
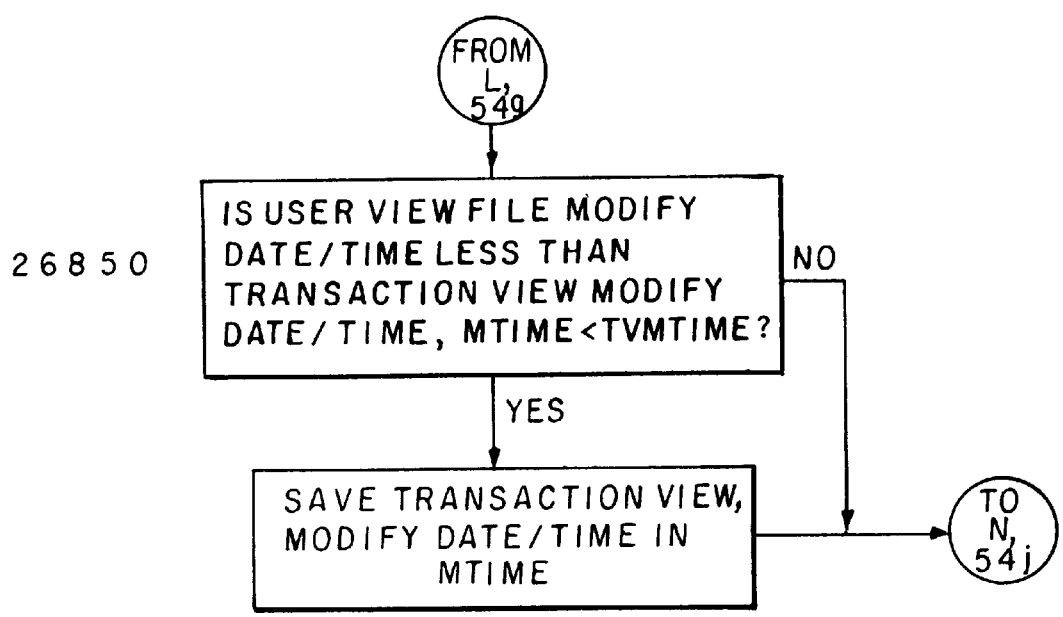
Figure 54J:
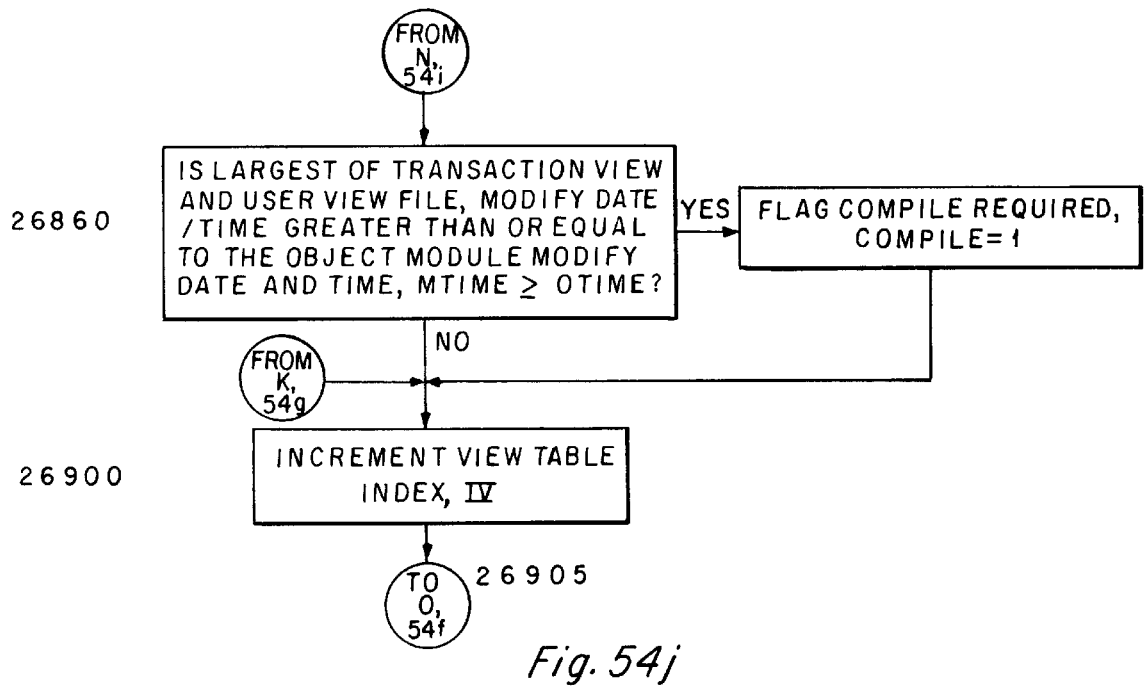
Figure 54K:
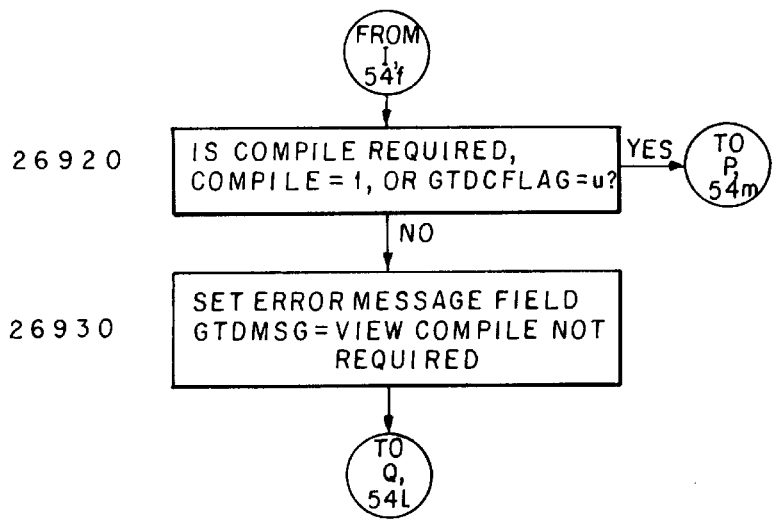
Figure 54N:
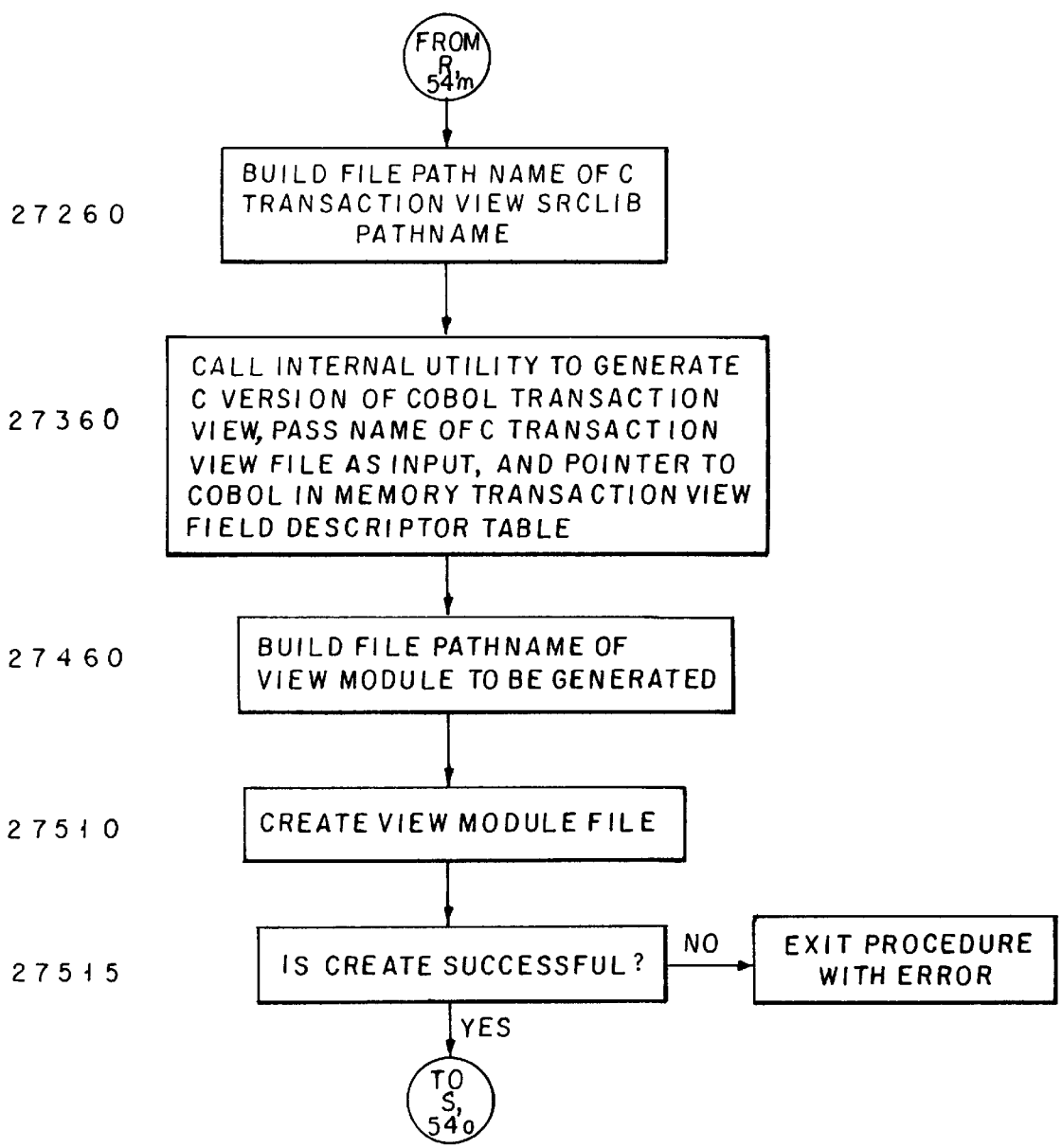
Figure 54O:
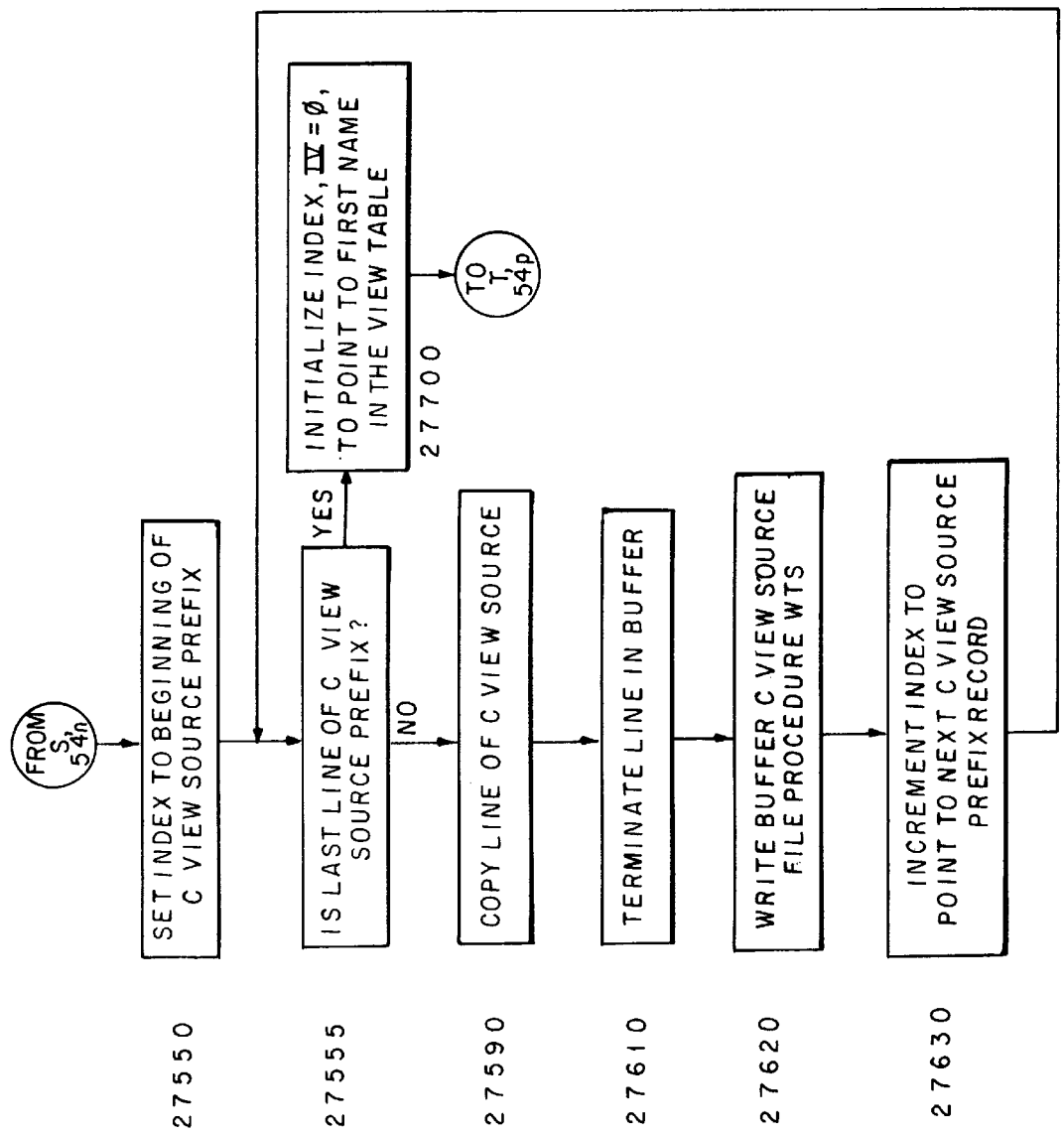
Figure 54P:
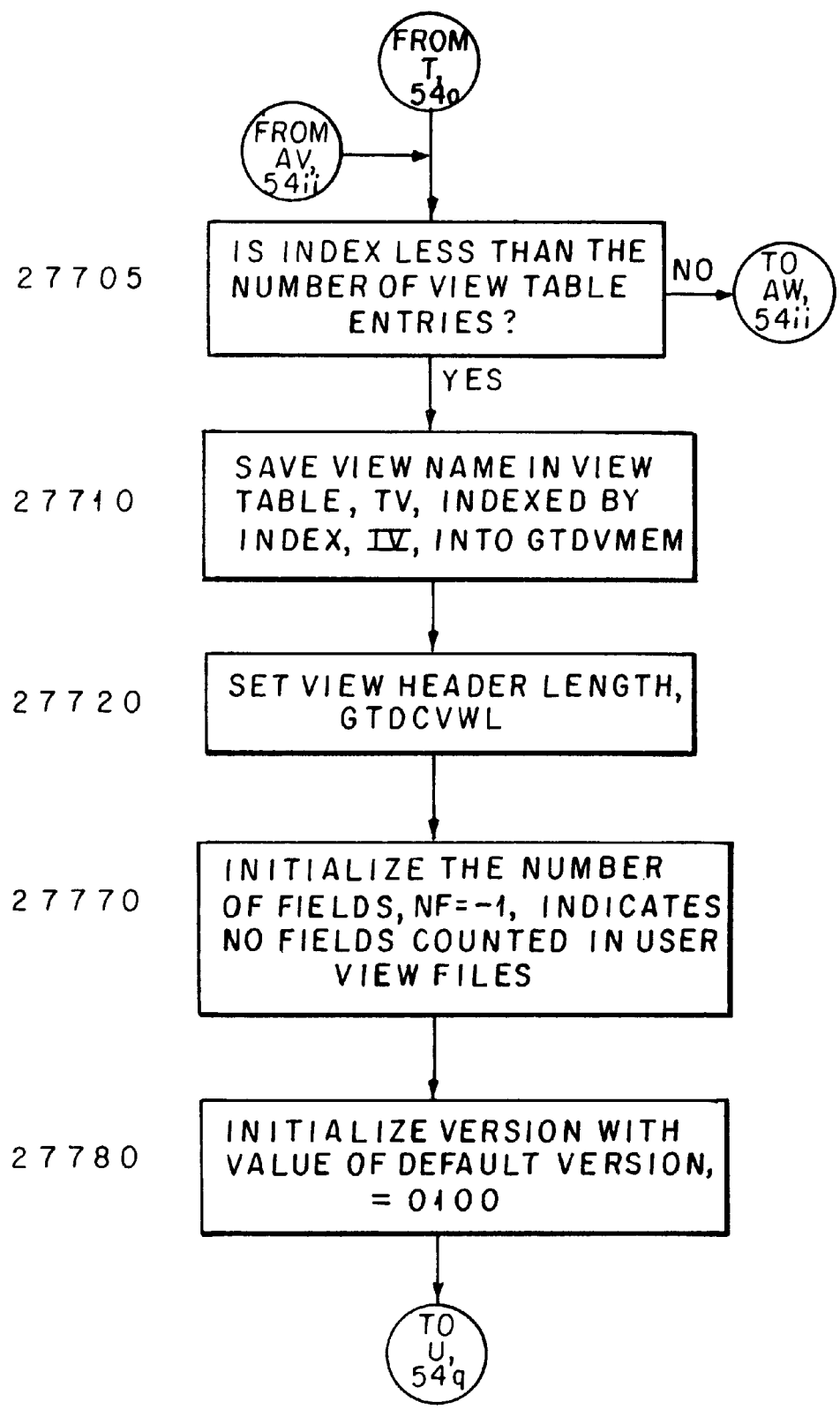
Figure 54Q:
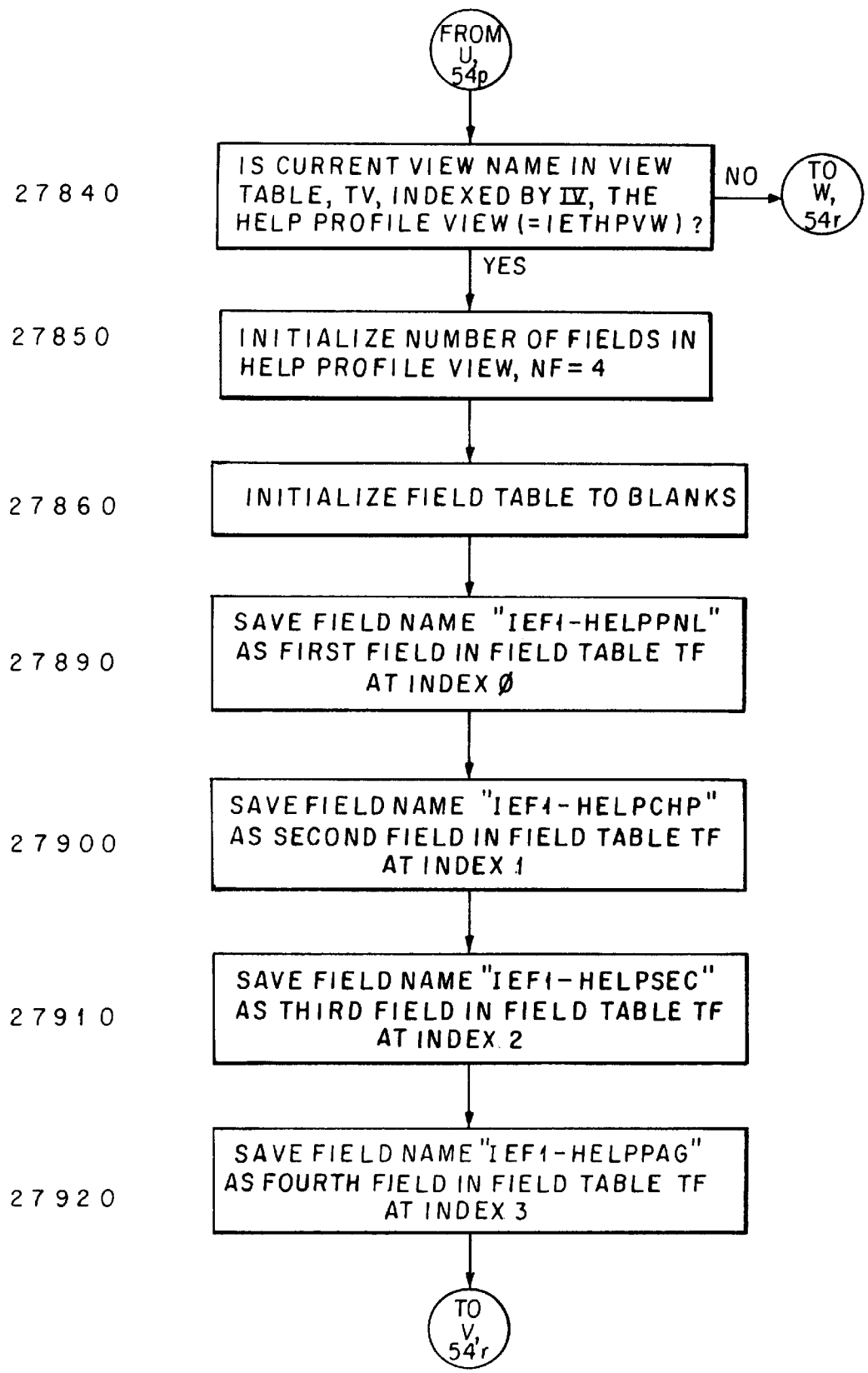
Figure 54R:
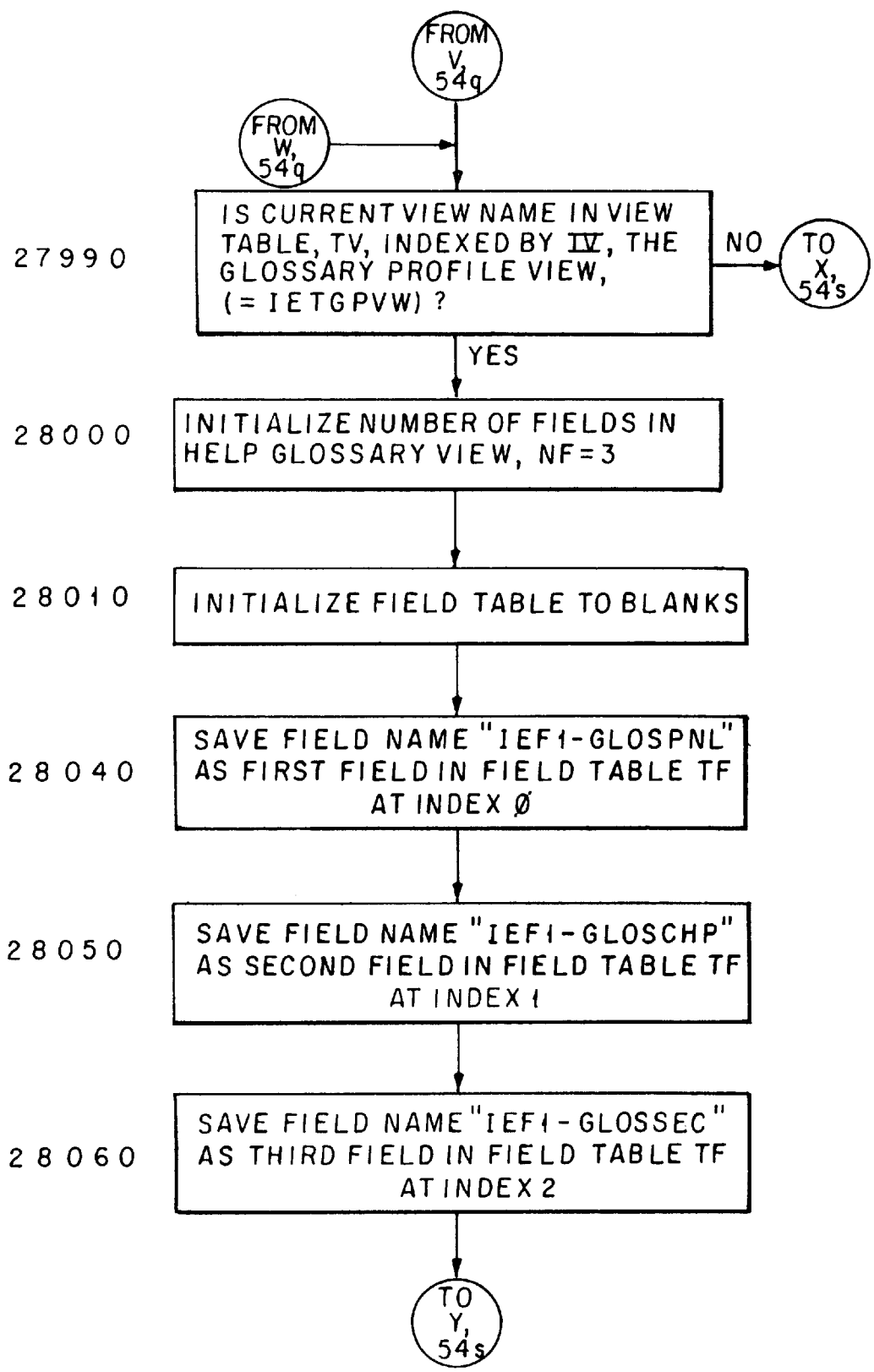
Figure 54S:
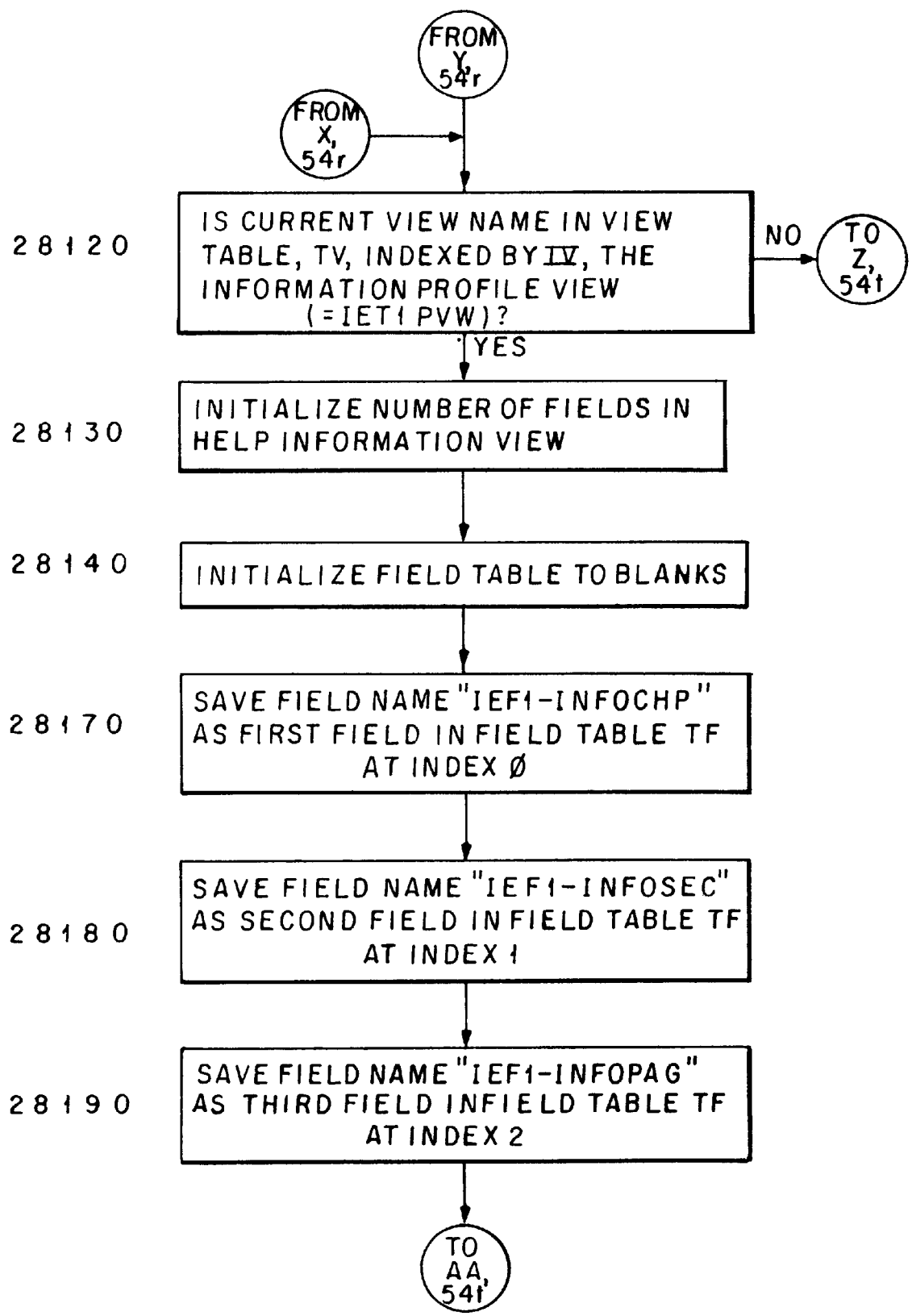
Figure 54T:
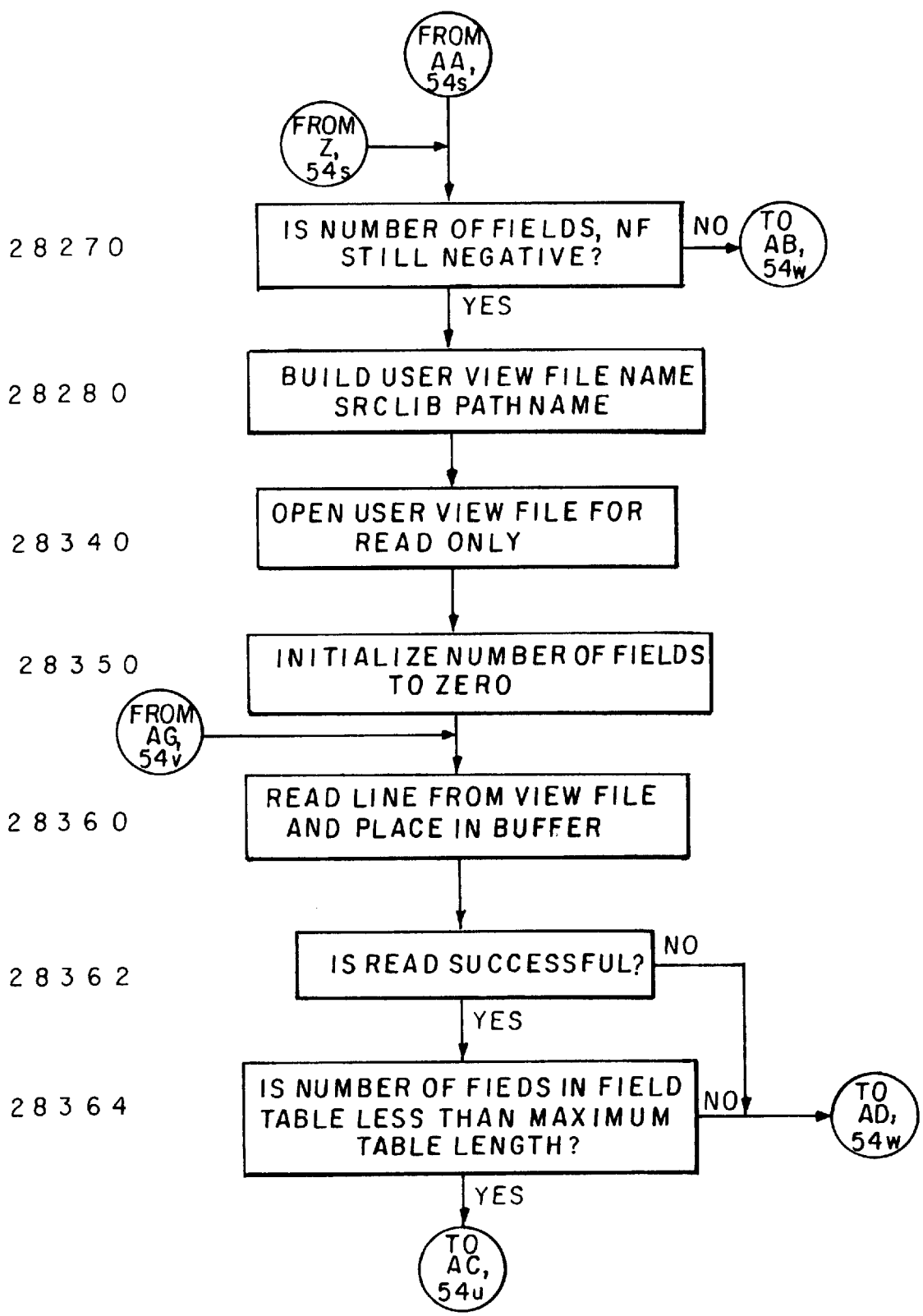
Figure 54U:
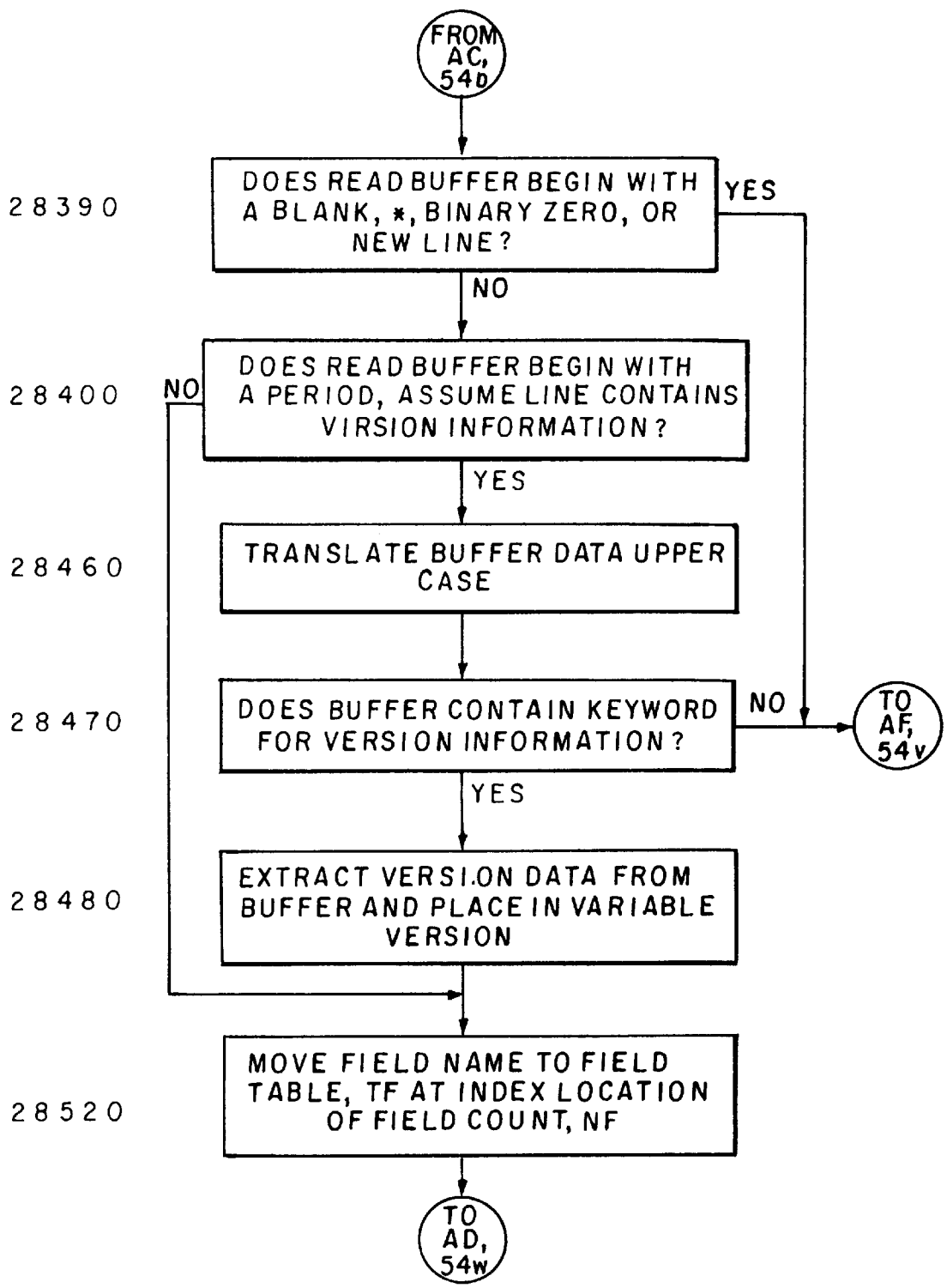
Figures 54V, 54W:
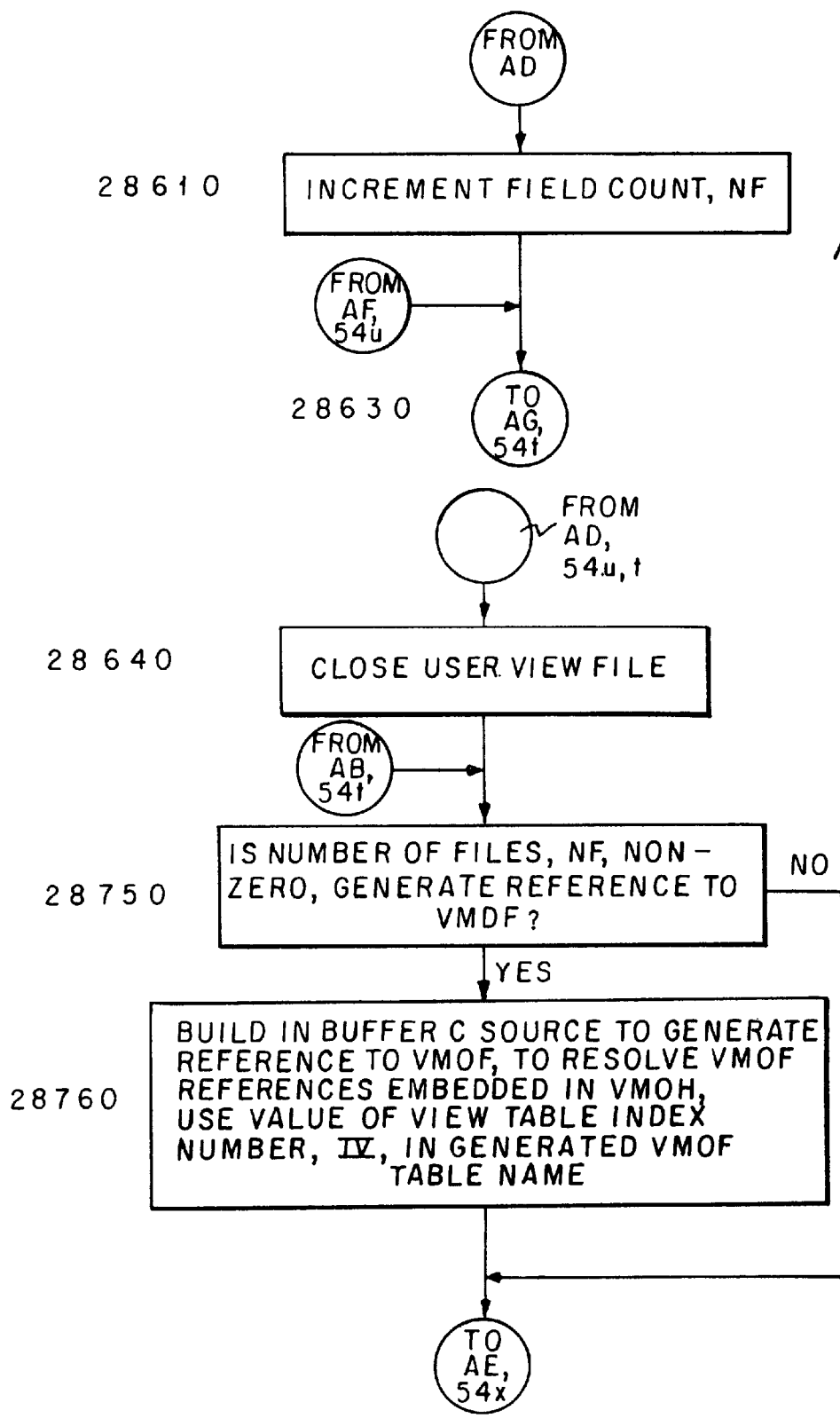
Figure 54X:
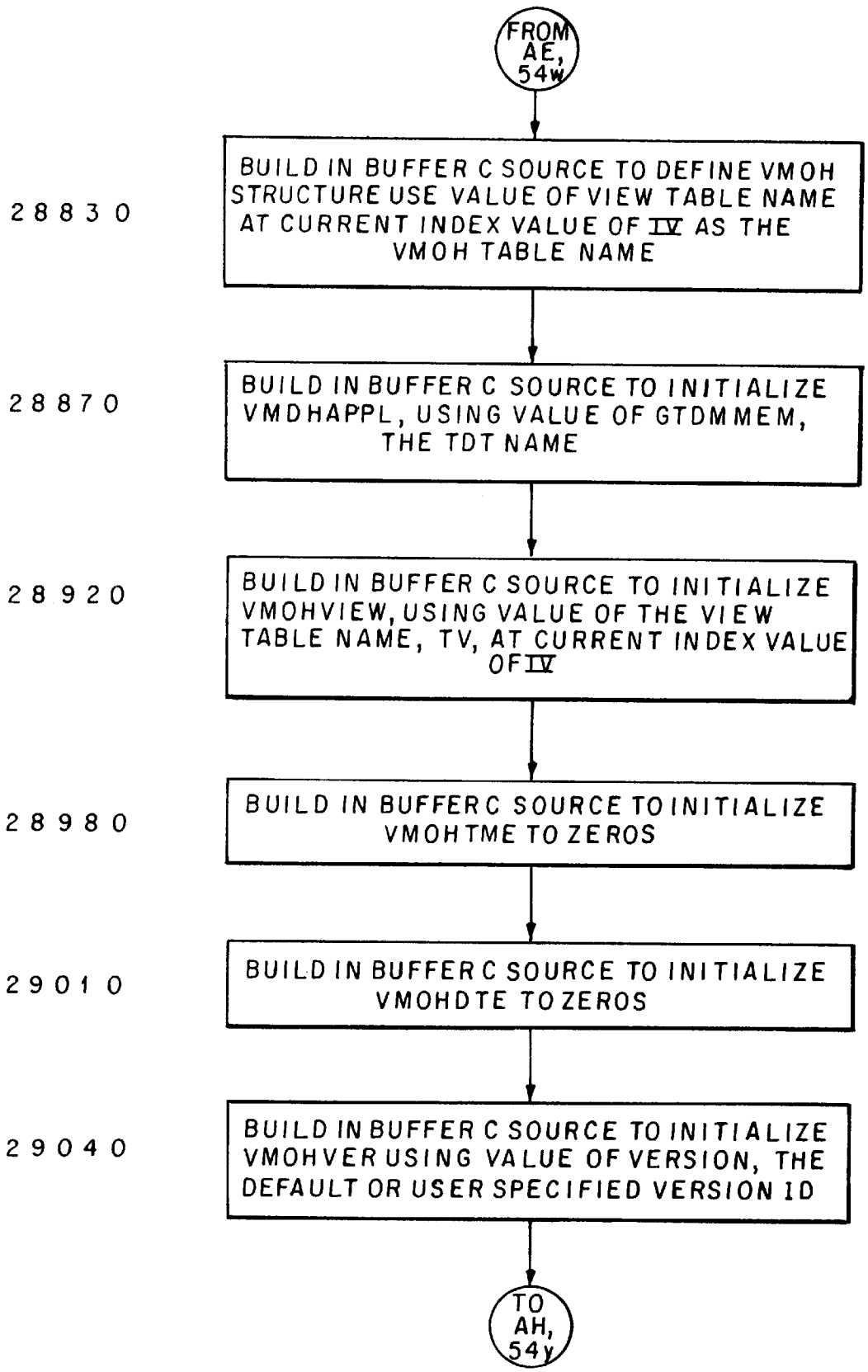
Figure 54Y:
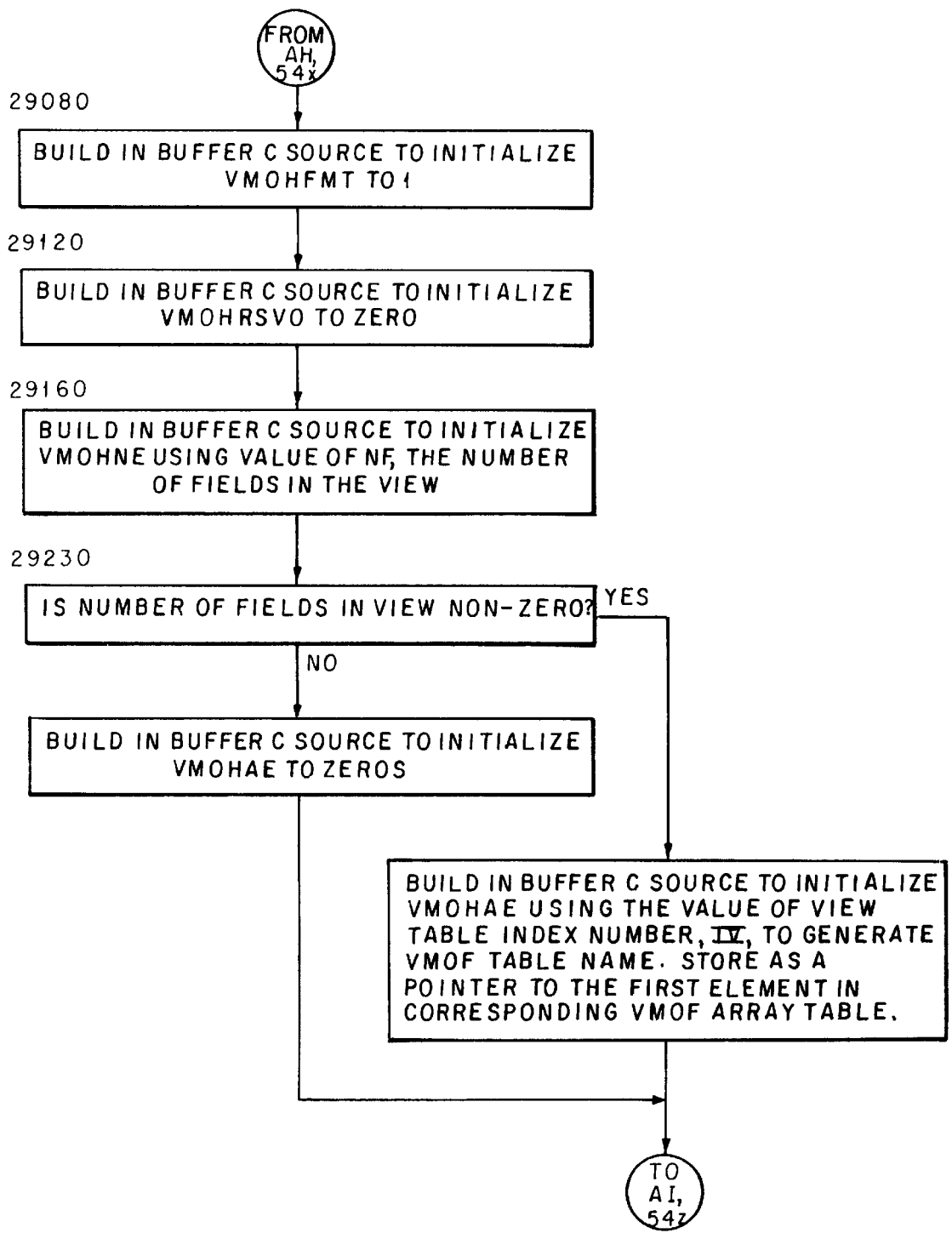
Figure 54Z:
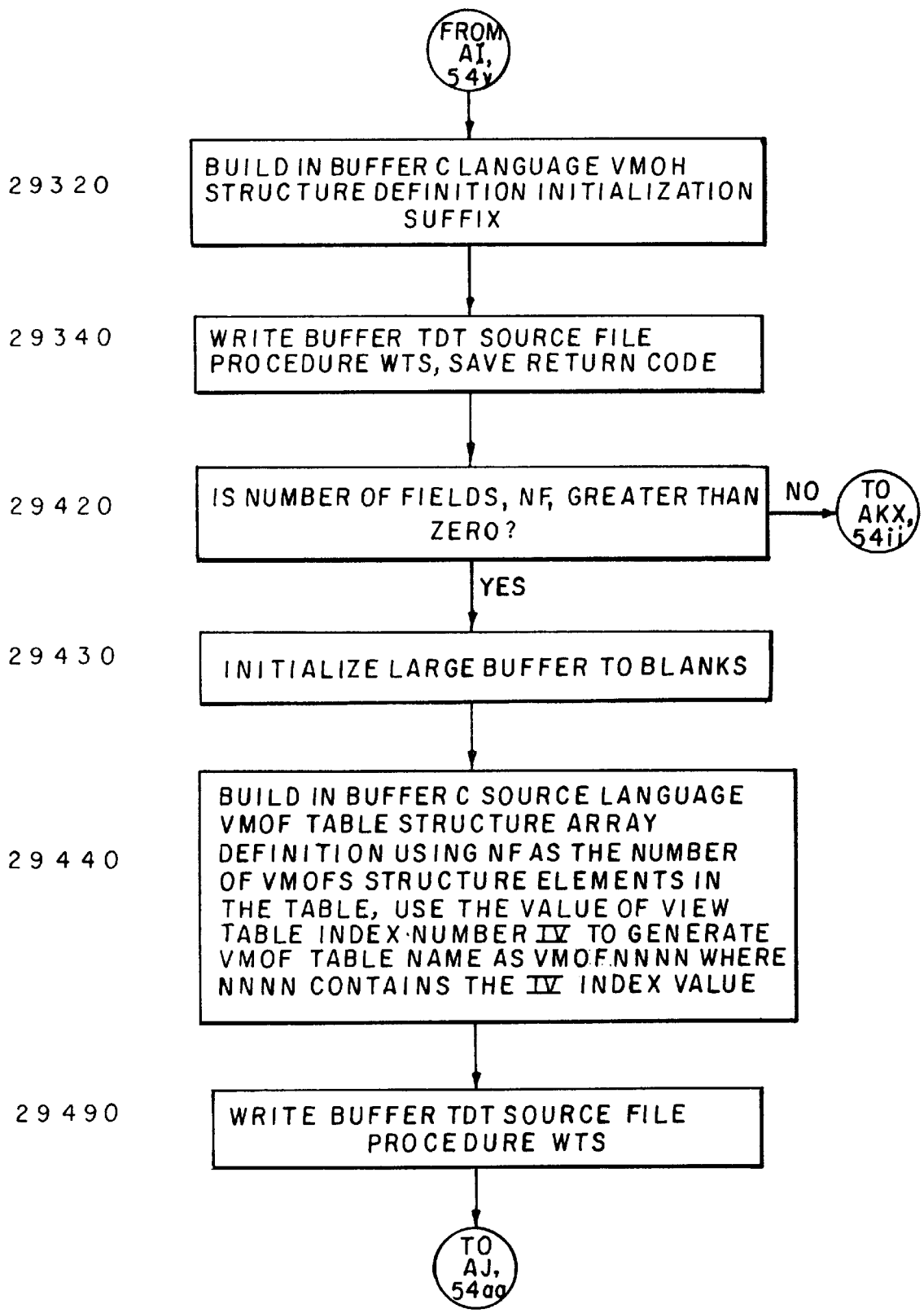
Figure 54A:
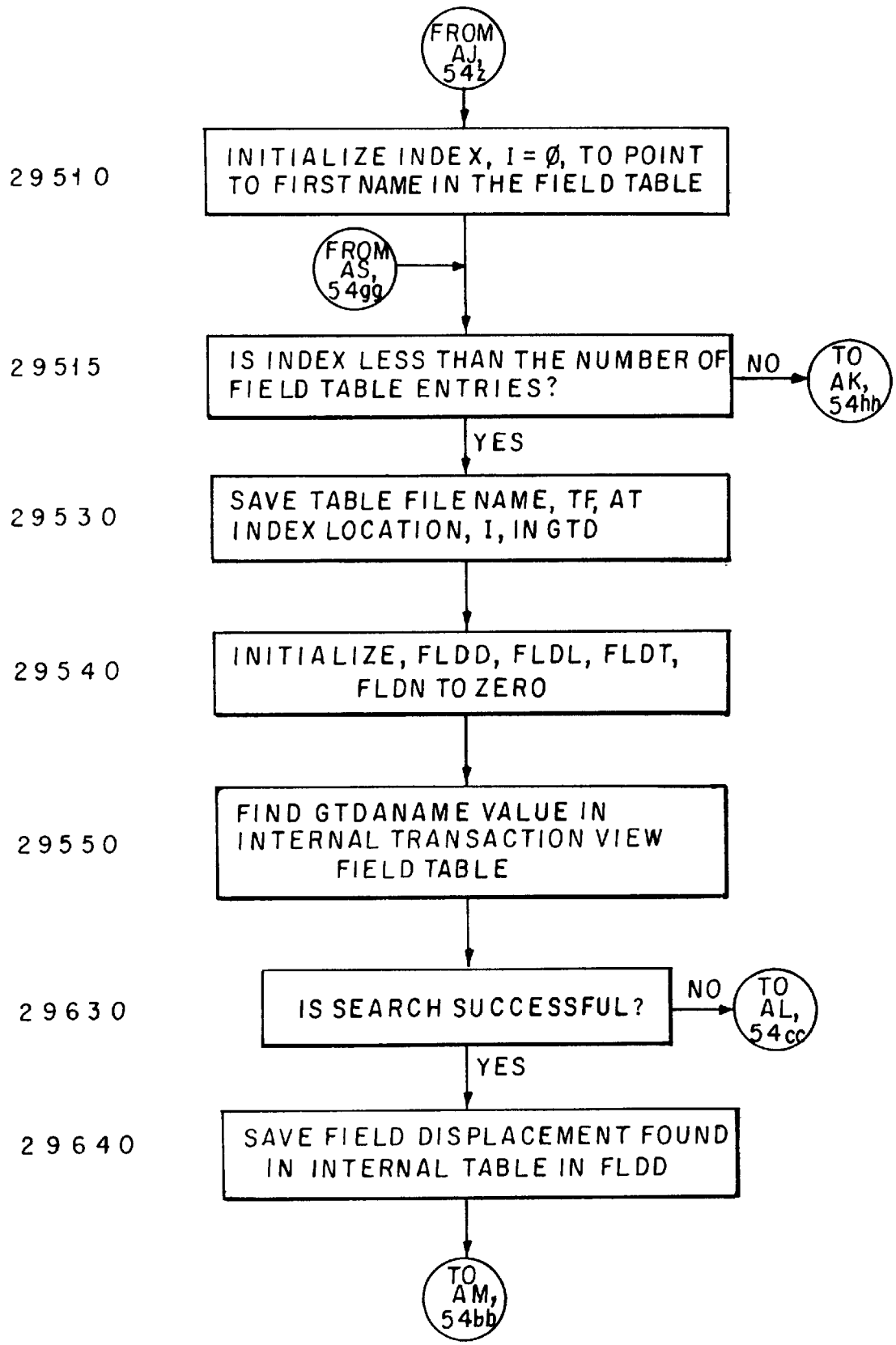
Figure 54B:
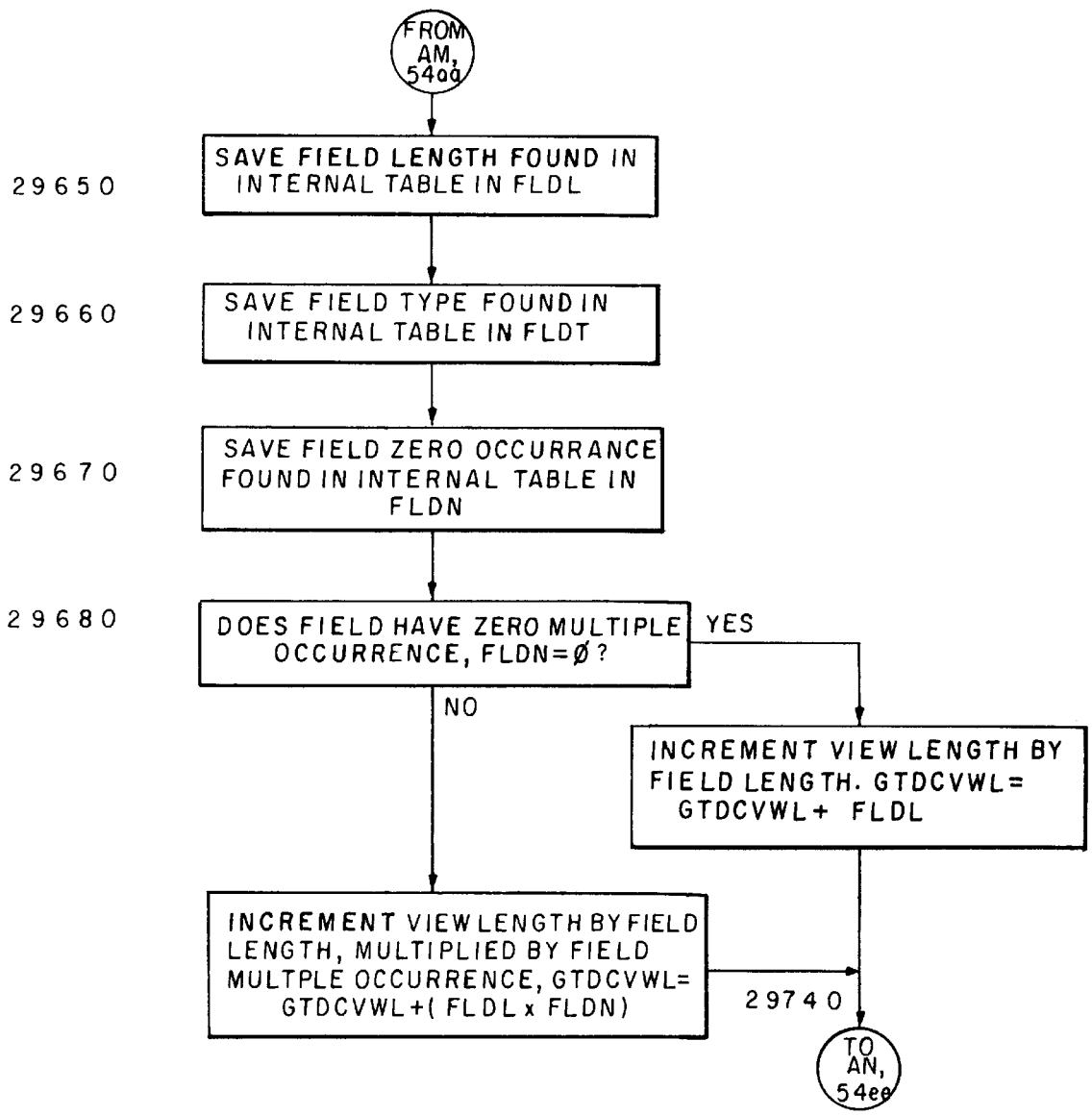
Figure 54C:
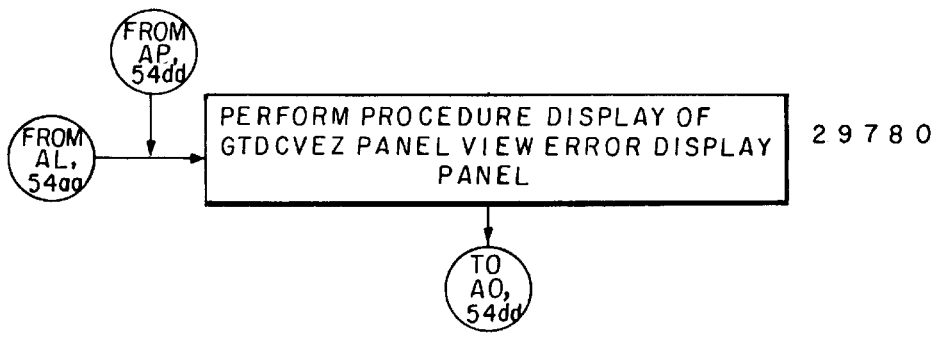
Figure 54D:
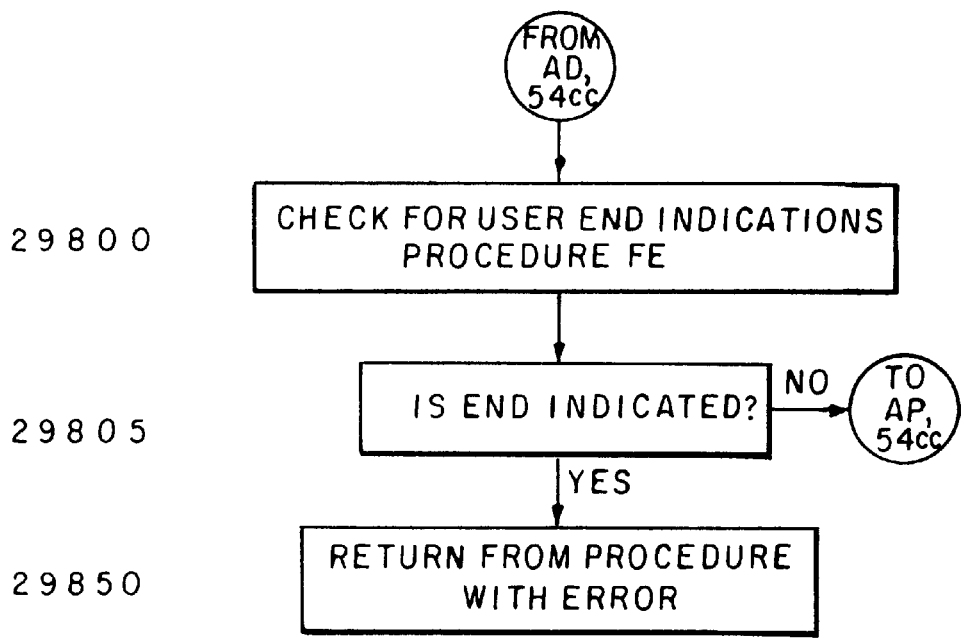
Figure 54E:
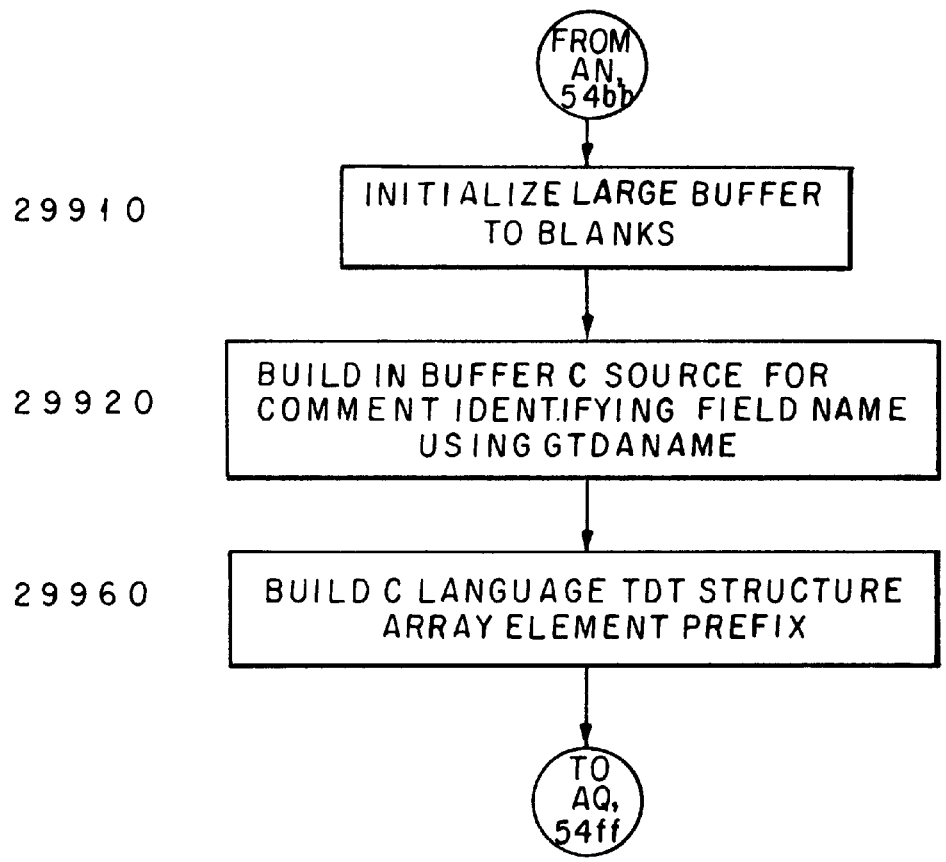
Figure 54F:
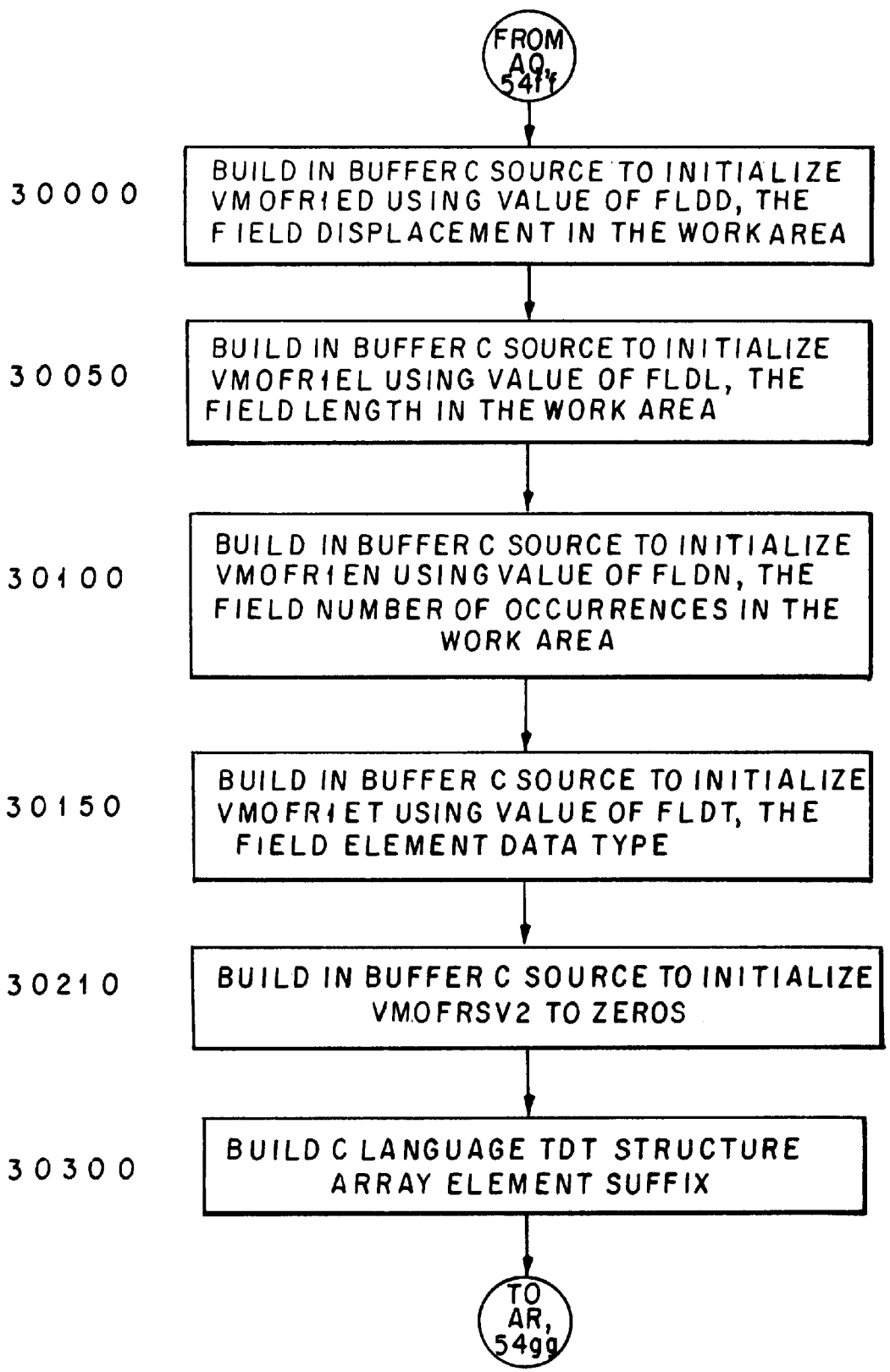
Figure 54G:
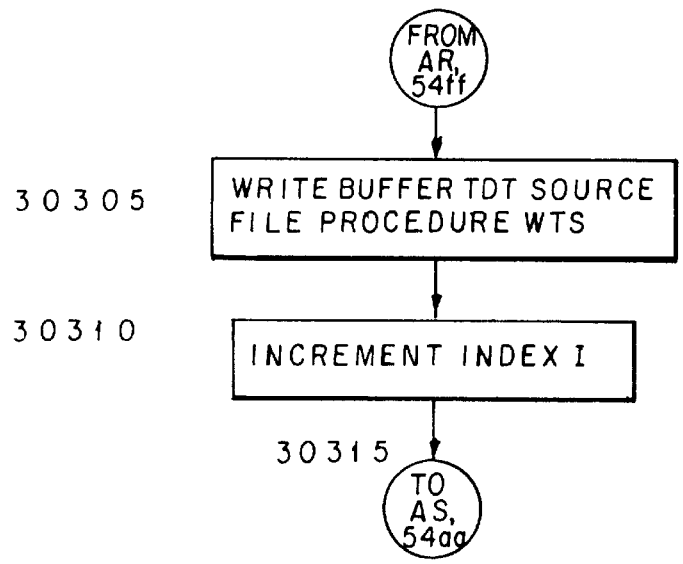
Figure 54H:
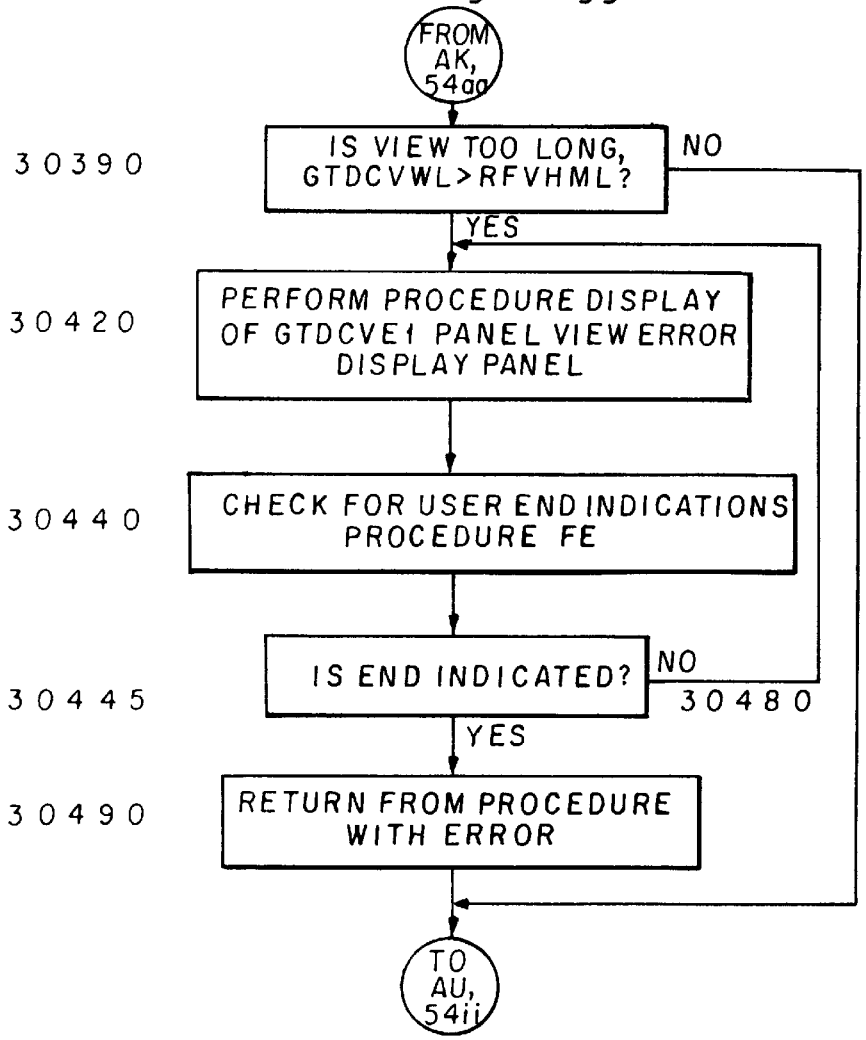
Figure 54I:
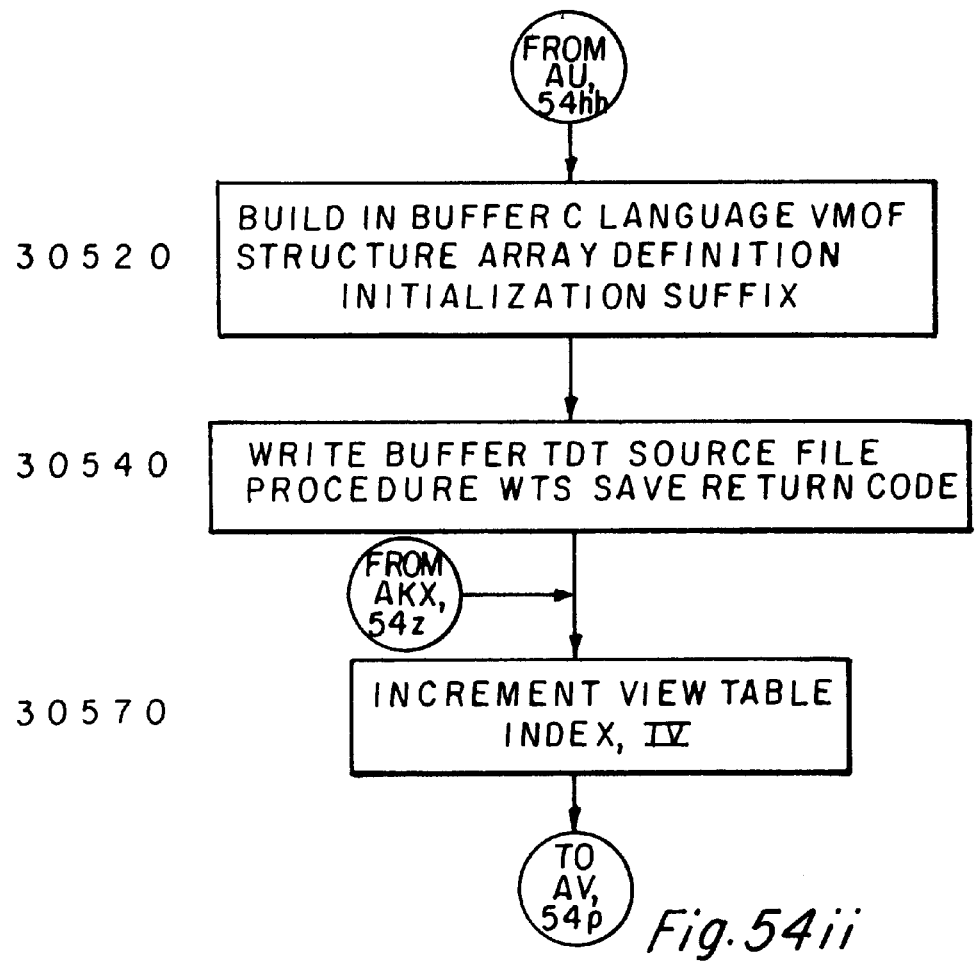
Figure 54J:
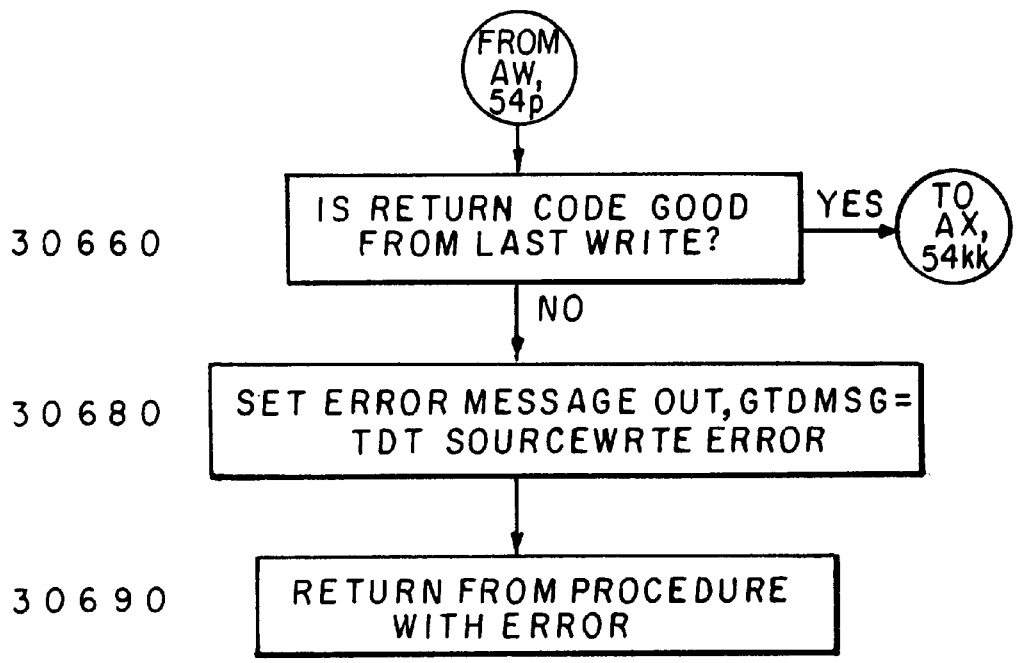
Figure 54K:
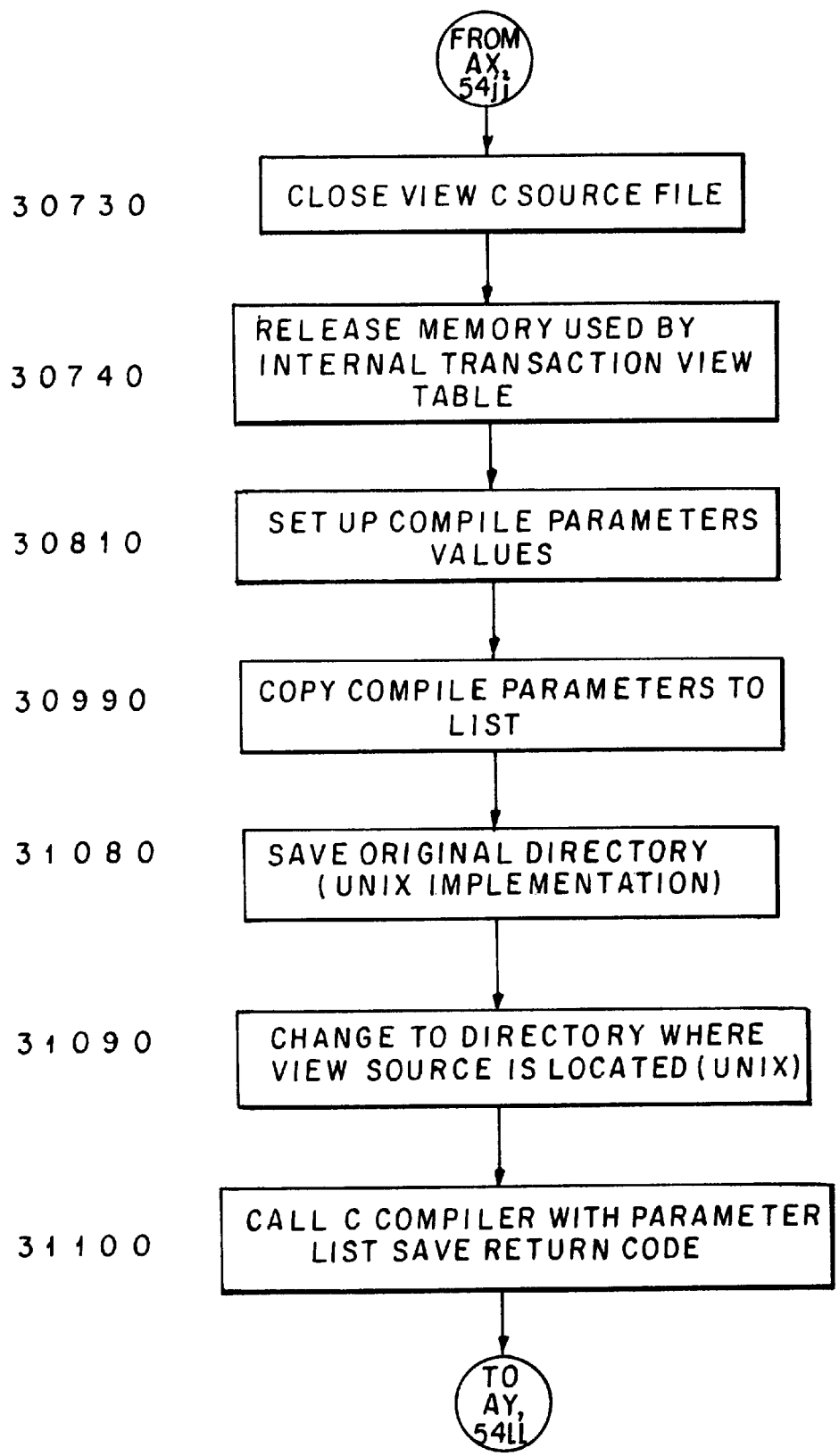
Figure 54L:
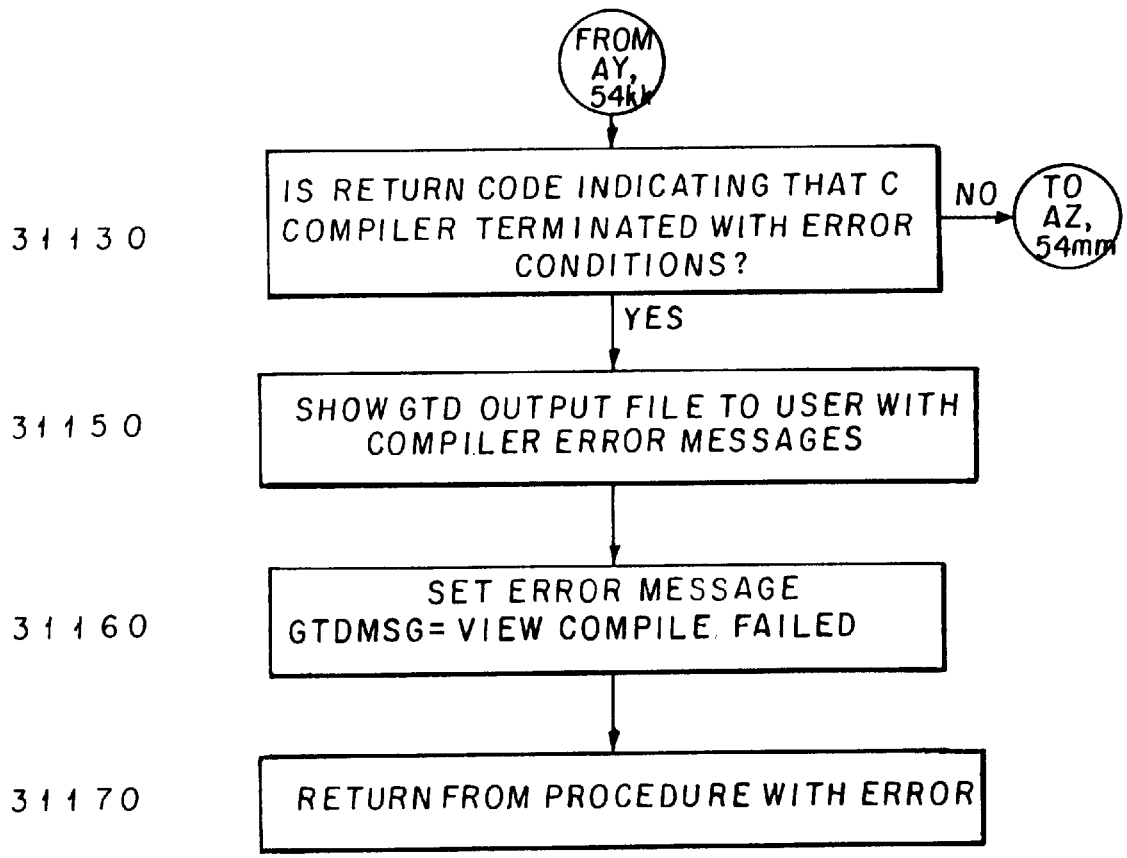
Figure 54M:
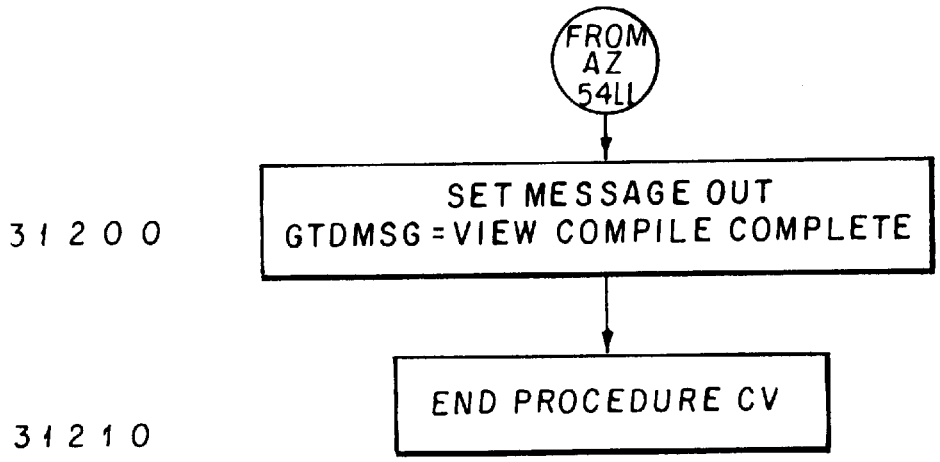

Block 19310 initializes buffer TDTBUF to blanks, and builds a C language external entry in the buffer as an "extern char", panel name from table at index loc i, "[ ];" (Block 19320). The line in the buffer is terminated by placing a new line character after the data (Block 19370). In Block 19380, the write buffer TDT source file WTS procedure (FIG. 53, Block 25500). The procedure then increments the index, i, in Block 19390, and proceeds to Block 19135.

In Block 19460, index, i, is initialized to zero. Decision Block 19465 checks to see if index, i, is equal to the number of views. If so, the procedure jumps to Block 19620. Otherwise, the buffer, TDTBUF, is set to blanks (Block 19470), and a C language external view entry is built in the buffer as "extern struct VMOH", view name from table, TV, at index loc i, "[ ];" (Block 19480).

The line in the buffer is terminated by placing a new line character after the data (Block 19530), and the procedure performs (Block 19540) a write buffer TDT source file WTS procedure (FIG. 53, Block 25500). The index, i, is incremented (Block 19550), and the procedure returns to Block 19465.

Blocks 19620 through 19730 generate EXTERN entries for procedures. The pointer, e, is set to the first STDE table component name (Block 19620), and then the procedure checks to see if e points past the end of the STDE table component name table. If so, the procedure jumps to Block 19800. If not, the procedure next checks to see if the component indicated by e is a language (STDETYP=C) entry type, with an external procedure type (STDECTYP= EXTERN). If not, the procedure continues at Block 19730. If it is, the procedure initializes the buffer, TDTBIF, to blanks (Block 19640).

The C language external procedure entry is built in the buffer as "extern int", with the procedure name from the STDE table (STDENAME) at index location i, "( )" (Block 19650). The line in the buffer is terminated by placing a new line character after the data (Block 19700) and the procedure performs (Block 19710) the write buffer TDT source file WTS procedure (FIG. 53, Block 25500). (Block 19730 increments e to the next STDE table component entry, and the procedure then returns to Block 19625.

Blocks 19800 through 20740 generate the TDT overhead structure source statements. This consists of the C statement necessary to build the TDT table portion shown in FIG. 62, as TDT fields labeled TDTID through TDTATLE. As shown in the Figure, a large portion of this table is made up of pointers to other tables and table entries. Examination of the TDT documentation section will help in understanding the logic required to build this overhead structure.

Pointers throughout the CT procedure, are constructed in C source as a pointer to a given table name subscripted by the index of the entry needed. For example, field TDTA-MENU is a pointer to the panel entry, TPE, whose name, TPENAME, is equal to application-generated menu name. Assuming that this entry is the 5th entry, subscript 4 in C, the C statement for such a definition would be "&TPETAB[4]". So, in each case, the entry's subscript is located and then the statement is generated as in the example.

This section starts at Block 19800 by initializing the large buffer to blanks. The buffer C language TDT table structure definition header is built in the buffer as "struct TDT IETTDT=(0 (Block 19810). The C source to initialize the TDTID is built in the buffer using the value of gtdmmem (Block 19830). The C source to initialize the TDTRELN is built in the buffer using the value of gtdreln (Block 19870). The C source to initialize the TDTGTIME is built in the buffer using the current clock time recorded as seconds since 07/01/01 (Block 19960).

The C source to initialize the TDTGDATE is built in the buffer using a zero. Because the date is implied in TDTGTIME, another implementation could record data and time information using both fields in TDT with different encoded values (Block 20010).

The C source to initialize the TDTDREP is built in the buffer using the value of the report name contained in gtdhdr (Block 20030).

The C source to initialize the TDTDGEN is built in the buffer using the value of the generation name contained in gtdhdg (Block 20060). The index number of the panel table entry which has the same value as gtdhmenu is then identified (Block 20090).

The C source to initialize the TDTAMENU is built in the buffer using the index number identified. This is stored as the pointer to nth entry in TPETAB identified by the index number, the TPE number of TDTAMENU (Block 20100).

The index number of the panel table entry which has the value the same as gtdhhelp is then identified (Block 20170). At Block 20180, the C source to initialize the TDTAHELP is built in the buffer using the index number identified. This is stored as the pointer to nth entry in TPETAB identified by the index number, the TPE number of TDTAHELP.

The index number of the panel table entry which has the value the same as gtdhinfo is next identified (Block 20250), and the C source to initialize the TDTAINFO is built in the buffer using the index number identified. This is stored as the pointer to nth entry in TPETAB identified by the index number, the TPE number of TDTAINFOs (Block 20260).

The index number of the panel table entry which has the value the same as gtdhglos is identified (Block 20320) and the C source to initialize the TDTAGLOS is built in the buffer using the index number identified. This is stored as the pointer to nth entry in TPETAB identified by the index number, the TPE number of TDTAGLOS (Block 20330).

The C source to initialize the TDTNTPE is built in the buffer using the value of NP as the number of panels (number of TPEs).

The C source to initialize the TDTATPE is built in the buffer and stored as the pointer to the first entry in TPETAB, the transaction panel entry table (Block 20460).

The C source to initialize the TDTNTCE is built in the buffer using the value of NC as the number of procedures (number of TCE's) (Block 20490).

The C source to initialize the TDTATPE is built in the buffer and stored as the pointer to the first entry in TCETAB, the transaction procedure entry table (Block 20540).

The C source to initialize the TDTAPPL is built in the buffer using the value of GTAPPL, the application name (Block 20570).

The C source to initialize the TDTNTLE is built in the buffer using the value of NL as the number of language entries (number of TLEs) (Block 20610).

Block 20660 checks to see if the number of language entries is greater than zero (Block 20660). If it is, the C source to initialize the TDTATLE is built in the buffer and stored as the pointer to the first entry in TLETAB. Otherwise, the C source to initialize the TDTATLE is built in the buffer and stored as zero, or a NULL pointer reference, indicating that there is no language table, TLETAB.

The C language TDT table structure definition, IETTDT structure termination data is built in Block 20720. The procedure then performs the write large buffer TDT source file WTS procedure (FIG. 53, Block 25500) to complete this section.

The next CT section, comprising Blocks 20800 through 21900, generates the panel table, TPETAB. TPETAB is a table of entries, TPE. The structure for the TPETAB source file is to define TPETAB as an array of structure type TPETAB, with a max occurrence equal to the number of panel entries. Pointers in these entries are created the same way as they were for the TDT overhead, see the discussion above. There will be one entry built for each panel defined.

This section begins by initializing the large buffer to blanks (Blocks 20800). Block 20810 then builds the source statement to declare TPETAB as an array of structures of type TPE with an occurrence of the value NP. The buffer is then written to file at Block 20840.

Next Block 20860 prepares to build all the panel entries by initializing index, i, to zero. Block 20865 checks for the end of the panel definitions by determining whether i is equal to NP. If it is, control is passed to Block 21920. Otherwise, the large buffer is initialized to blanks (Block 20870), and the C language TDT structure array element prefix is built (Block 20880).

The C source to initialize the TPENAME is built in the buffer using the value of the element in the panel name table indicated by the index (TP at index location i) (Block 20910).

The C source to initialize the TPEAMAP is built in the buffer using the value of the element in the panel name table indicated by the index (TP at index location i) (Block 20910), and is stored as a pointer.

Block 21000 located the STDE table entry with the name, STDENAME, the same as panel name table entry indicated by index, TP at index location i, and sets the pointer e to indicate this element. Block 21030 then checks to see if the STDE table element indicated by e is a menu entry. If it is, the menu input procedure is saved as "IETIMENU" in the variable procname. If not, the input procedure name, STDEIPNM, of the STDE table element indicated by e, is saved and placed in the variable procname.

Block 21070 locates the STDE table procedure entry (STDETYP=procname). The number of procedures encountered in the STDE table before the desired procedure is located are counted and j is initialized with this count.

Block 21150 checks to see if the procname is blank. If it is, the C source to initialize the TPEAITCE is built in the buffer using zero or null as the pointer value. If not, the C source to initialize the TPEAITCE is built in the buffer and stored as a pointer to the first entry in TCETAB, the Transaction Procedure Entry table, indexed by j, the count of procedures encountered in the STDE table before the procedure procname was located.

Block 21240 checks to see if the STDE table element indicated by e is a menu entry. If it is, the procedure saves the menu input procedure as "IETOMENU", in the variable procname. If not, the procedure saves the output procedure name, STDEOPNM, of the STDE table element indicated by e, and places it in the variable procname. The procedure then locates the STDE table procedure entry (STDETYP=C) with the name (STDENAME) the same as the value of procname. The number of procedures encountered in STDE table before the procedure is located is counted and j initialized with this count.

Block 21360 checks again to see if the procname is blank. If it is, the C source to initialize the TPEAOTCE is built in the buffer using zero or null as the pointer value. If not, the C source to initialize the TPEAOTCE is built in the buffer and stored as a pointer to the first entry in TCETAB, the Transaction Procedure Entry table, indexed by the count, j, of procedures encountered in the STDE table before the procedure procname was located.

The C source to initialize TPERSVD1 to zeros is built in the buffer (Block 21450). This is currently unused. It is here to allow room for expansion and enhancements.

The C source to initialize OPCHTA to zeros is built in the buffer (Block 21490). This is also currently unused. It is here to allow room for expansion and enhancements.

Block 21520 locates the STDE table first entry with the name, STDENAME, the same as the panel name table entry indicated by the index, TP, at index location, i. Pointer, e, is set to indicate this element. The number of menu entries encountered in the STDE table before the desired panel is located are counted and j initialized with this count.

Block 21570 checks to see if the STDE table entry is a menu, STDETYP='E'. If not, the procedure jumps to Block 21740. If it is, Block 21580, locates subsequent entries in the STDE table with name, STDENAME, the same as panel name table entry indicated by TP at location i. The pointer is set to indicate the number of subsequent entries found in the rest of table, and initializes k with count.

The C source to initialize TPENTME is built in the buffer using the value of k as the number of menu entries which are related for the current menu panel (Block 21620).

The C source to initialize TPEATME is built in the buffer and stored as a pointer to the menu entry in TMETAB, indexed by j (Block 21680), after which the procedure jumps to Block 21840. This is the first menu entry related to the current menu panel.

The C source to initialize TPENTME (Block 21740) and TPEATME (Block 21790) to zeros are built in the buffer. The procedure builds the C language TDT structure array element suffix (Block 21840) and performs (Block 21890) the write buffer TDT source file WTS procedure (FIG. 53, Block 25500). Index i is incremented (Block 21900) and the procedure jumps to Block 20865.

The procedure initializes the large buffer to blanks (Block 21920), and then builds the C language TPETAB table structure array definition suffix in the buffer (Block 21930). The procedure then performs (Block 21940) the write buffer TDT source file WTS procedure (FIG. 53, Block 25500).

Blocks 22010 through 22720 generate the TCETAB in a very similar manner to the way the TPETAB was built. There will be one entry generated for each procedure defined. This section begins by initializing the large buffer to blanks (Block 22010).

The C language TCETAB table structure array is built in the buffer using the value of NC as the number of procedures (TCE) structure elements in the TCETAB table (Block 22020).

The procedure performs (Block 22050) the write buffer TDT source file WTS procedure (FIG. 53, Block 25500) and then initializes the pointer to the first STDE table component name (Block 22080). Block 22085 checks to see if e points past the end of the STDE component table. If so, the procedure jumps to Block 22700. Otherwise, Block 22090 checks to see if the component type of the component indicated by e is a procedure, STDETYP=C entry definition. If it is not, the procedure jumps to Block 22670.

The procedure initializes the large buffer to blanks (Block 22100), and then builds the C language TDT structure array element prefix (Block 22110).

The C source to initialize TCENAME is built using the value of STDENAME in the STDE table name table entry indicated by index e (Block 22140). Block 22180 checks to see if the procedure component procedure type indicates a procedure that belongs to another application transaction program, STDECTYP="EXTERN". If it does, the procedure builds the C source to initialize TPEAPROC to zeros or null value. If not, the procedure builds the C source in the buffer to initialize TPEAPROC, using the value of STDENAME in the STDE table name table entry indicated by index, e, and stores it as a pointer.

Block 22280 checks if the procedure component input view is not defined, STDEIPNM=blanks. If it is not defined, the procedure builds the C source in the buffer to initialize TCEAIVW to zeros or null value. If it is, the procedure builds the C source to initialize TCEAIVW using value of STDEIPNM in the STDE table name table entry indicated by the index, e, and stores it as a pointer.

Block 22360 checks if the procedure component output view is not defined, STDEOPNM=blanks. If it is not defined, the procedure builds the C source in the buffer to initialize TCEAOVW to zeros or null value. If it is, the procedure builds the C source to initialize TCEAOVW using value of STDEOPNM in the STDE table name table entry indicated by the index, e, and stores it as a pointer.

Block 22440 checks if the procedure component profile view is not defined, STDEPVNM=blanks. If it is not defined, the procedure builds the C source in the buffer to initialize TCEAPVW to zeros or null value. If is defined, the procedure builds the C source to initialize TCEAPVW using value of STDEPVNM in the STDE table name table entry indicated by the index, e, and stores it as a pointer.

Block 22520 checks if the procedure component is a DBMS type procedure, STDECDB2=Y. If it is a DBMS type, the procedure builds the C source in the buffer to initialize TCEDBTYP to 1, flagging it as a database procedure. If it is not, the procedure builds the C source to initialize TCEDBTYP to zeros, flagging it as a non-database procedure. The procedure builds the C language TDT structure array element suffix (Block 22610) and performs (Block 22650) the write buffer TDT source file WTS procedure (FIG. 53, Block 25500). Pointer e is incremented (Block 22670), after which the procedure returns to Block 22085.

At this point, the CT procedure creates source to build the menu table, TMETAB. Here too, there will be one entry per menu. The procedure initializes the large buffer to blanks (Block 22700) and builds a C language, TMETAB, table structure array definition suffix in the buffer (Block 22710). At Block 22710 the procedure then performs the write buffer TDT source file WTS procedure (FIG. 53, Block 25500).

Blocks 22790 through 23420 generate the TMETAB. This section begins at Block 22790 by initializing the large buffer to blanks. The C language TMETAB table structure array is then built in the buffer using the value of NE as the number of procedure (TME) structure elements in the TMETAB table (Block 22800). The procedure performs (Block 22830) the WTS procedure (FIG. 53, Block 25500) and then initializes the pointer, e, to the first STDE table component table. (Block 20865 checks to see if e points past the end of STDE table component name. If it is, the procedure jumps to Block 23400. Otherwise, the procedure (Block 22870) checks to see if the component type of the component indicated by e is a menu entry definition (STDETYP=E).

Block 22890 builds a C language TDT structure array element prefix. The C source to initialize TMESEL is built using the value of STDENAME in the STDE table name table entry indicated by index, e (Block 22920). (Block 22180 locates the panel name in the panel table with the same name as the menu output panel indicated by pointer e. Index j is initialized with the number of panels encountered in the panel table before the desired panel is located.

Block 23000 checks if the procedure component profile view is not defined, STDEIPNM=blanks. If it is not defined, the procedure builds the C source in the buffer to initialize TPEATPE to zeros or null value. If it is defined, the procedure builds the C source to initialize TPEATPE using the j as an index into the panel table, TPETAB and stores it as a pointer to the jth entry in TPETAB identified by the value of j and the TPE number of the STDEIPNM panel.

Block 23100 located the STDE table procedure entry, STDETYP='C', with the name, STDENAME, the same as the value of the menu output procedure name, STDEOPNM, in the menu entry in the STDE table indicated by pointer e. Index j is initialized with the number of procedures encountered in the STDE table before the procedure is located.

Block 23170 checks if the procedure menu output procedure is not defined, STDEOPNM=blanks. If it is not defined, the procedure builds the C source in the buffer to initialize TPEATCE to zeros or null value. If it is defined, the procedure builds the C source to initialize TPEATCE using the j as an index into the panel table, TCETAB and stores it as a pointer to the jth entry in TCETAB identified by the value of j and the TCE number of the STDEOPNM panel.

The procedure builds the C source to initialize TME-DESC using the value of STDEDESC in the STDE table name table entry as indicated by the index, e.

Block 23300 builds the C language TDT structure array element suffix and performs (Block 23350) the WTS procedure (FIG. 53, Block 25500). Pointer e is incremented (Block 23380) after which the procedure returns to Block 22085.

The large buffer is initialized to blanks (Block 23400), a C language TMETAB table structure array definition suffix is built in the buffer (Block 23410), and the procedure performs (Block 23420) the WTS procedure (FIG. 53, Block 25500).

The next portion of the CT procedure Blocks 23490 through 23870) generates the transaction language table, TLETAB. As noted by the flow chart, no transaction language entries will be built if none are defined. (Block 23490 checks to see if the number of language entries, NL, are greater than zero. If they are not, the procedure advances to Block 23950. If they are, the procedure initializes the large buffer to blanks (Block 23550).

Block 23510 builds the C language TMETAB structure array definition using ne as the number of procedure (TME) structure elements in the TMETAB table. The procedure performs the WTS procedure (FIG. 53, Block 25500) and pointer e is incremented to the first STDE table component name (Block 23380).

Block 23575 checks to see if e points past the end of the STDE table component table. If it does, the procedure jumps to Block 23580. If it does not, the procedure checks to see if the component type (STDETYP) of the component indicated by e is a language entry definition. If not, the procedure jumps to Block 23830. If it is, the procedure initializes large buffer to blanks (Block 23590) and builds a C language TDT structure array element prefix (Block 23600).

Block 23630 builds the C source in the buffer to initialize TLENAME using the language name in the STDE table name table entry indicated by index, e.

Block 23670 builds the C source in the buffer to initialize TLEDREP using the documentation report file name, the value of STDEIPNM in the STDE table name table entry indicated by index, e.

Block 23671 builds the C source in the buffer to initialize TLEDGEN using the documentation generation name, the value of STDEOPNM in the STDE table name table entry indicated by index, e.

The procedure initializes the large buffer to blanks (Block 23850), builds the C language TLETAB table structure array definition suffix (Block 23860), and performs (Block 23870) the WTS procedure (FIG. 53, Block 25500).

The next section of the CT procedure (Blocks 23950 through 242230) generates the DB synchronization function address table. This table is used only if a procedure has been declared to be a DB user. However, although the table exists, the procedure pointer generated will be 0, so that the link editor will not try to link in the DB routines.

This section of the procedure begins at Block 23960 by initializing the large buffer to blanks and builds the C language DB synchronization function address table structure definition (Block 23960).

Block 23980 checks to see if the application contains any procedures with STDECDB2 flagged (flag set to dbtype=1). If not, the procedure jumps to Block 24100. If STDECDB2 was flagged, the procedure builds the C source to initialize the connect using the IETCONN function address. IETCONN performs a DBMS login or connect function within IET. The procedure then builds the C source in the buffer to initialize the commit using the IETCOMM function address (Block 24050). IETCOMM performs a DBMS commit function within IET.

The procedure builds the C source in the buffer to initialize the release using the IETREL function address (Block 24055) and then proceeds to Block 24210. IETREL performs DBMS release or logout function within IET.

The procedure builds the C source in the buffer to initialize the connect using zeros or null pointer value in Block 24100. At Block 24130 the procedure builds the C source in the buffer to initialize the commit using zeros or null pointer value, and then builds the C source in the buffer to initialize the release using zeros or null pointer value in Block 24160.

The procedure builds the C language DB synchronization structure initialization suffix (Block 24210), and performs (Block 24230) the WTS procedure (FIG. 53, Block 25500).

The next portion of CT procedure Blocks 24250 through 24500 generates the TDT source suffix and closes the source file. This section of the procedure begins at Block 24260 by setting the index to the beginning of the TDT suffix initialization data. The procedure checks to see if the index points to the last line of the suffix initialization data in Block 24270. If so, the procedure jumps to Block 24440. If not, the procedure copies the line of TDT suffix into the output buffer (Block 24300) and terminates the line in the buffer by placing a new line character after the data (Block 24320).

Block 24330 performs the WTS procedure: (FIG. 53, Block 25500) and saves the return code. The index is incremented and the procedure returns to Block 24350.

Block 24440 checks to see if the return code is good. If it is, the procedure proceeds to Block 24500 and closes the TDT source file. If not, the error message out, gtdmsg, is set equal to "TDT SOURCE WRITE ERROR" (Block 24460) and the program exits the CT procedure with an error.

The last portion of the CT procedure (Blocks 24560 through 25070) compiles the TDT. This section of the procedure begins at Block 24560 by setting up the compile parameter values. The compile parameters are copied to the list Block 24790). For UNIX implementation, the original directory is saved (Block 24890) and the directory where the TDT source is located is changed (Block 24900).

Block 24910 next calls the C compiler with the parameter list and saves the return code. For a UNIX implementation, the procedure changes back to the original directory (Block 24920). Block 24950 checks to see if the return code indicates the call to the C compiler failed. If it did not, the program advances to Block 25000. If it did fail, the error message out, gtdmsg, is set equal to "TDT cc spawnvp failed, errno=rc" (Block 24960) and the program exits the CT procedure with an error (Block 24970).

Block 25000 checks to see if the return code indicates the C compiler terminated with error conditions. If it did not, the program jumps to Block 25070. If it did terminate with an error, the GTD output file is shown to the user with the compiler error messages.

Block 24960 sets the error message out, gtdmsg, equal to "TDT COMPILE FAILED" and the program exits the CT procedure with an error (Block 25030).

Block 25070 sets the message out, gtdmsg, to "TDT COMPILE COMPLETE", and the program exits procedure CT.

GTD ADD VIEW NAME TO Table: TVA PROCEDURE. Looking now at FIGS. 52*a*–*b*, which depict the preferred embodiment of this procedure according to the present invention, the GTD add view name to table procedure adds an input view name to the view table in ascending sequence and updates a view table count, and begins with the Decision Block 25210 to check if the input view name is blank. If blank, the program exits the procedure with no error. If the input view name is not blank, Decision Block 25220 checks if the input view name is zero. If so, the program exists the TVA procedure with no error. If not, Decision Block 25250 checks if the number of views exceed the maximum view table size. If yes, the program sets the error message field, GTDMSG=VIEW TABLE FULL (Block 25260) and exits the TVA procedure with an error (Block 25270).

If the number of views do not exceed the maximum view table size, a view table location is found for the view table name (Block 25350). The view table is built in an ascending sorted manner. Decision Block 25355 checks for the input view name, vname, to see if it was found at the view table location. If found, the program exits the TVA procedure (Block 25420). If input view name, vname, is not found at the table location, the procedure moves the table entries over to make room for the new name (Block 25360) and then proceeds to Block 25390.

Block 25390 step puts the name, vname, in the table at the location that was found, and then increments the view count NV (Block 25400). When this is completed, the program exits the TVA procedure (Block 25420).

GTD WRITE BUFFER TO FILE: WTS PROCEDURE. Briefly considering FIG. 53, which depicts the preferred embodiment of this procedure, the GTD write buffer to file procedure begins at Block 25530 by writing the data buffer to file. Decision Block 25550 then checks if the write was successful. If not, the error message field is set GTDMSG= TDT SOURCE WRITE ERROR (Block 25560), and the program exits the WTS procedure with an error (Block 25570). Otherwise, the program exits the WTS procedure at Block 25420).

GTD COMPILE VIEW: CV PROCEDURE. Considering now FIGS. 54*a*–*mm*, which depict the preferred embodiment of this procedure according to the present invention, this process involves verifying the view compile is required, as well as building and compiling the views. The verifying process is done in the following manner. First, the name of the view object module is built and the modify date and time is collected. Next, list of all the views is built from the TDF. Then, the modify dates of user view files and the transaction view file are checked against the date of the view object module. The build and compile process is required if any of the user view files or the transaction view file has an equal or later date than the view object module, or if an unconditional compile is requested by the user.

During the build view process the C transaction view file (.h) is regenerated from the COBOL transaction view file to maintain consistent transaction views between COBOL and C language procedures.

VMOH and VMOF tables are constructed for each user view. Help, glossary, and information profile views are constructed with VMOH and VMOF tables and written out to the view C source file. For each user view, the view fields are read into a table, and the VMOH and VMOF tables are constructed and written out to the view C source file. If the construction is successful, the view source file is closed and the view is compiled.

Starting at Block 25870, the GTD compile view CV procedure rewinds the GTD output file and saves the maximum view length in the variable gtdmvwl (Block 26120).

Blocks 26170 through 26285 set the fully qualified pathname of the view object module and obtain the object module modification date and time. The fully qualified view object module file pathname is built using the map library pathname: gtdmlib, the TDT name: gtdmmem, and the suffix View.o (Block 26170).

In Block 26280 the existence of the view object module is checked and the file description information is obtained. Block 26285 checks if the view object module exists. If so, the view object module modify date/time is stored in otime and the program continues executing with Block 26380. If not, otime is set to zero and the program continues executing with Block 26380.

The next portion of the CV procedure, (Blocks 26380 through 26465) builds a list of views from information contained in the STDE table. First the number of views is set to zero, NV=1 (Block 26465), and the pointer, e, is initialized to the beginning of the STDE table. Decision Block 26405 checks to see if e points beyond the end of the STDE table. If so, the procedure jumps to Block 26510. If not, the procedure checks to see if the current entry in the STDE table entry is a procedure entry, STDETYP=C (Block 26410).

If the STDE table entry is not a procedure entry (Block 26410) the program continues executing at Block 26460. If the STDE table entry is a procedure entry, then TVA procedure (FIG. 52, Block 25170) is performed to add the input view name STDEIPNM to the view table (Block 26420). If the input view is not successfully added, the CV procedure is exited with an error (Block 26425). Otherwise, the procedure adds the output view name STDEOPNM to the view table by performing the TVA procedure (Block 26430).

If the output view is not successfully added, the CV procedure is exited with an error (Block 26435). If the output view is successfully added, the TVA procedure is performed to add the profile view name STDEPVNM to the view table (Block 26440). If the profile view is not successfully added, the CV procedure is exited with an error (Block 26445). If the profile view is successfully added to the view table, e is set to point to the next STDE entry in the STDE table (Block 26460), and the procedure returns to Block 26405.

The section of the CV procedure represented by Blocks 26510 through 26590 determines whether the view compile is required in order to maintain program source/object consistency. This involves checking the unconditional compile flag and then checking the modify date/times of all view source (including the transaction view modify date and time) against the modify date/time of the view object as stored in otime. Decision Block 26510 checks to see if an unconditional compile is requested by the application developer, gtdcflag=U (Block 26510). If so, the view compile is required, compile is set to 1 (Block 26510), and execution continues with Block 26550. If not, the view compile requirement has not yet been fully determined, compile is set to 0 (Block 26510), and execution continues with Block 26550. Block 26550 sets view table index, IV, to zero.

Decision Block 26555 checks to see if the view table index is less than the number of views in the view table, IV<NV. At Block 26555 if the view table index is less than the number of views in the view table, execution continues with Block 26560 which sets the current modify date/time variable to zero, mtime. Otherwise, the program proceeds to Block 26920. Block 26560 sets the current modify date/time variable to zero, mtime.

Decision Block 26570 checks if the current view identified by index IV in the view table is the glossary profile view IETGPVW. If so, at Block 26270 the modify date/time is set to negative one (−1) indicating that no conditional compile file check is required later and execution proceeds with Block 26850. If not, execution continues with Block 26580 which checks if the current view identified by index IV in the view table is the help profile view IETHPVW. If so, the modify date/time is set to negative one (−1) indicating that no conditional compile file check is required later. Execution proceeds with Block 26590.

Decision Block 26590 checks if the current view identified by index, IV, in the view table is the information profile view IETIPVW. If so, the modify date/time is set to negative one (−1) indicating that no conditional compile file check is required later. Execution of the CV procedure then continues with Block 26600.

At Block 26600, if a file check is not required (mtime not=0), the program jumps to Block 26900. If a file check is required (mtime=0), the fully qualified user view file name is built using pathname: gtdslib, current table view name, and suffix ".v" (Block 26610).

Block 26680 checks the existence of the user view file and obtains the file description information. If the view user file exists (Block 26685), the view user file modify date/time is stored in mtime (Block 26700), and the program proceeds to Block 26850. If the view file does not exist, an error has occurred and the program advances to Block 26720. Block 26720 saves the current view table name indicated by IV into gtdvmem and performs the procedure to display a panel (FIG. 21, Block 47300), electing to display the GTDCVE3 compile view error panel (Block 26760). Block 26760 performs the FE procedure (FIG. 22, Block 48130) to check for user input end indications. If an end is indicated (Block 26785), the program exits the CV procedure with an error (Block 26830). Otherwise, the program returns to Block 26760.

In Decision Block 26850 a check is made to see if the user view file modify date/time is less than the transaction view modify date/time, mtime<tvwtime. If so, the transaction view file modify date/time is saved in mtime (Block 26850) and execution continues with Block 26860. If not, the larger of the transaction view date/time and user view file date/time, mtime, is compared to the object module modify date/time, otime. If mtime is greater than or equal to otime, then a view source has been modified and a view compile is required. The procedure at Block 26820 sets the compile flag to one and continues execution with Block 26900. If mtime is less than otime, the procedure increments the view table index IV (Block 26900) and returns to Block 26555 to check date/time validation on the remaining views in the view table.

Decision Block 26920, checks to see if a view compile is required either by the application developer (gtdcflag=U) or by the date/time validation process (compile=1). If a view compile is required (Block 26920), the procedure advances to Block 27020 to start the view compile process. If a view compile is not required, the GTD message field gtdmsg is set to "VIEW COMPILE NOT REQUIRED" (Block 26930), and the CV procedure is exited with no errors indicated (Block 26940).

Blocks 27020 through 27160 set up an internal table of transaction view field information. This process is essentially a compiler for the transaction view COBOL source which encodes the field displacement, type and length information output from the compile, and places that information into an internal table. The internal table contains for each field: the field displacement relative to the beginning of the transaction view, the field type, the field length, and the field occurrence multiple. This information is used when creating the VMOF table entries and as input to the COBOL/C translation utility which translates the COBOL transaction view into a C version of the same transaction view. Another translation utility may be employed which does not use the internal table as input. The method of the preferred embodiment used here, is efficient because it does not require any duplication of effort between generating the field offset, length, etc. information and generating the C version of the transaction view. The two views are required to result in the same memory usage and allocation for each language version of the transaction view.

Block 27020 builds the fully qualified pathname of the COBOL transaction view and then calls the internal compiler utility to generate a memory table of the transaction view field attributes discussed above. This memory table is accessed through a pointer cpytable. Decision Block 27125 checks to see if the utility was successful. If so, the program proceeds to Block 27260 to continue with the compile view process. If the utility was not successful, an error occurred, so the GTD error message field gtdmsg is set to "TVW OPEN ERROR" (Block 27150) and the CV procedure is exited with an error (Block 27160).

Blocks 27260 and 27360 invoke the COBOL to C translator to generate the C transaction view from the COBOL transaction view. This technique ensures data consistency and integrity of the transaction view interpretation between the IET and the application program as well as for applications which have both C and COBOL procedures within one load module. Block 27260 builds the fully qualified pathname of the C transaction view and then calls the COBOL to C translator (Block 27360).

Blocks 27460 through 27630 open the view source module to be generated and place constant prefix information into the source module. Every line of prefix source is copied to a buffer and then the buffer is written using WTS procedure (FIG. 53, Block 25500).

Block 27460 builds the file pathname of the view module to be generated using the SCRLIB pathname GTDSLIB, the transaction view name, and the standard suffix "VIEW.c". Block 27510 then attempts to create the view module with that constructed path. Decision Block 27515 tests for a successful create and if so, execution proceeds to Block 27550. If the create file was not successful, the CV procedure is exited with an error.

Block 27550 sets an index to the beginning of the prefix source and then proceeds to Decision Block 27555 which tests for the last line of the c view prefix source. If found, execution proceeds to Block 27700. If the last line of the prefix source has not been reached, that line of c view source is copied to an output buffer (Block 27590) and the line is terminated in the buffer (Block 27610). The buffer is then written to the c view source file (Block 27620) using the WTS procedure and the prefix source index is incremented (Block 27630).

Block 27700 initialized the index (IV) to the first name in the view table and Decision Block 27705 then determines if the index is less than the number of view table entries. If the index is greater than the number of view table entries, control is passed to Block 30660.

If the index points to a valid view table entry, Blocks 27710 through 28190 initialize multiple field names and values for that view. Block 27710 saves the view name (from the view table, indexed by IV), to a memory area.

Specifically, Block 27720 sets the view header length. The procedure then initializes the number of fields to indicate no fields counted in the user view files (Block 27770) and initializes the version with the value (0100) of the default version (Block 27780).

Decision Block 27840 tests for whether the view name (from the view table) is equal to the HELP PROFILE VIEW and, if not, execution continues at Block 27990. If so, control passes to Block 27850 which initializes the number of fields in the HELP PROFILE VIEW to four. Block 27860 then initializes the field table to blanks, and Blocks 27890 through 27920 then save field names "IEF1-HELPPNL," "IEF1-HELPCHP," IEF1-HELPSEC," and "IEF1-HELPPAG" as the first through fourth fields in the field table respectively, beginning at index 0.

Decision Block 27990 tests for the view name (from the view table, indexed by IV) equal to the glossary view and, if not found, passes control to Block 28120. If found, control passes to Block 28000 which initializes the number of fields in the HELP GLOSSARY VIEW to three. Block 28010 then initializes the field table to blanks. Blocks 28040 through 28060 then save the field names "IEF1-GLOSPNL," "IEF1-GLOSCHP," and "IEF1-GLOSSEC" as the first through third fields in the field table beginning at index 0.

Decision Block 28120 then tests for the view name (from the view table at index IV) equal to the INFORMATION PROFILE VIEW and, if not found, passes control to Block 28270. If found, Block 28130 initializes the number of fields in the help information view to three and Block 28140 initializes the field table to blanks. Blocks 28170 through 28190 then save the field names "IEF-INFOCHP," :IEF1-INFOSEC," and "IEF1-INFOPAG" as the first through third fields in the field table beginning at index 0.

Decision Block 28270 tests for the number of fields still negative and, if none are found, passes control to Block 28750. If any are found, control passes to Block 28280 which builds the user views file name using the gtdslib pathname from SRCLIB, the table view name as indexed, and the suffix, ".v".

Block 28340 then opens the user file using this pathname for read only and Block 28350 initializes the number of fields to zero. Block 28360 then reads a line from the view file and places that line in the buffer. Decision Block 28360 tests for a successful read. If not successful, control passes to Block 28610. Otherwise, control passes to Decision Block 28364 which tests whether the number of fields in the field table is less than the maximum table length and if not, passes control to Block 28610. If so, control passes to Decision Block 28390 which tests for the read buffer (Block 28360) beginning with a blank, or asterisk or binary zero, or new line and, if found, continues execution at Block 28630. If not found, Decision Block 28400 looks for the read buffer beginning with a period. If not found, control passes to Block 28520. If found, Block 28460 translates the buffer data to upper case. Decision Block 28470 tests for the buffer containing a keyword for version information and, if not found, passes control to Block 28360. If found, Block 28480 extracts version data from the buffer and places that data in the version variable. Block 28520 moves the field name to the field table at the index location of the field count. Block 28610 then increments the field count. The procedure then returns to Block 28360 to read the next line from the view file.

Block 28640 closes the user view file. Decision Block 28750 tests for whether the number of fields is non-zero and, if so, generates a reference to VMOF and passes control to Block 28760. If the number of fields is zero, control passes to Block 28850. Block 28760 builds C source in the buffer to generate a reference to VMOF, to resolve VMOF references embedded in VMOH, using the value of the view table index in the VMOF table name.

Block 28830 builds c source in the buffer to define VMOH structure, using the value of the view table name at the current index as the VMOH table name. Block 28870 builds C source in the buffer to initialize VMOHAPPL, using the value of the GTD name. Block 28920 builds C source in the buffer to initialize VMOHVIEW using the value of the view table name at the current index. Block 28980 builds C source in the buffer to initialize VMOHTME to zeros. Block 29010 builds C source in the buffer to initialize VMOHDTE to zeros. Block 29040 builds C source in the buffer to initialize VMOHVER using the value of the version variable (the default or user specified version id). Block 29080 builds C source in the buffer to initialize VMOHFMT to 1. Block 29120 builds C source in buffer to initialize VMHORSVO to zero. Block 29160 builds C source in the buffer to initialize VMOHNE using the value of the number of fields in the view.

Decision Block 29230 tests for the number of fields in the view greater than zero and, if none, builds C source in the buffer to initialize VMOHAE to zeros and then passes control to Block 29320. If the number of fields in the view is greater than zero, C source is built in the buffer to initialize VMOHAE using the value of the view table index number to generate the VMOF table name and is stored as a pointer to the first element in the corresponding VMOF array table.

Block 29320 builds C source in the buffer for VMOH structure definition initialization suffix. Block 29340 writes the buffer to the TDT source file using WTS procedure and saves the return code. Decision Block 29420 tests for the number of fields greater than zero and, if there are none, passes control to Block 30570.

If the number of fields is greater than zero, Block 29430 initializes a large buffer to blanks. Block 29440 builds in that buffer C source language for a VMOF table structure array definition using the number of fields as the number of VMOF structure elements in the table. The values of the view table index number is used to generate VMOF table names as VMOFnnnn where nnnn contains the index value. Block 29490 writes the buffer TDT source file using the WTS procedure. Block 29510 initializes an index to point to the first name in the field table.

Decision Block 29515 tests whether the table index is less than the number of field table entries and, if not, passes control to Block 30390. If so, Block 29530 saves the table file name at the index location in gtdaname, Block 29540 initializes variables fldd, fldl, fldt, and fldn to zeros, and Block 29550 finds the index value gtdaname in the internal transaction view field table.

Decision Block 29630 tests for whether the search was successful and, if so, passes control to Block 29640. If not, control passes to Block 29780. Blocks 29640 through 29670 save the field displacement, field length, field type, and field zero occurrences found in the internal table into fldd, fldl, fldt, and fldn, respectively.

Decision Block 29680 tests whether the field has zero multiple occurrences and, if so, increments the view length by the field length. Otherwise, the view length is incremented by the field length multiplied by the number of field multiple occurrences. Execution continues with Block 29910.

Block 29780 performs a procedure display (FIG. 21, Block 47300) of the GTDCVE2 panel view error display panel. Block 29800 checks for user end indication and performs the FE procedure (FIG. 22, Block 48130). If an end was indicated, execution continues with Block 29850 where the program exits the CV procedure with an error (Block 29850). If not, control is passed to Block 29780.

Block 29910 initializes a large buffer to blanks. Block 29920 builds C source in that buffer for a comment identifying the field name using gtdaname. Block 29960 builds C source for a TDT structure array element prefix. Blocks 30000 through 30210 build C source in the buffer to initialize VMOFR1ED using the value of fldd (field displacement in the work area), to initialize VMOFR1EL using the value of fldl (field length in the work area), to initialize VMOFR1EN using the value of fldn (field number of occurrences in the work area), to initialize VMOFR1ET using the value of fldt (field element data type), and to initialize VMOFRSV2 to zeros, respectively.

Block 30300 builds C source for the TDT structure array element suffix. Block 30305 writes the buffer TDT source file using the WTS procedure. Block 30310 increments the index i. The program then returns to Block 29515.

Decision Block 30390 tests whether the view is too long (gtdcvwl greater than RFVHML) and, Block 30420 performs the procedure display of GTDCVE1 panel (view error display panel). If so, Block 30440 tests for a user end indication (FE procedure, FIG. 22, Block 48130). If the view is not too long, control passes to Block 30520.

Decision Block 30445 tests the result of Block 30440 and if an end was indicated, passes control to Block 30490. Otherwise, control is passed to Block 30480 which forwards control to Block 30420.

Decision Block 30490 exits the CV procedure with an error indication. Block 30520 builds C source in the buffer for the VMOF structure array definition initialization suffix. Block 30540 writes the buffer TDT source file using the WTS procedure and saves the return code. Block 30570 increments the view table index and passes control to Block 27705.

Decision Block 30660 tests whether the return code from the last write is good and, if so, passes control to Block 30730. If not, control is passed to Block 30680 which sets an error message gtdmsg="TDT SOURCE WRITE ERROR". At Block 30690, the program exits from the CV procedure with an error.

Block 30730 closes the view C source file. Block 30740 releases memory used by the internal transaction view table. Block 30810 sets up compile parameter values. Block 30990 copies the compile parameters to a list. Block 31080 saves the original directory and Block 31090 changes to the directory in which the view source is located (UNIX implementation only). Block 31100 calls the C compiler with the parameter list built above (Block 30990) and saves the return code.

Decision Block 31130 tests whether the compiler return code indicates the compiler terminated with an error and, if so, passes control to Block 31150. If not, execution continues at Block 31200. Block 31150 shows the GTD output file to the user with the compiler error message. Block 31160 sets the error message for output gtdmsg="VIEW COMPILE FAILED". The program exits the CV procedure with an error (Block 31170).

Block 31200 sets the message for output gtdmsg="VIEW COMPILE COMPLETE". Block 31210 ends the CV procedure.

GTD COMPILE PANELS: CP PROCEDURE

Figure 55:
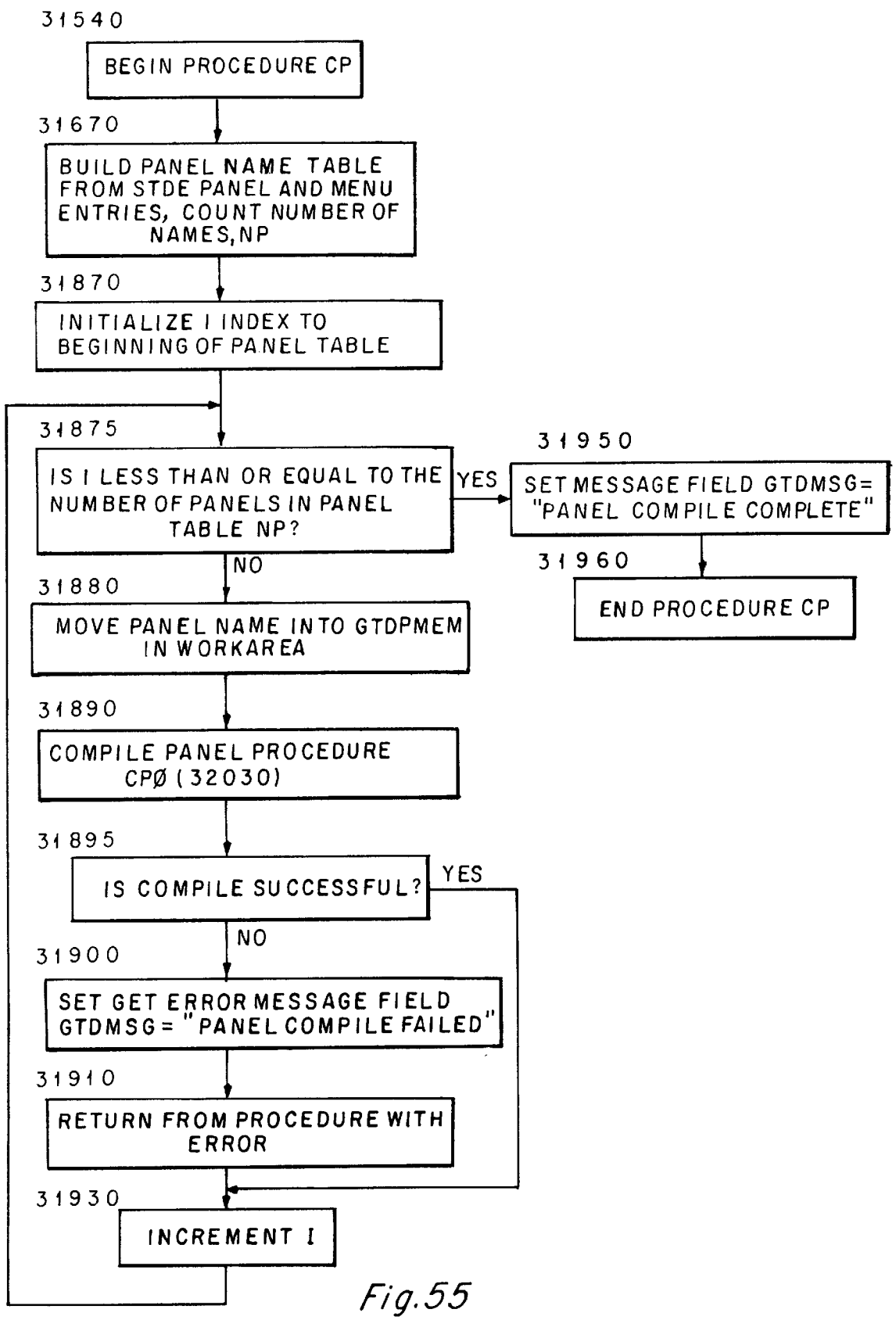
FIG. 55 is a flow chart depicting the compile panels (CP) procedure according to the preferred embodiment of the present invention.

Looking next at FIG. 55, which depicts the preferred embodiment of this procedure according to the present invention, the compile panels procedure initiates a compile process for each panel in the application. It first builds a list of all the panels in the application from the menus and panel names listed in the STDE table and then initiates the compile process for each panel in the list.

The CP procedure begins at Block 31540 by building the panel name table from the STDE panel and menu entries, and counting the number of panel names, NP (Block 31670). Then, the i index is initialized to the beginning of the panel name table (Block 31870).

Decision Block 31875 checks if i is less than or equal to the number of panels in the panel table, NP. If so, the procedure sets the message field to GTMSG="PANEL COMPILE complete" (Block 31950) and the program exits the CP procedure (Block 31960). If i is greater than NP, the procedure moves the panel name into GTDPMEM in the work area (Block 31880). Block 31890 next performs the compile the panel procedure CPO (FIG. 56, Block 32030), Decision Block 31895 checks if the compile was successful. If it was, and is incremented (Block 31930), and execution proceeds to Decision Block 31875. If compile was not successful, the get error message field is set to GTDMSG="PANEL COMPILE FAILED" (Block 31900). The procedure returns with the error (Block 31910), increments i (Block 31930), and returns to Decision Block 31875.

COMPILE PANEL: CPO PROCEDURE

Figure 56A:
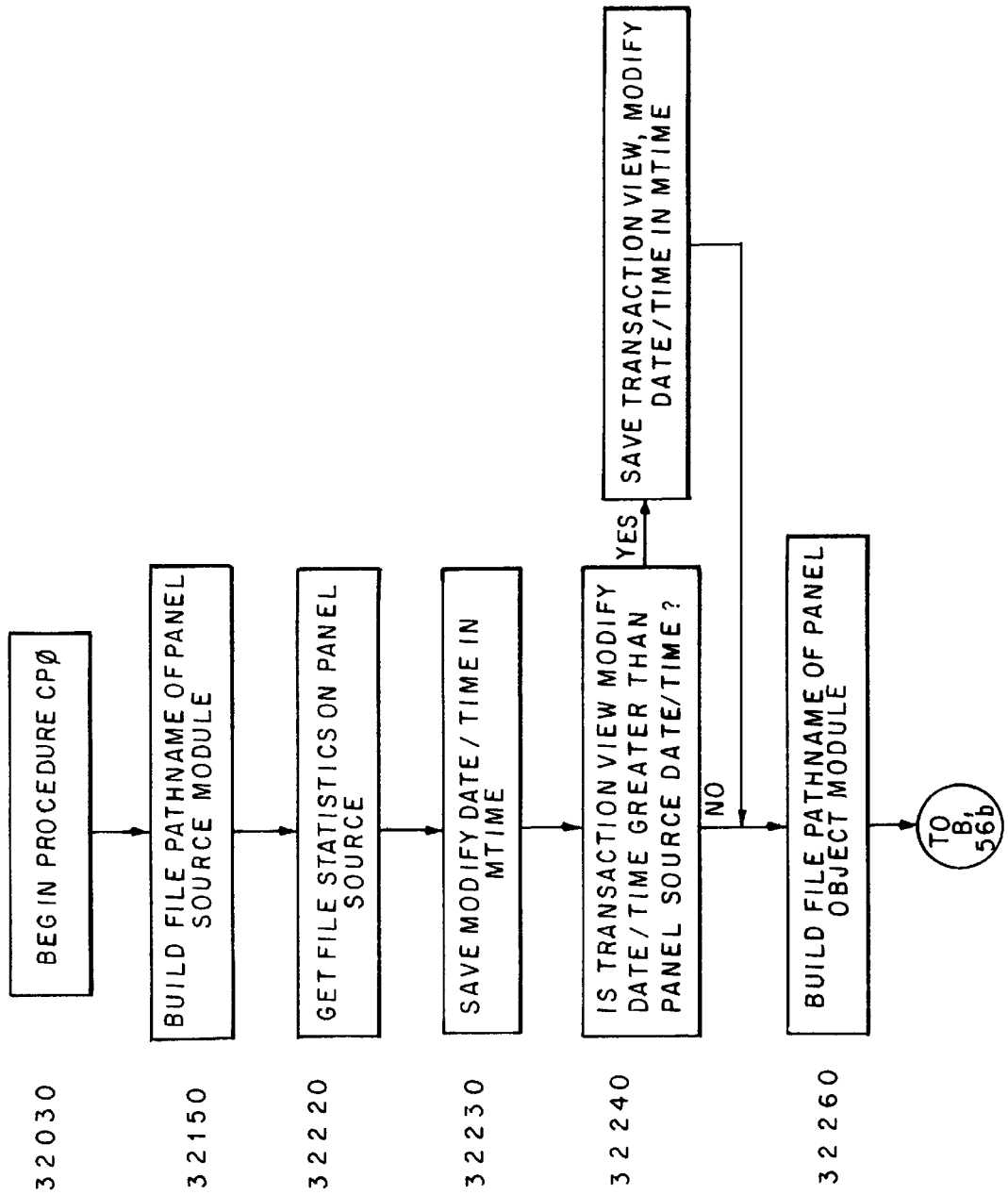
FIGS. 56*a–c* are a flow chart depicting the lower level compile panels (CPO) procedure according to the preferred embodiment of the present invention.
Figure 56B:
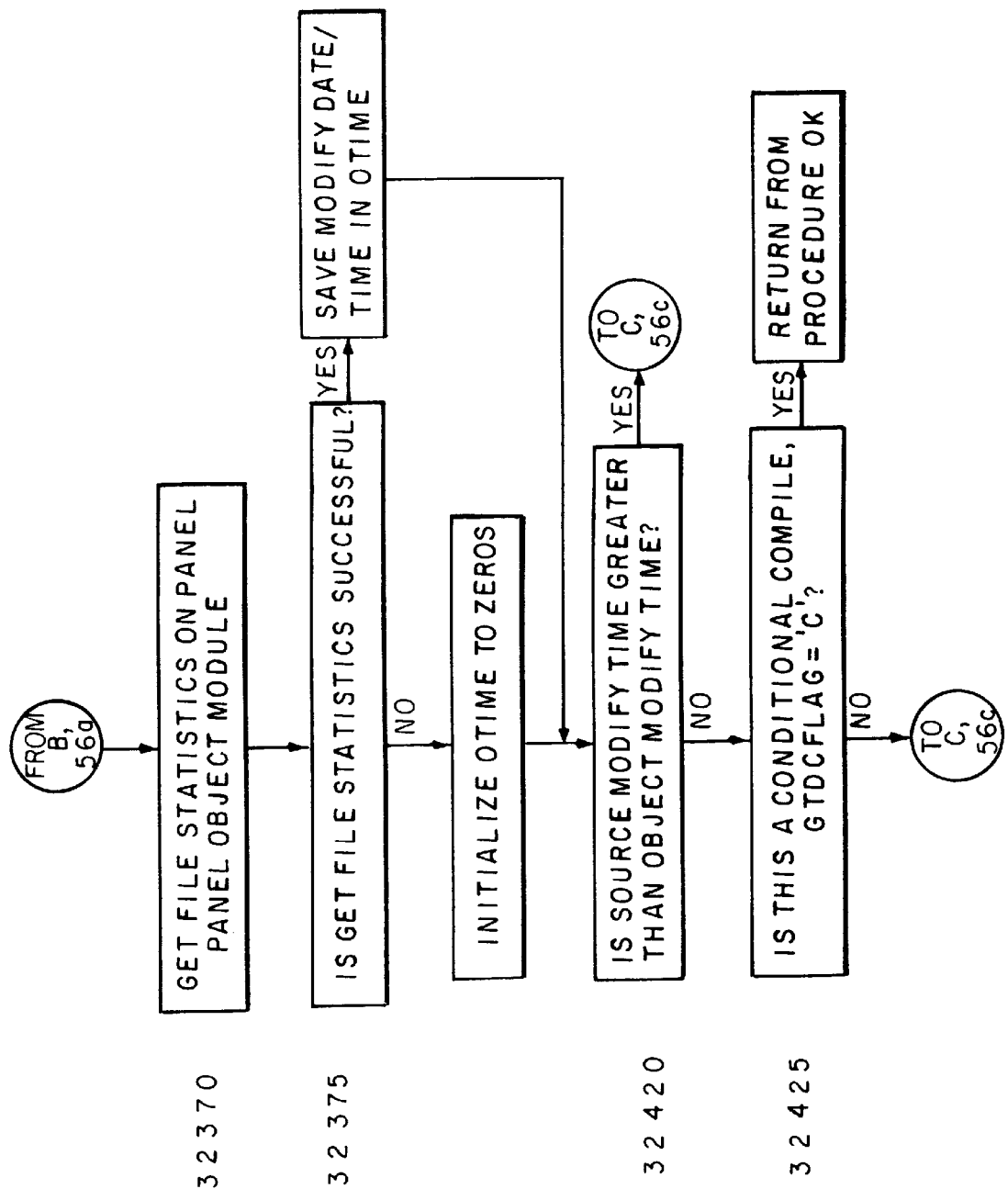
Figure 56C:
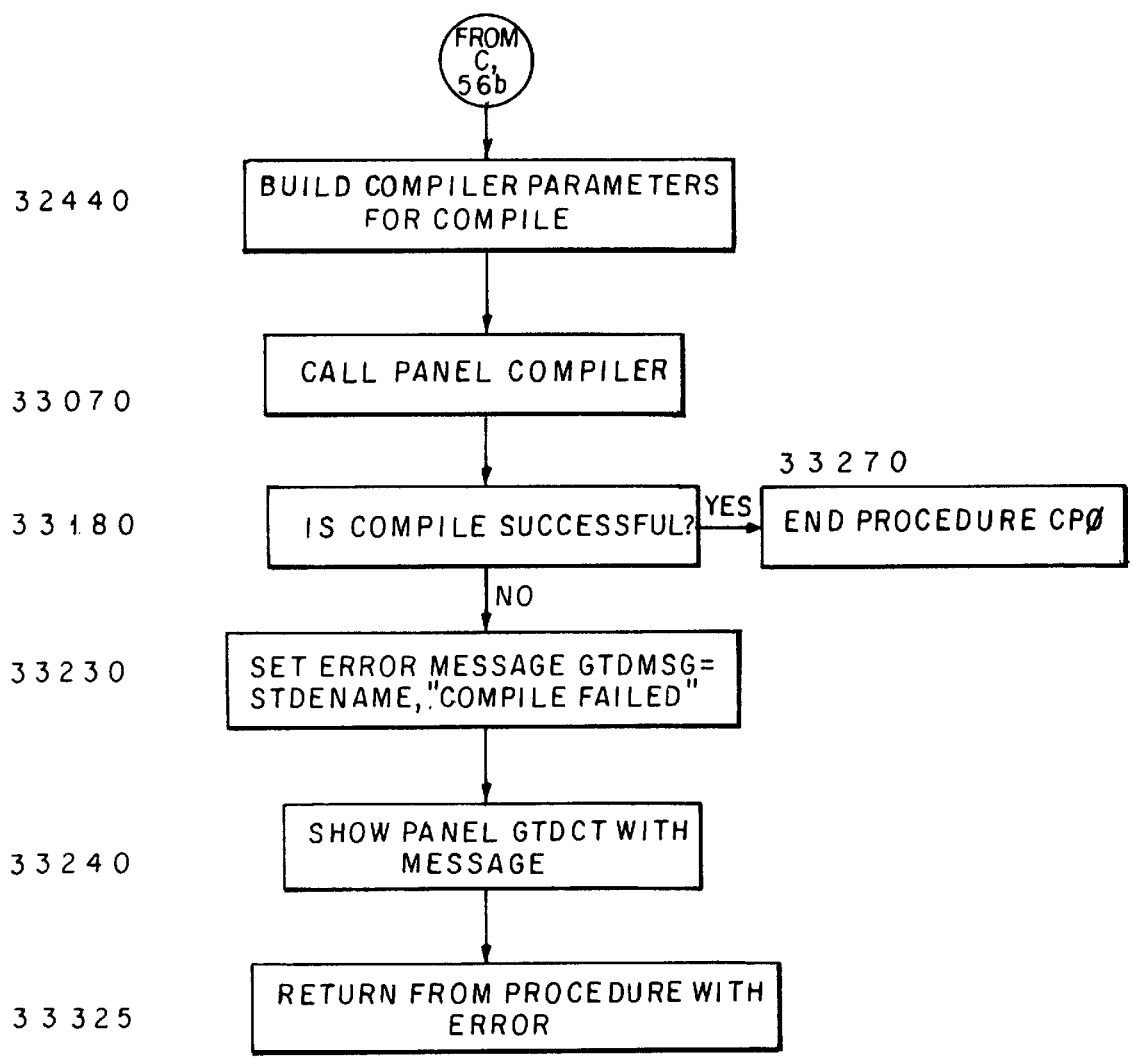

Looking next at FIGS. 56a–c, which depicts the preferred embodiment of the GTD compile panel procedure, the CPO procedure begins by building the fully qualified file pathname of the panel source module (Block 32150). The file statistics on the panel source are obtained (Block 32220) and the modify date and time are saved in mtime (Block 32230). The transaction view modify date and time are then compared to the panel source date and time. If the transaction view modify date/time is greater than the panel source date/time, the transaction view modify date/time is saved in mtime (Block 32240) and execution continues with Block 32260. If not, execution continues with Block 32260.

The fully qualified pathname of the panel object module is then built (Block 32260). The file statistics on the panel object module are obtained (Block 32370). Decision Block 32375 checks to see if the file statistics were obtained successfully.

If the statistics were obtained successfully, the object modify date and time are saved in otime. Otherwise, otime is initialized to zeros (Block 32375). The source and object modify times are then compared (Block 32420). If the source modify time is greater than the object modify time (mtime>otime) the program jumps to Block 32440.

If the source modify time is not greater than the object modify time, the program checks to see if this is a conditional compile (gtdcflag=C) (Block 32425). If so, the CPO procedure ends and returns with no error (Block 32425). If this is not a conditional compile, compiler parameters are built (Block 32440). The panel compiler is then called to produce the object file (Block 33070. The compile status is checked (Block 33180). If the compile was successful, the CPO procedure ends (Block 33180). Otherwise, the gtdmsg is set to "COMPILE FAILED" (Block 33230). The error messages are displayed, but no input is accepted from the user (Block 33240). The procedure then returns with an error status (Block 33325).

COMPILE: CC PROCEDURE

Moving now to FIGS. 57a–d, which depict the preferred embodiment of the CC procedure, the compile procedure initiates a compile process for each procedure in the application. It examines each procedure in the STDE table and calls the appropriate compiler for the procedure. In the current implementation only C and COBOL compilers are supported, however, any language may be used which can produce linkable object code.

The CC procedure begins by initializing E to point to the beginning of the STDE table (Block 33380). Decision Block 33420 checks to see if E points past the end of STDE table. If it does, the program jumps to Block 33600 and sets the message field, GTDMSG to "PROCEDURE COMPILE COMPLETE" at which time the program exits the CC procedure (Block 33610). If E does not point past the end of STDE table, the STDE entry is checked to see if it is a procedure entry, STDETYP=C (Block 33425). If the STDE table entry is not a procedure, execution continues at Block 33520. If the STDE table entry is a procedure, the procedure language is checked to see if the procedure is written in the C language, STDECTYP=C, (Block 33426). If the procedure language of the STDE entry is not the C language then the program jumps to Block 33520. If the procedure language of the STDE entry is the C language, Block 33430 calls the compile C procedure: CCO (FIG. 58, Block 33690).

Decision Block 33435 determines if the compile is successful. If the compile is successful, the program jumps to Block 33520. If not, GET error message field, GTDMSGF is set to "PROCEDURE COMPILE FAILED" (Block 33440) and the program returns from the CCO procedure with an error (Block 33450).

Decision Block 33520 determines if the STDE procedure entry is a COBOL procedure STDECTYP=COBOL (Block 33520). If the procedure language is COBOL, at Block 33530 the program calls compile C procedure, CCOBO (FIG. 59, Block 36270). If not, the program jumps to Block 33580. Decision Block 33535 determines if the compile is successful. If the compile is successful, the program jumps to Block 33580. If the compile is not successful, error message field GTDMSG is set to "PROCEDURE COMPILE FAILS" (Block 33540) and the program returns from the CCOBO procedure with an error (Block 33550).

Block 33580 increments E to the next STDE table entry and returns to Block 33420 to examine the next STDE table entry.

COMPILE C PROGRAM: CCO PROCEDURE

Looking now at FIGS. 58a–j, which depict the preferred embodiment of the CCO procedure, this procedure invokes the compiler (or compilers) necessary to build an output object for the C procedure. It first determines if a compile is necessary for the current procedure. It is necessary if the compile is an unconditional compile, or if it is a conditional compile and the transaction view source or procedure source modify date/time is larger than the object module date time. If the compile is necessary, then the compile proceeds as follows. First a DBMS compile is performed, if the procedure is flagged as a DBMS procedure in the STDE table. Then the compile is performed, followed by any required cleanup to get rid of temporary files.

The CCO procedure starts execution by rewinding the GTD output file (Block 33780), and building the fully qualified C source module file name (Block 33820). It then obtains the file statistics on the procedure source file (Block 33890) and saves the modified date/time in mtime (Block 33900).

The Decision Block 33910 determines if the transaction view modify date/time, stored in tvwtime, is greater than the procedure date time stored in mtime (Block 33910. If this is true, the transaction view modify date/time is saved in mtime (Block 33910).

If the transaction view modify date/time stored in tvwtime is not greater than the procedure date/time stored in mtime, then execution continues with Block 33930. In Block 33930, a C object module pathname for the output object is built, and file C object module statistics on procedure object module are obtained (Block 34040).

Decision Block 34045 determines if the statistics were obtained successfully, and if they were, the modify date/time in otime is saved. If they were not obtained successfully, otime is initialized to zeros. Decision Block 34090 determines if source modify time is greater than object modify time. If true, the procedure jumps to Block 34110. Decision Block 34095 determines if gtdcflag equals 'C', indicating a conditional compile. If this is true, the procedure returns with no errors.

Decision Block 34110 checks to see if the procedure is a DBMS type procedure (STDECDB2=Y). If it is not, the program jumps to Block 35170 to compile the C procedure. If the procedure is a DBMS type, the program sets up the data sets required for the DBMS pre-compiler and then invokes the DBMS pre-compiler. Block 34140 copies the C source file to a temporary file for precompiling, and builds the C DBMS pre-compiler parameters (Block 35170). It then calls the C DBMS pre-compiler (Block 35030).

Decision Block 35060 determines if the pre-compile was successful. If the pre-compile was successful, the program jumps to Block 34110. Otherwise, the user is shown the pre-compiler GTD output file containing the error messages from the pre-compiler (Block 35070) and the error message field, gtdmsg, is set up to contain the name of the failed procedure, STDENAME, together with the "PRECOMPILE FAILED" message (Block 35080). The error messages are displayed, but no input is accepted from the user (Block 35090). The procedure then returns with an error (Block 35100).

In Block 35170, the program builds C compiler parameters for the compile procedure, saves the current directory pathname (Block 35600), changes to directory gtdslib (Block 35610), calls the C compiler (Block 35620) and after the C compiler has completed, changes back to the original directory (Block 35630).

Decision Block 35670 checks to see if the C compile was successful. If it was, the program jumps to Block 35740. If the C compile was not successful the GTD output jumps to Block 35740. If the C compile was not successful the GTD output file containing the compiler error messages is shown to the user (Block 35680) and the error message gtdmsg field set up to contain the name of the failed procedure, STDENAME, together with the "COMPILE FAILED" message (Block 35690). The error messages are displayed, but no input is accepted from the user (Block 35700). The procedure returns with an error (Block 35710).

Decision Block 35740 checks to see if the procedure is a DBMS type procedure. If it is not, the program jumps to Block 36600. If the procedure is a DBMS type procedure, the program moves the compiler output object file named with a temporary name to the correct name (Block 35780), removes the DBMS temporary files (Block 36240) and sets up the message field, gtdmsg, to contain the name of the compiled procedure, STDENAME, together with the COMPILE COMPLETE" message (Block 36600). The status messages are displayed, but no input is accepted from the user (Block 36610), and the program exits the CCO procedure (Block 36630).

COMPILE COBOL PROGRAM: CCOBO PROCEDURE

Figure 59A:
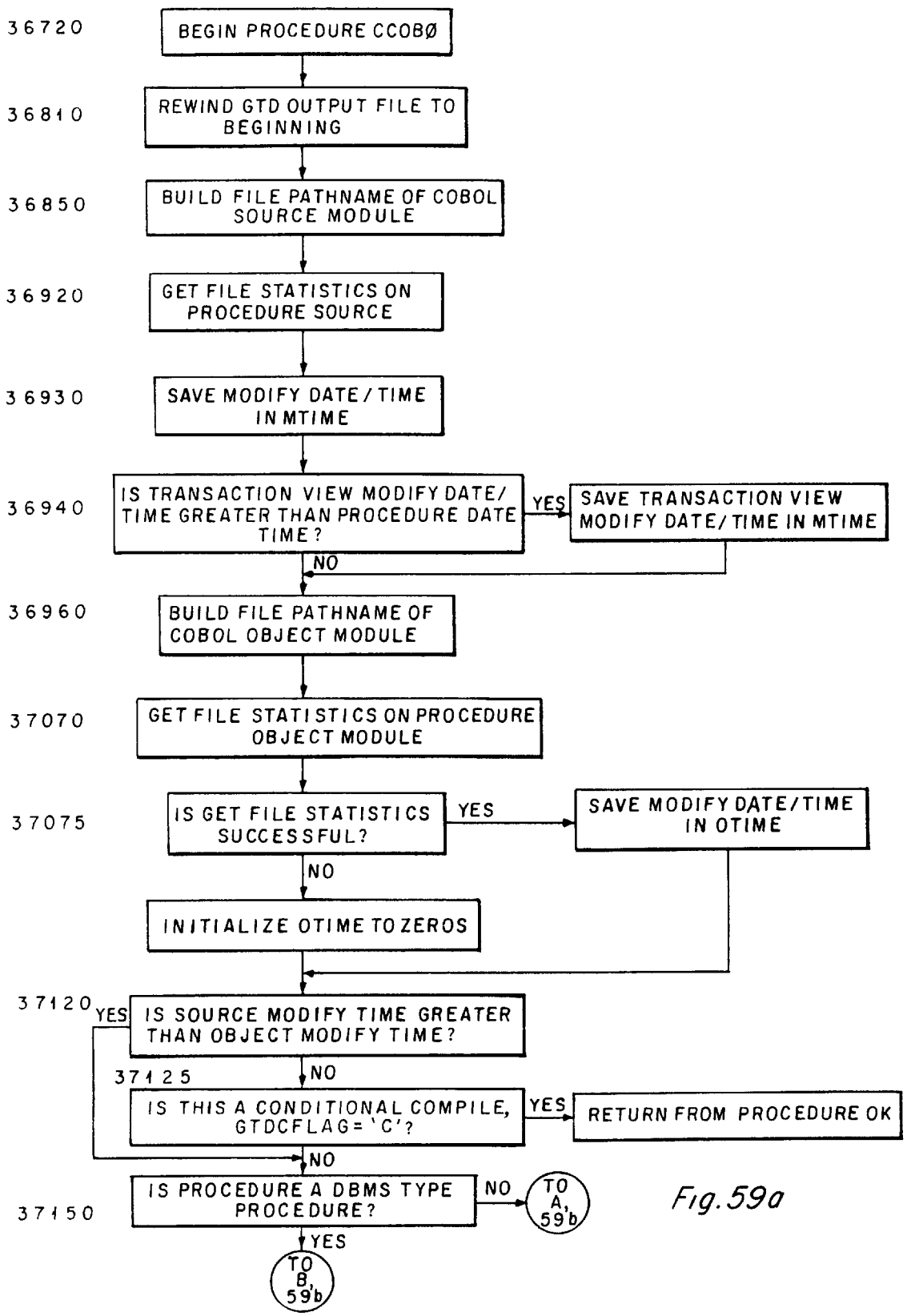
FIGS. 59*a–c* are a flow chart depicting the compile COBOL program (CCOBO) procedure according to the preferred embodiment of the present invention.
Figure 59B:
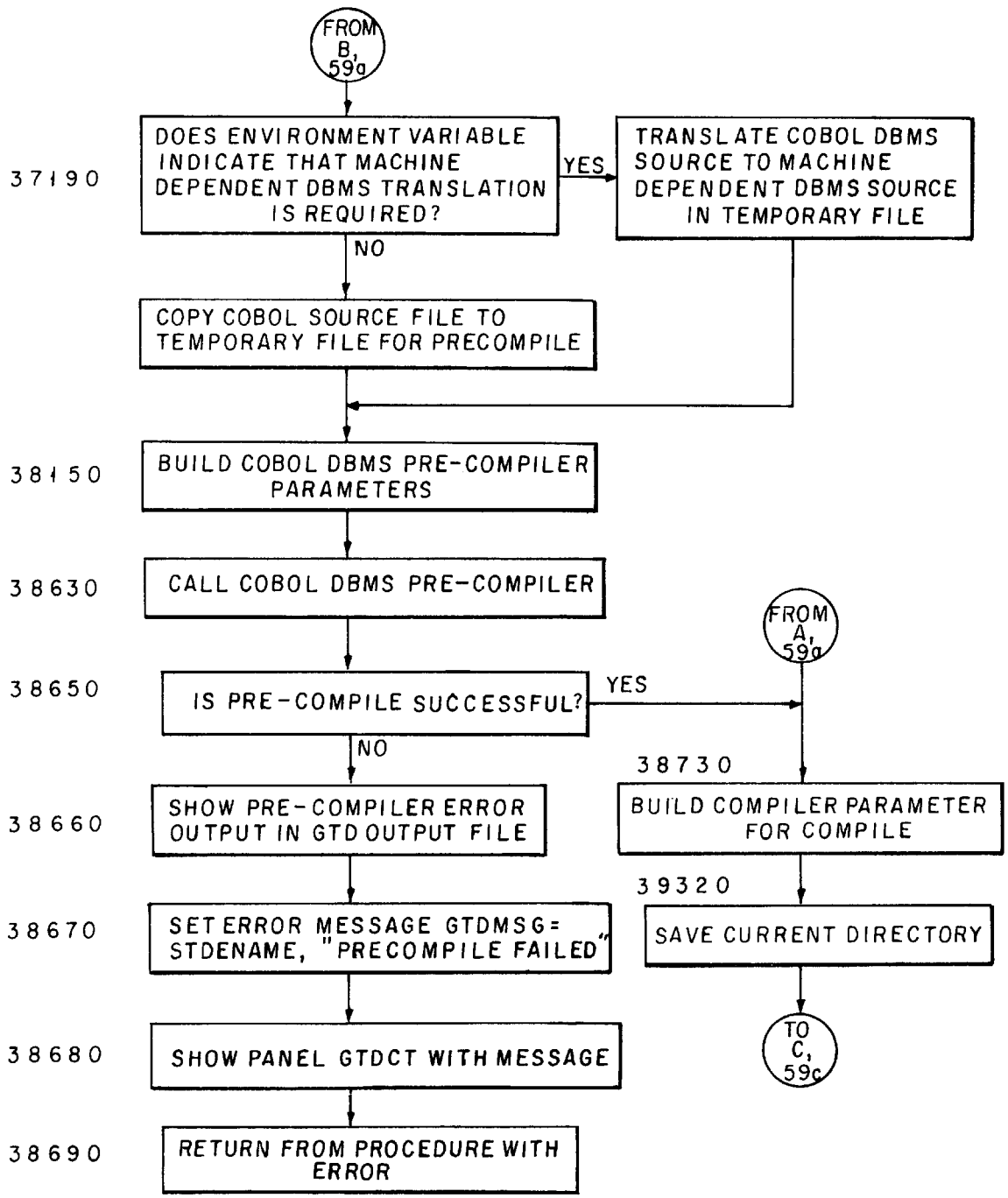
Figure 59C:
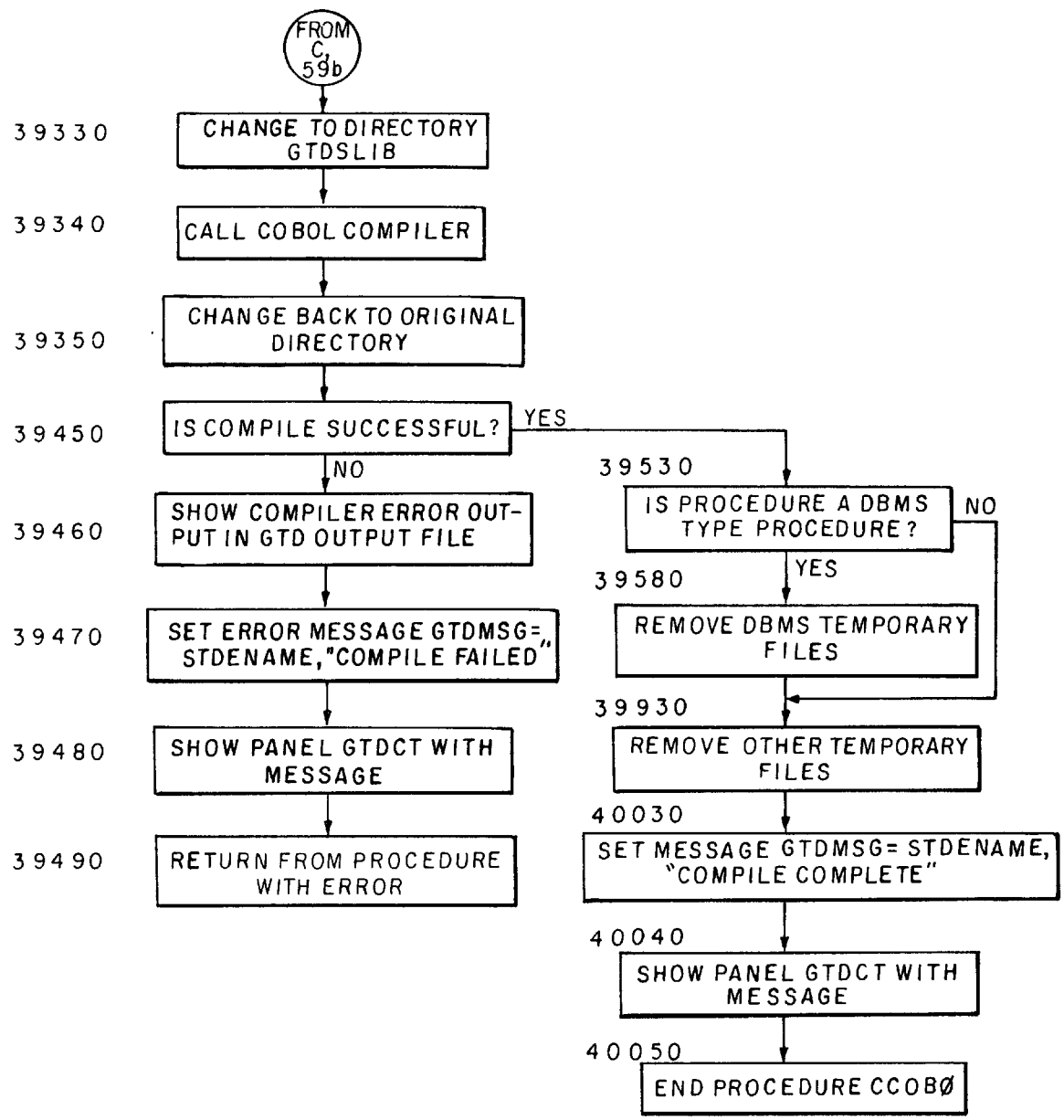

Moving now to FIGS. 59*a–c*, which depict the preferred embodiment of the CCOBO procedure aspect of the present inventions, this procedure invokes the compiler (or compilers) necessary to build an output object for the C procedure. It first determines if a compile is necessary for the current procedure. It is necessary if the compile is an unconditional compile, or if it is a conditional compile and the transaction view source or procedure source modify date/time is larger than the object module date time. If the compile is necessary, then the compile proceeds as follows. First a DBMS compile is performed, if the procedure is flagged as a DBMS procedure in the STDE table. Then the compile is performed, followed by any required cleanup to get rid of temporary files.

The compile COBOL program procedure begins (Block 36810) by rewinding the GTD output file to the beginning. Block 36850 builds a fully qualified file pathname of the COBOL source module. Block 36920 gets the file statistics on the procedure source. Block 36930 saves modified date/ time in field mtime. Block 69640 determines if the transaction view modified date/time is greater than the procedure date/time. If it is, the program saves the transaction view modified date/time in mtime. Block 36960 then builds the fully qualified pathname of the COBOL object module.

Block 37070 gets the file statistics on the procedure object module. Decision Block 37075 determines if the file statistics were obtained successfully. If they were, the program saves the modified date/time in otime and jumps to Block 37120. If the statistics were not obtained successfully, the program initializes otime to zeros and continues execution with Block 37120.

Block 37120 determines if the source file modify date/ time is greater than the object file modify date/time. If the source file modify date/time is not greater than the object modify date/time, then the program returns from the CCOBO procedure. If the source file modify date/time is greater than the object modify date/time, then execution continues with Block 37150.

Decision Block 37150 determines if the procedure is a DBMS type procedure. If it is not, the program jumps to Block 38650. If the procedure is a DBMS type procedure, Block 37190 determines if the environment configuration information indicates that a machine-dependent DBMS translation is required. If so, the program translates COBOL standard DBMS source to machine dependent DBMS source placing it into a temporary file, and execution continues with Block 38150. If not, the program copies the COBOL source file to a temporary file for a standard DBMS pre-compile.

Block 38150 builds the COBOL DBMS pre-compile parameters, and Block 38630 calls the COBOL DBMS pre-compiler. Decision Block 38650 determines if the pre-compile was successful. If it is, the program jumps to Block 38730. If not, the pre-compile error output in the GTD output file (Block 38660) is displayed, the error message field, GTDMSG, is set up to contain the name of the failed procedure, STDENAME, together with the "PRECOMPILE FAILED" message (Block 38670) and the error messages are displayed, but no input is accepted from the user (Block 38680). The procedure returns with an error (Block 38690).

If the pre-compile is successful, the program (Block 38730) builds the compiler parameters for the compile, (Block, 39320) saves the current directory, (Block 39330) changes to directory gtdslib, (Block 39340) calls the COBOL compiler, and (Block 39350) changes back to the original directory.

Decision Block 39450 determines if the compile was successful. If so, it jumps to Block 39530. If not, the program shows the compiler error output in GTD output file (Block 39460), sets the error message field to contain the name of the failed procedure, STDENAME, together with the "COMPILE FAILED" message (Block 39470). The error messages are displayed, but no input is accepted from the user (Block 39480, and (Block 39490) returns from the procedure with an error.

If the compile is successful, the program determines (Block 39530) if the procedure is a DBMS type procedure. If not, the program jumps to Block 39930. If the procedure is a DBMS type procedure, the program removes the DBMS temporary files.

Block 39930 removes other temporary files. Block 40030 sets the status message field to contain the name of the compiled procedure, STDENAME< together with the "COMPILE COMPLETE" message (Block 40030). The status messages are displayed, but no input is accepted from the user (Block 40040). The program exits the CCOBO procedure (Block 40050).

BIND TRANSACTION: BT PROCEDURE

The final step in preparation of a GTD transaction is the BIND process for the TDT member. This process extracts all GTD system-provided runtime members necessary to execute the transaction along with each of the designer-specified procedures, panels and views creating the appropriate load module.

Figure 60A:
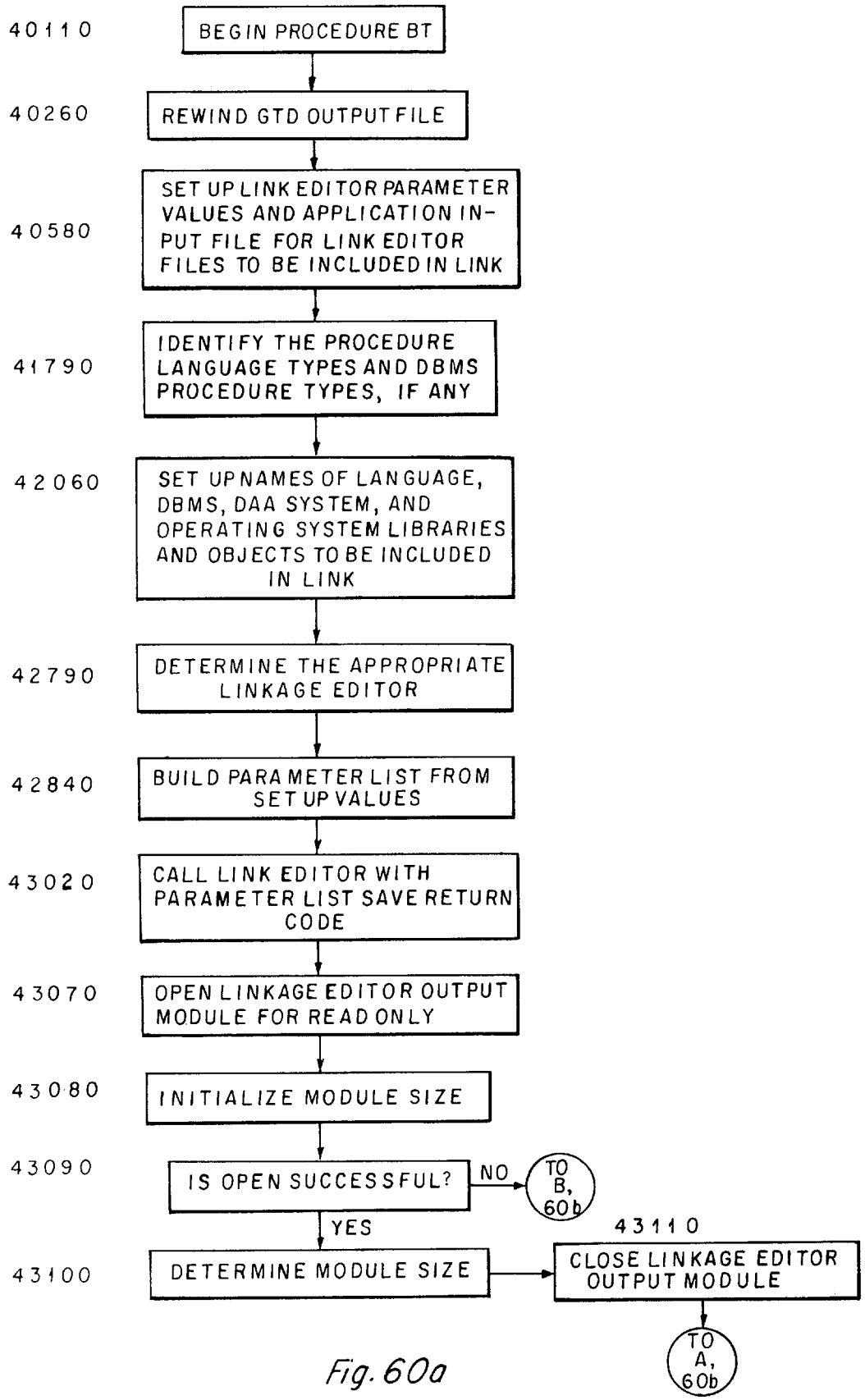
FIGS. 60*a–b* are a flow chart depicting the bind transaction (BT) procedure according to the preferred embodiment of the present invention.
Figure 60B:
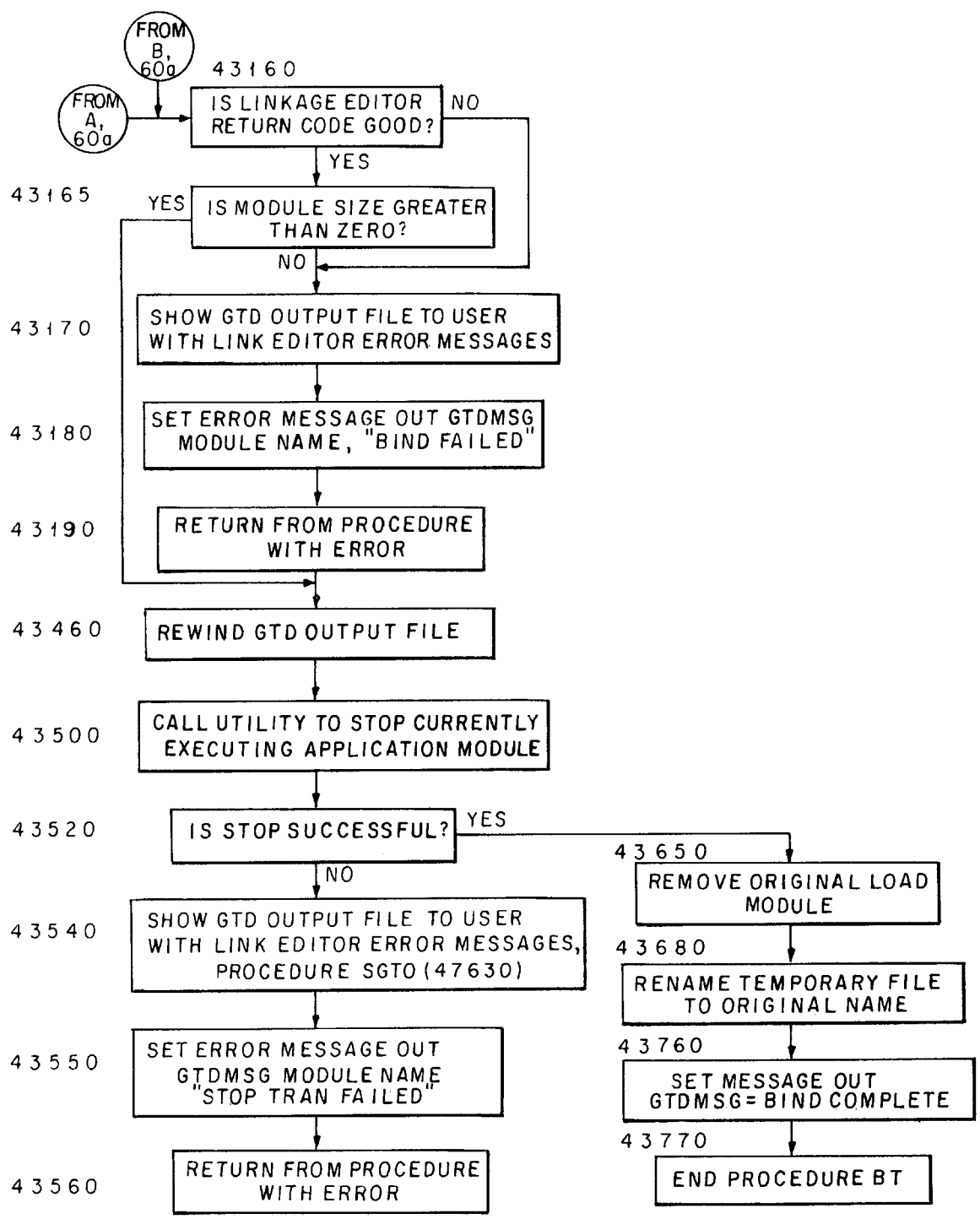

Consider now FIGS. 60a–b, which depict the preferred embodiment of the BT procedure aspect according to the present invention. The bind transaction procedure builds the application load module and installs it in an executable directory or library. It may also perform a data base bind if required by the DBMS used. In the implementation documented here this was not necessary; however, on the mainframe a DBMS bind must be performed before the load module can access the DBMS successfully. The load module is built with a linkage editor. This utility resolves all unresolved references made to DAA, application, or system libraries. Library references can either be dynamically loaded at execution time or linked in with the load module. It is preferred to have library modules dynamically loaded at execution time.

The BT procedure begins by rewinding the GTD output file (Block 40260), sets up the link editor parameter values and application input file with link editor files to be included in the link editor procedure (Block 40580) identifies the DBMS procedure types, if any, and procedure language types (Block 41790), sets up names of language, DBMS (if any), DAA system, operating system libraries and object files to be included in the link (Block 42060).

The appropriate linkage editor to use is determined (Block 42790).

The parameter list is built from the setup values (Block 42840).

The link editor is called with the generated parameter list and the link editor return code is saved (Block 43020).

The linkage editor output module is opened for read only (Block 43070) and the module size is initialized (Block 43080).

Decision Block 43090 checks to see if opening the linkage editor output module was successful. If the open was not successful, the program jumps to Block 43160. If the open is successful, the module size is determined (Block 43100) and the linkage editor output module is closed (Block 43110).

Decision Block 43160 checks to see if the linkage editor return code is good. If not, the program proceeds to Block 43170. If the return code is good, the linkage editor output module is checked to see if its size is greater than zero (Block 43165. If the module is greater than zero, the program jumps to Block 43460. If not, the output file containing the linkage editor error messages is displayed (Block 43170), the error message field, GTDMSG is set to "BIND FAILED" (Block 43180), and the program returns with an error (Block 43190).

The program rewinds the GTD output file (Block 43460) and calls the task termination utility to stop the currently executing application module (Block 43500). This is due to an operating system restriction on UNIX which prevents a currently executing load module from being overwritten by a new copy. This does not apply to the mainframe implementation. A way to get around the problem is to kill the task and then replace the load module.

If the stop is successful, the program advances to Block 43650, removes the original load module (Block 43650), renames the temporary file to the original name (Block 436080), sets the error message field, GTDMSG to "BIND COMPLETE" (Block 43760), and the program exits the BT procedure (Block 43770).

If the stop is not successful, the program shows the user the output file containing the linkage editor error messages (Block 43170) sets the error message field, GTDMSG, to "STOP TRAN FAILED" (Block 43550) and returns from the BT procedure with an error (Block 43560).

FILE TRANSFER PANELS/PROCEDURES/VIEWS/DOCUMENTATION

The last area of the GTD involves the File Transfer Panels, Procedure, views, Documentation Procedure which provides the interfaces necessary to file transfer all or part of the application source from one DAA machine to another.

The file transfer file is built by passing a list of all data sets for transfer to an archive utility, which is supported on both platforms, to archive the application files into one large file. This archive file is then shipped to the destination system using standard data transfer channels between the two systems. This data transfer should have a capability to bit an unarchive utility, once the file is shipped, to unarchive the file into its component files into appropriate corresponding file locations on the destination machine.

The file transfer menu option needs only to present panels to the user permitting the selection of required components for transfer to the destination environment. It may then modify a copy of the TDF to comply with the target machine naming conventions. Other application source components are independent of the naming conventions on the different platforms due to the capabilities provided by the IET.

Specifically, the GTD file transfer procedure begins at Block 115640 by building a parameter list for the file transfer user interface utility including USERID. MAPLIB, and TDTNAME (Block 115750). The output file is rewound to the beginning to capture any utility output messages (Block 116260) and the file transfer user interface utility is invoked (Block 116300). Decision Block 116410 checks to see if the file transfer was successful. If it was, the program exits the FT procedure. If not, the procedure shows the messages in the output file (Block 116450), sets the error message field, GTDMSG equal to "FT FAILED" (Block 116455), and exits the FT procedure with an error.

TRANSACTION DEFINITION TABLE

Figure 4:
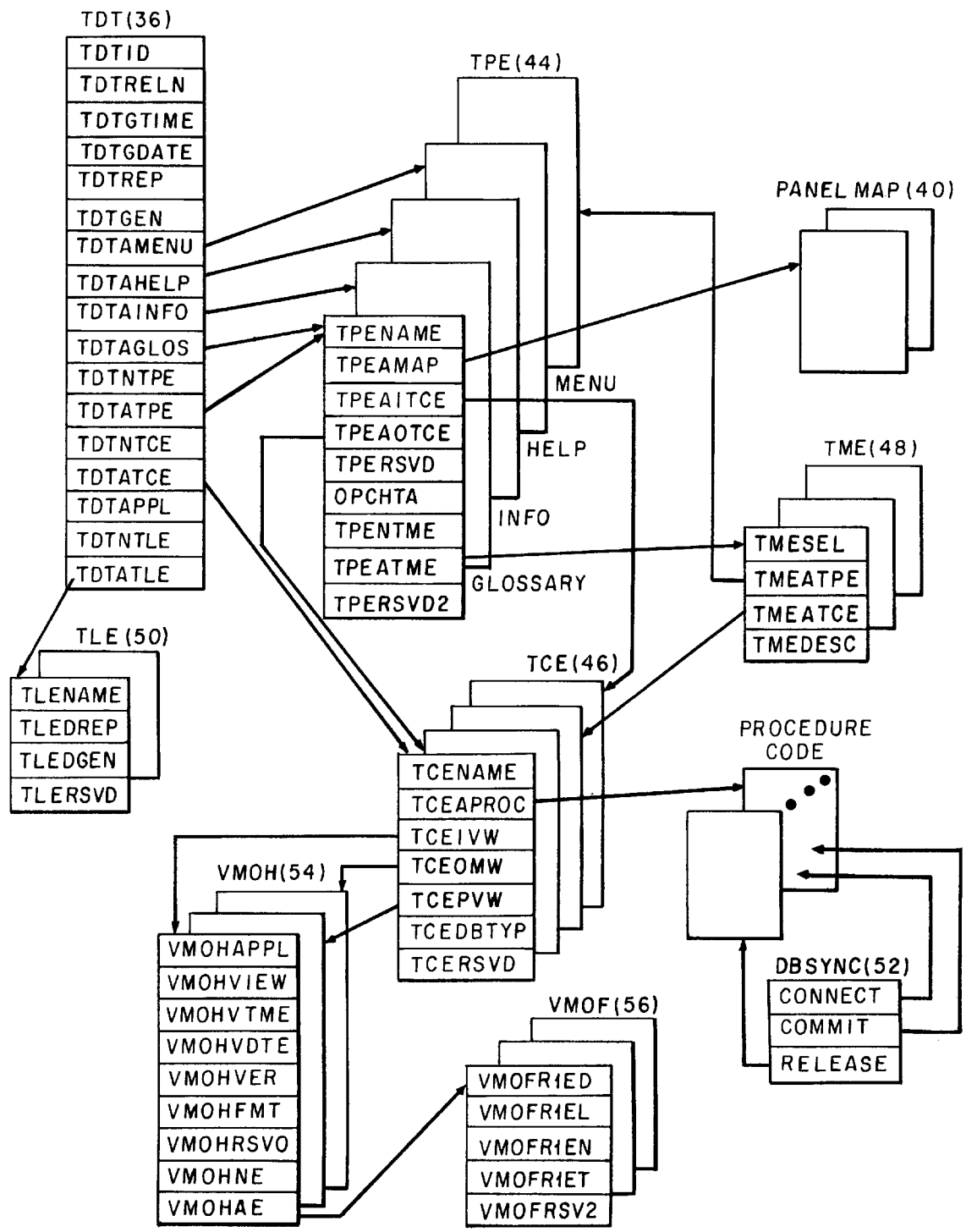
FIG. 4 is a graphical representation of internal configuration of a transaction definition table (TDT), according to the present invention.

The Transaction Definition Table, or TDT, as used throughout this description, consists of various tables of information stacked together so that the IET can easily access the appropriate information at run-time for the transaction procedures. As seen in FIG. 4, the TDT consists of the following table types, described in further detail below: TDT overhead 36, list of panel map entries (TPE) 44, list of procedure entries (TCE) 46, list of menu entries (TME) 48, list of language entries (TLE) 50 defining the various languages (i.e., English, French, German, etc.) in which the documentation is available, and list of SQL data base processing procedures (DBSYNC) 52.

Where pointers are used, if the number of entries is zero or this particular type of entry is not used by this specific transaction, the pointer value may be NULL.

Each table type is described below by listing the name of the entry type and a brief description of its purpose.

TDT OVERHEAD. The TDT overhead 36 contains all of the global information about the transaction and pointers to the various tables. It consists of the following fields:

TDTID is the four character application identification.

TDTRELN is the four character release number.

TDTGTIME is the time that this TDT was generated.

TDTGDATE is the date that this TDT was generated.

TDTREP is the eight character documentation report name.

TDTDGEN is the eight character documentation generation name.

TDTAMENU is the pointer to the menu entry in the TPE table.

TDTAHELP is the pointer to the help entry in the TPE table.

TDTAINFO is the pointer to the info entry in the TPE table.

TDTAGLOS is the pointer to the glossary entry in the TPE table.

TDTNTPE is the number of entries in the TPE table.

TDTATPE is the pointer to the first entry in the TPE table.

TDTNTCE is the number of entries in the TCE table.

TDTATCE is the pointer to the first entry in the TCE table.

TDTAPPL is the four character application name.

TDTNTLE is the number of entries in the TLE table.

TDTATLE is the pointer to the first entry in the TLE table.

TRANSACTION PANEL ENTRIES (TPE). The TPE list 44 is an array of TPEs each describing a single transaction panel, the combination of which includes all panels required for the processing of a procedure and containing the following fields:

TPENAME is the eight character panel name.

TPEAMAP is the pointer to the panel map data for this panel.
This is generated by the map compiler, external to the TDT.

TPEAITCE is the pointer to the input TCE for this panel.

TPEAOTCE is the pointer to the output TCE for this panel.

TPERSVD1 is a twelve character reserved field.

OPCHTA is the pointer to the help table.

TPENTME is the number of TMEs for this panel if it is a menu panel.

TPEATME is the pointer to the first entry in the TME table for this panel if it is a menu panel.

TPERSVD2 is a twenty character reserved field.

TRANSACTION PROCEDURE ENTRIES (TCE). The TCE list 46 contains pointers to various VIEWs which are described by the View Map Object Header (VMOH) and View Map Object Field (VMOF) structures which define views and are described later. The TCE list is an array of TCEs each describing a single application-supplied procedure, the combination of which includes all procedures required for the processing of an application transaction. The TCE contains the following fields:

TCENAME is the eight character procedure name.

TCEAPROC is the pointer to the entry point of the application supplied procedure.

TCEAIVW is the pointer to the input view VMOH.

TCEAOVW is the pointer to the output view VMOH.

TCEAPVW is the pointer to the profile view VMOH.

TCEDBTYP is a character describing the data base type. (SQL=1).

TCERSVD is a seven character reserved field.

TRANSACTION MENU ENTRIES (TME). The TME list 48 is an array of TMEs each describing a single menu entry. Each TME points to a TPE or a TCE, or both, and contains the following fields:

TMESEL is the eight character selection code for this entry.

TMEATPE is the pointer to the TPE to be used for this selection code.

TMEATCE is the pointer to the TCE to be used for this selection code.

TMEDESC is the thirty-two character description of this entry.

TRANSACTION LANGUAGE ENTRIES (TLE). The TLE list 50 is an array of TLEs each describing a language (i.e., English, French, German, etc.) in which the documentation is available, and containing the following fields:

TLENAME is the eight character language name.

TLEDREP is the eight character documentation report name.

TLEDGEN is the eight character documentation generation name.

TLERSVD is a twenty-four character reserved field.

SQL DATA BASE PROCESSING PROCEDURE (DBSYNC). The DBSYNC table 52 contains the pointers to the various entry points for the data base procedures defined by the data base protocol and needed by IET during the execution of a transaction. It consists of the following fields:

CONNECT is the procedure pointer to the entry point of the data base connect procedure.

COMMIT is the procedure pointer to the entry point of the data base commit procedure.

RELEASE is the procedure pointer to entry point of the data base release procedure.

VIEW MAP OBJECT HEADER (VMOH). The Views discussed earlier are described by a View Map Object Header (VMOH) 54 and a list of View Map Object Fields (VMOF) 56. The description of the VMOF 56 follows the VMOH description given directly below. The VMOH 54 contains the static information about a view and a pointer to the array of VMOFs. It consists of the following fields:

VMOHAPPPL is the four character application name.

VMOHVIEW is the eight character view name.

VMOHVTME is the view compile time.

VMOHVDTE is the view compile date.

VMOHVER is the four character version.

VMOHFMT is the one character view format.

VMOHRSVO is a one character reserved field.

VMOHNE is the number of VMOF entries.

VMOHAE is the pointer to this view's VMOF array.

VIEW MAP OBJECT FIELD (VMOF) ARRAY. The VMOF array 56 contains the displacement, length and type of each field in the view. Each VMOF entry consists of the following information:

VMOFR1ED is the displacement of this data element in the transaction view work area.

VMOFR1EL is the length of this data element.

VMOFR1EN is the number of occurrences for this data element.

VMOFR1ET is the one character data element type. This type includes, but is not restricted to the following types: binary; character; signed character; unsigned character; small; short; long; hyper; unsigned small; unsigned short; unsigned long; unsigned hyper; single; and double.

VMOFRSV2 is a three character reserved field.

The last major area of the present invention is the IET, or dialog manager. The IET communicates with the user indirectly through the input and output messages. Whenever messages are communicated to the user the IET calls a transaction processor interface function which communicates with the transaction processor. The transaction processor is then responsible for the presentation of output messages to the user and accepting input messages from the user. In this way a dialog may be maintained between the user and the application program through the IET and the transaction processor.

Communication between the application program and the IET is performed through the transaction view. The data fields within the transaction view are initialized by the IET when it receives an input message. When the input data contains formatted text, the IET interprets the formatted text by using the header information in the input message to locate the appropriate map and then calls the map interpreter to extract the input field information from the input message and place in the transaction view. The data fields are also initialized by the application procedure before relinquishing control to the IET. The data fields are then placed in the formatted output data when the IET calls the map interpreter again. The formatted output is placed in the data portion of the output message and header information built. Communication fields within the transaction view exist to allow the application procedure to instruct the IET as to what action to perform once the application has relinquished control. Two typical actions are to present a new panel to the user or to perform a link request to a new procedure.

The IET communicates with the application profile. The IET maintains a separate application profile record for each unique user/application/transaction. A DBMS interface procedure called by IET performs all application profile input and output. Typically, the IET reads the application profile whenever a new message is received from the transaction processor and writes the application profile before sending a message to the transaction processor.

The IET provides the application with services for handling menus, help and documentation, message and screen formatting, and cooperative processing. The TDT includes the structure and names of the panels which contain the application menus. It also contains the list of application procedures and panels referenced by each menu entry. An IET input and output procedure exists to perform processing and navigation for each level of menu supported by IET. Thus menu handling logic is completely handled by the IET without involving any application procedures. Help and documentation is supported by the IET in a similar manner. The help and documentation files are listed in the TDT. There are IET input and output procedures for handling both help and documentation processing or navigation without involving any application procedure. The IET provides for cooperative processing through its link and return capabilities and its use of a profile view. This protocol allow data to be passed between two processes and profiles for the maintenance of saved data in the two processes and application profile, allowing a dialog between the processes to obtain a cooperatively achieved result. The IET provides the application control over message and screen formatting services through the control fields in the transaction view which indicate the current and next panel display names. The application can control the panel displayed by changing these fields.

The services the IET provides for the application which include menu handling, help and documentation handling, application profile management, cooperative processing and message/screen formatting isolate the application from the platform software by allowing the IET to handle any differences in platform software and hardware related to interface differences for file input/output, screen formatting and message handling. The IET implementation for each platform provide isolation for the application program. Further isolation is maintained through the use of common high level languages and a common embedded DBMS language interface for data base applications on all platforms. It is a result of the isolation from the hardware and software-dependent interfaces and the use of common language implementations which allow application portability across multiple execution environments.

The IET communicates with a remote application through the use of link and return protocols, data input and output view interfaces and a routing request header. The LINK is a request to IET to initiate the execution of a remote application procedure. The RETURN is a request to IET to return control to the initiator of the LINK request. The interface view includes documentation on the initiating procedure, the remote application procedure, the user terminal devices and the systems on which they are located. The INPUT view lists the items which are to be included as input then a LINK request is performed. The OUTPUT view lists the data items which are to be included as output on a RETURN request. All these views are included in the view objects built by GTD for use by IET in the processing of LINK and RETURN requests.

The IET performs different functions for both the LINK and RETURN requests depending on whether the application procedure is requesting LINK or RETURN functions or whether the IET has just received an input message containing either a LINK or RETURN routing request header. Whenever the IET complies with an application LINK or RETURN request it builds the header as part of the output message. The header uses an identifying keyword at a well-known location in the data and includes the interface view as well as data obtained from the transaction view which corresponds to the data items listed in the input (for LINK request) and output (for RETURN request) views for the application procedure just executed. The output message is then sent to the transaction processor for handling. The transaction processor recognizes a routing request header on the output message and treats it appropriately. Whenever the IET receives an input message containing a routing request header, the IET determines if the message has come to the correct system; if not, the message is forwarded to the appropriate system. Otherwise, the application profile is retrieved and placed in the transaction view, then the interface and input (for LINK requests) and output (for RETURN requests) view data is placed in the corresponding data names in the transaction view for the application procedure to be executed. The application procedure is then executed. The applications procedures involved are in control of exactly when the LINK and RETURN requests are performed.

Figure 62A:
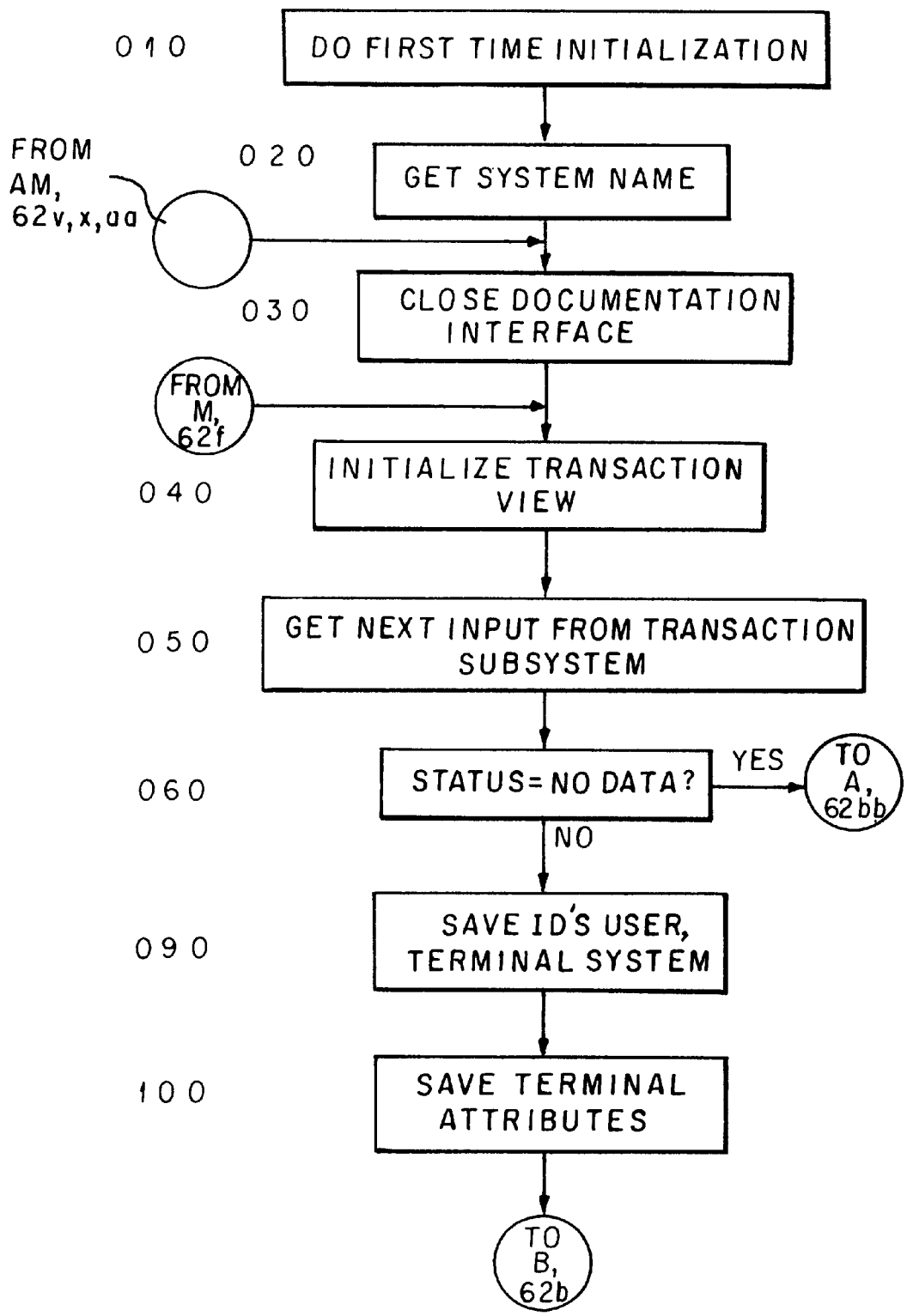
FIGS. 62*a–bb* are a flow chart depicting the information engineering task aspect of the preferred embodiment of the present invention.

At this point, the Information Engineering Task will be considered in greater detail. FIGS. 62a–bb depict a flow chart of the preferred embodiment of this aspect of the present invention. As stated earlier, the IET is the control module for every DAA transaction and is written to be entered through a call from the transaction processing subsystem when the DAA transaction is executed by the user. Such subsystems might be IMS on MVS or Tuxedo on Unix platforms.

IET must get control of a transaction via the transaction processing system, for every instance of the transaction execution. GTD forms an executable transaction module by link-editing the TDT, maps, user procedures and the IET module together with the transaction sub-system main interface module which calls the IET.

Several key variable areas and components are referenced throughout the description of the IET logic, and are briefly described here.

Transaction Definition Table (TDT): As indicated earlier, the TDT is critical to the success of IET since the TDT provides all of the variable information, in table form, that the IET module needs to control the flow of panels and data between the user and the application procedures. The TDT also provides pointers to the menu panels, help panel, and glossary panel. Reference to the TDT discussion presented earlier will enable one to better understand the IET logic flow.

Transaction View (TV): As defined earlier, a transaction view is a collection of variables that contains state information, names and pointers used throughout IET to control flow of processing between IET and the user procedures. It consists of a set of well-known IET variables followed by user-specified variables. This is the only way IET and the user procedures have to communicate information back and forth. A pointer to this area is passed to a user's procedure every time it is called. Example of fields contained in this view are the executing-system-name, active-panel-name, user-id and transaction-name.

IETM/IETI headers: These headers are separate collections of blocks that precede the IET interface messages exchanged between systems and transactions. IET interface messages are used to communicate requests between systems and between transactions. They contain a header, a control block and the message or view data. The data in the header (IETM) and the control block (IETI) provide IET with information regarding the origin and destination system environments of the message as well as the capabilities of the requesting terminal. This data is used to route the message to the destination and the response back to the originator. It is also used to determine what conversion, if any, needs to be done on the data in the message. It should be noted that the names of the various fields are strictly of choice and should not limit the scope of the invention.

The IETM header defines the total length of the interface message and the transaction requested. It consists of the following fields:

IETMLL is the length of the IETM message including this header.

IETMZZ is a reserved field and contains zero.

IETMTRAN is the eight character transaction name.

IETMBLNK is a one character field and contains blank.

IETMCONT is the eight character control code and contains "=IETCONT". This field is the key used by IET to identify this as an interface message.

The IETI control block follows the IETM header and describes the originating and destination system environments. It consists of the following fields:

IETILL is the length of the IETI control block.

IETIZZ is a reserved field and contains zero.

IETIAPPL is the four character application ID.

IETIVIEW is the eight character view name.

IETISYST is the eight character name of the system owning the requesting terminal. This may not be the originating system for the message.

IETIRSV1 is an eight character reserved field.

IETICC is the one character command code. It specifies the type of request (LINK, RETURN, FORWARD, or TERMINAL).

IETIRC is the one character return code.

IETIMC is the one character message code.

IETIHCNT is the one character hop count. This field is used to prevent looping in the network during routing.

IETIUSER is the eight character user ID.

IETITERM is the eight character terminal name.

IETIONO is a four character reserved field.

IETIAPLO is the four character originating application identification.

IETISYSO is the eight character originating system name.

IETITRNO is the eight character originating transaction name.

IETIPRCO is the eight character originating procedure name.

IETIFMT is the one character IETI format (Normal=1).

IETIRSV2 is a three character reserved field.

IETIAPL1 is the four character Destination Application Identification.

IETISYS1 is the eight character destination system name.

IETITRN1 is the eight character destination transaction name.

IETIPRC1 is the eight character destination procedure name.

IETIMTCH is a one character, character type (EBCDIC=0, ASCII=1). It is used by IET at the destination to determine what character code conversion may be needed on the message data.

IETIMTIN is the one character integer type (Normal=0, Byte-swapped=1).

IETIRSV4 is a six character reserved field.

IETITRMD is the sixteen character terminal definition information. This defines the capabilities of the terminal.

IETIRSV5 is an eight character reserved field.

IBM 3270 data streams are referenced in the following description because it reflects the preferred embodiment of the present invention. Nevertheless, such reference should not in any way limit the scope of the invention.

Consider first FIG. 62a, which depicts the beginning of the IET flow chart. As a result of the transaction subsystem main module having called the IET, IET logic at Block 10 does first time initialization of global accessible variables and key fields in the transaction view. Some of these variables and key fields include: a TDT pointer, iopcb and altpcb (both of which are passed to the IET by the transaction sub-system main module), as well as pointers to a screen build area, message buffer, view buffers, and documentation screen buffer. At Block 20, the IET obtains the local system name from the system.

The main loop of IET begins at Block 30, wherein new messages are fetched from the transaction sub-system for the given transaction identification. This block starts by closing the documentation interface, if it was left open due to, for example, a previous pass through the main logic.

Block 40 initializes the transaction view. This consists of clearing the TV by zeroing the pointers and setting the character fields to blank, loading the system name, date and time from the operating system and getting the TDT identification, application identification, and release number from the TDT.

At this point, Block 50 is executed to get the next input from the transaction subsystem. Decision Block (60) then determines if any new data is available to the DAA system: STATUS=NO DATA?. If there is not a new data stream available, the IET interface jumps to Block 1660 of FIG. 62bb, discussed later, to exit the IET interface.

If the logic of Block 60 has determined there is a new data stream available, Block 90 is executed. The user identification and terminal identification are retrieved from the sub-system iopcb and stored into the TV. Block 100 saves the terminal attributes, such as color capability, highlighting, reverse video, etc., and stores them in the TV.

Figure 62B:
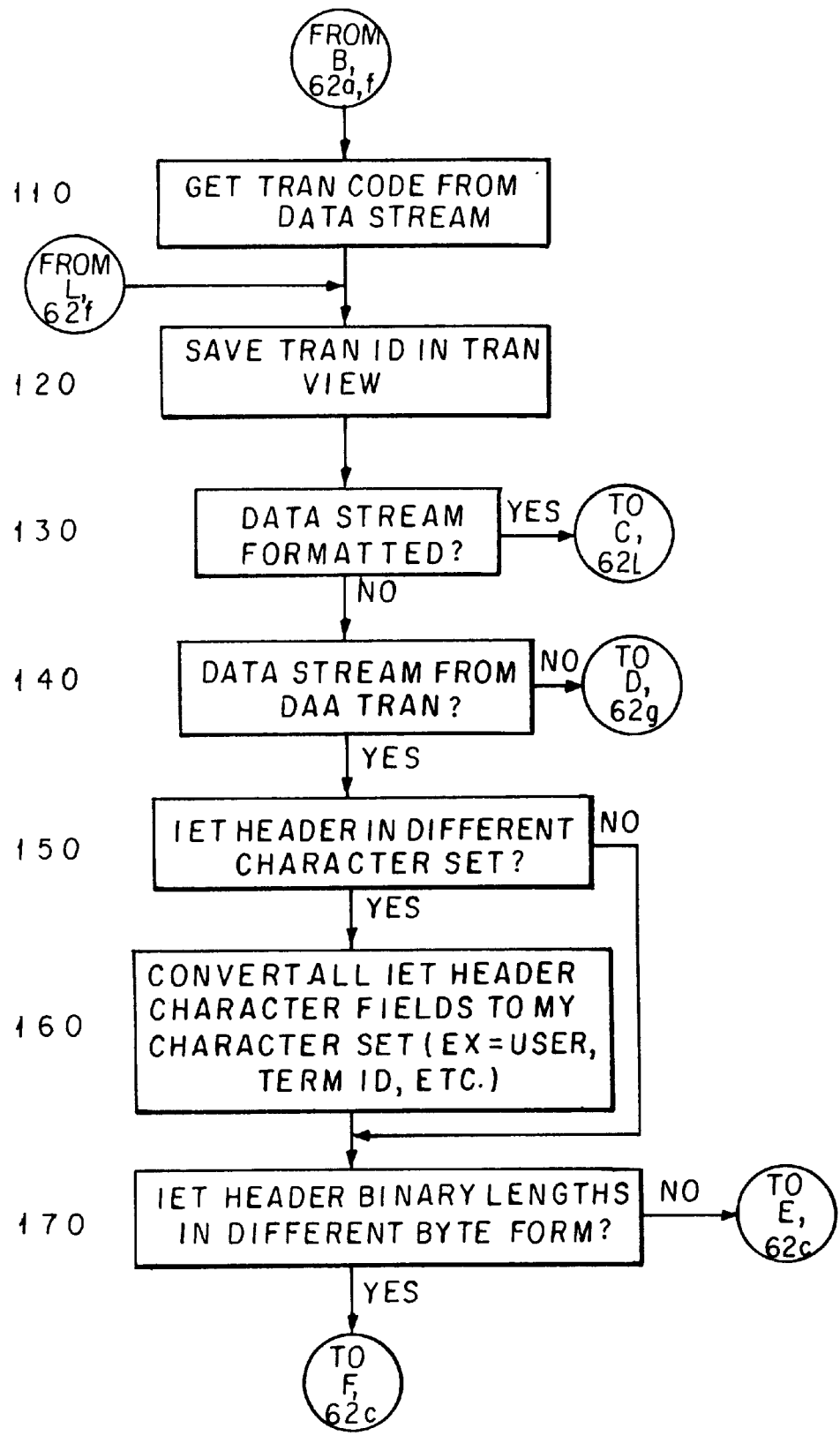

Continuing to FIG. 62b, Block 110 gets the transaction identification from the data stream and translates it to native code (ASCII or EBCDIC). Block 120 saves the transaction identification and stores it in the TV.

Next, Decision Block 130 checks the input data stream to see if the data is formatted, i.e., directly from a 3270 formatted screen. The check is made by looking for a 3270 SBA in the first byte of the 3270 data stream and, if found, the stream is declared formatted. This implies the data stream came from a 3270 type terminal with a formatted panel displayed.

"Unformatted" implies input from a cleared (unformatted 3270 screen) or at least the first part of the input has no 3270 data stream. The latter case may occur, where formatted data is found later in the message following a special header. If the data stream is formatted then IET will jump to Block 780 or FIG. 621, discussed later, where the formatted screen is processed.

The logic of Decision Block 140 at this point begins the processing of the "unformatted" data stream. This block checks to see if the data was built by IET in another DAA transaction, and inserted into this transaction, by looking for a literal "=IETCONT" following the clear text tran code in the input message. If the data stream is from a DAA transaction, then it will have an IET header consisting of IETM and IETI, described earlier. If the test yields a negative decision, the IET interface moves to Decision Block 470 of FIG. 62g, discussed later, where processing begins for a true unformatted message from a 3270 terminal.

If, however, the test yields a positive decision, the IET moves to Decision Block 150, where it checks if the sending IET's character set is different from the receiving IET'S character set (e.g., ASCII versus EBCDIC), by comparing the character type field of the IETI header with a the receiver's type. If the IET header is from an EBCDIC system, and the local IET is ASCII, the IET interface converts all IETI character fields to ASCII (Block 160).

When a message has IET headers, there should be three separate 2byte binary length fields, one in IETM, one in IETI and one preceding the messages data following the IETI header. Since the lengths are built by the sending IET process, they will be in the native machine format of that IET's hardware. Some hardware stores the high-order byte first followed by the low order byte (e.g., IBM 370) while other hardware stores there short values byte-swapped with the low order byte first followed by the high-order byte (e.g., Intel). Therefore at Block 170, the IET compares the local, or receiving, IET's binary length storage type to that of the sending IET's hardware type. Continuing to FIG. 62c, if the types are compatible then IET jumps to Block 190. Otherwise the bytes are swapped in the three different length fields at block 180. The IET then continues to Block 90 where it saves the user identification, terminal system, terminal identification, and terminal attributes from the IETI header and stores them into the TV.

The logic at Decision Block 220 checks the IETI command code field for a LINK request code. A LINK request indicates that the requesting IET has attached an input view block (following the IETI header) to be processed by this system and this transaction. If this is not a LINK request then control is passed to Block 310 of FIG. 62e, discussed later.

If there is a LINK request code, the view stack is cleared (Block 230). The view stack is kept on disc (heretofore referred to as ROLLFILE), indexed by user identification and application identification. Throughout IET operation this stack is used to save and restore view variables at different points in the transaction execution. In addition, when a view is stored, the panel name and transaction name are also stored with the request. When a link request is received, the IET at Block 230 clears all previous views for the current user identification and application identification. The IET at Block 240 then puts the current IETI header onto the top of the stack for the user and application identifications.

At Block 250, the IET moves the name of the requested link-to-procedure from the IETI header to the TV in preparation for execution of the procedure for the given input view that follows the IETI header. Continuing to FIG. 62d, once the procedure name is identified, at Block 260, the IET scans the procedure table entries (TCE, discussed earlier) for the named procedure and saves a pointer to the TCE with a matching name.

Proceeding to Block 270, the IET uses the TCE block to locate the profile view list, TCEPVW. This list is used to extract the profile view data fields from the TV and move them to a separate view work area. Once the view work area is built, the IET has a contiguous list of fields which represents the profile view prior to processing the LINK request input view. Block 280 then saves this profile view by putting it on to the stack for the specified user and application id.

Block 290 then uses the above input view list (VMOH/ VMOF) and moves each field in the input view into the TV. As they are moved character fields are translated, if necessary, from EBCDIC to ASCII or visa-versa. Also byte swapping is done if the machine storage types are different (see Block 170 for discussion). As documented in the TDT, the VMOF entry for a given field contains the appropriate information to do the mapping, including the offset into the TV, the length of the field, and the format of the field (character, etc.). After the TV is populated, the IET interface continues to Block 1200 of FIG. 62s, discussed later, to start the input procedure specified by the TCE (Block 260 above).

If a LINK request has not been indicated (Block 220), control is passed to Block 310. At this point, the IET checks the IETI command code for a RETURN command. If it is not a RETURN, control is passed to Block 400 of FIG. 62f, discussed later. If it is a RETURN request, Block 320 is executed to extract the returned-to-procedure name from the IETI.

Block 330 operates similar to Block 260 and locates the TCE pointer for the returned-to-procedure.

At Block 340, the IET restores the profile view fields by popping the last pushed view off the stack for the user and application identification. Included in the restore process is the output panel name saved when the LINK was done. Then the IET uses the TCE field, TCEPVW, as a pointer to the profile view list structure, VMOH, and its list of VMOF entries (one per field in the view), to restore all the fields from the profile view to the TV (Block 350).

The TCE is then used to locate the output view list, TCEOVW (Block 370). From this list of fields the TV is populated with the data from the view data that followed the IETI header. Block 370 employs similar logic to that of Block 350, except the output view list is used instead of the profile view list.

At this point, the IET at Block 380 sets the output panel name into the TV using the panel name that was restored from the profile data base in Block 340. Control is then passed to Block 1200 of FIG. 62s, discussed later, to start the output procedure specified by the TCE (Block 330 above).

Figure 62E:
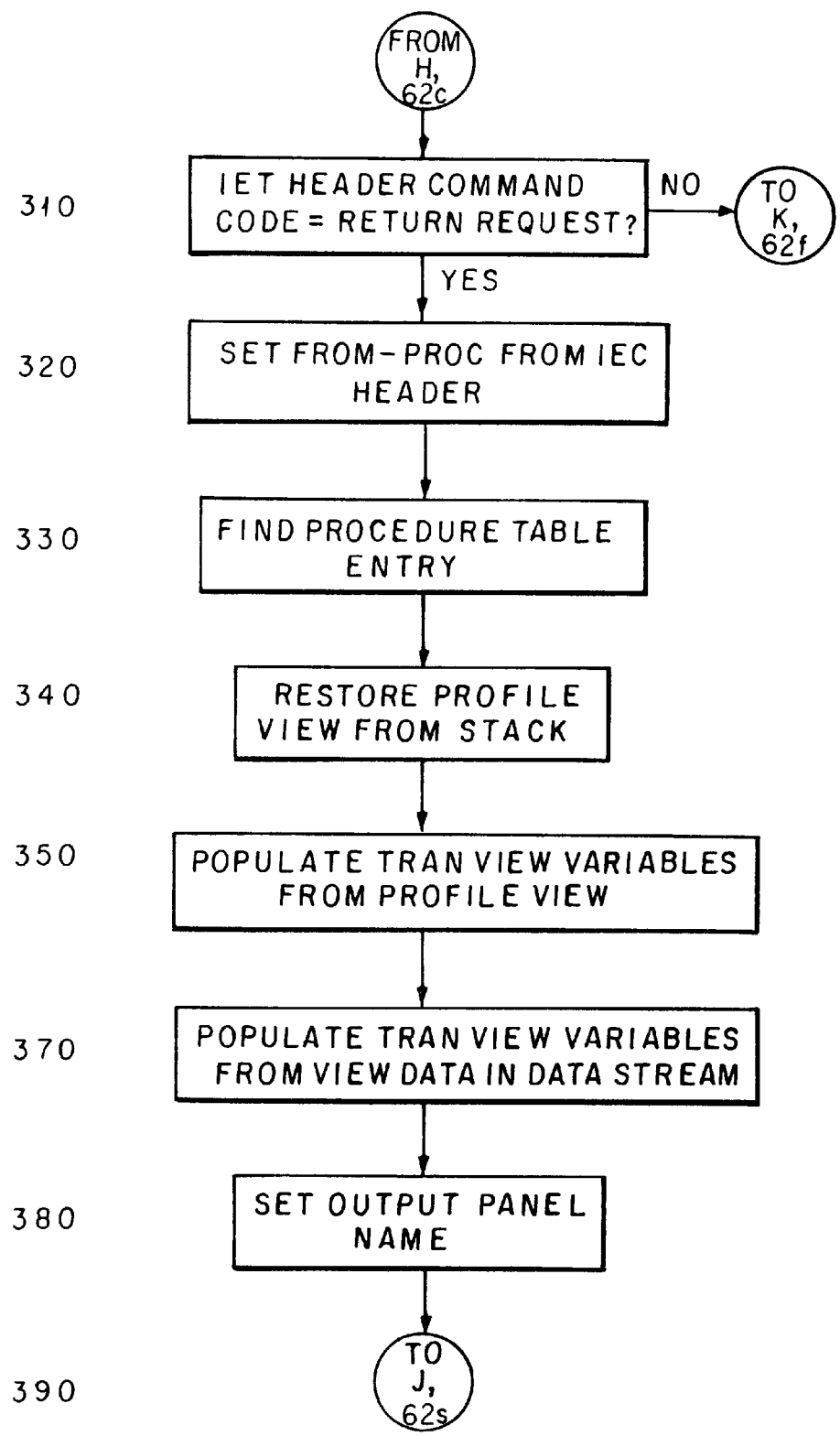
Figure 62F:
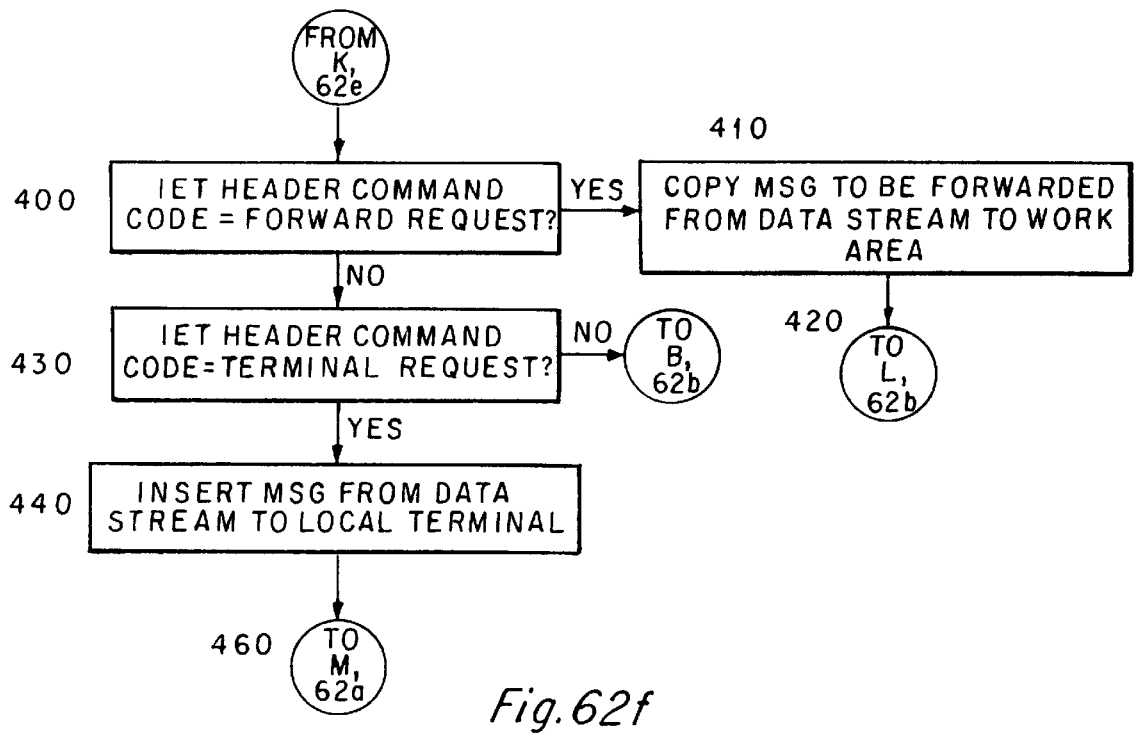
Figure 62G:
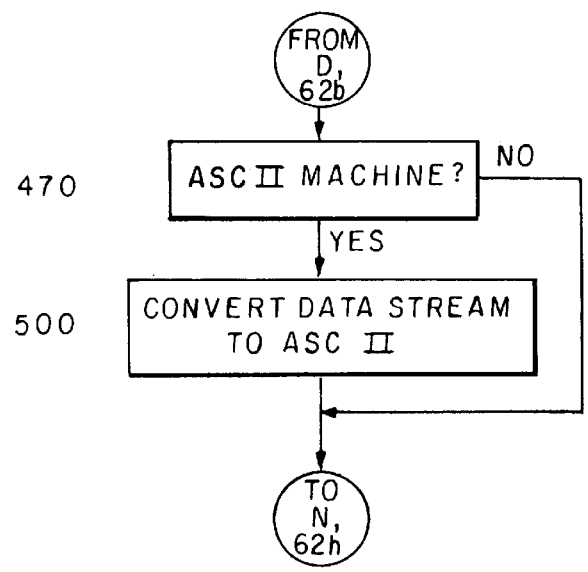
Figures 62H, 62I:
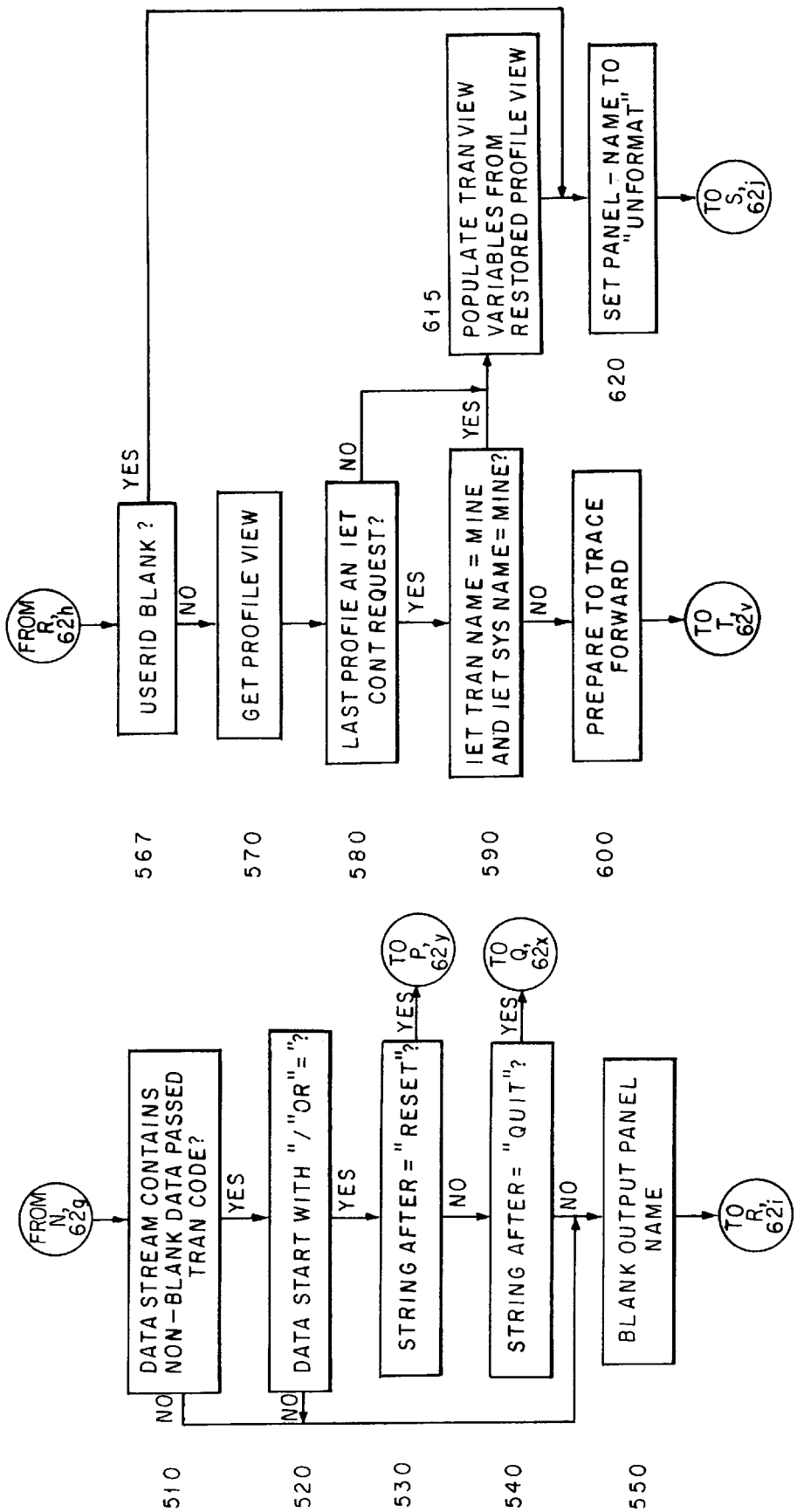

Looking now at FIG. 62f, Block 400 checks the IETI command code for a FORWARD command. If there is no FORWARD command, then control is passed to Block 430.

The FORWARD request is used by a DAA transaction on one system to pass input data, usually input terminal data, to another system to be executed by the same or different transaction on the destination system. For example, a terminal on one system can use the DAA transaction to route a transaction request to a remote system for execution. This can be done by entering "DA sysid tran tran-input" from a cleared screen. Where "sysid" is the name of the remote system, "tran" is the name of the transaction to be executed, and "tran-input" is optional transaction data. The DA transaction would make use of this FORWARD request to build the IETM/IETI/message buffer to be executed on system sysid.

If Block 400 has found a FORWARD command, at Block 410 the IETE copies the message buffer following the IETI header to a work area and then branches back to Block 120 of FIG. 62*b*, for processing as if the message buffer was originated on the local system. It is possible in the preferred embodiment of the present invention for this message block to be examined and forwarded yet again to another system for execution. However, generally the FORWARD request is executed after one pass.

Block 430 checks the IETI command code for a TERMINAL command. If it is not a TERMINAL command then control is passed to Block 110 to get the next transaction input. Otherwise, the message from the data stream following the IETI header is sent to the local terminal specified in the IETI header. Control is then passed back to Block 40 to process the next input for this transaction.

At Block 470, the IET checks the local machine character set for type of ASCII. If it is not an ASCII machine, the IET interface skips the next step and moves to Block 510. If it is an ASCII machine, the IET interface converts the data stream to ASCII code (500), and then moves to Block 510.

Next, the IET at Decision Block 510 checks if the data stream contains non-blank data passed the transaction code. Non-blank data passed the transaction code means that a menu option may be present, or option data may await processing by the "UNFORMATTED" panel input procedure. If there is no data passed the transaction code then control is passed to Block 550.

Block 520 is executed when extra data exists. The first non-blank character following the tran code is compared with a "/" or "=" indicating whether the user wants to invoke a specified command that follows that character. If neither "/" or "=" are found, then control is passed to Block 550.

If "/" or "=" is found, Decision Block 530 further compares the command string following the character to a "RESET". If the string equals "RESET", control is passed to Block 1560, of FIG. 62*y*, discussed later, where the transaction state is reset and the top level menu is displayed. If the string does not equal "RESET", Block 540 checks if the string equals "QUIT". Skipping to FIG. 62*x* for a moment, control is then passed to Block 1530 if the string does equal "QUIT". Here the IET begins processing the QUIT request for the specified user and application identifications by deleting the application identification from the profile data base. Block 1540 then queues the message "DA=1" to the local system for execution. This invokes the Display Active transaction. Control is then passed to block 30 where the next transaction message is received and processed.

Returning to FIG. 62*h*, the logic at Block 550 begins the processing of transactions using only the tran code, which has been invoked from a clear screen. This is one way a user may restart a transaction at the last known state and panel. The process is begun by blanking the panel name in the TV.

Decision Block 567 checks the current user identification for blanks. If the user identification has blanks, there is no user id, and the IET bypasses restoring the profile and passes control to Block 620. If the user identification has not blanks, the logic at Block 570 restores the profile view from the stack, including the output panel name, for the given user identification and application identification.

At this point, Decision Block 580 checks if the last profile was an IETI control block by comparing the first part of the restored view to the literal "IETCONT". If the result is negative, then control is passed to Block 615 where the TV is populated from the restored profile view.

Block 590 is entered when an IET control block was restored (i.e., the result of Block 580 comparison is positive). A test is made to determine if the IET request was last passed to a different transaction code than this code and passed to a different system identification than the current system. If the result of the test is positive, then control is passed to Block 615 where the TV is populated from the just restored view.

Block 600 is executed when the result of the test in 590 is negative. The IET employs a process called TRACE FORWARD whereby the IET can resend a message to the destination transaction and system id found in the restored IETI. This block builds a new message block which consists of the IETM, IETI, and a message buffer equal to the IETI tran code. The IETI request code is set to FORWARD. This message block, when transmitted, is designed to restart the transaction on the destination system at the last requested state from this tran/system. After the buffer is constructed, control is passed to Block 1420 of FIG. 62*v*, discussed later, where the message is sent to the designated tran/system.

Block 615 populates the transaction view variables from the profile view restored in Block 570, much as the process described for Block 350 of FIG. 62*e*. The input panel name is set to 'UNFORMAT' (Block 620).

Figure 62J:
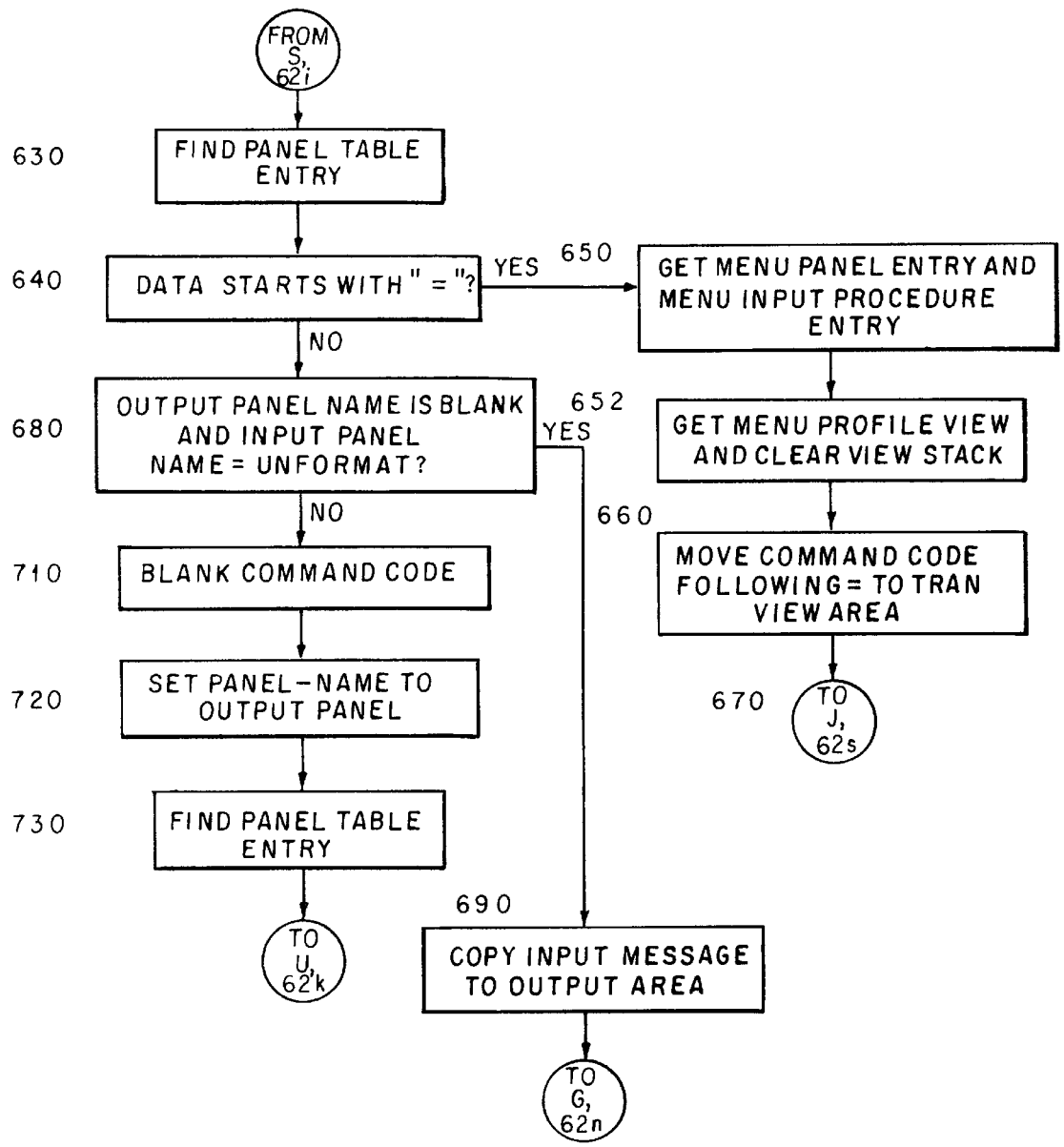

Moving on to FIG. 62*j*, Block 630 locates the TPE entry for the specified panel name. The TPE contains all the information to build and display a panel. Locating a panel is simply a matter of scanning each TPE entry until the desired panel name is found equal to the name in the TPE. The first TPE is anchored in the TDT at field TDTATPE.

Next, the IET at Decision Block 640 checks to see if the data in the message buffer following the tran code was preceded with an "=". If it was not, then control is passed to Block 680. If, on the other hand, the tran code was preceded with an "=", Block 650 handles the menu restart request from the user. For example. XYZ=2 indicated transaction XYZ menu option 2 should be executed. The top level menu panel entry, TPE is located from the TDT using variable TDTAMENU. From this TPE the menu input procedure entry, TCE, is located by using the TPEAITCE field in the TPE.

After Block 650 executes, Block 652 pops each of the views for this user identification and application identification until it locates the first view on the stack, which is the top menu view. If the top view is found, i.e., the top menu profile view, the TV is restored from the view and the view stack is cleared. If the top view is not found then nothing is restored in the TV, and the stack is left empty. Block 660 moves the command code following the "=" to the command field in the TV. Control is then passed to Block 1200 of FIG. 62*s*, discussed later, where the input procedure is executed for the menu panel.

Returning to a trans code not preceded by an "=", Block 680 checks for a blank output panel name and an input panel name of "UNFORMAT". If both are found, the input message buffer is copied to the output area (Block 690) and control is passed to Block 960 where the input procedure for the input panel of UNFORMAT is called.

If either are not found, Block 710 starts the logic that prepares to restart a transaction from a given panel. First the command code is blanked, then Block 720 moves the output panel name to the TV. Block 730 then finds the TPE entry for the specified panel name.

Figure 62K:
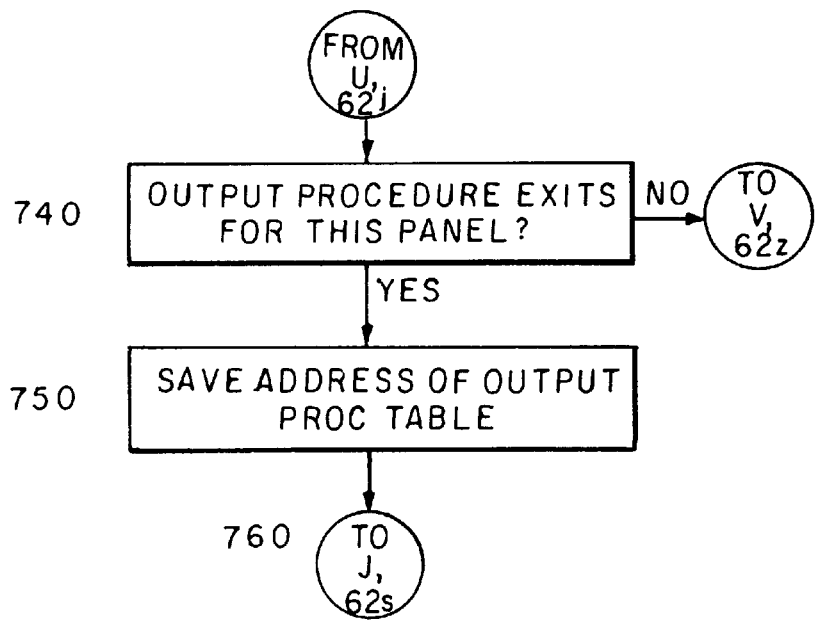
Figure 62L:
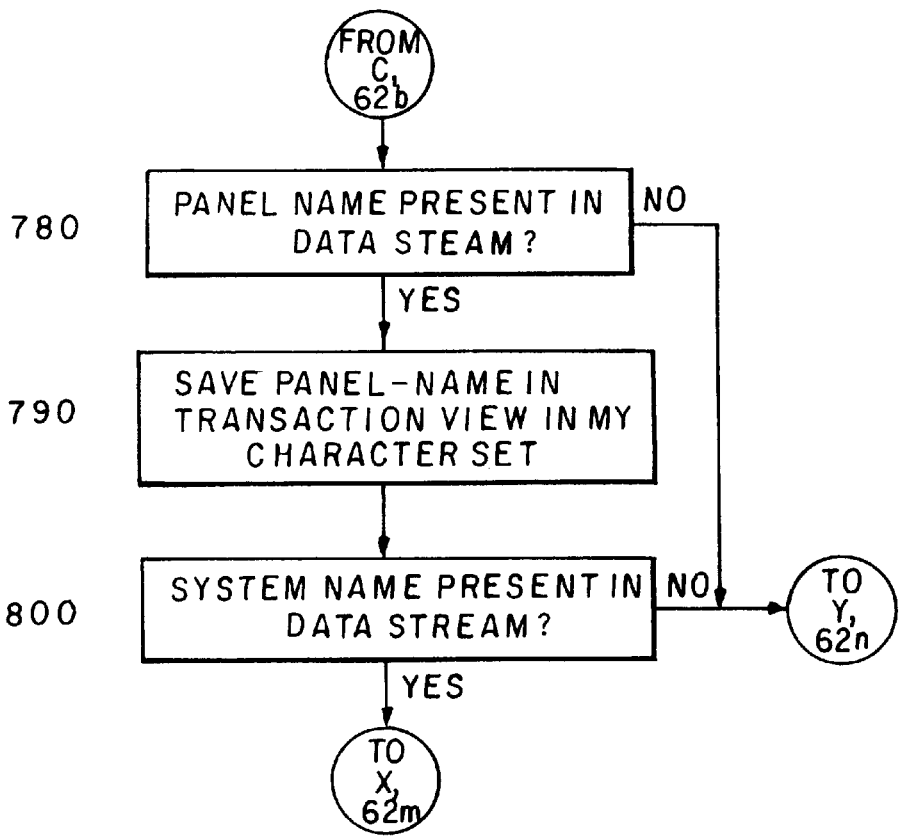
Figure 62M:
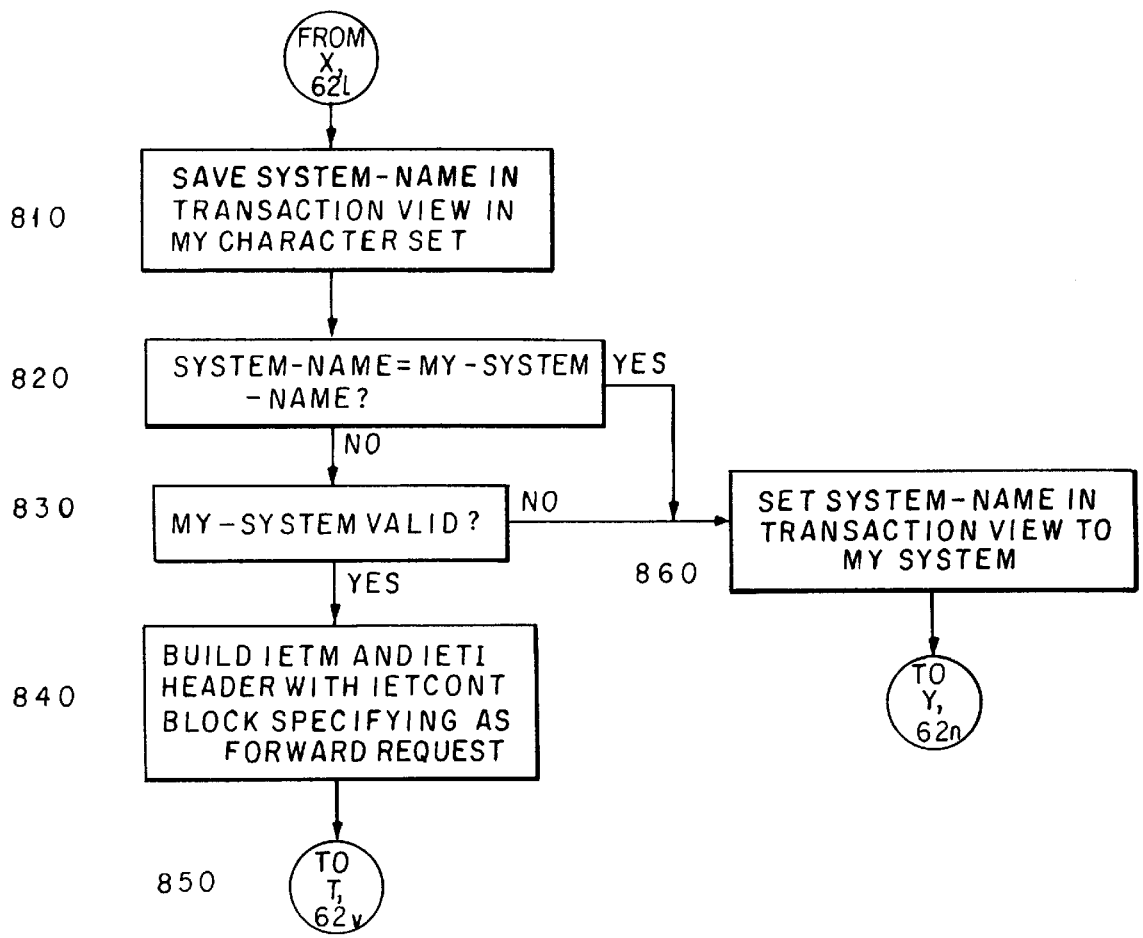

In FIG. 62K, Block 740 checks the TPE for an output procedure entry pointer in the field TPEAOTCE. If the pointer exists, it points to a TCE entry of the procedure to be called prior to outputting the panel. Block 750 then sets the TCE address and passes control to Block 1200 of FIG. 62s, where the specified procedure is executed. If an output procedure does not exist, then control is passed to Block 1610 of FIG. 62z, discussed later, where the panel display is built and output to the terminal.

Block 780 begins the logic for messages that are formatted with 3270 data streams. (i.e., the message was determined to have a 3270 SBA at the beginning; see Block 130). At this point, the IET expects to have a 3270 input stream that was received from a 3270 terminal that had a DAA transaction panel displayed. An integral part of IET's processing of input from a terminal is the design of the screen. This is enforced to some degree by GTD when the panels are created. The rule is that the first three fields on a DAA screen that are returned by the 3270 terminal must be the tran code, the panel name and the system id. This is facilitated in 3270 data streams by having these three fields as input/output fields with a modified data tag set. This causes the 3270 to always return them when any transmit key is pressed. When these three fields are returned, the IET can continue processing where the transaction was last exited, invoking the next procedure specified to process the input.

Therefore, Decision Block 780 checks to see if the panel name is present in the data stream by looking for a second 3270 SBA and extracting the characters returned as the panel name. If the data stream is too short or does not have the second SBA, then control is passed to Block 870 of FIG. 62n, discussed below, where this input is treated as a restart for the transaction. If the panel name was found, it is stored in the TV (Block 790) and is translated to ASCII provided IET is running on an ASCII machine.

Decision Block 800 operates similar to Decision Block 780 except the next SBA, expected following the panel name is the system name. If this field is not present then control is passed to Block 870 of FIG. 62n, where this input is treated as a restart for the transaction. Considering FIG. 62m, if the field is found, Block 810 stores the panel name in the TV and translates it to ASCII provided IET is running on ASCII machine.

Decision Block 820 compares the system name from the panel with the system on which IET is running; if they are equal the IET processes this screen and control is passed to Block 860 where the profile is to be restored. Block 830 is executed when the system name from the panel is not the same as the system on which IET is executing. Therefore, IET must forward this panel input for processing to the system name on the panel. IET verifies that the panel system name is a valid network system by examining a local data base of valid names. Some systems' implementations may not have a table and therefore all names are potentially valid and should be forwarded to the next higher DAA system for delivery. If the system name is not deemed valid, control is passed to Block 860 for processing on the local system.

Block 840 is executed when a forward request to a remote system is needed. This block constructs the IETM, IETI, followed by the message panel input from the terminal. The exact field definitions were discussed earlier in connection with the IET message format. The remote IET processing to handle this forward request is handled at Block 400. It is important to note that the IETI is updated to contain information about the requesting terminal, the local and remote IET systems, relative tran code on each system, panel name on each system, and the type of machine that the local IET is executing on, whether ASCII/EBCDIC and byte swapped or not. As mentioned earlier, these IET headers facilitate routing to the remote system and proper translation when it arrives. After the message block is formatted by Block 840, control is passed to Block 1410 of FIG. 62v, discussed later, for delivery to remote system.

Block 860 is executed for a local system terminal input. The system name in the TV is set to the local system identification and control is passed to Block 870, which blanks the output name.

Figure 62N:
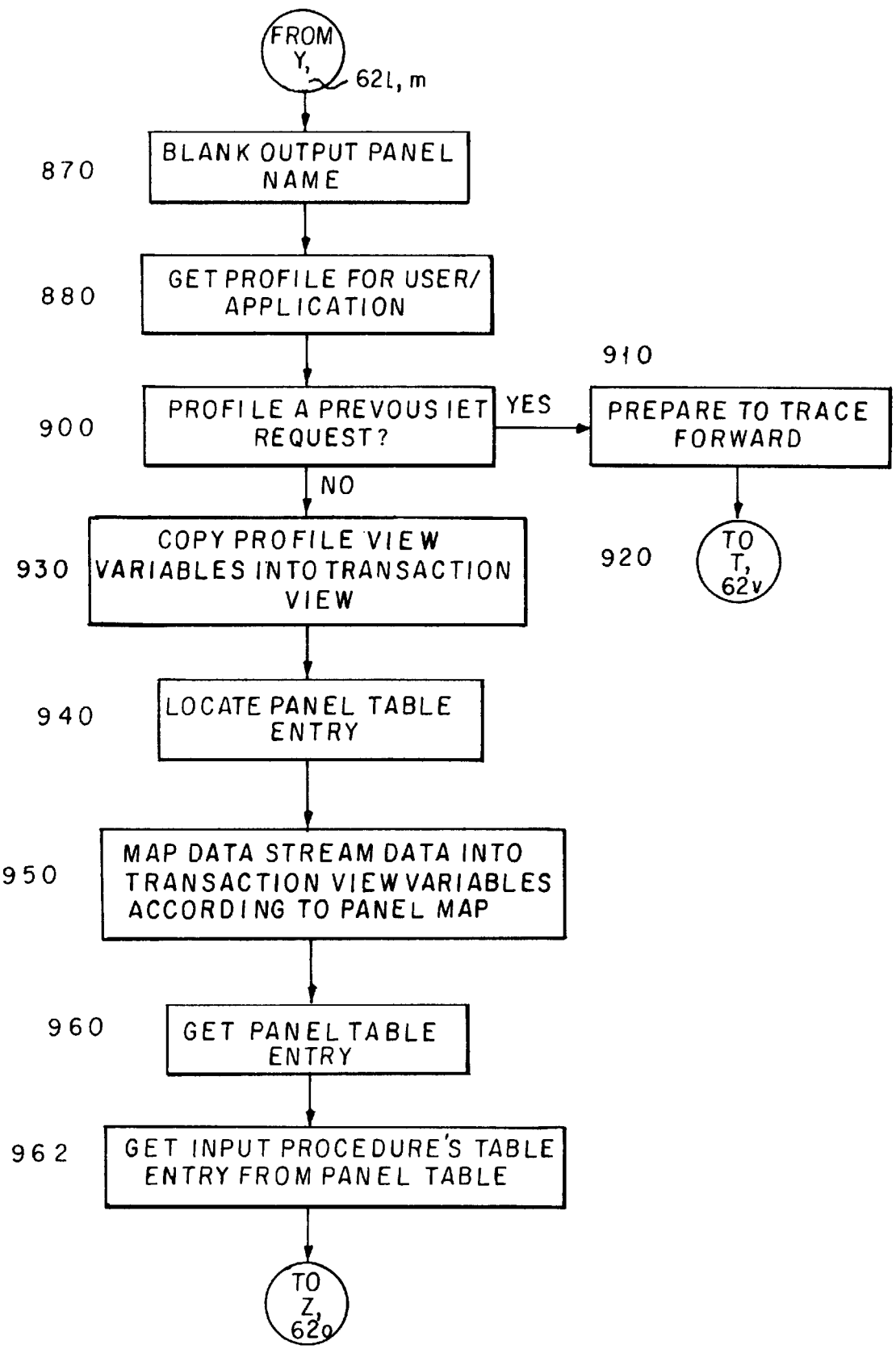
Figure 62O:
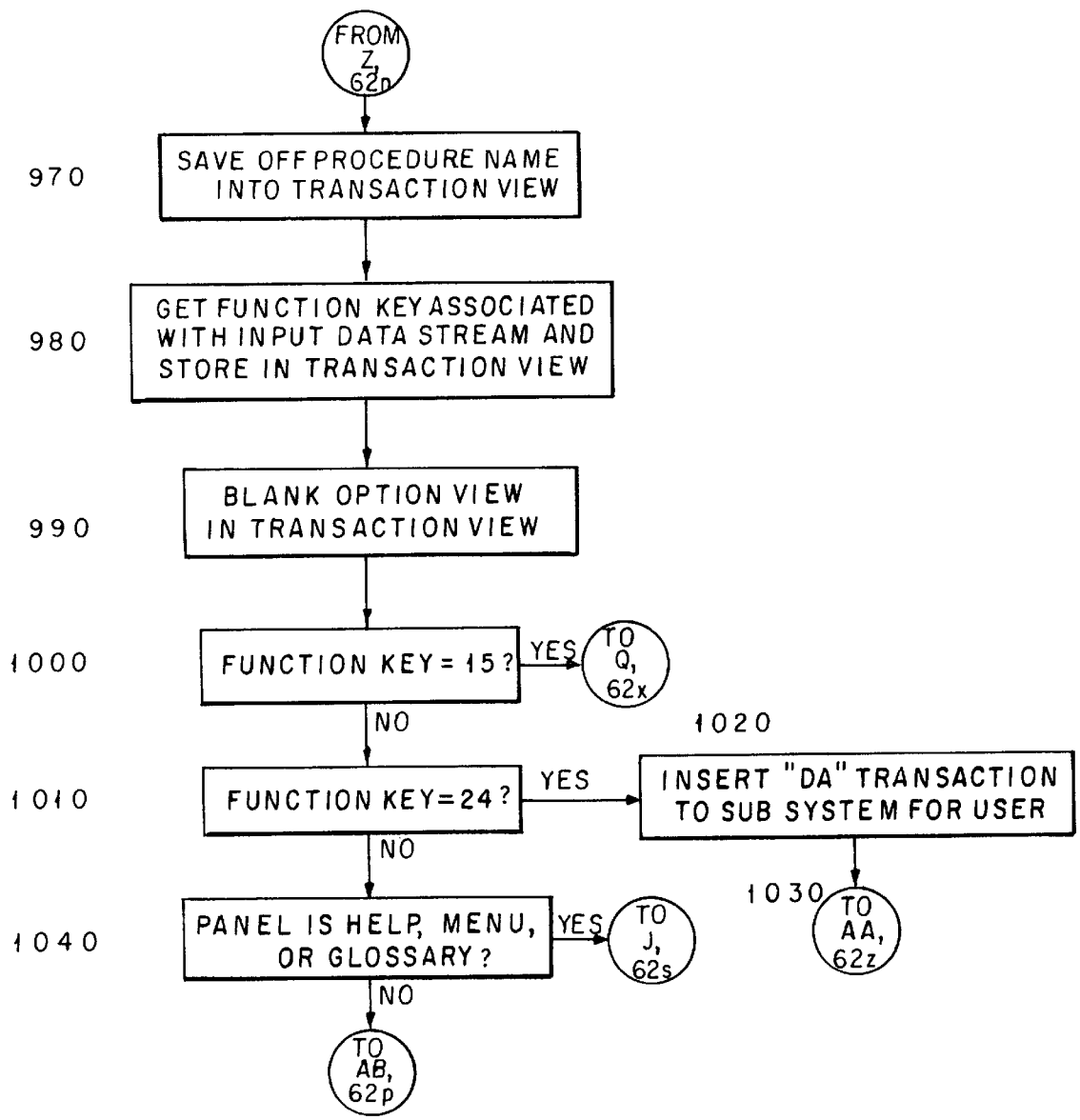
Figure 62P:
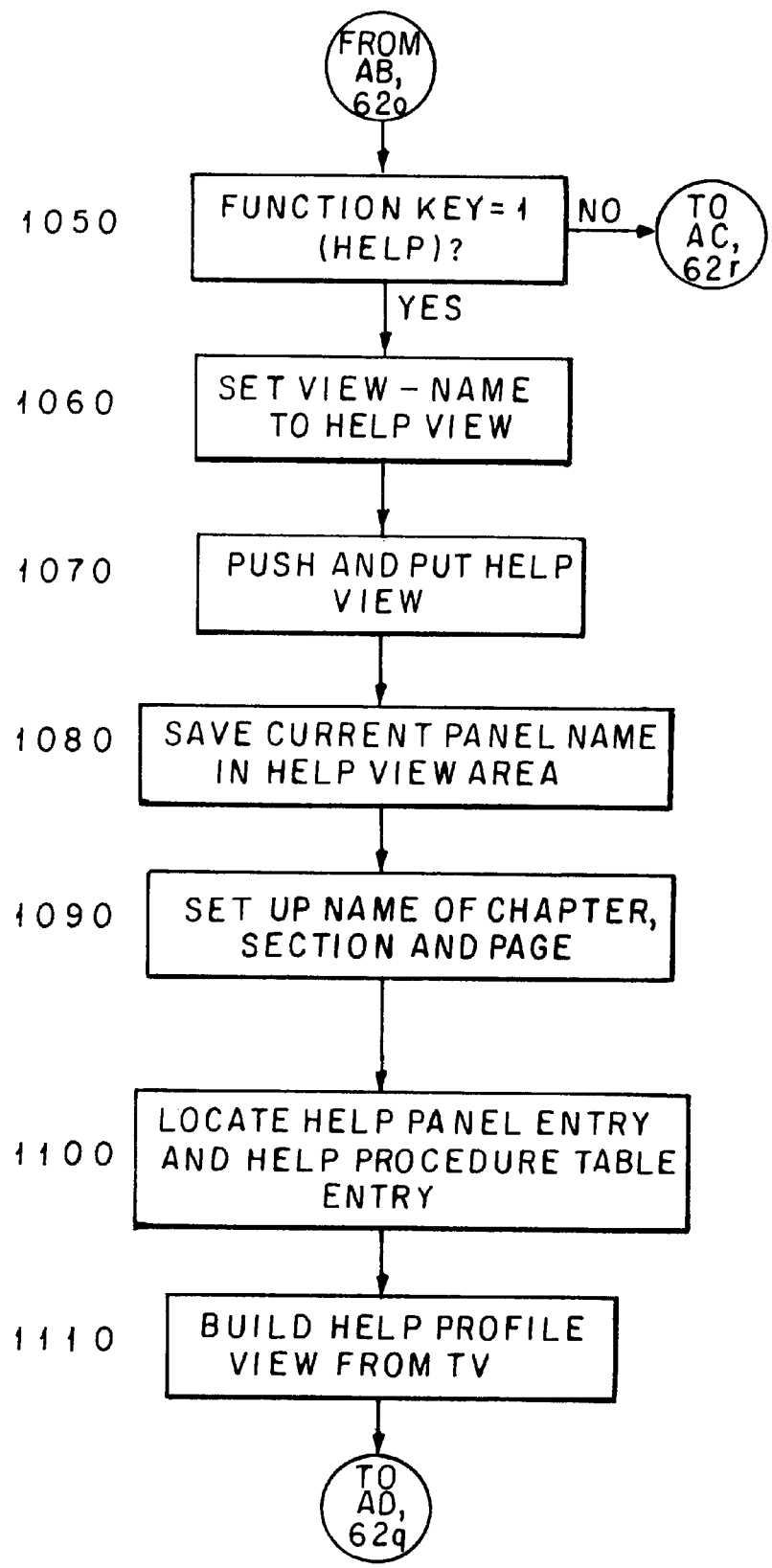
Figure 62T:
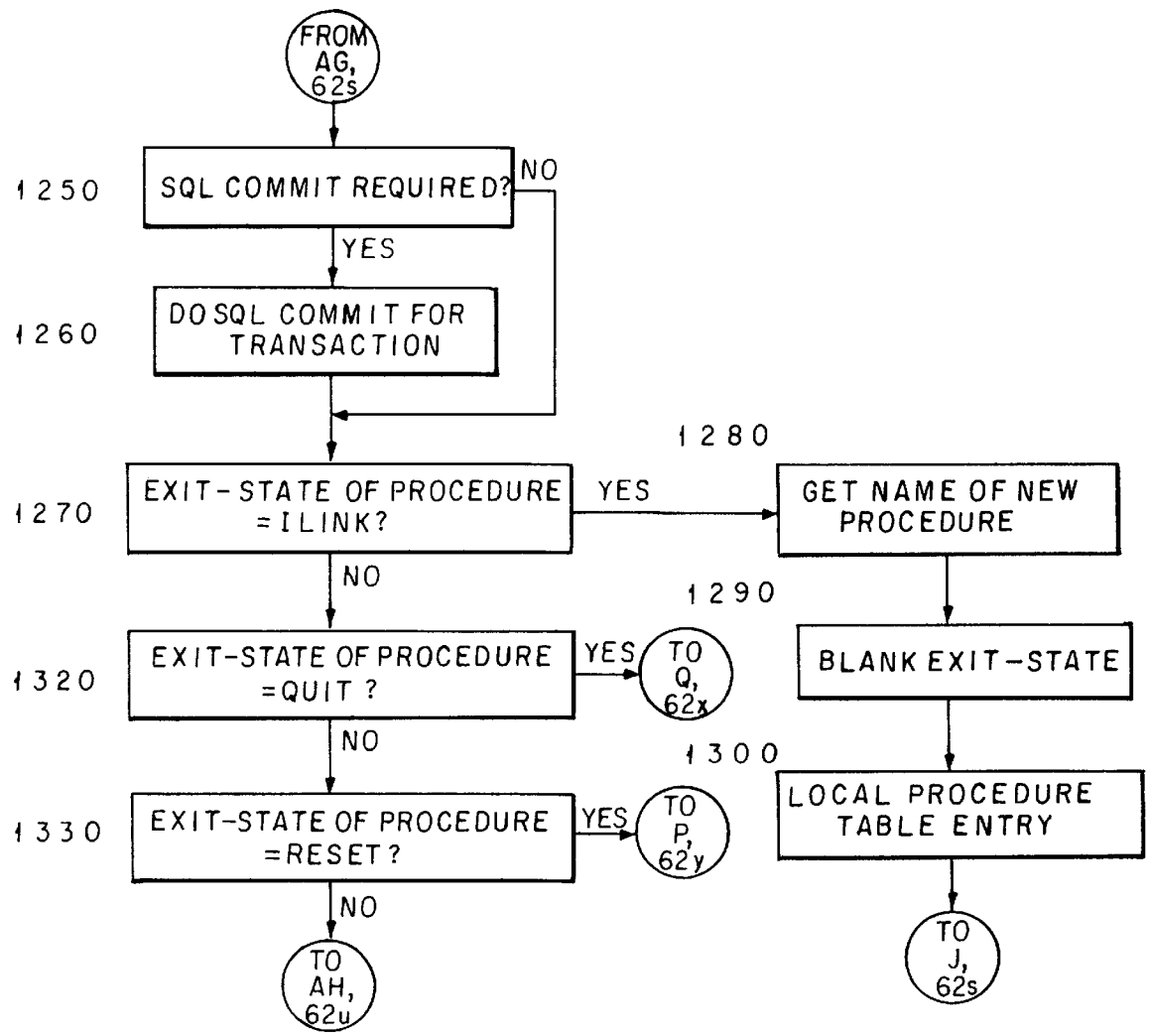

Continuing with FIG. 62n, Blocks 880, 900, and 910 are identical logic to previous Blocks 570–590 (i.e., the profile is restored for this user and application identifications). If the last thing done was an IET, request to another system or transaction, then a trace forward request is built to restart the transaction/system found in the restored IETI profile (Block 910) and control is passed to Block 1420 of FIG. 62v, for transmission of the request to the desired system. For example, if the last thing done for this user and transaction was a link request to another system, and a return has not yet occurred, or the profile would not show a link outstanding, then this trace forward request is designed to get the remote transaction to do a return again.

If the profile was not an IET request then control is passed to Block 930 which populates the TV from the restored profile view, (See Block 350 for discussion). Then Block 940 finds the TPE for the panel name specified in the TV (see Block 630 for discussion).

Block 950 takes the panel map data pointed to by the TPEAMAP field of the TPE, along with the input 3270 data stream and calls TMS to extract the fields returned form the terminal to the appropriate fields in the TV as described by the panel map data area. TMS is a Texas Instruments, Incorporated 3270 screen facility, but other facilities could be developed or adapted use with the present invention, such as IBM's IMS MFS facility. The important thing is that the input fields returned from the terminal are mapped, including conversion to internal representation, to the application's TV fields. In addition, the 3270 AID key representation is updated in the TV.

Block 960 gets the TPE entry for the panel name. Then Block 962 uses the TPEAITCE to locate the TCE entry for the input procedure to be called. Moving to FIG. 62o, Block 970 then saves the procedure name from the TCE into the TV.

Block 980 thereafter updates the binary field in the TV for the function key. DAA application developers can generate their panels with an option field displayed on the panel as "OPTION:" and if the user types a string "Fnn", IET will interpret this the same as if the Fnn key was pressed. This logic only applies if the user typed the function key name and pressed the ENTER key. If the function name was typed and another function key was depressed, the IET will use the 3270 generated AID key as the function key and the user's typed function key name will be ignored. In any case after this function key logic, Block 990 will cause this option field to be blanked in the TV.

At this point, the IET at Decision Block 1000 checks to see if the function key selected is F15. If F15 was selected, the IET interface jumps to Block 1530 of FIG. 62x, discussed earlier. F15 is used by DAA to indicate that the user wants to QUIT this application, so branching to 1530 will remove this application from the profile data base for the user and the DA transaction will be inserted. If the function key selected is not F15, the IET interface checks to see if the function key F24 is selected (Block 1010). If so, this indicates the user wants to suspend the current application and see a list of his current active applications by use of the DA transaction. Block 102 builds a message buffer of "DA=1" for the user and inserts it to the transaction processing subsystem. After this, control is passed to Block 1630 of FIG. 62z, where transaction cleanup is performed.

Decision Block 1040 checks to see if the current panel is the HELP, GLOSSARY or MENU panel. If it is one of these, the control is passed to Block 1190 where the input procedure associated with the panel is to be executed. Considering FIG. 62e, if the current panel is not one of these panels, Decision Block 1050 checks to see if the value of a selected function key equals 1, which is the standard DAA HELP key. If it is not a 1 then control passes to Block 1150, where the next value for the selected key is tested.

Block 1060 begins the logic for displaying HELP panels for a particular application. First the help logic must save enough information that upon exit from the help screen, IET can restart the current panel with all of its fields. This logic builds the help view area consisting of all the current input and output fields contained in the TMS buffer. The view name is set to "HELPVIEW" to identify this view.

Block 1070 then pushes and puts this help view onto the stack file. After the environment has been saved, the help logic can now prepare to output the help panel. Blocks 1080 and 1090 save the current panel name, documentation chapter, section, and page names in the TV.

Block 1100 locates the TPE and TCE for the help panel and help procedure respectively. The help panel TPE is anchored off TDT using field TDTAHELP. Next a help profile buffer is built (Block 1110), and moving to FIG. 62q, saved to the profile file (Block 1120). This is comparable to the logic for Blocks 270 and 280. Block 1130 opens the documentation file, locates the specified help page and reads 20 lines into the TV. Then control is passed to Block 1610 of FIG. 62z, discussed later, where the panel is built and output to the terminal.

Decision Block 1150 checks to see if the function key is a 3. F3 is used by IET to allow the user to go back to the top menu. If it is 3, then control is passed to Block 1590 where the top menu panel is built and output.

If the function key is not 3, Decision Block 1160 checks to see if it is a 12. F12 is used by IET to perform a "CANCEL". At this point the IET cancels the current panel and redisplays the last panel that preceded the canceled panel.

Moving now to FIG. 62s, the IET at this point blanks the message area in the TV.

Block 1200 begins the logic of executing a procedure that is already setup via the TCE. This logic is branched to from several places in IET. This block gets the address of the procedure from the TCE.

Decision Block 1210 examines the TDT to see if this procedure is a SQL procedure and if not, control is passed to Block 1240. If it is, Block 1220 checks a global flag to see if a SQL connect has been done for this user and application. If it has, control is passed to Block 1240. If not, Block 1230 is executed to the SQL connect. IET uses the application id string as the SQL user id and SQL password. This facilitates not requiring every user of the transaction be registered with the SQL system, but rather the application id is registered as the user id.

Block 1240 calls the procedure passing the TV, and the transaction I/O control blocks.

Decision Block 1250 checks to see if the procedure was an SQL procedure and whether an SQL commit needs to be done. If no, then control is passed to Block 1270. Otherwise, Block 1260 does the required SQL commit.

Block 1270 starts the logic to examine the exit-status of the just-called procedure. If the exit-state field in the TV is not equal to "ILINK", then control is passed to Block 1320.

Block 1280 processes the ILINK request which indicates that the called procedure wishes to invoke another procedure immediately. The name of the new procedure is first obtained from the TV. Next, Block 1290 blanks the exit-state in the TV, and Block 1300 scans the list of TCE's for a match on the name specified. The results is the address of the TCE for the new procedure. Control is then passed to Block 1200 of FIG. 62s, where the new procedure is executed.

When the exit-state does not equal ILINK, Decision Block 1320 checks the exit-state for "QUIT". If it is there, then control is passed to Block 1530 of FIG. 62x, discussed earlier, where the application is deleted from the profile and the DA transaction is inserted for the user.

When the exit-state does not equal QUIT either, Block 1330 next checks the exit-state for "RESET". If found, control is passed to Block 1560 of FIG. 62y, discussed later, where the stack is cleared for the user/application and the top menu is invoked.

Figure 62U:
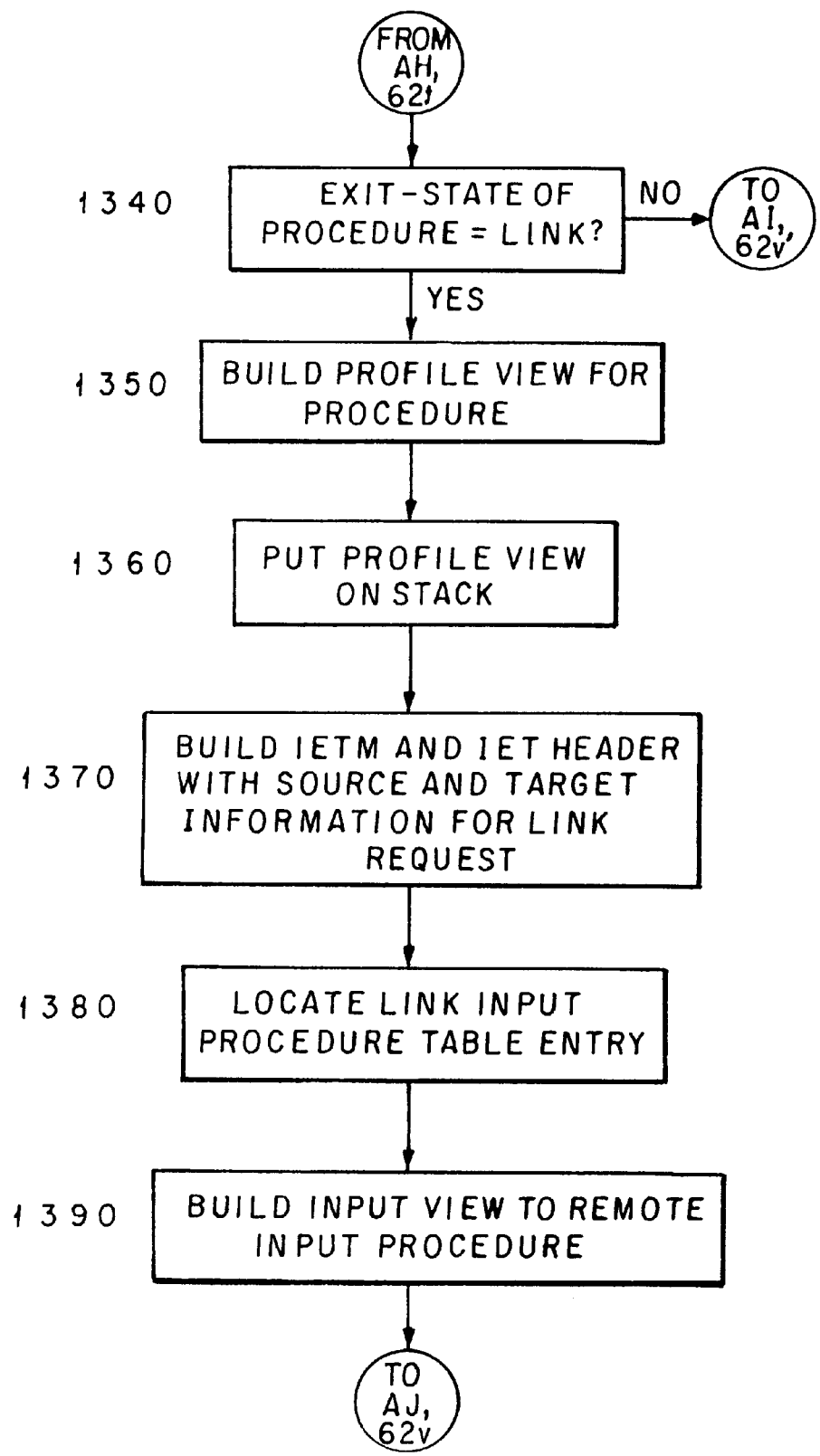

Turning now to FIG. 62u, Decision Block 1340 checks the exit-state for "LINK". If not found, control is passed to Block 1430 of FIG. 62v, to check for a RETURN request; otherwise, Block 1350 handles the "LINK" request. First the profile area for the current TCE is built. Then Block 1360 puts this profile area on the stack file. (See Blocks 270–280 discussion above).

Block 1370 starts the process of building an IETM and IETI header in the message area. As previously discussed the IETM/IETI construct is used to route data to a different transaction/system. After the IETM/IETI headers are constructed, Block 1380 scans the list of TCE's for the name of the linked to procedure found in the TV. Block 1390 then uses the TCE block to locate the profile view list, VMOH/VMOF (see TDT discussion earlier). This list is used to extract the profile view data fields from the TV and move them to the area following the IETM/IETI in the message buffer.

Figure 62V:
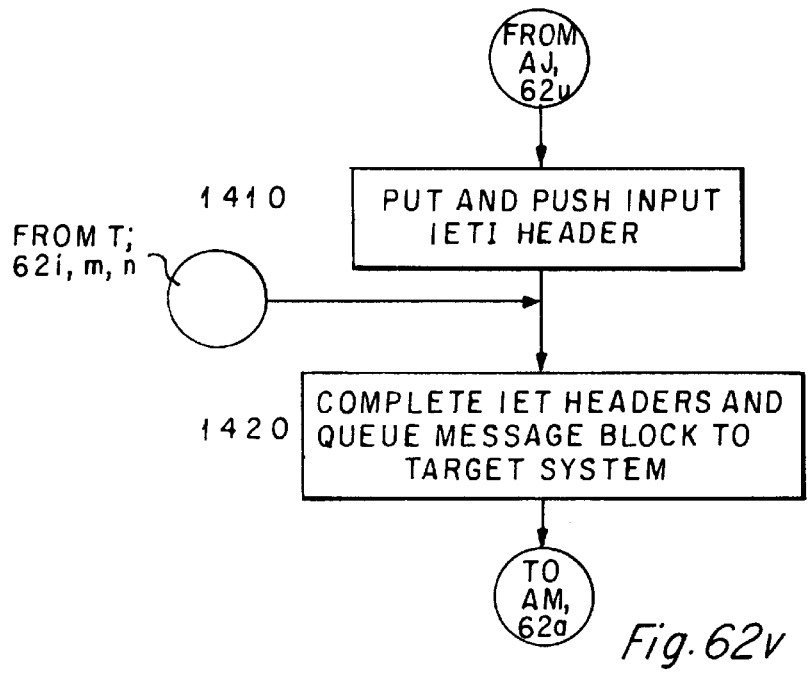
Figure 62V:
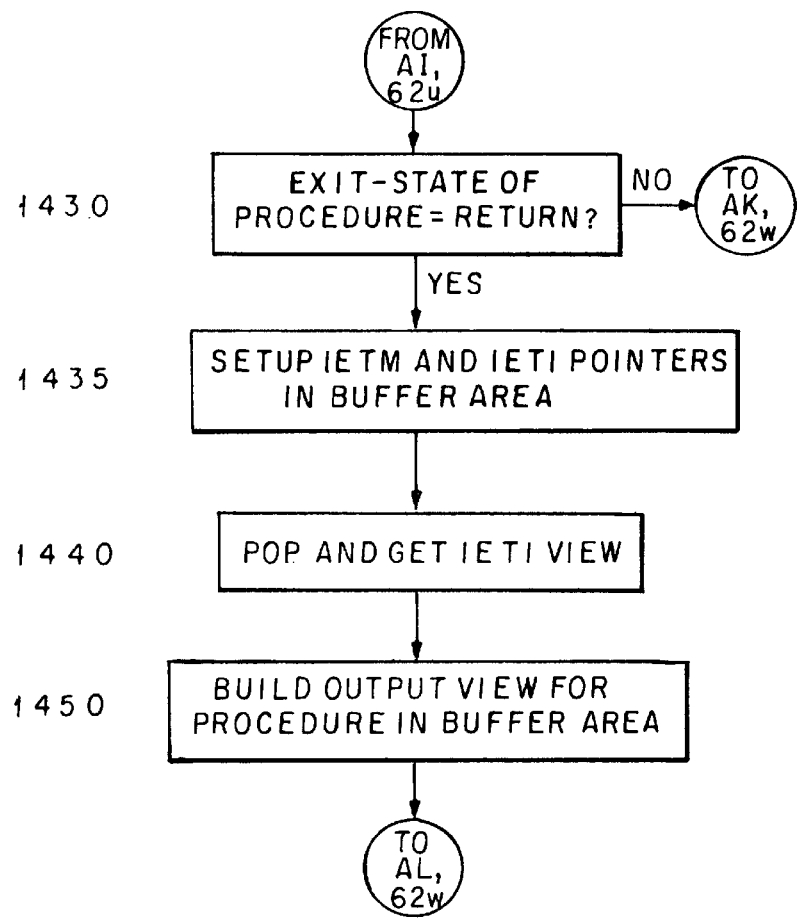

Moving now to FIG. 62v, Block 1410 saves the IETI header on the profile data base. The IET at Block 1420 then takes the current message block and finishes building the IETM and IETI header. All the character fields of the IETI header are converted to EBCDIC if necessary and the destination tran code and the total length of the message are added to the IETM header. If the destination system is the same as the local system then the message block is queued to the tran code on the local system, otherwise the block is queued for transmission to the destination system. Control is then passed to Block 30 where the next input message is received from the transaction processing system.

Block 1430 checks the exit-state for "RETURN". If it is not "RETURN", then control is passed to block 1490 for the IET to process the next panel.

Block 1435 handles the "RETURN" request. The procedure has been invoked by a LINK request and is now returning to the invoking procedure. First the IETM and IETI pointers are constructed in the message buffer (Block 1435). Then Block 1440 restores the IETI view from the stack. The IETI was stored on the stack by the original LINK request. Block 1450 next builds the output view area after the IETI header in the buffer, using the procedures output view list, anchored off the TCE in field TCEOVW. Each field referenced by the list is moved to the output area.

Block 1460 clears the view stack, whereafter Block 1470 is executed to setup the tran code in the IETM header and the target system identification for transmission. Block 1480 then marks the IETI field IETICC to indicate a return request, and Block 1490 blanks the exit-state.

Figure 62Z:
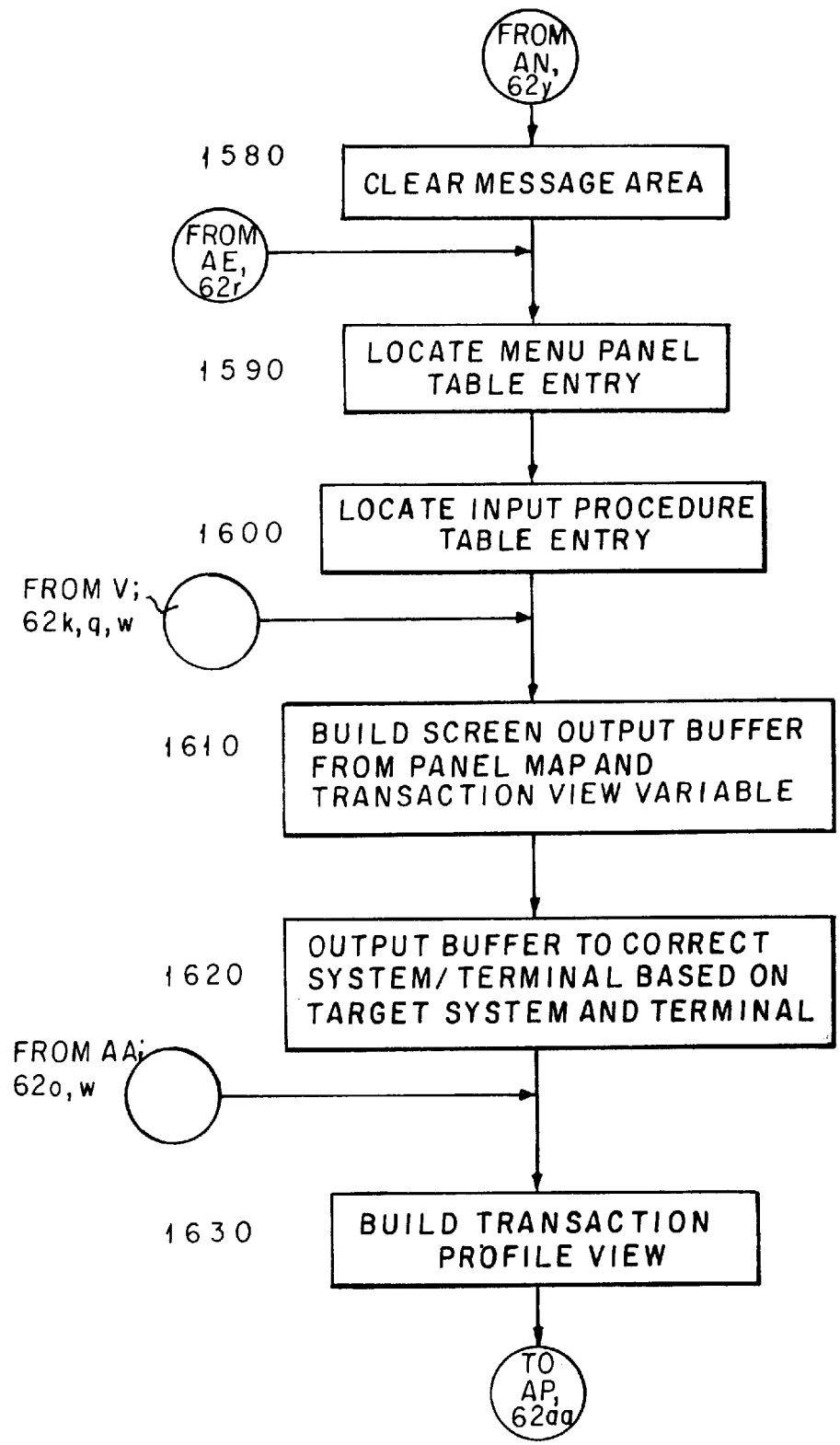

Decision Block 1500 tests the current panel name in the TV for blanks and if present, then control is passed to Block 1630 of FIG. 62z, to build the transaction profile view in preparation for executing the next transaction request.

If the panel name is not blank, Block 1510 uses the panel name to find the correct TPE. Control is then passed to Block 1610 of FIG. 62z, where the panel specified is processed.

Looking now at FIG. 62y, Block 1560 is executed to return the user to the top menu. Here the view stack is cleared and Block 1570 initializes the TV (see Block 40). Then, according to FIG. 62z, Block 1580 clears the message area in the TV, and Block 1590 displays the top menu. First the TPE is located from the TDT field TDTAMENU. Then at Block 1600 the TCE pointer is set to the menu procedure using the TMEATCE pointer in the TME entry for the top menu.

The IET at Block 1610 builds the 3270 data stream from the panel map and the TV. The logic of this block employs TMS, but as mentioned earlier, other facilities such as IBM's IMS MFS could be used. Block 1620 then outputs the data streams to the terminal. If the destination system is local, the message is queued to the local transaction system for delivery to the specified terminal. If the system is not the local system, then an IETM/IETI header is built and the 3270 data stream is appended. The IETI request code is set to TERMINAL and the message is queued for transmission to the remote destination system.

Block 1630 builds the transaction profile view for the current procedure. Then, as seen in FIG. 62aa Block 1640 puts this view on the stack file. Control is then passed to Block 30 where the next transaction message is received and processed.

Decision Block 1660 exits the transaction by testing to see if a SQL connect was done and, if so, Block 1665 is executed to release the SQL data vase. If not, control is passed to Block 1670 which closes the documentation file if it is still open. Block 1680 then finishes the cleanup by closing the profile data base and freeing any allocated memory. Finally the IET returns to the transaction sub-system main module for termination of this transaction.

While a specific embodiment of the invention has been shown and described, various modifications and alternate embodiments will occur to those skilled in the art. Accordingly, it is intended that the invention be limited only in terms of the appended claims.

APPENDIX A

APPENDIX TO SPECIFICATION TITLED:
PORTABLE AND DYNAMIC DISTRIBUTED TRANSACTION MANAGEMENT METHOD
INVENTOR: John W. White
FILED: Septernber 28, 1989

Workarea Variables used by GTD
GTD transaction view fields
NAME LENGTH DEFINITIQN
ief1_appl 4
ief1_tdtid 4
ief1_tran 8 name of GTD program
ief1_panel 8
ief1_term 8
ief1_user 8 user id
ief1_system 8
ief1_msg 72
ief1_command 32
ief1_select 8 ARRAY OF 4
ief1_currow
ief1_curcol
ief1_funkey function key value input
ief1_confirm 1
ief1_systype 1
ief1_curdt 18

APPENDIX A-continued

APPENDIX TO SPECIFICATION TITLED:
PORTABLE AND DYNAMIC DISTRIBUTED TRANSACTION MANAGEMENT METHOD
INVENTOR: John W. White
FILED: Septernber 28, 1989 ief1_msgcolor 1
ief1_msgae 4
ief1_time
ief1_date
ief1_year
ief1_mon
ief1_day
ief1_helpblk
ief1_proc 8
ief1_reln 4
ief1_lookahd 64
ief1_gdate 8
ief1_gtime 8
ief1_termdef 16
ief1_ainput 4
ief1-tvwend 8
NAME LENGTH DEFINITION
gtdhmenu 8 main menu name
gtdhhelp 8 help panel name
gtdhinfo 8 inf o panel nane
gtdhglos 8 glos panel name
gtdhimnu 8 information menu name
gtdhpvw 8 profile view name
gtdhmap 8
gtdtitl 32
gtdpmem 8 field containing name of an application
    procedure or menu
gtdmsg 32 output field used to contain
    informational or error messages for benefit of the
user
zcmd 80
zluser 8
THESE FIELDS CORRESPOND TO THE DATA PORTION OF THE TDF HEADER
NAME LENGTH DEFINITION
gtdhrtyp 1 TDF GTDHRTYP record type
gtdhmem 8
gtdhmtyp 1 TDF GTDHMTYP TDT type
gtdhdr 8 documentation report name
gtdhdg 8 documentation generation name
gtdappl 4 appiication name
gtdreln 4 tdt release number
gtdllib 46 load library
gtdlmem 8 load module member name
gtdolib 46 object library
gtdomem 8 object module member name
gtdslib 46 field used to contain the pathname for
    all the application source procedures
    (also transaction view data sets)
gtdcmem 8 name of transaction view
gtddlib 46 data base library name
gtddinem 8 data base library member name
gtdnlib 46 control library path
gtdnmem 8 control library member
gtdleopt 50 linkage editor options
gtdgof 1 generation option flag
gtdglf 1 generation lookahead flag
gtdrsvd2
THESE FIELDS CORRESPOND TO THE DATA PORTION OF THE TDF FIRST EXTENSION HEADER
NAME LENGTH DEFINITION
gtdhex1 2 record type
gtdhex1n 2 extension type
gtdcdsn1 46 extra copy/header library path
gtdcdsn2 46 extra copy/header library path
gtdcdsn3 46 extra copy/header library path
gtdcdsn4 46 extra copy/header library path
gtdxlib 46 debugger symbols
gtdexlf
THESE FIELDS CORRESPOND TO THE DATA PORTION OF THE TDF SECOND EXTENSION HEADER
NAME TYPE LENGTH DEFINITION
NAME LENGTH DEFINITION

APPENDIX A-continued

APPENDIX TO SPECIFICATION TITLED:
PORTABLE AND DYNAMIC DISTRIBUTED TRANSACTION
MANAGEMENT METHOD
INVENTOR: John W. White
FILED: Septernber 28, 1989 gtdhex2 2 TDF record type
gtdhex2n 2 extension type
gtdldsn1 46 extra load library pathname
gtdldsn2 46 extra load library pathname
gtdldsn3 46 extra load library pathname
gtdldsn4 46 extra load library pathname
gtdldsn5 46 extra load library pathname
gtdldsn6 46 extra load library pathname
gtdex2f
INPUT/DISPLAY FIELDS
NAME LENGTH DEFINITION
gtdsel 40 field used as user input usually to
    obtain numbered menu item selections
gtdse10 8
gtdse11 8
gtdse12 8
gtdse13 8
gtdmenu1 8
gtdmenu2 8
gtdmenu3 8
dname 8 first name to display
tdtbuf 400
zuser 8 user id
zdate 8 formatted data of program entry
ztime 5 formatted time of program entry
gtdseli 1
gtdselo 1
gtdselp 1
gtdsela 16 input area select code for edit list: panel,
    procedure1 menu display lines
dnamea 8 A 16 display areas for component names:
    panels, procedures, menu, language
dipnm 8 0 16 display areas for input procedure, input view,
dopnm 8 0 16 display area for output procedure,
    output view,
dpvnm 8 0 16 display area for profile view
dm0ds 16 0 16 display area for level 1 menu sel/descriptions
    one for each menu entry in display list
dm1ds 16 0 16 display area for level 2 menu sel/descriptions
    one for each menu entry in display list
dm2ds 16 0 16 display area for level 3 menu
    select/descriptions
    one for each menu entry in display list
dm3ds 16 0 16 display area for level 4 menu
    select/descriptions
    one for each menu entry in display list
gtdcty 8 0 16 one for each procedure entry in display list,
    Y = data base
gtddb2 1 0 16 display area for procedure data base flag,
    Y = data base
application, one for each procedure entry in display list
gtdxpd 1 0 16 display area for procedure debug flag,
    Y = debug compile
options are to be used, one for each procedure entry in display
    list
gtdmmem 8 name of TDF file
gtdmlib 46 pathname for maps and TDF files
should be maximuin length for most restrictive platform
COPY OF ONE INSTANCE OF A TDF COMPONENT AND STDE
TABLE ENTRY
(generic for all types)
NAME LENGTH DEFINITION
gtdetyp 1 TDF component record type
gtdename 8 panel, procedure, menu, or language name
gtdesel 8 menu selection value
gtdeipnm 8 input view for procedures
input procedure for panels
panel to invoke for menus
report name for languages
gtdeopnm 8 output view for procedures
output procedure for panels
procedure to invoke for menus
generation name for languages

APPENDIX A-continued

APPENDIX TO SPECIFICATION TITLED:
PORTABLE AND DYNAMIC DISTRIBUTED TRANSACTION
MANAGEMENT METHOD
INVENTOR: John W. White
FILED: Septernber 28, 1989 gtdepvnin 8 procedure view name
gtdedesc 32 panel, procedure, menu description
gtdersv1 4
gtdeccbm 1
gtdecdb2 1 procedure data base flag
gtdecxpd 1 debugger flag
gtdectyp 8 procedure type
gtdelopt 60 compiler language options
gtdersv2
OTHER INPUT/DISPLAY FIELDS
NAME LENGTH DEFINITION
gtdvmem 8
gtdmvw1
gtdcvw1
gtdaname 32
statitem 20
statstat 60
srcsid 8 source system id
srclid 48 source pathname
srctdt 8 source tdt name
srcuid 8 source user id
srcupw 8
tgtsid 8 target system id
tgtlid 48 target pathname
tgtuid 8 target user id
tgtupw 8
tgtsw 1 target
rsvrd11 7
rsvrd10
STDE TABLE entry
NAME LENGTH DEFINITION
gtdetyp 1 TDF component record type
gtdename 8 panel, procedure, menu, or language name
gtdesel 8 menu selection value
gtdeipnm 8 input view for procedures,
    input procedure for panels
    panel to invoke for menus
    report name for languages
gtdeopnm 8 output view for procedures
    output procedure for panels
    procedure to invoke for menus
    generation name for languages
gtdepvnin 8 procedure view name
gtdedesc 32 panel, procedure, menu description
gtdersvl 4
gtdeccbin 1
gtdecdb2 1 procedure data base flag
gtdecxpd 1 debugger flag
gtdectyp 8 procedure type
gtdelopt 60 compiler language options
gtdersv2

APPENDIX B

APPENDIX TO SPECIFICATION TITLED:
PORTABLE AND DYNAMIC DISTRIBUTED TRANSACTION
MANAGEMENT METHOD
INVENTOR: John W. White
FILED: September 28, 1989

Application Path name Name date area File
File extension
TDF gtdmlib gtdmmem workarea .tdt
transaction gtdslib gtdcmem TDF header .cpy
view COBOL
record in workarea
transaction gtdslib gtdcmem TDF header H.h
view, C record in workarea
input view gtdslib STDEIPNM STDE .v
procedure entry

APPENDIX B-continued

APPENDIX TO SPECIFICATION TITLED:
PORTABLE AND DYNAMIC DISTRIBUTED TRANSACTION
MANAGEMENT METHOD
INVENTOR: John W. White
FILED: September 28, 1989 output view gtdslib STDEOPNM STDE .v
procedure entry
profile view gtdslib STDEVPNM STDE .v
procedure entry
panel source gtdmlib STDENAME STDE .map
panel entry
menu source gtdmlib STDENAME STDE .map
menu entry
COBOL gtdslib STDENAME STDE .cob
procedure procedure source entry
C gtdslib STDENAME STDE .c
procedure procedure source entry
panel gtdolib STDENAME STDE .o
objects procedure entry
menu gtdolib STDENAME STDE .o

APPENDIX B-continued

APPENDIX TO SPECIFICATION TITLED:
PORTABLE AND DYNAMIC DISTRIBUTED TRANSACTION
MANAGEMENT METHOD
INVENTOR: John W. White
FILED: September 28, 1989 objects procedure entry
load module gtdllib gtdlmem TDF header
record in workarea
TDT gtdslib gtdmmem workarea .c source
view gtdslib gtdmmem workarea VIEW.c
source
TDT gtdslib gtdmmem workarea .o
object
view gtdslib gtdmmem workarea VIEW.o
object
procedure gtdslib STDENAME STDE .o
objects procedure UNIX entry
procedure gtdolib STDENAME STDE
objects procedure MAINFRAME entry

APPENDIX C

TRANSACTION VIEW
APPENDIX TO SPECIFICATION TITLED:
PORTABLE AND DYNAMIC DISTRIBUTED TRANSACTION MANAGEMENT METHOD
INVENTOR: John W. White
FILED: September 28, 1989
This appendix lists the data items included in the
transaction view system provided area. These data items are
listed in the order in which they appear in the transaction view.

| COBOL NAME | C NAME | LENGTH (Bytes) | DESCRIPTION |
| --- | --- | --- | --- |
| IEF1-SAVE | wsave | 72 | SAVE area available for use by ALC GTD applications. |
| EF1-APPL | wappl | 4 | Application (APPL) ID of active transaction. Used by profile manager to identify activity for this transaction in profile space. APPL ID is also presented on "Show Active Application Display" under TRAN=A. |
| IEF1-RSVRDO | wrsvrdo | 4 | Reserved. |
| IEF1-TRAN | wtran | 8 | Transaction code of active transaction |
| IEF1-PANEL | wpanel | 8 | Panel name of active panel. |
| IEF1-TERM | wterm | 8 | Terminal name (under IMS, LTERM name. Identifies terminal from which input has been received. It received from TDT will be blank. |
| IEF1-USER | wuser | 8 | User ID. Set at transaction initialization to identify user of this particular transaction and application. |
| IEF1-PSWD | wpswd | 8 | Password. Is available to application to verify user is authorized to perform various functions of this application. This is not DAA network log-on |

APPENDIX C-continued

TRANSACTION VIEW
APPENDIX TO SPECIFICATION TITLED:
PORTABLE AND DYNAMIC DISTRIBUTED TRANSACTION MANAGEMENT METHOD
INVENTOR: John W. White
FILED: September 28, 1989
This appendix lists the data items included in the
transaction view system provided area. These data items are
listed in the order in which they appear in the transaction view.

| COBOL NAME | C NAME | LENGTH (Bytes) | DESCRIPTION |
| --- | --- | --- | --- |
| | | | password. |
| IEF1-SYSTEM | wsystem | 8 | System name of computer system environment within which this transaction is running. |
| IEF1-MSG | wmsg | 32 | Message area. Used to display messages in message field on GTD panels. Field is further subdivided into MSG ID and MSG test fields. |
| IEF1-MSGID | wmsgid | 7 | Message ID, 6 bytes plus one null character. Used as an identifier of a message. Allows user to read the ID of message being displayed. |
| IEF1-MSGTX | wmsgtx | 25 | Message text area for display on panels. |
| IEF1-COMMAND | wcommand | 23 | Command field. Used for accepting inputs on GTD panels |
| IEF1-SELECT1 | wselect1 | 8 | Select field. Used as a work area for GTD Menu Manager for parsing the top level select field on a multi-level menu selection command. |
| IEF1-SBLECT2 | wselect2 | 8 | Select field. Used as a work area for GTD Menu Manager for parsing the second level field on a multi-level menu selection command. |
| IEF1-SELECT3 | wselect3 | 8 | Select field. Used as a work area for the GTD Menu Manager for parsing the third level select field on a multi-level menu selection command. |
| IEF1-SELECT4 | wselect4 | 8 | Select field. Used as a work area for GTD Menu Manager for parsing the third level select field on a multi-level menu selection command. |
| IEF1-CURROW | wcurrow | 2 | 16 bit binary number representing row number of cursor position on a video dispiay device. Row 1 is top row. |
| IEF1-CURCOL | wcurcol | 2 | 16 bit binary number representing column number of cursor position on a video display device. Column 1 is left-most Column. |
| IEF1-FUNKEY | wfunkey | 2 | 16 bit binary number representing function key pressed to enter transaction. Field is set to zero when ENTER key pressed. |
| IEF1-CONFIRM | wconfirm | 1 | Application available field to confirm actions by terminal user. |
| IEF1-SYSTYPE | wsystype | 1 | Host system type field. Valid types listed below: TYPE    SYSTEM<br><br>I    IMS<br>C    CICS<br>T    TSO<br>U    UNIX<br>V    VMS<br>O    OS2 |
| IEF1-CURDT | wcurdt | 18 | Holds date and time input was |

APPENDIX C-continued

TRANSACTION VIEW
APPENDIX TO SPECIFICATION TITLED:
PORTABLE AND DYNAMIC DISTRIBUTED TRANSACTION MANAGEMENT METHOD
INVENTOR: John W. White
FILED: September 28, 1989
This appendix lists the data items included in the
transaction view system provided area. These data items are
listed in the order in which they appear in the transaction view.

| COBOL NAME | C NAME | LENGTH (Bytes) | DESCRIPTION |
|---|---|---|---|
| | | | received in following displayable format: YY/MM/DD HH:MM:MM |
| IEF1-RSVRD1 | wrsvrdl | 6 | Reserved. |
| IEF1-TIME | wtime | 4 | Time input was received. In standard TIME SVC format: X'HHMMSSTH' |
| IEF1-DATE | wdate | 4 | Date input was received. In standard TIME SVC format: XX'OOYYDDDF' |
| IEF1-YEAR | wyear | 2 | Year input was received. In 16 bit binary form, for example 1988 = '88,' 1989 = '89.' |
| IEF1-MON | wmon | 2 | Month input was received. In 16 bit binary form, for example Jan = '1 ,' Feb = '2 .' |
| IEF1-DAY | wday | 2 | Day input was received. In 16 bit binary form. |
| IEF1-HELFBLK | whelpblk | 2 | Reserved. |
| IEF1-TEXA | wtext | 1600 | Array work area, twenty 80 character rows of text information suitable for display in GTD HELP, GLOSSARY, and INFO panels. Used by GTD system functions to present these data items. |
| IEF1-HELPPNL | whelppnl | 8 | Contains name of panel HELP support facility is preparing help information displays for. |
| IEF1-HELPCHP | whelpchp | 8 | Contains TIOLR chapter name where HELP documentation is being derived from. |
| IEF1-HELPSEC | whelpsec | 8 | Contains TIOLR section name where HELP documentation is being derived from. |
| IEF1-HELPPAG | whelppag | 8 | Contains TIOLR page name HELP documentation is being derived from. |
| IEF1-GLOSSEC | wglossec | 8 | Contains TIOLR section name where GLOSSARY documentation is being derived from. This is target word for a GLOSSARY selection. Can be modified by found name within GLOSSARY chapter. |
| IEF1-GLOSPAG | sglospag | 8 | Contains TIOLR page name where GLOSSARY documentation is being derived from. |
| IEF1-GLOSPNL | wglospnl | 8 | Contains name of panel interrupted for GLOSSARY information presentation. |
| IEF1-INFOCHP | winfochop | 8 | Contains TIOLR chapter name presented through INFO. |
| IEF1-INFOSEC | winfosec | 8 | Contains TIOLR section name presented through INFO. |
| IEF1-INFOPAG | winopag | 8 | Contains TIOLR page name presented through INFO. |
| IEF1-PROC | wproc | 8 | Procedure name of active GTD procedure. |
| IEF1-BELL | wbell | 1 | Used in preparation of output displays. Allows application to indicate the bell is to ring on an output display for a 3270 device. Field set to Y indicates bell is to ring. |
| IEF1-OPTIN | woption | 3 | Used for selecting function key prompts for terminals without |

APPENDIX C-continued

TRANSACTION VIEW
APPENDIX TO SPECIFICATION TITLED:
PORTABLE AND DYNAMIC DISTRIBUTED TRANSACTION MANAGEMENT METHOD
INVENTOR: John W. White
FILED: September 28, 1989
This appendix lists the data items included in the
transaction view system provided area. These data items are
listed in the order in which they appear in the transaction view.

| COBOL NAME | C NAME | LENGTH (Bytes) | DESCRIPTION |
|---|---|---|---|
| | | | function keys. |
| IEF1-NAPPL | wnappl | 4 | Reserved. |
| IEF1-NSYSTEM | wnsystem | 8 | New system name. Activated as result of procedure executing with IEF1-XSTATE of LINK. |
| IEF1-NTRAN | wntran | 8 | Name of transaction to be executed as result of IEF1-XSTATE of LINK. |
| IEF1-NPROC | wnproc | 8 | Name of procedure to be executed as result of IEF1-XSTATE for a procedure specifying LINK. |
| IEF1-XSTATE | wxstate | 8 | Exit state for an application. Can be set to LINK, RETURN, RESET, QUIT, indicating action to be taken by system as a result of the procedure completion. |
| IEF1-RSVRD3 | wsvrd3 | 16 | Reserved. |
| IEF1-DATA1 | wdata1 | 8 | Generic work field available to GTD application. |
| IEF1-DATA2 | wdata2 | 8 | Generic work field available to GTD application. |
| IEF1-DATA3 | wdata3 | 8 | Generic work field available to GTD application. |
| IEF1-DATA4 | wdata4 | 8 | Generic work field available to GTD application. |
| IEF1-OUTPUT | woutput | 32 | Generic work area available to GTD application. |
| IEF1-ETIMINT | wetimint | 4 | Number of microseconds (in integer format) required for transaction initialization. |
| IEF1-ETIMGSY | wetimgsy | 4 | Number of microseconds (in integer format) required to execute 'GET SYSTEM' request from IEC. |
| IEF1-ETIMGUY | wetimgu | 4 | Number of microseconds (in integer format) required to execute the 'GET UNIQUE' to IMS. |
| IEF1-ETIMGDV | wetimgdv | 4 | Number of microseconds (in integer format) required to execute 'GET DEVICE' request from IEC. |
| IEF1-ETIMGVW | wetimgvw | 4 | Number of microseconds (in integer format) required to execute 'GET VIEW' request from IEC. |
| IEF1-ETIMRVW | wetimrvw | 4 | Number of microseconds (in integer format) required to execute 'RESTORE VIEW' request from IEC. |
| IET1-ETIMITM | wetimitm | 4 | Number of microseconds (in integer format) required to complete input TMS call. |
| IEF1-ETIMXC | wetimxc | 4 | Number of microseconds (in integer format) required to execute procedure. |
| IEF1-ETIMTOT | wetimtot | 4 | Number of microseconds (in integer format) required to execute total transaction from transaction initialization through procedure execution. |
| IEF1-ETIM36 | weit36 | 4 | Reserved time field. |
| IEF1-ETIM40 | weit40 | 4 | Reserved time field. |
| IEF1-ETIM44 | weit44 | 4 | Reserved time field. |
| IEFI-LOOKAHEAD | wlookahead | 64 | Used by application to allow user to select new transaction. If first byte is indicated, the |

APPENDIX C-continued

TRANSACTION VIEW
APPENDIX TO SPECIFICATION TITLED:
PORTABLE AND DYNAMIC DISTRIBUTED TRANSACTION MANAGEMENT METHOD
INVENTOR: John W. White
FILED: September 28, 1989

This appendix lists the data items included in the transaction view system provided area. These data items are listed in the order in which they appear in the transaction view.

| COBOL NAME | C NAME | LENGTH (Bytes) | DESCRIPTION |
|---|---|---|---|
| | | | menu request is ignored by IET. Application has responsibility to take action to select next (LOOKAHEAD) action according to contents of this field. |
| IEF1-RSVRDS | wrsvrds | 400 | Reserved. |

What is claimed is:

1. A distributed environment for developing transaction processing applications across a selected set of heterogenous computing platforms, comprising:

a terminal;

a communications line connected to said terminal for transmitting an input;

a communications processor adapted to be connected to said communications line for receiving said input;

a hookup line adapted to be connected to said communications processor for transmitting said input from said communications processor to a central processing unit;

a bus adapted to be connected to said central processing unit for forwarding said input from said central processing unit to a computer memory;

a tool located within said computer memory for generating a transaction based on said input which can be distributed and executed on any of the selected set of heterogenous computing platforms;

a transaction definition table built specifically for said generated transaction;

a database; and an SQL command interface for accessing said database, further adapted to return information obtained from said database in response to requests for such information received from said tool or in accordance with information in said transaction definition table.

2. The distributed environment of claim 1, wherein said database includes source code, objects and datasets.

3. The distributed environment of claim 2, wherein said transaction definition table maintains pointers to at least one view, at least one panel and at least one procedure to be associated with said generated transaction.

* * * * *

UNITED STATES PATENT AND TRADEMARK OFFICE
CERTIFICATE OF CORRECTION

PATENT NO. : 6,115,710  
DATED : September 5, 2000  
INVENTOR(S) : John W. White Page 1 of 1

It is certified that error appears in the above-identified patent and that said Letters Patent is hereby corrected as shown below:

<u>Title page,</u>  
Item [56], please insert -- References Cited  
                    U.S. PATENT DOCUMENTS

| | | |
|---|---|---|
| 4,575,816 | 3/1986 | Hendrickson et al. ................. |
| 4,751,635 | 6/1988 | Kret ............................... |
| 5,202,996 | 4/1993 | Sugino et al. ..................... |
| 5,313,614 | 5/1994 | Goettelmann et al. ............... |
| 5,333,314 | 7/1994 | Masai et al. ...................... -- |

Signed and Sealed this

Fifth Day of February, 2002

Attest:

JAMES E. ROGAN  
*Attesting Officer*      *Director of the United States Patent and Trademark Office*